(12) United States Patent
Howell

(10) Patent No.: US 6,888,820 B1
(45) Date of Patent: May 3, 2005

(54) SYSTEM AND METHOD FOR TREATING A CALL FOR CALL PROCESSING

(75) Inventor: Royal Dean Howell, Trimble, MO (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 10/818,482

(22) Filed: Apr. 5, 2004

Related U.S. Application Data

(63) Continuation of application No. 10/199,775, filed on Jul. 19, 2002, now Pat. No. 6,744,770, which is a continuation of application No. 09/026,766, filed on Feb. 20, 1998, now Pat. No. 6,470,019.

(51) Int. Cl.[7] .................................................. H04J 3/16

(52) U.S. Cl. ........................................ 370/350; 370/524

(58) Field of Search ................................. 370/377, 397, 370/352, 358, 356, 392, 395.1, 396, 398, 376, 400, 401, 410, 467, 466, 351, 452, 402, 403, 389, 399, 465, 468, 469, 395.31, 395.5, 395.6, 395.51, 395.7, 395.71, 524, 405, 522, 404, 395.61, 395.65; 379/227, 224, 207, 209, 93.15, 93.31, 93.32, 219, 220.01, 221.1, 225, 229.23, 242, 15.02, 15.04, 207.16

(56) References Cited

U.S. PATENT DOCUMENTS

| 5,067,123 A | * | 11/1991 | Hyodo et al. | ................ 370/396 |
| 5,115,427 A | * | 5/1992 | Johnson et al. | ............. 370/391 |

* cited by examiner

*Primary Examiner*—Dang Ton

(57) ABSTRACT

The invention comprises of a telecommunications signaling processor that processes signaling system #7 telecommunications signaling messages to select asynchronous transfer mode virtual connections and to provide control messages indicating the selected virtual connections. The telecommunications signaling processor also processes non-call associated signaling messages for call maintenance.

20 Claims, 195 Drawing Sheets

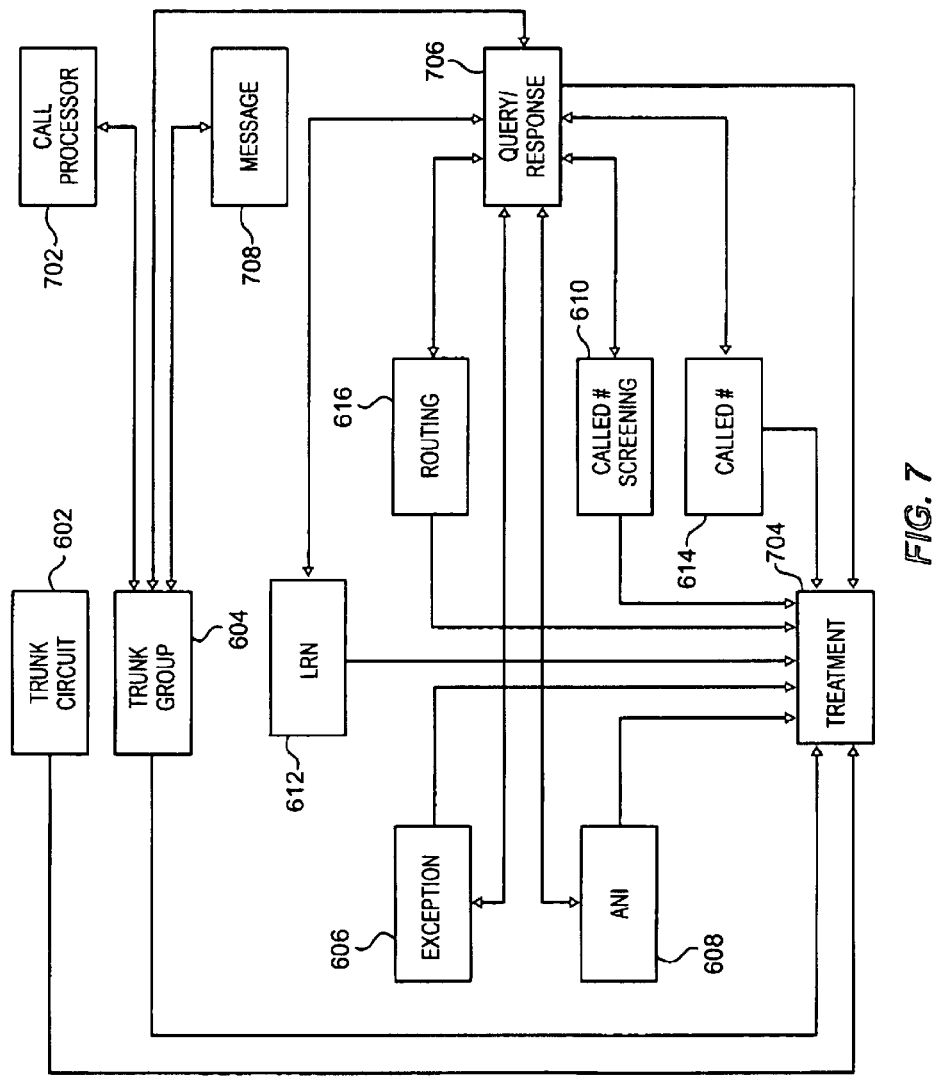

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 8A

| TRUNK GROUP NUMBER | GLARE RESOLUTION | CONTINUITY CONTROL | CLLI | SATELLITE TRUNK GROUP | SERVICE INDICATOR | NPA | SEL SEQ | HOP COUNTER | ACC ACTIVE | RE-ATTEMPT CIRCUIT | DEFAULT JIP/LRN | OMI | NEXT FUNCTION | NEXT INDEX |
|---|---|---|---|---|---|---|---|---|---|---|---|---|---|---|
| | | | | | | | | | | | | | | |
| | | | | | | | | | | | | | | |
| | | | | | | | | | | | | | | |

FIG. 8B

| EXCEPTION TABLE INDEX | CARRIER SELECTION IDENTIFICATION | CARRIER IDENTIFICATION | CALLED PARTY | | | NEXT FUNCTION | NEXT INDEX |
|---|---|---|---|---|---|---|---|
| | | | NATURE OF ADDRESS | DIGITS FROM | DIGITS TO | | |
| | | | | | | | |
| | | | | | | | |

| ANI TABLE INDEX | CALLING PARTY CATEGORY | CALLING PARTY/CHARGE NUMBER | | | | ORIGINATING LINE INFORMATION | NEXT FUNCTION | NEXT INDEX |
|---|---|---|---|---|---|---|---|---|
| | | NATURE OF ADDRESS | DIGITS FROM | DIGITS TO | DATA | | | |
| | | | | | | | | |
| | | | | | | | | |

FIG. 10A

| CALLED NUMBER SCREENING TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 10B

| LRN TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 11

| ROUTING TABLE INDEX | TRANSIT NETWORK SELECTION | | | NEXT FUNCTION #1 | INDEX #1 | SIGNAL ROUTE | NEXT FUNCTION #2 | INDEX #2 | SIGNAL ROUTE | NEXT FUNCTION #3 | INDEX #3 | SIGNAL ROUTE |
|---|---|---|---|---|---|---|---|---|---|---|---|---|
| | NETWORK IDENTIFICATION PLAN | DIGITS | CIRCUIT CODE | | | | | | | | | |
| | | | | | | | | | | | | |
| | | | | | | | | | | | | |

FIG. 12

| TREATMENT TABLE INDEX | MESSAGE RECEIVED CAUSE VALUE | GENERAL LOCATION | CODING STANDARD | CAUSE VALUE | NEXT FUNCTION | NEXT INDEX |
|---|---|---|---|---|---|---|
| | | | | | | |
| | | | | | | |

FIG. 13

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | LNP SIGNALING INSTRUCTION PARAMETER | | | |
| | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | JURISDICTION | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

FIG. 14

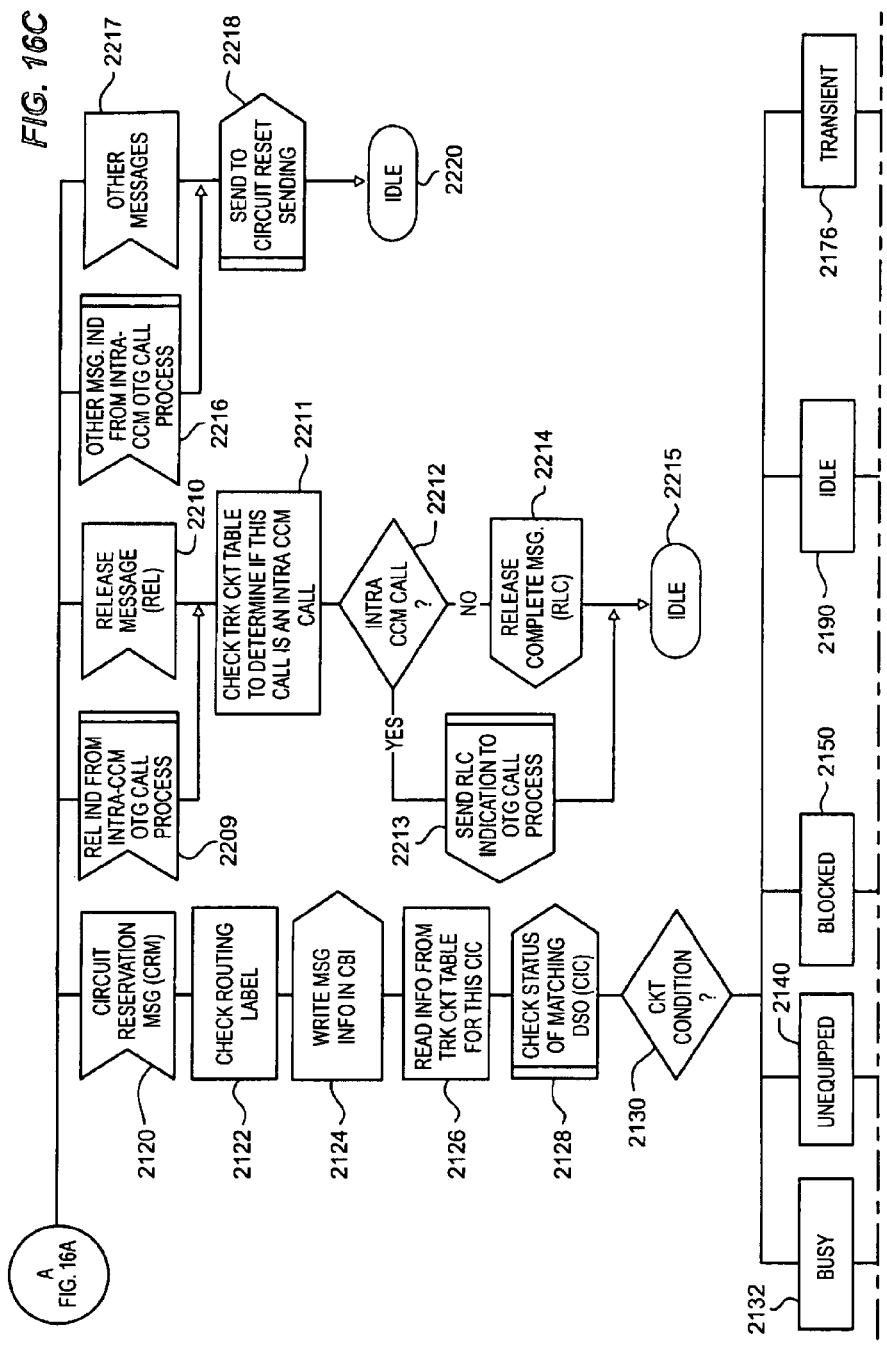

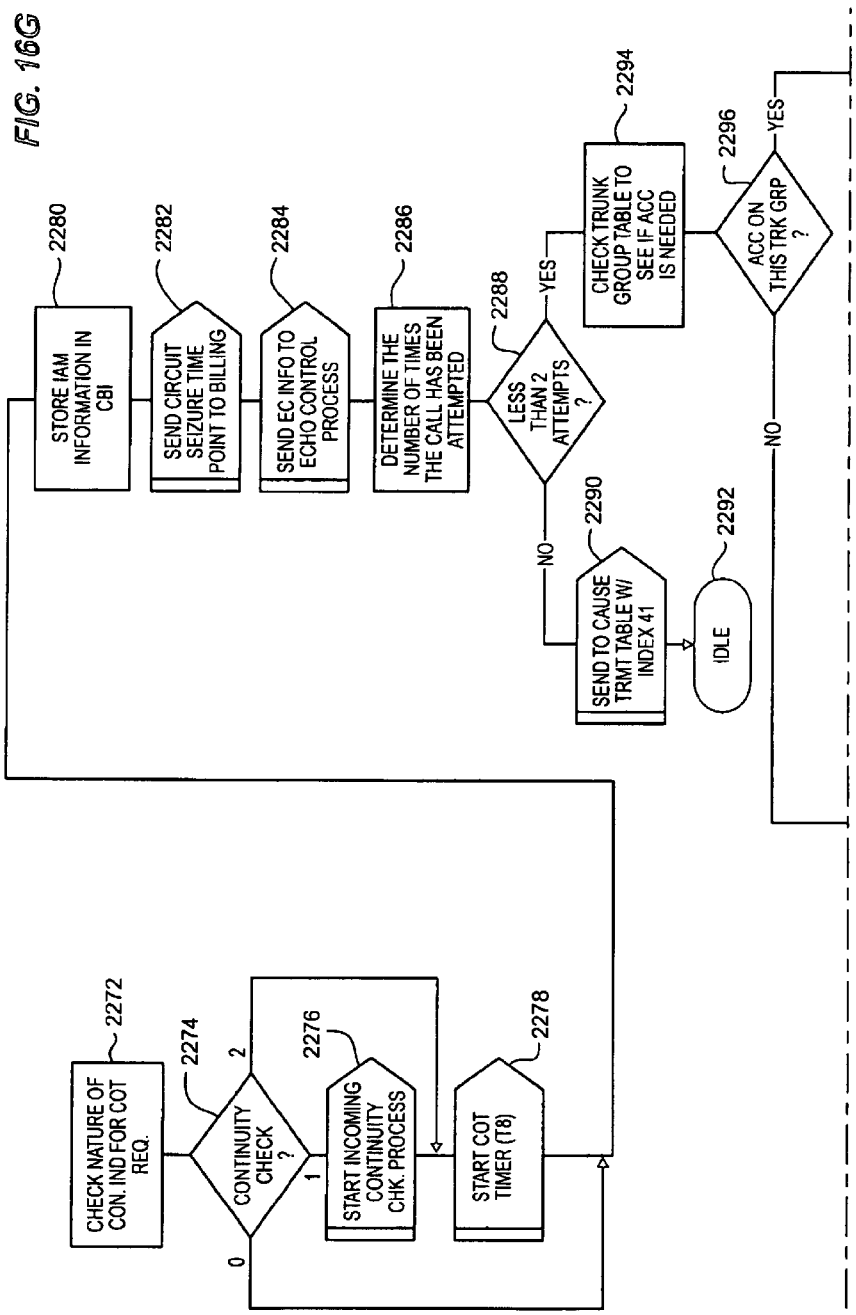

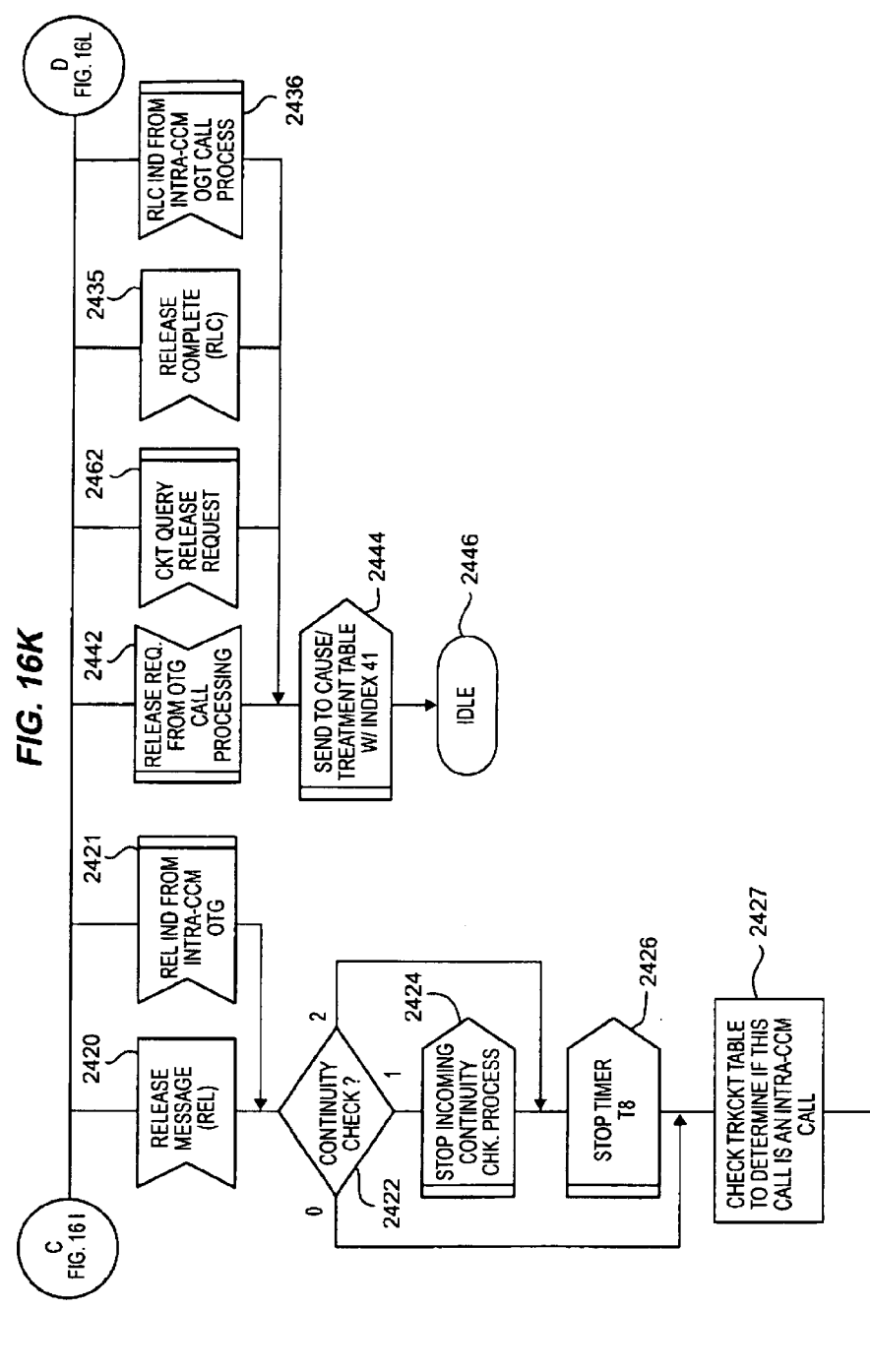

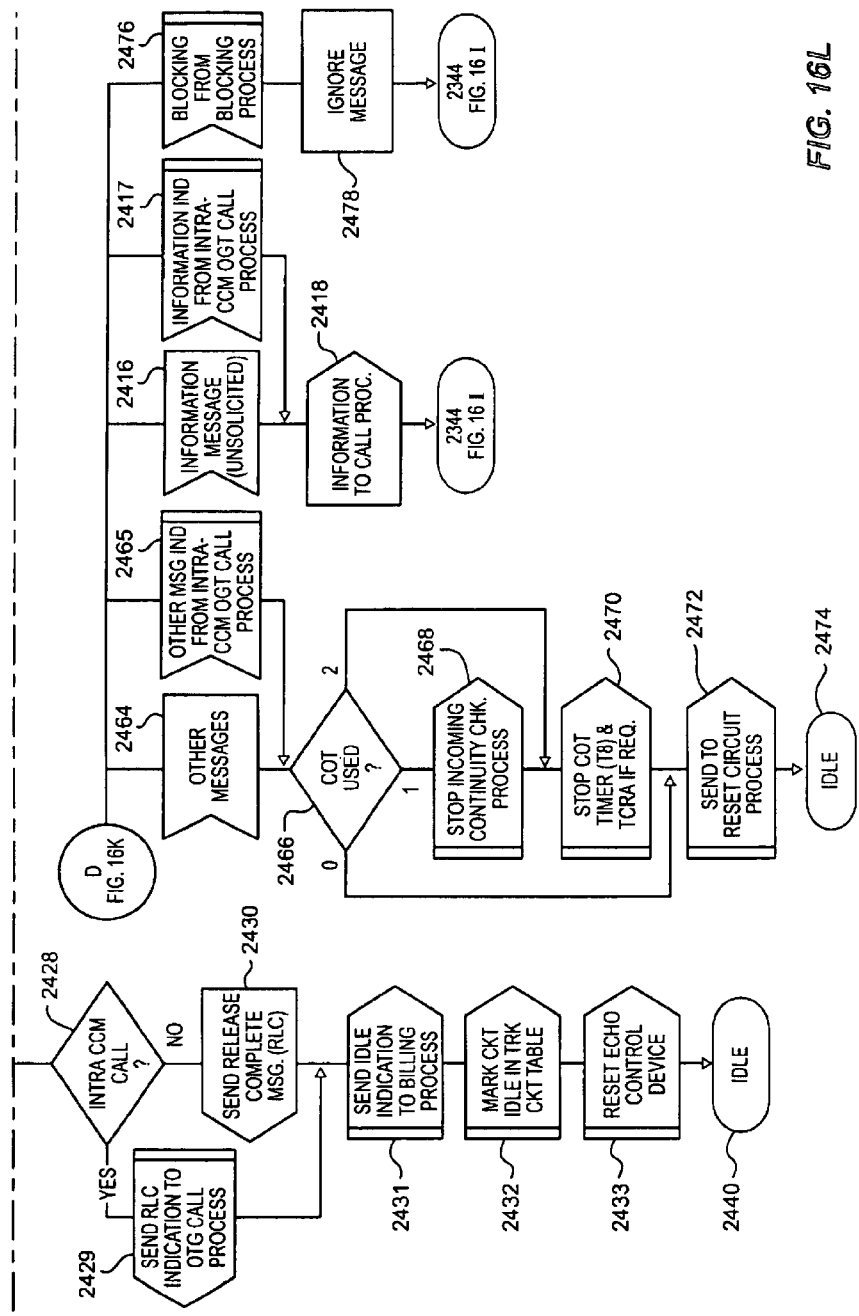

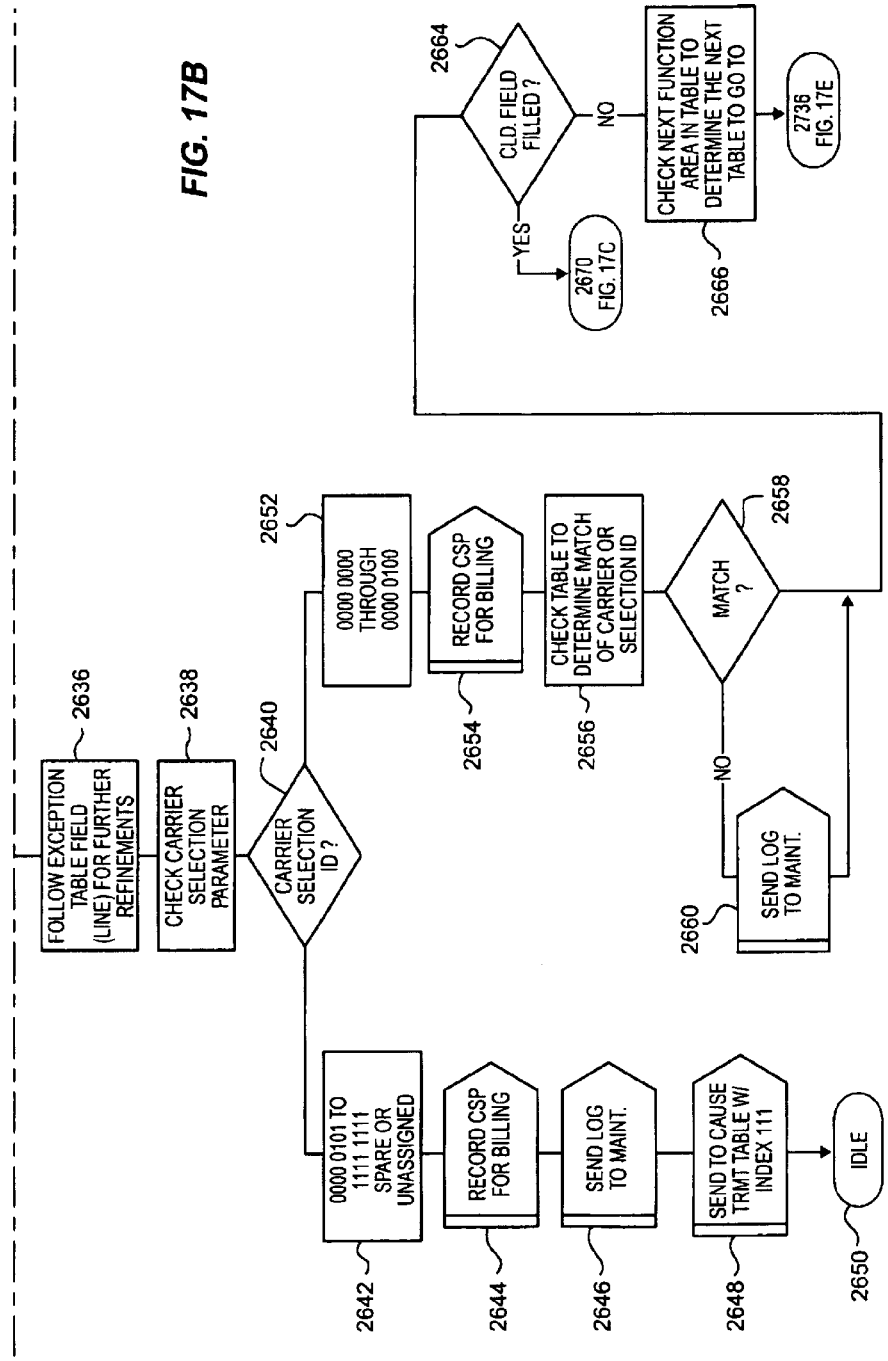

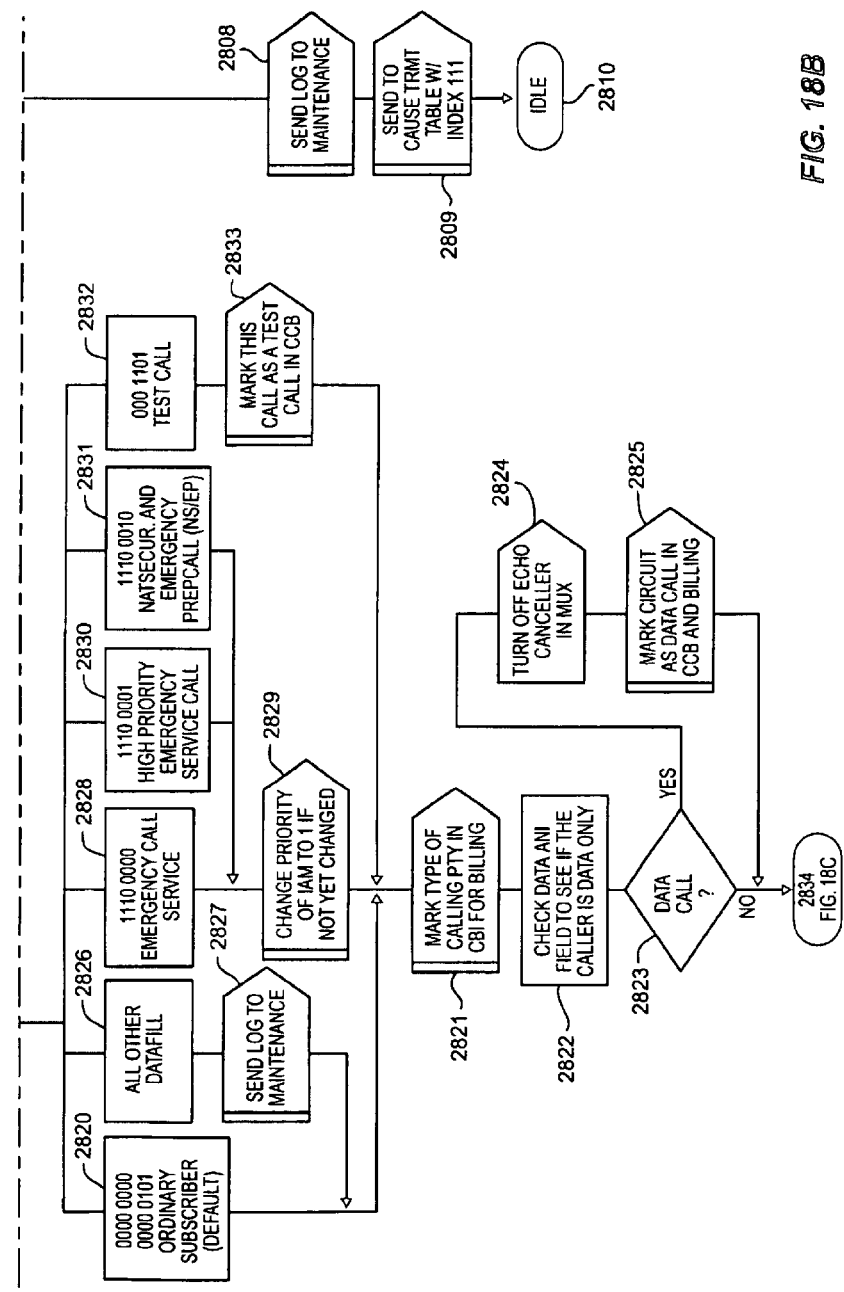

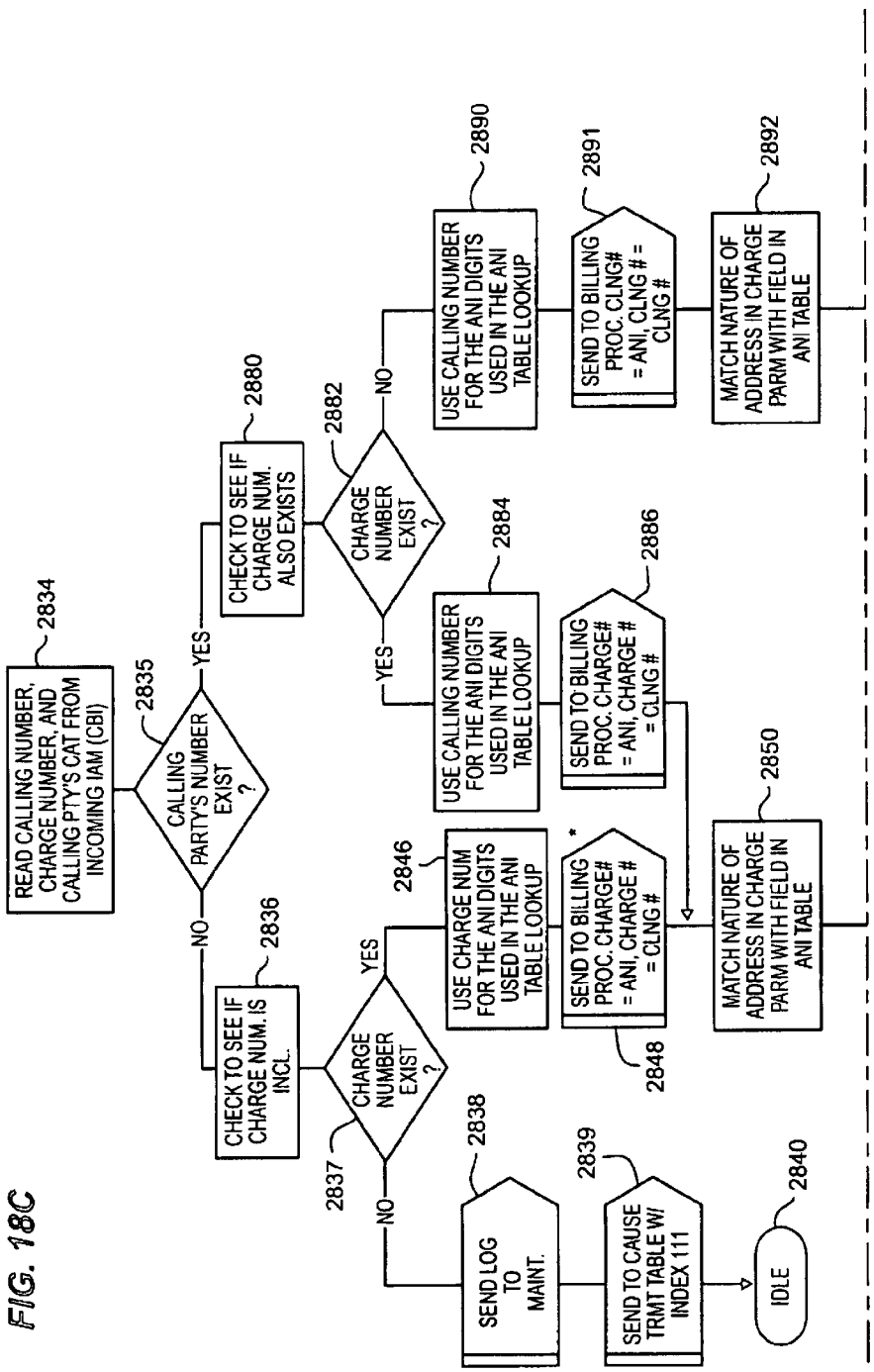

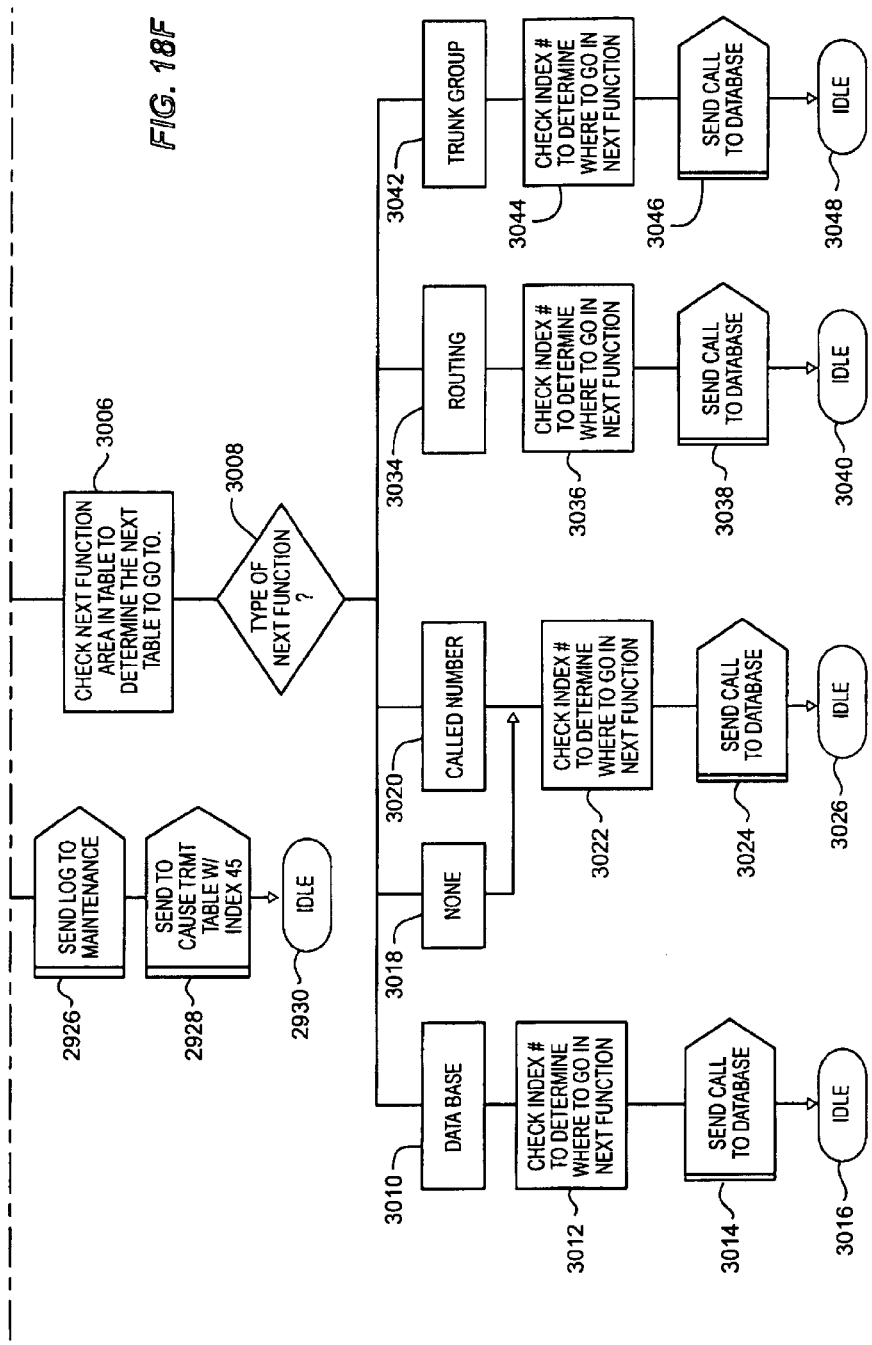

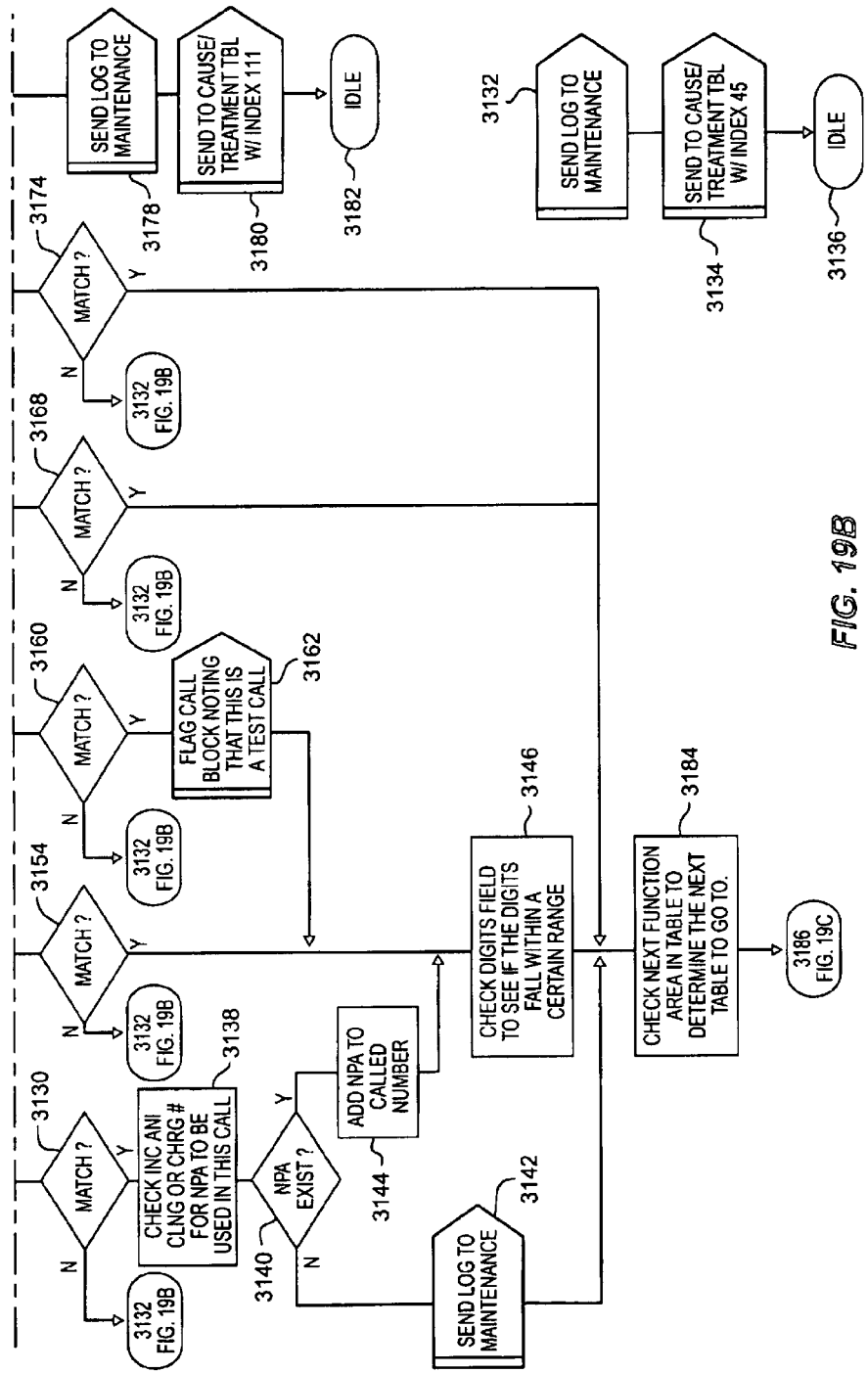

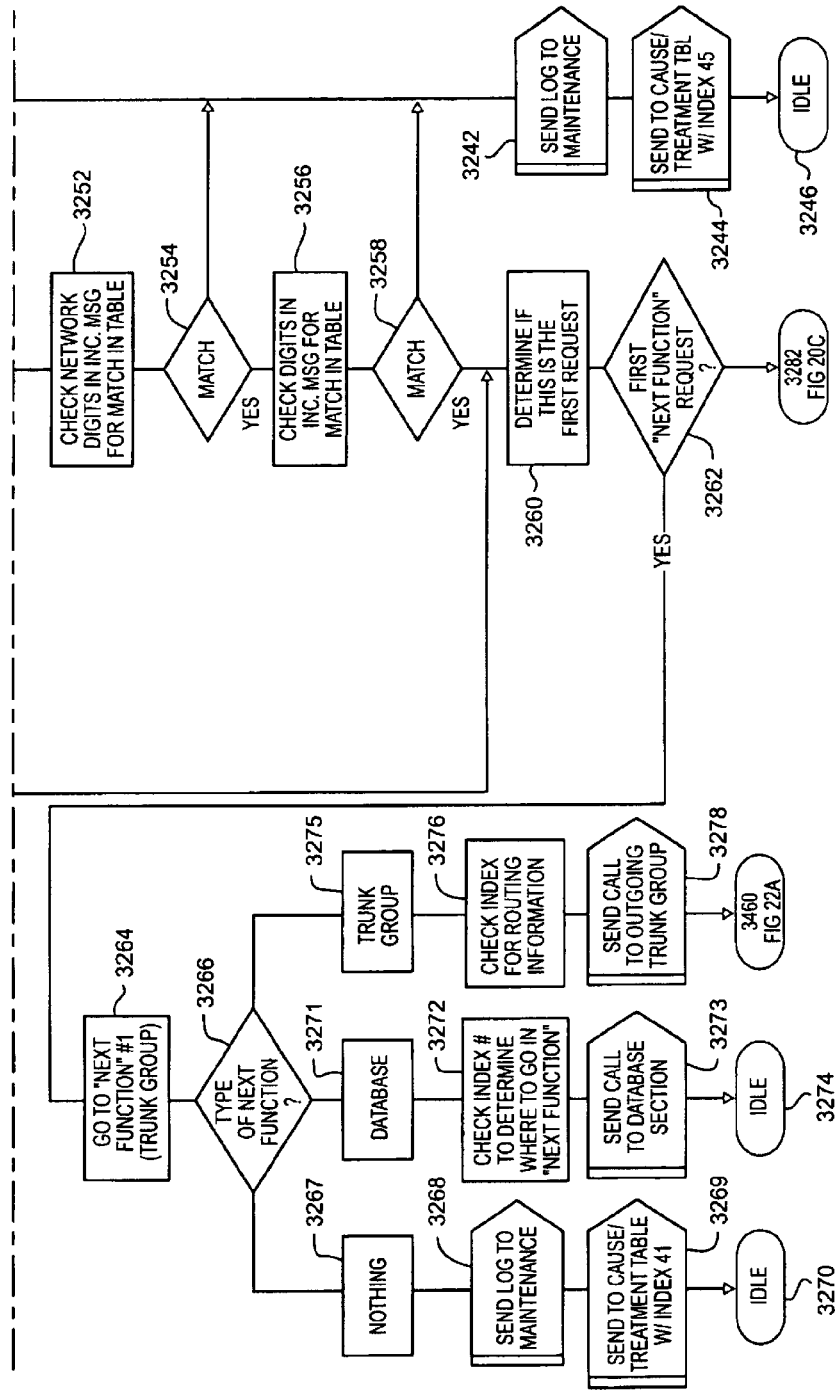

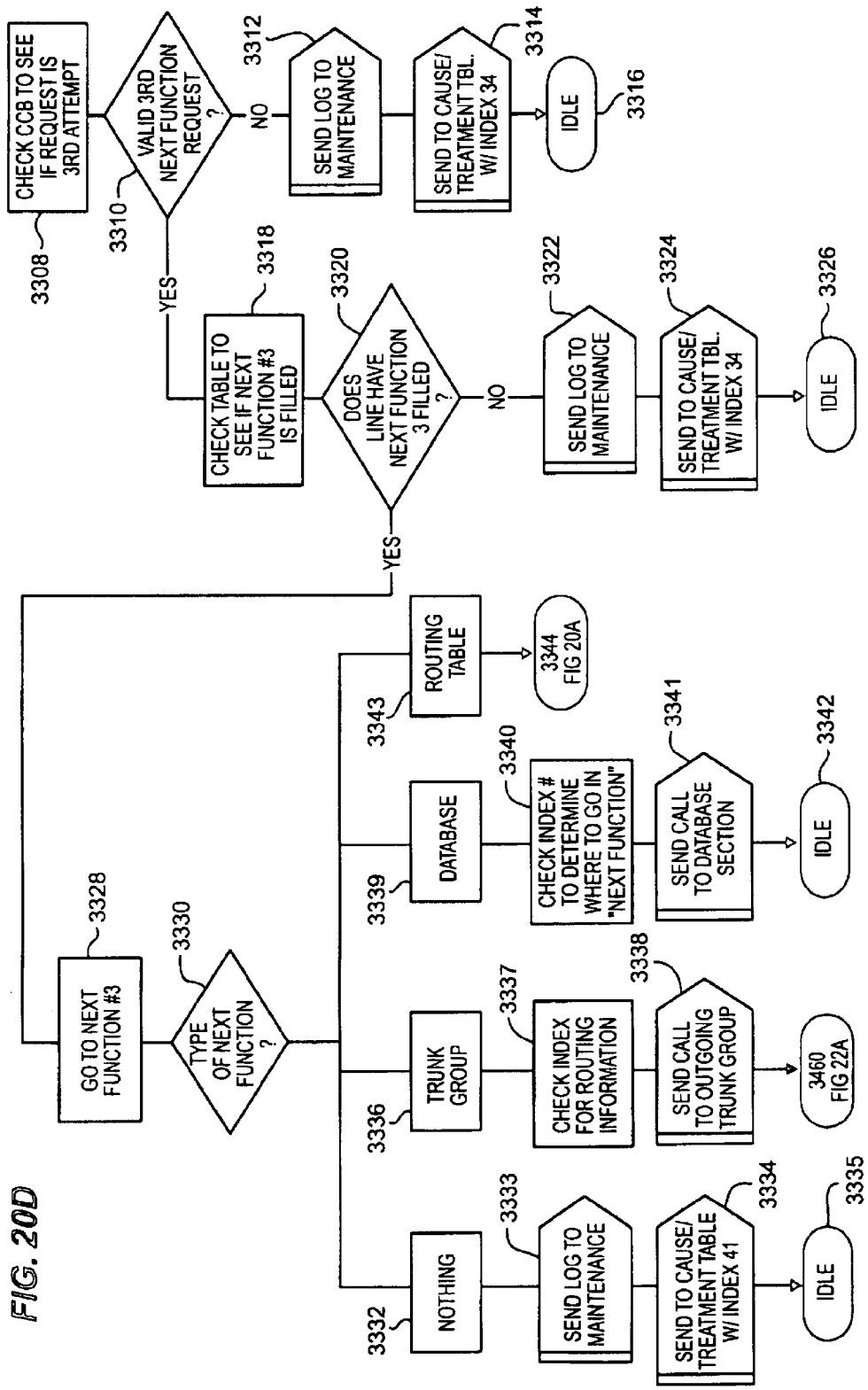

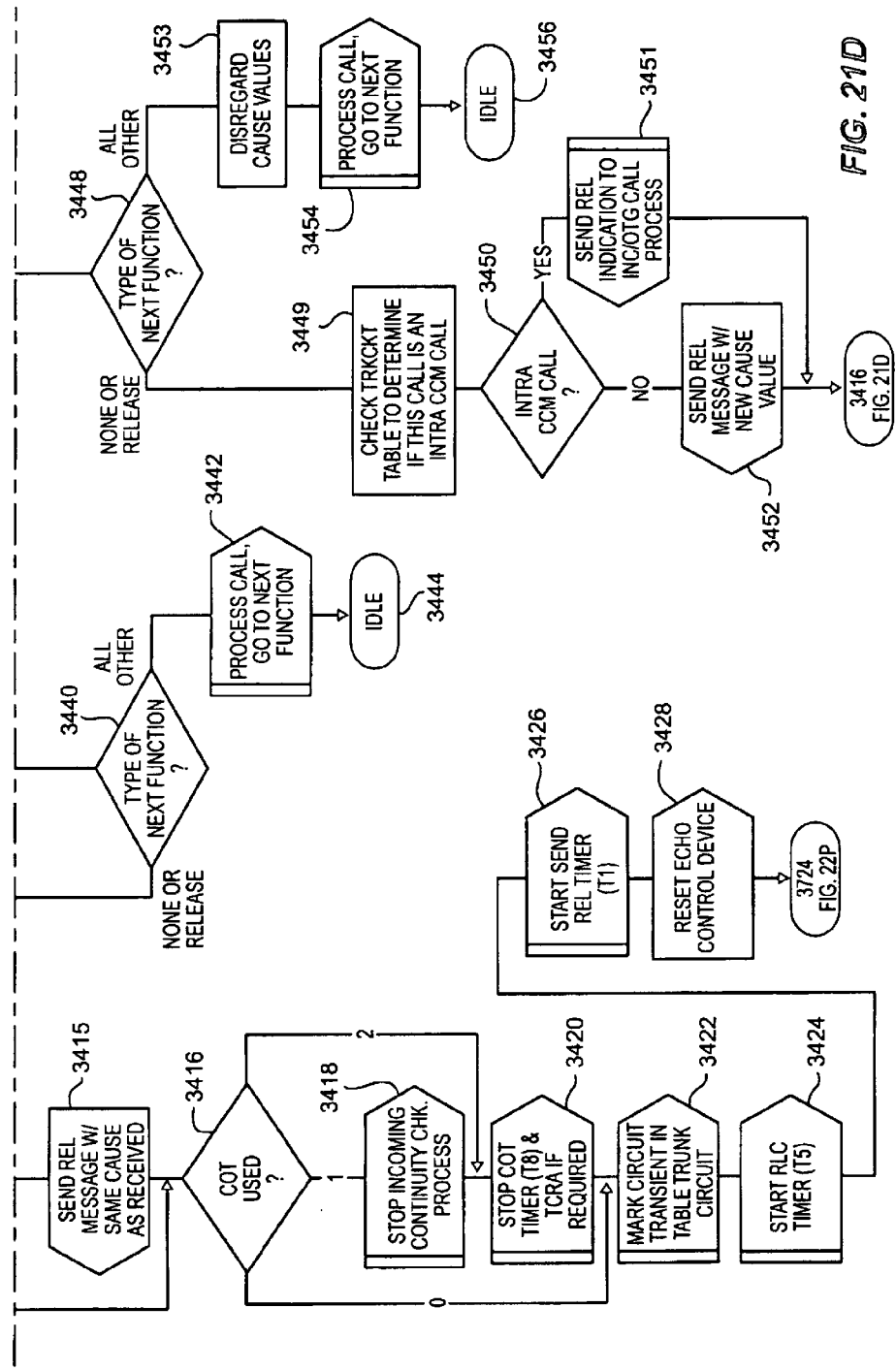

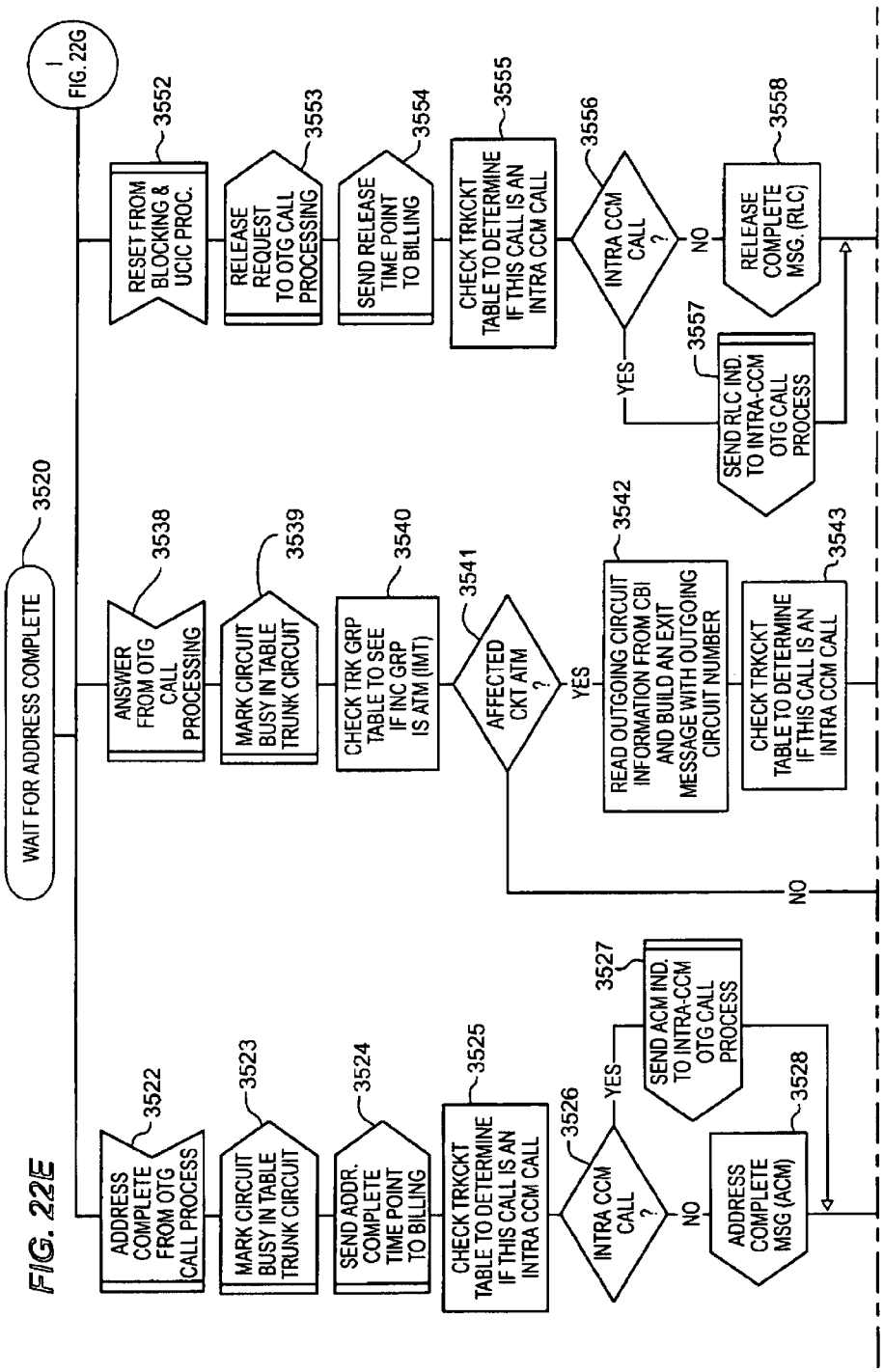

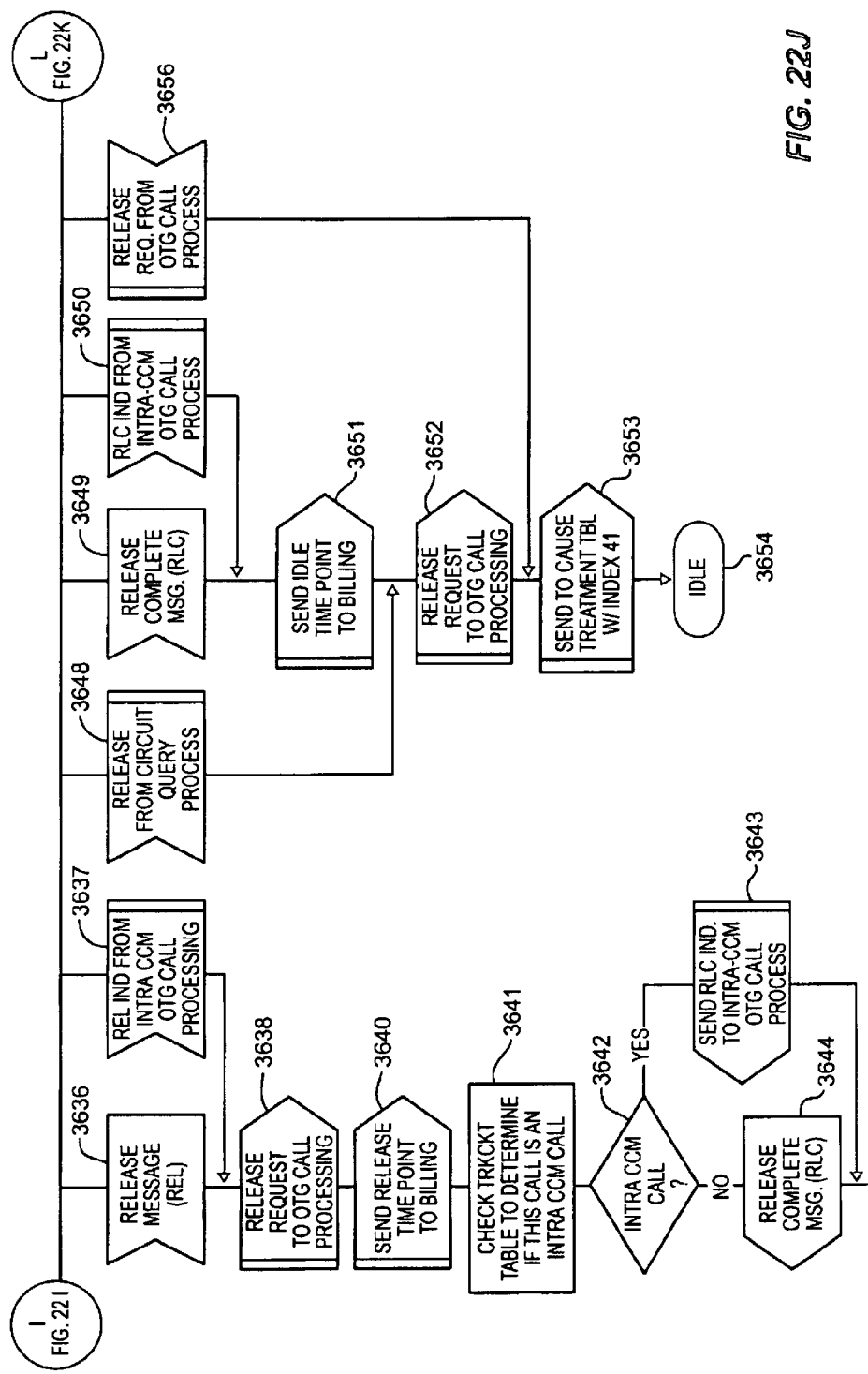

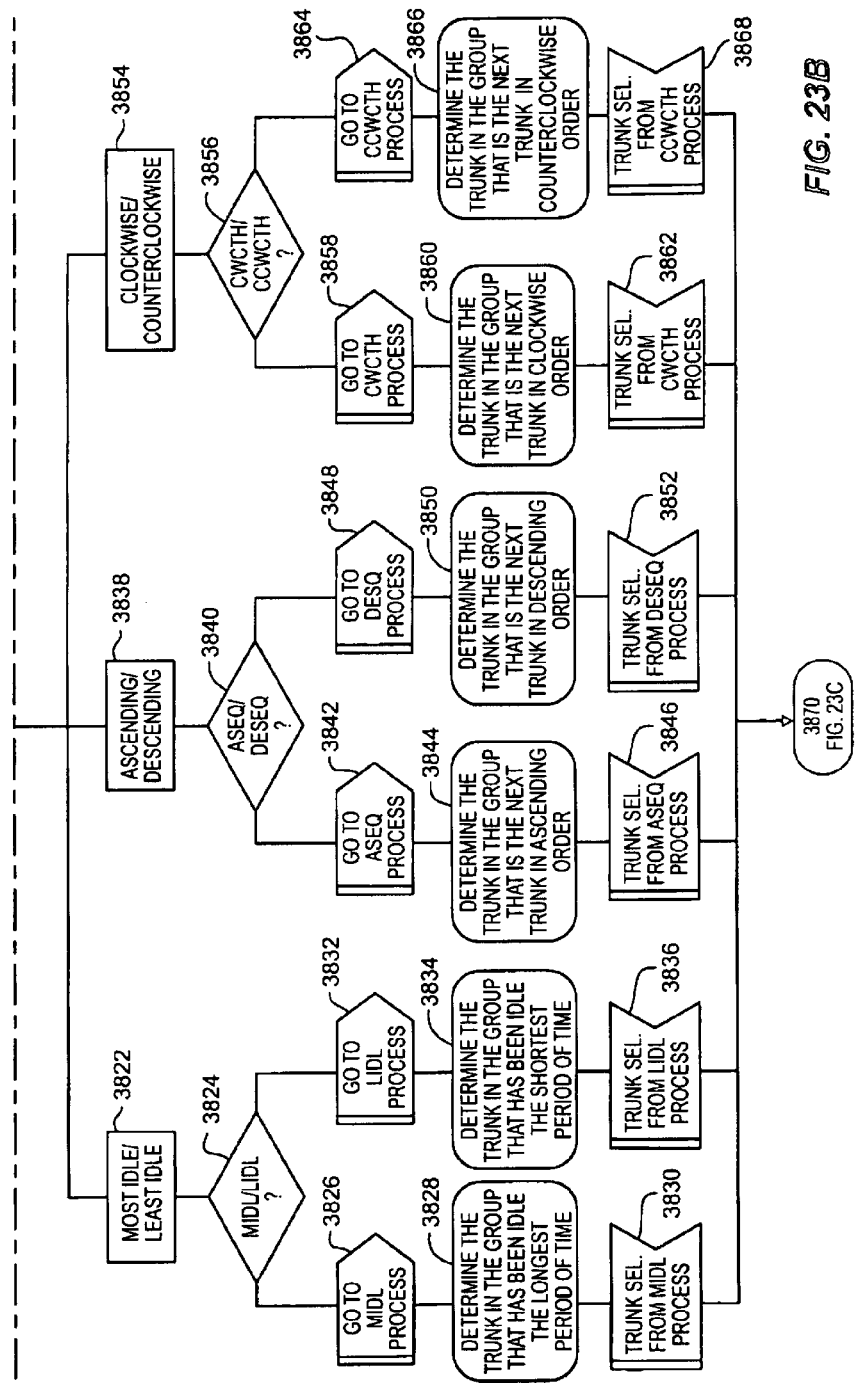

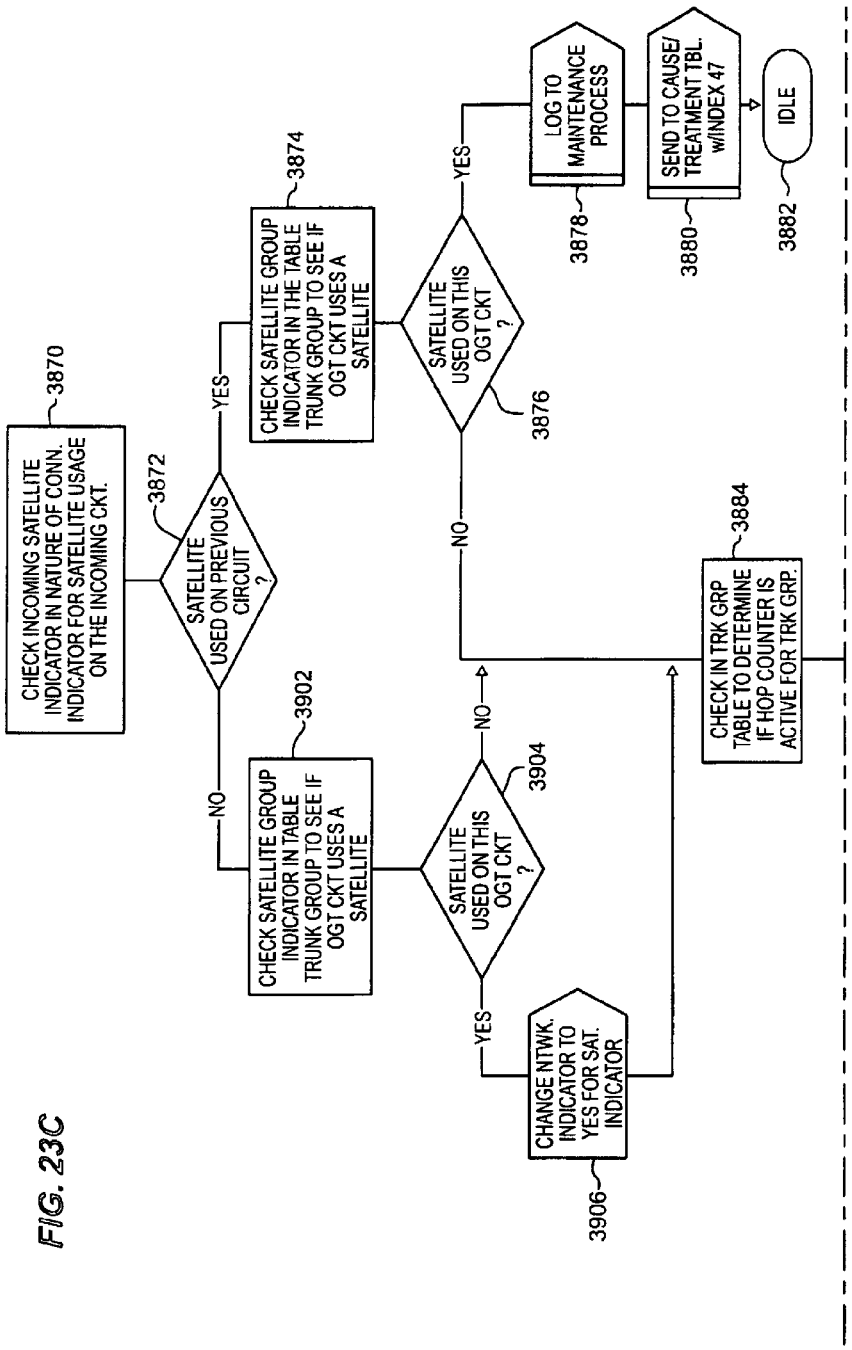

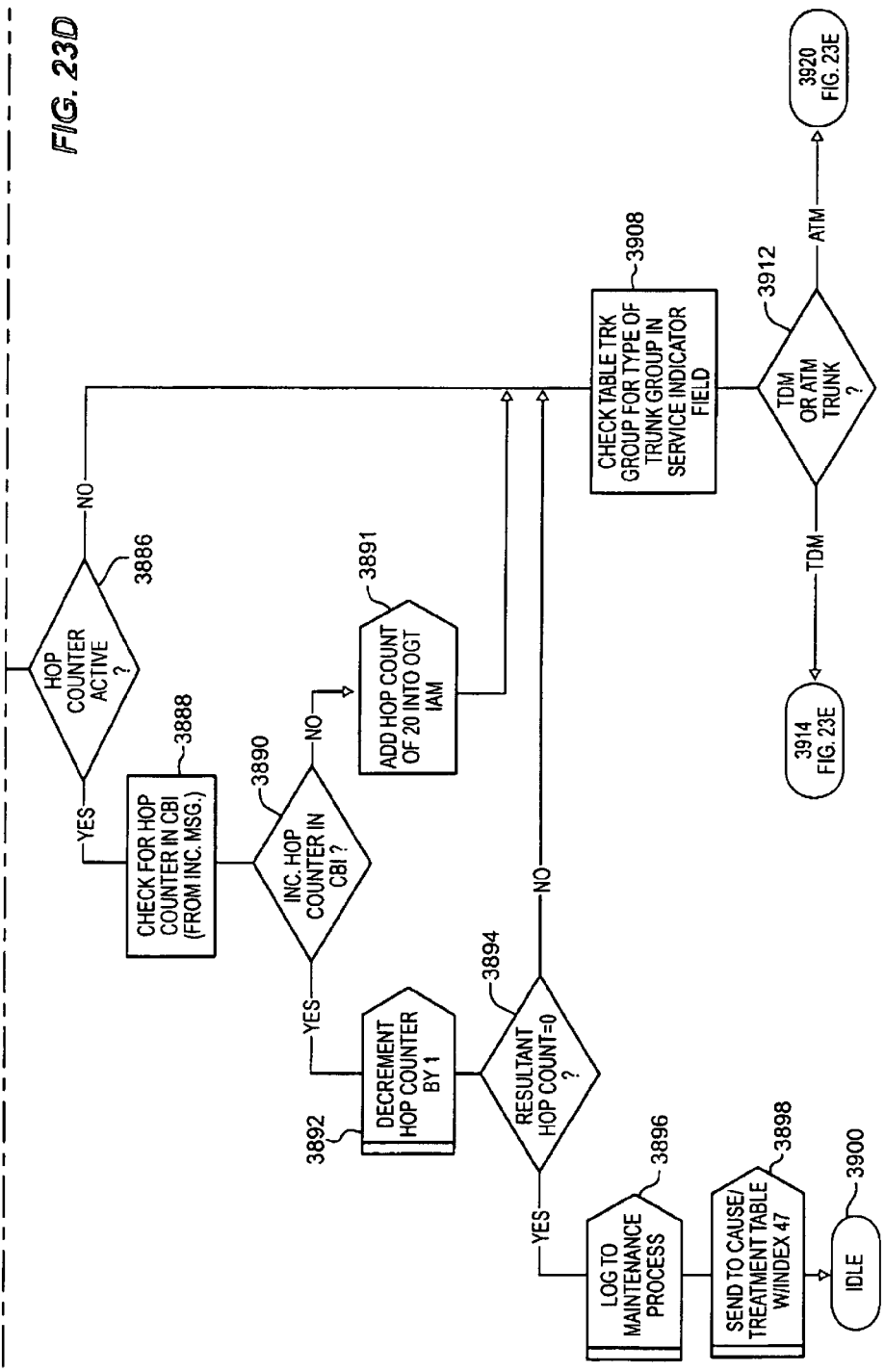

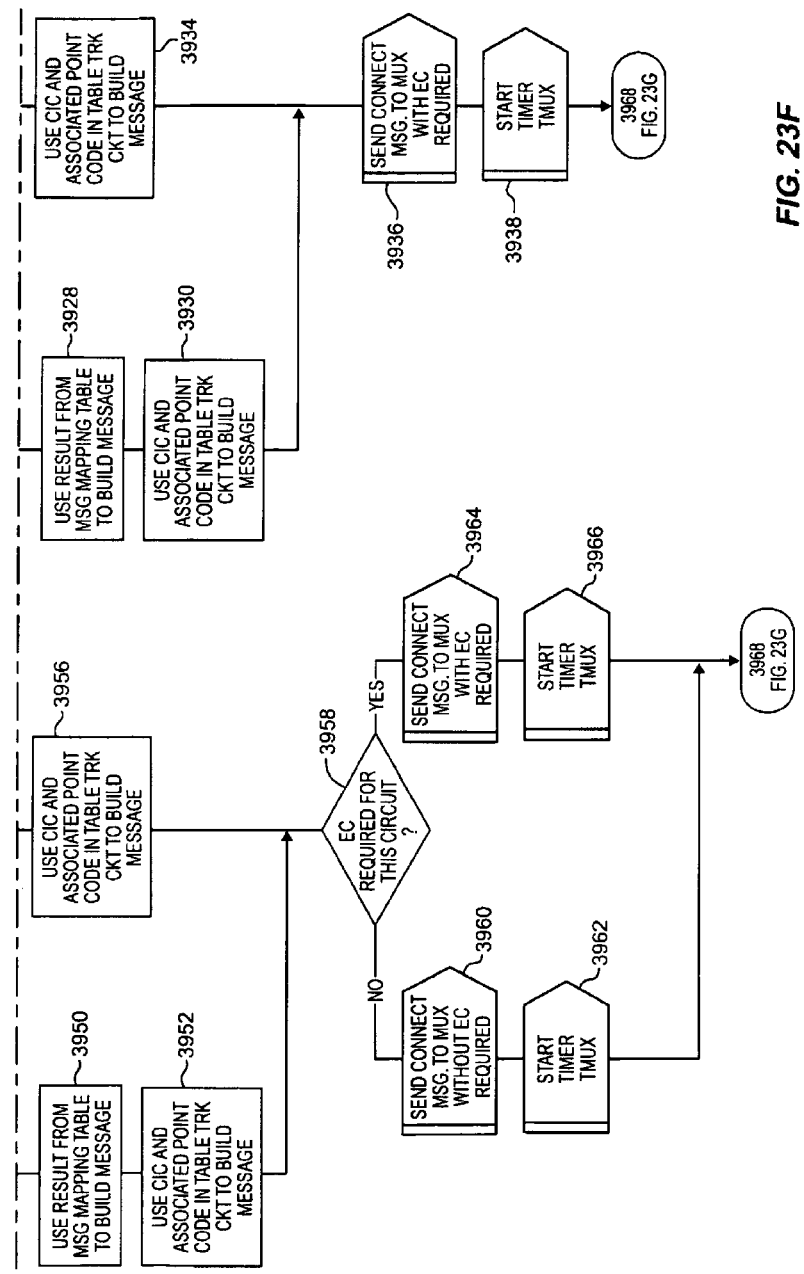

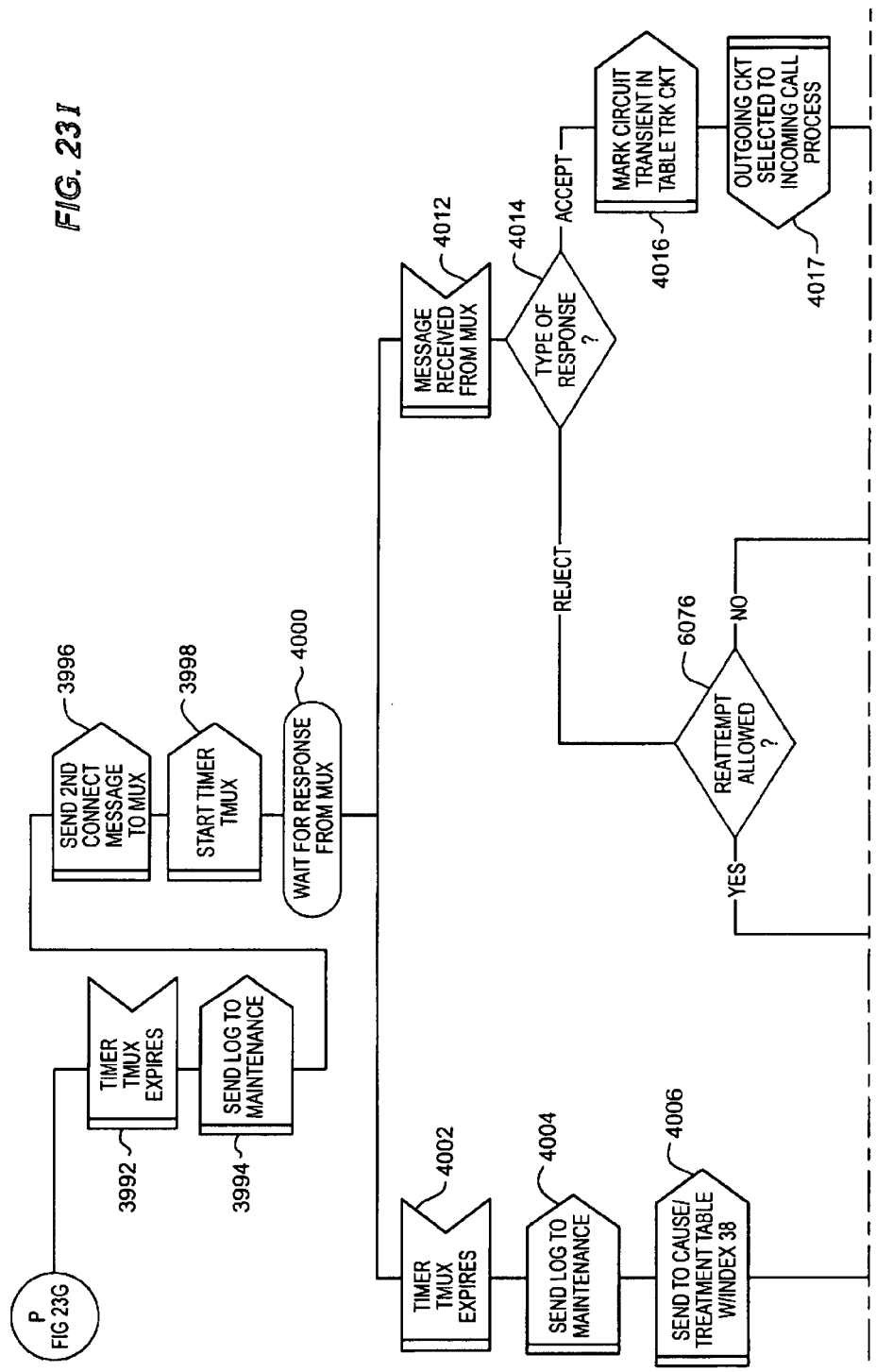

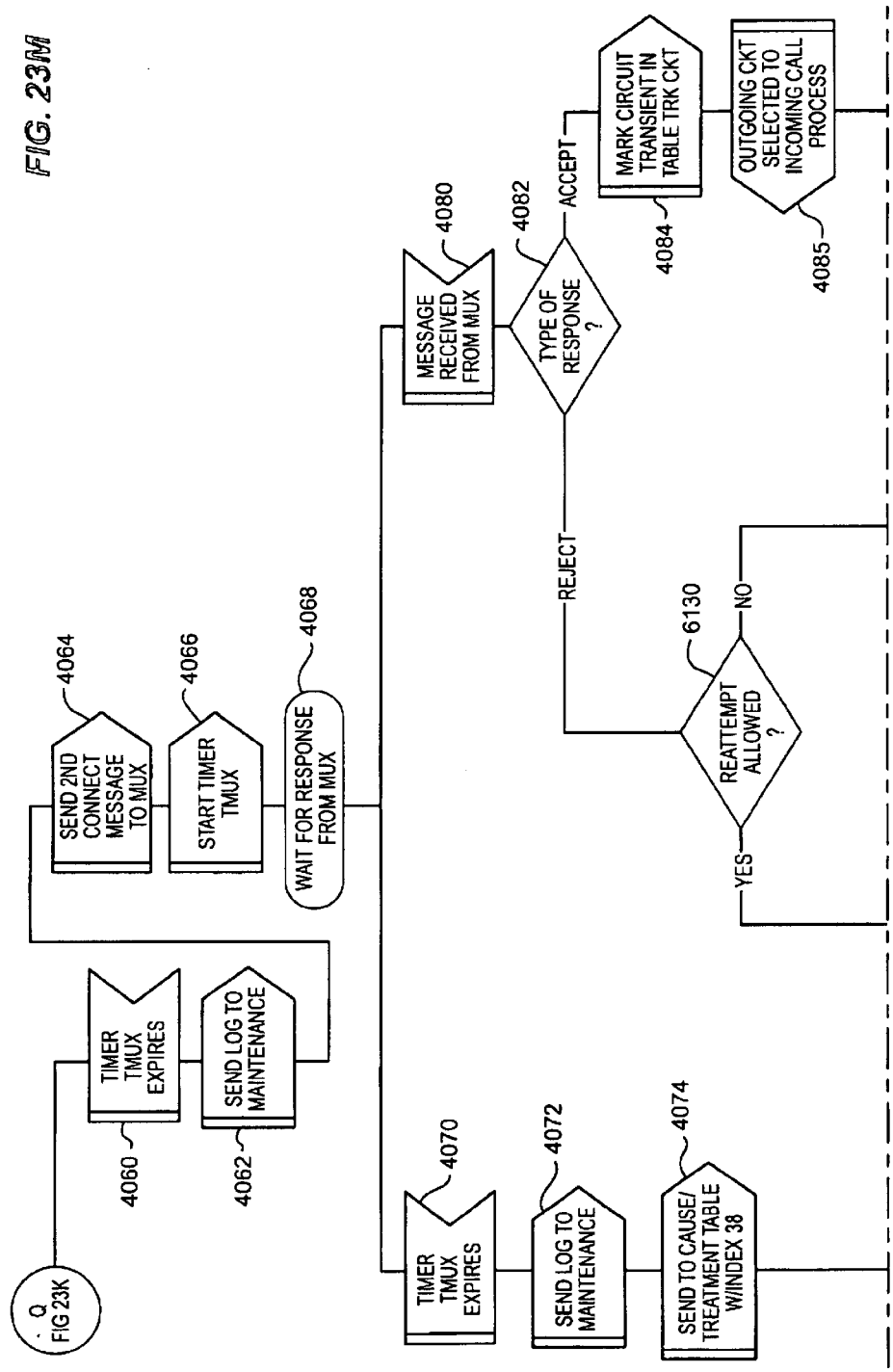

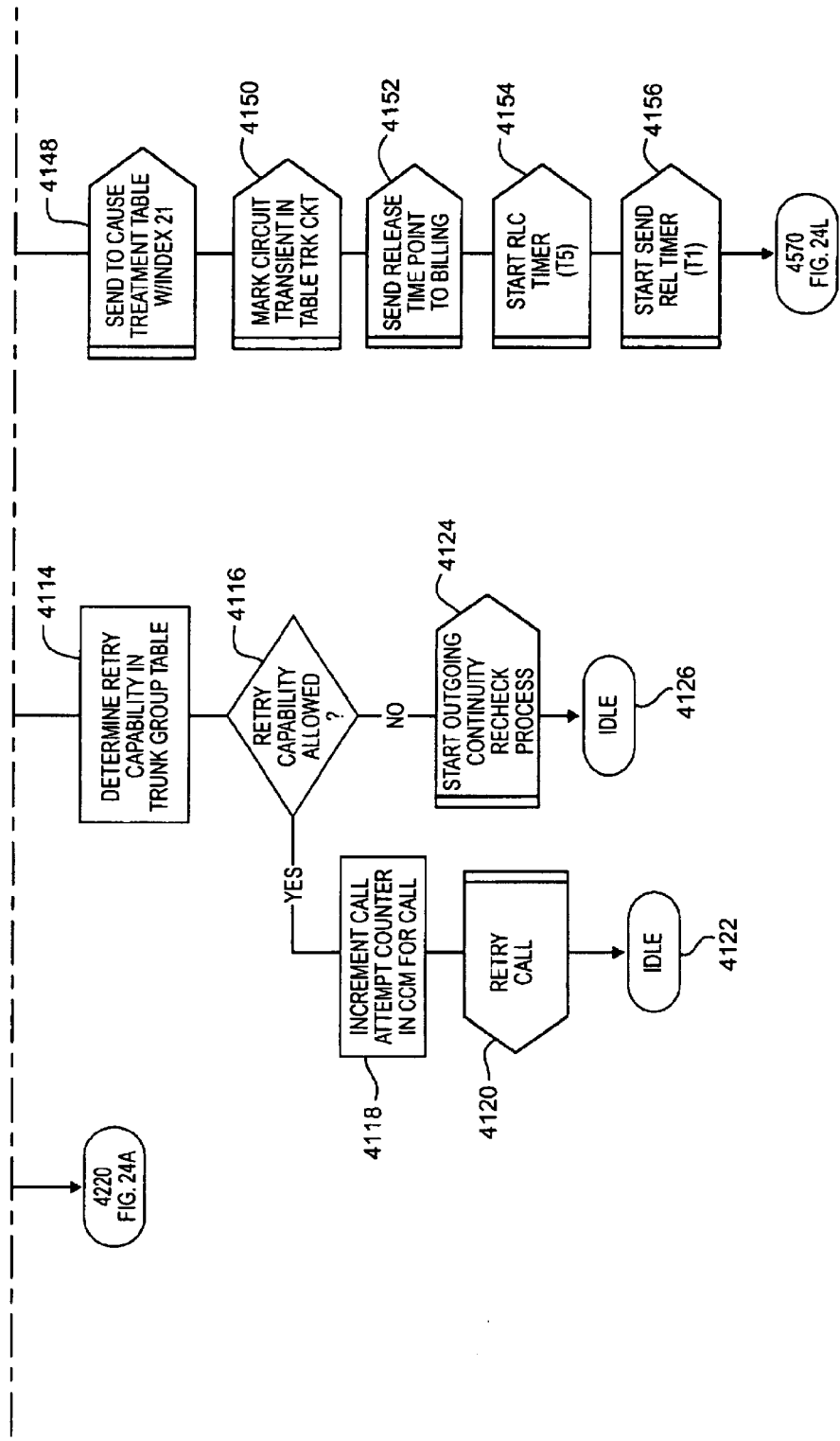

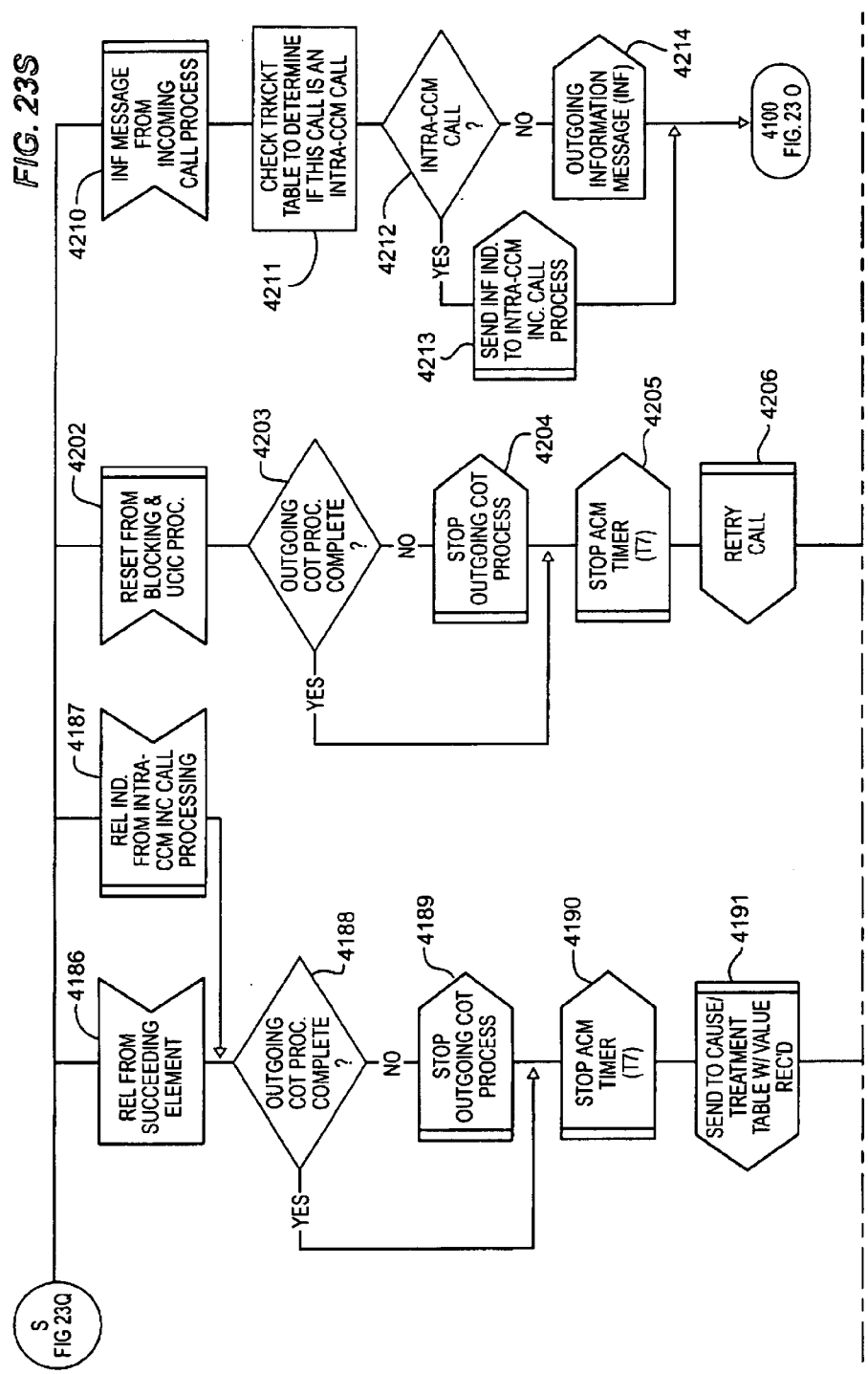

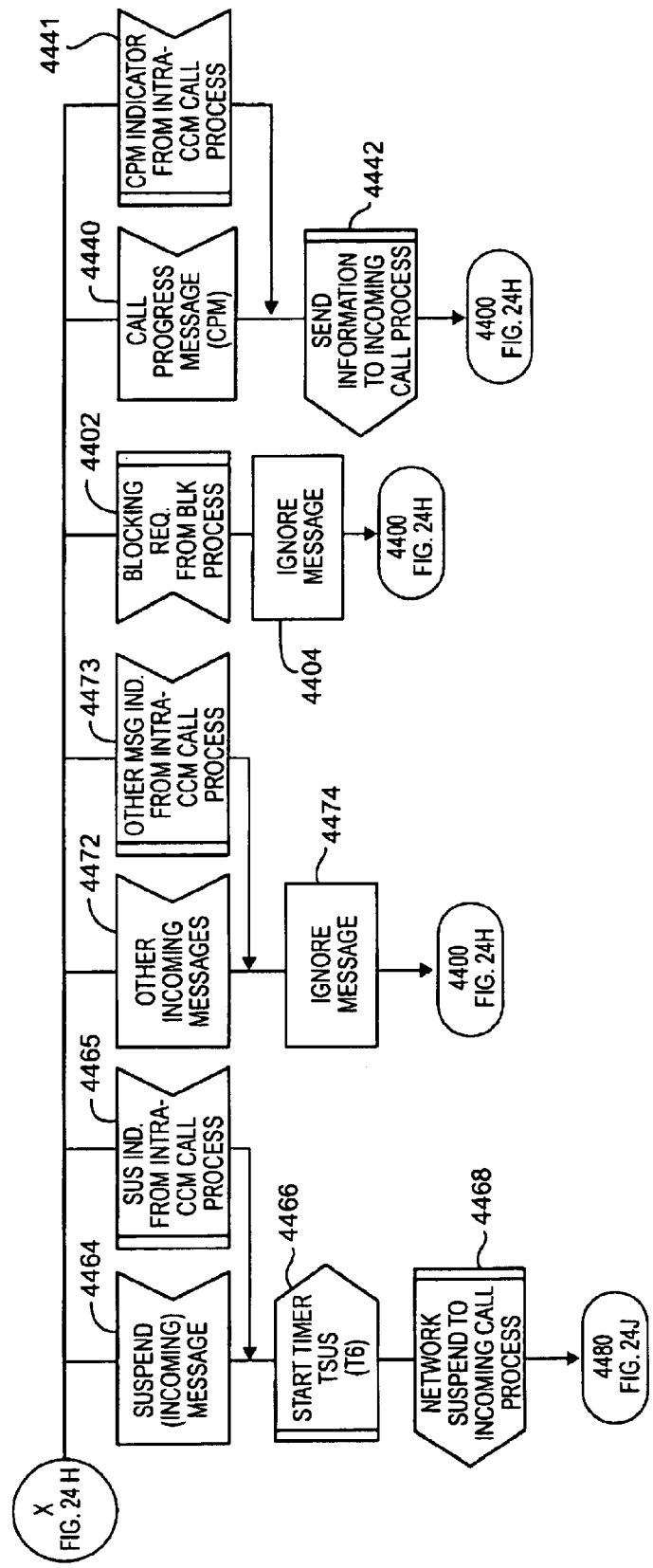

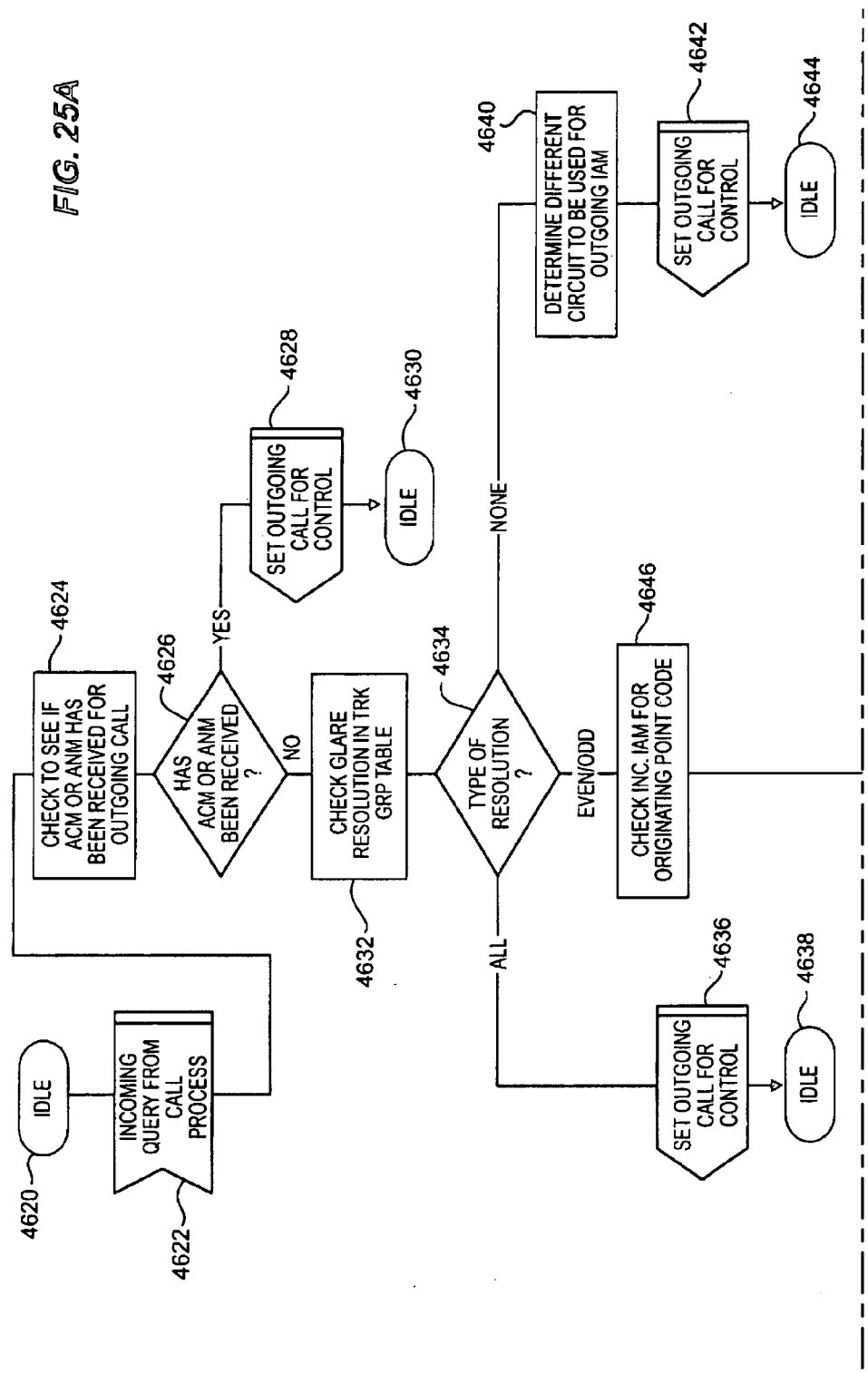

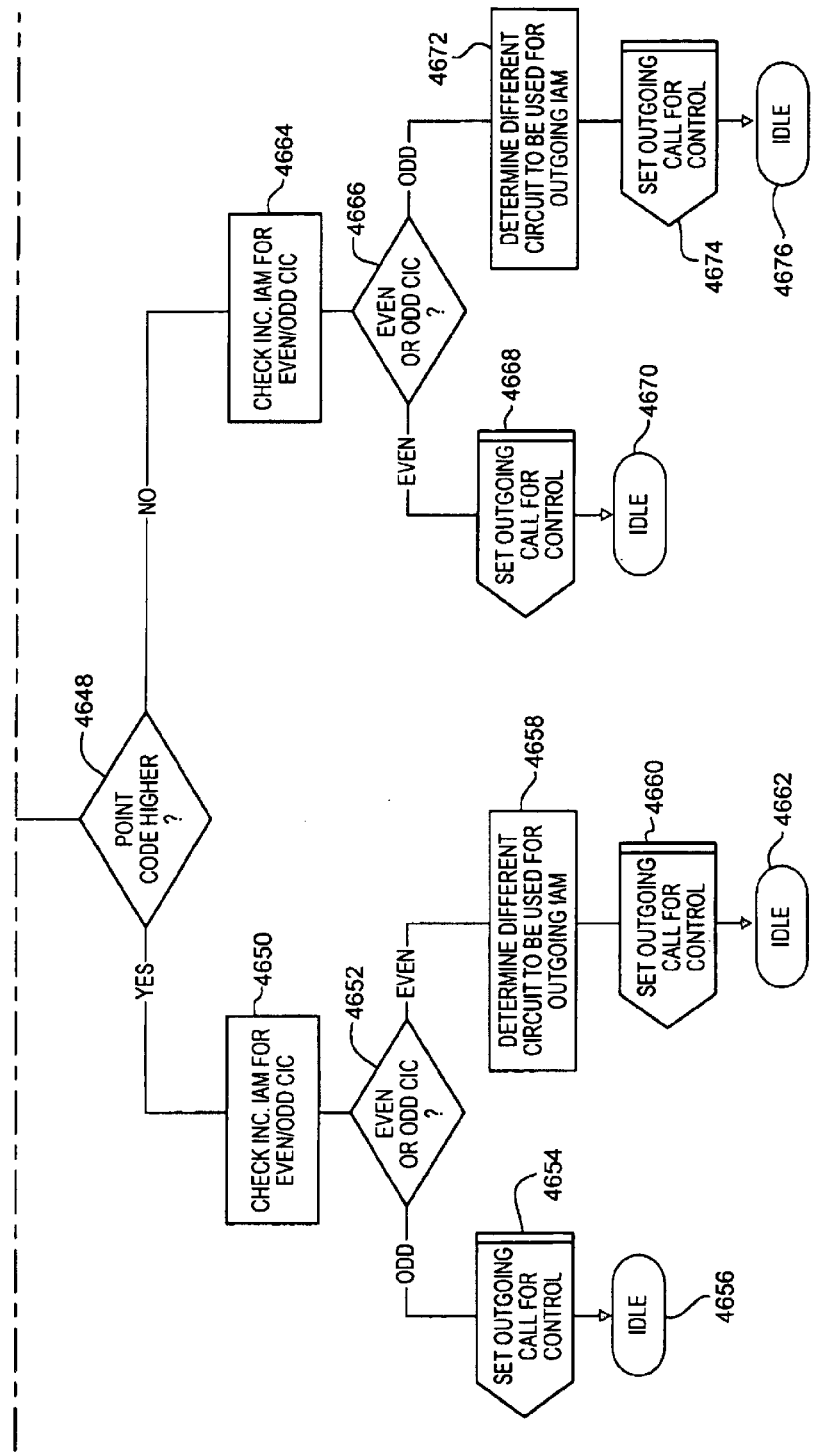

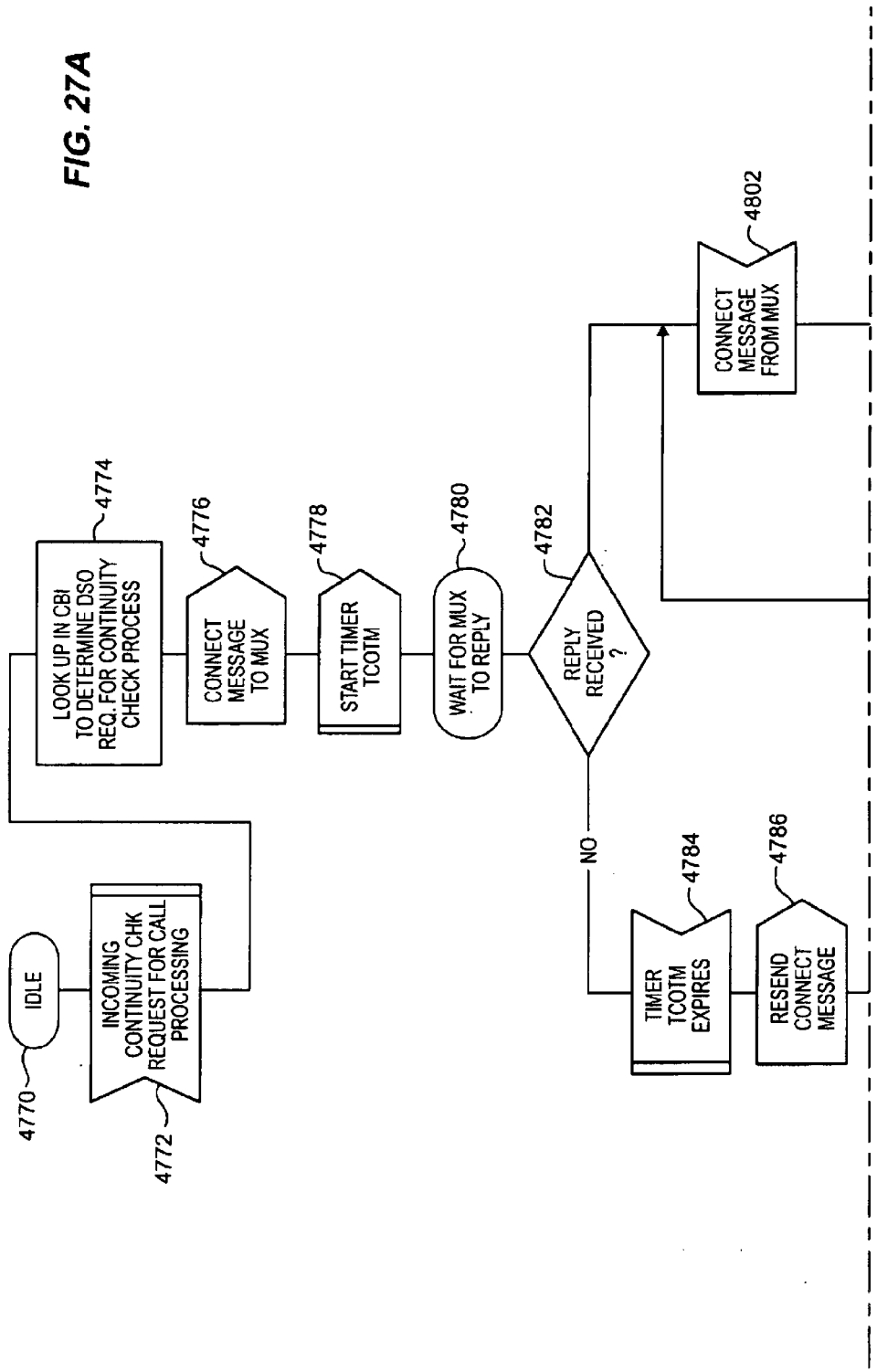

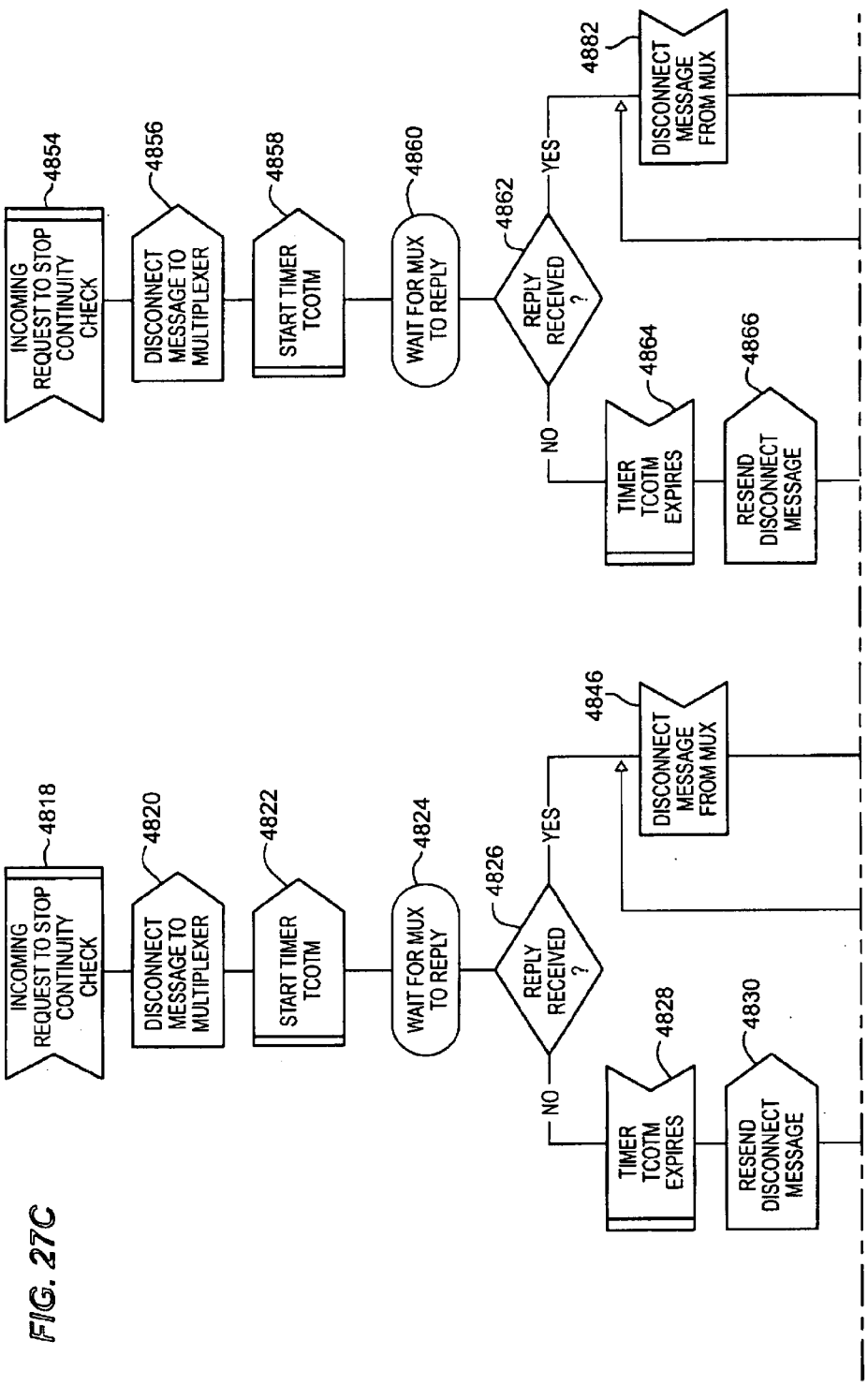

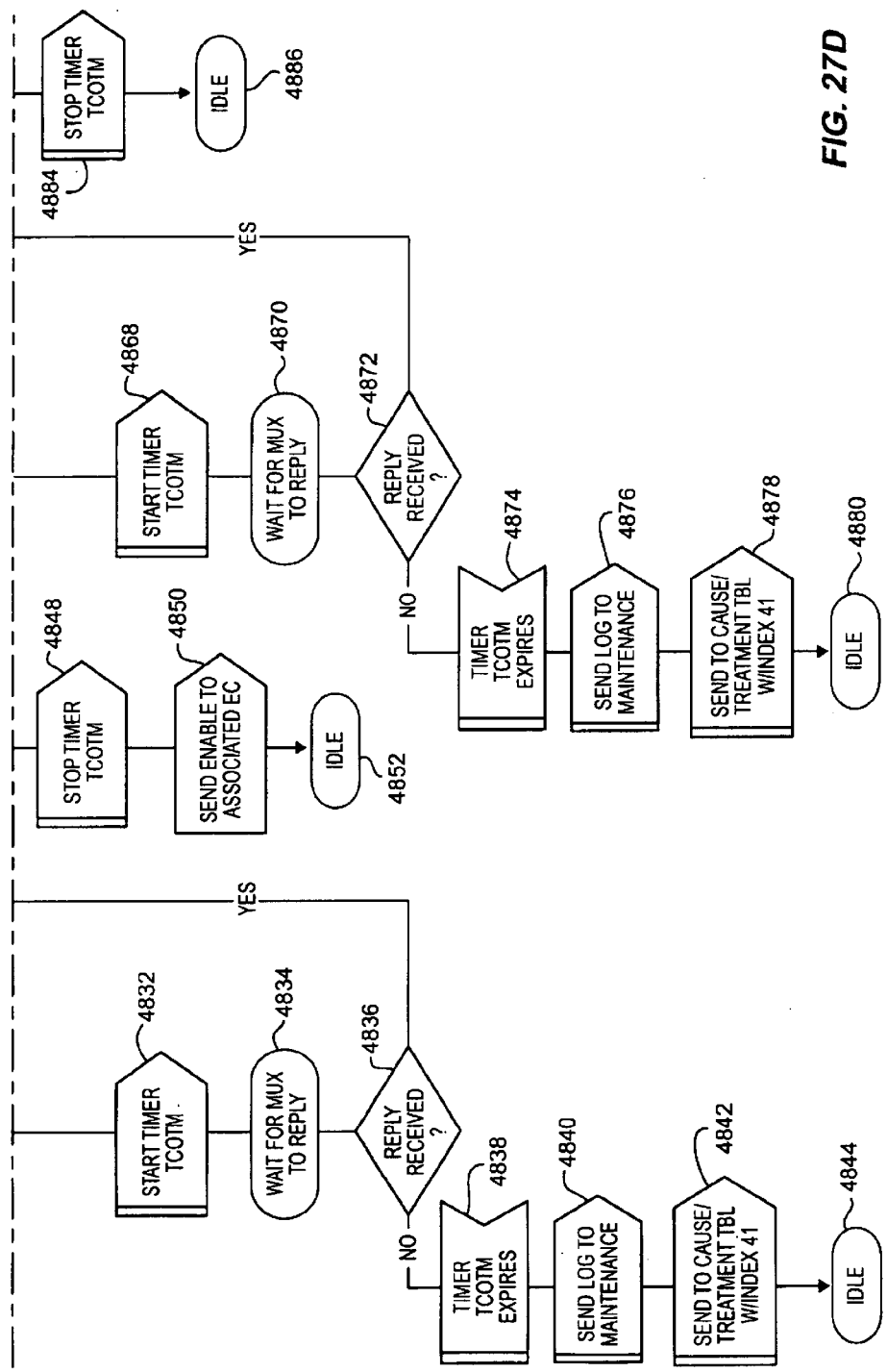

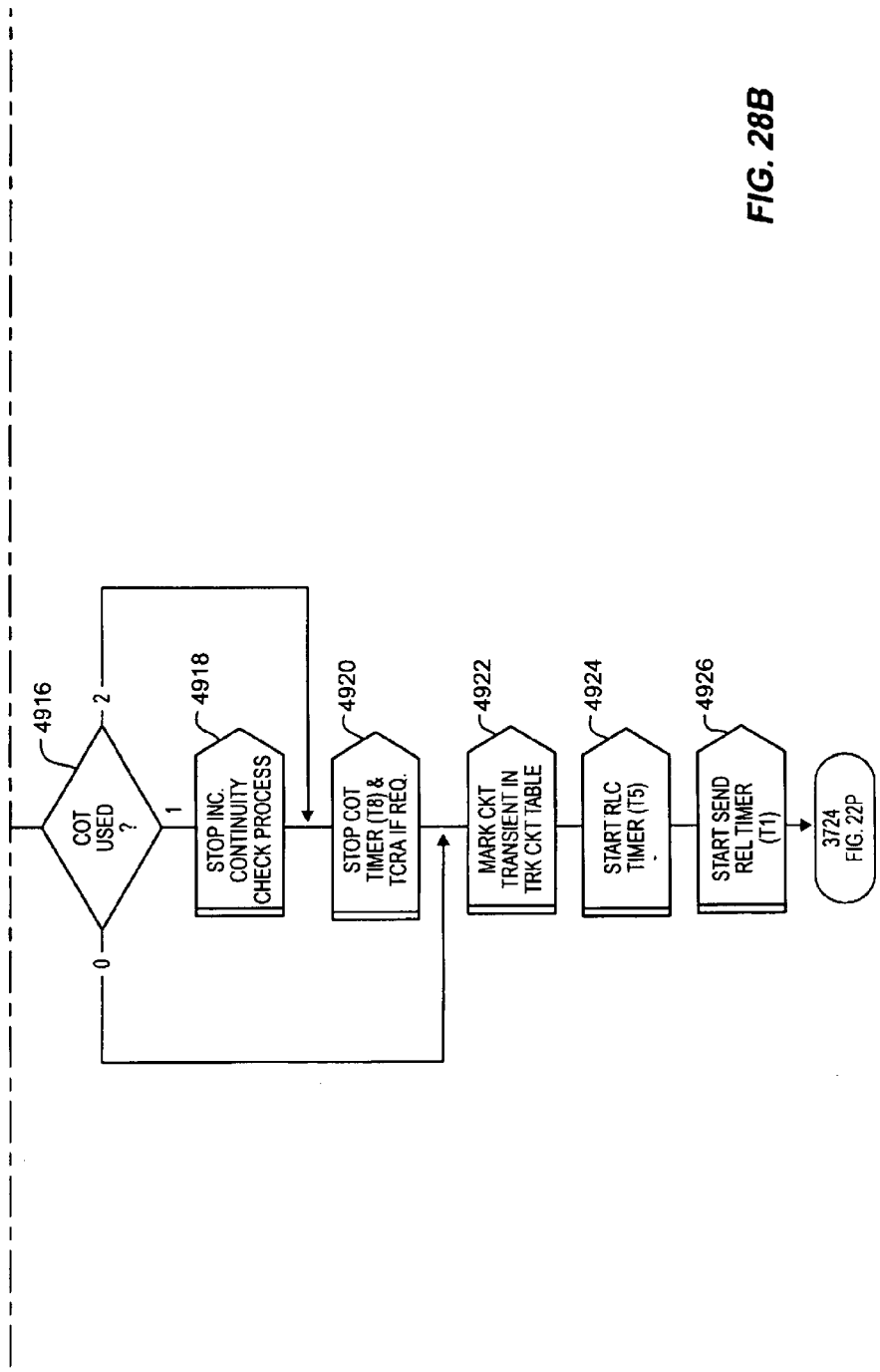

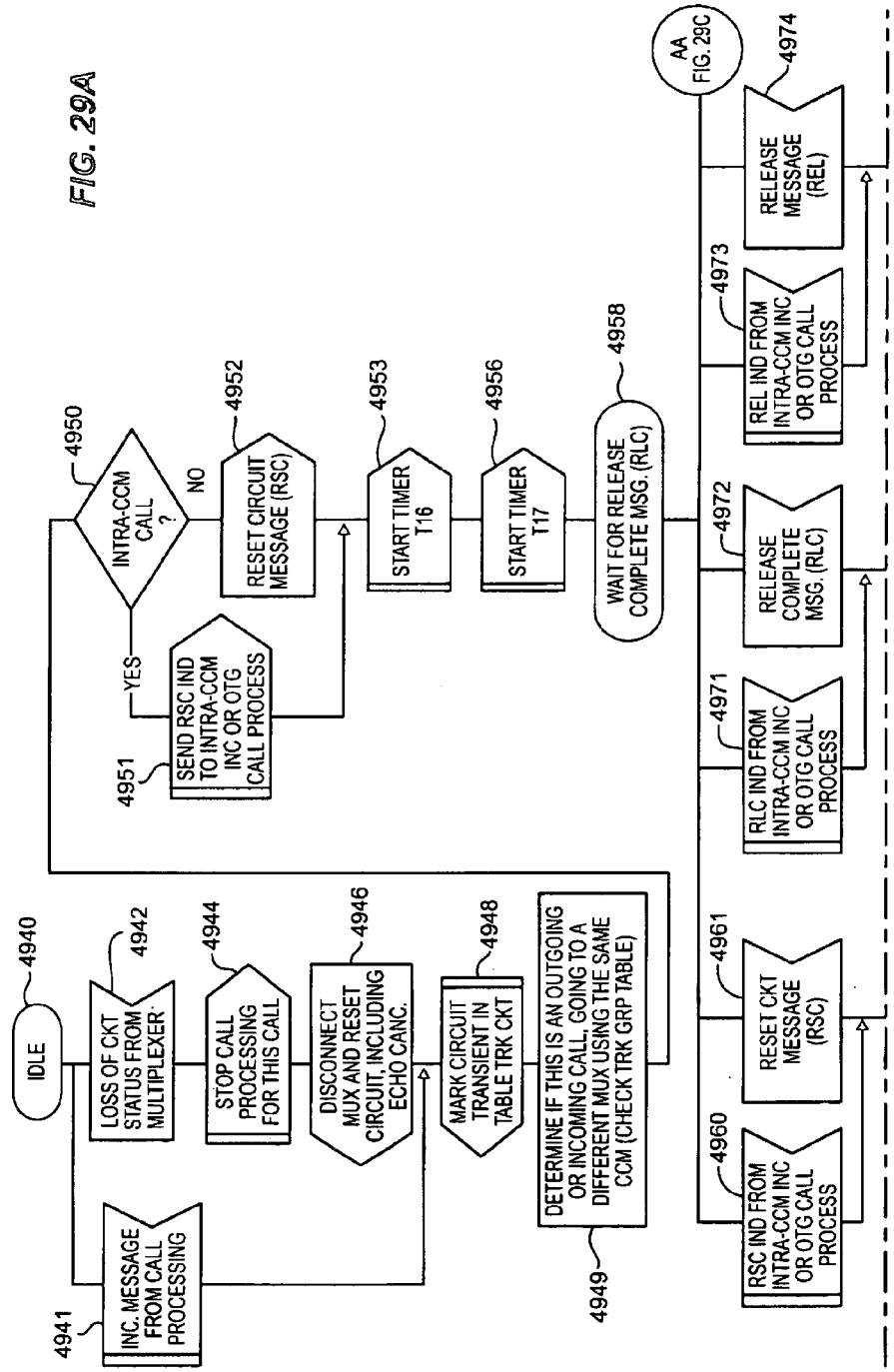

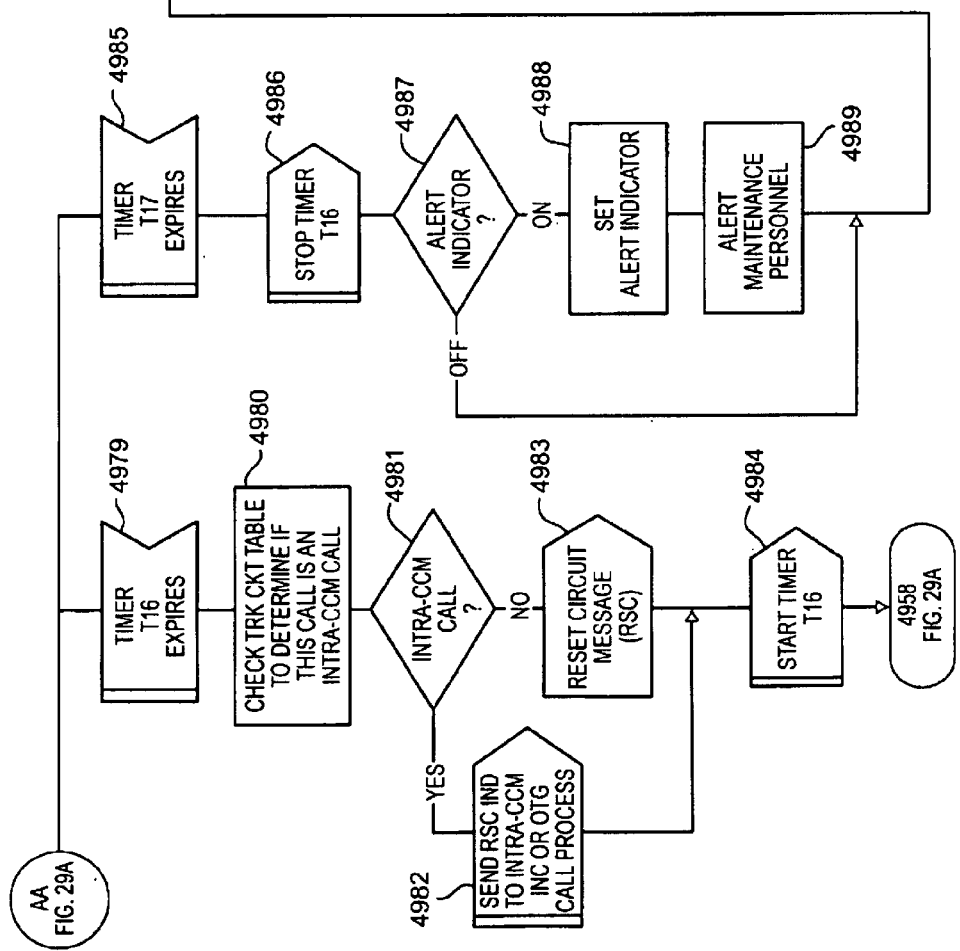

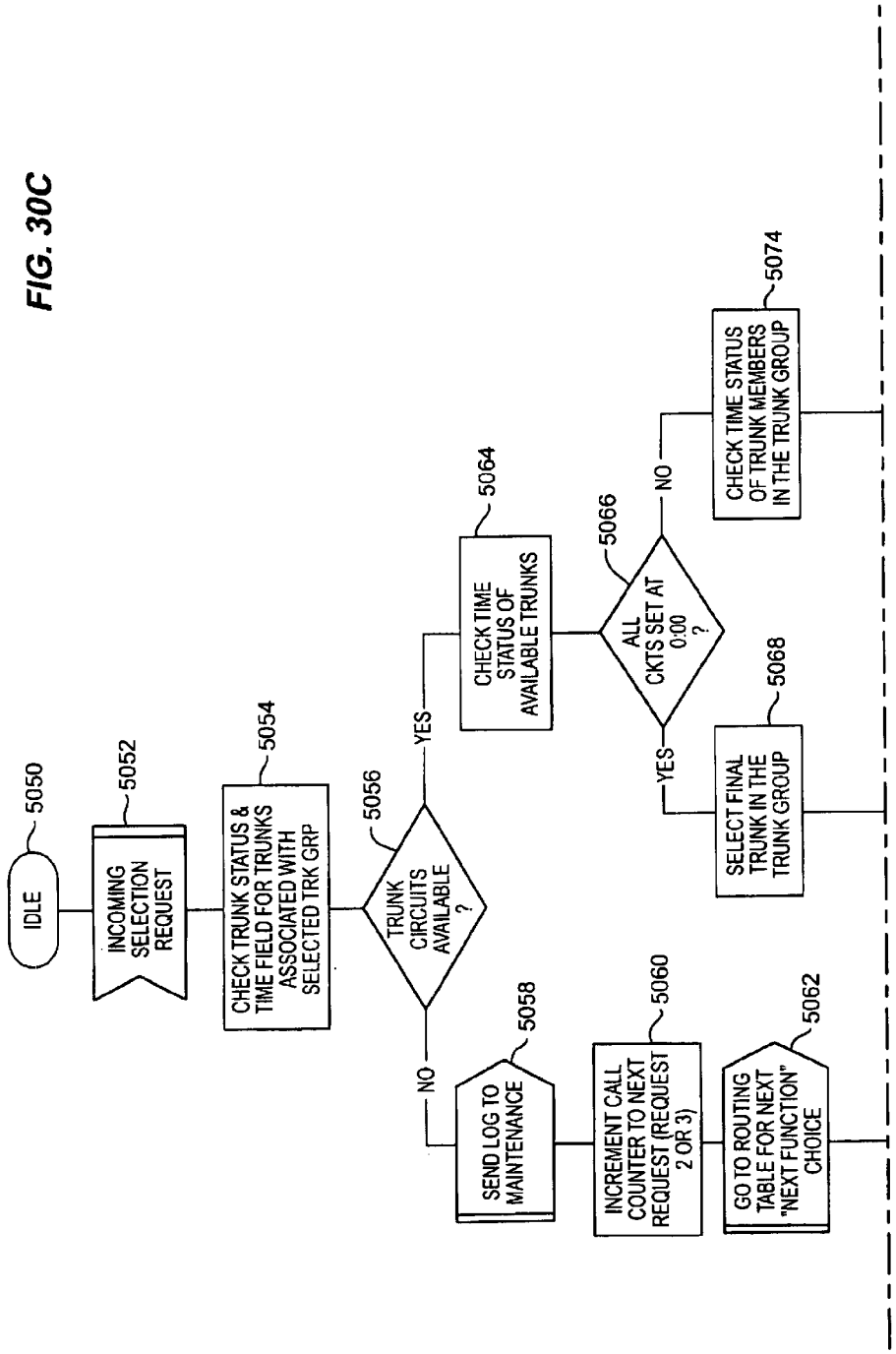

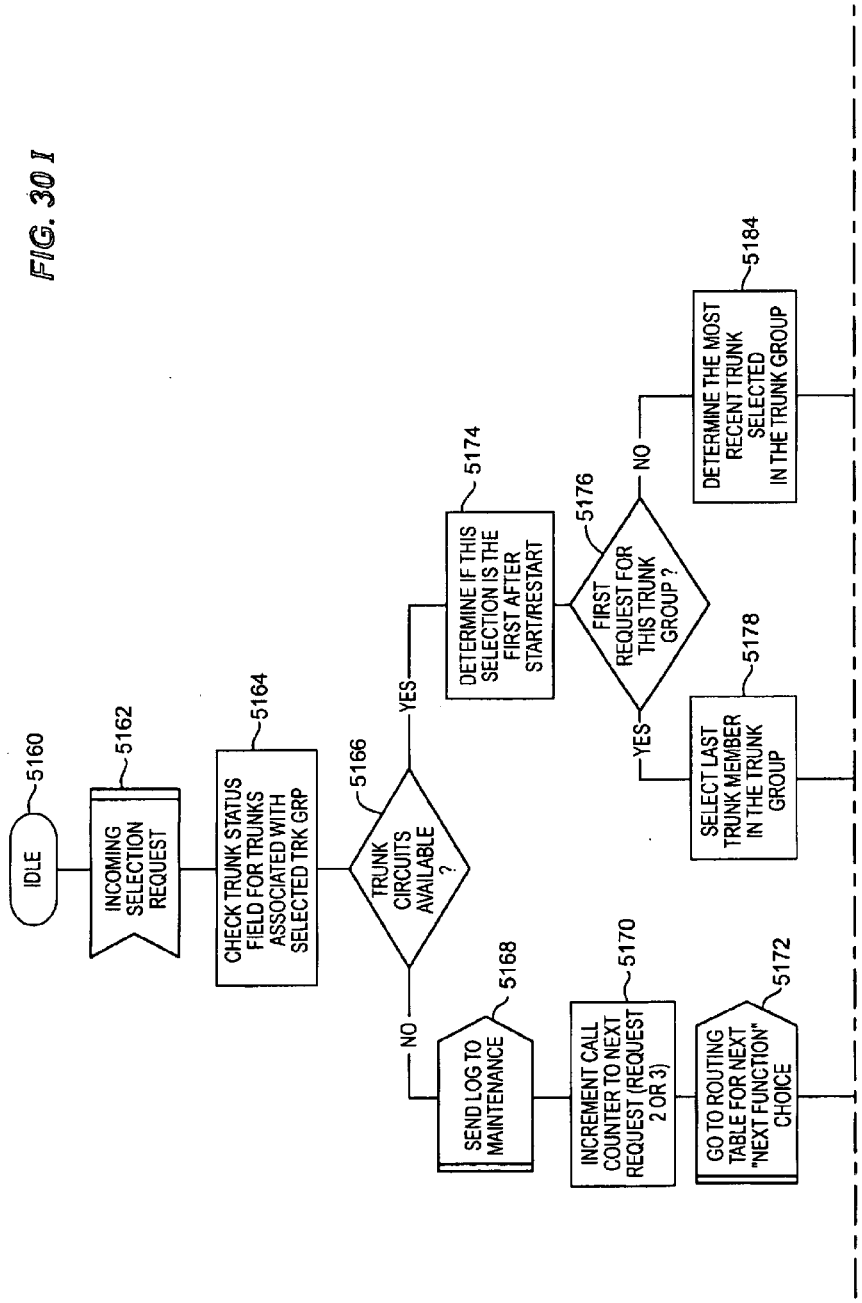

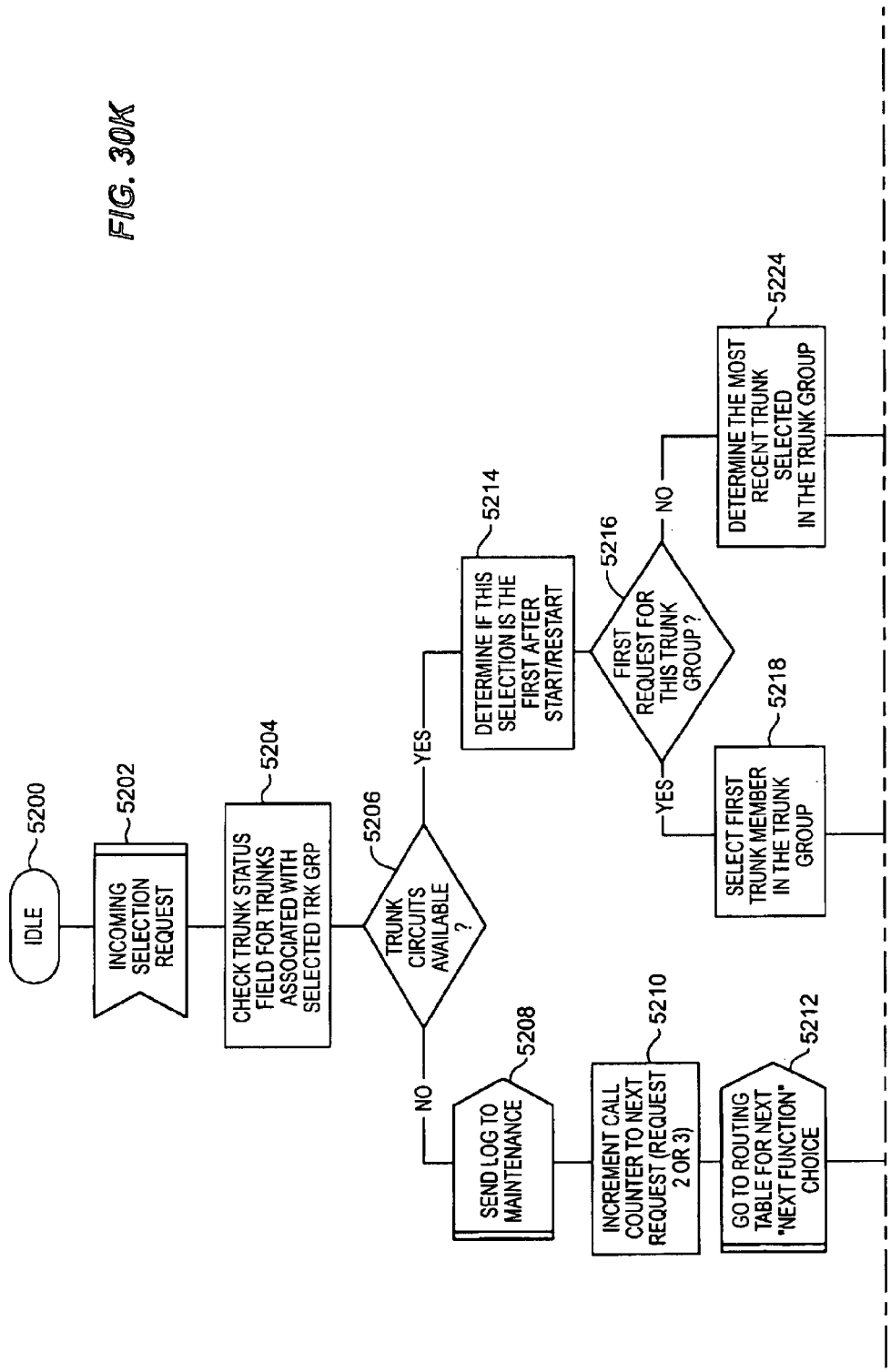

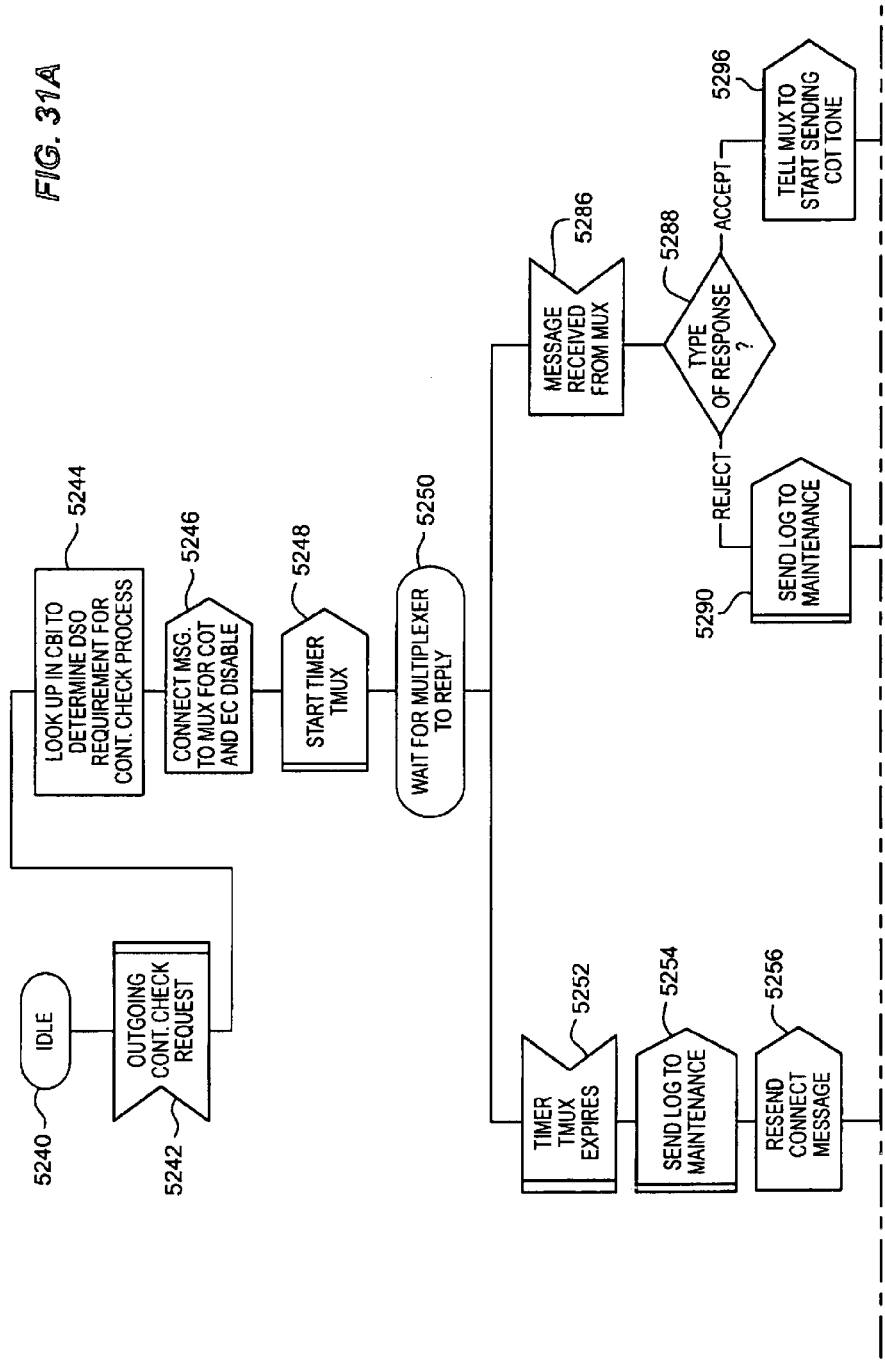

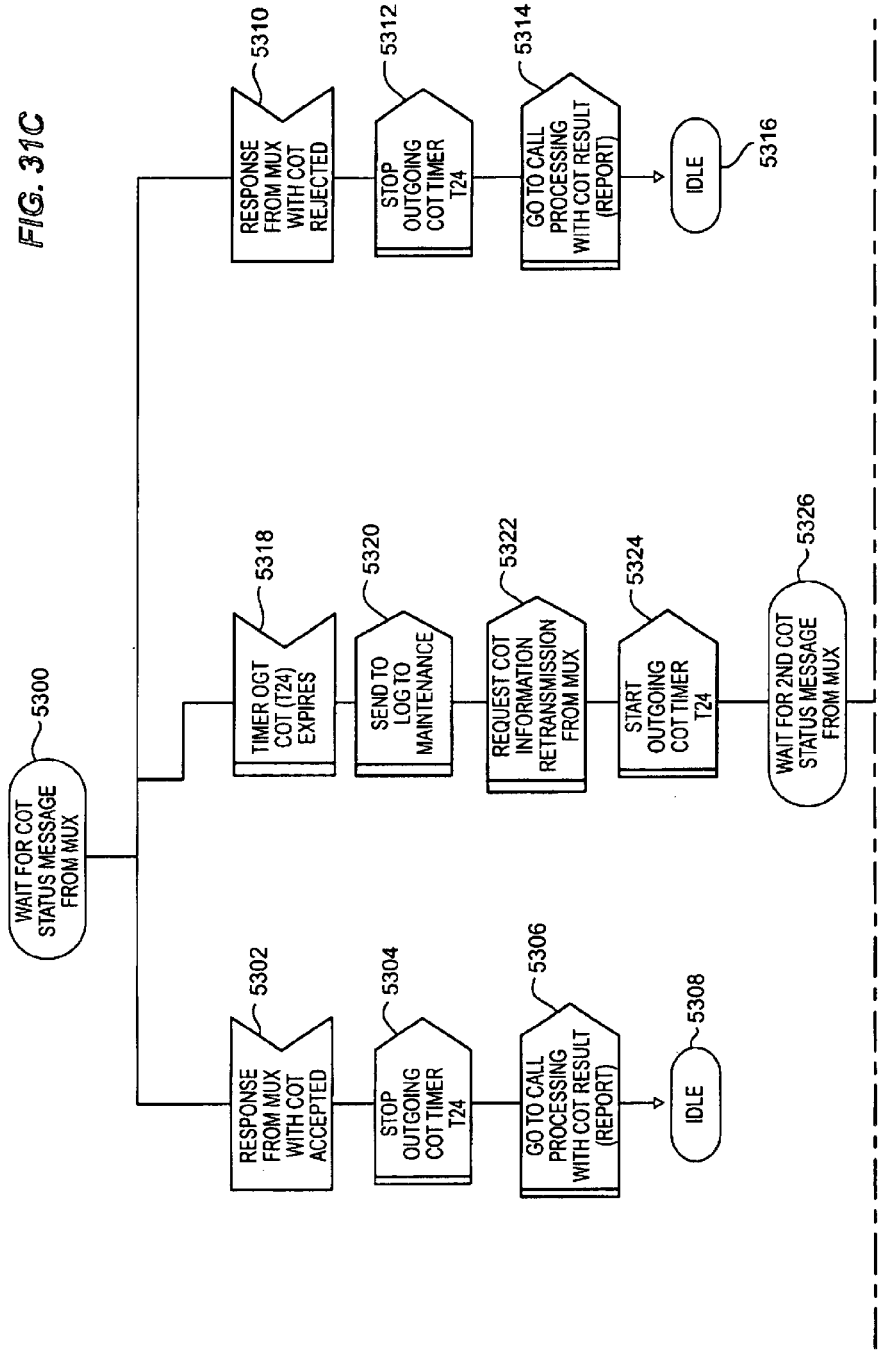

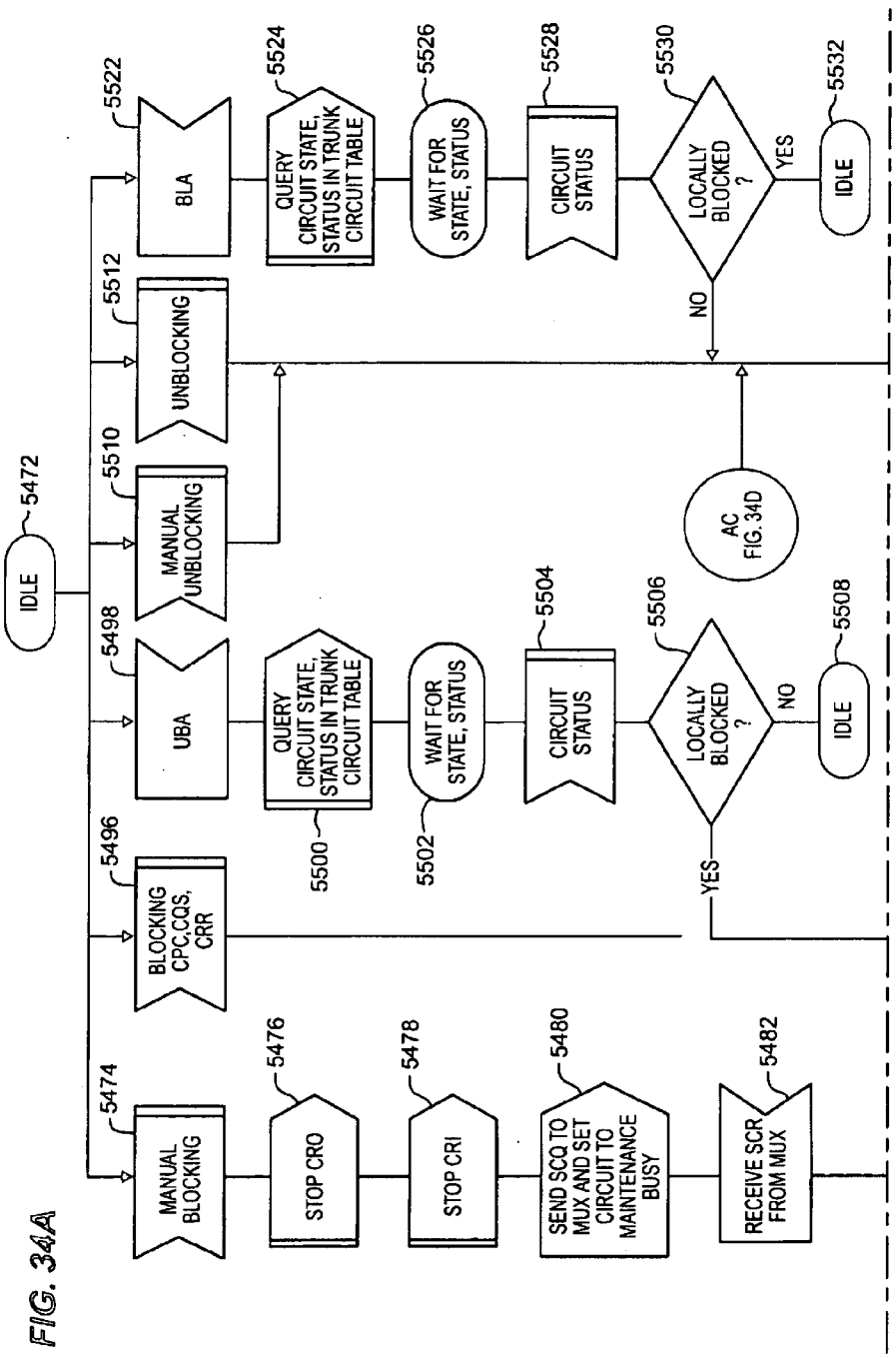

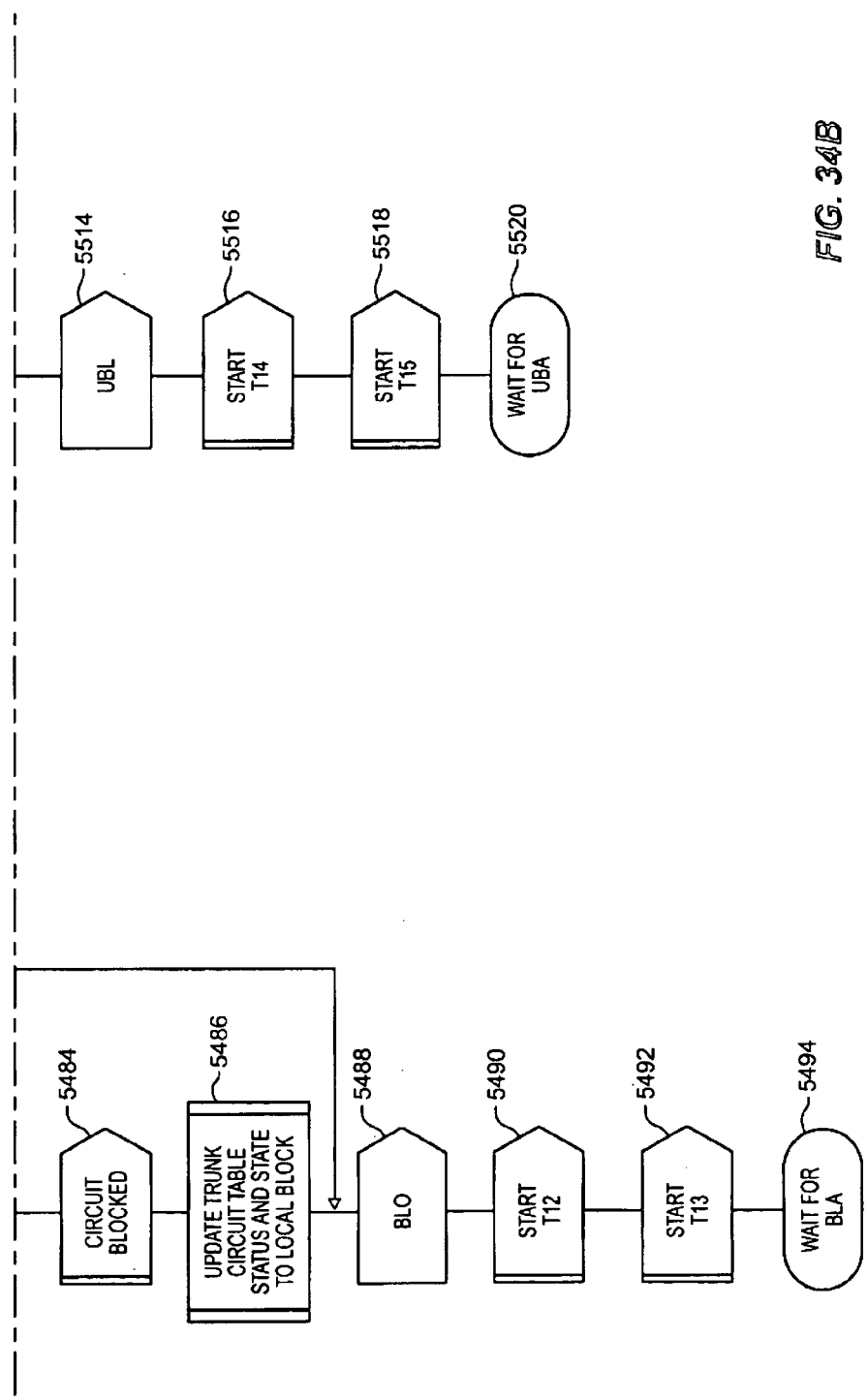

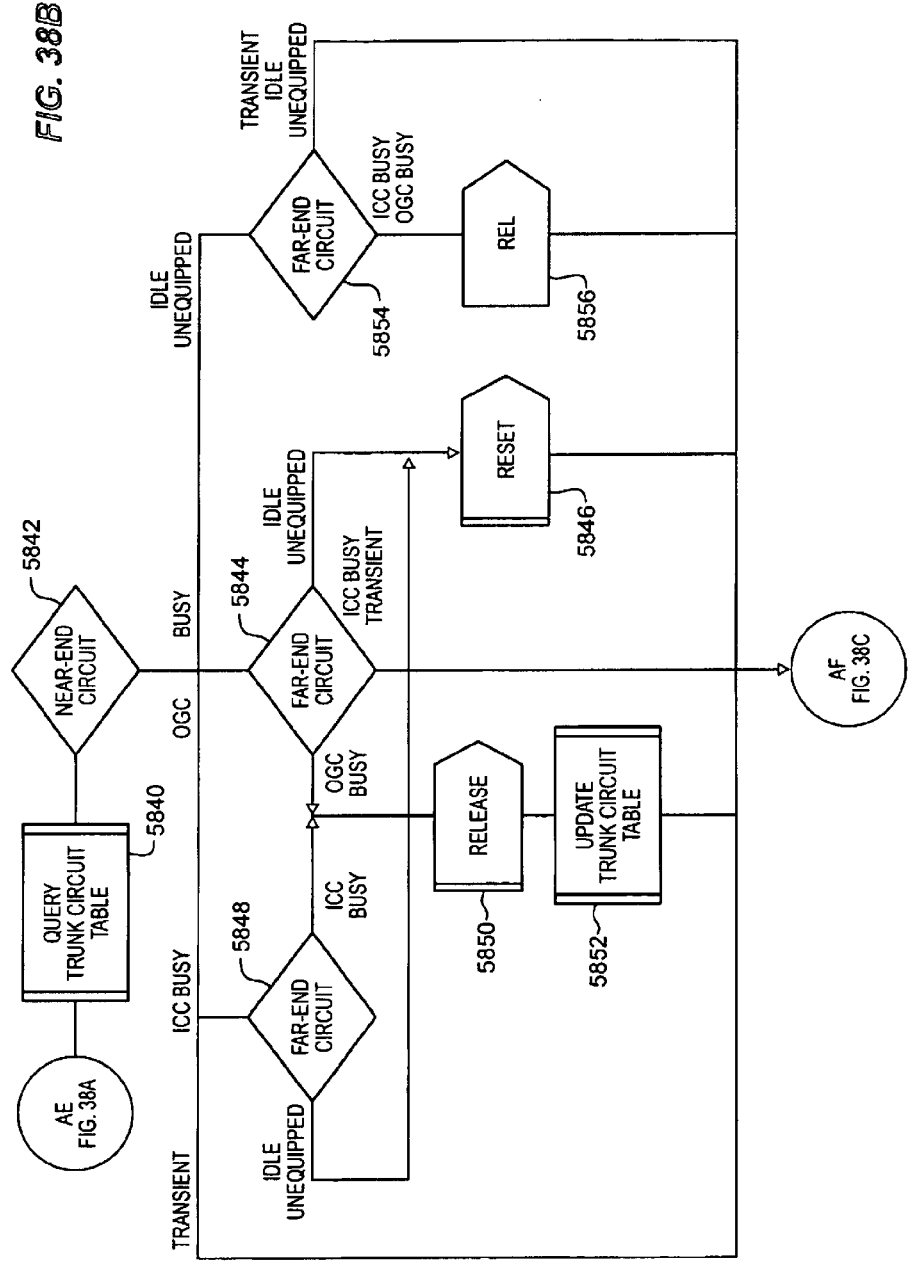

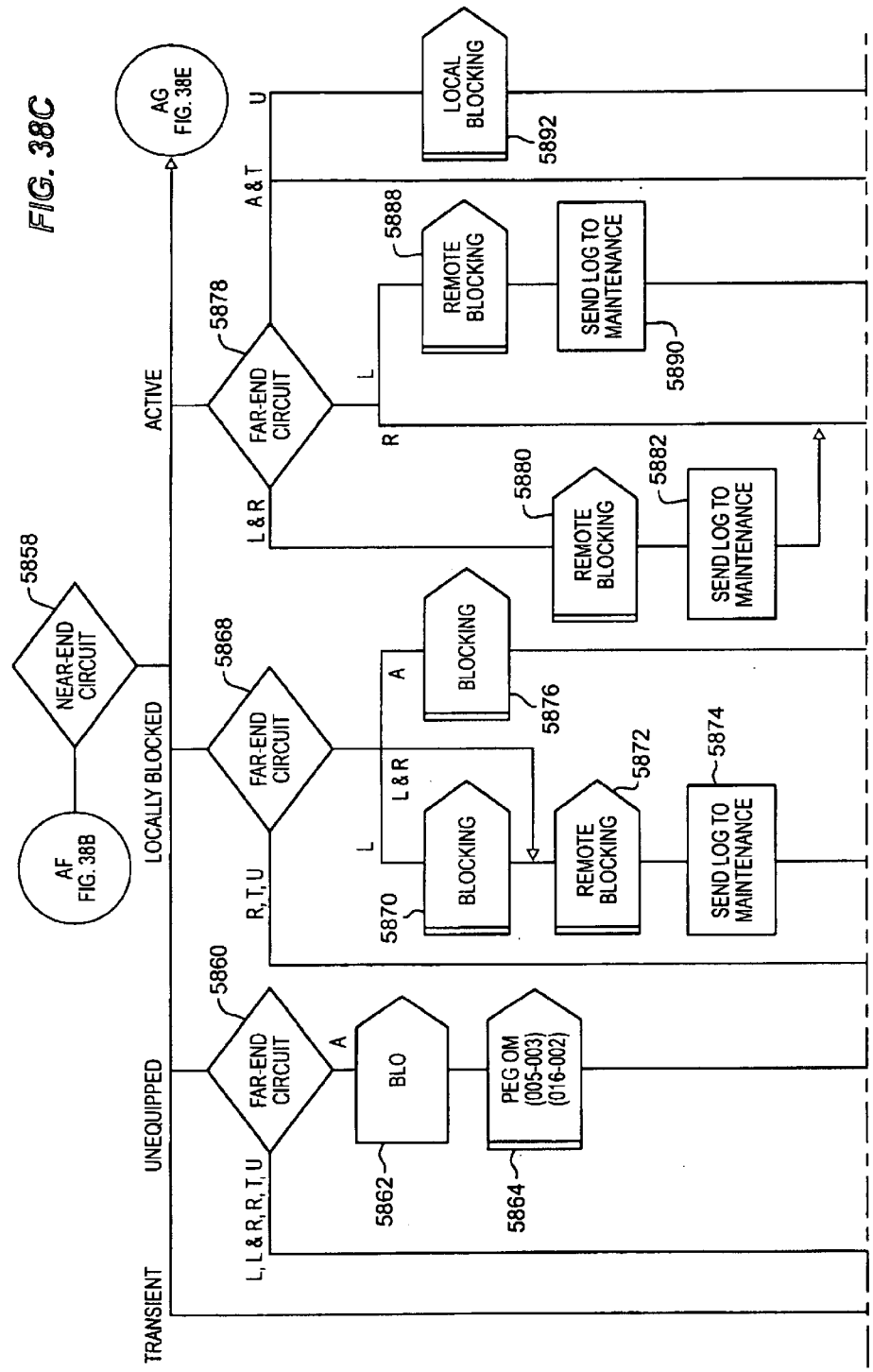

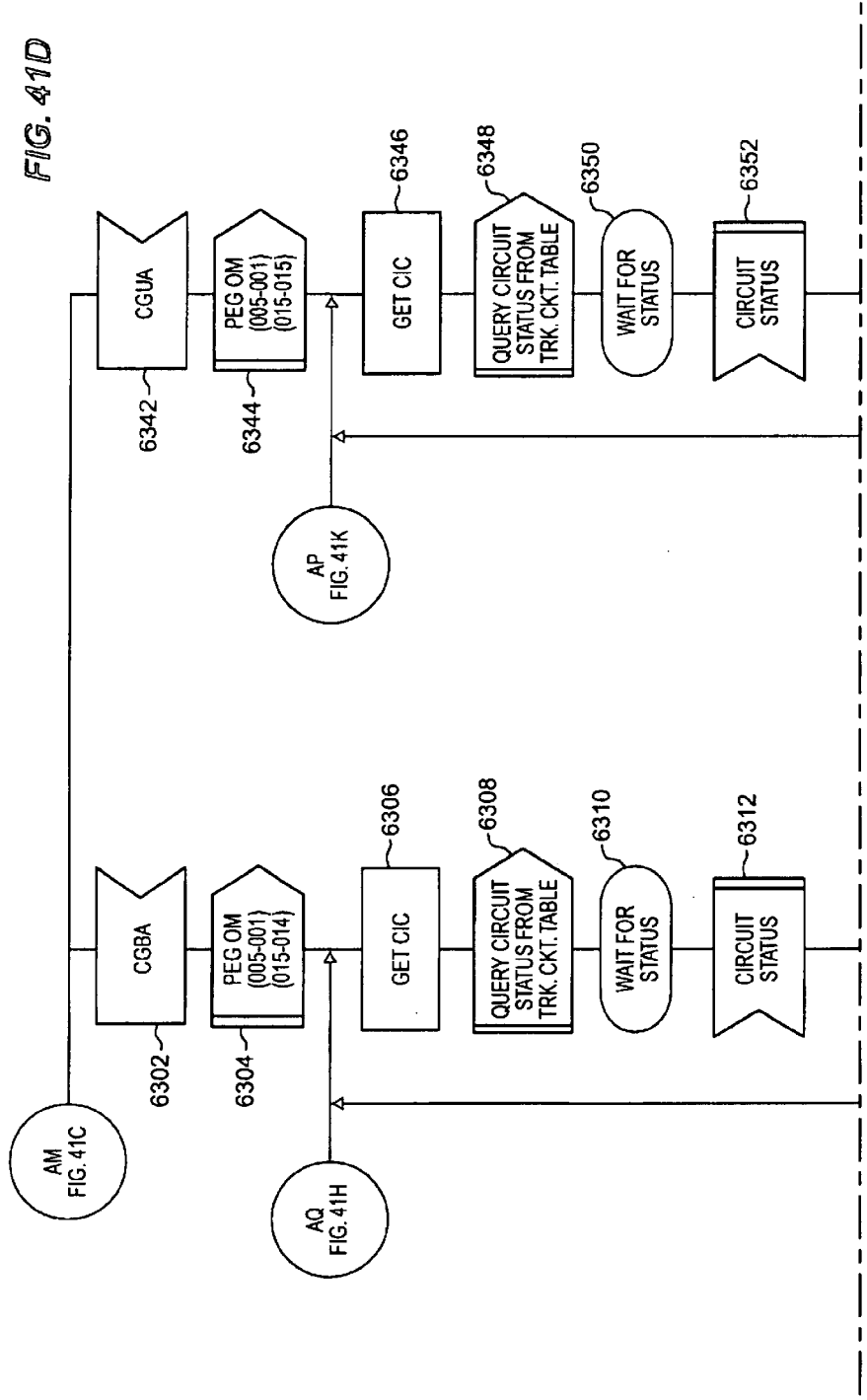

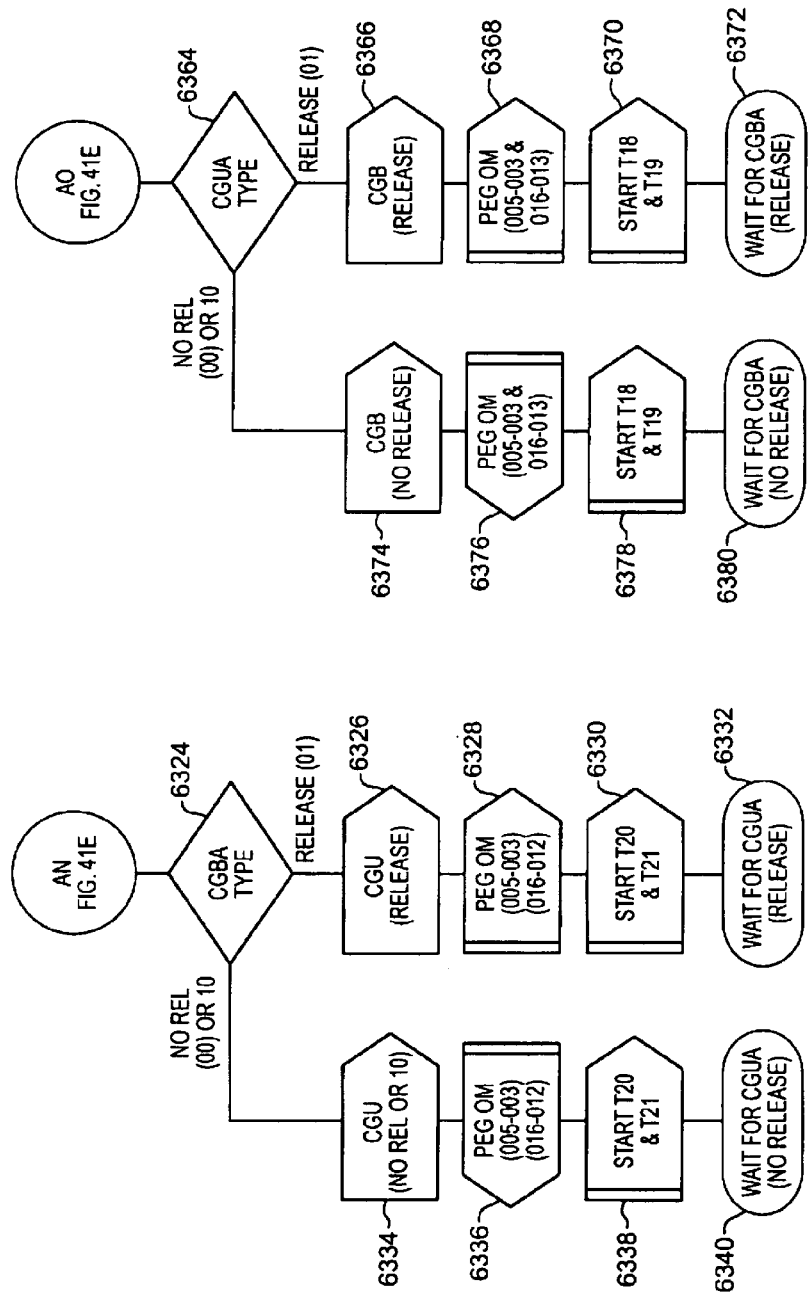

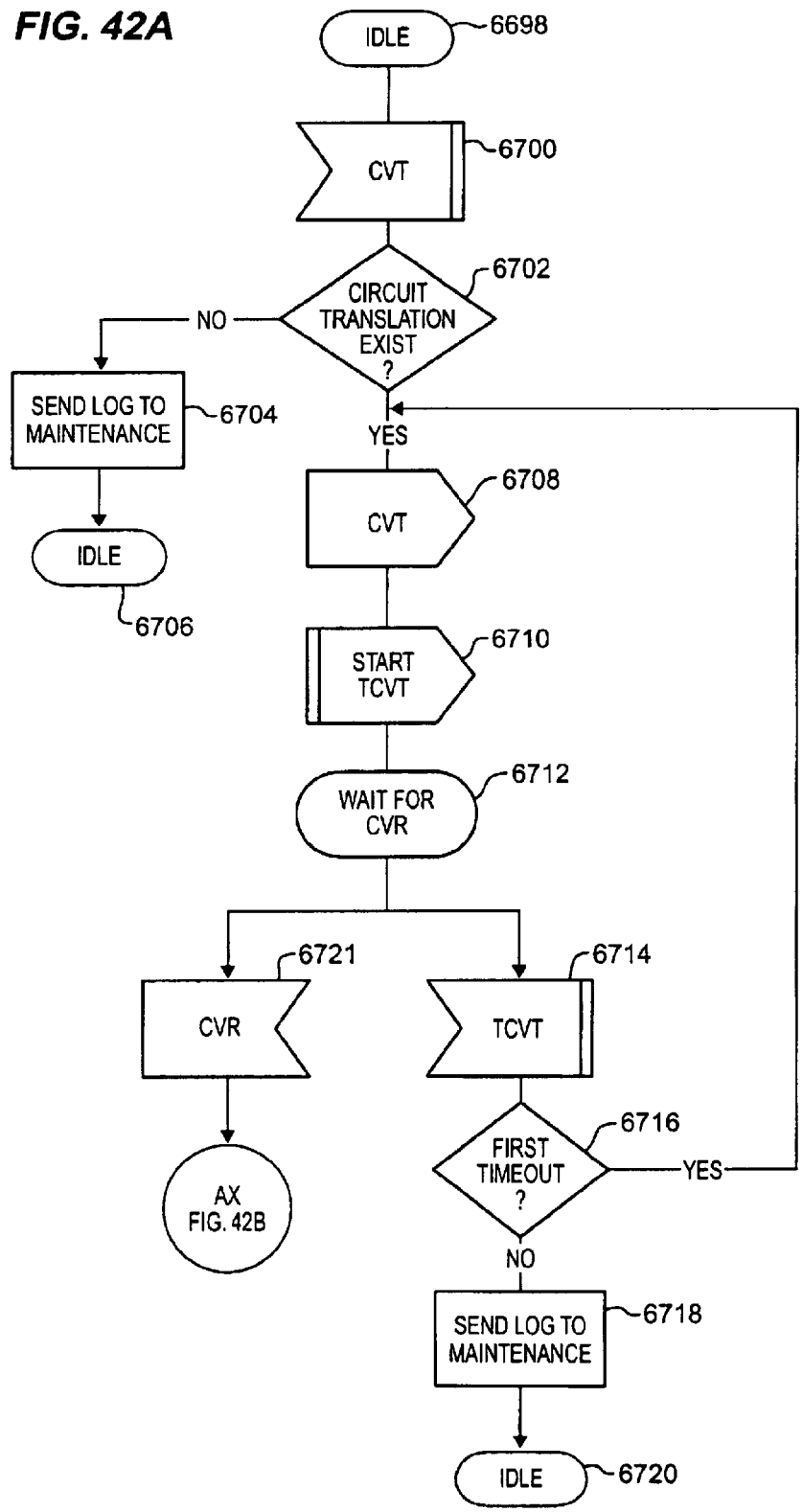

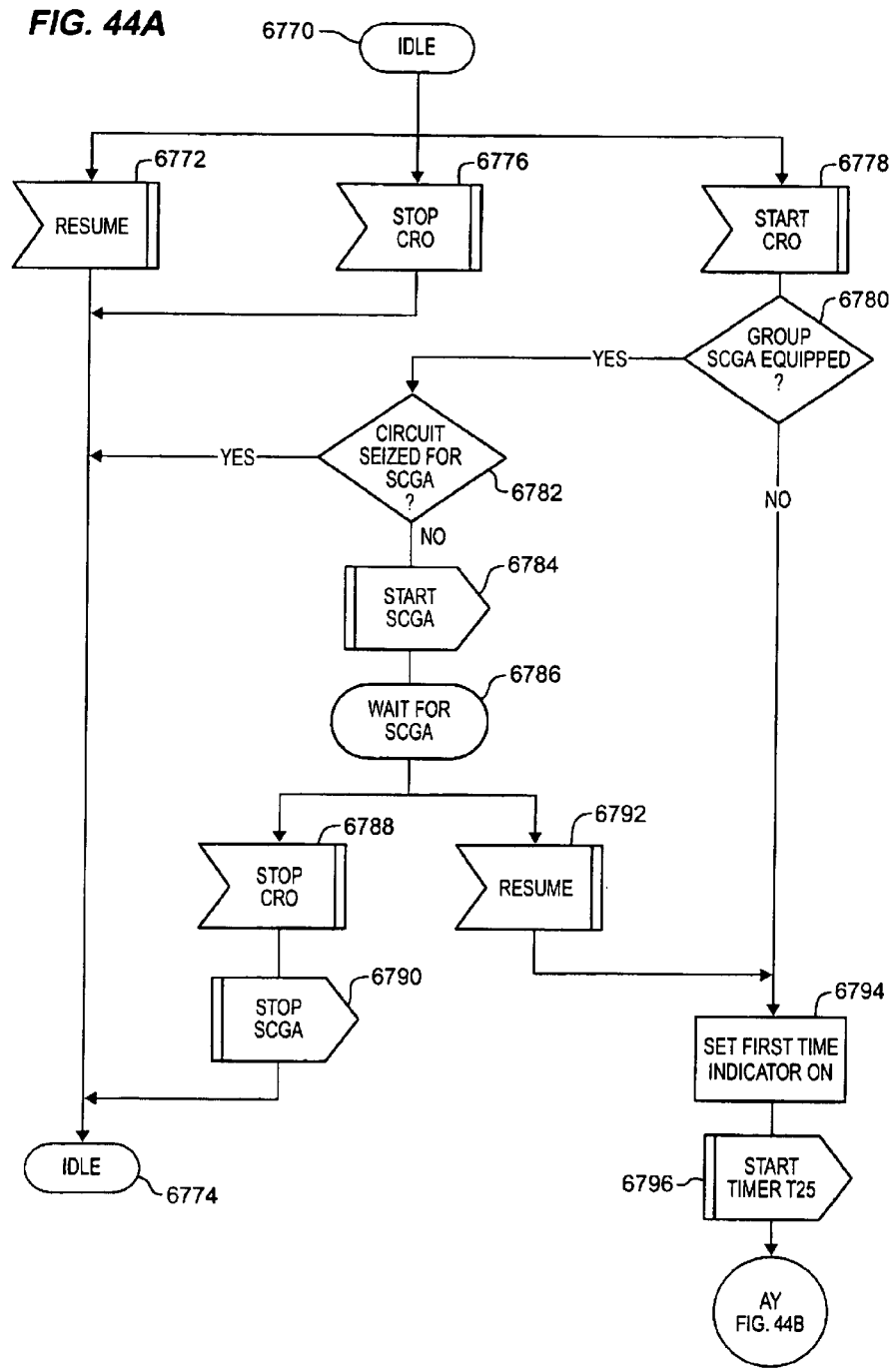

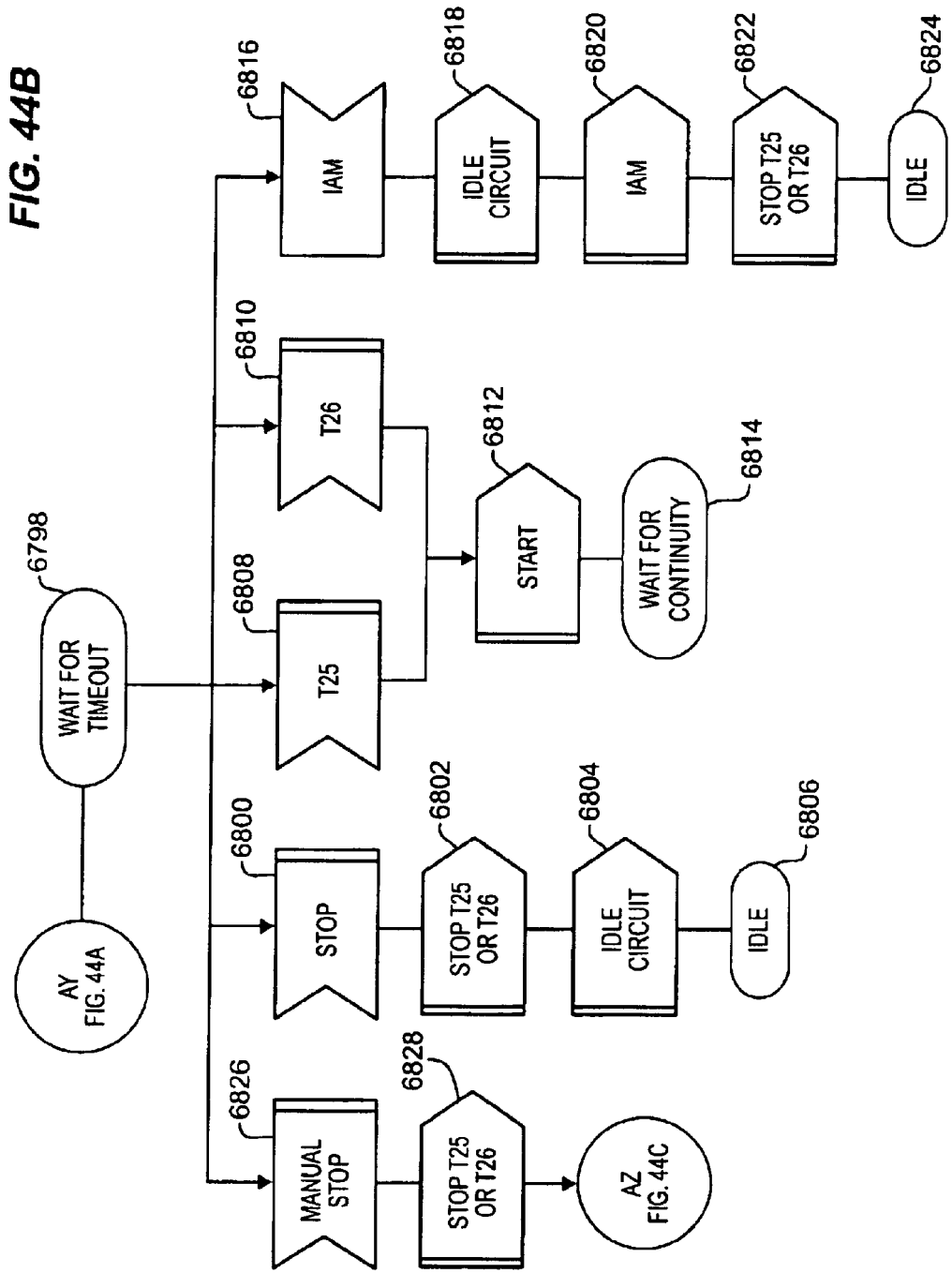

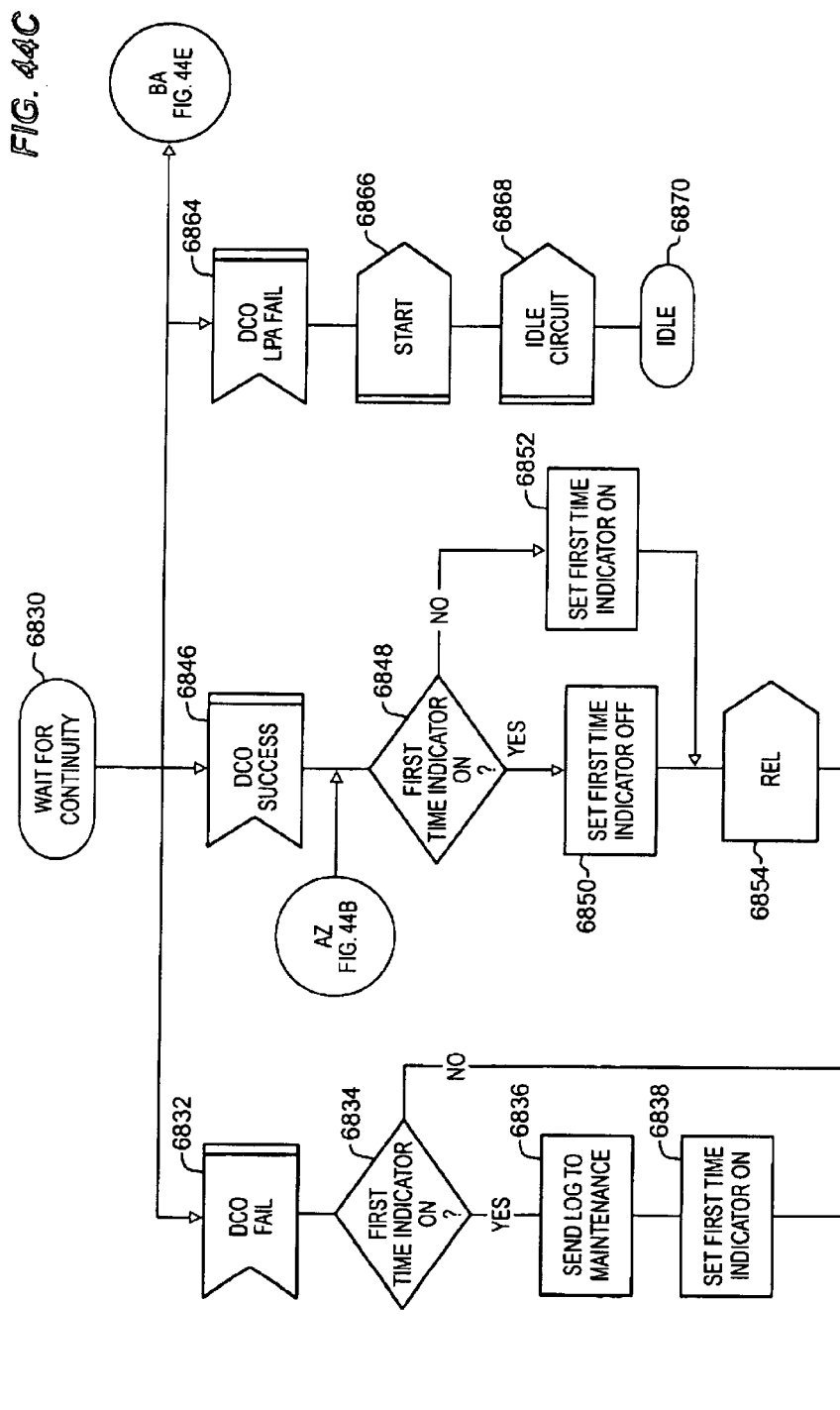

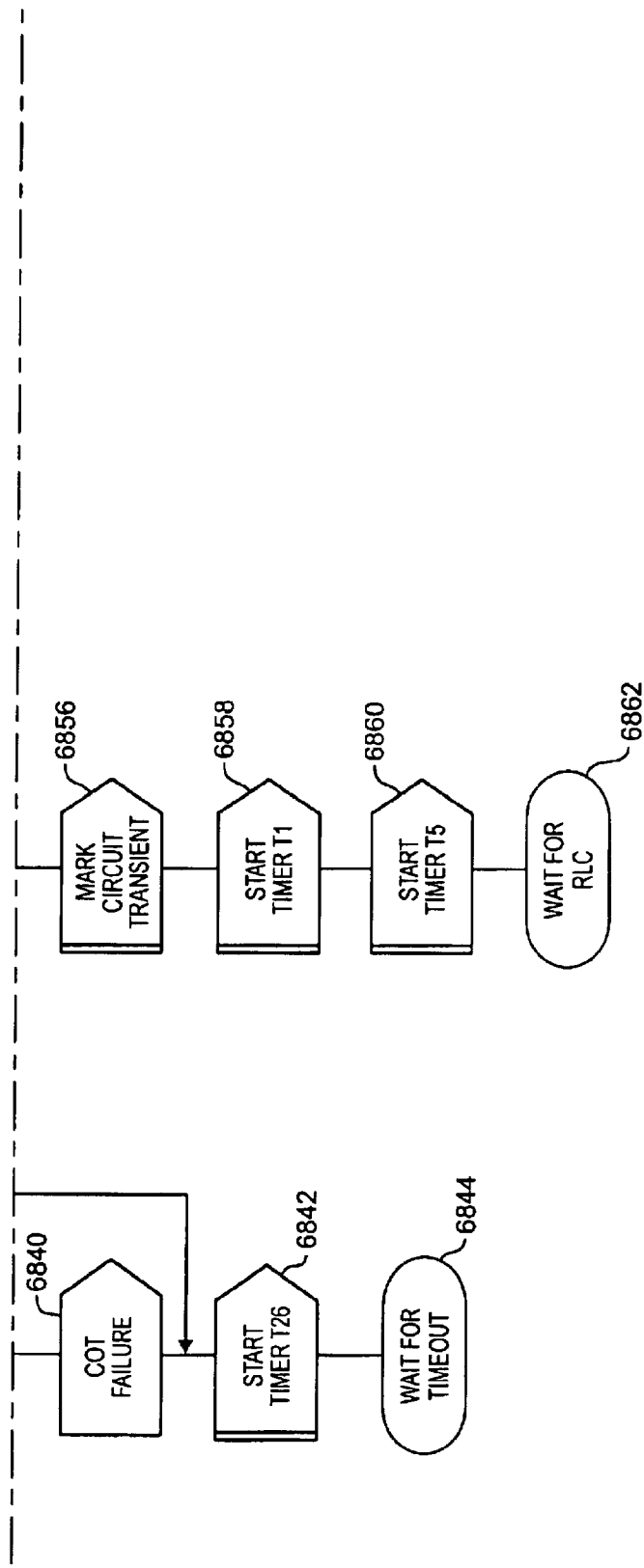

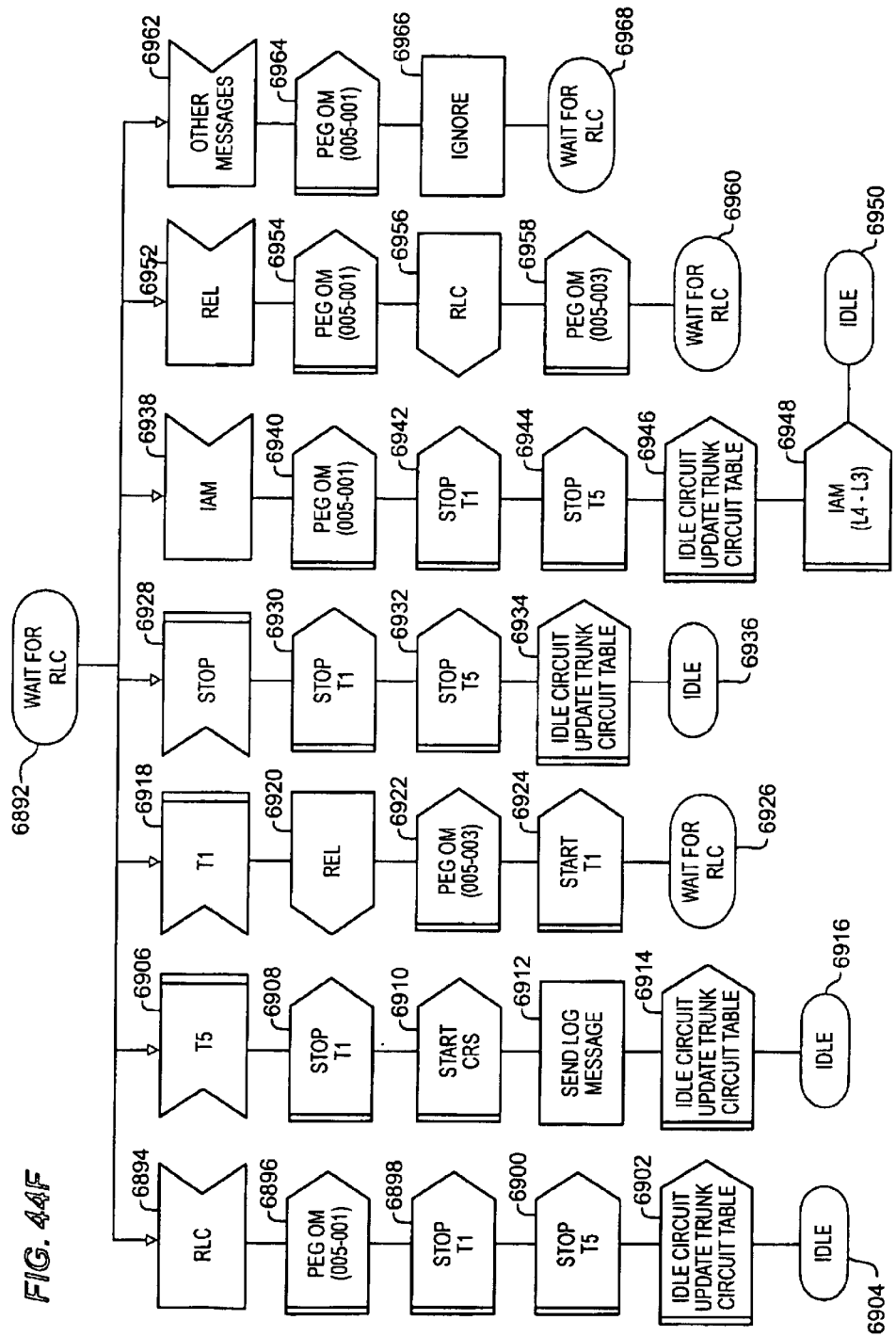
FIG. 4.4F

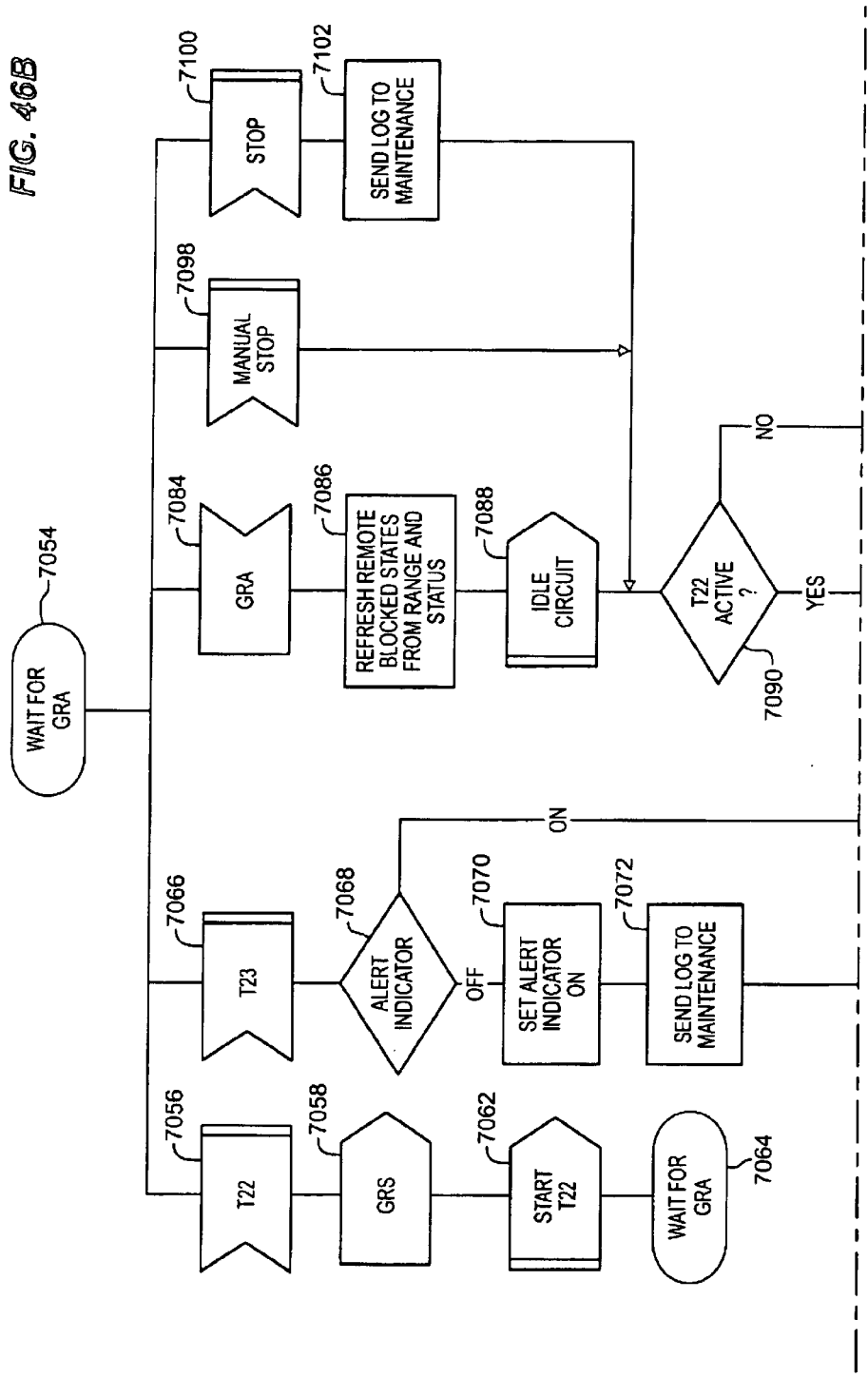

SYSTEM AND METHOD FOR TREATING A CALL FOR CALL PROCESSING

RELATED APPLICATIONS

This application is a continuation of application Ser. No. 10/199,775, filed Jul. 19, 2002, now U.S. Pat. No. 6,744,770, entitled "SYSTEM AND METHOD FOR TREATING A CALL FOR CALL PROCESSING," which is a continuation of Ser. No. 09/026,766, now U.S. Pat. No. 6,470,019, filed Feb. 20, 1998, and which are hereby incorporated by reference into this application.

FEDERALLY SPONSORED RESEARCH OR DEVELOPMENT

Not Applicable

MICROFICHE APPENDIX

Not Applicable

FIELD OF THE INVENTION

The invention relates to the processing of telecommunications signaling in order to establish communications paths, and in particular, to processing Signaling System #7 (SS7) signaling messages to establish communications paths.

BACKGROUND OF THE INVENTION

A telephone call typically comprises both call signaling and caller information. Call signaling is typically data (i.e. the called number) that is used by the switches to establish call connections. The call connections carry the caller information (i.e. voice). A telecommunications switch contains a processor that can process telecommunications signaling in order to select call connections. These switches also contain a switching matrix that can establish the selected connections. The combination of the signaling processor and the switching matrix in the switch is problematic. Additional cost and complexity are added by the matrix. Signaling processors are needed that are not combined with the switching matrix.

In the United States, the predominant form of telecommunications signaling is Signaling System #7 (SS7). In addition, Asynchronous Transfer Mode (ATM) equipment is being developed to transport all types of traffic at high speeds over Synchronous Optical Network (SONET) connections. Signaling processors are needed that can process SS7 signaling and select ATM connections.

SUMMARY

The present invention comprises a telecommunications signaling processor that processes Signaling System #7 (SS7) telecommunications signaling messages to select Asynchronous Transfer Mode (ATM) virtual connections and provide control messages indicating the selected ATM virtual connections. The signaling processor comprises a computer system, data structures, originating process logic, and terminating process logic. The computer system stores data structures and executes stored logic. A call control data structure contains information pertinent to individual calls. A circuit data structure contains information pertinent to telecommunications connections. An exception data structure contains information pertinent to call route exceptions. A caller number data structure contains information pertinent to caller numbers. A called number data structure contains information pertinent to called numbers. A routing data structure contains information pertinent to route selections. Originating process logic is stored in the computer system and processes information from SS7 signaling messages that relates to an originating circuit and accesses the data structures to request a terminating ATM virtual connection. Terminating process logic is stored in the computer system and processes information from SS7 signaling messages and to select the terminating ATM virtual connection in response to the request from the originating process.

DESCRIPTION OF THE DRAWINGS

FIG. 7 is a block diagram of additional tables that are used in the signaling processor of FIG. 6.

FIG. 8A is a table diagram of a trunk circuit table used in the signaling processor of FIG. 6.

FIG. 8B is a table diagram of a trunk group table used in the signaling processor of FIG. 6.

FIG. 9A is a table diagram of an exception circuit table used in the signaling processor of FIG. 6.

FIG. 9B is a table diagram of an automated number index table used in the signaling processor of FIG. 6.

FIG. 10A is a table diagram of a called number screening table used in the signaling processor of FIG. 6.

FIG. 10B is a table diagram of a local routing number table used in the signaling processor of FIG. 6.

FIG. 11 is a table diagram of a called number table used in the signaling processor of FIG. 6.

FIG. 12 is a table diagram of a routing table used in the signaling processor of FIG. 6.

FIG. 13 is a table diagram of a treatment table used in the signaling processor of FIG. 6.

FIG. 14 is a table diagram of a message table used in the signaling processor of FIG. 6.

FIGS. 17A–17E are SDL diagrams of logic used in a version of the invention for exception table processing.

FIGS. 18A–18F are SDL diagrams of logic used in a version of the invention for automatic number identification table processing.

FIGS. 19A–19C are SDL diagrams of logic used in a version of the invention for called number table processing.

FIGS. 20A–20D are SDL diagrams of logic used in a version of the invention for routing table processing.

FIGS. 21A–21D are SDL diagrams of logic used in a version of the invention for treatment table processing.

FIGS. 24A–24M are SDL diagrams of logic used in a version of the invention for a call completion processing for the terminating end process.

FIGS. 25A–25B are SDL diagrams of logic used in a version of the invention for a glare handling process.

FIGS. 27A–27D are SDL diagrams of logic used in a version of the invention for an incoming continuity check process.

FIGS. 28A–28B are SDL diagrams of logic used in a version of the invention for an automatic congestion control process.

FIGS. 29A–29C are SDL diagrams of logic used in a version of the invention for an circuit reset sending process.

FIGS. 30A–30L are SDL diagrams of logic used in a version of the invention for an trunk selection process.

FIGS. 31A–31D are SDL diagrams of logic used in a version of the invention for an outgoing continuity check process.

FIGS. 34A–34E are SDL diagrams of logic used in a version of the invention for a blocking and unblocking message sending process.

FIGS. 38A–38E are SDL diagrams of logic used in a version of the invention for a circuit query message sending process.

FIGS. 42A–42B are SDL diagrams of logic used in a version of the invention for a circuit validation test sending process.

FIGS. 44A–44F are SDL diagrams of logic used in a version of the invention for a continuity recheck outgoing process.

FIGS. 46A–46C are SDL diagrams of logic used in a version of the invention for a circuit group reset sending process.

DETAILED DESCRIPTION

Figure 1:
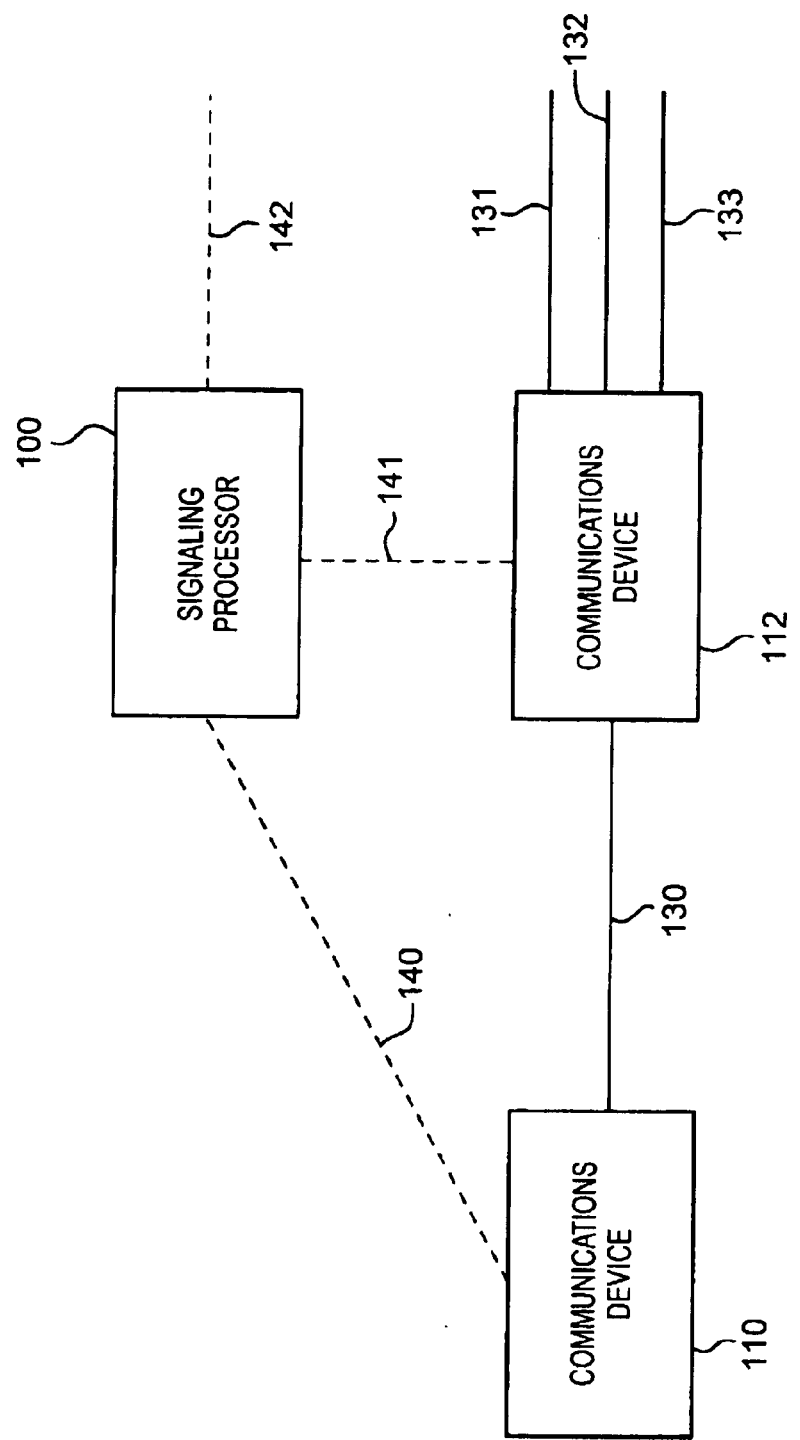
FIG. 1 is a block diagram of a version of the invention with a communications device.

FIG. 1 depicts a version of the invention. Shown are signaling processor 100, communications device 110, and communications device 112. Communications device 110 is connected to communications device 112 over connection 130. Communications device 112 is connected to other communications devices (not shown) over connections 131, 132, and 133. Signaling processor 100 is linked to communications device 110 over link 140 and is linked to communications device 112 over link 141. Signaling processor 100 is linked to other communications devices (not shown) over link 142.

Communications device 110 could be any device that facilitates communications through telecommunications signaling. Examples would include switches, service platforms, and customer premises equipment (CPE). Examples of switches are the Nortel DMS-250 and the Lucent 5ESS. Examples of service platforms are voice response units and host computers that deliver services, such as voice messaging or the use of calling cards. Examples of CPE are PBX devices, LAN devices, computers, telephones, and switches. All of these devices are well known in the art.

Communications device 112 could be any device that can establish communications paths in response to control instructions. Examples would be switches and ATM interworking multiplexers. Connection 130 could be any connection that supports communications between communications devices 110 and 112. Examples include Time Division Multiplex (TDM) connections such as DS3, DS1, DSO, E3, E1, and EO. Other examples include SONET, SDH, A TM, CDMA, GSM, PCS, and cellular connections. Connections 131–133 are similar, although they need not be the same as connection 130. All of these connections are well known in the art.

Signaling processor 100 is a telecommunications signaling processor. Signaling System #7 (SS7) is a well known form of telecommunications signaling. SS7 signaling includes information exchanged among the communications devices that facilitates the establishment of communications paths for users. The communications paths are typically comprised of a set of connections between communications devices. The signaling processor receives signaling, processes the signaling to select the connections, and sends control instructions to at least one communications device to implement the connections. A detailed description of signaling processor 100 follows further below.

Links 140–142 are any links capable of transferring signaling or control messages among the signaling processor and the communications devices. Examples include SS7, ISDN, or UDP/IP (or TCP/IP) over ethernet. A bus structure could also be used in some instances. Although not shown for reasons of clarity, several intermediary devices might be used to route the signaling over the links, such as routers, STPs, or signaling converters. These devices and links are known in the art.

The invention operates as follows. Communications device 110 requests a communications path by sending signaling over link 140. The signaling is received by signaling processor 100, and if required, it is converted into SS7. Signaling processor 100 processes the signaling and selects a connection, for example connection 132. Signaling processor 100 generates a control instruction identifying connections 130 and 132 and sends it to communications device 112 over link 141.

Communications device 110 typically seizes a connection to communications device 112 (this connection is represented by connection 130). Signaling processor 100 could also select this connection and instruct the communications device 110 to use connection 130. Communications device 112 extends the communications, path from connection 130 to connection 132 in response to the control instruction from signaling processor 100. Signaling processor 100 also may send additional signaling over link 142 to facilitate further extension of the communications path. As a result of signaling processor 100 processing, a communications path is established from communications device 110 through communications device 112 over connections 130 and 132.

Figure 2:
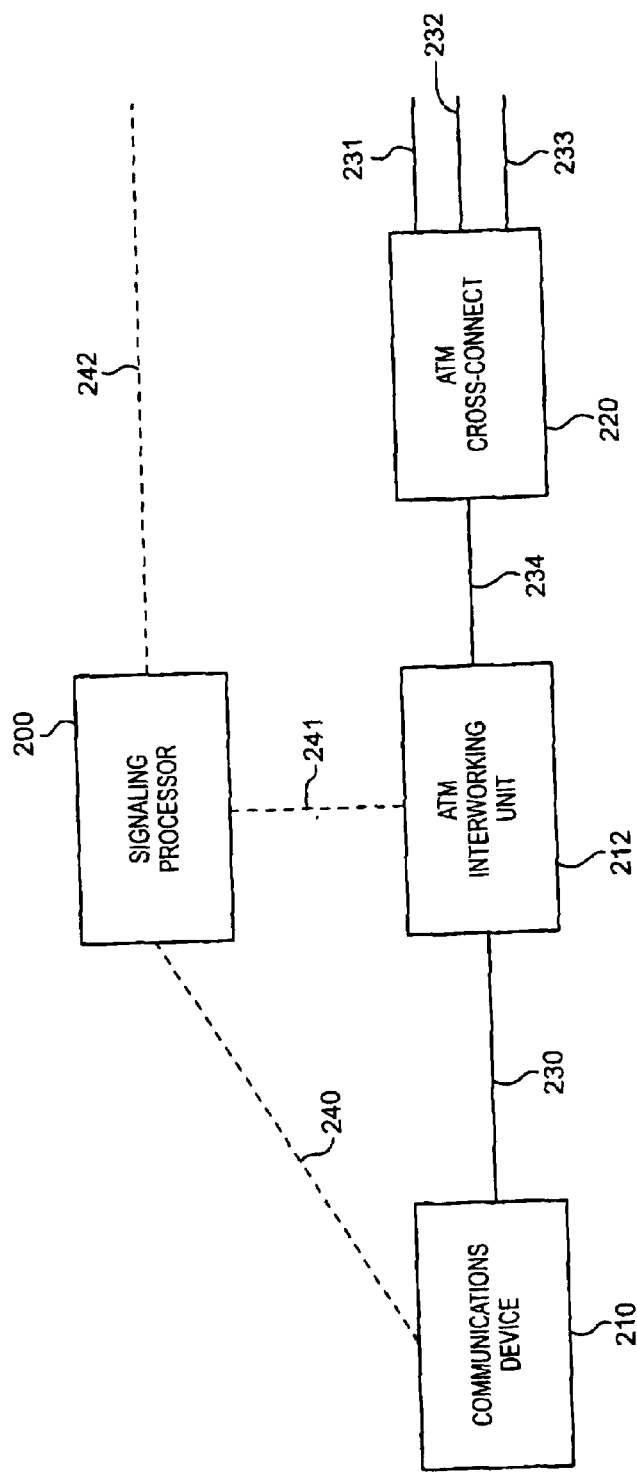
FIG. 2 is a block diagram of a version of the invention with an interworking unit.

FIG. 2 depicts a particular version of the invention—although other versions are also contemplated. Shown are signaling processor 200, communications device 210, ATM Interworking Unit (IWU) 212, and ATM cross-connect 220. Communications device 210 is connected to ATM IWU 212 by connection 230. ATM IWU 212 is connected to ATM cross-connect 220 by connection 234. ATM cross-connect 220 is connected to other devices (not shown) over connections 231, 232, and 233. Signaling processor 200 is linked to communications device 210 by link 240, to ATM IWU by link 241, and to other devices by link 242.

These elements are similar to those described above for the corresponding reference numbers of FIG. 1, except that communications device 112 has been replaced by ATM IWU 212, ATM cross-connect 220, and connection 234. Additionally, communications device 210 and connection 230 do not use ATM. ATM IWU 212 is a device that interworks (converts) non-ATM communications and ATM communications in response to control instructions from signaling processor 200. ATM cross-connect 220 is a device that provides a plurality of pre-provisioned ATM virtual connections to ATM IWU 212. Connections 231–233 each carry virtual connections. An example of ATM cross-connect 220 would be NBC model 20. Connection 234 is an ATM connection.

In operation, non-ATM communications device 210 will request a communications path by sending signaling over link 240. Signaling processor 200 will receive and process the signaling to select an ATM virtual connection. This ATM virtual connection would have already been provisioned through ATM cross-connect 220 to the appropriate destination. For example, virtual connection "A" might comprise a path within connections 234 and 232 interconnected by ATM cross-connect 220, and virtual connection "B" might comprise a path within connections 234 and 233 interconnected by ATM cross-connect 220. Signaling processor 200 might select virtual connection "B" and provide a control instruction to ATM IWU 212 identifying connection 230 and virtual connection "B." ATM IWU 212 would interwork the non-ATM communications on connection 230 with the ATM communications on virtual connection "B." Signaling processor 200 may also send additional signaling over link 242 to facilitate further extension of the call. As a result, a communications path is established from communications device 210 through ATM IWU 212 and ATM cross-connect 220 within connections 230, 234, and 233.

Signaling processor 200, ATM IWU 212, and ATM cross-connect 220 are able to provide ATM virtual connections to multiple destinations. It is significant to point out that the invention can select and implement connections to multiple destinations on a call-by-call basis. Signaling processor 200 can do this without controlling an ATM cross-connect or switch on a call-by-call basis. ATM cross-connect 220 is already configured to provide ATM connections to multiple destinations. Signaling processor 200 can route a call by selecting an ATM connection and having ATM IWU 212 interwork the non-ATM and A TM connections.

In one embodiment, communications device 210 is a conventional circuit switch and connection 230 is a DSO seized by the switch for a call. The switch (device 210) would send an SS7 Initial Address Message (IAM) over link 240 to signaling processor 200. Signaling processor 200 would process the IAM, for example, by examining the called number. Signaling processor 200 then would select an ATM Virtual Path/Virtual Channel (VP/VC) representing a virtual connection provisioned through ATM cross-connect 220 to the appropriate destination. Signaling processor 200 would send a control message to ATM IWU 212 over link 241 that identified the DSO and the selected VP/VC. Signaling processor 200 also would send another IAM to the destination over link 242. ATM IWU 212 would interwork the DSO and the selected VP/VC in response to the control instruction. Interworking entails converting the DSO into ATM cells and placing the VP/VC in the cell headers. As a result, a communications path is established from the switch (device 210) through ATM IWU 212 and ATM cross-connect 220 over the DSO and the selected VP/VC (connections 230, 234, and 232).

For a call in the reverse direction, signaling processor 200 would receive the IAM over link 242 and would select a DSO to communications device 210. The VP/VC used on the call and the selected DSO would be provided to ATM IWU 212 over link 241. ATM IWU 212 will interwork the VP/VC and the selected DSO in response to the control instruction. As a result, a communications path is established to the switch (device 210) through ATM cross-connect 220 and ATM IWU 212 over the VP/VC and the selected DSO (connections 232, 234, and 230). When combined with the above paragraph, it can be seen how end-to-end ATM connections could be provided between two switches through two ATM IWUs and the ATM cross-connect. Signaling processors would select the VP NC and the outbound DSO. The first ATM IWU would interwork the incoming DSO and the VP/VC. The second ATM IWU would interwork the VP/VC and the outbound DSO.

It is significant to point out that the switches could be provided with ATM virtual connections to appropriate destinations that are selected on a call-by-call basis. This can be accomplished without the need to control an ATM switching matrix or cross-connect on a call-by-call basis.

The ATM Interworking Unit

Figure 3:
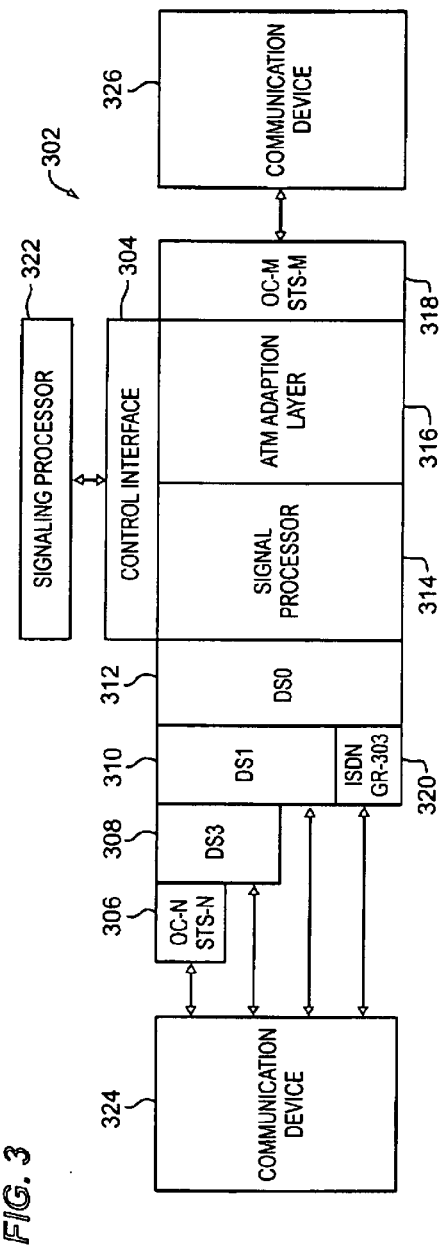
FIG. 3 is a functional diagram of an asynchronous transfer mode interworking unit for use with a synchronous optical network system in accordance with the present invention.

FIG. 3 shows one embodiment of an interworking unit which is ATM interworking unit 302 suitable for the present invention for use with a SONET system, but other interworking units that support the requirements of the invention also are applicable. ATM interworking unit 302 may receive and transmit in-band and out-of-band calls.

ATM interworking unit 302 has control interface 304, OC-N/STS-N interface 306, DS3 interface 308, DSI interface 310, DSO interface 312, signal processor 314, ATM adaptation layer (AAL) 316, OC-M/STS-M interface 318, and ISDN/GR-303 interface 320. As used herein in conjunction with OC or STS, "N" refers to an integer, and "M" refers to an integer.

Control interface 304 receives control messages originating from signaling processor 322, identifies DSO and virtual connection assignments in the control messages, and provides these assignments to AAL 316 for implementation. The control messages are received over an ATM virtual connection and through OC-M/STS-M interface 318 to control interface 304 or directly through the control interface from a link.

OC-N/STS-N interface 306, DS3 interface 308, DS1 interface 310, DS0 interface 312, and ISDN/GR-303 interface 320 each can receive user communications from communication device 324. Likewise, OC-M/STS-M interface 318 can receive user communications from communication device 326.

OC-N/STS-N interface 306 receives OC-N formatted user communications and STS-N formatted user communications and converts the user communications to the OS3 format. OS3 interface 308 receives user communications in the OS3 format and converts the user communications to the DS format. DS3 interface 308 can receive OS3s from OC-N/STS-N interface 306 or from an external connection. DS 1 interface 310 receives user communications in the DS1 format and converts the user communications to the DS0 format. DSI interface 310 receives DS1s from DS3 interface 308 or from an external connection. DS0 interface 312 receives user communications in the OS0 format and provides an interface to AAL 316. ISDN/GR-303 interface 320 receives user communications in either the ISDN format or the GR303 format and converts the user communications to the DS0 format. In addition, each interface may transmit use( communications in like manner to communication device 324.

OC-M/STS-M interface 318 is operational to receive A TM cells from AAL 316 and to transmit the A TM cells over the connection to communication device 326. OC-M/STS-M interface 318 also may receive ATM cells in the OC or STS format and transmit them to AAL 316.

AAL 316 comprises both a convergence sublayer and a segmentation and reassembly (SAR) sublayer. AAL 316 obtains the identity of the OS0 and the ATM VP/VC from control interface 304. AAL 316 is operational to convert between the DS0 format and the ATM format. AALs are known in the art and information about AALs is provided by International Telecommunications Union (ITU) document 1.363, which is incorporated herein by reference. An AAL for voice calls is described in U.S. Pat. No. 5,606,553 entitled "Cell Processing for Voice Transmission" which is incorporated herein by reference.

Calls with multiple 64 Kilo-bits per second (Kbps) OS0s are known as Nx64 calls. If desired, AAL 316 can be configured to accept control messages through control interface 304 for Nx64 calls. ATM interworking unit 302 is able to interwork, multiplex, and demultiplex for multiple DS0s. A technique for processing VFNCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically unidirectional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo cancellation to selected DS0 circuits. In these embodiments, signal processor 314 is included either separately (as shown) or as a part of OS0 interface 312. Signaling" processor 322 is configured to send control messages to ATM interworking unit 302 to implement particular features on particular DS0 circuits. Alternatively, lookup tables may be used to implement particular features for particular circuits or VP/VCs.

Figure 4:
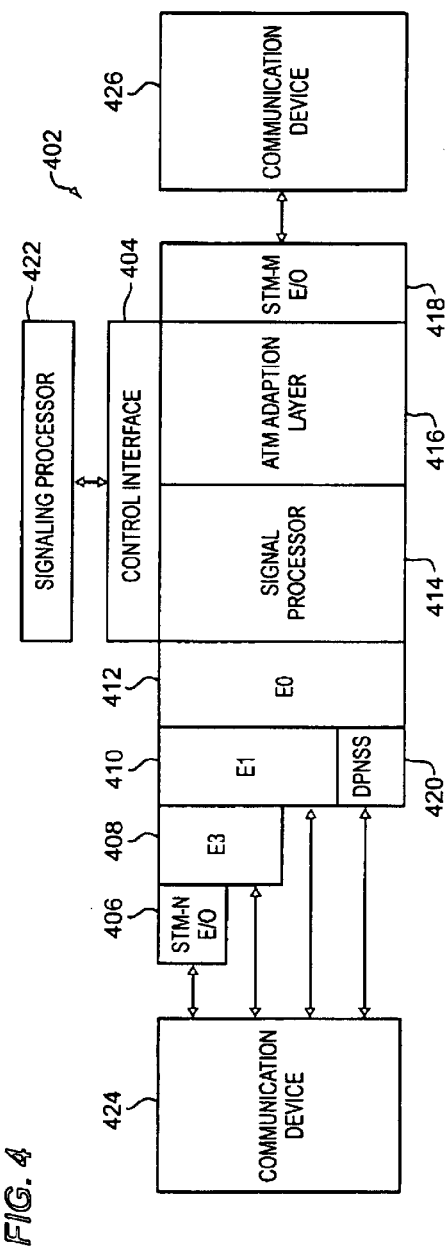
FIG. 4 is a functional diagram of an asynchronous transfer mode interworking unit for use with a synchronous digital hierarchy system in accordance with the present invention.

FIG. 4 shows another embodiment of an interworking unit which is ATM interworking unit 402 suitable for the present invention for use with an SDH system. ATM interworking unit 402 has control interface 404, STM-N electrical/optical (E/O) interface 406, E3 interface 408, E1 interface 410, E0 interface 412, signal processor 414, AAL 416, STM-M electrical/optical (E/O) interface 418, and digital private network signaling system (DPNSS) interface 420. As used herein in conjunction with STM, "N" refers to an integer, and "M" refers to an integer.

Control interface 404 receives control messages from the signaling processor 422, identifies E0 and virtual connection assignments in the control messages, and provides these assignments to AAL 416 for implementation. The control messages are received over an ATM virtual connection and through STM-M interface 418 to control interface 404 or directly through the control interface from a link.

STM-N E/O interface 406, E3 interface 408, E1 interface 410, E0 interface 412, and DPNSS interface 420 each can receive user communications from second communication device 424. Likewise, STM-M E/O interface 418 can receive user communications from third communication device 426.

STM-N E/O interface 406 receives STM-N electrical or optical formatted user communications and converts the user communications from the STM-N electrical or STM-N optical format to the E3 format. E3 interface 408 receives user communications in the E3 format and converts the user communications to the E1 format. E3 interface 408 can receive E3s from STM-N E/O interface 406 or from an external connection. E1 interface 410 receives user communications in the E1 format and converts the user communications to the E0 format. E1 interface 410 receives E1s from STM-N E/O interface 406 or E3 interface 408 or from an external connection. E0 interface 412 receives user communications in the E0 format and provides an interface to AAL 416. DPNSS interface 420 receives user communications in the DPNSS format and converts the user-communications to the E0 format. In addition, each interface may transmit user communications in a like manner to communication device 424.

STM-M E/O interface 418 is operational to receive ATM cells from AAL 416 and to transmit the ATM cells over the connection to communication device 426. STM-M E/O interface 418 may also receive ATM cells in the STM-M E/O format and transmit them to AAL 416.

AAL 416 comprises both a convergence sublayer and a segmentation and reassembly (SAR) sublayer. AAL 416 obtains the identity of the E0 and the ATM VP/VC from control interface 404. AAL 416 is operational to convert between the E0 format and the ATM format, either in response to a control instruction or without a control instruction. AAL's are known in the art. If desired, AAL 416 can be configured to receive control messages through control interface 404 for Nx64 user communications.

E0 connections are bi-directional and ATM connections typically are unidirectional. As a result, two virtual connections in opposing directions typically will be required for each E0. Those skilled in the art will appreciate how this can be accomplished in the context of the invention.

In some instances, it may be desirable to incorporate digital signal processing capabilities at the EO level. Also, it may be desirable to apply echo cancellation. In these embodiments, signal processor 414 is included either separately (as shown) or as a part of EO interface 412. Signaling processor 422 is configured to send control messages to ATM interworking unit 402 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call.

In addition to selecting connections, the signaling processor performs many other functions in the context of call processing. It not only can control routing and select the actual connections, but it also can validate callers, control echo cancelers, generate accounting information, invoke intelligent network functions, access remote databases, manage traffic, and balance network loads. One skilled in the art will appreciate how the signaling processor described below can be adapted to operate in the above embodiments.

Figure 5:
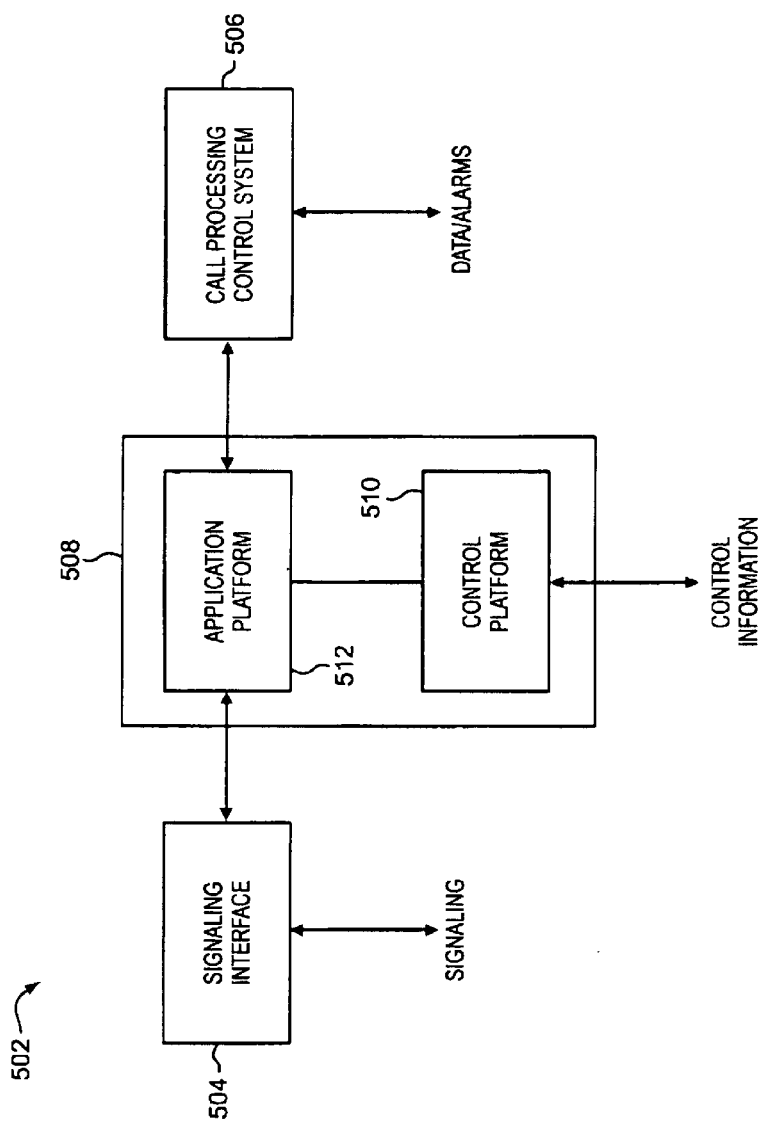
FIG. 5 is a block diagram of a signaling processor constructed in accordance with the present system.

FIG. 5 depicts a version of the signaling processor. Other versions also are contemplated. In the embodiment of FIG. 5, signaling processor 502 has signaling interface 504, call processing control system 506 (CPCS), and call processor 508. It will be appreciated that signaling processor 508 may be constructed as modules in a single unit or as multiple units.

Signaling interface 504 is coupled externally to signaling systems—in particular to signaling systems having a message transfer part (MTP), an ISDN user part (ISUP), a signaling connection control part (SCCP), an intelligent network application part (INAP), and a TCAP. Signaling interface 504 preferably is a platform that comprises an MTP level 1, an MTP level 2, MTP level 3, an SCCP process, an ISUP process, and a TCAP process. Signaling interface 504 also has INAP functionality.

Signaling interface 504 may be linked to a communication device (not shown). For example, the communication device may be an SCP which is queried by the signaling interface with an AIN 0.1 SCP TCAP query to obtain additional call-associated data. The answer message may have additional information parameters that are required to complete call processing. The communication device also may be an STP or other device.

Signaling interface 504 is operational to transmit, receive, and process call signaling. The TCAP, SCCP, ISUP, and INAP functionality use the services of MTP to transmit and receive the messages. Preferably, signaling interface 504 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGMS company).

The processes of signaling interface 504 process information that is received in message signal units (MSUs) and convert the information to call information elements that are sent to call processor 508 to be processed. A call information element may be, for example, an ISUP IAM message parameter from the MSU. Signaling interface 504 strips the unneeded header information from the MSU to isolate the message information parameters and passes the parameters to call processor 508 as the call information elements. Examples of these parameters are the called number, calling number, and user service information. Other examples of messages with information elements are an ANM, an ACM, an REL, an RLC, and an INF. In addition, call information elements are transferred from call processor 508 back to signaling interface 504, and the information elements are reassembled into MSUs and transferred to a signaling point.

CPCS 506 is a management and administration system. CPCS 506 is the user interface and external systems interface into call processor 508. CPCS 506 serves as a collection point for call-associated data such as translations having call routing data, logs, operational measurement data, statistical information, accounting information, and other call data.

CPCS 506 accepts data, such as the translations, from a source such as an operations system and updates the data in the tables in call processor 508. CPCS 506 makes sure this data is in the correct format prior to transferring the data to call processor 508. CPCS 506 also provides configuration data to other devices including to processor 508, signaling interface 504, and the interworking unit (not shown). In addition, CPCS 506 provides for remote control of call monitoring and call tapping applications from call processor 508.

CPCS 506 also serves as a collection point for alarms. Alarm information is transferred to CPCS 506. CPCS 506 then transports alarm messages to the required communication device. For example, CPCS 506 can transport alarms to an operations center.

CPCS 506 also has a human-machine interface (HMI). This allows a person to log onto CPCS 506 and manage data tables or review data tables in the CPCS or provide maintenance services.

Call processor 508 processes call signaling and controls an ATM interworking unit, such as an ATM interworking multiplexer (mux) that performs interworking of, DSOs and VP/VCs. However, call processor 508 may control other communications devices and connections in other embodiments.

Call processor 508 comprises control platform 510 and application platform 512. Each platform 510 and 512 is coupled to the other platform.

Control platform 510 is comprised of various external interfaces including an interworking unit interface, an echo interface, a resource control interface, a call information interface, and an operations interface. Control platform 510 is externally coupled to an interworking unit control, an echo control, a resource control, accounting, and operations. The interworking unit interface exchanges messages with at least one interworking unit. These messages comprise DSO to VPNC assignments, acknowledgments, and status information. The echo control interface exchanges messages with echo control systems. Messages exchanged with echo control systems might include instructions to enable or disable echo cancellation on particular DSOs, acknowledgments; and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DSOs, acknowledgments, and status information. For example, a message may instruct a continuity testing resource to provide a loopback or to send and detect a tone for a continuity test.

The call information interface transfers pertinent call information to a call information processing system, such as to CPCS 506. Typical call information includes various accounting information, such as the parties to the call, time points for the call, and any special features applied to the call. One skilled in the art will appreciate how to produce the software for the interfaces in control platform 510.

Application platform 512 is functional to process signaling information from signaling interface 504 in order to select connections. The identity of the selected connections are provided to control platform 510 for the interworking unit interface. Application platform 512 is responsible for validation, translation, routing, call control, exceptions, screening, and error handling. In addition to providing the control requirements for the interworking unit, application platform 512 also provides requirements for echo control and resource control to the appropriate interface of control platform 510. In addition, application platform 512 generates signaling information for transmission by signaling interface 504. Signaling information might be for ISUP, INAP, or TCAP messages to external network elements. Pertinent information for each call is stored in a call buffer information (CBI) location for the call. The CBI can be used for tracking and accounting the call.

Application platform 512 operates in general accord with the Basic Call Model (BCM) defined by the ITU. An instance of the BCM is created to handle each call. The BCM includes an originating process and a terminating process. Application platform 512 includes a service switching function (SSF) that is used to invoke the service control function (SCF). Typically, the SCF is contained in an SCP. The SCF is queried with TCAP or INAP messages transported by signaling interface 504 which are initiated with information from the SSP in application platform 512. The originating or terminating processes will access remote databases with intelligent network (IN) functionality via the SSF.

Software requirements for application platform 512 can be produced in specification and description language (SDL) defined in ITU-T Z.100. The SDL can be converted into C code. A real time case tool such as SDT from Telelogic, Inc. or Object Time from Object Time, Inc. can be used. Additional C and C++ code can be added as required to establish the environment.

Call processor 508 can be comprised of the above-described software loaded onto a computer. The computer can be a Tandem S4000 using the non-stop Unix operating system and conventional database systems. It may be desirable to utilize the multi-threading capability of a Unix operating system.

From FIG. 5, it can be seen that application platform 512 processes signaling information to control numerous systems and facilitate call connections and services. The SS7 signaling is exchanged between call processor 508 and external components through signaling interface 504, and control information is exchanged with external systems through control platform 510. Advantageously, signaling interface 504, CPCS 506, and call processor 508 are not integrated into a switch central processing unit (CPU) that is coupled to a switching matrix. Unlike an SCP, the components of signaling processor 502 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
TCAP—Transaction Capabilities Application Part
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 6:
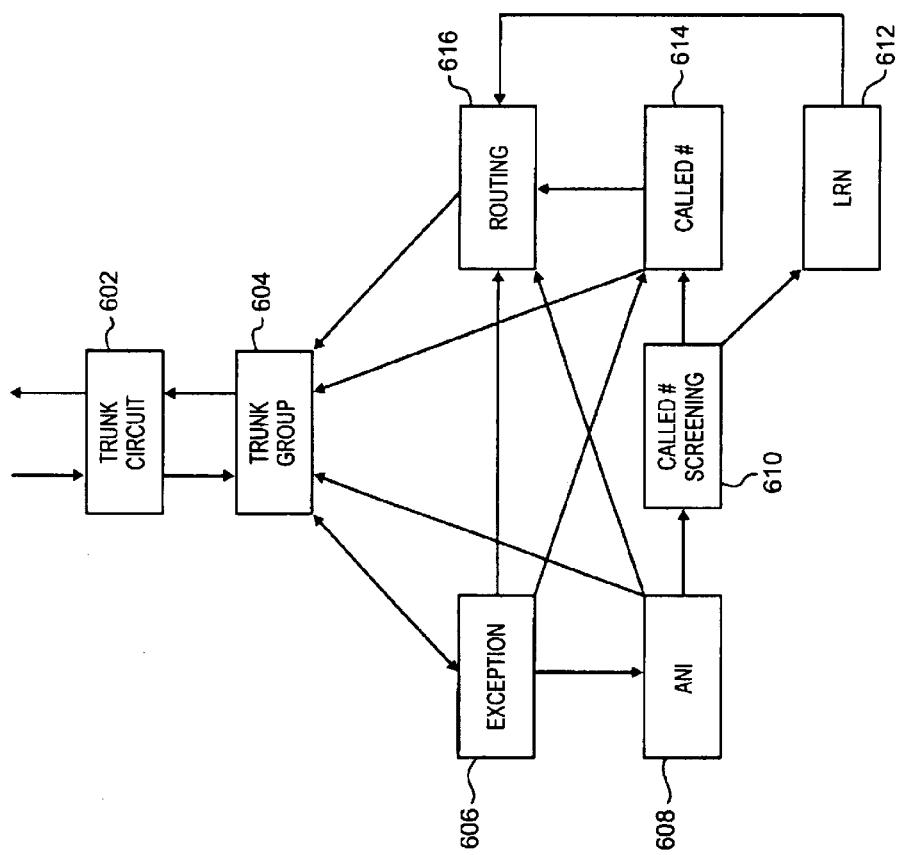
FIG. 6 is a block diagram of a data structure having tables that are used in the signaling processor of FIG. 5.

FIG. 6 depicts a data structure used by application platform 512 of FIG. 5 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 602, trunk group table 604, exception table 606, ANI table 608, called number screening table 610, location routing number (LRN) table 612, called number table 614, and routing table 616.

Trunk circuit table 602 contains information related to the connections. Typically, the connections are DS0 or ATM connections. Initially, trunk circuit table 602 is used to retrieve information about the originating connection. Later, the table is used to retrieve information about the terminating connection. When the originating connection is being processed, the trunk group number in trunk circuit table 602 points to the applicable trunk group for the originating connection in trunk group table 604.

Trunk group table 604 contains information related to the originating and terminating trunk groups. When the originating connection is being processed, trunk group table 604 provides information relevant to the trunk group for the originating connection and typically points to exception table 606.

Exception table 606 is used to identify various exception conditions related to the call that may influence the routing or other handling of the call. Typically, exception table 606 points to ANI table 608. Although, exception table 606 may point directly to trunk group table 604, called number table 614, or routing table 616.

ANI table 608 is used to identify any special characteristics related to the caller's number. The caller's number is commonly known as automatic number identification (ANI). ANI table 608 typically points to called number screening table 610. Although, ANI table 608 may point directly to trunk group table 604 or routing table 616.

Called number screening table 610 is used to provide the trigger detection point (TDP) for an AIN 0.1 SCP TCAP query. It is used, for example, with the local number portability (LNP) feature. Called number screening table 610 invokes a TCAP. According to the TCAP response, either LRN table 612 or called number table 614 is accessed.

LRN table 612 is used to identify routing requirements based on the called number for those calls that have a return response from an LNP query to an SCP, indicating that the called number is ported. LRN table 612 points to routing table 616.

Called number table 614 is used to identify routing requirements based on the called number. This will be the case for standard telephone calls. Called number table 614 typically points to routing table 616. Although, it may point to trunk group table 604.

Routing table 616 has information relating to the routing of the call for the various connections. Routing table 616 is entered from a pointer in exception table 606, ANI table 608, LRN table 612, or called number table 614. Routing table 616 typically points to a trunk group in trunk group table 604.

When exception table 606, ANI table 608, called number table 614, or routing table 616 point to trunk group table 604, they effectively select the terminating trunk group. When the terminating connection is being processed, the trunk group number in trunk group table 604 and trunk circuit table 606 is the index that points to the trunk group index. The trunk group index contains the applicable terminating connection in trunk circuit table 604.

The terminating trunk circuit is used to extend the call. The trunk circuit is typically a VPNC or a OSO. Thus, it can be seen that by migrating through the tables, a terminating connection can be selected for a call.

FIG. 7 is an overlay of FIG. 6. The tables from FIG. 6 are present, but for clarity, their pointers have been omitted. FIG. 7 illustrates additional tables that can be accessed from the tables of FIG. 6. These include call processor 10 table 702, treatment table 704, query/response table 706, and message table 708.

Call processor ill table 702 contains various call processor SS7 point codes. It can be accessed from trunk group table 604, and it points back to trunk group table 604.

Treatment table 704 identifies various special actions to be taken in the course of call processing. This will typically result in the transmission of a release message (REL) and a cause value. Treatment table 704 can be accessed from trunk circuit table 602, trunk group table 604, exception table 606, ANI table 608, called number screening table 610, LRN table 612, called number table 614, routing table 616, and query/response table 706.

Query/response table 706 has information used to invoke the SCF. It can be accessed by trunk group table 604, exception table 606, ANI table 608, called number screening table 610, LRN table 612, called number table 614, and routing table 616. It points to trunk group table 604, exception table 606, ANI table 608, called number, screening table 610, LRN table 612, called number table 614, routing table 616, and treatment table 704.

Message table 708 is used to provide instructions for signaling messages from the termination side of the call. It can be accessed by trunk group table 604 and points to trunk group table 604.

FIGS. 8A–14 depict examples of the various tables described above. FIG. 8A depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or call processor associated with the originating circuit. For terminating circuit processing, the trunk group number is used to enter the table.

The table also contains the circuit identification code (CIC). The CIC identifies the circuit which is typically a DSO or a VPNC. Thus, the invention is capable of mapping the SS7 CICs to the ATM VP/VC. If the circuit is ATM, the VP and the VC also can be used for identification. The group member number is a numeric code that is used for terminating circuit selection. The hardware identifier identifies the location of the hardware associated with the originating circuit. The echo canceller (EC) identification (ID) entry identifies the echo canceller for the originating circuit.

The remaining fields are dynamic in that they are filled during call processing. The echo control entry is filled based on three fields in signaling messages: the echo suppresser indicator in the IAM or circuit reservation message (CRM), and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 8B depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the call processor controls all of the circuits. If the glare resolution entry is set to "none," the call processor yields. The continuity control entry lists the percent of calls requiring continuity tests on the trunk group.

Continuity control indicates whether continuity is to be checked. The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a call processor (ATM) or a switch (TDM). The outgoing message index (OMI) points to the message table so that outgoing messages can obtain parameters. The associated number plan area (NPA) entry identifies the area code.

Selection sequence (SEL SEQ) indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the call processor may release the call. During termination processing, the next function and index are used to enter the trunk circuit table. Reattempt circuit indicates if an outgoing call can be reattempted on a different circuit within the same trunk group.

Default jurisdiction information parameter (JIP) is an NPA-NXX value that is used to identify the switch from which the call originates. If an ISUP JIP is not received in an IAM, the default JIP is the value recorded on the call processor CBI. Alternately, this field can hold a default LRN having a ten digit form of NPA-NXX-X in which the first six digits can populate the JIP parameter. If an ISUP LRN is not received in an IAM, the default IAM is the value recorded on the call processor CBI. The next function and next index entries point to the next table.

FIG. 9A depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network.

The called party number nature of address differentiates between 0+calls, 1+calls, test calls, and international calls. For example, international calls might be routed to a preselected international carrier. The called party "digits from" and "digits to" focus further processing unique to a defined range of called numbers. The "digits from" field is a decimal number ranging from 1–15 digits. It can be any length and, if filled with less than 15 digits, is filled with Os for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 9B depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private pay station, and access for private virtual network types of service. The next function and next index point to the next table which is typically the called number table.

FIG. 10A depicts an example of a called number screening table. The index is used to enter the table. The nature of address entry indicates the type of dialed number, for example, national versus international. The "digits from" and "digits to" entries focus further processing unique to a range of called numbers. This is where the TCAP response information is incorporated in the call processing flow. This is where the trigger occurs for an LNP TCAP query launch. The processing follows the processing logic of the "digits from" and "digits to" fields in FIG. 9A. The next function and next index point to the next table which is typically either the called number table or the LRN table.

FIG. 10B depicts an example of an LRN table. This table will perform the same function as the called number table for those calls that are identified as ported based upon an LNP query response. The index is used to enter the table. The nature of address entry indicates the type of dialed number, for example, national versus international. In an LRN case, the value is a national number. The "digits from" and "digits to" entries focus further processing unique to a range of called numbers. This is where the TCAP response information is incorporated in the call processing flow. The processing follows the processing logic of the "digits from" and "digits to" fields in FIG. 9A. The next function and next index point to the next table which is typically the routing table.

FIG. 11 depicts an example of the called number table. The index is used to enter the table. The called number nature of address entry indicates the type of dialed number, for example, national versus international. The "digits from" and "digits to" entries focus further processing unique to a range of called numbers, and they are used in the LRN table check process. The processing follows the processing logic of the "digits from" and "digits to" fields in FIG. 9A. The next function and next index point to the next table which is typically the routing table.

FIG. 12 depicts an example of the routing table. The index is used to enter the table. The transit network selection (TNS) network identification (ID) plan indicates the number of digits to use for the CIC. The transit network selection "digits" field defines the numbers to identify an international carrier. The circuit code indicates the need for an operator on the call. The next function, next index, and signal route entries in the routing table are used to identify a trunk group. The second and third next function/index/signal route entries define alternate routes. The third next function entry also can point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 8A–12 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number screening, called number, routing, trunk group, and trunk circuit.

FIG. 13 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in an REL from the call processor. The next function and next index point to the next table.

FIG. 14 depicts an example of the message table. This table allows the call processor to alter information in outgoing messages. Message type is used to enter the table, and it represents the outgoing standard SS7 message type. The parameter is the pertinent parameter within the outgoing SS7 message. The indexes point to various entries in the trunk group table and determine if parameters are passed unchanged, omitted, or modified in the outgoing messages.

Initial Call Processing

The above-described tables essentially select a connection or treatment for a call during call set-up. The remaining figures detail the processing of the various SS7 signaling messages by the call processor. These figures use the well known SDL nomenclature. In SDL, rectangles indicate processes, and diamonds represent decisions. Pointed rectangles represent messages sent, and indented rectangles represent messages received. If a vertical line is included in the rectangle, the message is internal to the call processor. If no line is present, the message is external to the call processor. If the point or indent is on the left, the message is related to the origination side of the call. If the point or indent is on the right, the message is related to the termination side of the call. In the following discussion, a transition from one figure to another will be indicated by placing the new figure in parentheses.

Figure 15:
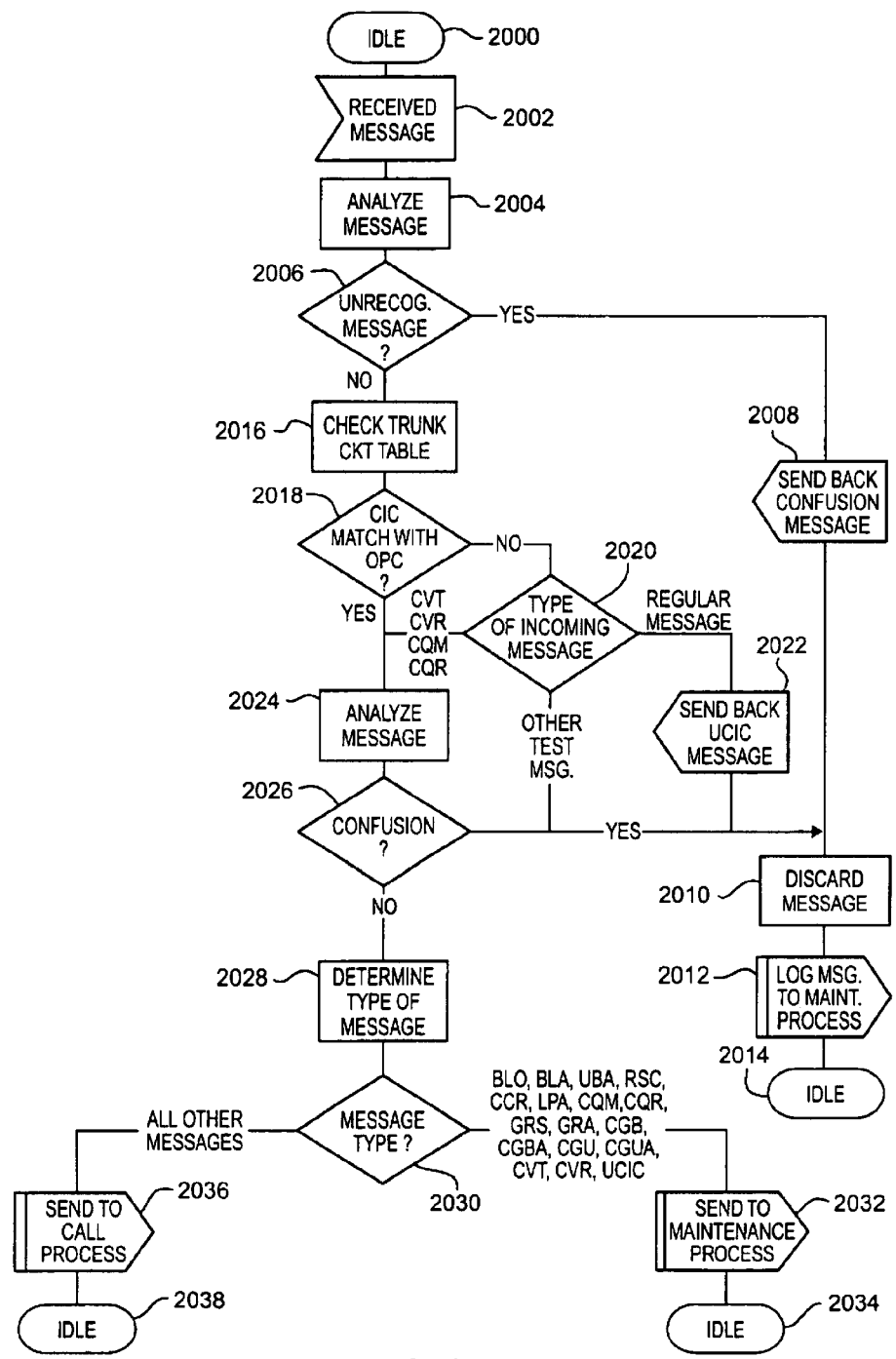
FIG. 15 is an SDL diagram of logic used in a version of the invention for initial call processing.

FIG. 15 entails the initial handling of all messages by the call processor, also referred to as a CCM. The process begins with step 2000 in the idle state. At 2002, a message is received and analyzed in 2004. If the message is unrecognized in 2006, then a confusion message is sent back in 2008, and the message is discarded at 2010. The maintenance process (maintenance) is informed with a message (msg) at 2012, and idle is attained at 2014. If the message is recognized at 2006, the trunk circuit (ckt) table is checked at 2016. If a CIC match is not found in 2018, then the message type is checked at 2020. If the message is regular, a UCIC message is sent back at 2022, and the message is discarded at 2010. If the message is a test message at 2020, it is discarded at 2010. If the message is a CVT, CVR, CQM, or CQR at 2020, or if a CIC match is found at 2018, then it is analyzed at 2024. If the process is confused by the message (i.e., it is garbled) at 2026, it is discarded at 2010. If it is not, message type is determined at 2028 and 2030. The following messages are sent to maintenance at 2032 before idle is attained at 2034: BLO, BLA, UBA, RSC, CCR, LPA, CQM, CQR, GRS, GRA, CGB, CGBA, CGU, CGUA, CVT, CVR, and UCIC (FIGS. 33A–48B). All other messages are sent to call processing at 2036 before the idle state is attained at 2038. At step 2036, an instance of a BCM is created to process the call.

The BCM is comprised of a process that handles the incoming side of the call. This is known as an originating call process. The originating call process receives messages and processes information related to the incoming side of the call. The BCM also is comprised of a process that handles the outgoing side of the call—the terminating process. The terminating process receives messages and processes information related to the outgoing side of the call.

Calls may be referred to as "intra-call processor" calls. This is where the same call processor is controlling both ends of a call connection. The call messages for intra-call processor calls may be referred to as "internal" messages. If the call is not an intra-call processor call, the call messages are referred in their normal fashion or as "external" messages.

Trunk Circuit and Group Table Processing for Incoming Calls

Figure 16A:
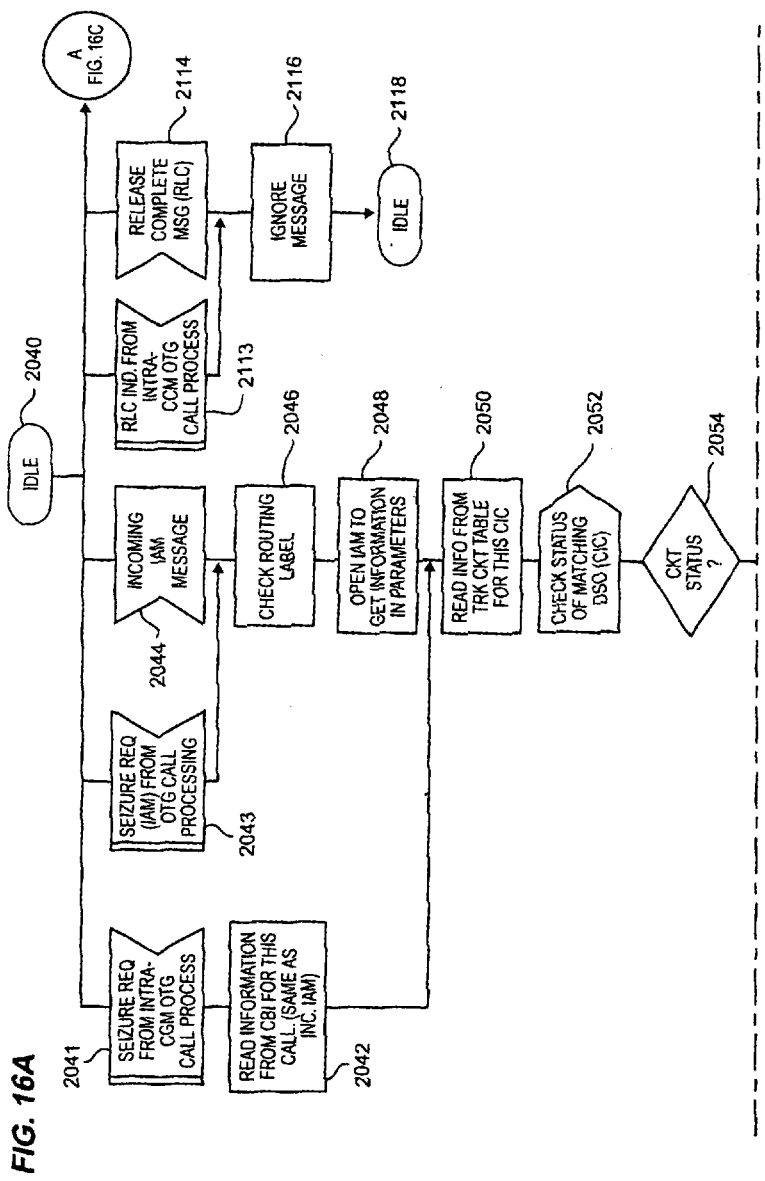
FIGS. 16A–16P are SDL diagrams of logic used in a version of the invention for trunk circuit/group table processing.
Figure 16B:
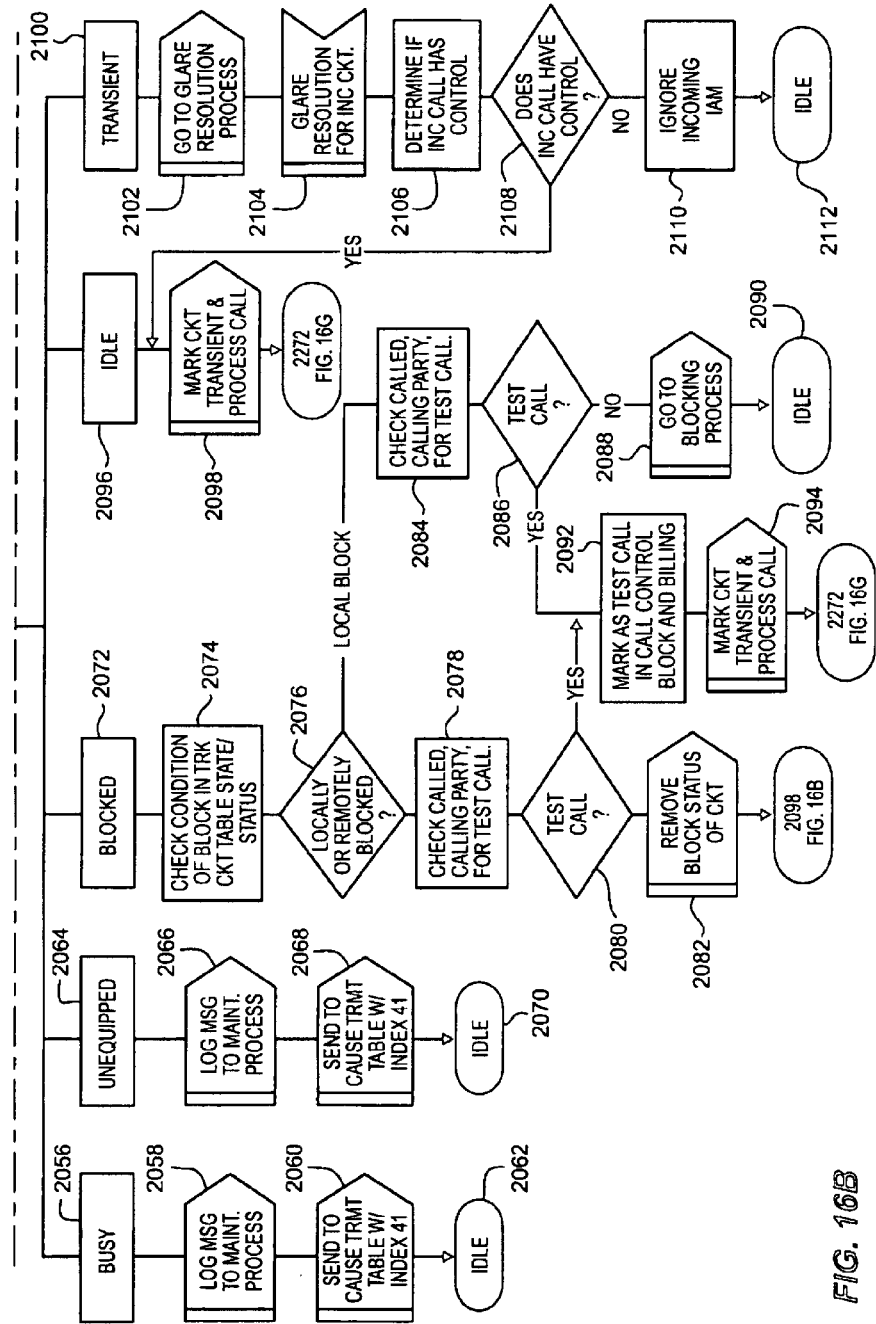
Figure 16D:
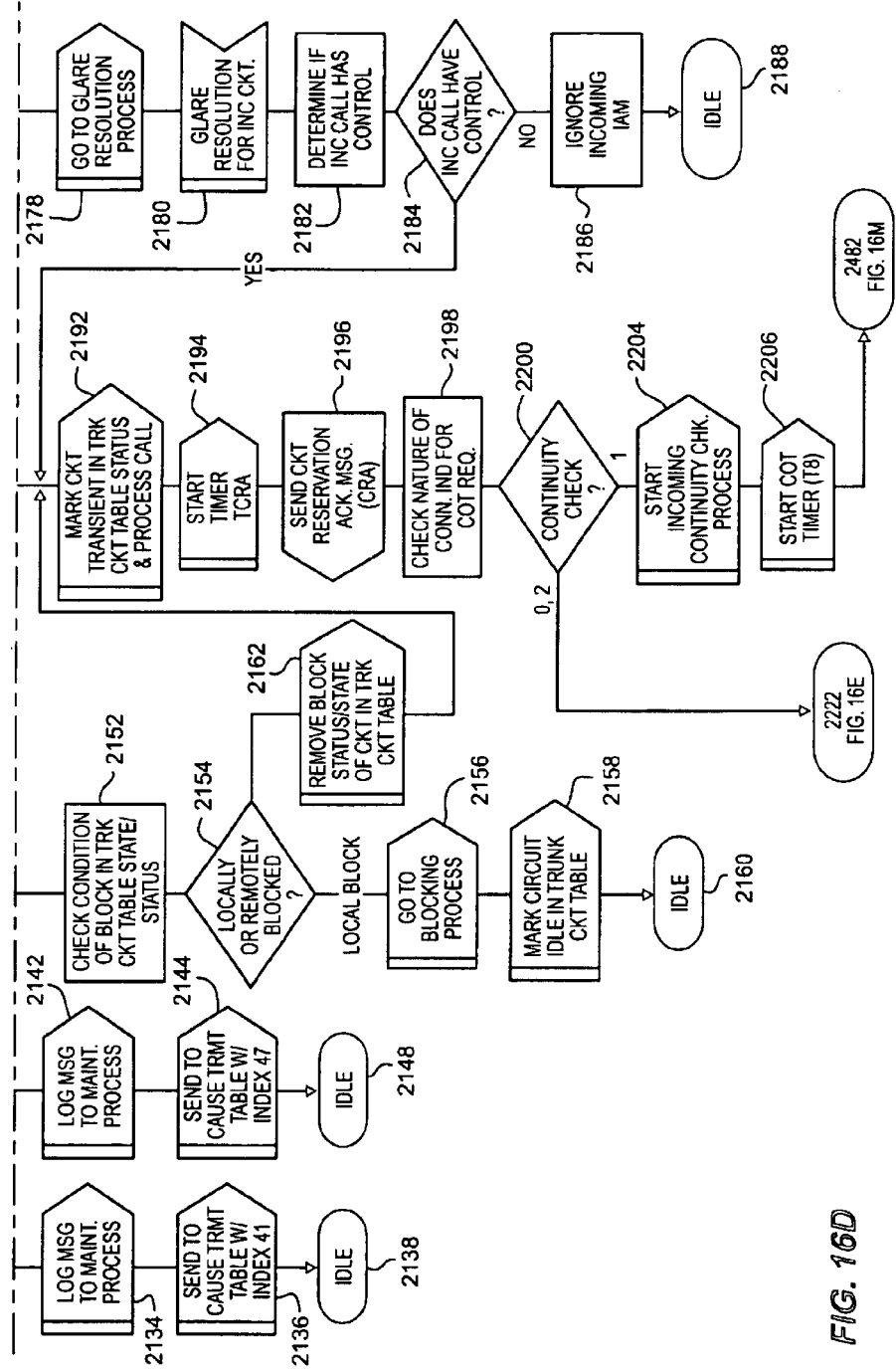
Figure 16E:
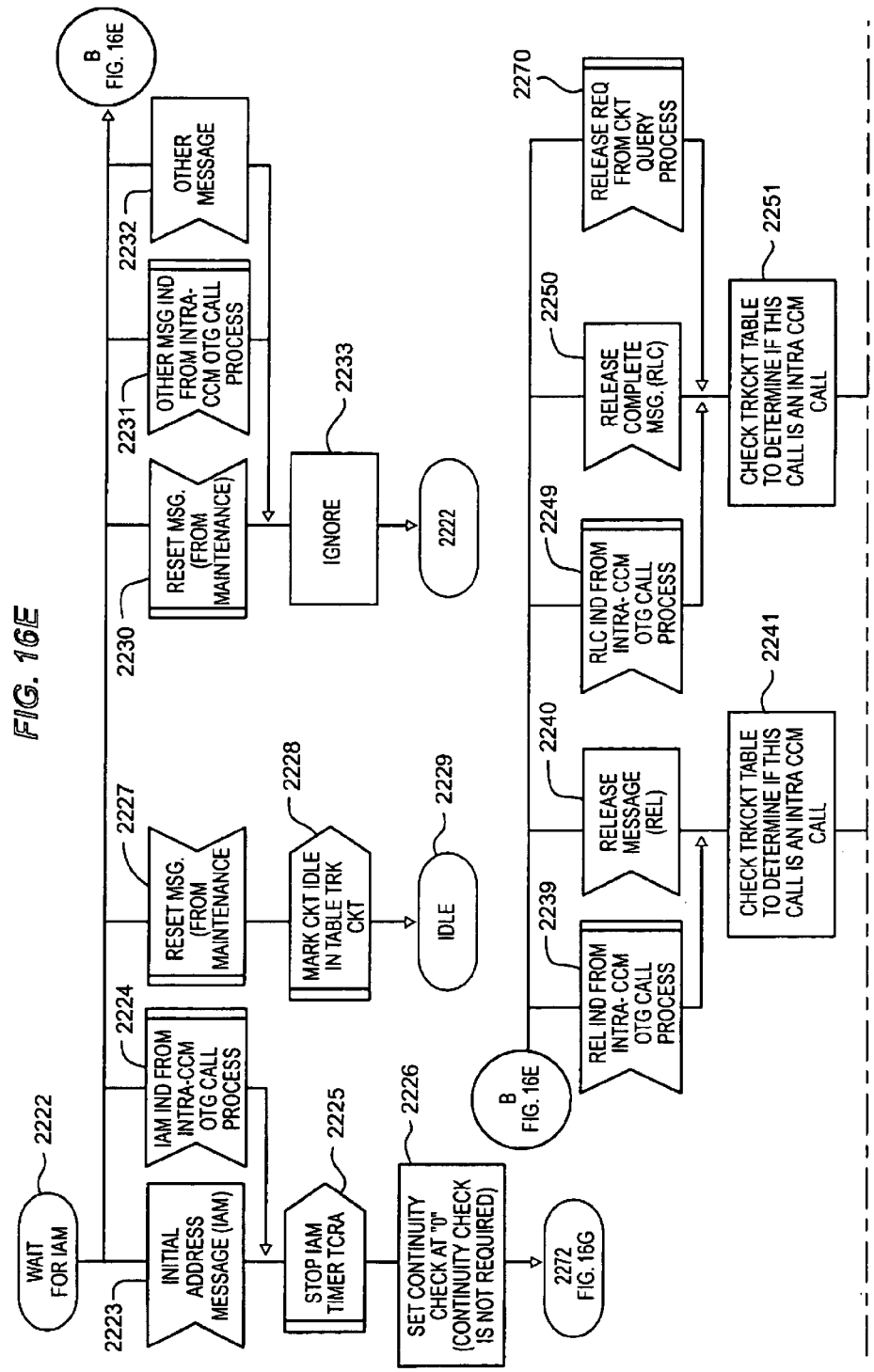
Figure 16F:
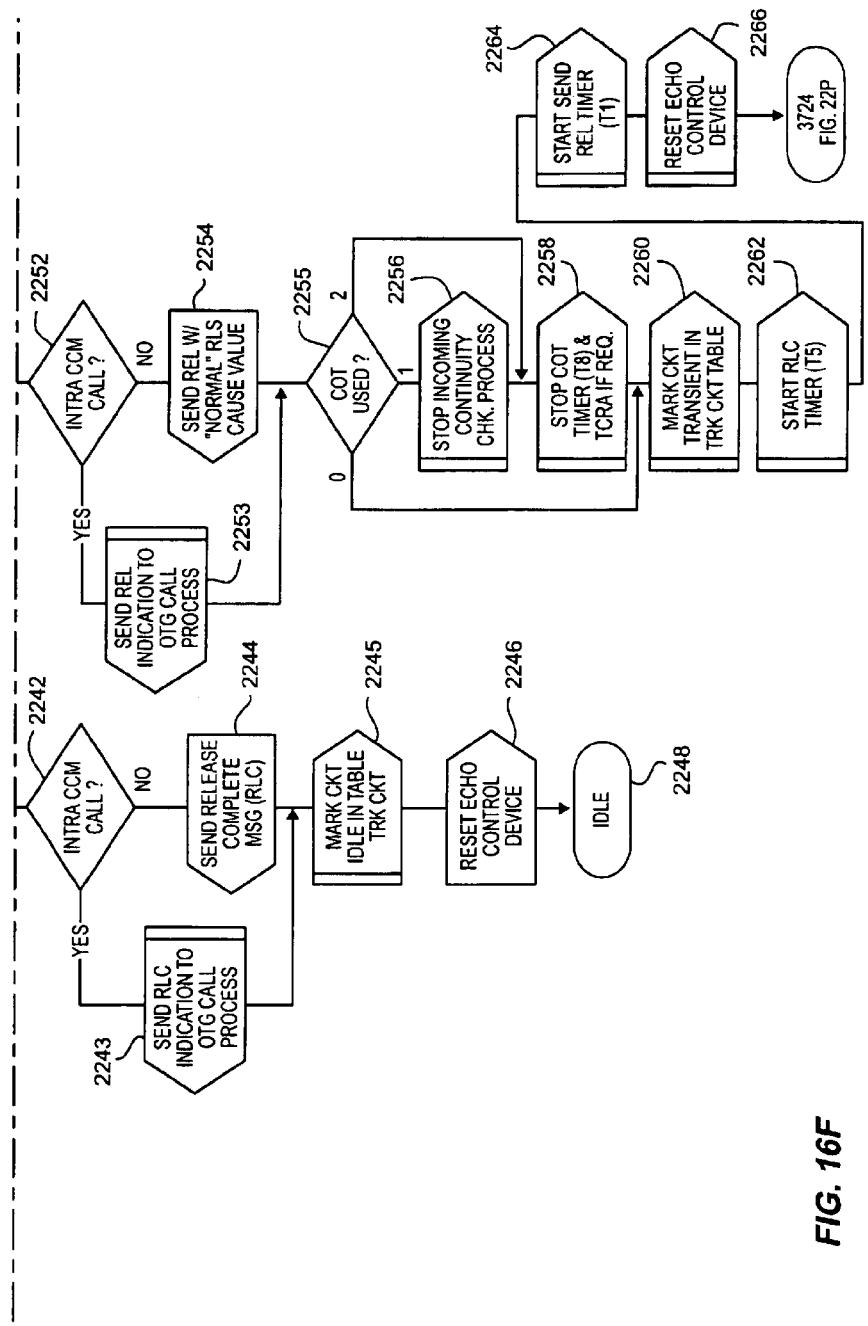
Figure 16H:
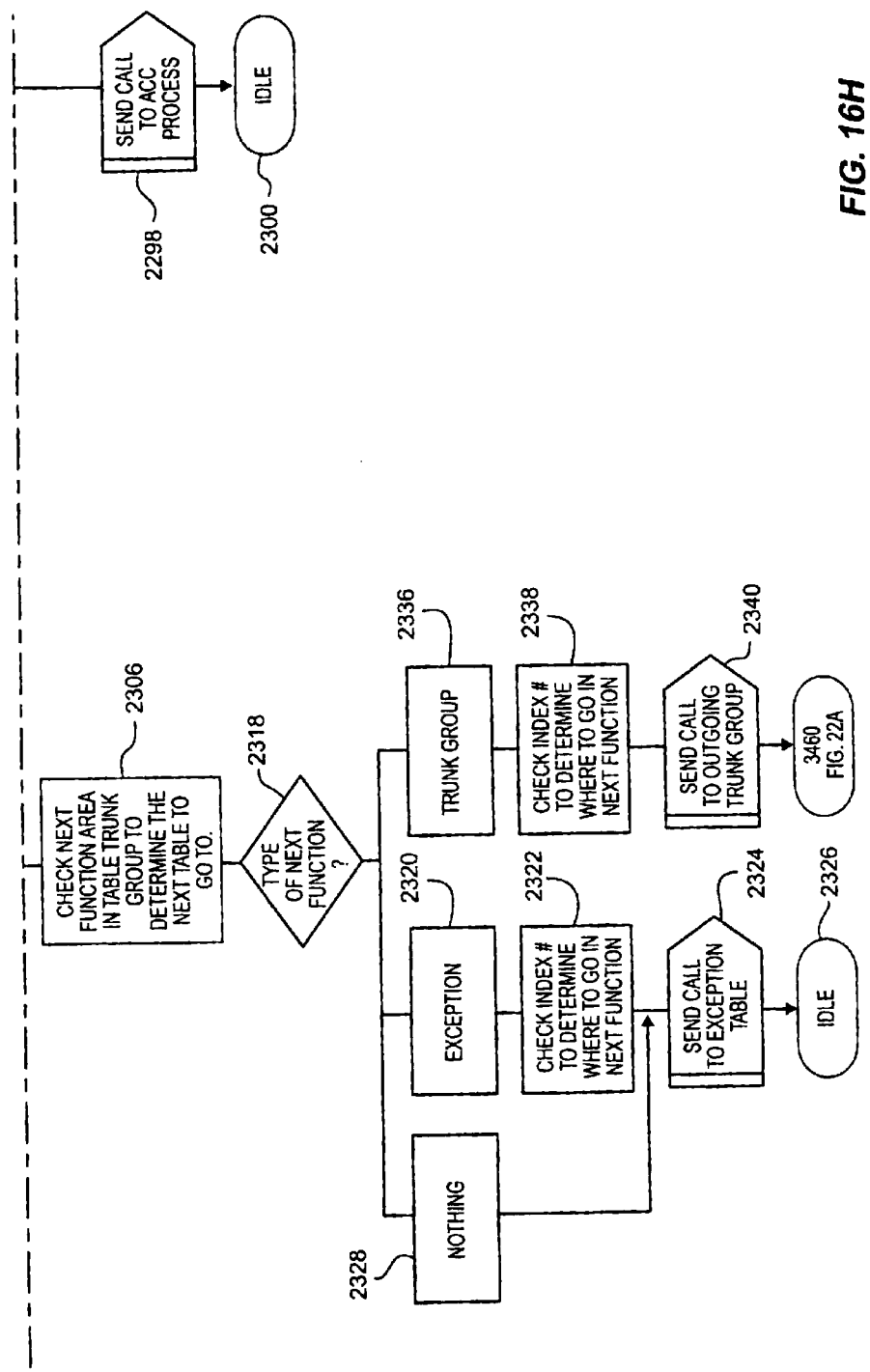
Figure 16I:
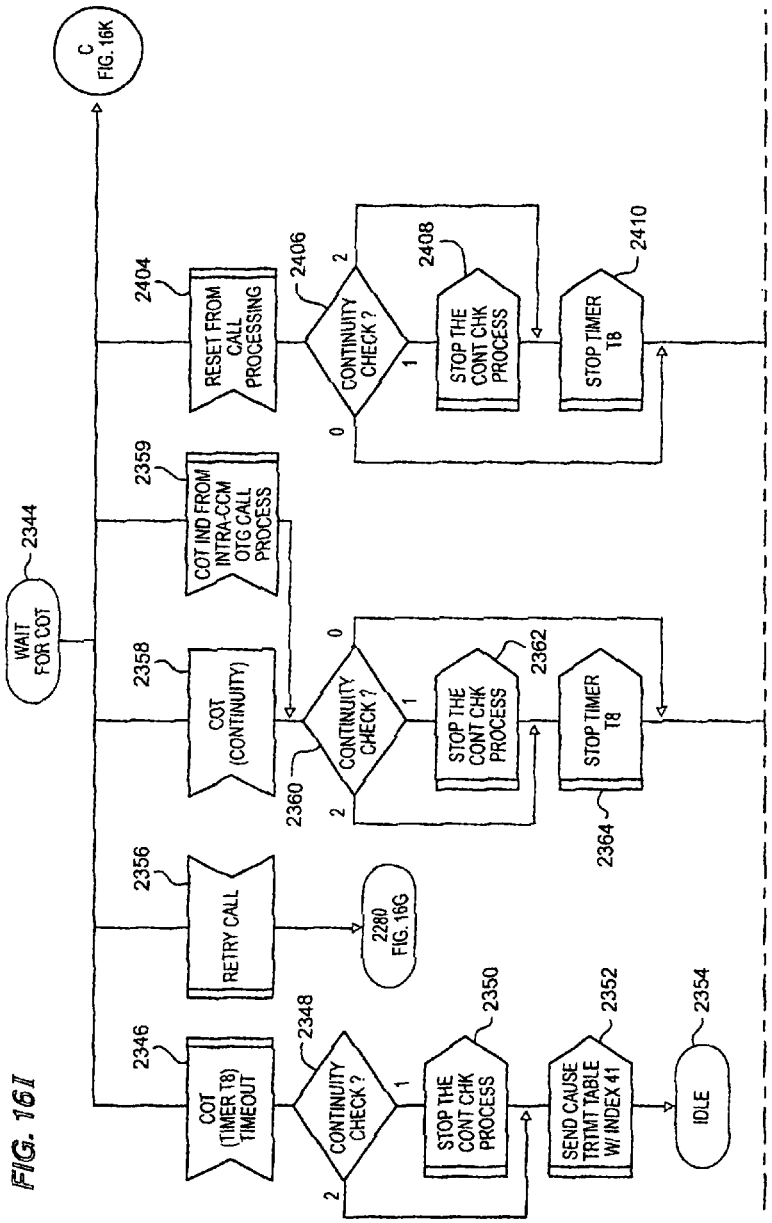
Figure 16J:
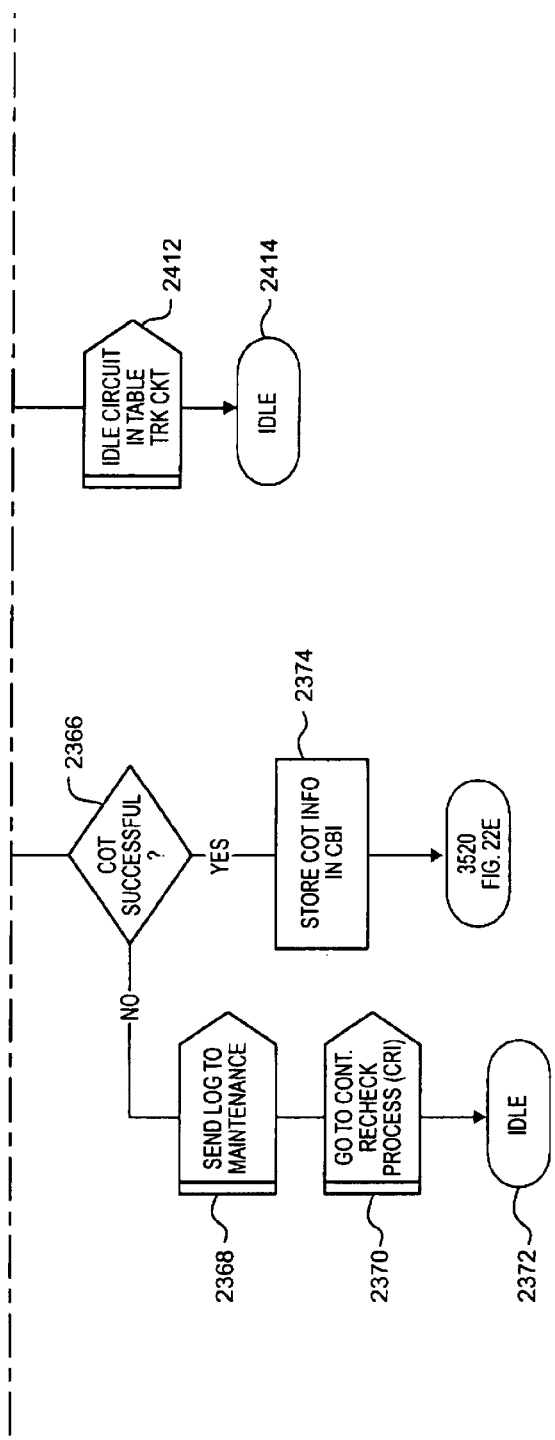
Figure 16M:
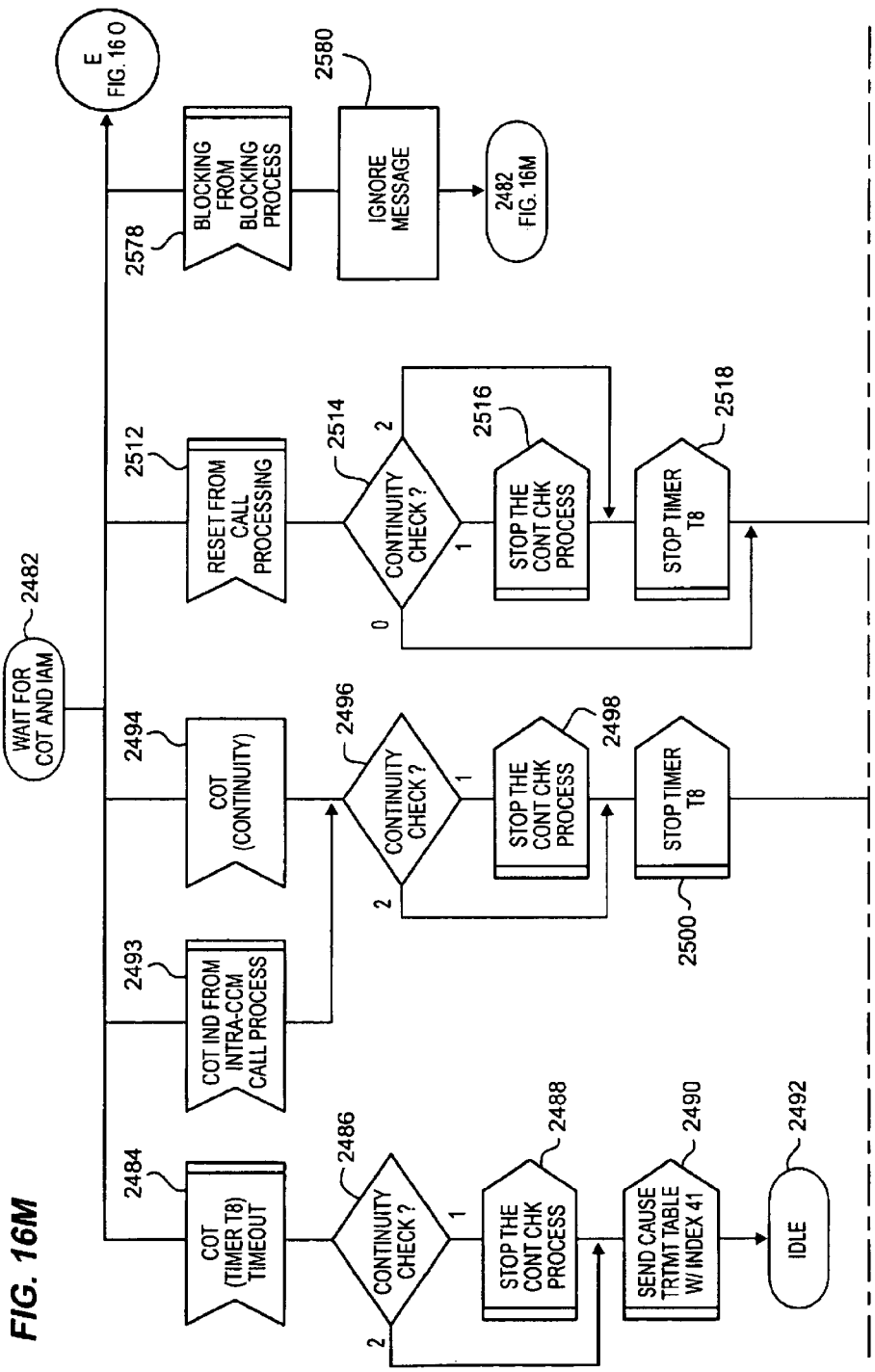
Figure 16N:
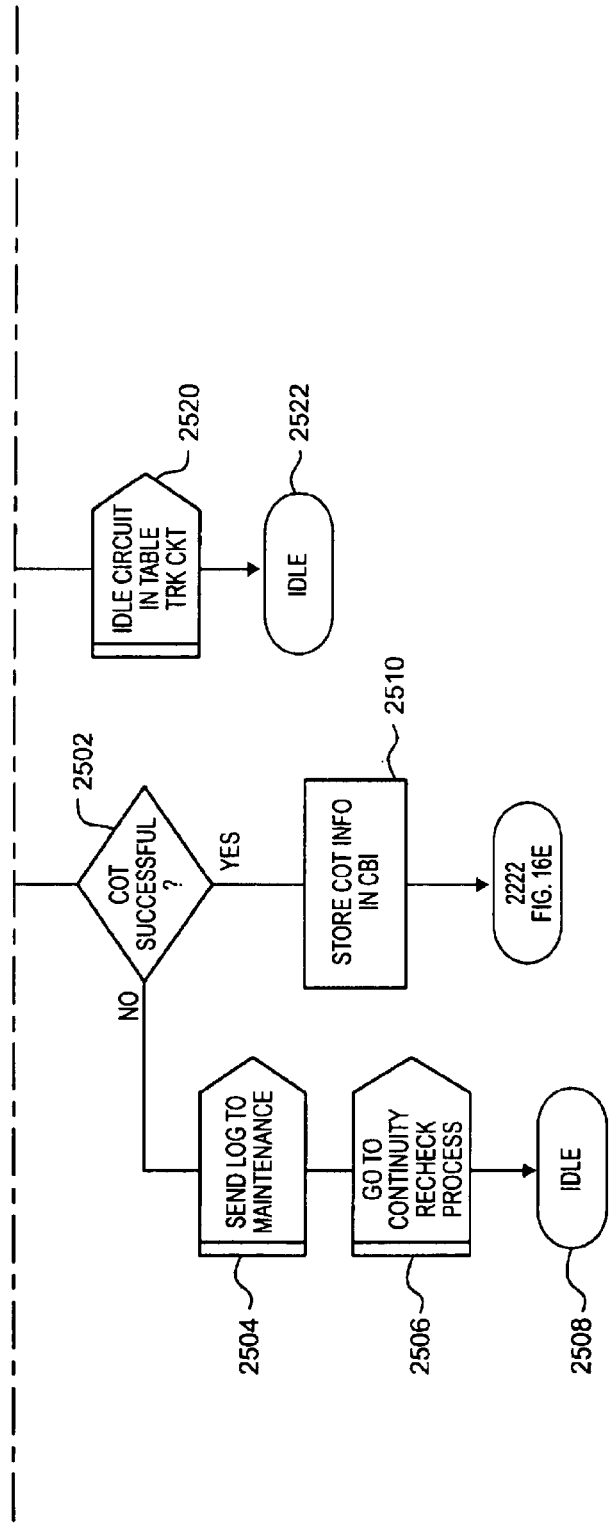
Figure 16:
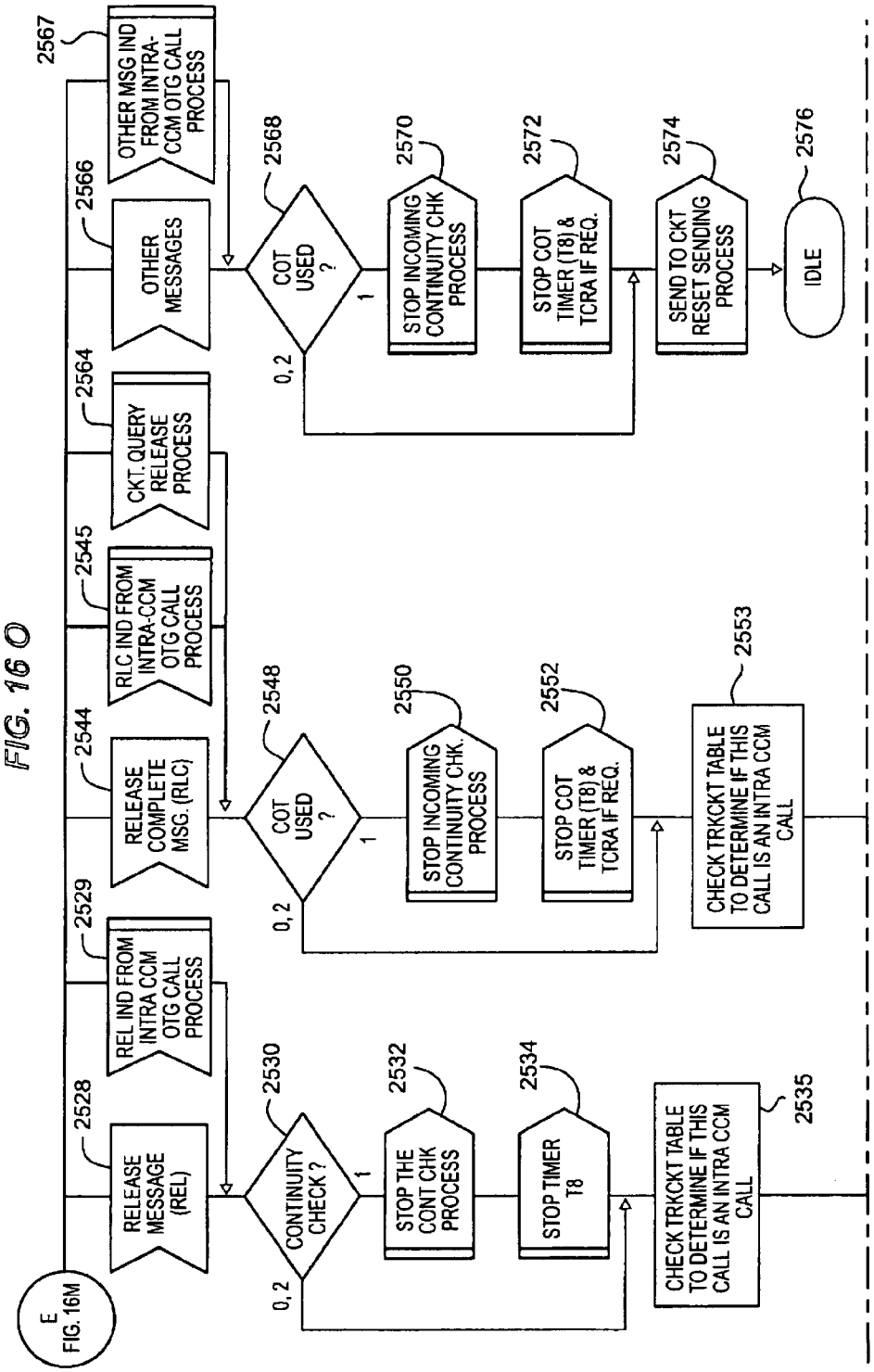
Figure 16P:
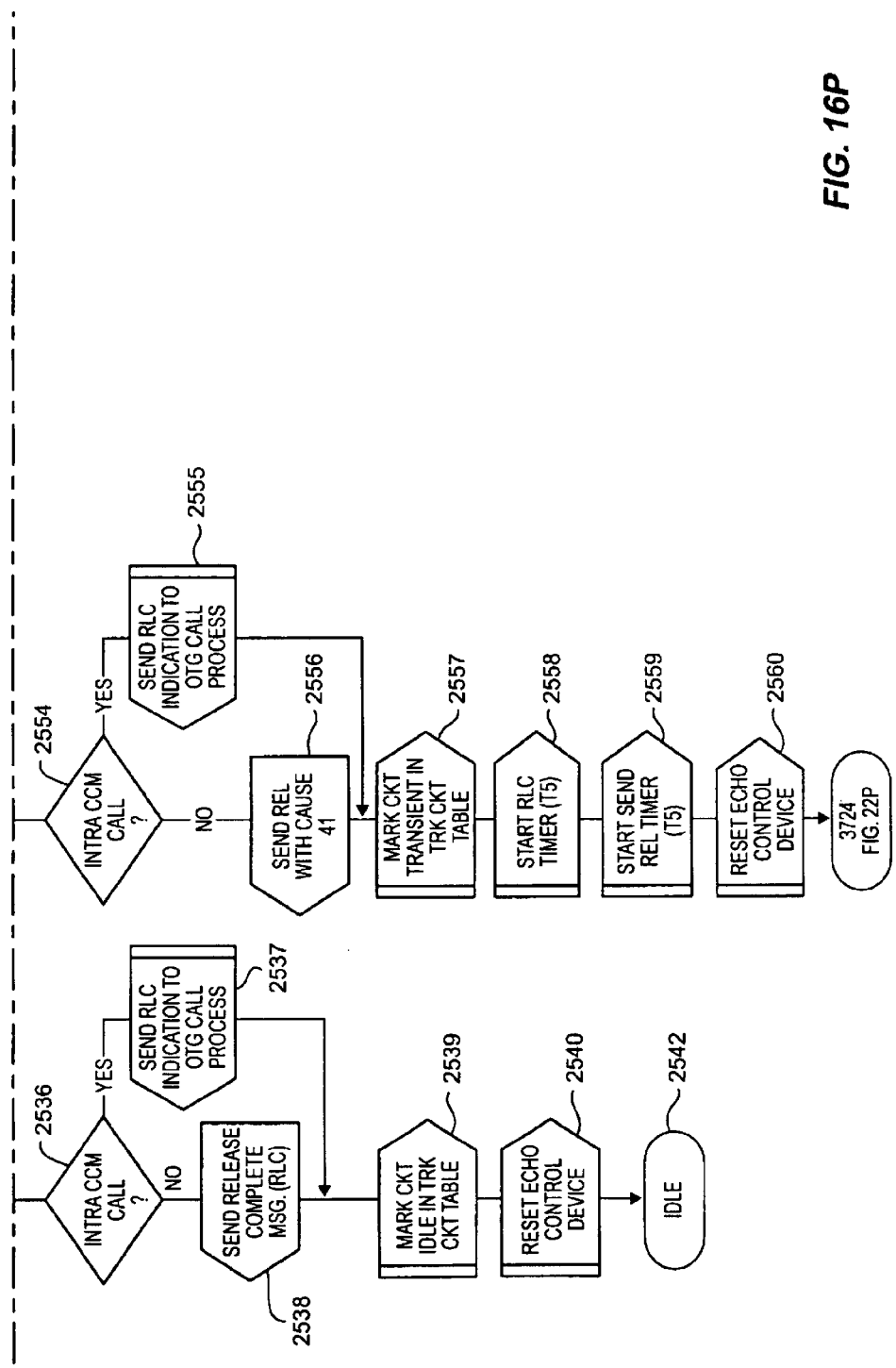

FIGS. 16A–16P entail the use of the trunk circuit and trunk group tables by the origination process. At FIGS. 16A–16B, the BCM is in the idle state at 2040. If an internal seizure request is received from the outgoing call process (OTG—the outgoing process is also referenced as terminating process) at 2041, the IAM information is read from the call buffer information location (CBI) at 2042 and processing proceeds to 2050. If the terminating (OTG) process requests seizure at 2043 or if an IAM is received at 2044, then the routing label of the IAM is checked at 2046. The IAM is opened at 2048, and information is retrieved for the CIC at 2050.

The circuit status for the CIC is checked at 2052 and 2054. If the status is busy at 2056, then maintenance is informed at 2058, a cause with index 41 is sent to the treatment table at 2060, and idle is attained at 2062. If the status is unequipped at 2064, then maintenance is informed at 2066, a cause with index 41 is sent to the treatment table at 2068, and idle is attained at 2070. If the status is blocked at 2072, the condition is checked at 2074.

If a remote block is found at 2076, then a called/calling party test call is checked for at 2078. If it is not a test call at 2080, then block status is removed at 2082 and the process proceeds to 2098. If a local block is found at 2076, then a called/calling party test call is checked at 2084. If it is not a test call at 2086, then a blocking process is invoked at 2088, and idle is attained at 2090. If a test call is found at either 2080 or 2086, then the call is marked as a test call at 2092. The circuit is marked as transient at 2094, and processing proceeds at 2272.

After 2082, or if an idle status is found at 2096, then the circuit status is marked as transient at 2098. If the status is transient at 2100, then glare resolution is invoked at 2102, and a resolution is obtained at 2104. Glare control for the incoming (inc) call is determined at 2106 and 2108. If the call processor has control, then the circuit is marked as transient at 2098. If the origination process does not have control, then the IAM is ignored at 2110, and idle is attained at 2112. If the received message is an internal RLC 2113 or an external RLC at 2114, the message is ignored at 2116 and idle is attained at 2118.

If a CRM is received at 2120 (FIGS. 16C–D), then the routing label is checked at 2122 and message information is recorded to the CBI at 2124. The CIC is checked in the trunk circuit table at 2126, and the status of the CIC is checked at 2128 and 2130. If the status is busy at 2132, then maintenance is informed at 2134, a cause with index 41 is sent to the treatment table at 2136, and idle is attained at 2138. If the status is unequipped at 2140, then maintenance is informed at 2142, a cause with index 47 is sent to the treatment table at 2144, and idle is attained at 2148.

If the status is blocked at 2150, the condition is checked at 2152. If a remote block is found at 2154, then the blocking status is removed at 2162 and processing proceeds to 2192. If a local block is found at 2154, then a blocking process is invoked at 2156, the circuit is marked as transient at 2158, and idle is attained at 2160. If the status is transient at 2176, then glare resolution is invoked at 2178, and a resolution is obtained at 2180.

Glare control for the call is determined at 2182 and 2184. If the call processor does not have control, then the IAM is ignored at 2186, and idle is attained at 2188. If the origination process does have control at 2184, processing proceeds to 2192. After 2162, 2184, or if an idle status is found at 2190, the circuit is marked as transient at 2192. At 2194, the timer TCRA is started, and a CRA is sent out at 2196.

At 2198, the nature of the connection indicator is checked for COT requirements. If a COT is required (1) at 2200, then the COT process is invoked at 2204, the COT timer is started at 2206, and the process proceeds to 2482. If an internal REL is received at 2209 or if an external REL is received at 2210, the trunk circuit table is checked to determine if the call is an intra-call processor call at 2211 and 2212. If it is an intra-call processor call at 2212, an internal RLC is sent at 2213. If it is not an intra-call processor call at 2212, an external RLC is sent at 2214. Idle is attained at 2215.

If other internal messages are received at 2216 or other external messages are received at 2217, they are sent to circuit reset at 2218. Idle is attained at 2220. If a COT is not required at 2200 (0 or 2), then processing proceeds to 2222.

The wait for an IAM begins at 2222 (FIGS. 16E–16F). If an external IAM is received at 2223 or if an internal IAM is received at 2224, the IAM timer TCRA is stopped at 2225, and the continuity check is set to 0 at 2226. The process proceeds to 2272. If a reset is received at 2227 (from circuit reset, circuit group reset, circuit query send, or circuit group block send), then the circuit is marked as idle at 2228, and idle is attained at 2229. If a reset message is received at 2230 (from circuit group block/unblock receipt), other internal messages are received at 2231, or other external messages are received at 2232, the messages are ignored at 2233, and the process proceeds to 2222.

If an internal REL is received at 2239 or if an external REL is received at 2240, then it is determined if the call is intra-call processor at 2241 and 2242. If the call is intra-call processor at 2242, then an internal RLC is sent at 2243. If the call is not intra-call processor at 2242, then an external RLC is sent at 2244, and the circuit is marked as idle at 2245. Echo control is reset at 2246, and idle is attained at 2248.

If an internal RLC is received at 2249, an external RLC is received at 2250, or a release is requested by the circuit query process at 2270, then it is determined if the call is intra-call processor at 2251 and 2252. If the call is intra-call processor at 2252, then an internal REL is sent at 2253. If the call is not intra-call processor at 2252, an external RLC is sent with cause set to normal at 2254. After 2253 or 2254, the COT is checked at 2255. If a 1 is present, the incoming continuity process is stopped at 2256, and the COT timer is stopped at 2258. If a 2 is present at 2254, the COT timer is stopped at 2258. After 2258 or if a 0 is present at 2254, the circuit is marked as transient at 2260. The RLC timer is started at 2262, and the send REL timer is started at 2264. Echo control is reset at 2266; and the process proceeds to 3724.

After 2094, 2098, or 2226, the nature of connection indicator is checked for COT requirements at 2272 (FIGS. 16G–H) and 2274. If a 1 is present, the incoming continuity process is started at 2276, and the COT timer is started at 2278. If a 2 is present, the COT-timer is started at 2278. If a 0 is present, then processing proceeds to 2280 where the LAM information is stored in the CBI. The circuit seizure time point is sent to billing at 2282. Echo control information from the USI parameter is sent to echo control at 2284.

Call attempts are counted at 2286. If attempts are 2 or more, then a cause is sent to the treatment table with an index of 41 at 2290, and idle is attained at 2292. If less than 2 attempts are made at 2288, then the trunk group is checked to see if automatic congestion control (ACC) is needed at 2294. If ACC is needed at 2296, then the call is sent to the ACC process at 2298, and idle is attained at 2300. If ACC is not required at 2296, then the next function in the trunk group table is obtained at 2306 and 2318.

If the next function is the exception table at 2320, then the index is checked at 2322, the call is sent to the exception table at 2324, and idle is attained at 2326. If there is no next function at 2328, then the call is sent to the exception table at 2324. If the next function is the trunk group table at 2336, then the index is checked at 2338, and the call is sent to the outgoing section of the trunk group table at 2340. The originating process awaits outgoing circuit selection by the terminating process at 3460.

The wait for the COT begins at 2344 (FIGS. 16I–16J). If the COT timer times out at 2346, then continuity requirements are checked at 2348. If continuity testing is required, the incoming continuity check process is stopped at 2350. Cause is sent to the treatment table with an index of 41 at 2352, and idle is attained at 2354. If continuity checking is not required at 2348, then cause is sent to the treatment table with an index of 41 at 2352, and idle is attained at 2354.

If a retry call message is received at 2356, then the process proceeds to step 2280. If an external COT is received at 2258 or if an internal COT is received at 2359, then continuity requirements are checked at 2360. If continuity testing is required, the incoming continuity check process is stopped at 2362, and the COT timer is stopped at 2364. If continuity checking is not required at 2360, then the COT timer is stopped at 2364. After 2364 or if continuity is 0 at 2360, continuity test success is checked at 2366. If no success, maintenance is informed at 2368, the continuity recheck process is invoked at 2370, and idle is attained at 2372. If the continuity test is successful at 2366, then the COT is stored in the CBI at 2374. The process proceeds to 3520.

If a reset is received at 2404, then continuity requirements are checked at 2406. If continuity testing is required, the incoming continuity check process is stopped at 2408, and the COT timer is stopped at 2410. If continuity checking is not required at 2406, then the COT timer is stopped at 2410. After 2410 or if continuity is 0 at 2406, the circuit is set at idle at 2412, and idle is attained at 2414.

If an external REL is received at 2420 (FIGS. 16K–16L) or if an internal REL is received at 2421, then requirements for continuity testing are checked at 2422. If continuity testing is required (1), then the incoming continuity check process is stopped at 2424, and the COT timer is stopped at 2426. If continuity checking is required on the previous circuit (2), the T8 timer is stopped at 2426. After 2426 or if continuity is not required at 2422 (0), then it is determined if the call is an intra-call processor call at 2427 and 2428. If it is an intra-call processor call at 2428, then an internal RLC is sent at 2429. If it is not an intra-call processor call at 2428, an external RLC is sent out at 2428. An idle indication is sent to billing at 2431, and the circuit is set to idle at 2432. Echo control is reset at 2433, and idle is attained at 2440.

If a release request is received from call processing at 2442, then a message is sent to the treatment table with cause 41 at 2444, and idle is attained at 2446. If a circuit query release is received at 2462, an external RLC is received at 2435, or an internal RLC is received at 2436, then the processing proceeds to 2444.

If other external messages are received at 2464 or other internal messages are received at 2465, then requirements for continuity testing are checked at 2466. If continuity testing is required (1) at 2466, then the incoming continuity check process is stopped at 2468, and the COT timer is stopped at 2470. If continuity checking is required on the previous circuit (2) at 2466, then the COT timer is stopped at 2470. If continuity is not required (0) at 2466, then the circuit reset process is invoked at 2472, and idle is attained at 2474. If an external information message is received at 2416, or if an internal information message is received at 2417, then the information is provided to call processing at 2418, and the wait for the COT continues at 2344 (FIG. 16I). If a blocking message is received at 2476, then the message is ignored at 2478, and the process proceeds to 2344 (FIG. 16I).

The wait for the COT and the IAM begins at 2482 (FIGS. 16M–16N). If the COT timer times out at 2484, then continuity requirements are checked at 2486. If continuity testing is required (1) at 2486, then the incoming continuity check process is stopped at 2488. Cause is sent to the treatment table with an index of 41 at 2490, and idle is attained at 2492. If continuity checking is not required (2) at 2486, then cause is sent to the treatment table with an index of 41 at 2490, and idle is attained at 2492.

If an internal COT is received at 2493 or if an external COT is received at 2494, then continuity requirements are checked at 2496. If continuity testing is required, the incoming continuity check process is stopped at 2498, and the COT timer is stopped at 2500. If continuity checking is not required at 2496, then the COT timer is stopped at 2500. At 2502, continuity test success is checked. If the COT test is not successful at 2502, then maintenance is informed at 2504, the continuity recheck process is invoked at 2506, and idle is attained at 2508. If the continuity test is successful at 2502, then the COT is stored in the CBI at 2510, and processing proceeds to 2222.

If a reset is received at 2512, then continuity requirements are checked at 2514. If continuity testing is required, the incoming continuity check process is stopped at 2516, and the COT timer is stopped at 2518. If continuity checking is required on the previous circuit (2) at 14, then the COT timer is stopped at 2518. If continuity checking is not required (0) at 2514, then the circuit is set to idle at 2520, and idle is attained at 2522. If a blocking message is received at 2578, then the message is ignored at 2580, and the process proceeds to 2482.

If an external REL is received at 2528 (FIGS. 16O–16P) or if an internal REL is received at 2529, then requirements for continuity testing are checked at 2530. If continuity testing is required (1), then the incoming continuity check process is stopped at 2532, and the COT timer is stopped at 2534. If continuity checking is required on the previous circuit (2), or if continuity is not required (0), then it is determined if the call is an intra-call processor call at 2535 and 2536. If is an intra-call processor call at 2536, then an internal RLC is sent at 2537. If it is not an intra-call processor call at 2536, an external RLC is sent out at 2538. After 2537 or 2538, the circuit is set to idle at 2539. Echo control is reset at 2540, and idle is attained at 2542.

Figure 22A:
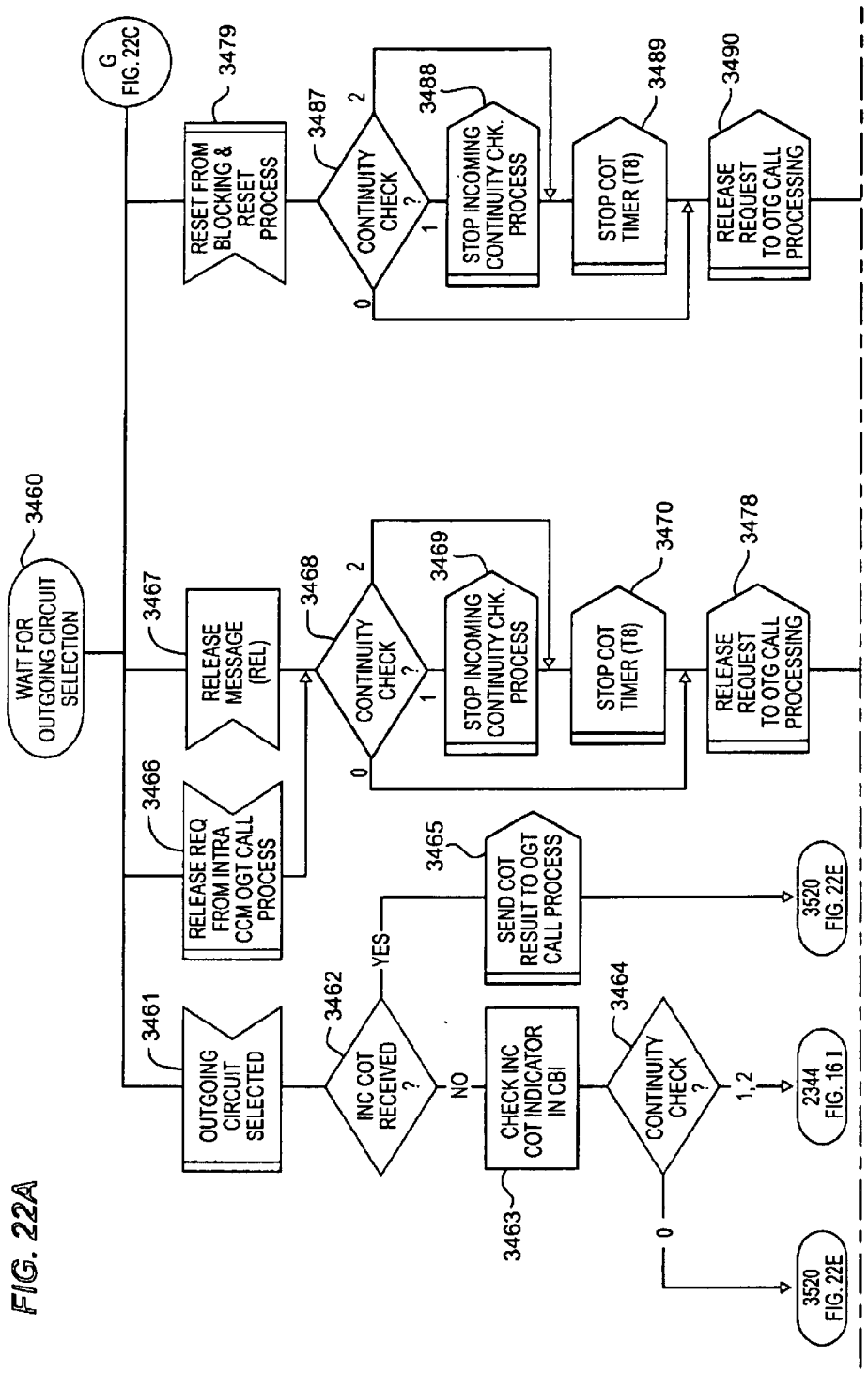
FIGS. 22A–22Q are SDL diagrams of logic used in a version of the invention for a call completion processing for the initiating end process.
Figure 22B:
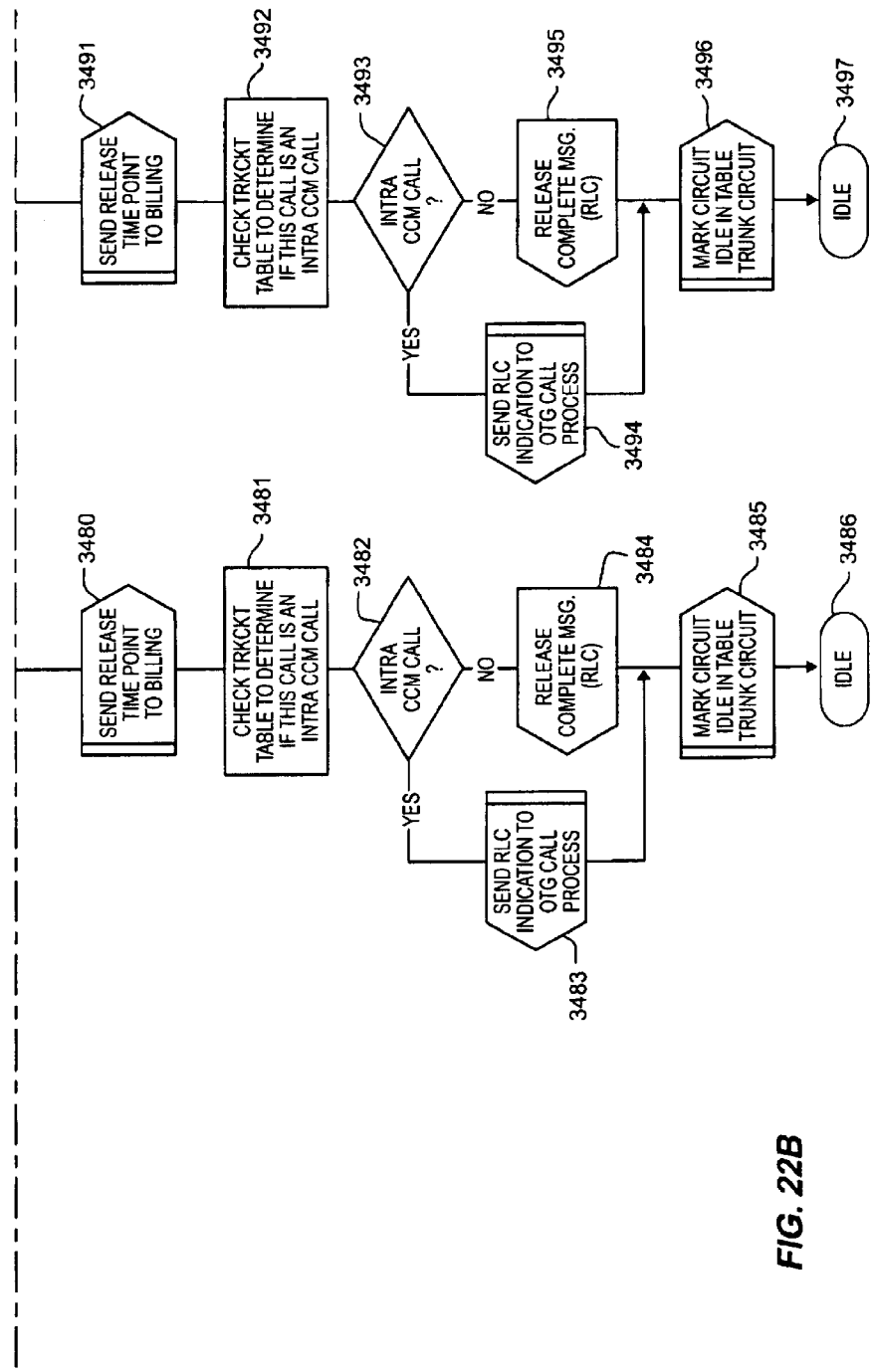
Figure 22C:
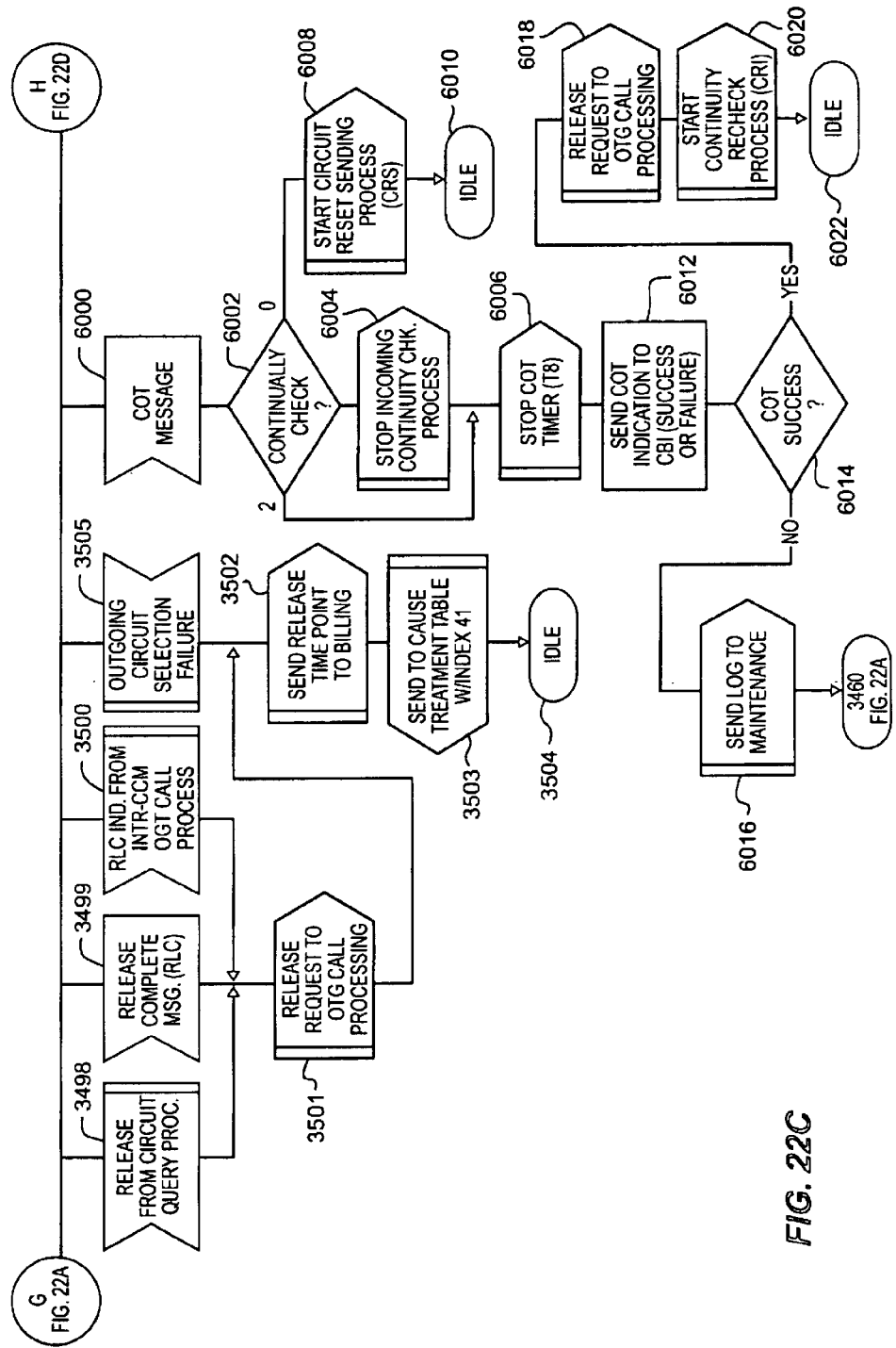
Figure 22D:
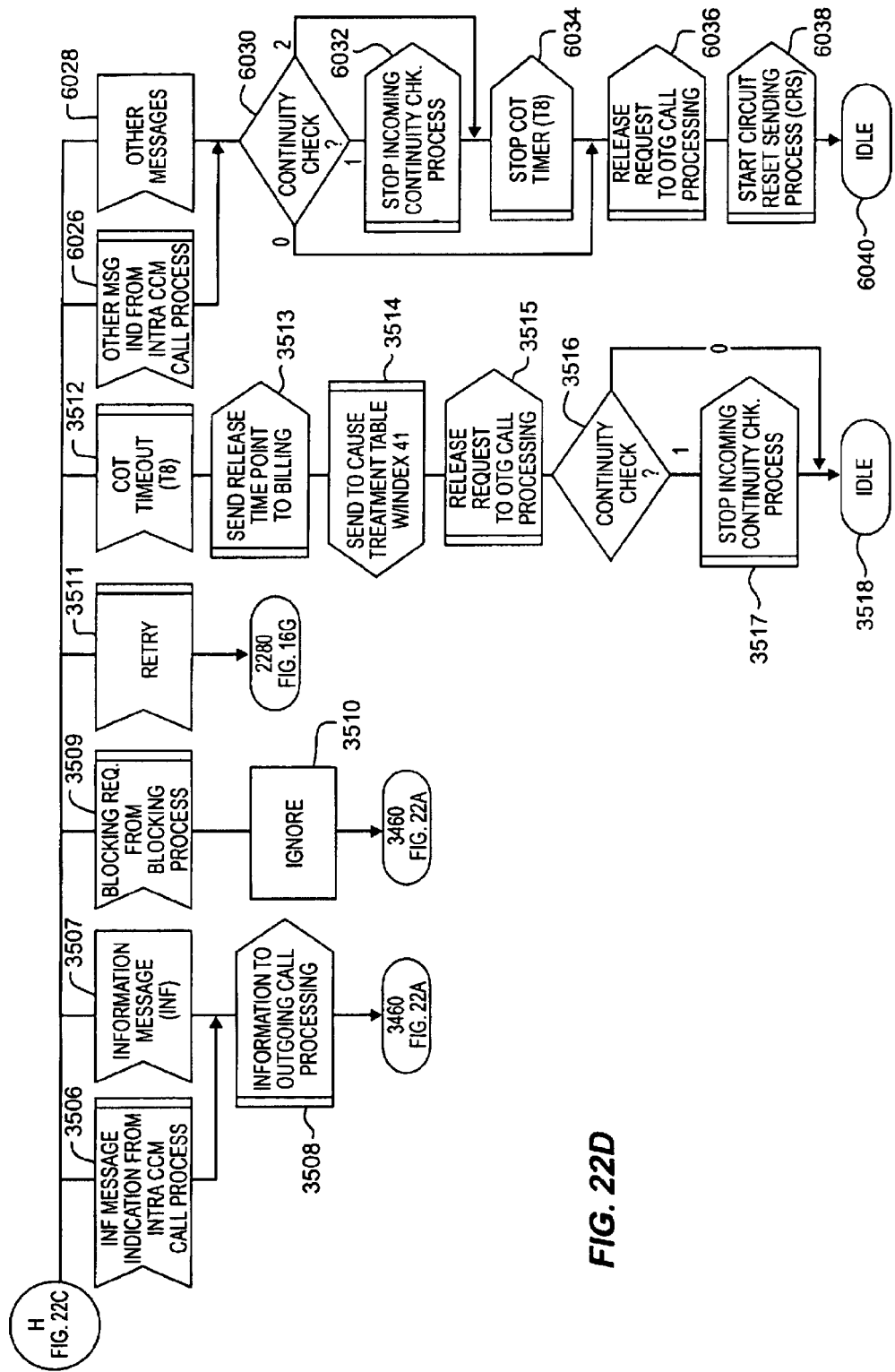
Figure 22F:
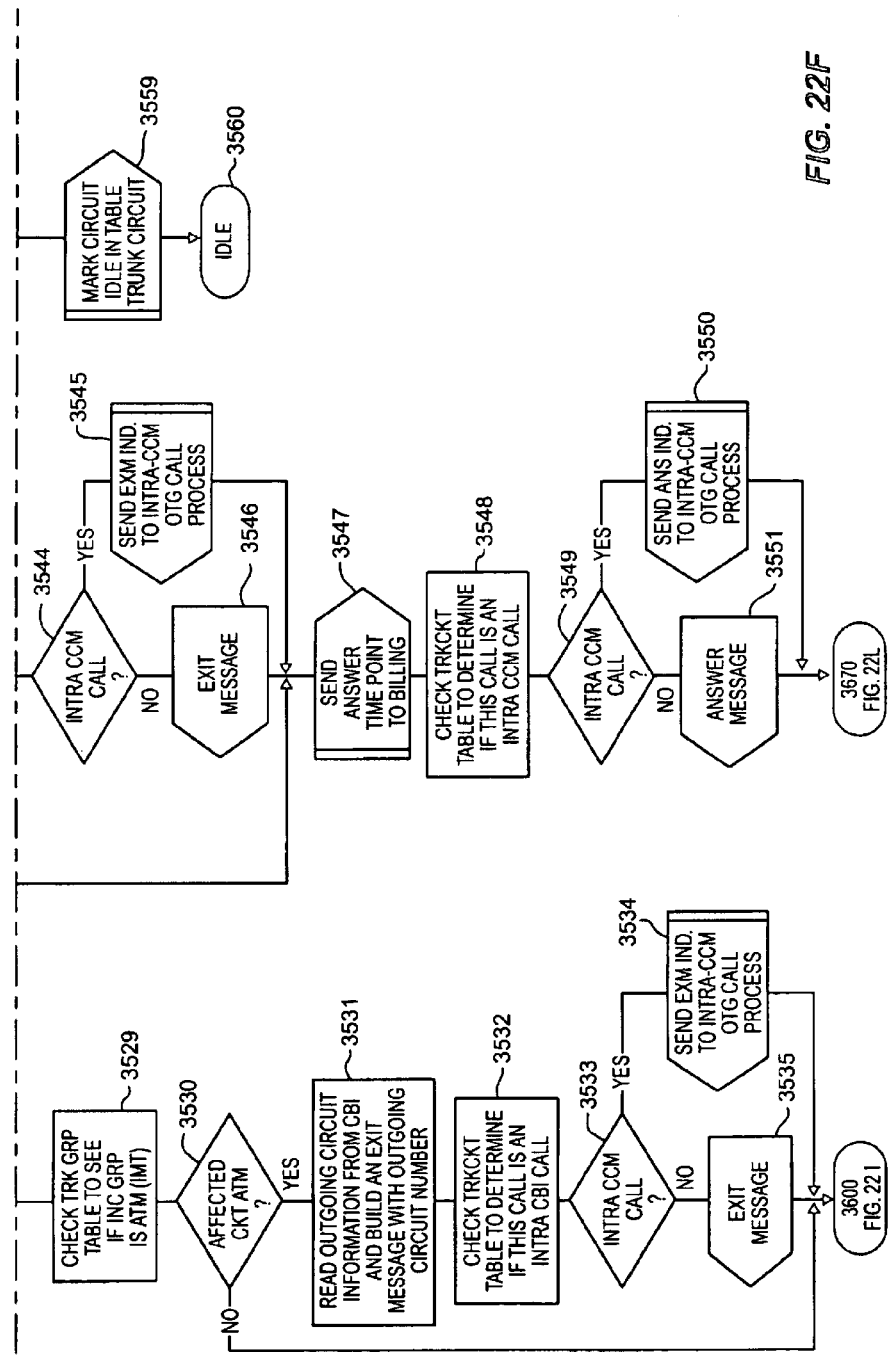
Figure 22G:
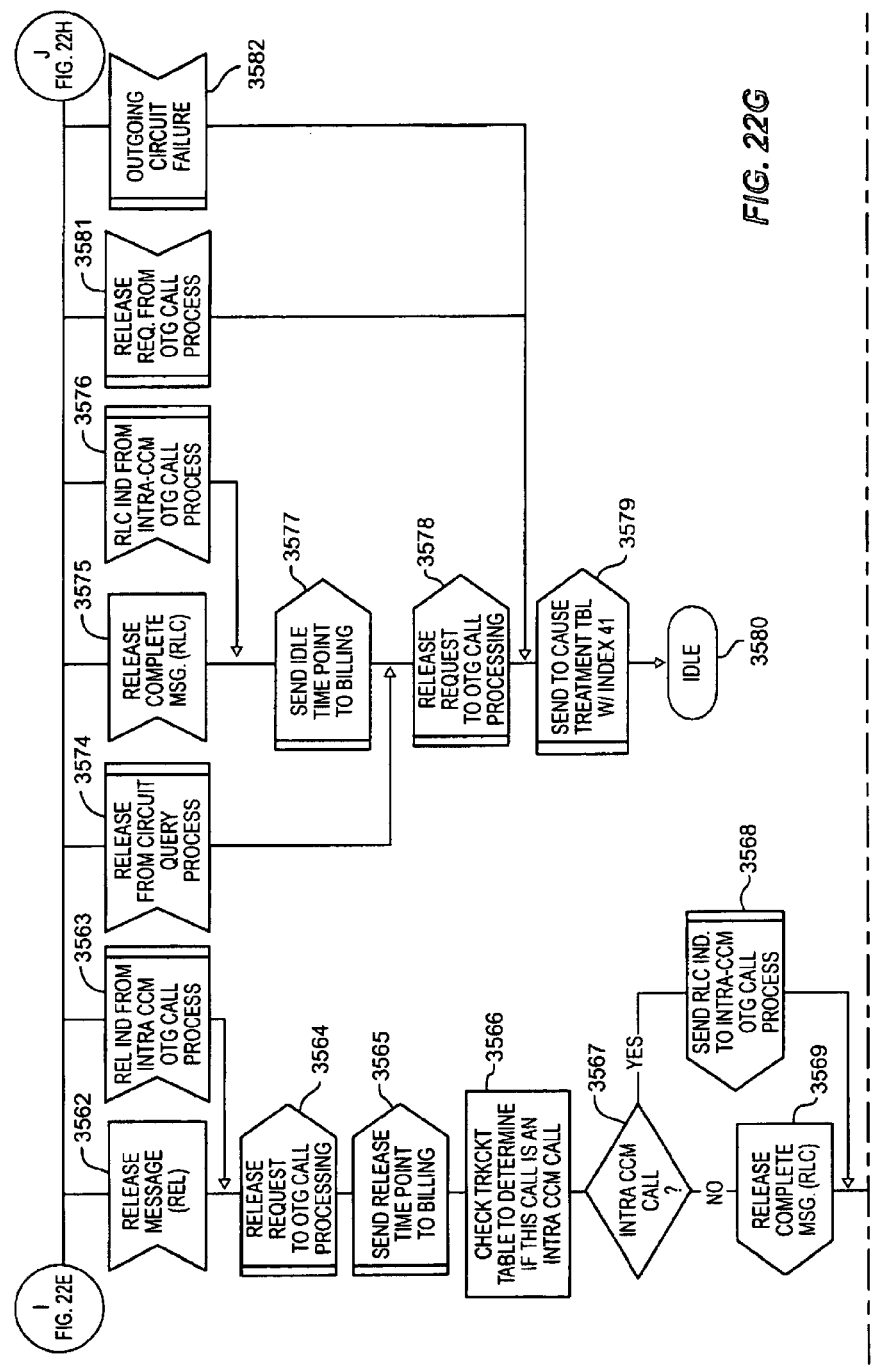
Figure 22H:
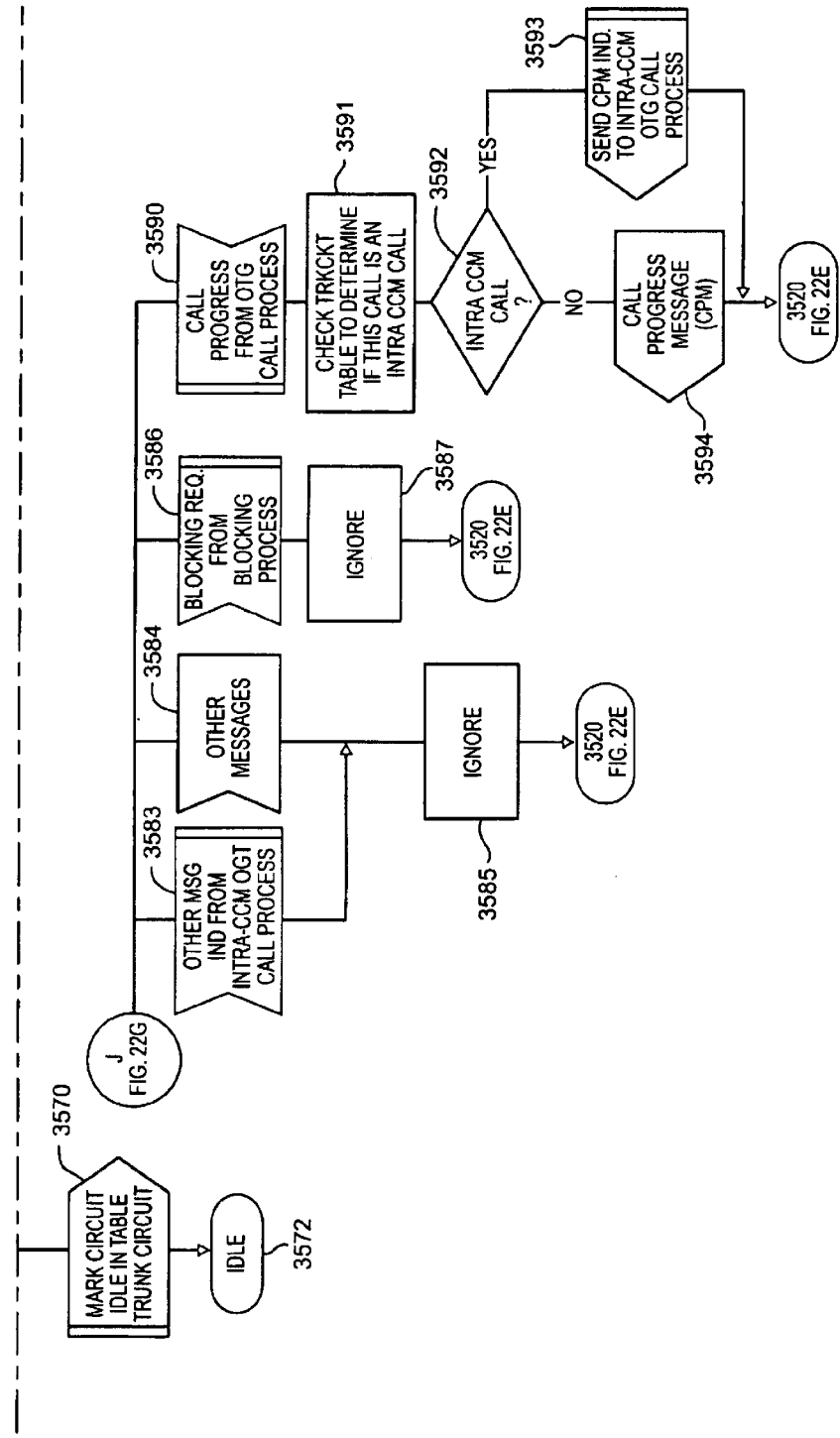
Figure 22:
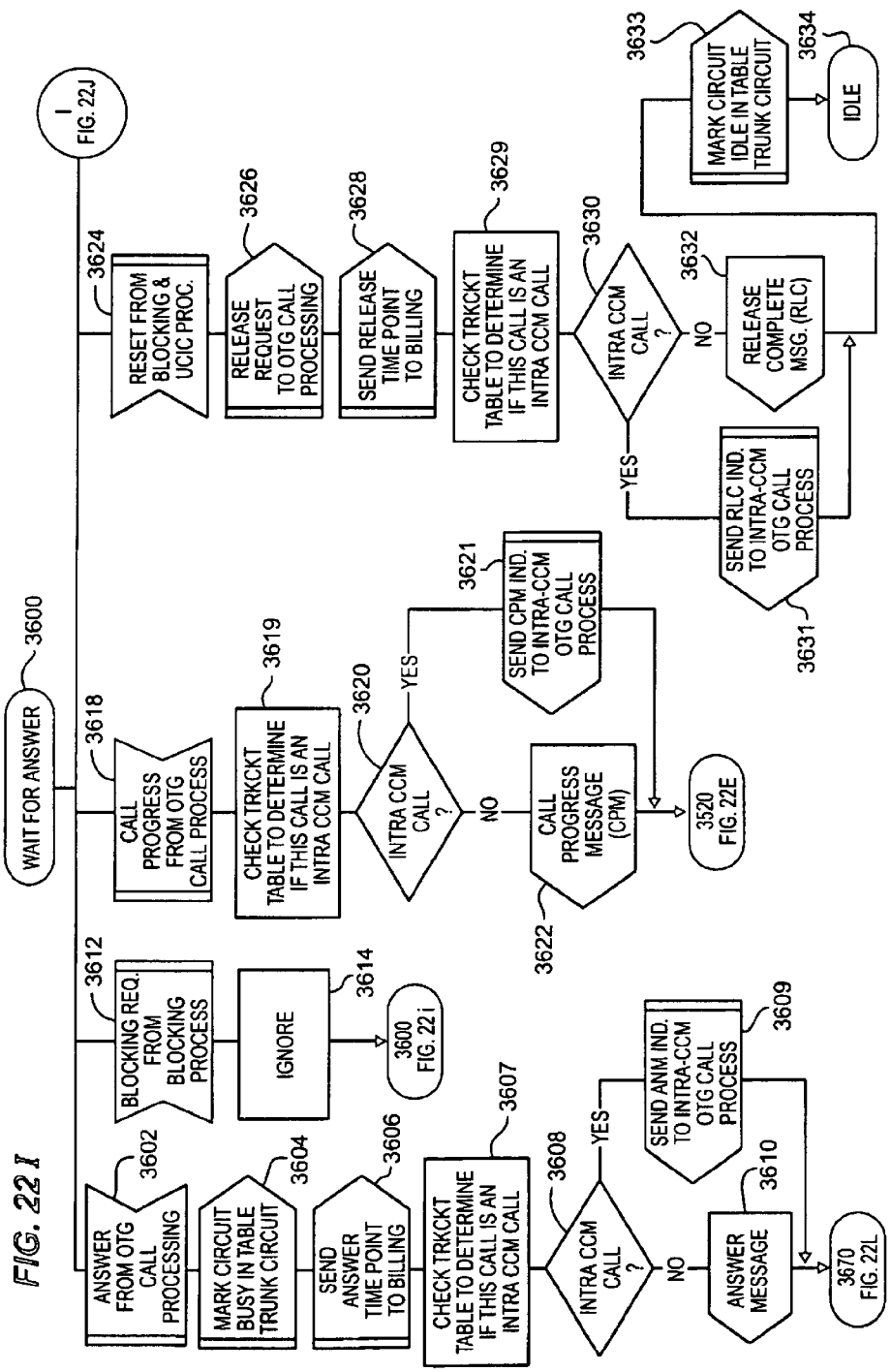
Figure 22K:
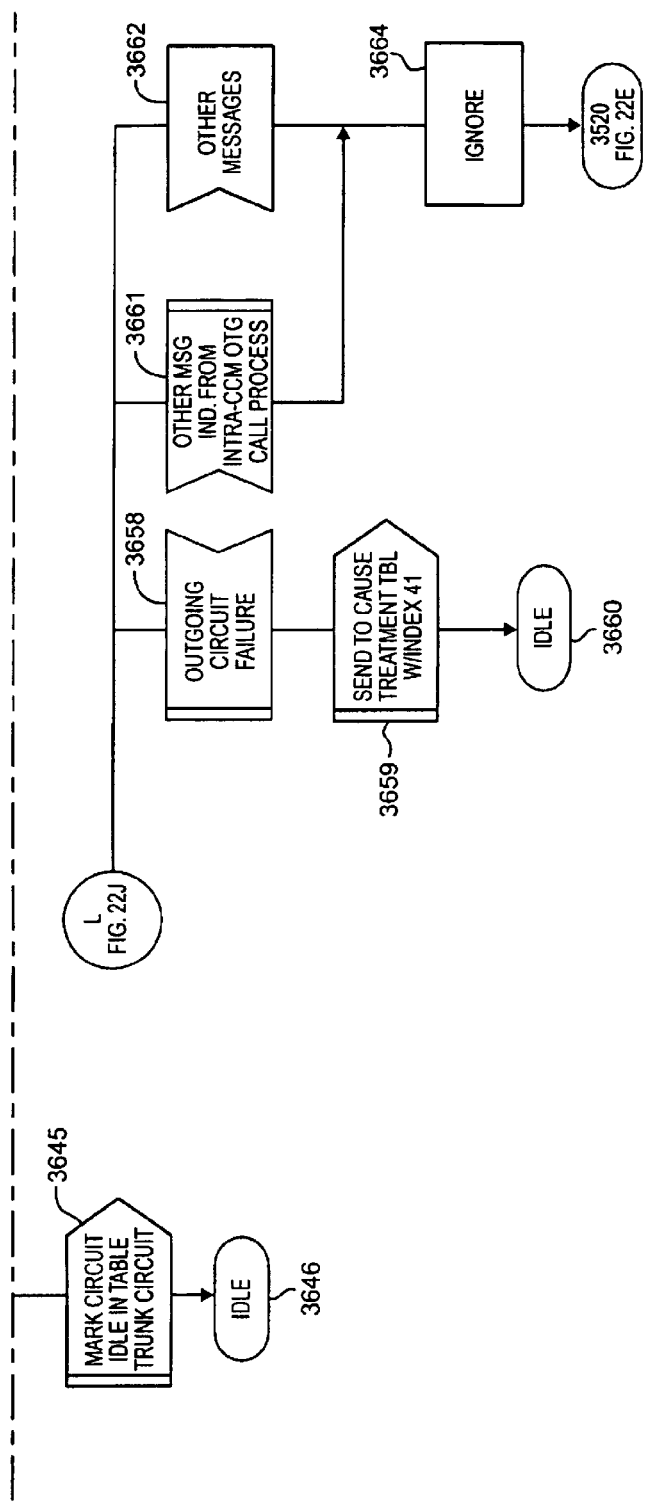
Figure 22L:
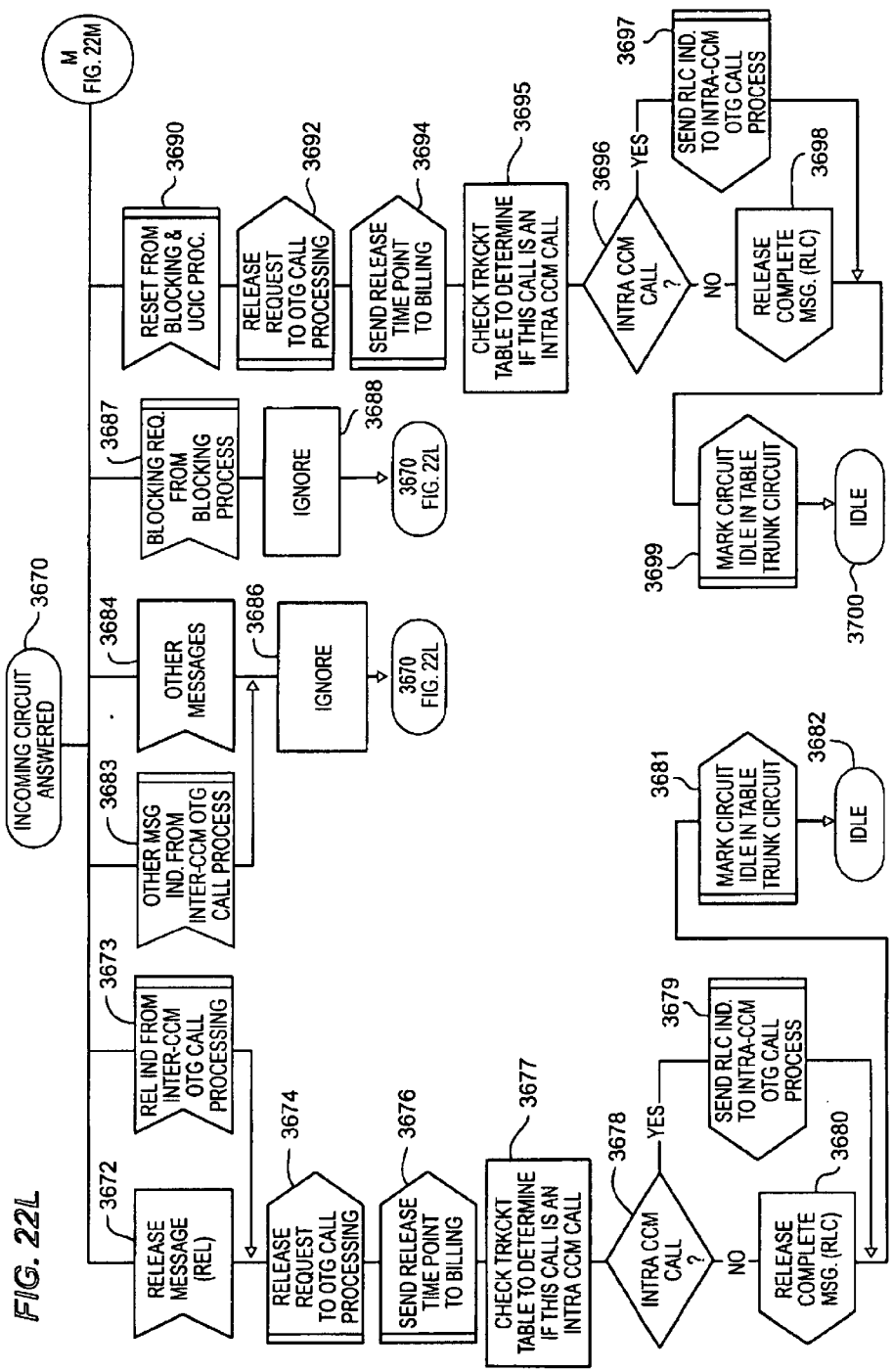
Figure 22M:
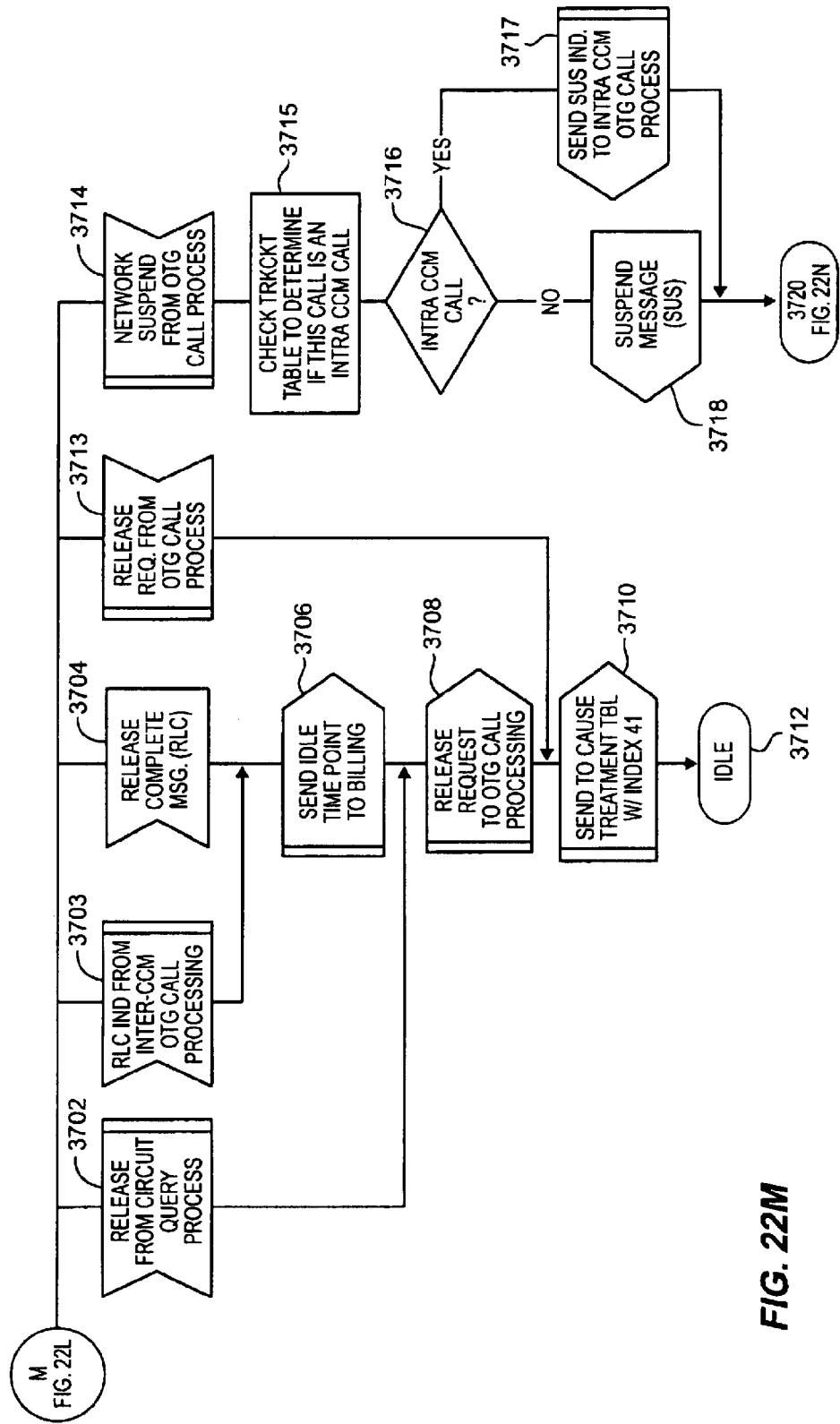
Figure 22N:
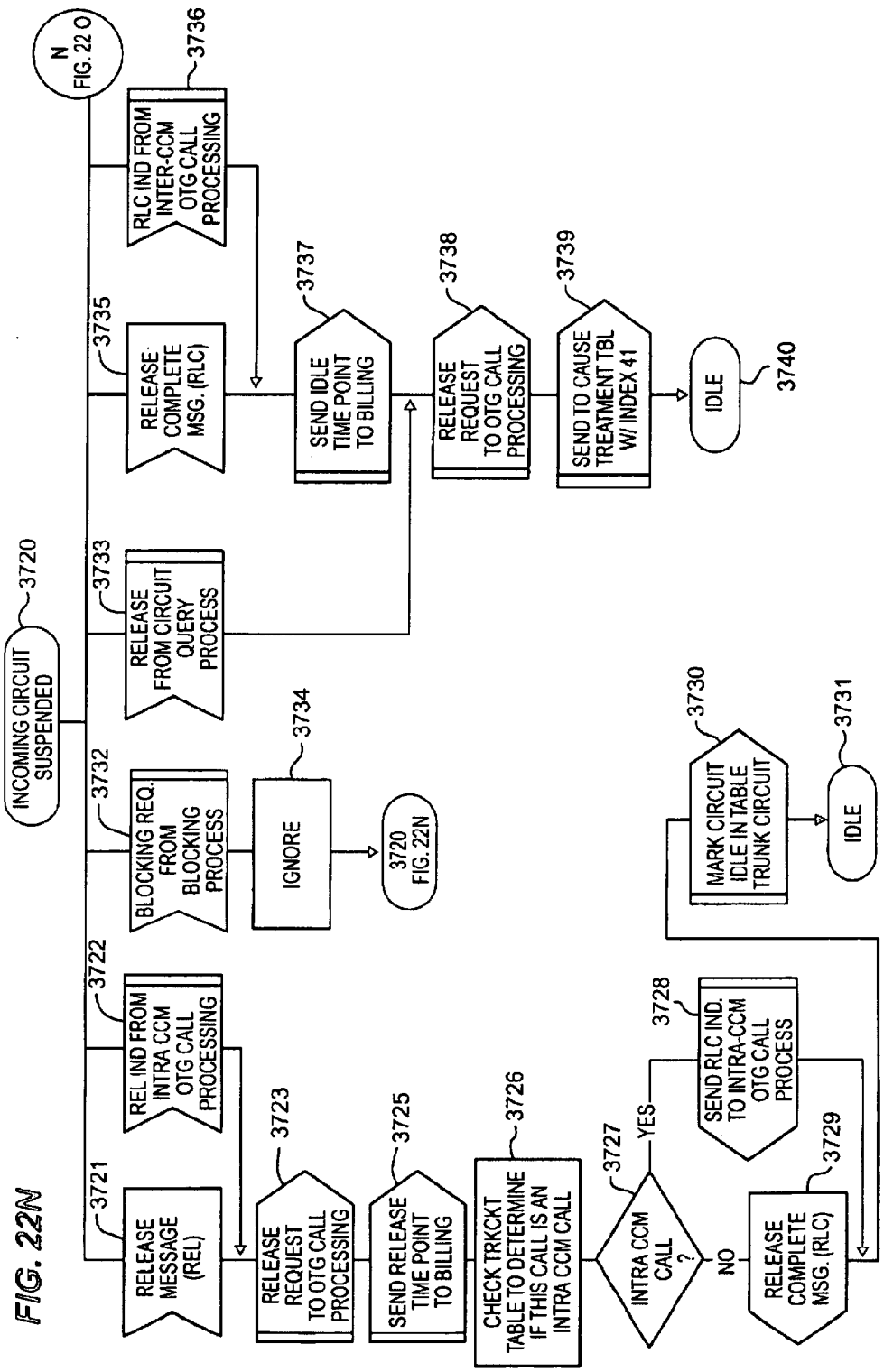
Figure 22:
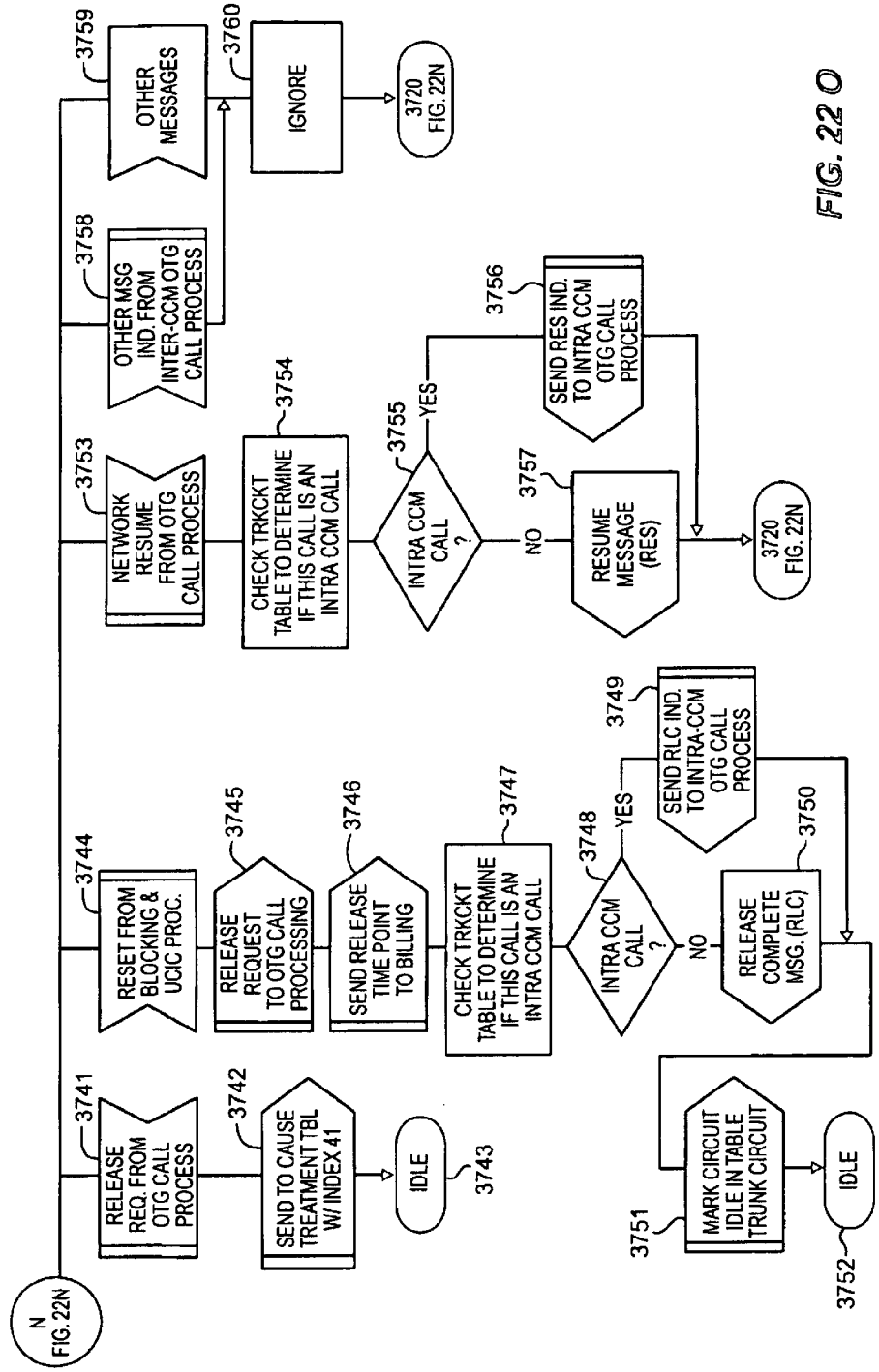
Figure 22P:
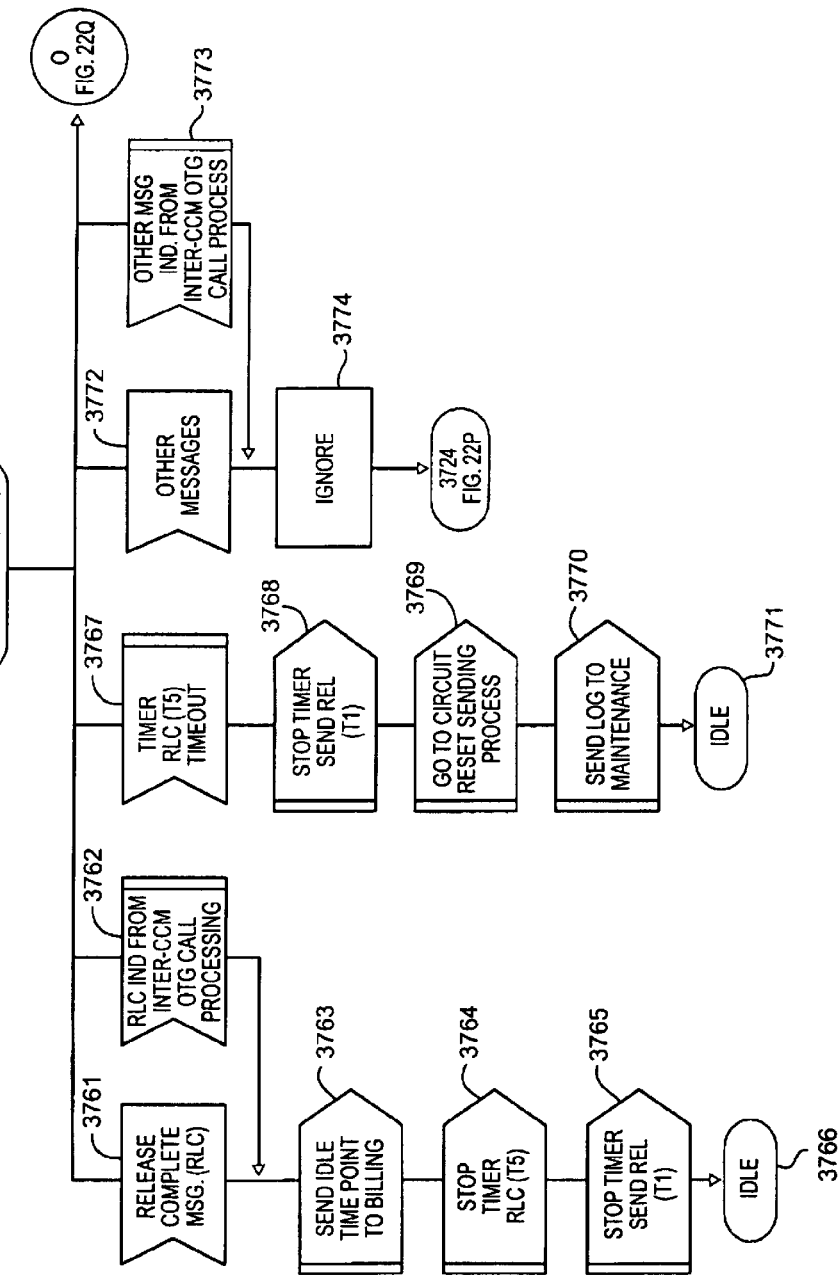

If an external RLC is received at 2544 or if an internal RLC is received at 2545, then requirements for continuity testing are checked at 2548. If continuity testing is required (1), the incoming continuity check process is stopped at 2550, and the COT timer is stopped at 2552. If continuity checking is required on the previous circuit (2) or if continuity is not required (0), then it is determined if the call is an intra-call processor call at 2553 and 2554. If the call is an intra-call processor call at 2554, then an internal RLC is sent at 2555. If the call is not an intra-call processor call at 2554, then an external RLC with cause 41 is sent out at 2556. After 2555 or 2556, the circuit is marked transient at 2557. At 2558, the RLC timer is started, and at 2559 the send REL timer is started. Echo control is reset at 2560, and the originating process awaits an RLC at 3724 (FIG. 22P).

If a circuit query release is received at 2564, the processing proceeds to 2548. If other external messages are received at 2566 or if other internal messages are sent at 2567, then requirements for continuity testing are checked at 2568. If continuity testing is required (1), the incoming continuity check process is stopped at 2570, and the COT timer is stopped at 2572. If continuity checking is required on the previous circuit (2) or if continuity is not required (0), then the circuit reset process is invoked at 2574, and idle is attained at 2576.

Exception Table Processing

Figure 17A:
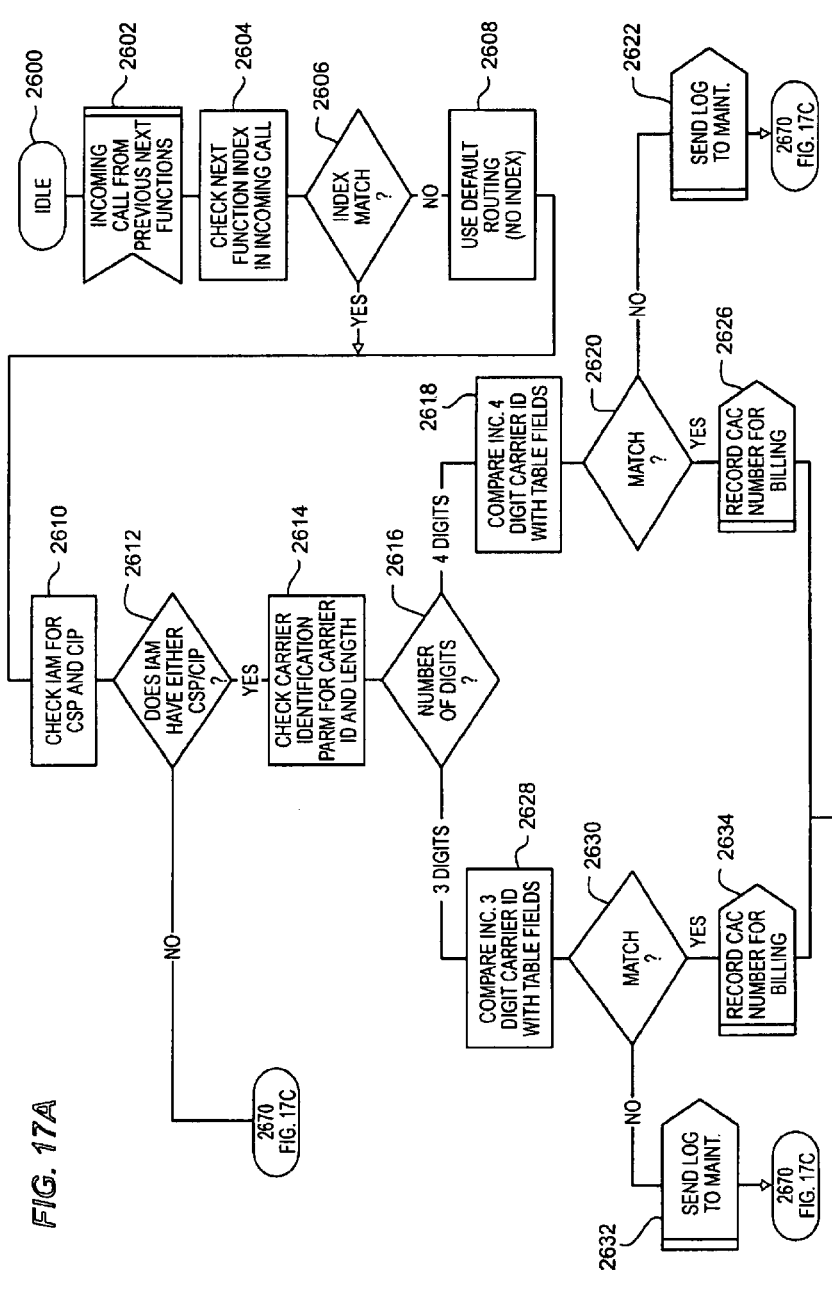
Figure 17C:
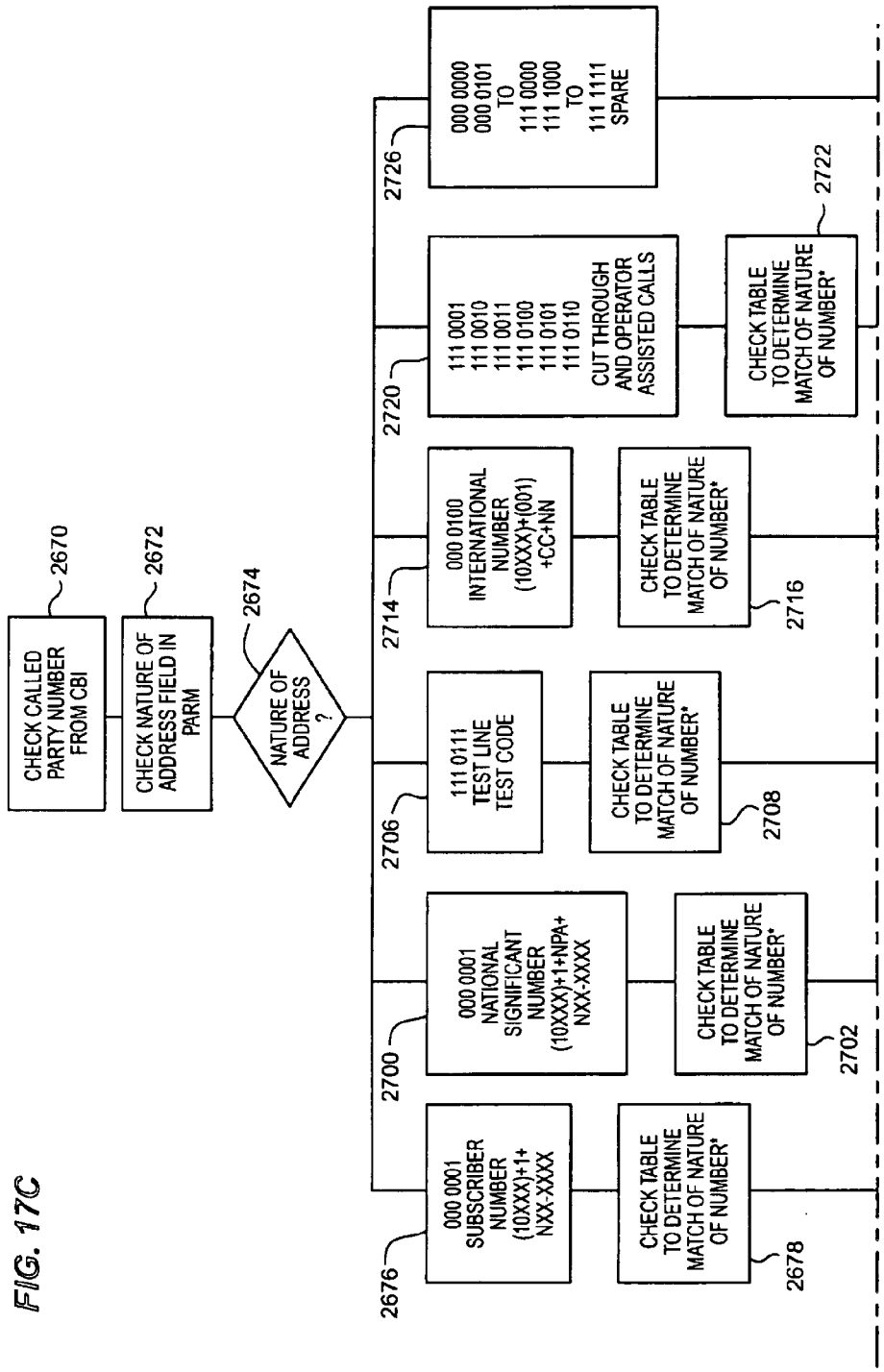

FIGS. 17A–17E entail the use of the exception table. On FIG. 17A at 2600, use of the exception table is idle. At 2602, the BCM can access the exception table based on the next function of another table. At 2604, the index from the previous table is matched to the indexes of the exception table. If no match is found, default routing is used at 2608. If an index is found, the LAM is checked for the carrier selection parameter (CSP) and the carrier identification parameter (CIP) at 2610 and 2612. If no CSP or CIP is found, then processing proceeds to 2670 (FIG. 17C). If a CSP or CIP is found at 2612, the CIP is checked for carrier identification and length at 2614 and 2616.

If the length is four digits at 2616" then the carrier identification is compared to other four digit carrier codes at 2618. If a match is not found at 2620, then maintenance is informed at 2622, and processing proceeds to 2670 (FIG. 17C). If a match is found at 2620, then the CAC is recorded for billing at 2626, and processing proceeds to 2636.

If the number of digits at 2616 is three, then the carrier identification is compared to other three digit carrier codes at 2628. If a match is not found at 2630, then maintenance is informed at 2632, and processing proceeds to 2670. If a match is found at 2630, then the CAC is recorded for billing at 2632, and the exception table field line is checked for further information at 2636.

Figure 17D:
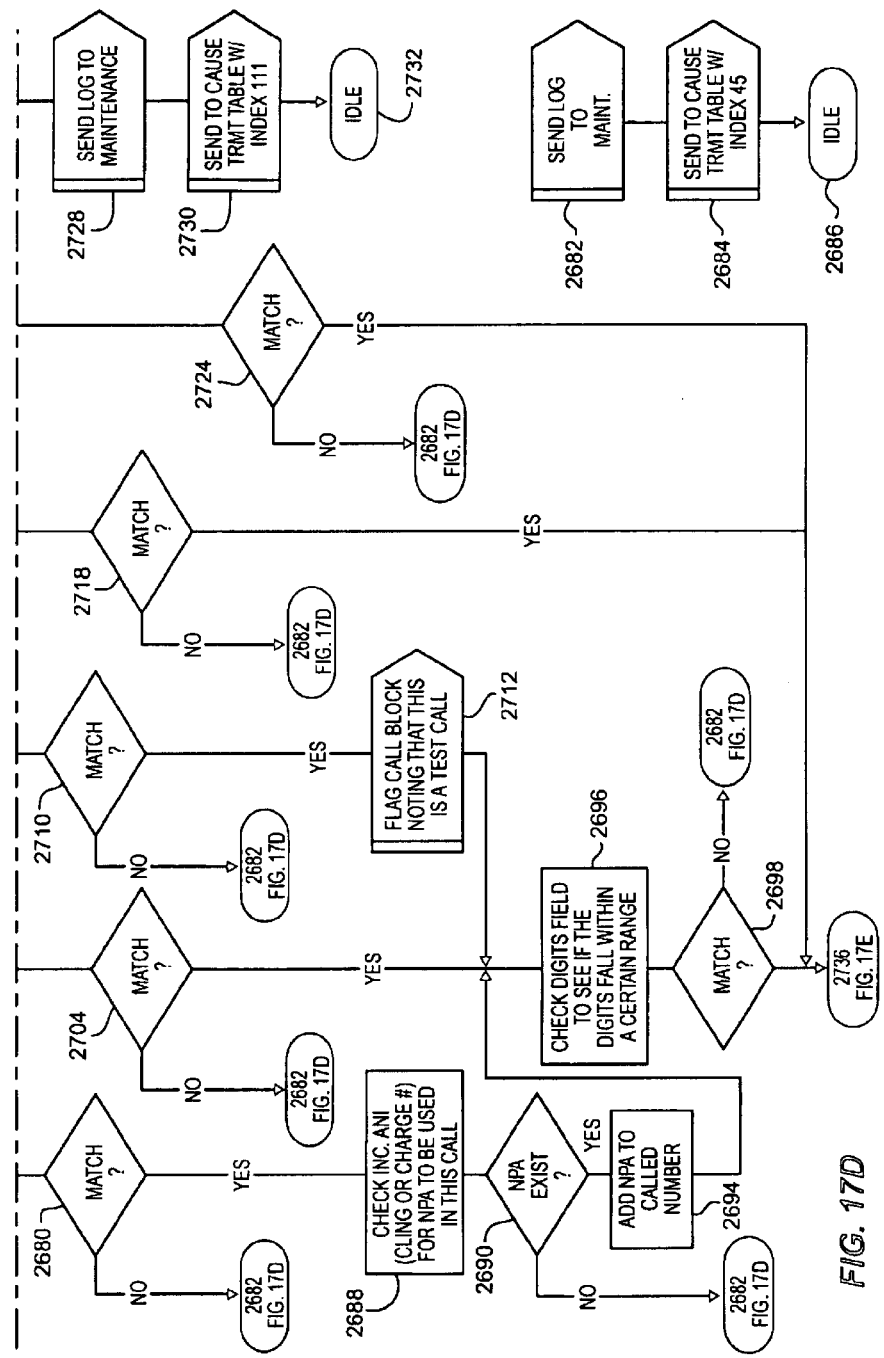
Figure 17E:
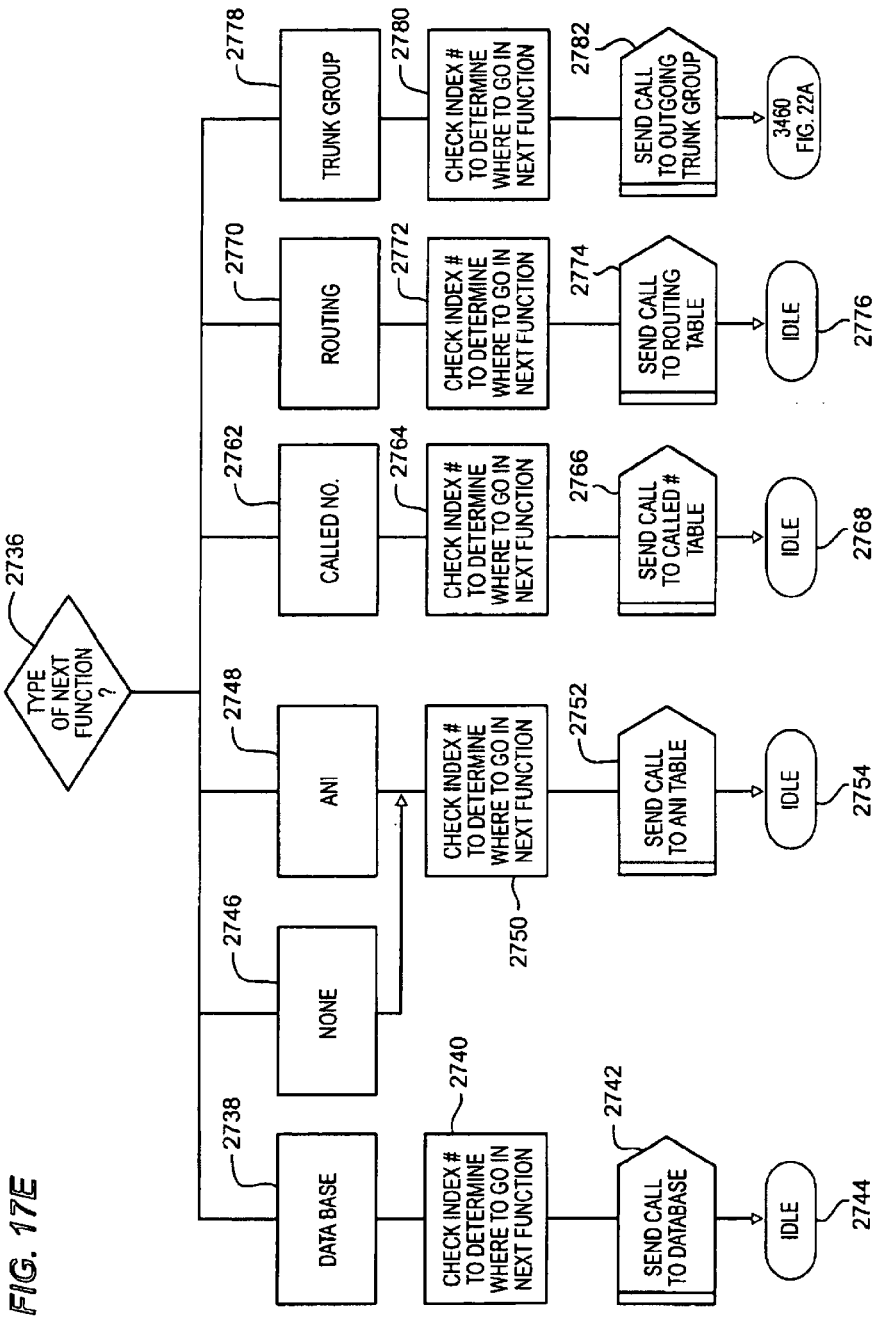

At 2638 and 2640, the CSP is checked for carrier selection identification. If the code is spare or unassigned at 2642, then the CSP is recorded for billing at 2644, and maintenance is informed at 2646. A message is then sent to the treatment table at 2648 with a cause of 111, and the process goes idle at 2650. If the check at 2640 matches an entry at 2652 (0000 0000 to 0000 0100), then the CSP is recorded for billing at 2654, and the table is checked to match the carrier selection identification at 2656 and 2658. If a match is not found at 2658, maintenance is informed at 2660. If a match is found, the called number field is checked at 2664. If it is not filled at 2664, then the next function area in the table is checked to determine the next table at 2666, and processing proceeds to 2736 (FIG. 17E).

If a match is found at 2664, then the called party number is checked in the CBI at 2670 (FIG. 17C), and the nature of address is checked at 2672 and 2674. If a subscriber number is found at 2676, then remaining entries on that line are checked for a match at 2678 and 2680. If no matches are found at 2680, then maintenance is informed at 2682 (FIG. 17D), a message is sent to the treatment table with an index of 45 at 2684, and the process goes idle at 2686. If a match is found at 2680, the ANI is checked for an NPA to use for the call at 2688. If no NPA exists at 2690, then processing proceeds to 2682. If an NPA does exist at 2690, the NPA is added to the called number at 2694, and the digits are checked at 2696. If the digits do not match a certain range at 2698, processing proceeds to 2682 (FIG. 17D). If the digits do match a certain range at 2698, then processing proceeds to 2736 (FIG. 17E).

If a national significant number is found at 2700, then remaining entries on that line are checked for a match at 2702 and 2704. If no matches are found at 2704, then processing proceeds to 2682 (FIG. 17C). If a match is found at 2704, processing proceeds to 2696.

If a test line or code is found at 2706, then remaining entries on that line are checked for a match at 2708 and 2710. If no matches are found at 2710, then processing proceeds to 2682 (FIG. 17D). If a match is found at 2710, the call block is flagged to indicate a test call at 2712, and processing proceeds to 2696.

If an international number is found at 2714, then remaining entries on that line are checked for a match at 2716 and 2718. If no matches are found at 2718, then processing proceeds to 2682 (FIG. 17D). If a match is found at 2718, processing proceeds to 2736 (FIG. 17E). Typically, this call goes directly to the trunk group associated with the international carrier.

If cut-through or operator assisted, number is found at 2720, then remaining entries on that line are checked for a match at 2722 and 2724. If no matches are found at 2724, then processing proceeds to 2682 (FIG. 17C). If a match is found at 2724, processing proceeds to 2736. Typically, this call would go directly to the trunk group associated with operator services. If a spare number is found at 2726, then maintenance is informed at 2778, a message is sent to the treatment table with an index of 111 at 2730, and idle is attained at 2732.

At 2736 (FIG. 17E), the next function is checked. If the query/response table is next at 2738, then the index is obtained at 2740. The call is sent to the query/response table at 2742, and idle is attained at 2744. If no table is listed at 2746 or if the ANI table is next at 2748, then the index is obtained at 2750. The call is sent to the ANI table at 2752, and idle is attained at 2754. If the called number table is next at 2762, then the index is obtained at 2764.

The call is sent to the called number table at 2766, and idle is attained at 2768. If the routing table is next at 2770, then the index is obtained at 2772. The call is sent to the routing table at 2774, and idle is attained at 2776. If the trunk group table is next at 2778, then the index is obtained at 2780. The call is sent to the outgoing section of the trunk table at 2782. The originating process awaits the outgoing circuit selection by the terminating process at 3460.

ANI Table Processing

FIGS. 18A–18F entail the use of the ANI table. On FIG. 18A at 2800 the ANI table is idle until the BCM enters the table from a next function at 2801. At 2802, the index is checked, and a match is searched at 2803. If a match is not found, default routing is used at 2804. If the index matches at 2803, the index is used to key into the ANI table at 2805. After 2804 or 2805, the originating line information (OLI) parameter is checked at 2806. If the originating line information does not exist at 2807, maintenance is informed at 2808, a message is sent to the treatment with index 111 at 2809, and idle is attained at 2810. If the originating line information is found at 2807, OLI digits are sent to billing at 2811, and the table is checked for an OLI match at 2812 and 2813. If no match is found at 2813, maintenance is informed at 2814, and an OLI of 2 is used at 2815.

After 2815 or if a match is found at 2813, the calling party category is checked in the IAM at 2816. If a calling party category does not exist at 2817, processing goes to 2808. If a calling party category does exist at 2817, it is matched to the table at 2818 and 2819. If the calling party is an ordinary subscriber at 2820, this is marked in the CBI at 2821, and the table is checked for a data caller at 2822 and 2823. If the call is a data call, the echo canceller for the call is turned off at 2824, and the call is marked as a data call for billing at 2825. After 2825 or if the call is not a data call at 2823, processing proceeds to 2834 (FIG. 18C).

If the category is other datafill at 2826, maintenance is informed at 2827, and processing proceeds to 2821. If the category indicates an emergency call at 2828, a high priority call at 2830, or a national security call at 2831, the priority of the IAM is set to 1, and processing proceeds to 2821. If the category indicates a test call at 2832, the call is marked as a test call at 2833, and processing proceeds to 2821.

At 2834 (FIG. 18C), the calling number, charge number, and calling party category from the LAM are read from the CBI. If the calling party's number does not exist at 2835, the charge number is checked at 2836. If the charge number does not exist at 2837, maintenance is informed at 2838, a message is sent to the treatment with index 111 at 2839, and idle is attained at 2840. If the charge number exists at 2837, the charge number is used as the ANI at 2846. Information that the charge number is the ANI and that the charge number is the calling number is sent to billing at 2848.

Figure 18A:
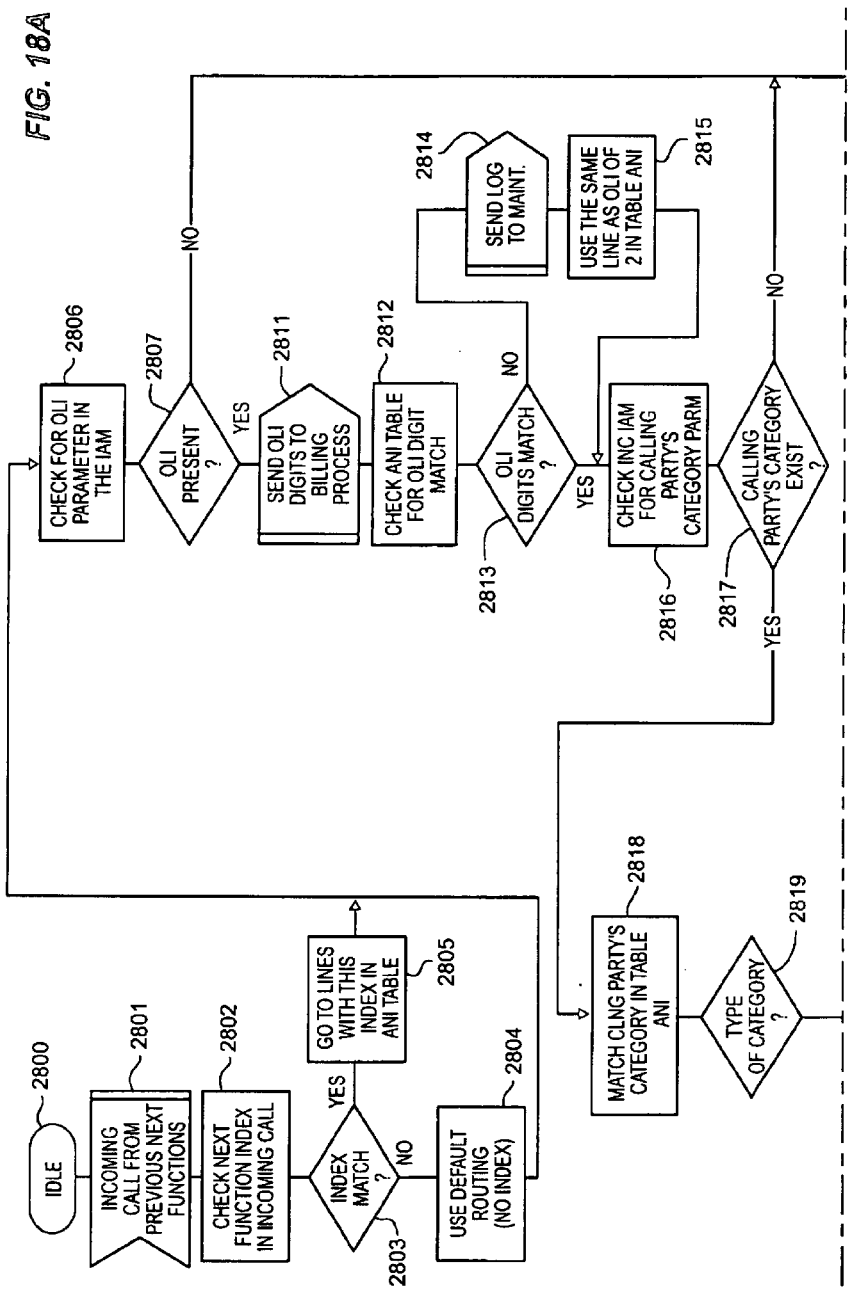
Figure 18D:
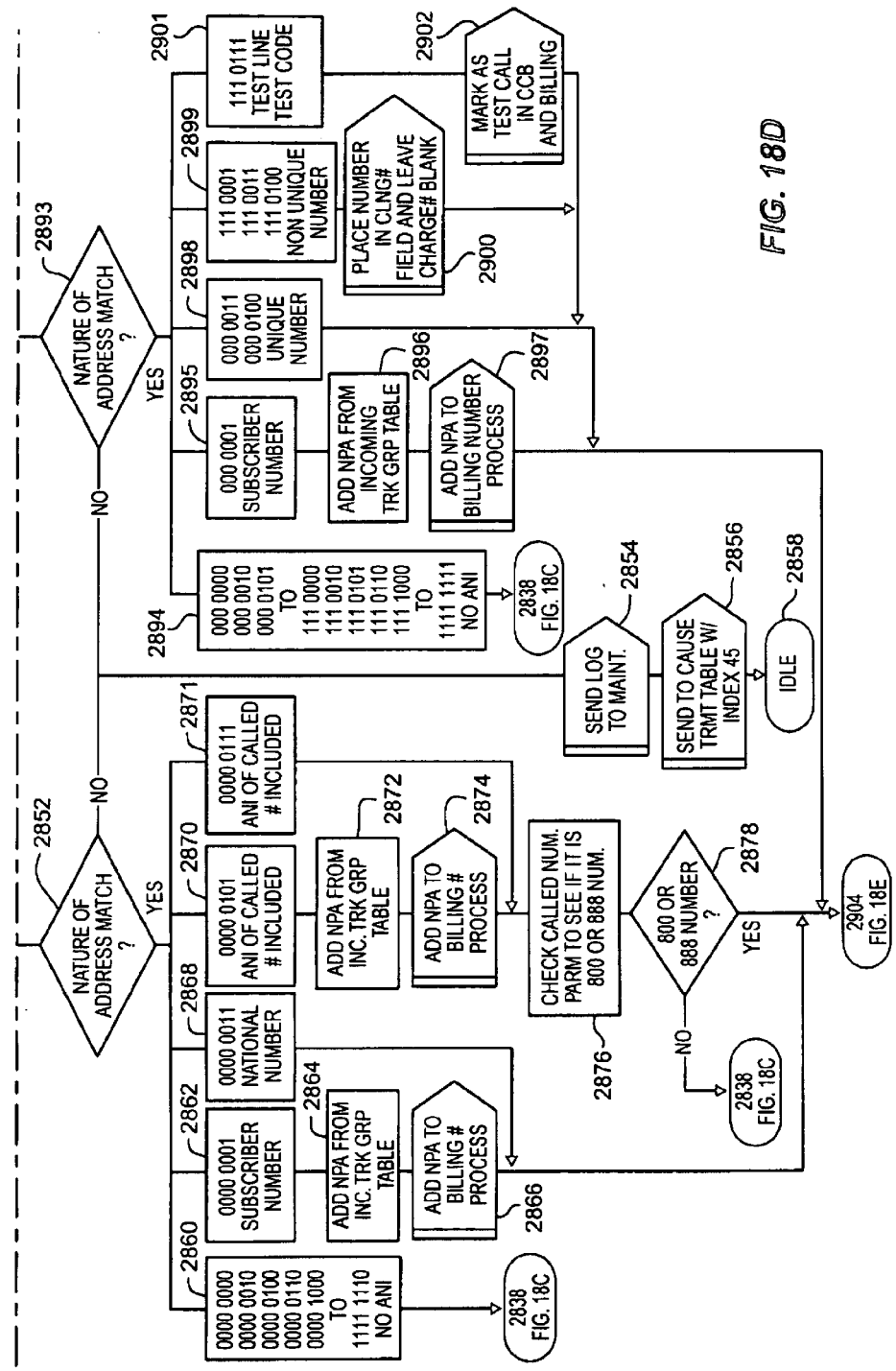
Figure 18E:
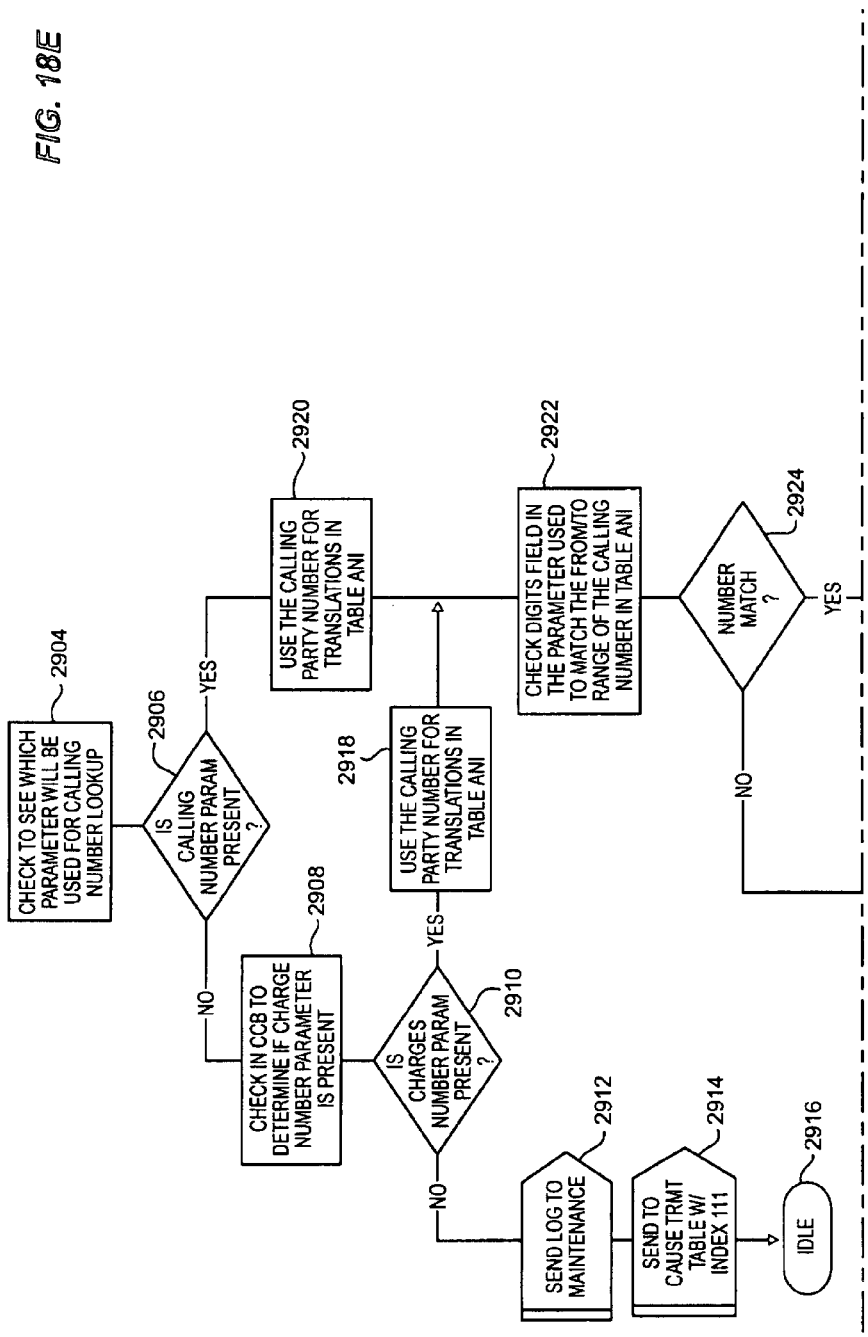

The nature of number of the charge parameter is matched at 2850 and 2852. If there is no match, maintenance is informed at 2854, a message is sent to the treatment table with a cause of 45 at 2856, and idle is attained at 2858. If the match at 2860 is a no ANI indication, the process proceeds to 2838. If the match at 2862 is a subscriber number, the NPA from the trunk table is added at 2864, and the NPA is added to the billing number process at 2866. The process then proceeds to 2904 (FIG. 18D). If the match at 2852 is a national number a 2868, the process proceeds to 2904 (FIG. 18D).

If the match at 2852 is an ANI with the called number (0000 0101) at 2870, the NPA from the trunk table is added at 2872, and the NPA is added to the billing number process at 2874. After 2874 or if the match at 2852 is an ANI with called number (0000111) at 2871, then the called number parameter is checked for 800 or 888 at 2876 and 2878. If it is not 800 or 888, the process proceeds to 2838. If it is 800 or 888, the process proceeds to 2904. If the calling party's number exists at 2835, then a check for the charge number is made at 2880 and 2882. If a charge number exists at 2882, the charge number is used as the ANI at 2884. Information that the charge number is the ANT and that the calling number is the calling number is sent to billing at 2886. Processing proceeds to 2850.

If a charge number does not exist at 2882, the calling party number is used as the ANI at 2890. Information that the calling number is the ANI and that the calling number is the calling number is sent to billing at 2891. The nature of address of the charge parameter is matched at 2892 and 2893. If there is no match, maintenance is informed at 2854. If the match at 2893 is a no ANI, processing proceeds to 2838. If the match at 2893 is a subscriber number at 2895, the NPA from the trunk table is added at 2896, and the NPA is added to the billing number process at 2897. The process then proceeds to 2904.

If the match at 2893 is a unique number at 2898, then the process proceeds to 2904. If the match at 2893 is a non-unique number at 2899, the number is placed in the calling number field, the charge number is left blank at 2900, and the process proceeds to 2904. If the match at 2893 is a test line or a test code at 2901, then the call is marked as a test call for billing at 2902, and the processing proceeds to 2904.

At 2904 (FIG. 18E), the parameter is determined for calling number look-up. If a parameter is not present at 2906, a charge number is determined at 2908. If a charge number is not present at 2910, maintenance is informed at 2912, a cause with index 111 is sent to the treatment table at 2914, and idle is attained at 2916. If a charge number is found at 2910, the calling party number is used for translations at 2918. After 2918 or if a calling number parameter is found at 2906, the calling number is matched to the range in the table at 2922. If a number does not match at 2924, maintenance is informed at 2926, a cause with index 45 is sent to the treatment table at 2928, and idle is attained at 2930. If a match is found at 2924, the next function is checked at 3006 and 3008. If the query/response table is next at 3010, then the index is obtained at 3012. The call is sent to the query/response table at 3014, and idle is attained at 3016. If no table is listed at 3018 or the called number table is next at 3020, then the index is obtained at 3022. The call is sent to the called number table at 3024, and idle is attained at 3026. If the routing table is next at 3034, then the index is obtained at 3036. The call is sent to the routing table at 3038, and idle is attained at 3040. If the trunk group table is next at 3042, then the index is obtained at 3044. The call is sent to the outgoing section of the trunk table at 3046, and idle is attained at 3048.

Called Number Table Processing

Figure 19A:
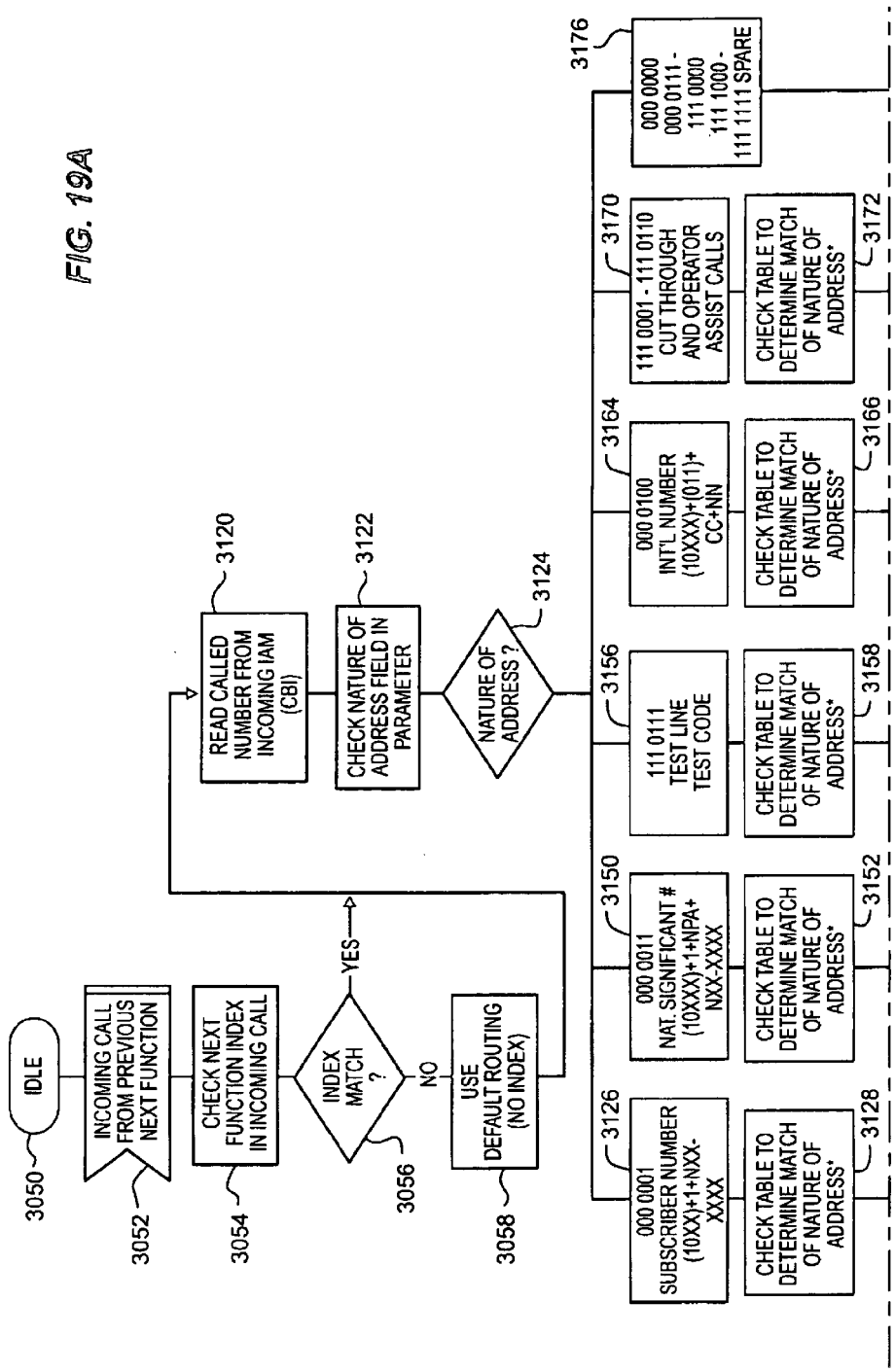
Figure 19C:
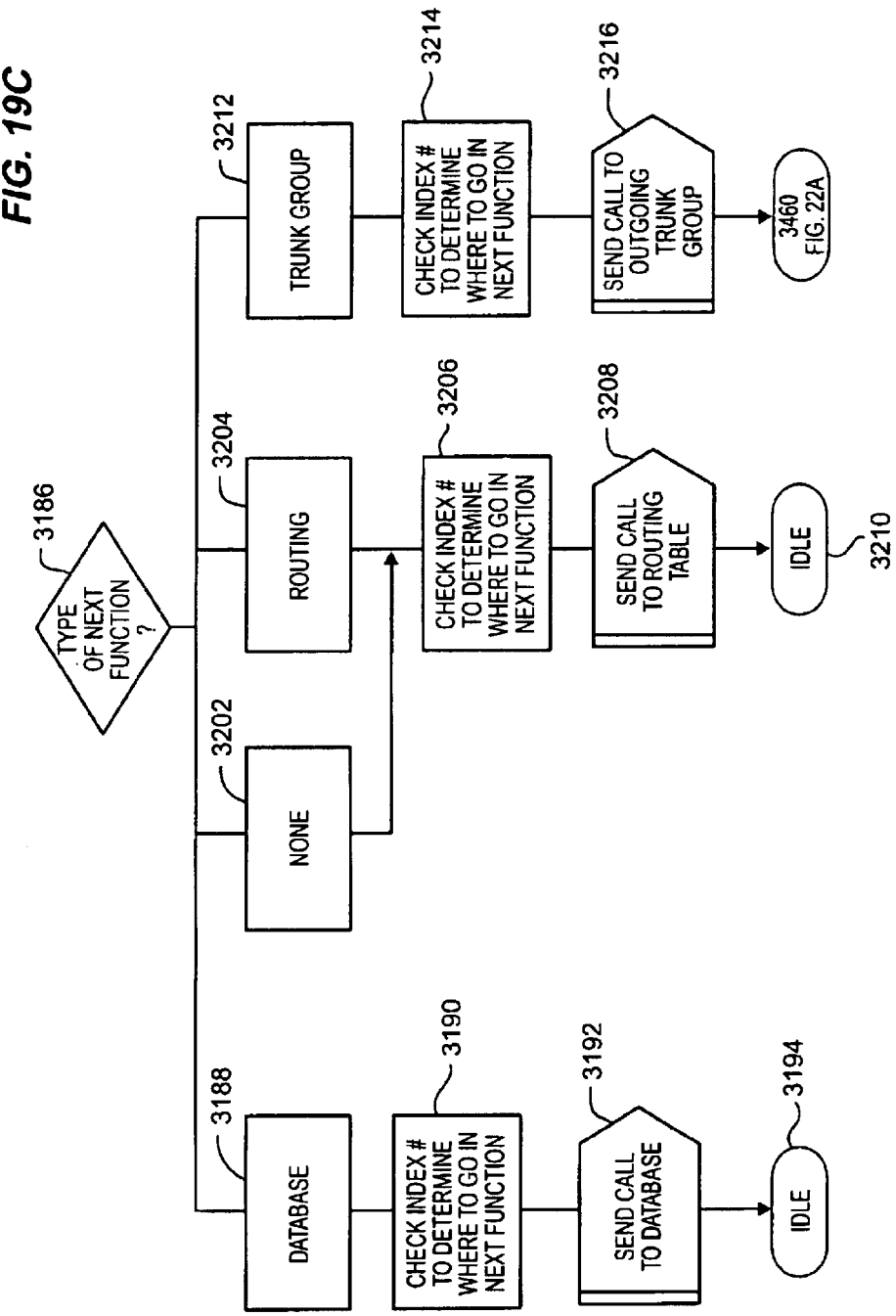

FIGS. 19A–19C entail the use of the called number table. On FIG. 19A, called number table processing is idle at 3050 and is entered by the BCM at 3052 when a call is transferred from a previous next function. At 3054, the index is checked and matched with the table at 3056. If no match is found, the default routing is used at 3058. After 3058 or if the index matches at 3056, then the called party number from the IAM is checked in the CBI at 3120, and the nature of address is checked at 3122 and 3124.

If a subscriber number is found at 3126, then remaining entries on that line are checked for a match at 3128 and 3130. If no matches are found at 3130, then maintenance is informed at 3132, a message is sent to the treatment table with an index of 45 at 3134, and the process goes idle at 3136. If a match is found at 3130, ANI is checked for an NPA to use for the call at 3138. If no NPA exists at 3140, then maintenance is informed at 3142, and processing proceeds to 3184. If an NPA does exist at 3140, the NPA is added to the called number at 3144, and the digits are checked at 3146. Processing proceeds to 3184.

If a national significant number is found at 3150, then remaining entries on that line are checked for a match at 3152 and 3154. If no matches are found at 3154, then processing proceeds to 3132 (FIG. 19B). If a match is found at 3154, processing proceeds to 3146.

If a test line or code is found at 3156, then remaining entries on that line are checked for a match at 3158 and 3160. If no matches are found at 3160, then processing proceeds to 3132 (FIG. 19B). If a match is found at 3160, the call block is flagged to indicate a test call at 3162 and processing proceeds to 3146 (FIG. 19B).

If an international number is found at 3164, then remaining entries on that line are checked for a match at 3166 and 3168. If no matches are found at 3168, then processing proceeds to 3132. If a match is found at 3168, processing proceeds to 3184. Typically, this call goes directly to the trunk group associated with the international carrier.

If a cut-through or operator assisted number is found at 3170, then remaining entries on that line are checked for a match at 3172 and 3174. If no matches are found at 3174, then processing proceeds to 3132 (FIG. 19B). If a match is found at 3174, processing proceeds to 3184. Typically, this call would go directly to the trunk group associated with operator services.

If a spare number is found at 3176, then maintenance is informed at 3178. A message is sent to the treatment table with an index of 111 at 3180, and idle is attained at 3182.

At 3184 and 3186 (FIG. 19C), the next function is checked. If the query/response is next at 3188, then the index is obtained at 3190. The call is sent to the query/response table at 3192, and idle is attained at 3194. If no table is listed at 3202 or if the routing table is next at 3204, then the index is obtained at 3206. The call is sent to the routing table at 3208, and idle is attained at 3210. If the trunk group table is next at 3212, then the index is obtained at 3214. The call is sent to the outgoing section of the trunk table at 3216. The originating process awaits the outgoing circuit selection by the terminating process at 3460.

Routing Table Processing

FIGS. 20A–20D entail the use of the routing table. On FIG. 20A, the routing table is idle at 3220. At 3222, the BCM enters the table with a call that was transferred from a previous next function. The index is checked at 3224 and 3226. If the index does not match at 3226, default routing is used at 3228. If the index match is found, the IAM is checked for the transit network selection (TNS) at 3230. If the TNS is found at 3236, the network identification plan is matched to the table at 3238 and 3240. If a match is not found at 3240, maintenance is informed at 3242, a message is sent to the treatment table with index 45 at 3244, and idle is attained at 3246.

If a match is found at 3240, the network identification type is determined at 3248 and 3250. If the type is not a national network, processing proceeds to 3242. If the type is a national network, then the network digits are matched in the table at 3252 and 3254. If no match is found at 3254, processing proceeds to 3242. If a match is found at 3254, the digits in the incoming message are matched to the table at 3256 and 3258. If no match is found at 3258, processing proceeds to 3242. If there is no TNS at 3236 or if a match is found at 3258 a first request is determined at 3260 and 3262.

If this is a first request at 3262 then the next function is used at 3264 and 3266. If the next function is nothing at

3267, maintenance is informed at 3268, a cause with index 41 is sent to the treatment table at 3269, and idle is attained at 3270. If the next function is a database at 3271 the index is checked at 2872. The call is sent to the query response table at 2873 and idle is attained at 2874. If the next function is a trunk group at 3275 the index is checked at 3276, and the call is sent to outgoing trunk selection at 3278. The originating process awaits the outgoing circuit selection by the terminating process at 3460 (FIG. 22A). If the next function is not a first request at 3262, a second request is determined at 3282 (FIG. 20C) and 3283. If a valid second request is found at 3283, the table is checked to see if the second next function is filled at 3284 and 3285. If the second next function is not filled at 3285, maintenance is informed at 3286, a message is sent to the treatment table with cause 34 at 3287, and idle is attained at 3288. If the second next function is filled at 3285, then the second next function is used at 3290 and 3291. If the next function is nothing at 3292, maintenance is informed at 3293, a cause with index 41 is sent to the treatment table at 3294, and idle is attained at 3295.

If the next function is a database at 3296, the index is checked 3297. The call is sent to the query response table at 3298, and idle is attained at 3299. If the next function is a trunk group at 3300, the index is checked at 3302, and the call is sent to the outgoing trunk selection at 3304. The originating process awaits the outgoing circuit selection by the terminating process at 3460 (FIG. 22A).

If a valid second request is not found at 3283, the table is checked to see if the request is a third attempt at 3308 (FIG. 20D) and 3310. If the third request is not valid at 3310, maintenance is informed at 3312, a message is sent to the treatment table with cause 34 at 3314, and idle is attained at 3316. If the request is valid at 3310, the table is checked to see if the third next function is filled at 3318 and 3320. If the third next function is not filled at 3320, maintenance is informed at 3322, a message is sent to the treatment table with cause 34 at 3324, and idle is attained at 3326. If the third next function is filled at 3320, then the third next function is used at 3328 and 3330.

If the next function is nothing at 3332, maintenance is informed at 3333, a cause with index 41 is sent to the treatment table at 3334, and idle is attained at 3335. If the next function is a trunk group at 3336, the index is checked at 3337, and the call is sent to outgoing trunk selection at 3338. The originating process awaits the outgoing circuit selection by the terminating process at 3460 (FIG. 22A). If the next function is a database at 3339, the index is checked at 3340. The call is sent to the query response table at 3341 and idle is attained at 3342. If the next function is the routing table at 3343, a matching sub-index is checked at 3344 (FIG. 20A).

Figure 20A:
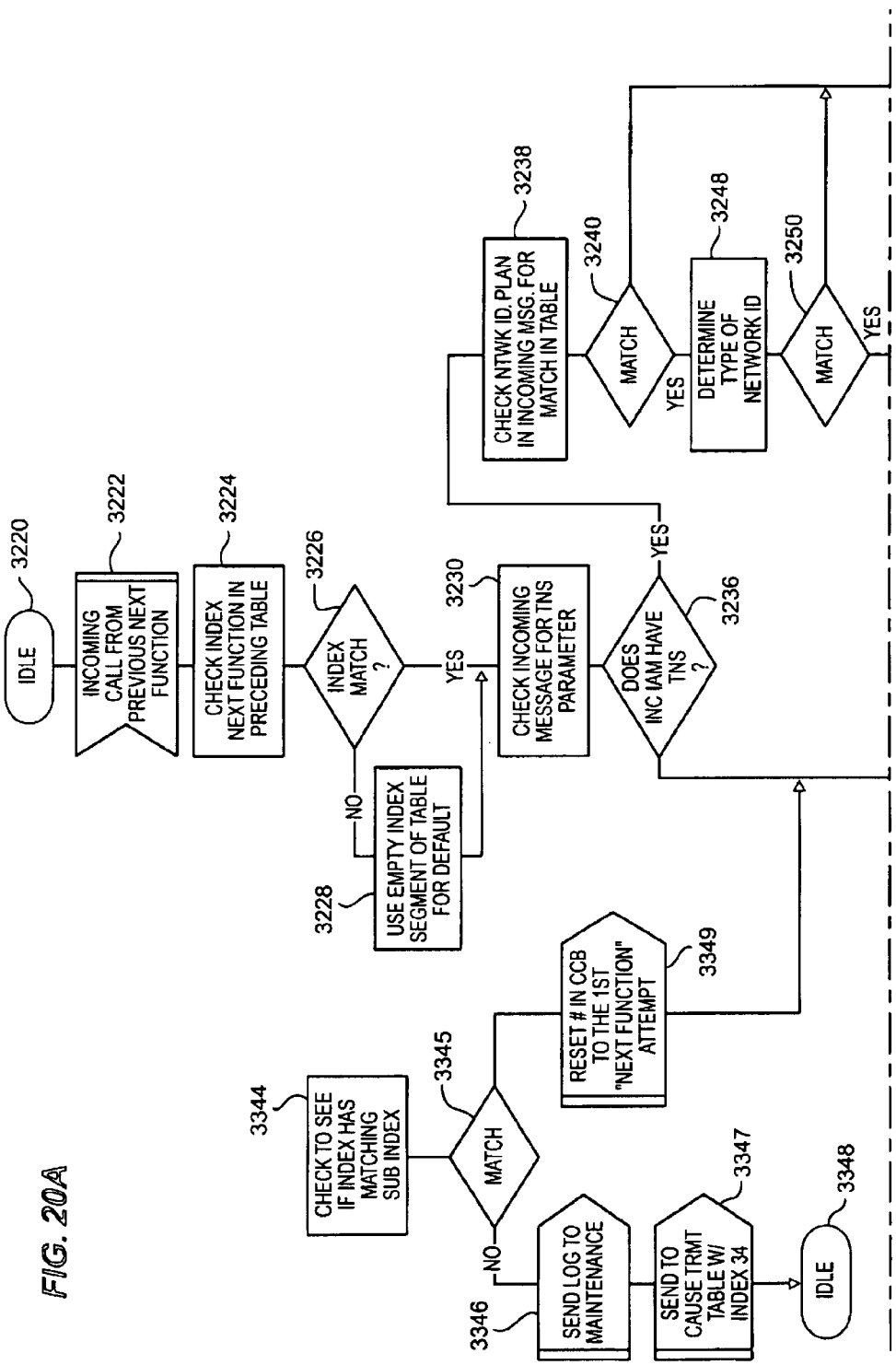

On FIG. 20A, if no match is found at 3345, maintenance is informed at 3346, a cause with index 41 is sent to the treatment table at 3347, and idle is attained at 3348. If a match is found at 3345, the CBI is reset to first next function at 3349, and processing proceeds to 3260.

Treatment Table Processing

FIGS. 21A–21D entail the use of the treatment table. On FIG. 21A, the treatment table is idle at 3350, and the BCM enters the table at 3352 when a message is received. At 3354 and 3456, the origin of the message is checked. If the message is an incoming REL message, the cause number is mapped to an index in the treatment table at 3358. The index and message received fields are used to key into the table at 3360. If a number is not found at 3362, then maintenance is informed at 3363 and it is determined if the call is an intra-call processor call at 3364 and 3365. If the call is an intra-call processor call at 3365, an internal REL is sent at 3366. If the call is not an intra-call processor call at 3365, an external REL with the same cause as was received is sent at 3367.

After 3366 or 3367, it is determined if a COT is used at 3368. If a 1 is present, the incoming continuity process is stopped at 3370, and the COT timer is stopped at 3372. If a 2 is present at 3368, the COT timer is stopped at 3372. After 3372 or if a 0 is present at 3368; the circuit is marked as transient at 3374. The RLC timer is started at 3376, and the send REL timer is started at 3378. Echo control is reset at 3380, and the originating process awaits an RLC at 3724.

If a number is found at 3362, then cause values are checked in the table at 3384 and 3386. If the field is not filled at 3386, then the next function is checked at 3388 and 3390. If the type of next function is nothing or release at 3390, then processing proceeds to 3364. All other types of next functions at 3390 have their cause values disregarded at 3392. The next function is used at 3394, and idle is attained at 3396.

Figure 21A:
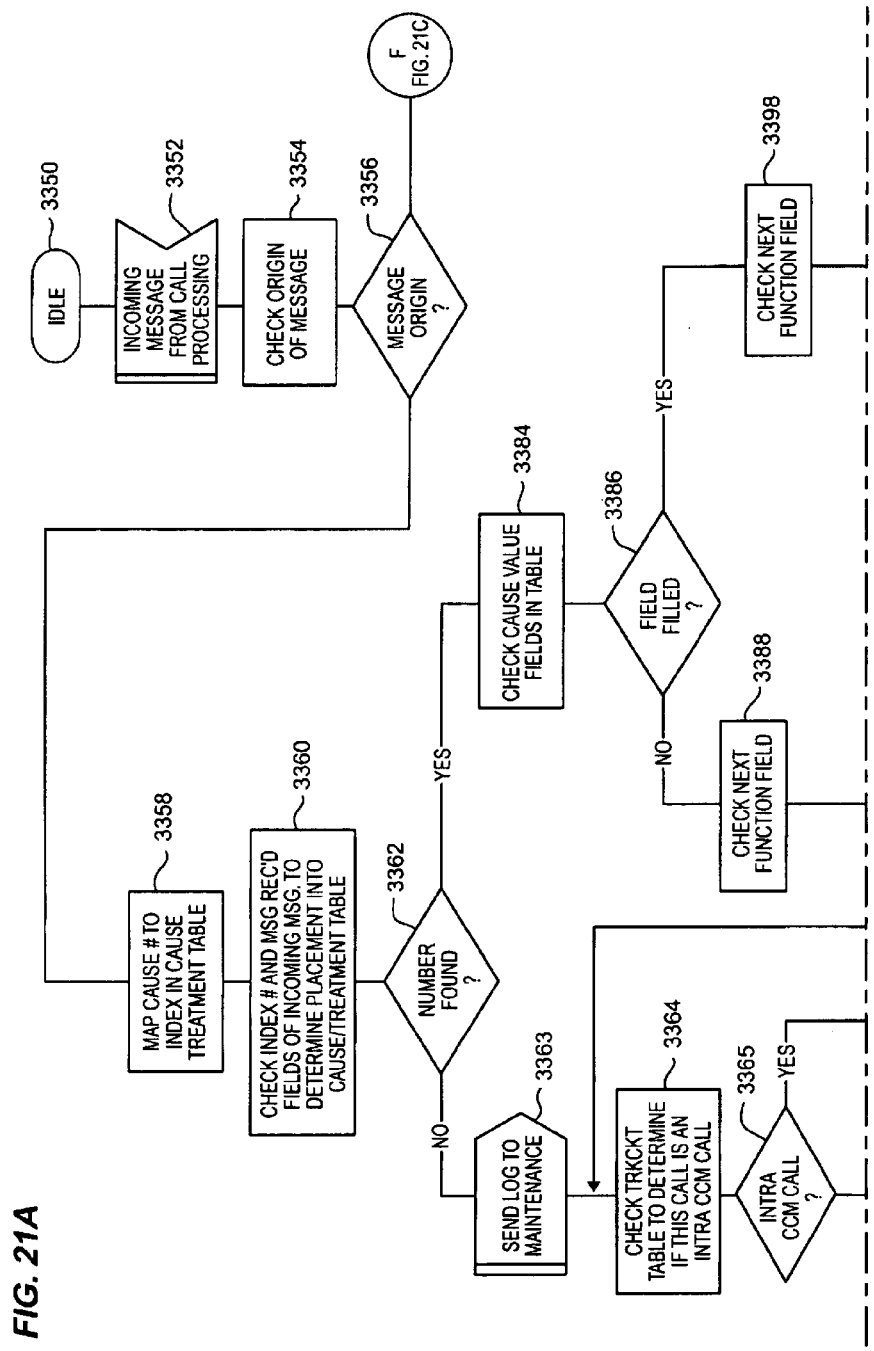
Figure 21B:
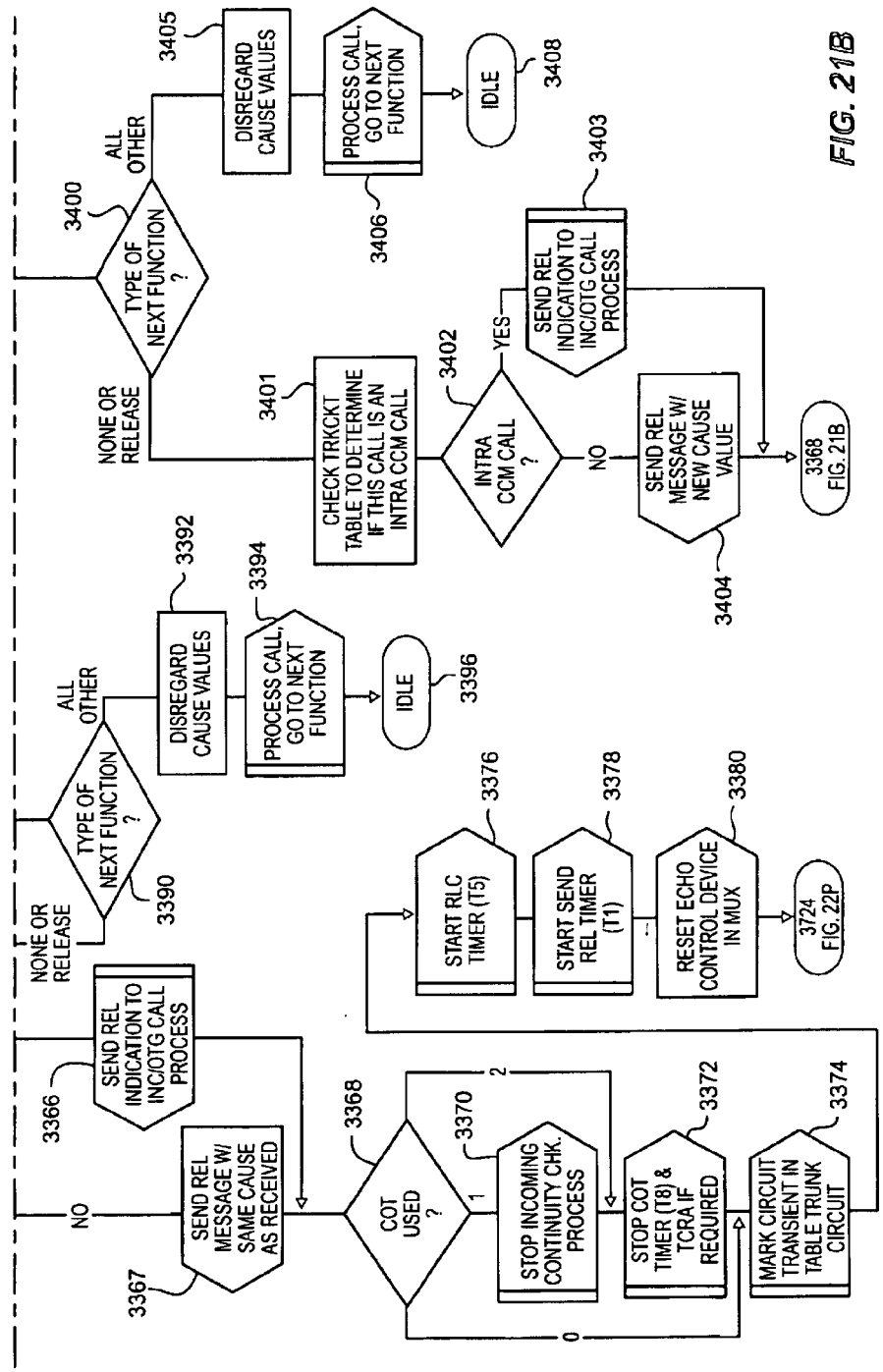

If the field is filled at 3386, then the next function is checked at 3398 and 3400. If the next function at 3400 is none or release, then it is determined if the call is intra-call processor at 3401 and 3402. If the call is intra-call processor at 3402, an internal REL is sent at 3403. If the call is not intra-call processor at 3402, an external REL with a new cause is sent at 3404. After 3403 or 3404, processing proceeds to 3368 (FIG. 21A). All other types of next functions at 3400 have their cause values disregarded at 3404. The next function is used at 3406, and idle is attained at 3408.

Figure 21C:
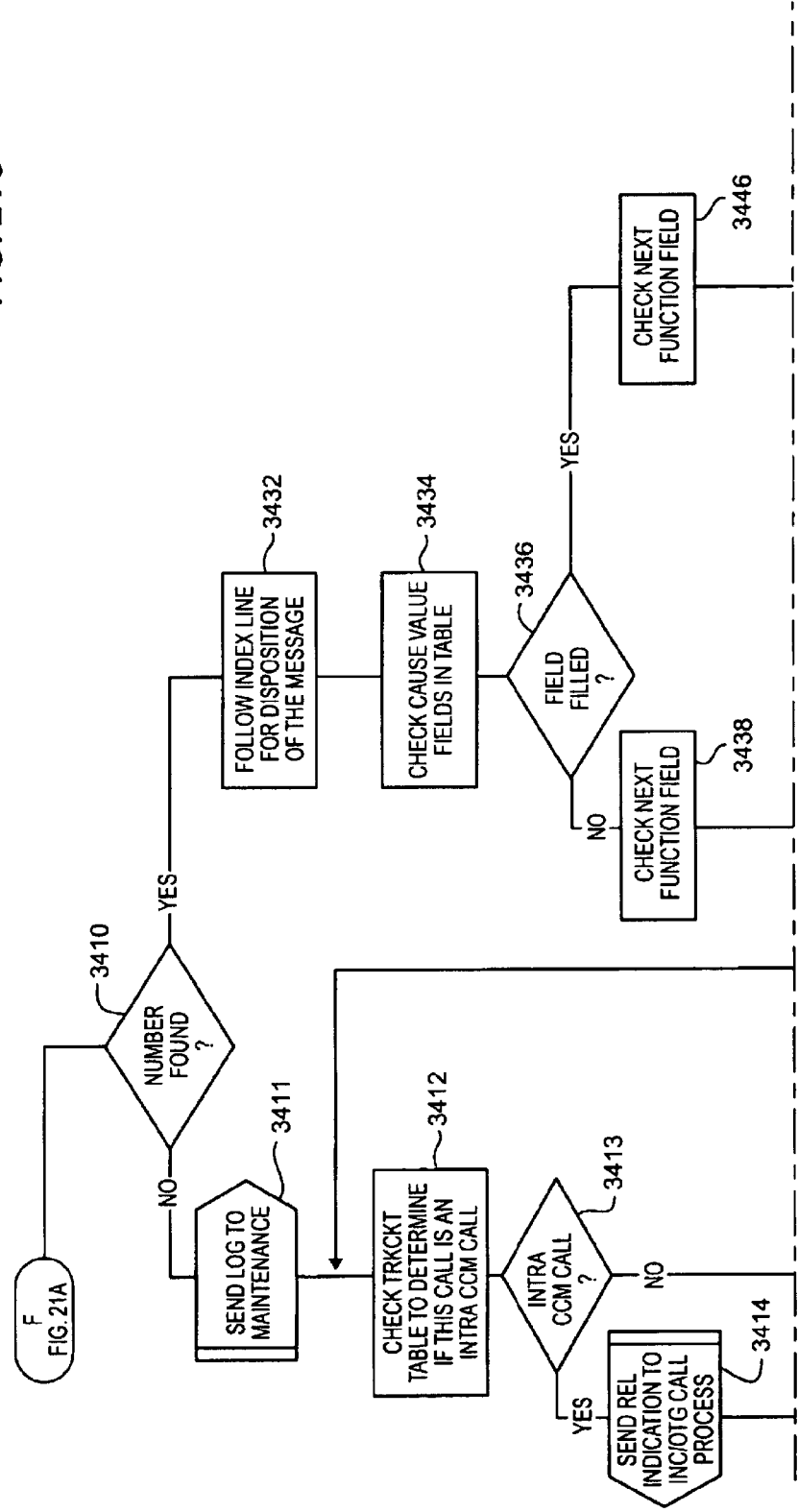

If the message originated within the call processor at 3356, then the index number is checked at 3410 (FIG. 21C). If a number is not found at 3410, then maintenance is informed at 3411, and it is determined if the call is intra-call processor at 3412 and 3413. If the call is intra-call processor at 3413, an internal REL is sent at 3414. If the call is not intra-call processor at 3413, an external REL with the same cause as was received is sent at 3415.

After 3414 or 3415, it is determined if a COT is used at 3416. If a 1 is present, the incoming continuity process is stopped at 3418, and the COT timer is stopped at 3420. If a 2 is present at 3416, the COT timer is stopped at 3420. After 3420 or if a 0 is present at 3416, the circuit is marked as transient at 3422. The RLC timer is started at 3424, and the send REL timer is started at 3426. Echo control is reset at 3428, and the originating process awaits an RLC at 3724 (FIG. 22P).

If a number is found at 3410, then the index line is followed at 3432, and cause values are checked in the table at 3434 and 3436. If the field is not filled at 3436, then the next function is checked at 3438 and 3440. If the type of next function is nothing or release at 3440, then processing proceeds to 3412. All other types of next functions at 3440 are used at 3442, and idle is attained at 3444.

If the field is filled at 3436, then the next function is checked at 3446 and 3448. If the next function at 3448 is none or release, then it is determined if the call is intra-call processor at 3449 and 3450. If the call is intra-call processor at 3450, an internal REL is sent at 3451. If the call is not intra-call processor at 3450, an external REL with a new cause is sent at 3352. After 3451 or 3452, processing proceeds to 3416 (FIG. 21D). All other types of next functions at 3448 have their cause values disregarded at 3453. The next function is used at 3454, and idle is attained at 3456.

Originating Process—Call Completion

Figure 22Q:
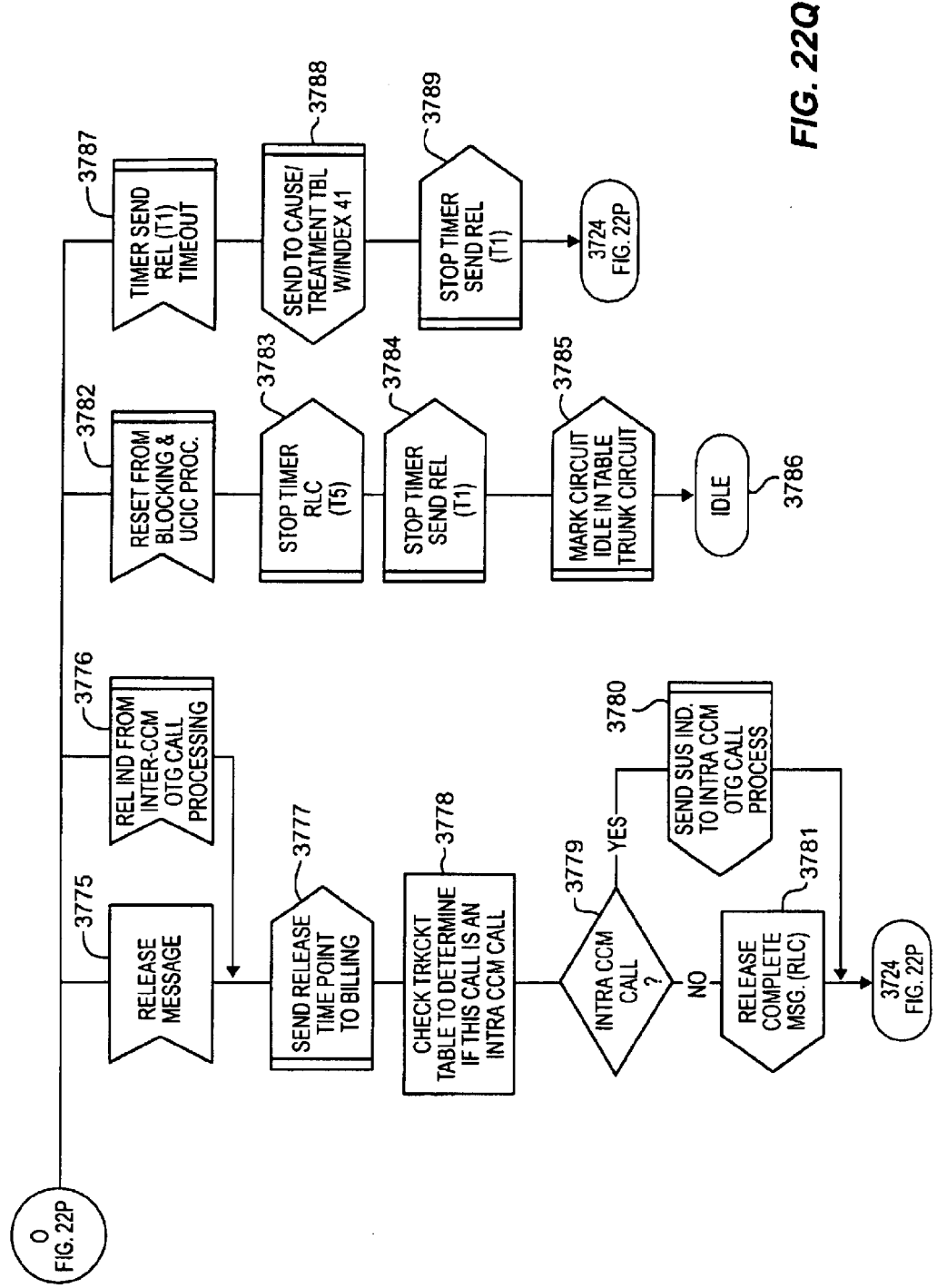

At various points above, the originating process handling the incoming side of the call may wait for the terminating process to take some action on the outgoing side of the call before call completion. Some examples are waiting for the terminating process to select an outgoing trunk group or receive an ACM, ANM, or RLC. The originating process also may receive an RLC from the incoming side of the call. FIGS. 22A–22Q depict this call completion processing by the originating process of the BCM.

On FIG. 22A at 3460, the originating process awaits the outgoing circuit selection by the termination process. If an outgoing circuit is selected at 3461, it is determined if a COT has been received at 3462, If a COT has not been received, the CBI is checked for a COT indicator at 3463 and 3464. If a 0 is found (COT not required), the process proceeds to 3520 (FIG. 22E). If a 1 or 2 is found at 3464 (COT required), processing proceeds to 2344 (FIG. 16I). If a COT was received at 3462, the COT result is sent to the terminating process at 3465, and processing proceeds to 3520 (FIG. 22E).

If an internal REL is received at 3466 or an external REL is received at 3467, it is determined if a continuity check is required at 3468, If a continuity check is required on this circuit (1), the incoming continuity check process is stopped at 3469 and the stop COT timer is stopped at 3470. If a continuity check is required on the previous circuit (2), processing proceeds to 3470. After 3470 or if no continuity check is required (0), a release request is sent to the terminating process at 3478, and a release time point is sent to billing at 3480. It is determined if the call is intra-call processor at 3481 and 3482. If the call is intra-call processor at 3482, an internal RLC is sent at 3483. If the call is not intra-call processor at 3482, an external RLC is sent at 3484. After 3483 or 3484, the circuit is marked as idle in the trunk circuit table at 3485. Idle is attained at 3486.

If a reset is received at 3479, it is determined if a continuity check is required at 3487. If a continuity check is required on this circuit (1), the incoming continuity check process is stopped at 3488, and the stop COT timer is stopped at 3489. If a continuity check is required on the previous circuit (2), processing proceeds to 3489. After 3489 or if no continuity check is required (0), then a release request is sent to the terminating process at 3490, and a release time point is sent to billing at 3491. It is determined if the call is intra-call processor at 3492 and 3493. If the call is intra-call processor at 3493, an internal RLC is sent at 3494. If the call is not intia-call processor at 3493, an external RLC is sent at 3495. After 3494 or 3495, the circuit is marked idle in the trunk circuit table at 3496. Idle is attained at 3497.

If a release is received from a circuit query at 3498 (FIG. 22C), or if an external RLC is received at 3499, or if an internal RLC is received at 3500, then a release request is sent to the terminating process at 3501, and a release time point is sent to billing at 3502. A message is sent to the treatment table with index 41 at 3503, and idle is attained at 3504. If a circuit selection failure is received at 3505, then processing proceeds to 3502.

If a COT is received at 6000, it is determined if a continuity check is required at 6002. If a continuity check is required on this circuit (1), the incoming continuity check process is stopped at 6004, and the stop COT timer is stopped at 6006. If a continuity check is required on the previous circuit (2), processing proceeds to 6006. If no continuity check is required (0), the circuit reset sending process is invoked at 6008, and idle is attained at 6010. After 6006, a COT success or failure indication is sent to the CBI at 6012. If the COT is not a success at 6014, maintenance is informed at 6016, and the process returns to 3460 (FIG. 22A). If the COT is a success at 6014, a release request is sent to the terminating process at 6018. The continuity recheck process is invoked at 6020, and idle is attained at 6022.

If an internal information message is received at 3506 (FIG. 22D) or if an external information message is received at 3507, the message is sent to the terminating process at 3508, and the process returns to 3460 (FIG. 22A). If a blocking request is received at 3509, it is ignored at 3510, and processing returns to 3460 (FIG. 22A). If a retry message is received at 3511, processing proceeds to 2280 (FIG. 16G). If a COT time-out is received at 3512, a release time point is sent to billing at 3513, and cause with index 41 is sent to the treatment table at 3514. At 3515, a release request is sent to the terminating process, and it is determined if a continuity check is required at 3516. If a continuity check is required on this circuit (1), the incoming continuity check process is stopped at 3517, and the idle is attained at 3518. If no continuity check is required (0), idle is attained at 3518.

If other internal messages are received at 6026 or if other external messages are received at 6028, it is determined if a continuity check is required at 6030. If a continuity check is required on this circuit (1), the incoming continuity check process is stopped at 6032, and the stop COT timer is stopped at 6034. If a continuity check is required on the previous circuit (2), processing proceeds to 6034. After 6034 or if no continuity check is required (0), a release request is sent to the terminating process at 6036. The continuity recheck process is invoked at 6038, and idle is attained at 6040.

At 3520 (FIG. 22E), the originating process awaits an ACM from the terminating process. If an ACM is received at 3522, the circuit is marked as busy in the trunk circuit table at 3523. An ACM time point is sent to billing at 3524, and it is determined if the call is intra-call processor at 3525 and 3526. If the call is intra-call processor at 3526, an internal ACM is sent at 3527. If the call is not intra-call processor at 3526, an external ACM is sent at 3527.

After 3526 or 3527, the trunk group table is checked to see if the incoming trunk group is an inter-machine trunk (IMT) at 3529 and 3530. If it is not, processing proceeds to 3600 (FIG. 22I). If it is an IMT, an exit message with the outgoing circuit number is built from the CBI at 3531. It is determined if the call is intra-call processor at 3532 and 3533. If the call is intra-call processor at 3533, an internal exit message is sent at 3534. If the call is not intra-call processor at 3533, an external exit message is sent at 3535. After 3534 or 3535, the process proceeds to 3600 (FIG. 22I).

If an answer message is received from the terminating process at 3538, the circuit is marked as busy in the trunk circuit table at 3539. At 3540 and 3541, the trunk group table is checked to see if the incoming trunk group is an IMT. If it is not an IMT at 3541, processing proceeds to 3547. If it is an IMT at 3541, an exit message with the outgoing circuit number is built from the CBI at 3542.

It is determined if the call is intra-call processor at 3543 and 3544. If the call is intra-call processor at 3544, an internal exit message is sent ~t 3545. If the call is not intra-call processor at 3544, an external exit message is sent at 3546. After 3545 or 3546, an answer time point is sent to billing at 3547. It is determined if the call is intra-call processor at 3548 and 3549. If the call is intra-call processor at 3549, an internal ANM is sent at 3550. If the call is not intra-call processor at 3549, an external ANM is sent at 3551. After 3550 or 3551, the process proceeds to 3670 (FIG. 22L).

If a reset is received at 3552, then a release request is sent to the terminating process at 3553, and a release time point is sent to billing at 3554. It is determined if the call is intra-call processor at 3555 and 3556. If the call is intra-call processor at 3556, an internal RLC is sent at 3557. If the call is not intra-call processor at 3556, an external RLC is sent at 3558. After 3557 or 3558, the circuit is marked as idle in the trunk circuit table at 3559. Idle is attained at 3560.

If an external REL is received at 3562 (FIG. 22G) or if an internal REL is received at 3563, a release request is sent to the terminating process at 3564, and a release time point is sent to billing at 3565. It is determined if the call is intra-call processor at 3566 and 3567. If the call is intra-call processor at 3567, an internal RLC is sent at 3568. If the call is not intra-call processor at 3567, an external RLC is sent at 3569. After 3568 or 3569, the circuit is marked idle in the trunk circuit table at 3570. Idle is attained at 3572.

If an external RLC is received at 3575 or if an internal RLC is received at 3576, an idle time point is sent to billing at 3577, and a release request is sent to the terminating process at 3578. At 3579, a message is sent to the treatment table with cause 41, and idle is attained at 3580. If a release is received from a circuit query at 3574, processing proceeds to 3578. If a release request is received from the terminating process at 3581 or if an outgoing circuit failure is received at 3582, then processing proceeds to 3579.

If other internal messages are received at 3583 or if other external messages are received at 3584, they are ignored at 3585, and processing returns to 3520 (FIG. 22E). If a blocking request is received at 3586, it is ignored at 3587, and processing proceeds to 3520 (FIG. 22E). If a call progress message is received from the terminating process at 3590, it is determined if the call is intra-call processor at 3591 and 3592. If the call is intra-call processor at 3592, an internal CPM is sent at 3593. If the call is not intra-call processor at 3592, an external CPM is sent at 3594. After 3593 or 3594, the process returns to 3520 (FIG. 22E).

At 3600 (FIG. 22I), the originating process awaits an answer message from the terminating process. If an answer message is received from the terminating process at 3602, the circuit is marked as busy in the trunk circuit table at 3604. An answer time point is sent to billing at 3606, and it is determined if the call is intra-call processor at 3607 and 3608. If the call is intra-call processor at 3608, an internal ANM is sent at 3609. If the call is not intra-call processor at 3608, an external ANM is sent at 3610. After 3609 or 3610, the process then proceeds to 3670 (FIG. 22L).

If a blocking request is received at 3612, it is ignored at 3614, and processing proceeds to 3600. If a call progress message is received from the terminating process at 3618, it is determined if the call is intra-call processor at 3619 and 3620. If the call is intra-call processor at 3620, an internal CPM is sent at 3621. If the call is not intra-call processor at 3620, an external CPM is sent at 3622. After 3621 or 3622, the process returns to 3520 (FIG. 22E).

If a reset is received at 3624, then a release request is sent to the terminating process at 3626, and a release time point is sent to billing at 3628. It is determined if the call is intra-call processor at 3629 and 3630. If the call is intra-call processor at 3630, an internal RLC is sent at 3631. If the call is not intra-call processor at 3630, an external RLC is sent at 3632. After 3631 or 3632, the circuit is marked as idle in the trunk circuit table at 3633. Idle is attained at 3634.

If an external REL is received at 3636 (FIG. 22J) or if an internal REL is received at 3637, a release request is sent to the terminating process at 3638, and a release time point is sent to billing at 3640. It is determined if the call is intra-call processor at 3641 and 3642. If the call is intra-call processor at 3642, an internal RLC is sent at 3643. If the call is not intra-call processor at 3642, an external RLC is sent at 3644. After 3643 or 3644, the circuit is marked as idle in the trunk circuit table at 3645. Idle is attained at 3646.

If an external RLC is received at 3649 or if an internal RLC is received at 3650, an idle time point is sent to billing at 3651, and a release request is sent to the terminating process at 3652. A message is sent to the treatment table with cause 41 at 3653, and idle is attained at 3654. If a release is received from a circuit query at 3648, processing proceeds to 3652. If a release request is received from the terminating process at 3656, then processing proceeds to 3653.

If an outgoing circuit failure is received at 3658, a message is sent to the treatment table with cause 41 at 3659, and idle is attained at 3660. If other internal messages are received at 3661 or if other external messages are received at 3662, they are ignored at 3664, and processing returns to 3520 (FIG. 22E).

At 3670 (FIG. 22L), the originating process has previously received an ANM indicating that the incoming circuit has been answered. If an external REL is received at 3672 or if an internal REL is received at 3673, a release request is sent to the terminating process at 3674, and a release time point is sent to billing at 3676. It is determined if the call is intra-call processor at 3677 and 3678. If the call is intra-call processor at 3678, an internal RLC is sent at 3679. If the call is not intra-call processor at 3678, an external RLC is sent at 3680. After 3679 or 3680, the circuit is marked as idle in the trunk circuit table at 3681. Idle is attained at 3682.

If other internal messages are received at 3683 or if other external messages are received at 3684, they are ignored at 3686, and processing returns to 3670. If a blocking request is received at 3687, it is ignored at 3688, and processing proceeds to 3670. If a reset is received at 3690, then a release request is sent to the terminating process at 3692, and a release time point is sent to billing at 3694. It is determined if the call is intra-call processor at 3695 and 3696. If the call is intra-call processor at 3696, an internal RLC is sent at 3697. If the call is not intra-call processor at 3696, an external RLC is sent at 3698. After 3697 or 3698, the circuit is marked as idle in the trunk circuit table at 3699. Idle is attained at 3700.

If a release is received from a circuit query at 3702 (FIG. 22M), processing proceeds to 3708. If an internal RLC is received at 3703 or if an external RLC is received at 3704, an idle time point is sent to billing at 3706, and a release request is sent to the terminating process at 3708. At 3710, a message is sent to the treatment table with cause 41, and idle is attained at 3712. If a release request is received from the terminating process at 3713, then processing proceeds to 3710. If a network suspend is received from the terminating process at 3714, it is determined if the call is intra-call processor at 3715 and 3716. If the call is intra-call processor at 3716, an internal SUS is sent at 3717. If the call is not intra-call processor at 3716, an external SUS is sent at 3718. After 3717 or 3718, processing proceeds to 3720 (FIG. 22N).

At 3720 (FIG. 22N), the originating process has previously received an SUS indicating that the incoming circuit has been suspended. If an external REL is received at 3721 or if an internal REL is received at 3722, a release request is sent to the terminating process at 3723, and a release time point is sent to billing at 3725. It is determined if the call is intra-call processor at 3726 and 3727. If the call is intra-call processor at 3727, an internal RLC is sent at 3728. If the call is not intra-call processor at 3727, an external RLC is sent at 3729. After 3728 or 3729, the circuit is marked as idle in the trunk circuit table at 3730. Idle is attained at 3731.

If a blocking request is received at 3732, it is ignored at 3734, and processing returns to 3720. If an external RLC is received at 3735 or if an internal RLC is received at 3736, an idle time point is sent to billing at 3737, and a release request is sent to the terminating process at 3738. At 3739, a message is sent to the treatment table with cause 41, and idle is attained at 3740. If a release is received from a circuit query at 3733, processing proceeds to 3738.

If a release request is received from the terminating process at 3741 (FIG. 22O), then a message is sent to the treatment table with cause 41 at 3742, and idle is attained at 3743. If a reset is received at 3744, then a release request is sent to the terminating process at 3745, and a release time point is sent to billing at 3746. It is determined if the call is intra-call processor at 3747 and 3748. If the call is intra-call processor at 3748, an internal RLC is sent at 3749. If the call is not intra-call processor at 3748, an external RLC is sent at 3750. After 3749 or 3750, the circuit is marked as idle in the trunk circuit table at 3751. Idle is attained at 3752.

If a network resume is received from the terminating process at 3753, it is determined if the call is intra-call processor at 3754 and 3755. If the call is intra-call processor at 3755, an internal RES is sent at 3756. If the call is not intra-call processor at 3755, an external RES is sent at 3757. After 3756 or 3757, processing proceeds to 3720 (FIG. 22N). If other internal messages are received at 3758 or if other external messages are received at 3759, they are ignored at 3760, and processing returns to 3720 (FIG. 22N).

At 3724 (FIG. 22P), the originating process awaits an RLC. If an external RLC is received at 3761 or if an internal RLC is received at 3762, an idle time point is sent to billing at 3763, and the RLC timer is stopped at 3764. At 3765, the send release timer is stopped. Idle is attained at 3766.

If the RLC timer times out at 3767, the send release timer is stopped at 3768, and a message is sent to circuit reset at 3769. At 3770, maintenance is informed, and idle is attained at 3771. If other external messages are received at 3772 or if other internal messages are received at 3773, they are ignored at 3774, and the process returns to 3724.

If an external REL is received at 3775 or if an internal REL is received at 3776, a release time point is sent to billing at 3777. It is determined if the call is intra-call processor at 3778 and 3779. If the call is intra-call processor at 3779, an internal SUS is sent at 3780. If the call is not intra-call processor at 3779, an external SUS is sent at 3781. After 3780 or 3781, the process returns to 3724.

If a reset is received at 3782, the RLC timer is stopped at 3783. At 3784, the send release timer is stopped, and the circuit is marked as idle in the trunk circuit table at 3785. Idle is attained at. 3786. If the send REL timer times out at 3787, a message is sent to the treatment table with cause 41 at 3788. The send REL timer is set at 3789, and the process returns to 3724.

Trunk Circuit/Trunk Group Table Processing for Outgoing Calls

Figure 23A:
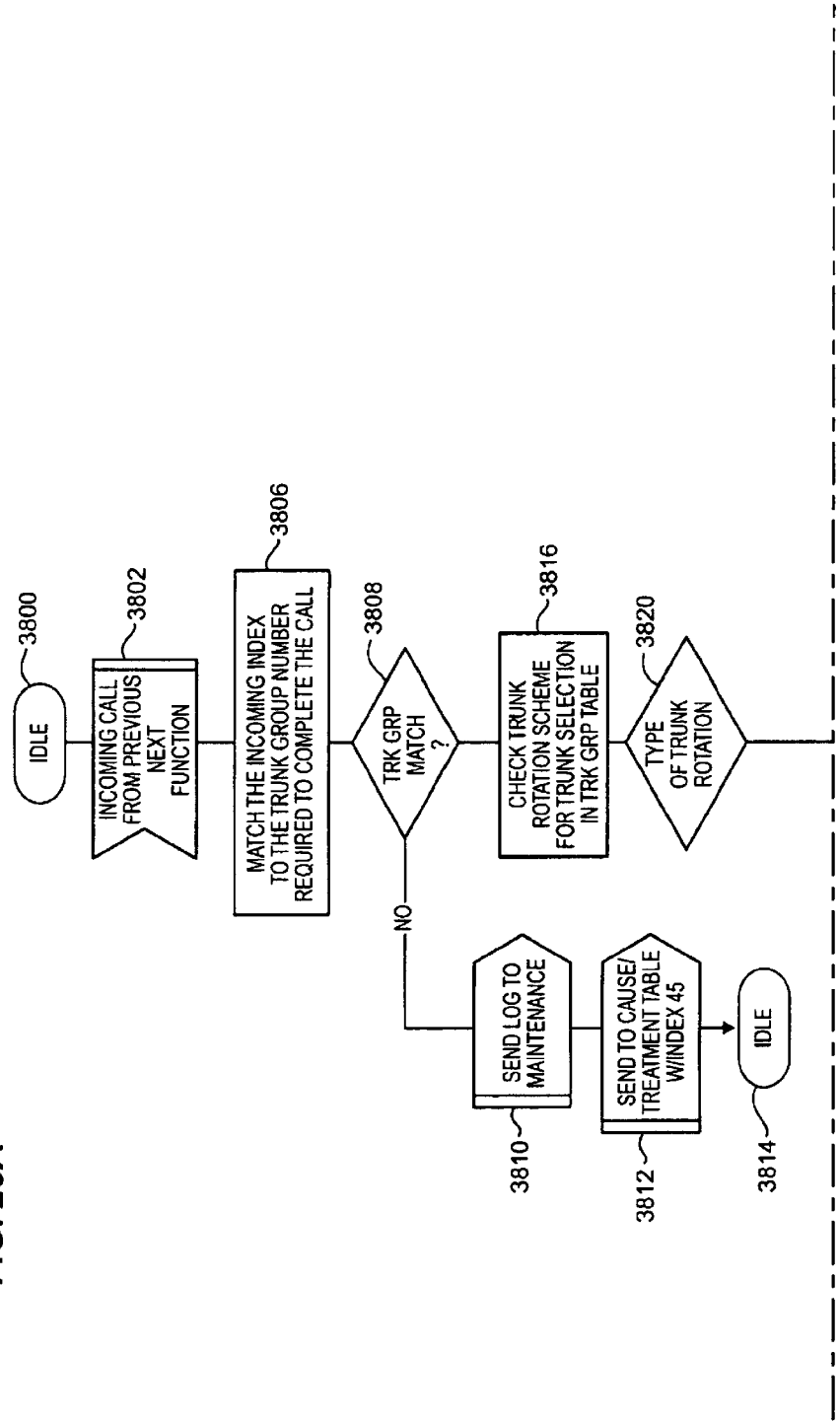
FIGS. 23A–23T are SDL diagrams of logic used in a version of the invention for trunk/circuit group processing.
Figure 23E:
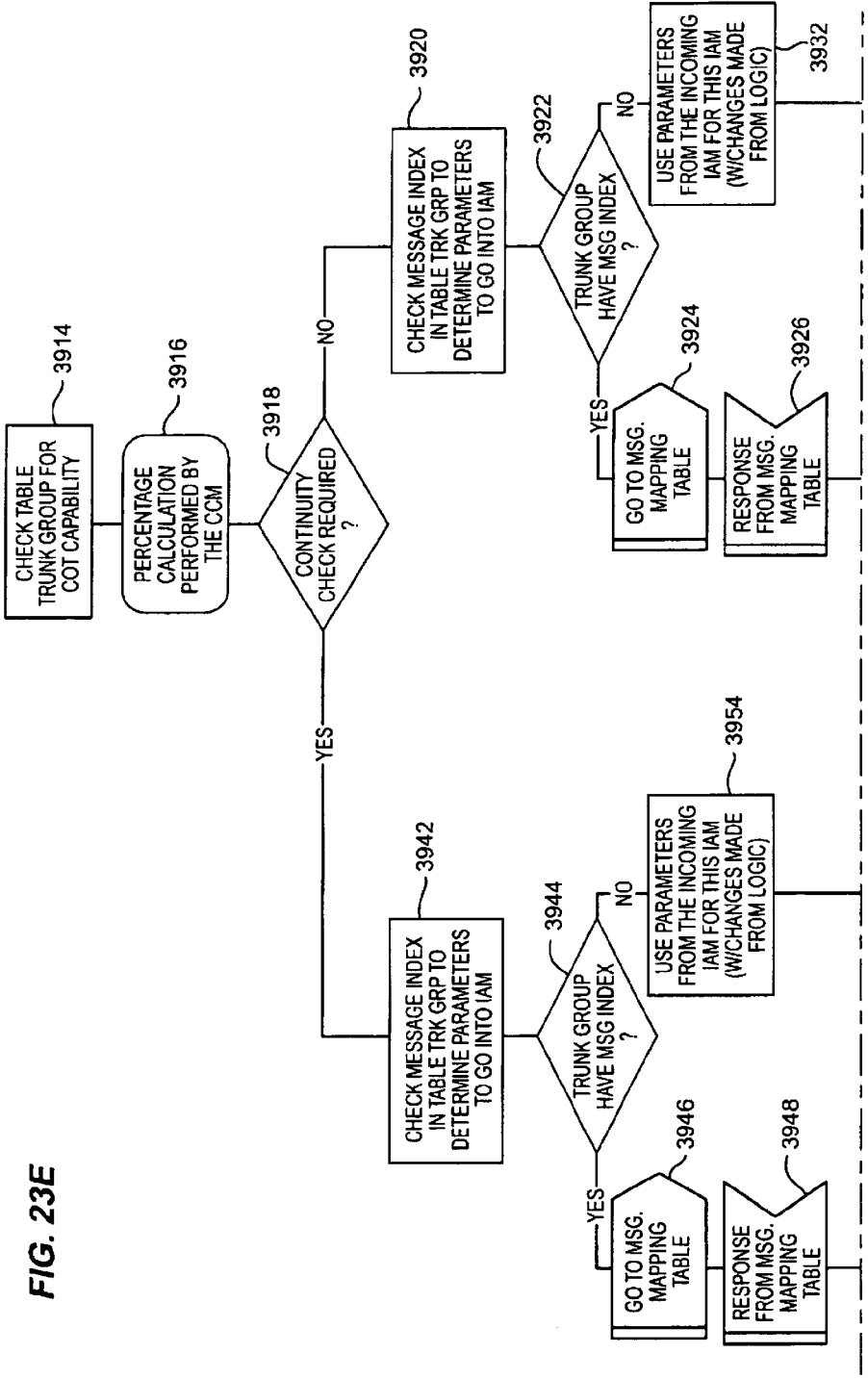
Figure 23G:
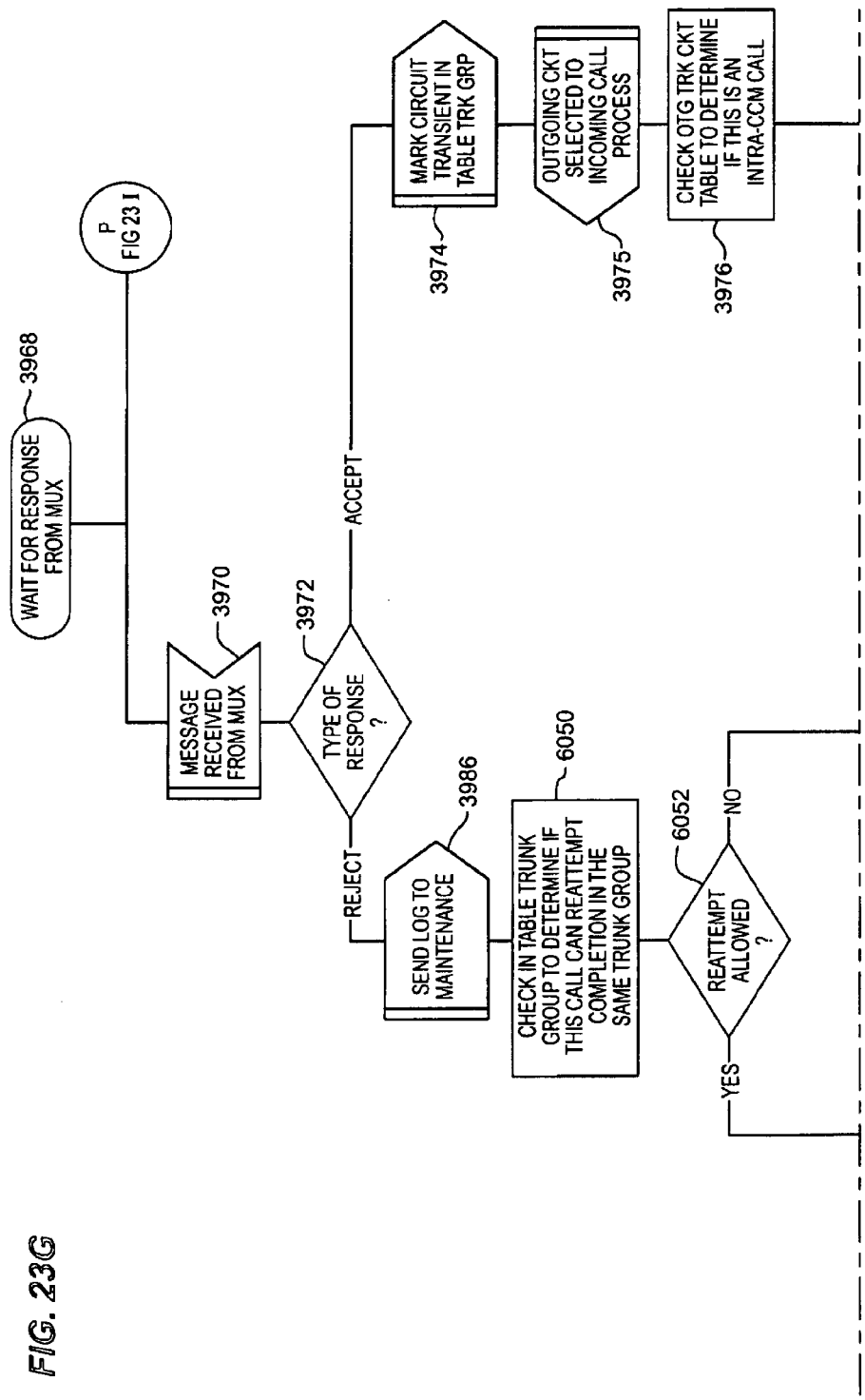
Figure 23H:
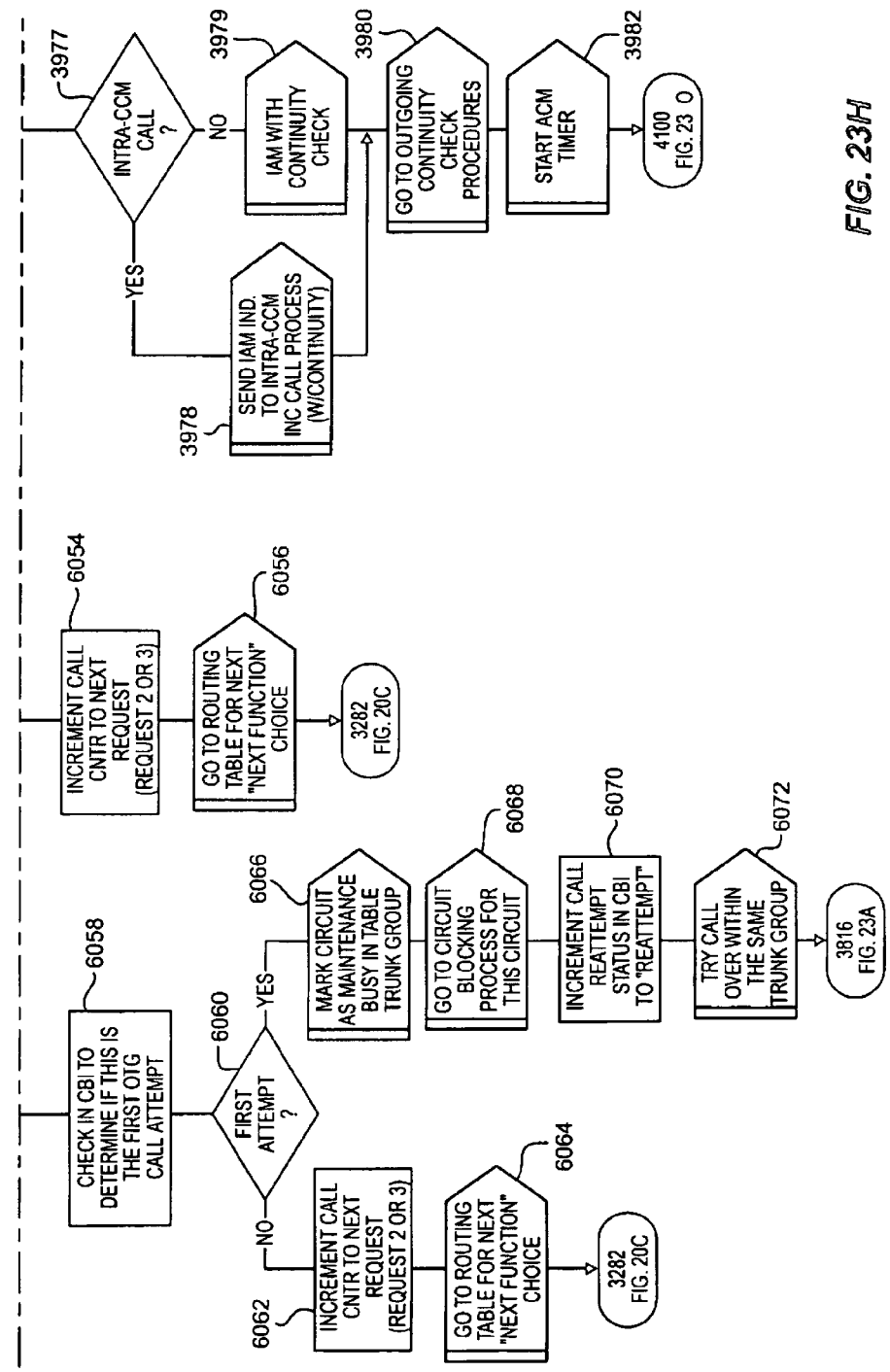
Figure 23J:
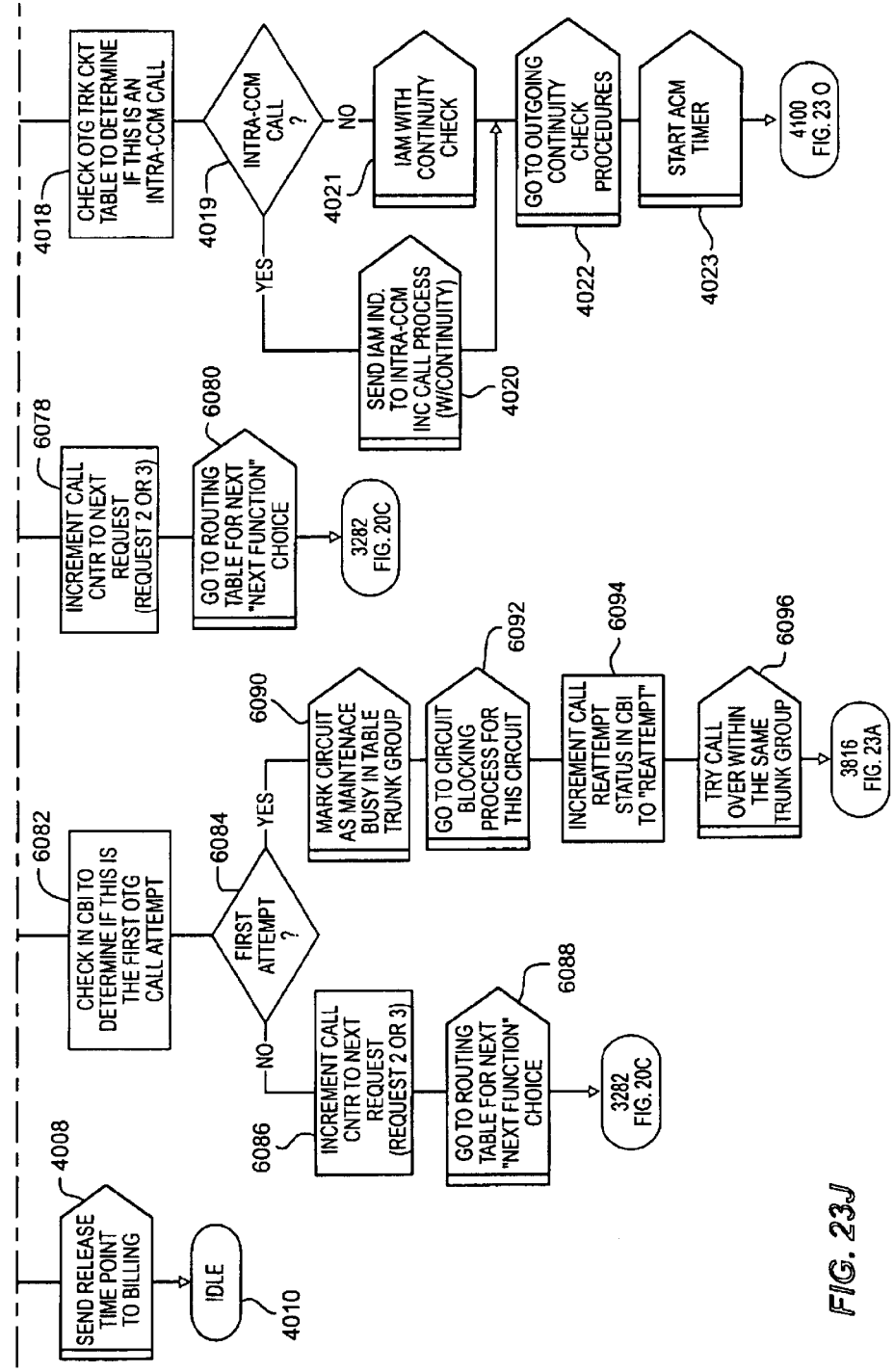
Figure 23K:
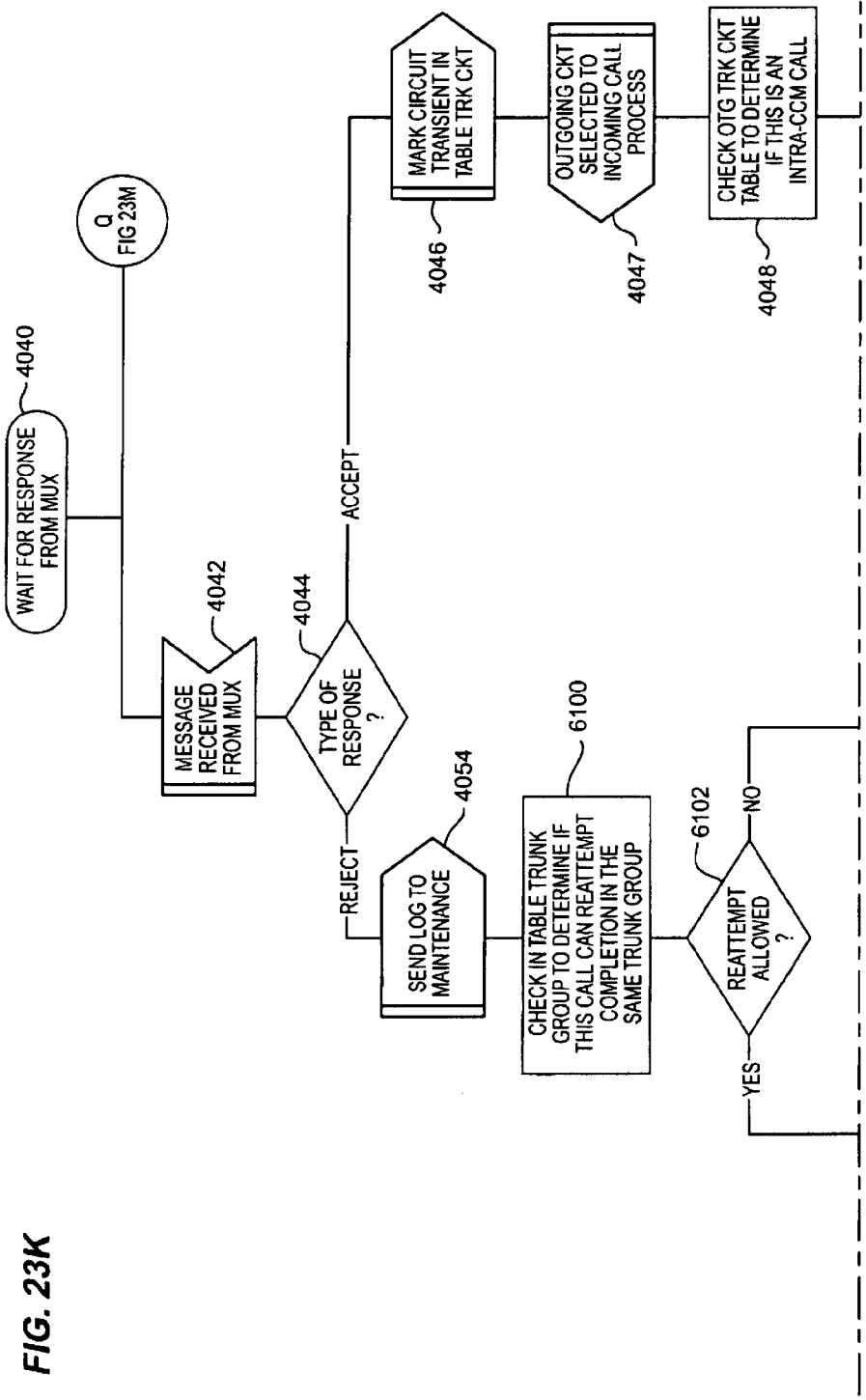
Figure 23L:
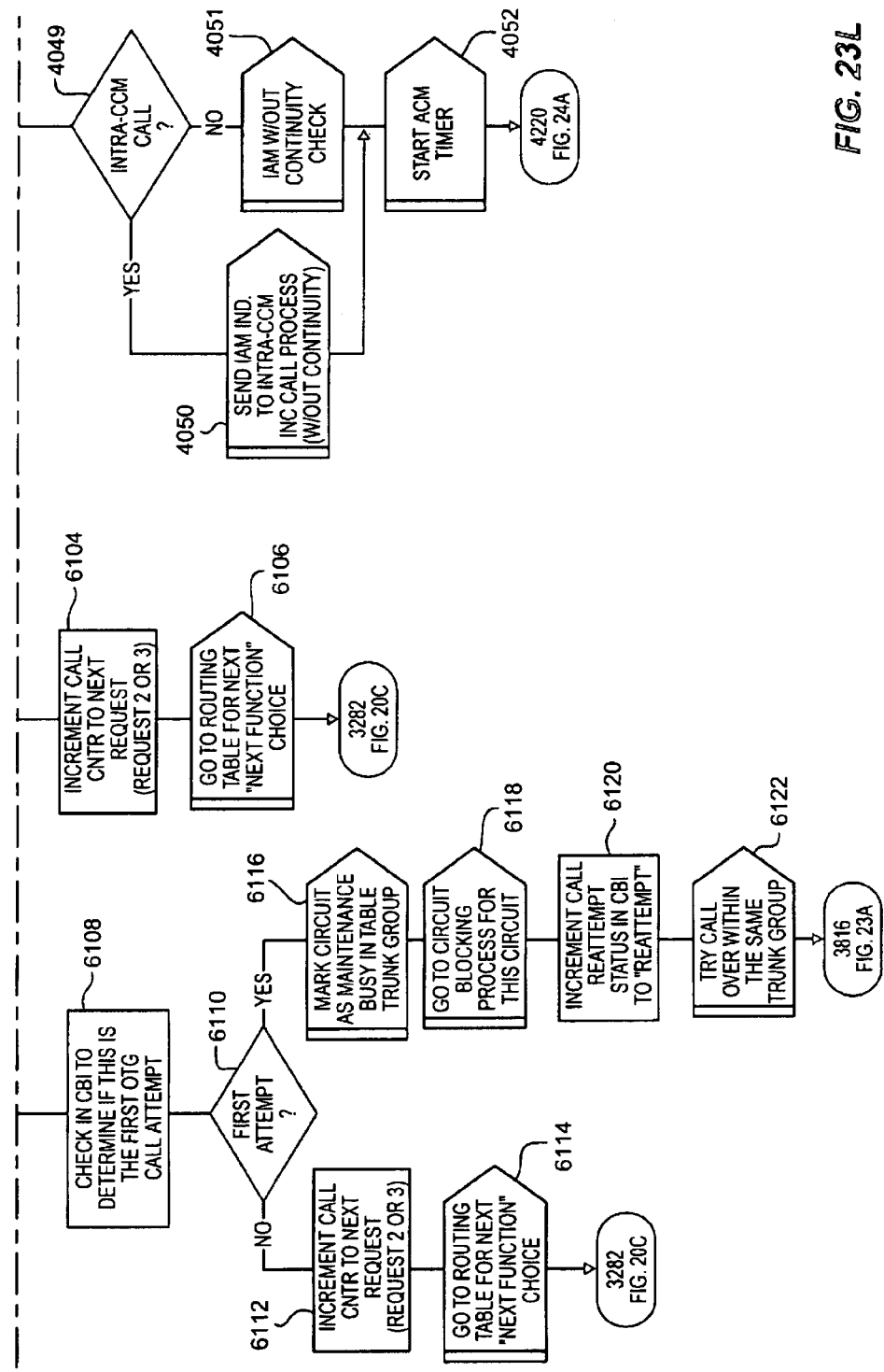
Figure 23N:
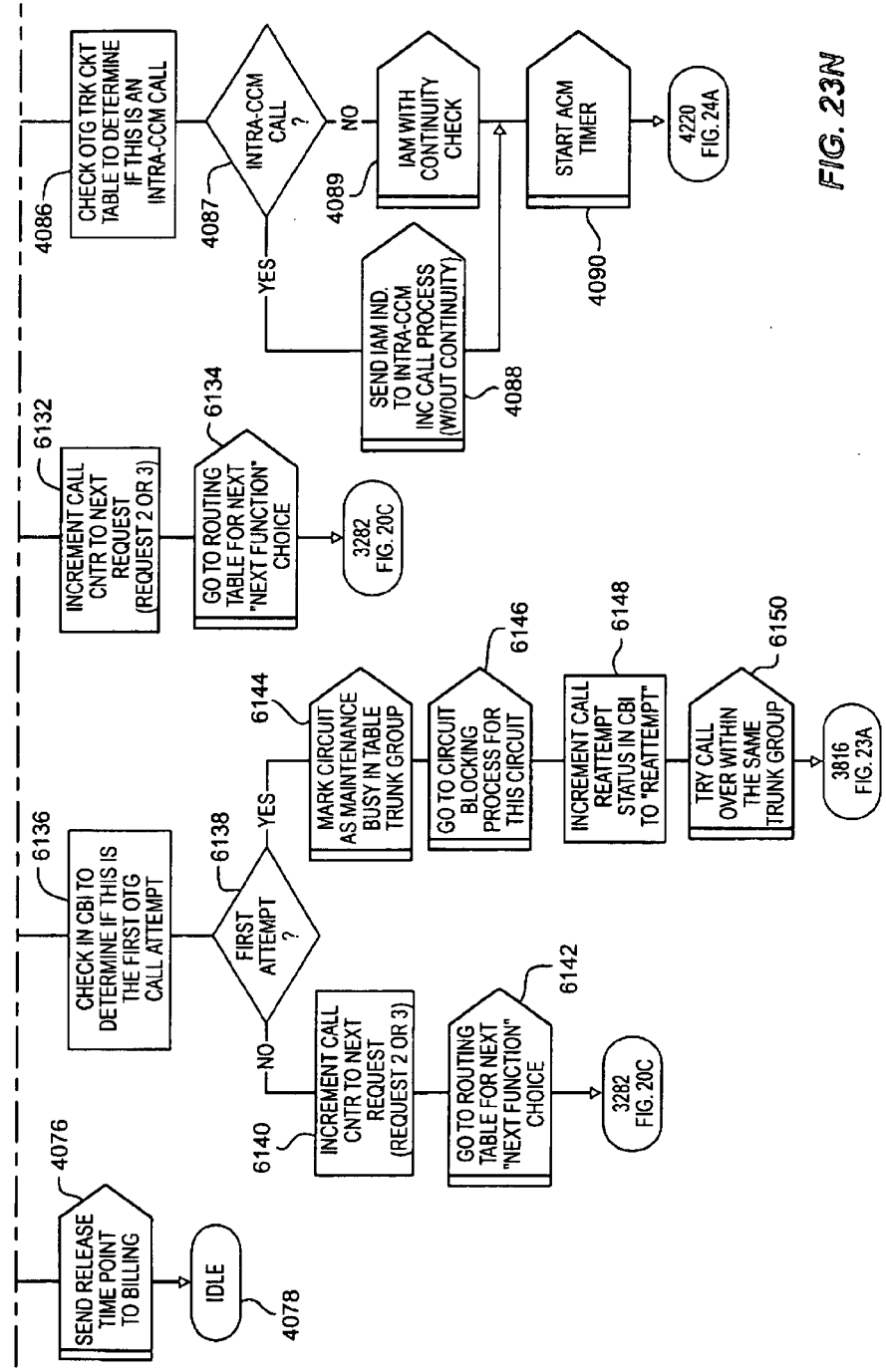
Figure 23:
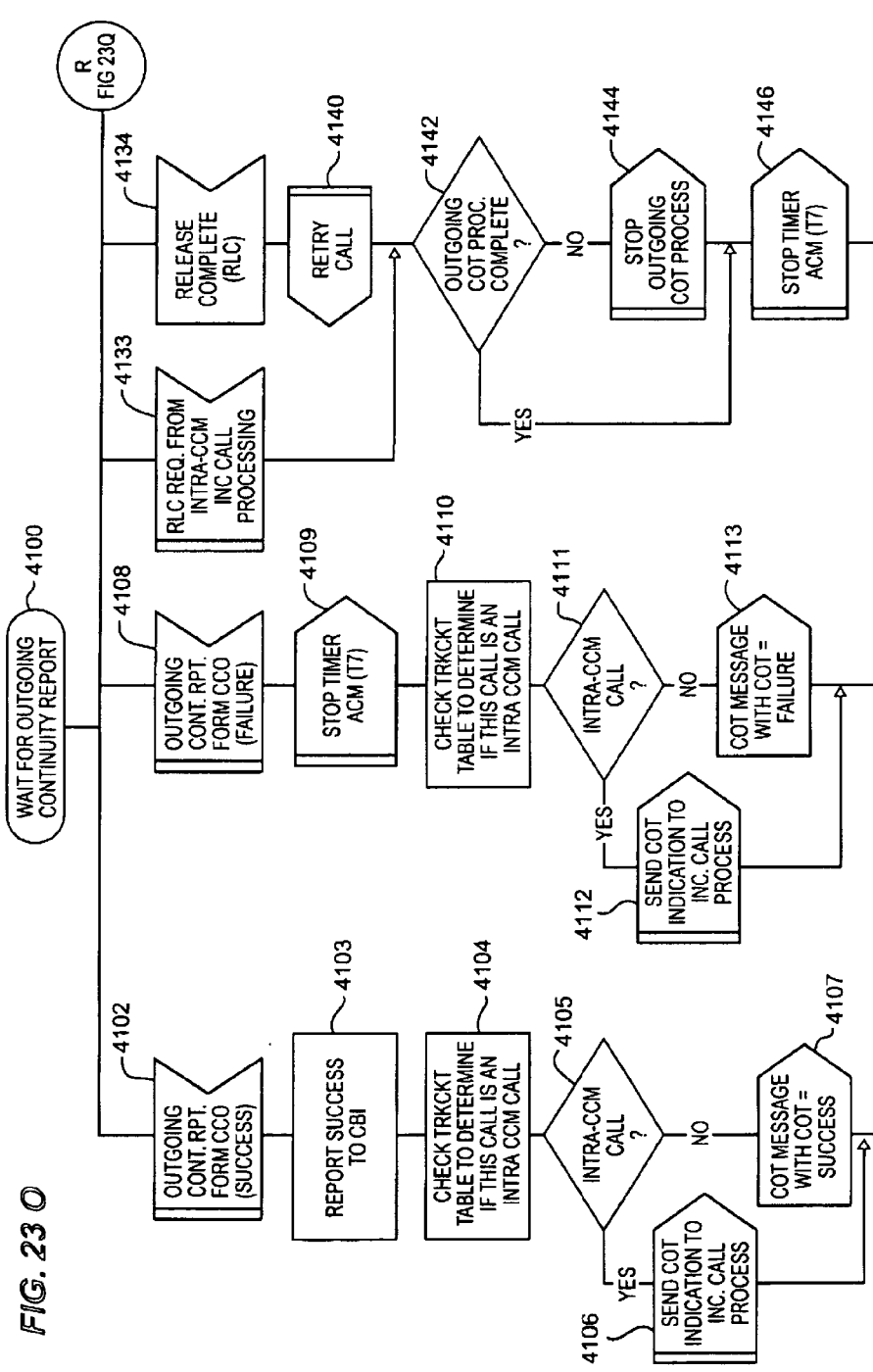
Figure 23Q:
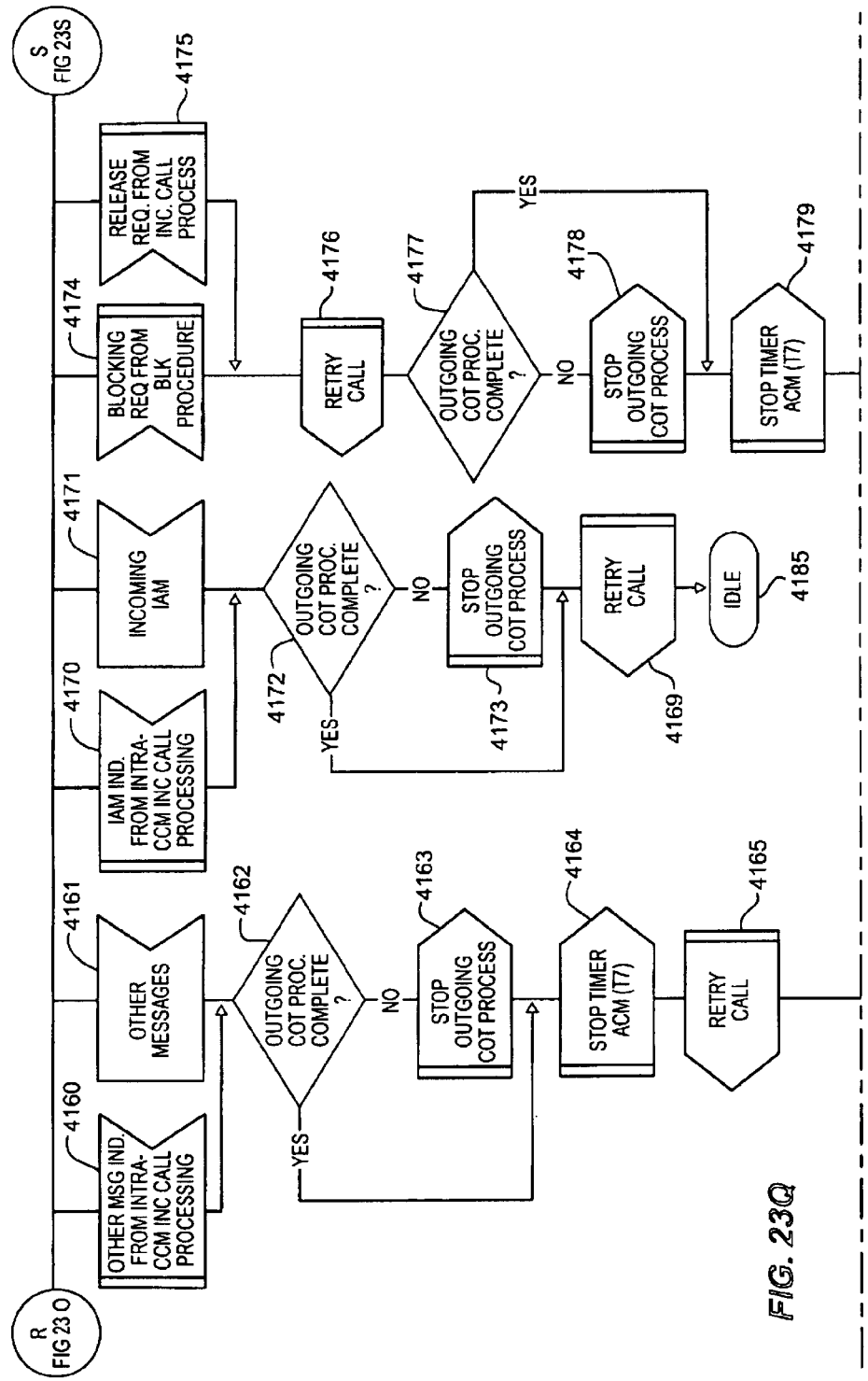
Figure 23R:
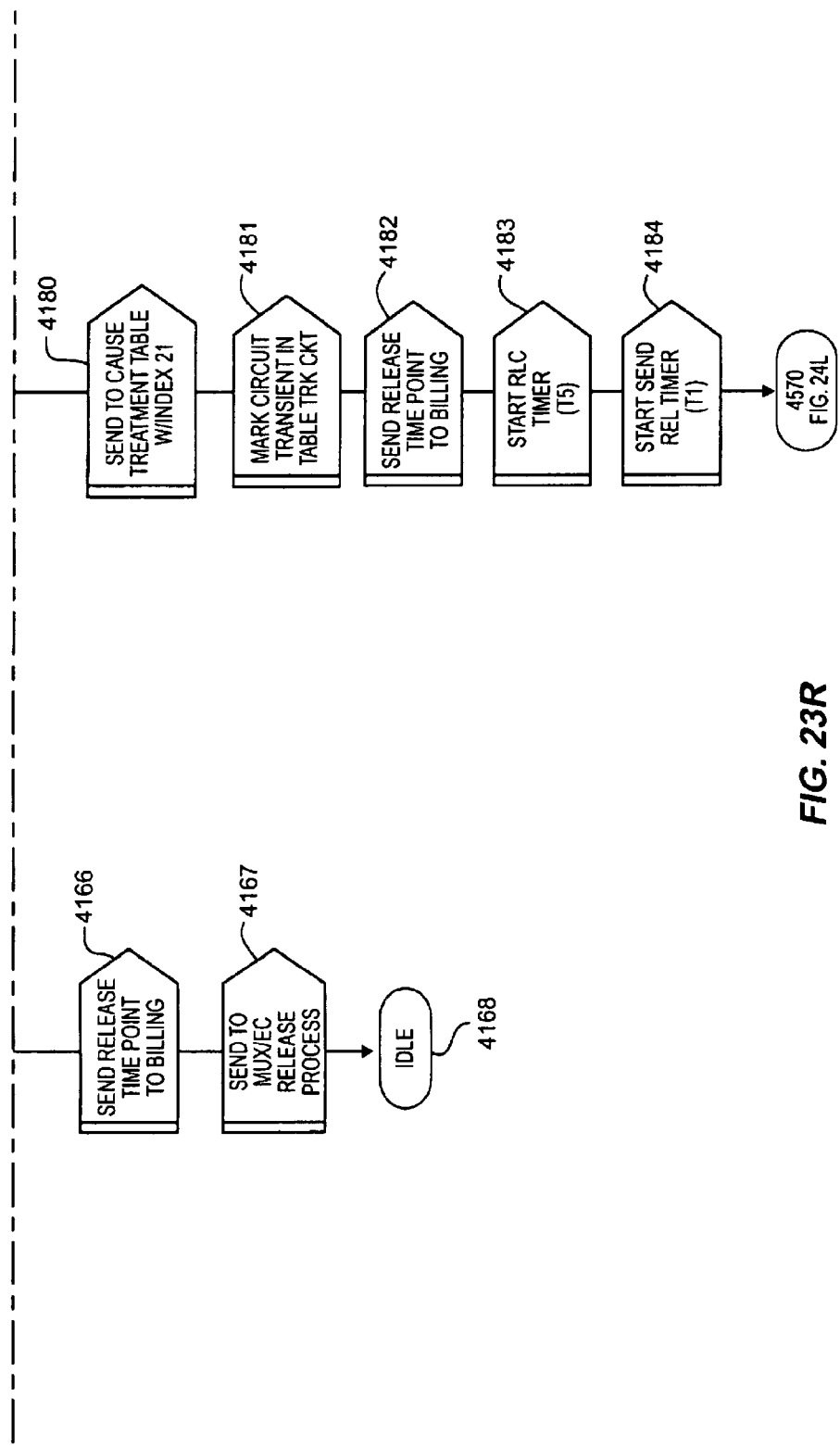
Figure 23T:
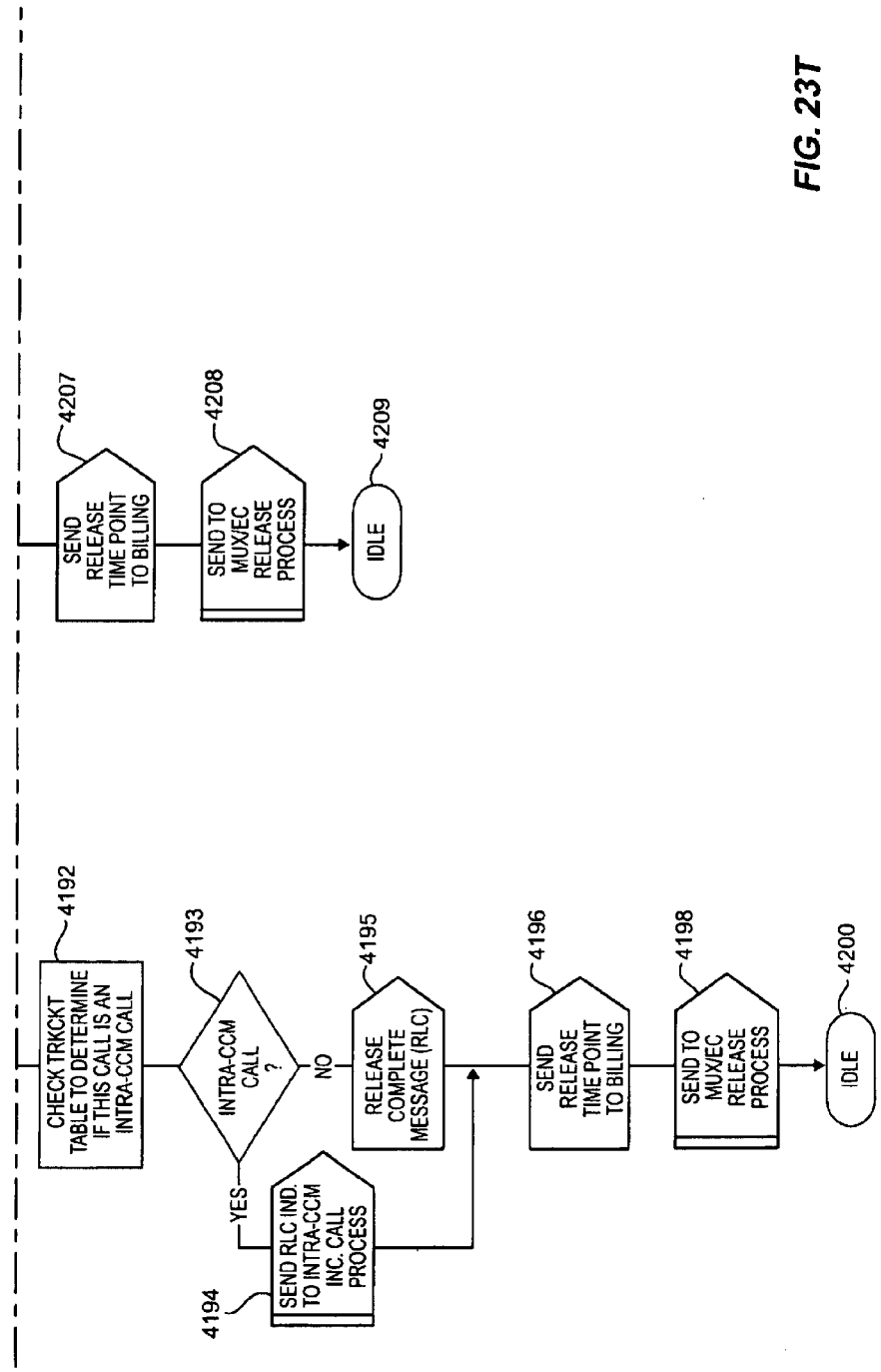

FIGS. 23A–23T depict trunk table processing by the terminating process of the BCM. On FIG. 23A at 3800, the terminating process is idle. The terminating process receives a next function for the trunk group table from the originating process at 3802. The index is matched at 3806 and 3808. If no match is found, maintenance is informed at 3810, a message is sent to the treatment table with cause 45 at 3812, and idle is attained at 3814. If a matching trunk group is found at 3808, the trunk group rotation scheme is checked at 3816 and determined at 3820.

If the rotation is most idle (MIDL) at 3822 and 3824, a message is sent to the most idle trunk selection process at 3826. This process will determine the trunk that has been idle the longest period of time at 3828 and return a trunk selection to the terminating process at 3830. The process then proceeds to 3870 (FIG. 23C).

If the rotation is least idle at 3822 and 3824, a message is sent to the least idle (LIDL) trunk selection process at 3832. This process will determine the trunk that has been idle the shortest period of time at 3834 and return a trunk selection to the terminating process at 3836. The process then proceeds to 3870. If the rotation is ascending (ASEQ) at 3838 and 3840, a message is sent to the ascending trunk selection process at 3842. This process will determine the trunk that is next in ascending order at 3844 and return a trunk selection to the terminating process at 3846. The process then proceeds to 3870 (FIG. 23C).

If the rotation is descending (DESEQ) at 3838 and 3840, a message is sent to the descending trunk selection process at 3848. This process will determine the trunk that is next in descending order at 3850 and return a trunk selection to the terminating process at 3852. The process then proceeds to 3870 (FIG. 23C).

If the rotation is clockwise (CWCTH) at 3854 and 3856, a message is sent to the clockwise trunk selection process at 3858. This process will determine the trunk that is next in clockwise order at 3860 and return a trunk selection to the terminating process at 3862. The process then proceeds to 3870 (FIG. 23C). If the rotation is counterclockwise at 3854 and 3856, a message is sent to the counter-clockwise. (CCWCTH) trunk selection process at 3864. This process will determine the trunk that is next in counter-clockwise order at 3866 and return a trunk selection to the terminating process at 3868. The process then proceeds to 3870 (FIG. 23C).

At 3870 (FIG. 23C), the satellite indicator is checked and if a satellite was used on the previous incoming circuit at 3872, the trunk group table is checked to determine if the selected trunk uses a satellite at 3874 and 3876. If a satellite would be used again, maintenance is informed at 3878, a message is sent to the treatment table with cause 47 at 3880, and idle is attained at 3882.

If a satellite will not be used again at 3876, the hop counter is checked at 3884 and 3886. If the hop counter is active, the CBI is checked at 3888 and 3890. If a hop counter is found in the CBI, it is decremented by one at 3892. If the hop counter is now zero at 3894, then maintenance is informed at 3896, a message is sent to the treatment table with cause 47 at 3898 and idle is attained at 3900.

If a satellite was not used on the incoming circuit at 3872, then the trunk group table is checked to determine if the selected outgoing.circuit (OGT) uses a satellite at 3902 and 3904. If a satellite would be used again at 3904, the network indicator is changed to indicate that a satellite has been used at 3906. After 3906 or if a satellite is not used at 3904, processing proceeds to 3884. If the determination at 3890 is negative, the IAM hop count is incremented by 20 at 3891, and processing proceeds to 3908. If the determinations at either 3886 or 3894 are negative, then processing proceeds to 3908. At 3908, the service indicator field is checked. At 3912, the type of trunk is determined.

If it is an TDM trunk (access), the trunk group is checked for COT capability at 3914 (FIG. 23E). Percentage calculations are performed at 3916 to determine if a continuity check is required at 3918. If the type of trunk is an A TM trunk (IMT) at 3912 (FIG. 23D), or if a continuity check is not required at 3918, then IAM parameters are determined at 3920 (FIG. 23E). If the trunk has a message index at 3922, then a message is sent to the message table at 3924, and the response is received at 3926. The response, the CIC, and the associated point codes are used to build the IAM at 3928 and 3930. Processing then proceeds to 3936. If no index is found at 3922, then the incoming IAM, the CIC, and the associated point codes are used to build the IAM at 3932 and 3934. After 3930 or 3934, a message is sent to the mux and echo canceller with the circuit-VPNC assignment at 3936, and a mux timer is set at 3938. The process continues at 3968 (FIG. 23G).

If a continuity check is required at 3918, the IAM parameters are determined at 3942. If the trunk has a message index at 3944, then a message is sent to the message table at 3946, and the response is received at 3948. The response, the CIC, and the associated point codes are used to build the IAM at 3950 and 3952. Processing then proceeds to 3958. If no index is found at 3944, then the incoming IAM, the CIC, and the associated point codes are used to build the IAM at 3954 and 3956. After 3952 or 3956, echo control is assessed at 3958. If echo control is not needed, a message is sent to the mux with the circuit—VPNC assignment at 3960, and a mux timer is set at 3962. Processing proceeds to 3968 (FIG. 23G). If echo control is required at 3958, then a message is sent to the mux and echo canceller with the circuit—VPNC assignment at 3964, and a mux timer is set at 3966. The process continues at 3968 (FIG. 23G).

The terminating process awaits a mux response at 3968 (FIG. 23G). If a message is received from the mux at 3970, the type of response is determined at 3972. If it is an acceptance, then the circuit is marked as transient at 3974, and a message that identifies the selected outgoing circuit is sent to the originating process at 3975. It is determined if the call is intra-call processor at 3976 and 3977. If the call is intra-call processor at 3977, an internal IAM with continuity is sent at 3978. If the call is not intra-call processor at 3977, an external IAM with continuity is sent at 3979. After 3978 or 3979, a message is sent to invoke outgoing continuity procedures at 3980. At 3982 the ACM timer is set, and the process proceeds to 4100 (FIG. 23O).

Figure 20C:
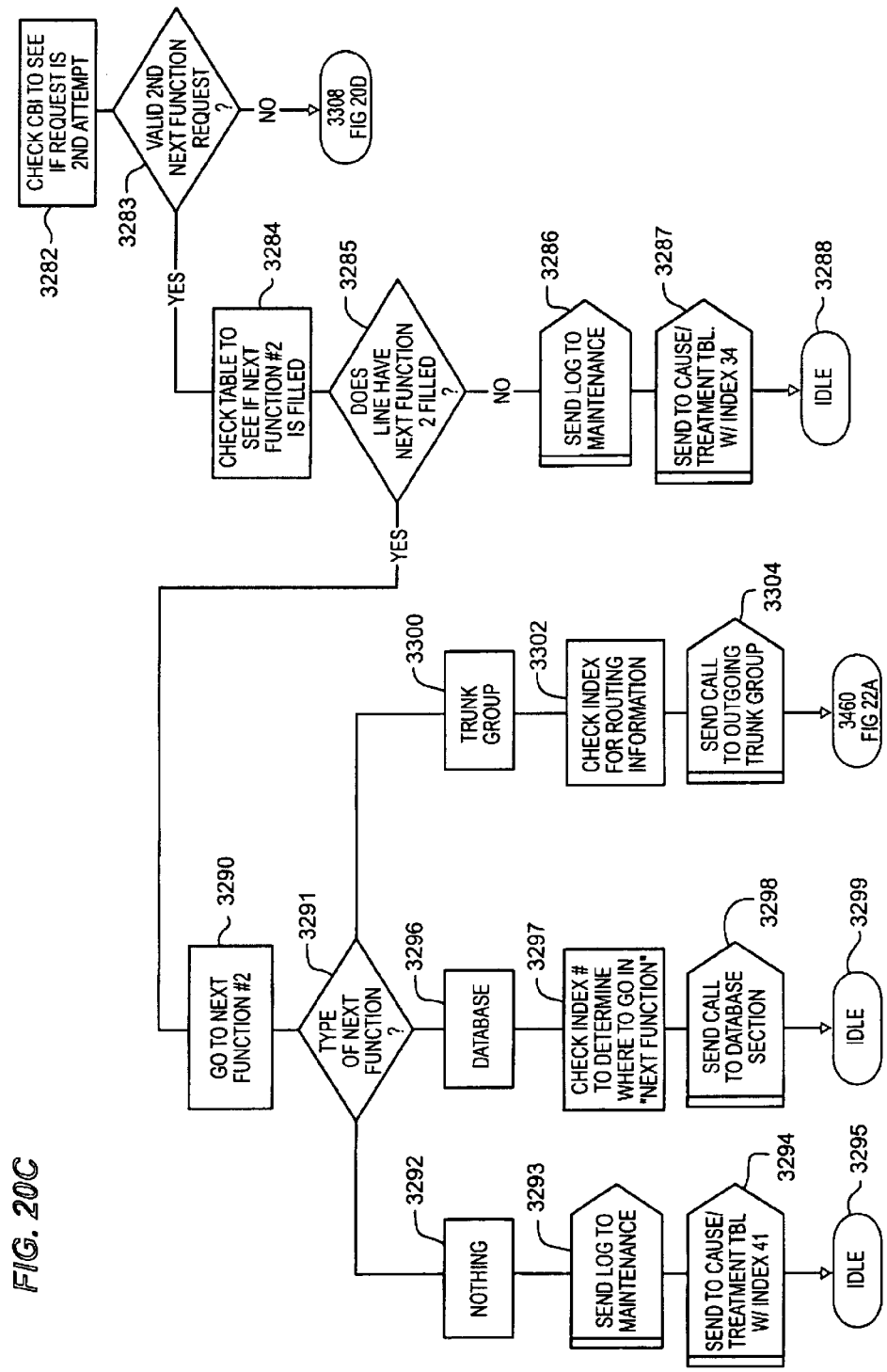

If the response at 3972 is a rejection, maintenance is informed at 3986. After 3986, the reattempt within the same trunk group is checked at 6050 and 6052. If reattempt is not allowed at 6052, the call counter is incremented to the next request at 6054, the next function is used at 6056, and processing proceeds to 3282 (FIG. 20C). If reattempt is allowed at 6052, a first attempt is checked in the CBI at 6058 and 6060. If it is not a first attempt at 6060, the call counter is incremented to the next request at 6062, the next function is used at 6064, and processing proceeds to 3282 (FIG. 20C). If this is a first attempt at 6060, the circuit is marked as maintenance busy at 6066, and the circuit blocking process is invoked at 6068. Call reattempt is incremented in the CBI at 6070, and the call is retried over the same trunk group at 6072. Processing proceeds to 3816 (FIG. 23A).

If the timer expires at 3992 (FIG. 23I), maintenance is informed at 3994, and a second message is sent to the mux with a different assignment at 3996. The mux timer is set at 3998, and a response is awaited at 4000. If the timer expires at 4002, maintenance is informed at 4004, a message is sent to the treatment table with cause 38 at 4006, a release point is sent to billing at 4008, and idle is attained at 4010. If a message is received from the mux at 4012, the type of response is determined at 4014. If it is an acceptance, then the circuit is marked as transient at 4016, and a message that identifies the selected outgoing-circuit is sent to the originating process at 4017.

It is determined if the call is intra-call processor at 4018 and 4019. If the call is intra-call processor at 4019, an internal IAM with continuity is sent at 4020. If the call is not intra-call processor at 4019, an external IAM with continuity is sent at 4021. After 4020 or 4021, a message is sent to invoke outgoing continuity procedures at 4022. At 4024 the ACM timer is set, and the process proceeds to 4100 (FIG. 23O).

If the response at 4014 is a rejection, the reattempt within the same trunk group is checked at 6076. If reattempt is not allowed at 6076, the call counter is incremented to the next request at 6078, the next function is used at 6080, and processing proceeds to 3282. If reattempt is allowed at 6076, a first attempt is checked in the CBI at 6082 and 6084. If it is not a first attempt at 6084, the call counter is incremented to the next request at 6086, the next function is used at 6088, and processing proceeds to 3282 (FIG. 20C). If this is a first attempt at 6084, the circuit is marked as maintenance busy at 6090, and the circuit blocking process is invoked at 6092. Call reattempt is incremented in the CBI at 6094, and the call is retried over the same trunk group at 6096. Processing proceeds to 3816 (FIG. 23A).

Figure 24A:
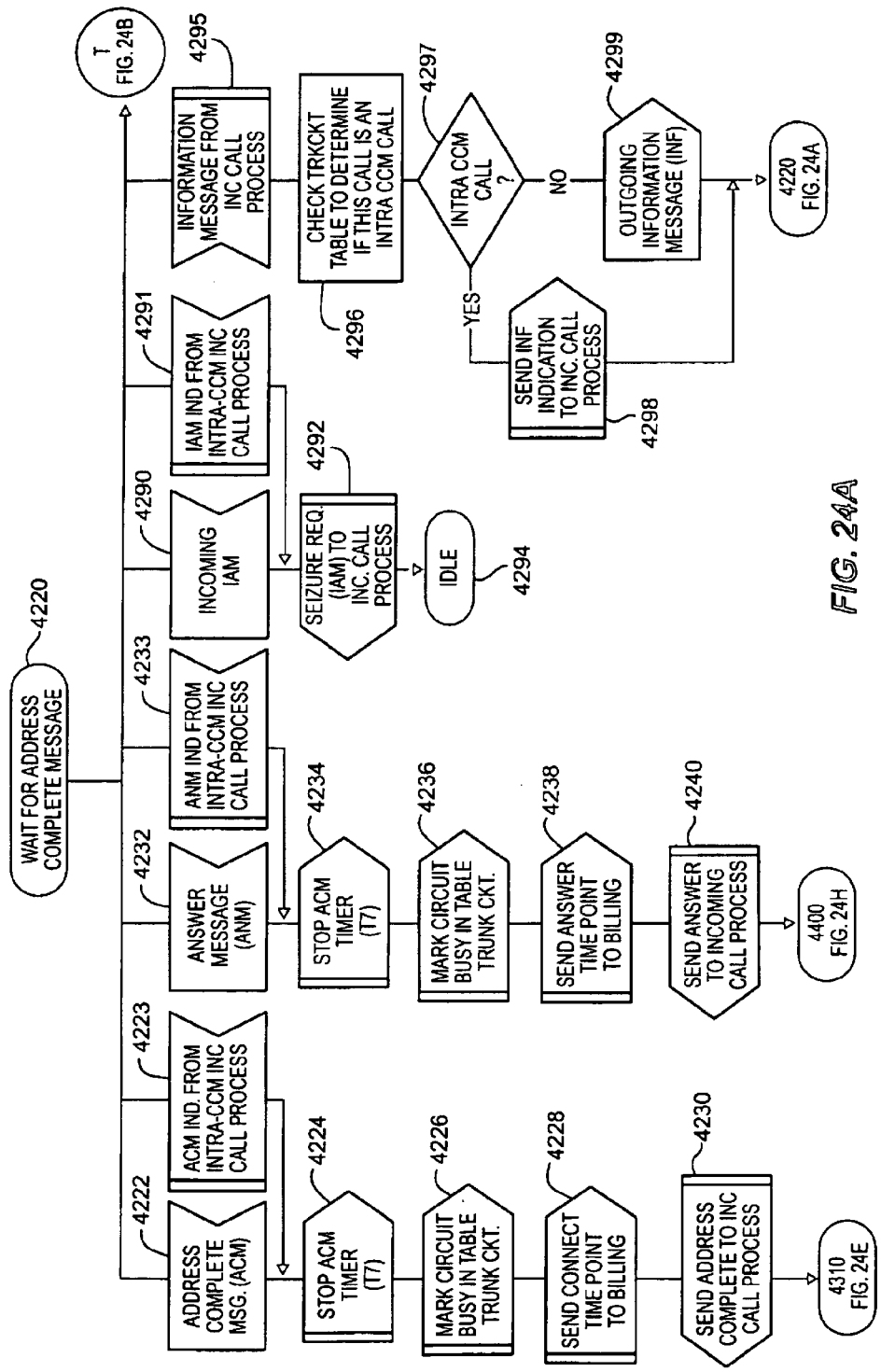
Figure 24B:
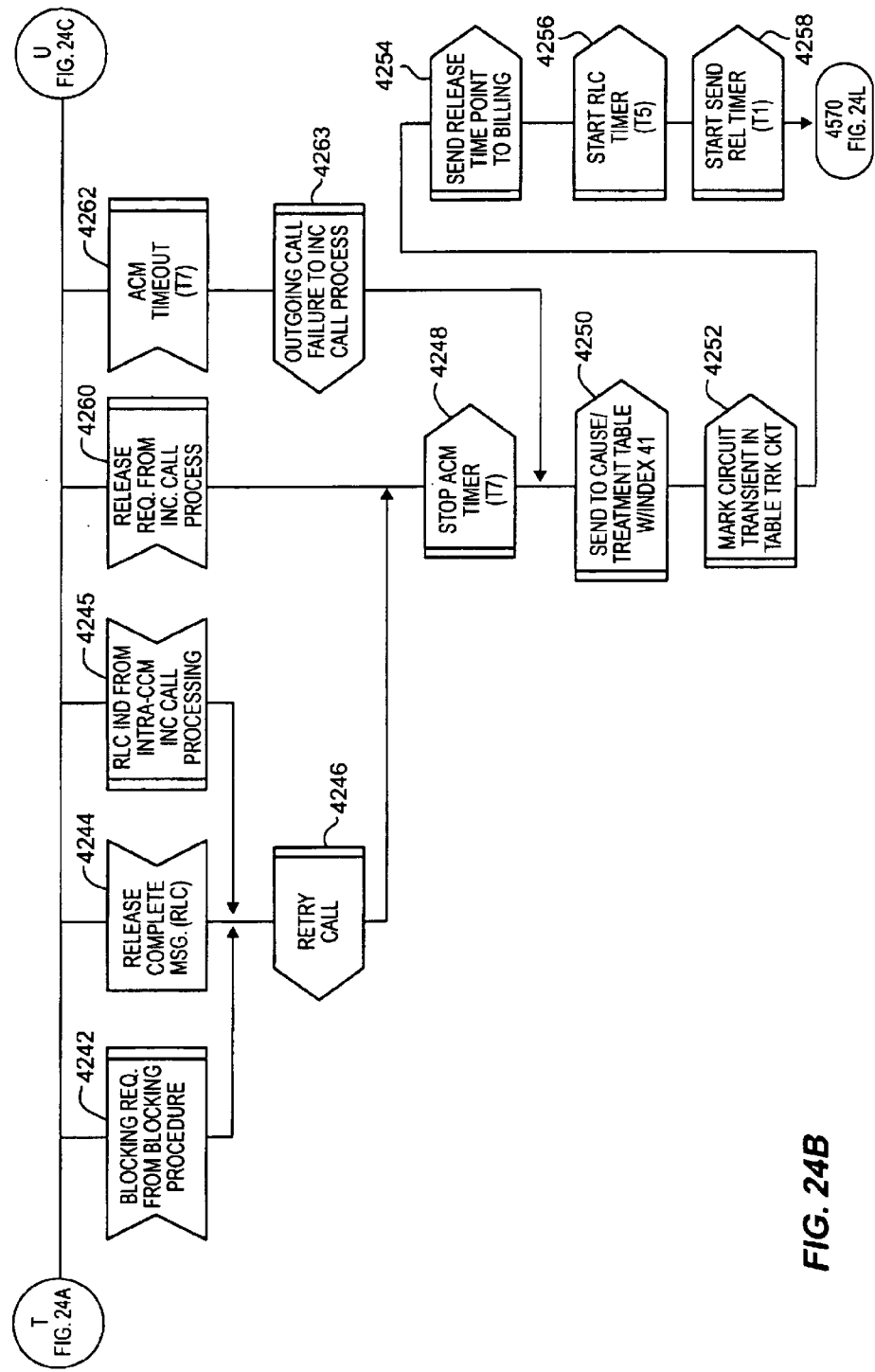
Figure 24C:
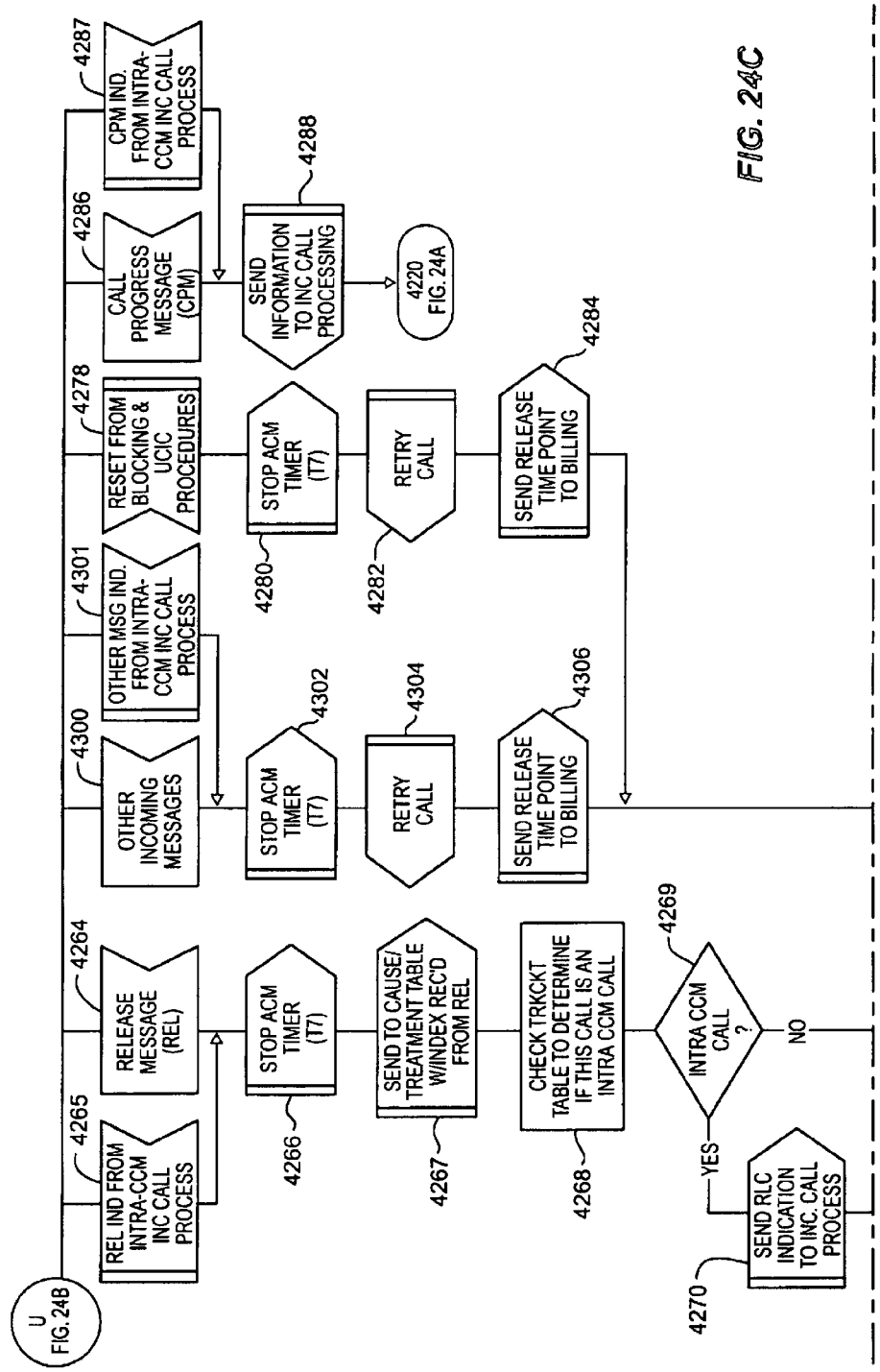
Figure 24D:
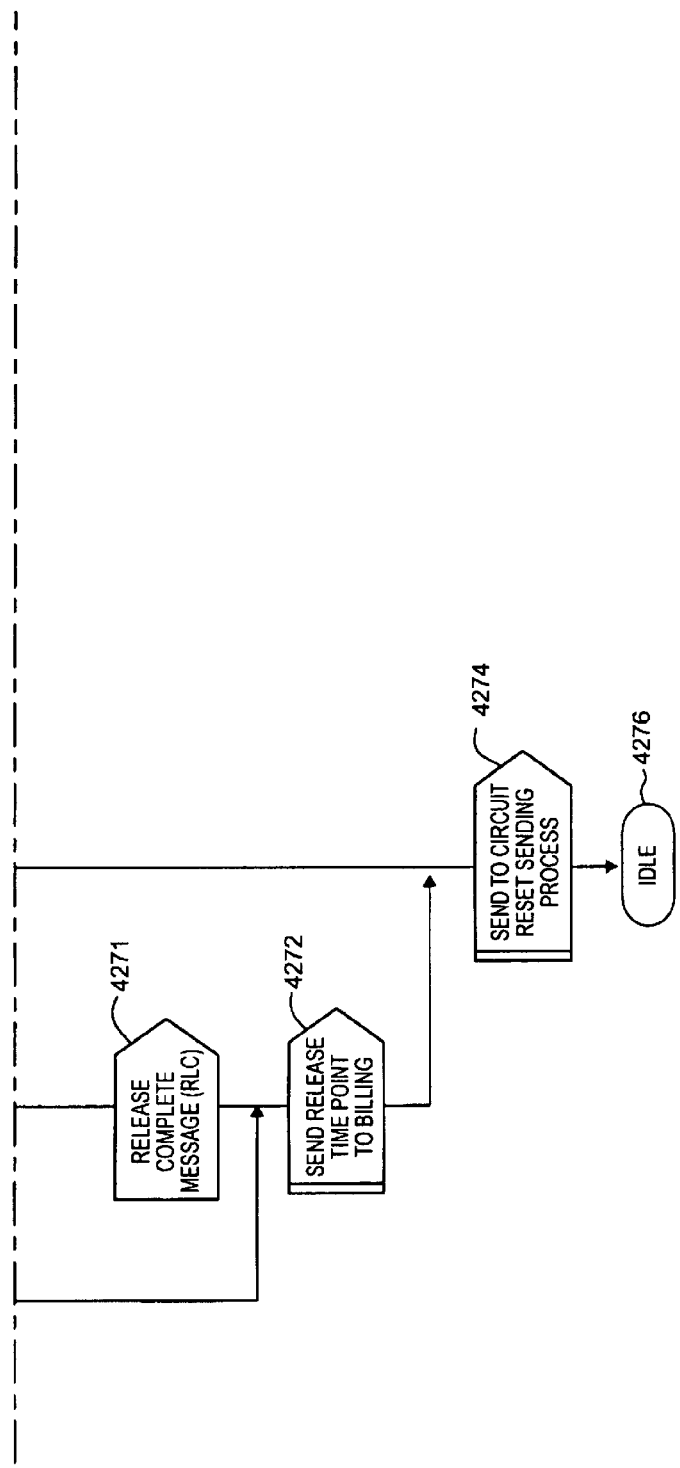

The terminating process awaits a mux response at 4040 (FIG. 23K). If a message is received from the mux at 4042, the type of response is determined at 4044. If it is an acceptance, then the circuit is marked as transient at 4046, and a message that identifies the selected outgoing circuit is sent to the originating process at 4047. It is determined if the call is intra-call processor at 4048 and 4049. If the call is intra-call processor at 4049, an internal IAM without continuity is sent at 4050. If the call is not intra-call processor at 4049, an external IAM without continuity is sent at 4051. After 4050 or 4051, the ACM timer is set at 4052, and the process proceeds to 4220 (FIG. 24A).

If the response at 4044 is a rejection, maintenance is informed at 4054. After 4054, the reattempt within the same trunk group is checked at 6100 and 6102. If reattempt is not allowed at 6102, the call counter is incremented to the next request at 6104, the next function is used at 6106, and processing proceeds to 3282 (FIG. 20C). If reattempt is allowed at 6102, a first attempt is checked in the CBI at 6108 and 6110. If it is not a first attempt at 6110, the call counter is incremented to the next request at 6112, the next function is used at 6114, and processing proceeds to 3282 (FIG. 20C). If this is a first attempt at 6110, the circuit is marked as maintenance busy at 6116, and the circuit blocking process is invoked at 6118. Call reattempt is incremented in the CBI at 6120, and the call is retried over the same trunk group at 6122. Processing proceeds to 3816 (FIG. 23A).

If the timer expires at 4060 (FIG. 23M), maintenance is informed at 4062, and a second message is sent to the mux with a different assignment at 4064. The mux timer is set at 4066, and a response is awaited at 4068. If the timer expires at 4070, maintenance is infoffiled at 4072, a message is sent to the treatment table with cause 38 at 4074, a release point is sent to billing at 4076, and idle is attained at 4078.

If a message is received from the mux at 4080, the type of response is determined at 4082. If it is an acceptance, then the circuit is marked as transient at 4084, and a message that identifies the selected outgoing circuit is sent to the originating process at 4085. It is determined if the call is intra-call processor at 4086 and 4087. If the call is intra-call processor at 4087, an internal IAM without continuity is sent at 4088. If the call is not intra-call processor at 4087, an external IAM without continuity is sent at 4089. After 4088 or 4089, the ACM timer is set at 4090, and the process proceeds to 4220 (FIG. 24A).

If the response at 4082 is a rejection, the reattempt within the same trunk group is checked at 6130. If reattempt is not allowed at 6130, the call counter is incremented to the next request at 6132, the next function is used at 6134, and processing proceeds to 3282 (FIG. 20C). If reattempt is allowed at 6130, a first attempt is checked in the CBI at 6136 and 6138. If it is not a first attempt at 6138, the call counter is incremented to the next request at 6140, the next function is used at 6142, and processing proceeds to 3282. If this is a first attempt at 6138, the circuit is marked as maintenance busy at 6144, and the circuit blocking process is invoked at 6146. Call reattempt is incremented in the CBI at 6148, and the call is retried over the sane trunk group at 6150. Processing proceeds to 3816 (FIG. 23A).

At 4100 (FIG. 23O), the terminating process awaits an outgoing continuity report. If the report is a success (continuity check outgoing—CCO) at 4102, the CBI is updated at 4103. It is determined if the call is intra-call processor at 4104 and 4105. If the call is intra-call processor at 4105, an internal COT (success) is sent at 4106. If the call is not intra-call processor at 4105, an external COT (success) is sent at 4107. After 4106 or 4107, processing proceeds to 4220 (FIG. 24A).

If the report is a failure at 4108, the ACM timer is stopped at 4109, and it is determined if the call is intra-call processor at 4110 and 4111. If the call is intra-call processor at 4111, an internal COT (fail) is sent at 4112. If the call is not intra-call processor at 4111, an external COT (fail) is sent at 4113. After 4112 or 4113, a retry capability is assessed at 4114, and if allowed at 4116, the call counter is incremented at 4118. A retry call message is sent to the originating process at 4120, and idle is attained at 4122. If retry is not allowed at 4116, the outgoing continuity recheck process is invoked with a message at 4124, and idle is attained at 4126.

Figure 24E:
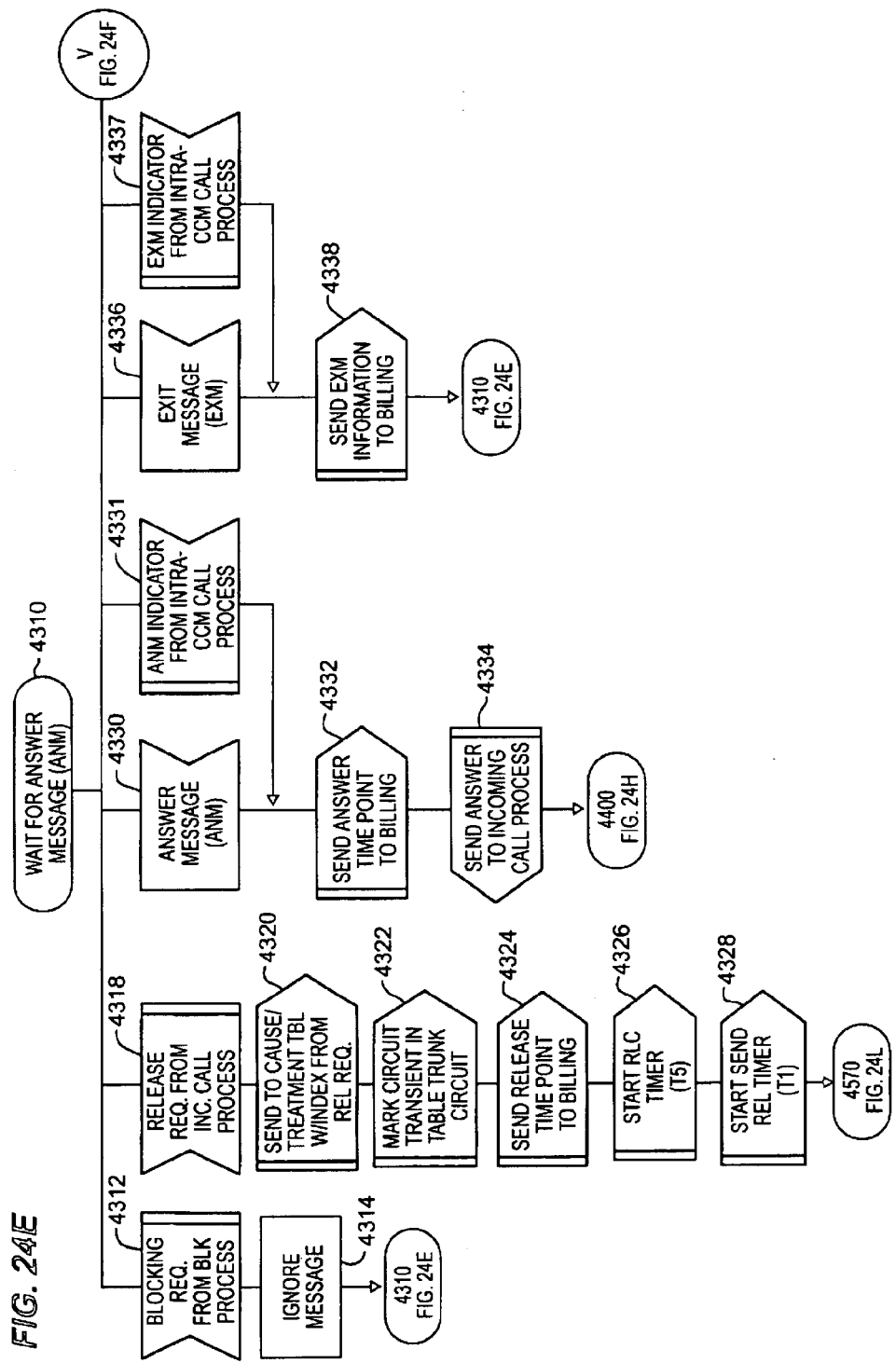
Figure 24F:
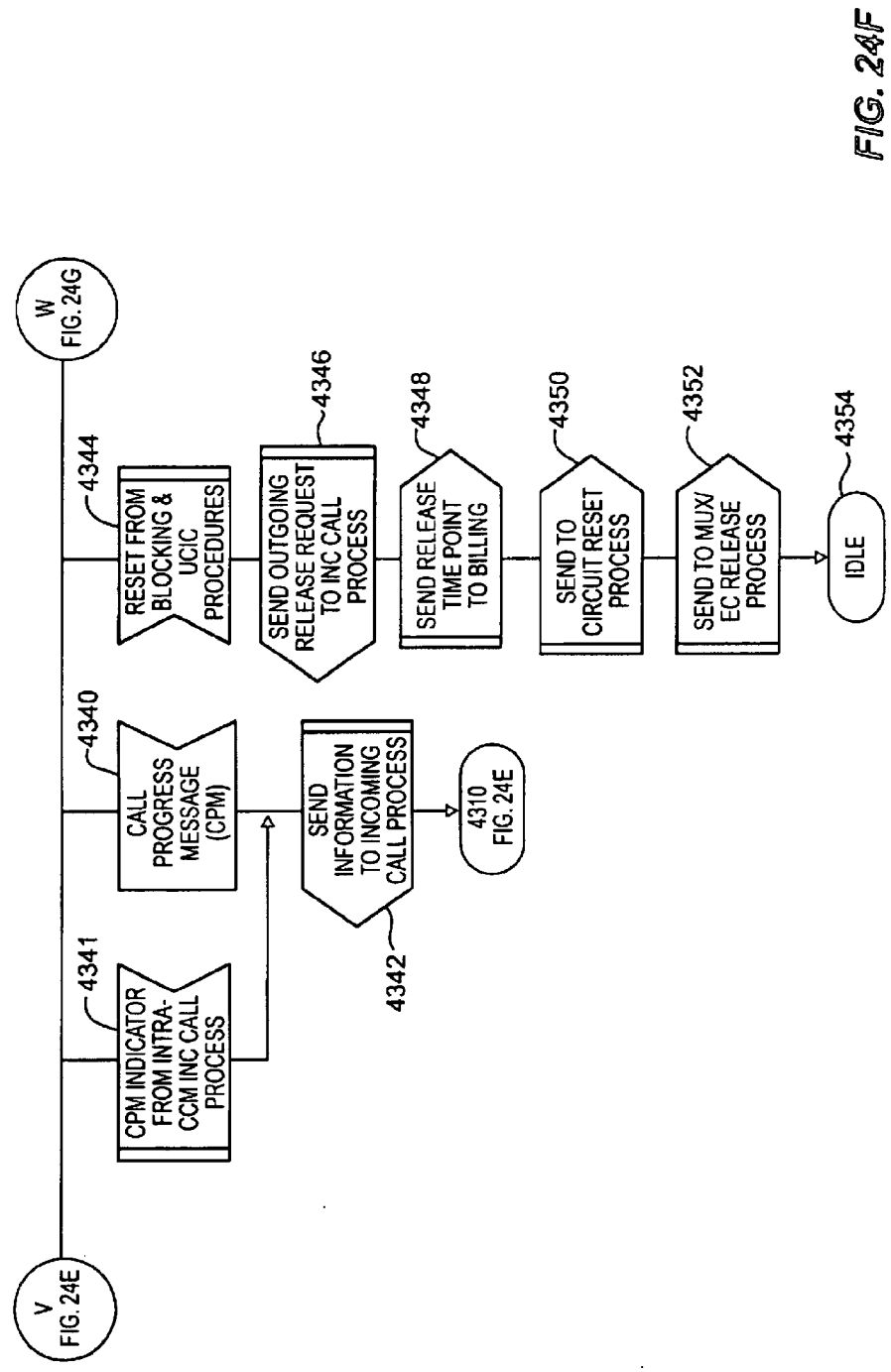
Figure 24G:
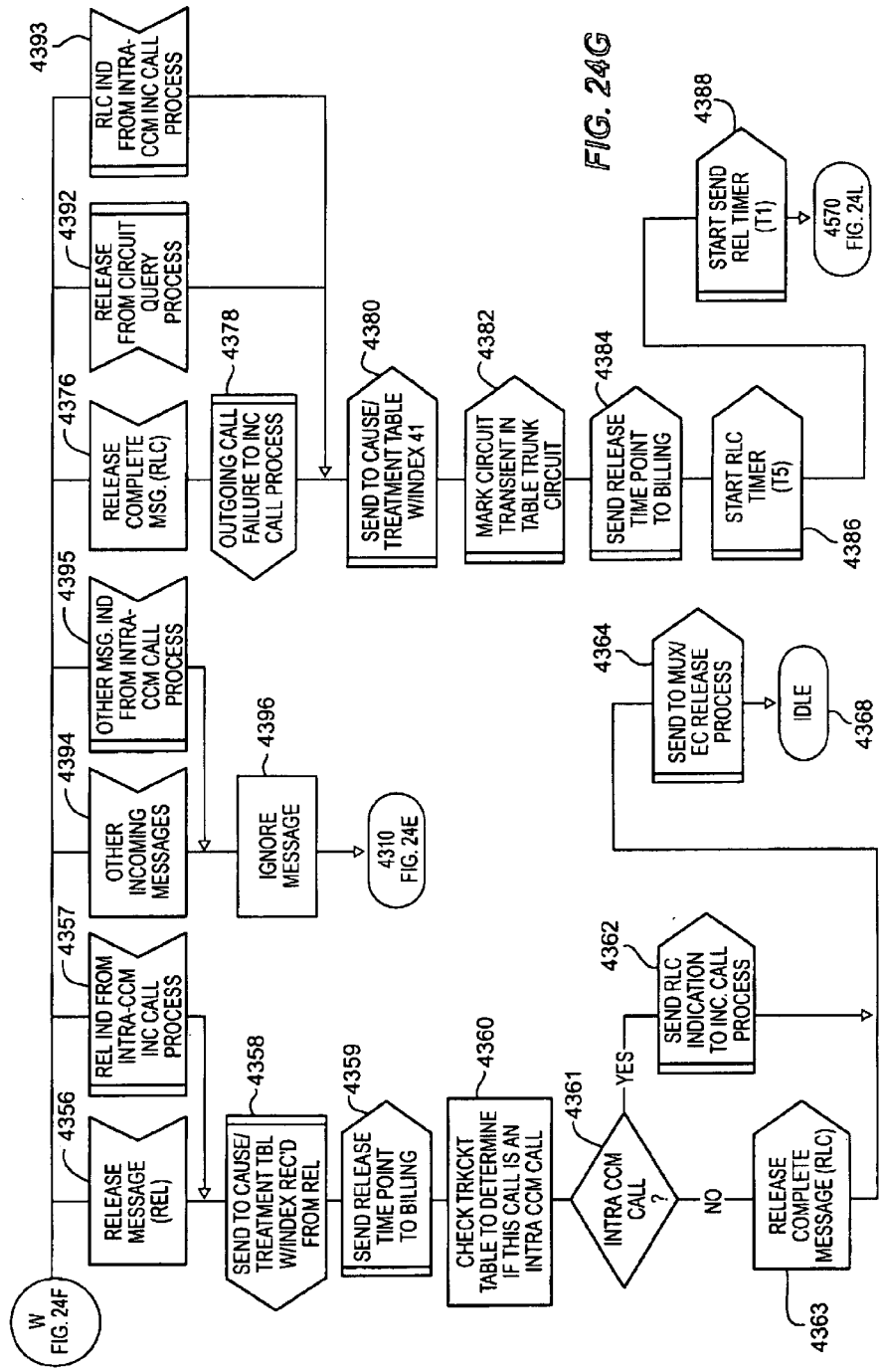
Figure 24H:
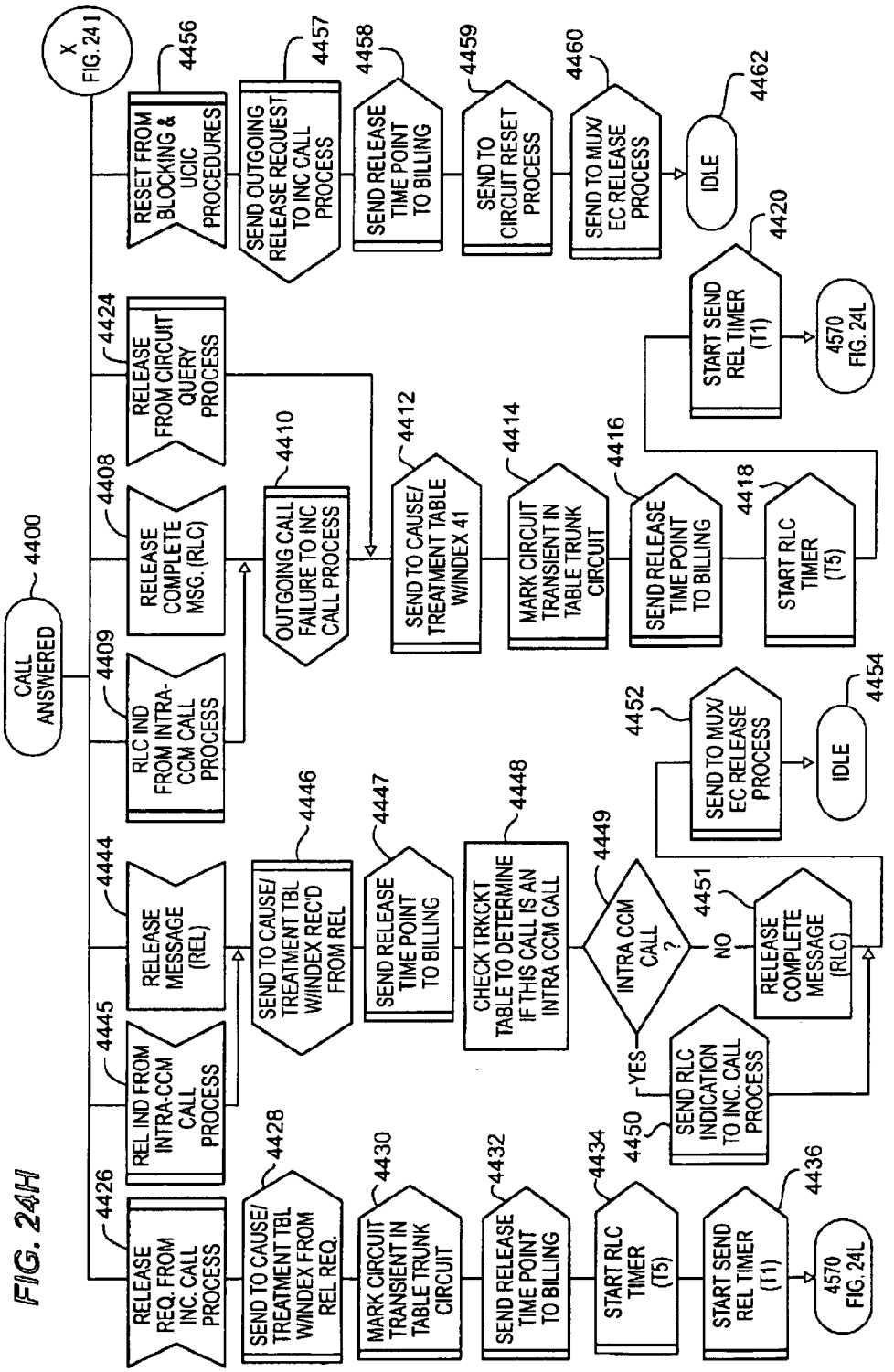
Figure 24J:
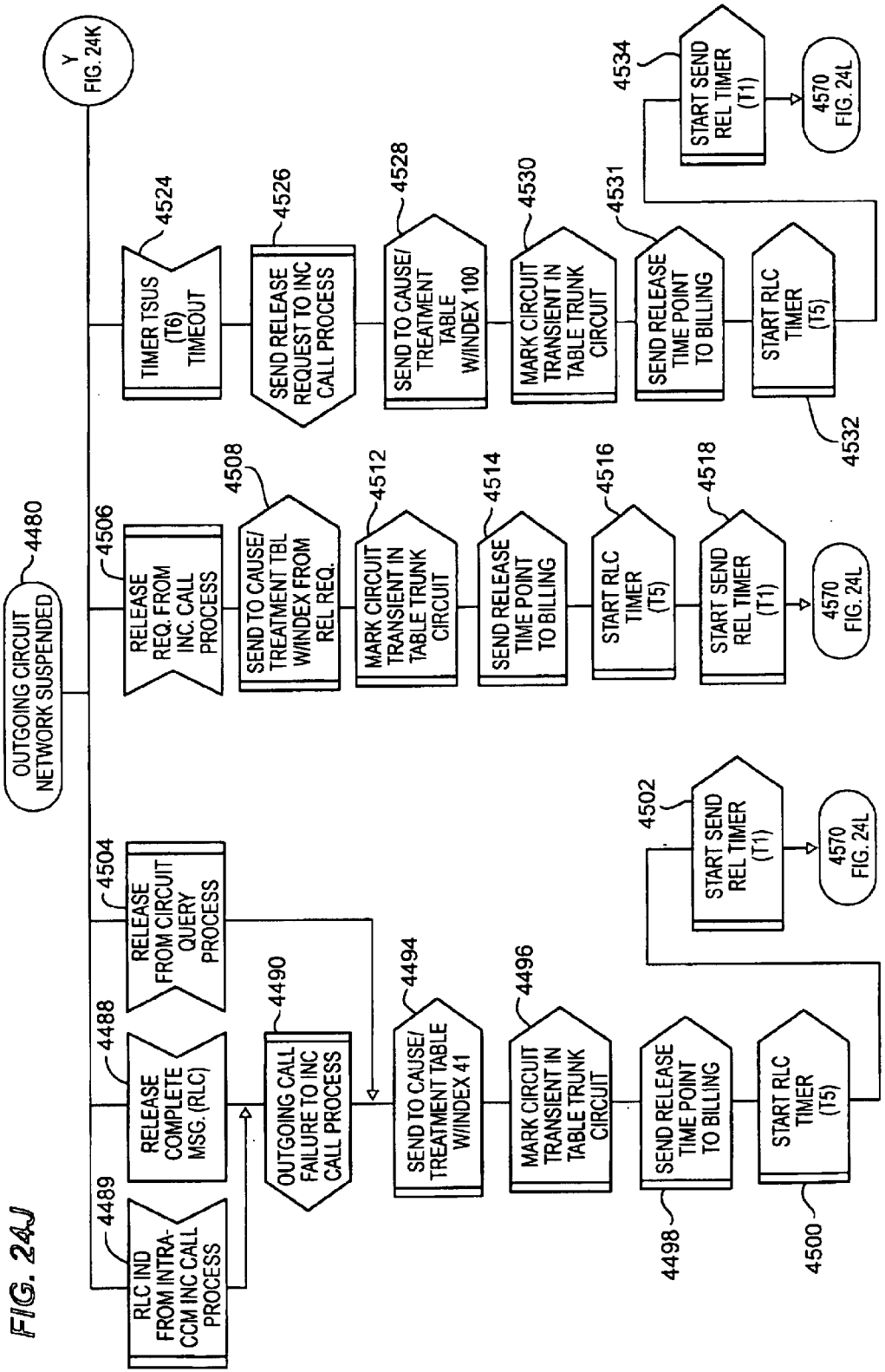
Figure 24K:
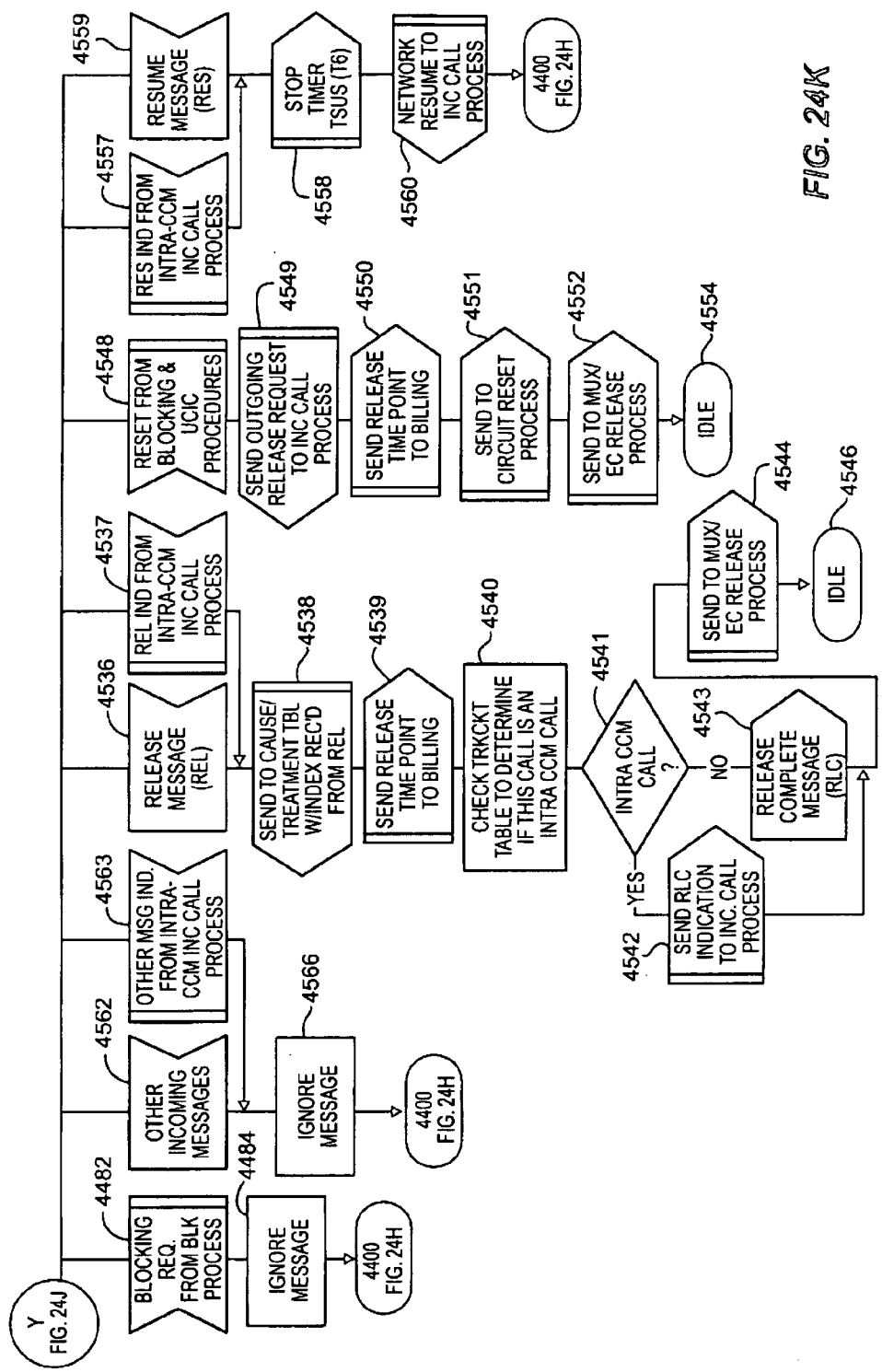
Figure 24L:
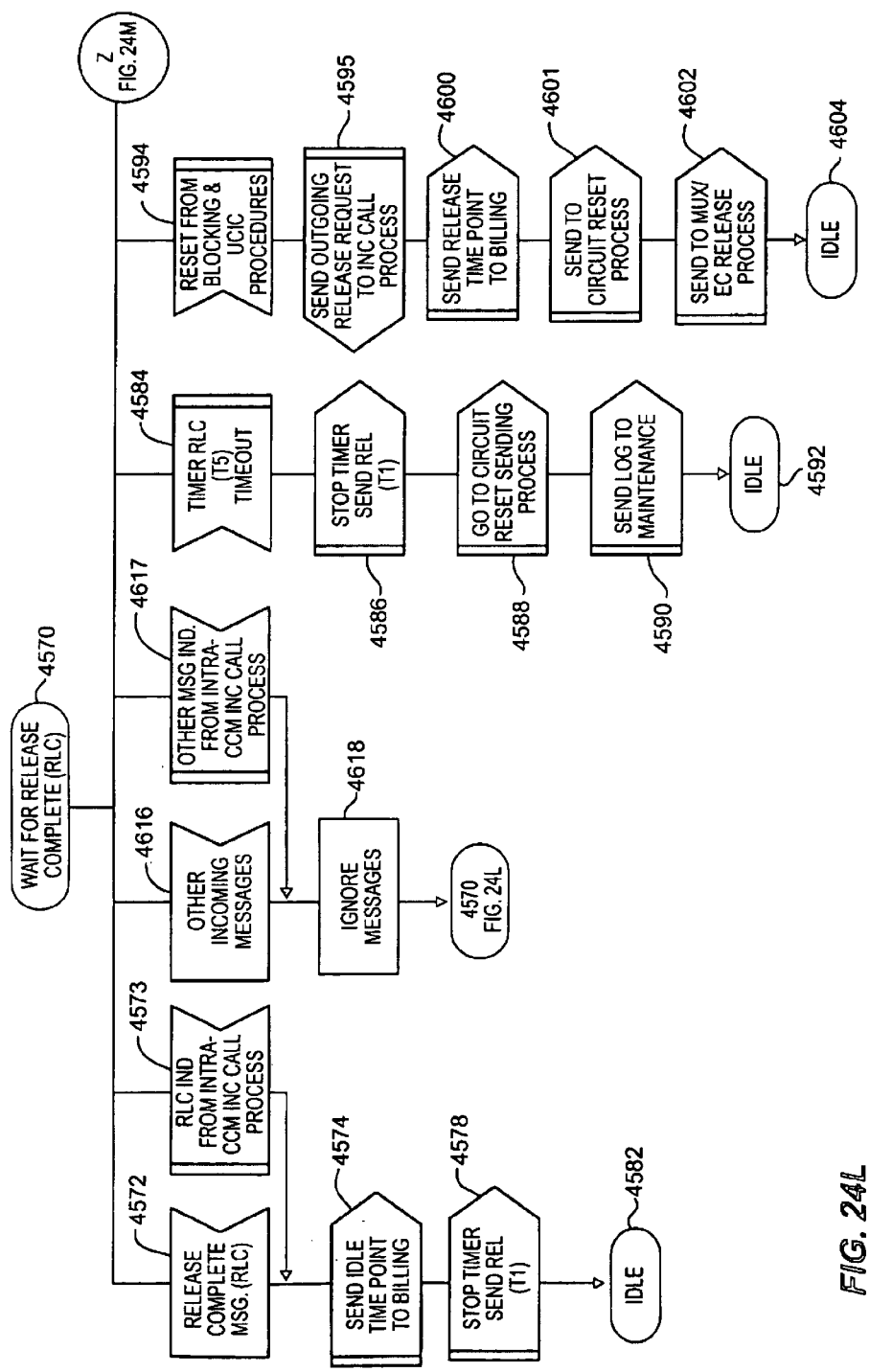
Figure 24M:
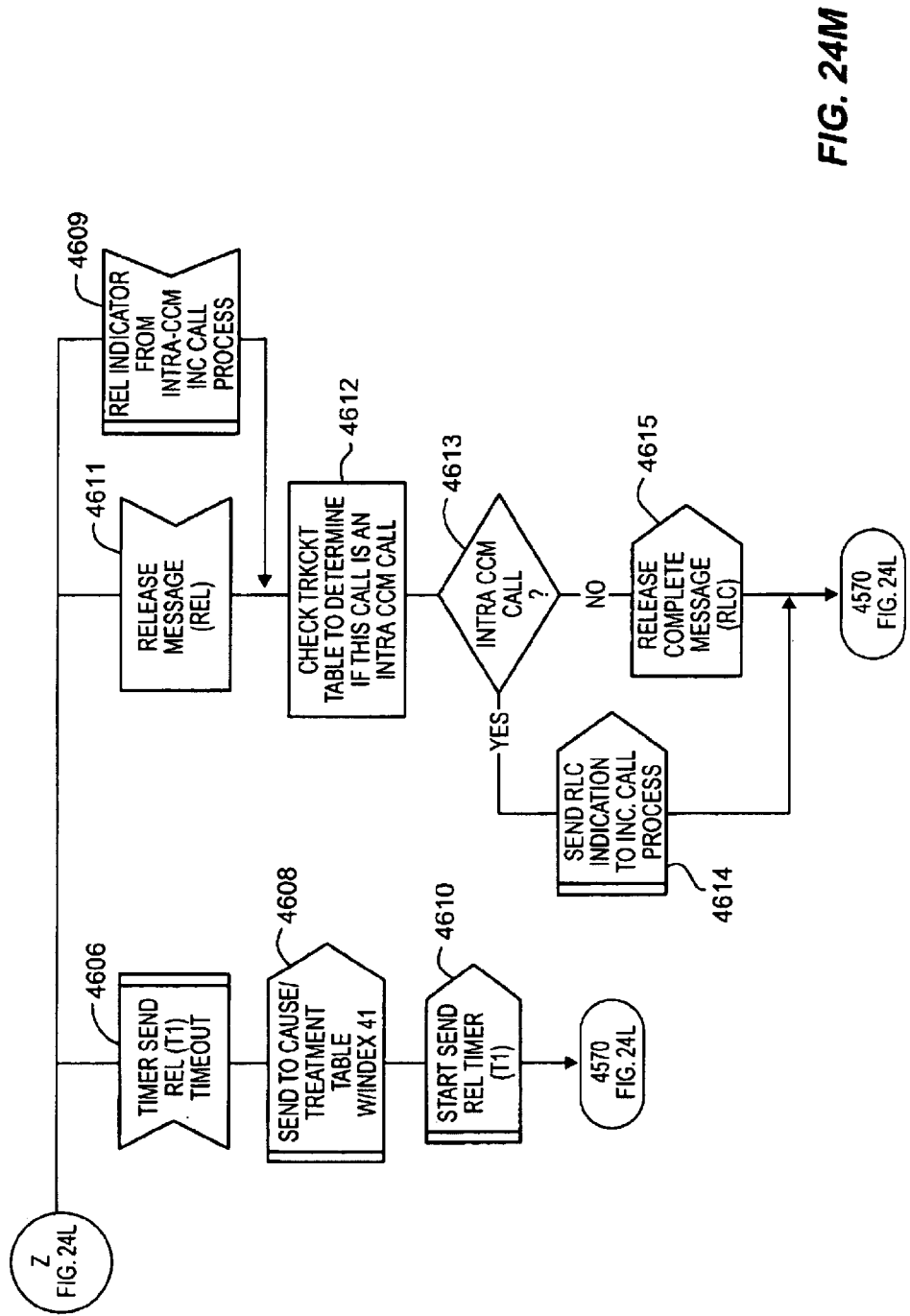

If an external RLC is received at 4134, a call retry request is sent 4140. After 4140, it is determined if the outgoing continuity procedure is complete at 4142. If not, the outgoing continuity procedure is stopped at 4144, and processing proceeds to 4146. If outgoing continuity procedures are complete at 4142, processing proceeds to 4146. The ACM timer is stopped at 4146, and a message is sent to the treatment table with cause 21 at 4148. The circuit is marked as transient at 4150, and a release time point is sent to billing at 4152. At 4154 an RLC timer is set, and at 4156 a set REL timer is set. Processing proceeds to 4570 (FIG. 24L). If an internal RLC is received at 4133, processing proceeds to 4142.

If another internal message is received at 4160 (FIG. 23O) or if another external message is received at 4161, it is determined if the outgoing continuity procedure is complete at 4162. If not, the outgoing continuity procedure is stopped at 4163, and processing proceeds to 4164. If outgoing continuity procedures are complete at 4162, processing proceeds to 4164. The ACM timer is stopped at 4164, and a message is sent to the originating process for call retry at 4165. A release time point is sent to billing at 4166. At 4167, a message invokes the mux release process, and idle is attained at 4168.

If an internal IAM is received at 4170 or if an external IAM is received at 4171, it is determined if the outgoing continuity procedure is complete at 4172. If not, the outgoing continuity procedure is stopped at 4173. Call retry is attempted at 4169, and idle is attained at 4185. If a blocking request is received at 4174 or if a release request is received from the incoming process at 4175, a call retry request is sent at 4176. After 4176, it is determined if the outgoing continuity procedure is complete at 4177. If not, the outgoing continuity procedure is stopped at 4178, and processing proceeds to 4179. If outgoing continuity procedures are complete at 4177, processing proceeds to 4179. The ACM timer is stopped at 4179, and a message is sent to the treatment table with cause 21 at 4180. The circuit is marked as transient at 4181, and a release time point is sent to billing at 4182. At 4183, an RLC timer is set, and at 4184, a send REL timer is set. Processing proceeds to 4570 (FIG. 24L).

If an external REL is received from the succeeding network element at 4186 (FIG. 23S) or if an internal REL is received at 4187, it is determined if the outgoing continuity procedure is complete at 4188. If not, the outgoing continuity procedure is stopped at 4189, and processing proceeds to 4190. If outgoing continuity procedures are complete at 4188, processing proceeds to 4190. The ACM timer is stopped at 4190, and a message is sent to the treatment table with cause from the REL at 4191. It is determined if the call is intra-call processor at 4192 and 4193. If the call is intra-call processor at 4193, an internal RLC is sent at 4194. If the call is not intra-call processor at 4193, an external RLC is sent at 4195. After 4194 or 4195, a release time point is sent to billing at 4196. At 4198, a message invokes mux/echo release procedures, and idle is attained at 4200.

If a blocking reset is received at 4202, it is determined if the outgoing continuity procedure is complete at 4203. If not, the outgoing continuity procedure is stopped at 4204, and processing proceeds to 4205. If outgoing continuity procedures are complete at 4203, processing proceeds to 4205. The ACM timer is stopped at 4205, and a message is sent to the originating process for call retry at 4206. A release time point is sent to billing at 4207. At 4208, a messages invokes mux/echo release procedures, and idle is attained at 4209.

If an information message is received from the originating process at 4210, it is determined if the call is intra-call processor at 4211 and 4212. If the call is intra-call processor at 4212, an internal INF is sent at 4213. If the call is not intra-call processor at 4212, an external INF is sent at 4214. After 4213 or 4214, processing proceeds back to 4100 (FIG. 23O).

Terminating Process—Call Completion

At various points above, the terminating process handling the outgoing side of the call may wait for some message or action on the call before call completion. Some examples are waiting for an ACM, ANM, or RLC. FIGS. 24A–24M depict this call completion processing by the terminating process of the BCM.

On FIG. 24A at 4220, the terminating process is waiting for an ACM. If an external ACM is received at 4222 or if an internal ACM is received at 4223, the ACM timer is stopped at 4224, and the circuit is marked as busy at 4226. At 4228, the connect time point is sent to billing, and the ACM is sent to the originating process at 4230. The process then proceeds to 4310 (FIG. 24E).

If an external ANM is received at 4232 or if an internal ANM is received at 4233, the ACM timer is stopped at 4234, and the circuit is marked as busy at 4236. At 4238, the answer time point is sent to billing, and the ANM is sent to the originating process at 4240. The process then proceeds to 4400 (FIG. 24H).

If a blocking request is received at 4242 (FIG. 24B), if an external RLC is received at 4244, or if an internal RLC is received at 4245, a call retry message is sent to the originating process at 4246. At 4248, the ACM timer is stopped, and a message is sent to the treatment table with index 41 at 4250. At 4252, the circuit is marked as transient, and a release time point is sent to billing at 4254. At 4256 the RLC timer is started, and at 4258, the send REL timer is started. The process proceeds to 4570 (FIG. 24L). If a release request is received from the originating process at 4260, processing proceeds to 4248. If an ACM timer times out at 4262, a call failure message is sent to the originating process at 4263, and the process proceeds to 4250.

If an external REL is received at 4264 (FIG. 24D) or if an internal REL is received at 4265, the ACM timer is stopped at 4266, and a message is sent to the treatment table with the cause from the REL at 4267. It is determined if the call is intra-call processor at 4268 and 4269. If the call is intra-call processor at 4269, an internal RLC is sent at 4270. If the call is not intra-call processor at 4269, an external RLC is sent at 4271. After 4270 or 4271, a release time point is sent to billing at 4272. At 4274, a message is sent to invoke the circuit reset process, and idle is attained at 4276.

If a reset from blocking is received at 4278, the ACM timer is stopped at 4280, and a call retry is sent to the originating process at 4282. A release time point is sent to billing at 4284, and the process proceeds to 4274. If an external CPM is received at 4286 or if an internal CPM is received at 4287, the information is sent to the originating process at 4288, and the process proceeds back to 4220.

If an external IAM is received at 4290 (FIG. 24A) or if an internal IAM is received at 4291, a seizure message is sent to the originating process at 4292, and idle is attained at 4294. If an INF message is received at 4295, it is determined if the call is intra-call processor at 4296 and 4297. If the call is intra-call processor at 4297, an internal INF is sent at 4298. If the call is not intra-call processor at 4297, an external INF is sent at 4299. After 4298 or 4299, the process proceeds back to 4220 (FIG. 24A).

If another external message is received at 4300 (FIG. 24C) or if an internal ACM is received at 4301, the ACM timer is stopped at 4302, and a call retry is sent to the originating process at 4304. A release time point is sent to billing at 4306, and the process proceeds to 4274.

At 4310 (FIG. 24E), the terminating process is awaiting an ANM. If a blocking request is received at 4312, it is ignored at 4314, and the process proceeds back to 4310. If a release request is received from the originating process at 4318, a message is sent to the treatment table with the index from the release at 4320. At 4322, the circuit is marked as transient, and a release time point is sent to billing at 4324. The RLC timer is started at 4326, and the send REL timer is started at 4328. The process proceeds to 4570 (FIG. 24L).

If an external ANM is received at 4330 or if an internal ANM is received at 4331, an answer time point is sent to billing at 4332, and the ANM is forwarded to the originating process at 4334. The process proceeds to 4400 (FIG. 24H).

If an external EXM is received at 4336 or if an internal EXM is received at 4337, the EXM information is sent to billing at 4338. The process returns to 4310 FIG. 24E).

If an external CPM is received at 4340 or if an internal CPM is received at 4341, the information is sent to the originating process at 4342, and the process returns to 4310 (FIG. 24E). If reset from blocking is received at 4344, a release request is sent to the originating process at 4346, and a release time point is sent to billing at 4348. A message is sent to the circuit reset process at 4350, and a release message is sent to the mux/echo process at 4352. Idle is attained at 4354.

If an external REL is received at 4356 (FIG. 24G) or if an internal REL is received at 4357, a message is sent to the treatment table with the index from the REL at 4358, and a release time point is sent to billing at 4359. It is determined if the call is intra-call processor at 4360 and 4361. If the call is intra-call processor at 4361, an internal RLC is sent at 4362. If the call is not intra-call processor at 4361, an external INF is sent at 4363. After 4362 or 4363; a message is sent the mux/echo release process at 4364. Idle is attained 4368.

If an external RLC is received at 4376, a call failure message is sent to the originating process at 4378. At 4380, a message is sent to the treatment table with index 41. At 4382, the circuit is marked as transient, and a release time point is sent to billing at 4384. At 4386, the RLC timer is started, and, at 4388, the send REL timer is started. The process proceeds to 4570 (FIG. 25L).

If a release is received from the circuit query process at 4392 or if an internal RLC is received at 4393, the process proceeds to 4380. If other external messages are received at 4394 or if another internal message is received at 4395, they are ignored at 4396, and the process returns to 4310 (FIG. 24E).

At 4400 (FIG. 24H), the call has been answered and is active. If a blocking request is received at 4402, it is ignored at 4404, and the process proceeds back to 4400. If an external RLC is received at 4408 or if an internal RLC is received at 4409, a call failure message is sent to the originating process at 4410. At 4412, a message is sent to the treatment table with index 41. At 4414, the circuit is marked as transient, and a release time point is sent to billing at 4416. At 4418, the RLC timer is started, and, at 4420, the send REL timer is started. The process proceeds to 4570 (FIG. 24L).

If a release request is received from the circuit query process at 4424, processing proceeds to 4412. If a release request is received from the originating process at 4426, a message is sent to the treatment table with the index from the release at 4428. At 4430, the circuit is marked as transient, and a release time point is sent to billing at 4432. The RLC timer is started at 4434, and the send REL timer is started at 4436. The process proceeds to 4570 (FIG. 24L).

If an external CPM is received at 4440 or if an internal CPM is received at 4441, the information is sent to the originating process at 4442, and the process returns to 4400. If an external REL is received at 4444 or if an internal REL is received at 4445, a message is sent to the treatment table with the index from the REL at 4446, and a release time point is sent to billing at 4447. It is determined if the call is intra-call processor at 4448 and 4449. If the call is intra-call processor at 4449, an internal RLC is sent at 4450. If the call is not intra-call processor at 4449, an external RLC is sent at 4451. After 4450 or 4451, a message is sent to the mux/echo release process at 4452. Idle is attained 4454.

If reset from blocking is received at 4456, a release request is sent to the originating process at 4457, and a release time point is sent to billing at 4458. A message is sent to the circuit resent process at 4459, and a release message is sent to the mux/echo process at 4460. Idle is attained at 4462.

If an external SUS message is received at 4464 or if an internal SUS is received at 4465, the SUS timer is set at 4466, and the SUS is forwarded to the originating process at 4468. The process proceeds to 4480 (FIG. 24J). If other external messages are received at 4472 or if other internal messages are received at 4473, they are ignored at 4474, and the process returns to 4400.

At 4480 (FIG. 24J), the outgoing circuit has been suspended. If an external RLC is received at 4488 or if an internal RLC is received at 4489, a call failure message is sent to the originating process at 4490. At 4494 a message is sent to the treatment table with index 41. At 4496, the circuit is marked as transient, and a release time point is sent to billing at 4498. At 4500, the RLC timer is started, and, at 4502, the send REL timer is started. The process proceeds to 4570 (FIG. 24L).

If a release request is received from the circuit query process at 4504, the process proceeds to 4494. If a release request is received from the originating process at 4506, a message is sent to the treatment table with the index from the release at 4508. At 4512, the circuit is marked as transient, and a release time point is sent to billing at 4514. The RLC timer is started at 4516, and the send REL timer is started at 4518. The process proceeds to 4570 (FIG. 24L).

If the suspend timer times out at 4524, a release request is sent to the originating process at 4526, and a message is sent to the treatment table with index 100 at 4528. At 4530, the circuit is marked as transient. The RLC timer is started at 4532, and the send REL timer is started at 4534. The process proceeds to 4570 (FIG. 24L).

If a blocking request is received at 4482 (FIG. 24K), it is ignored at 4484, and the process proceeds back to 4400 (FIG. 24H). If other external messages are received at 4562 or if other internal messages are received at 4563, they are ignored at 4566, and the process returns to 4400 (FIG. 24H).

If an external REL is received at 4536 or if an internal REL is received at 4537, a message is sent to the treatment table with the index from the REL at 4538, and a release time point is sent to billing at 4539. It is determined if the call is intra-call processor at 4540 and 4541. If the call is intra-call processor at 4541, an internal RLC is sent at 4542. If the call is not intra-call processor at 4541, an external RLC is sent at 4543. After 4542 or 4543, a message is sent the mux/echo release process at 4544. Idle is attained 4546.

If reset from blocking is received at 4548, a release request is sent to the originating process at 4549, and a release time point is sent to billing at 4550. A message is sent to the circuit reset process at 4551. At 4552, a release message is sent to the mux/echo process, and idle is attained at 4554. If an external RES message is received at 4556 or if an internal RES is received at 4557, the SUS timer is stopped at 4558, and the RES is forwarded to the originating process at 4560. The process proceeds back to 4400 (FIG. 24H).

At 4570 (FIG. 24L), the terminating process awaits an RLC. If an external RLC is received at 4572 or if an internal RLC is received at 4573, an idle time point is sent to billing at 4574. At 4578, the send REL timer is stopped. Idle is attained at 4582.

If the RLC timer times out at 4584, the send REL timer is stopped at 4586, and the circuit reset process is invoked at 4588. Maintenance is informed at 4590, and idle is attained at 4592.

If reset from blocking is received at 4594, a release request is sent to the iginating process at 4595, and a release time point is sent to billing at 4600. A message is sent to the circuit reset process at 4601. At 4602, a release message is sent to the mux/echo process, and idle is attained at 4604.

If the send REL timer times out at 4606, a message is sent to the treatment table with index 41 at 4608. The send REL timer is started at 4610, and the process returns to 4570.

If an internal REL is received at 4611 or if an internal REL is received at 4609, it is determined if the call is intra-call processor at 4612 and 4613. If the call is intra-call processor at 4613, an internal RLC is sent at 4614. If the call is not intra-call processor at 4613, an external RLC is sent at 4615.

After 4614 or 4615, the process returns to 4570. If other external messages are received at 4616 or if other internal messages are received at 4617, they are ignored at 4618 and the process returns to 4570.

Miscellaneous Processes

In the description above, the BCM invoked the following processes: glare handling, echo control, incoming circuit continuity check, automatic congestion control, circuit reset sending, outgoing trunk selection, outgoing circuit continuity check, and mux/echo release. FIGS. 25–32 depict these miscellaneous processes.

FIGS. 25A–25B depict the glare handling process. At 4620, the glare handling process is idle. At 4622, a query from the BCM is received. At 4624 and 4626 a check is made to see if the ACM or ANM has been received. If so, control is asserted for the call at 4628, and idle is attained at 4630. If these messages have not been received at 4626, glare resolution is checked in the trunk circuit table at 4632 and 4634. If control is set at "all," control is asserted for the call at 4636, and idle is attained at 4638.

If control is set at "none" at 4634, a different circuit to use is determined at 4640. Control for the new circuit is asserted for the call at 4642, and idle is attained at 4644.

If the control is set at even/odd at 4634, the originating point code (OPC) of the IAM is checked at 4646 and compared to the call processor point code at 4648. If the OPC of the IAM is higher than the call processor point code, the CIC in the IAM is checked to see if it is even or odd at 4650 and 4652. If it is odd, control is asserted for the call at 4654, and idle is attained at 4656. If the CIC is even, a different circuit to use is determined at 4658. Control for the new circuit is asserted for the call at 4660, and idle is attained at 4662.

If the OPC of the IAM is not higher than the call processor point code at 4648, the CIC in the IAM is checked to see if it is even or odd at 4664 and 4666. If it is even, control is asserted for the call at 4668, and idle is attained at 4670. If the CIC is odd, a different circuit to use is determined at 4672. Control for the new circuit is asserted for the call at 4674, and idle is attained at 4676.

Figure 26A:
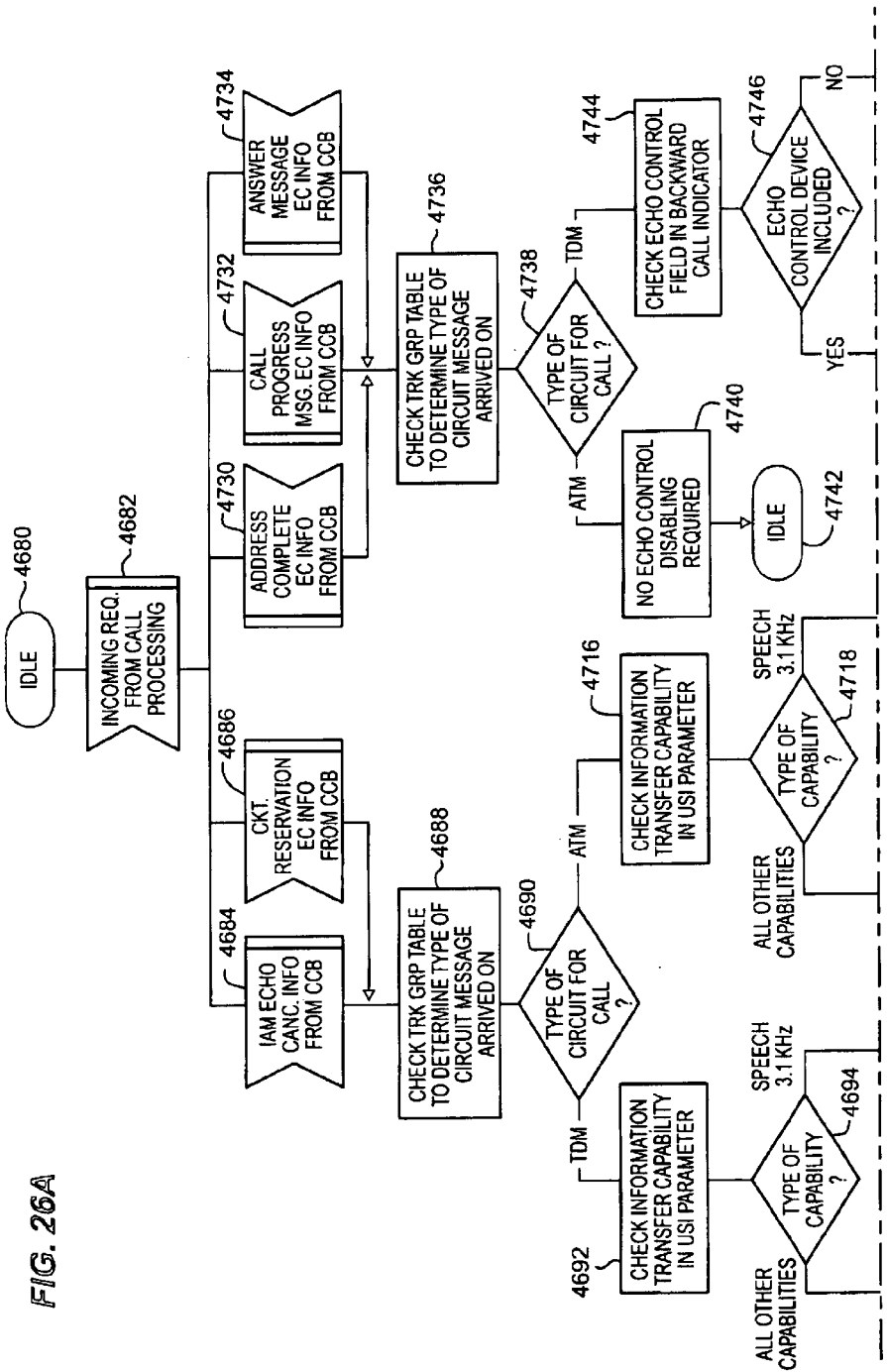
FIGS. 26A–26B are SDL diagrams of logic used in a version of the invention for an echo control process.
Figure 26B:
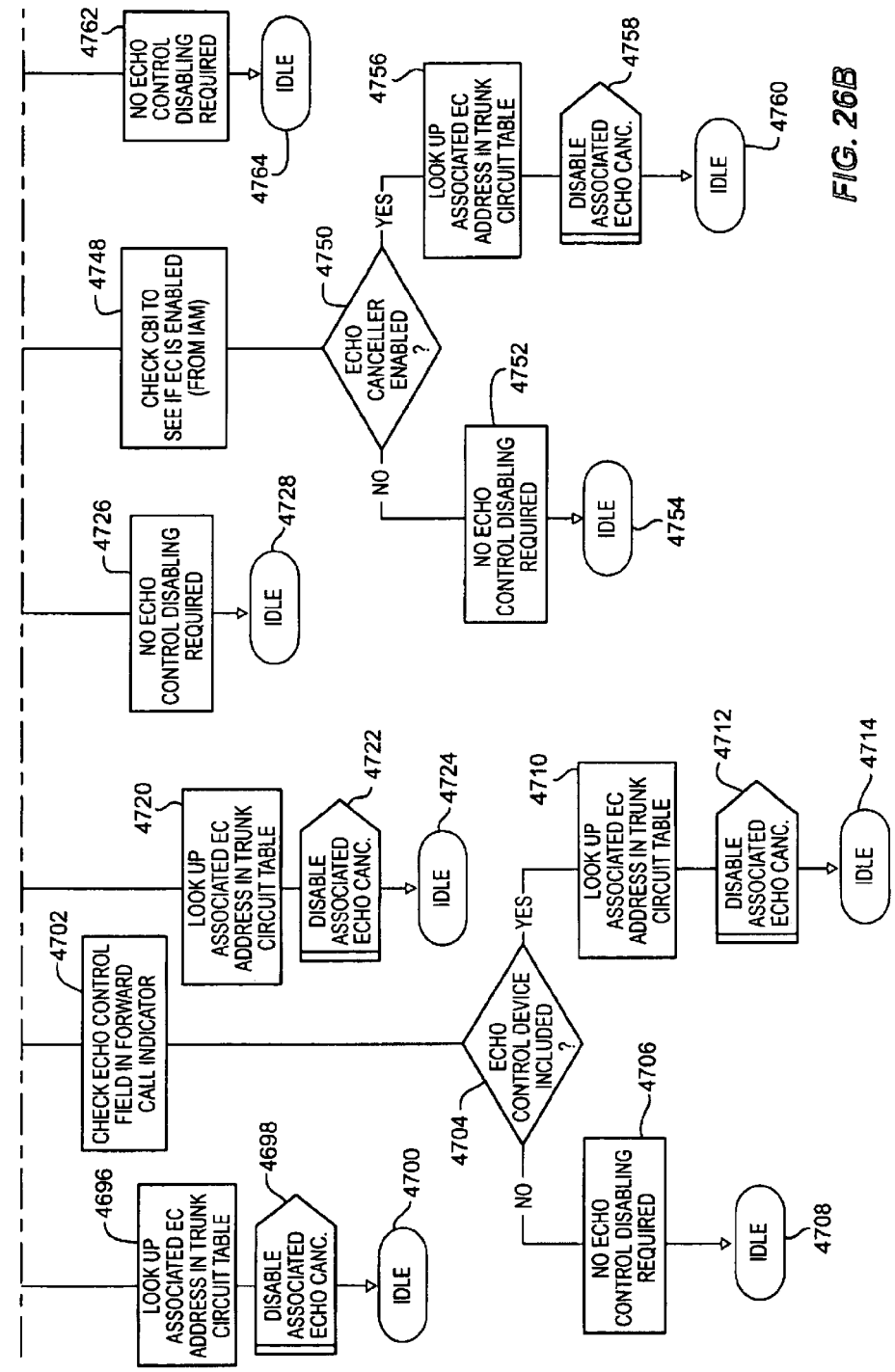
Figure 27B:
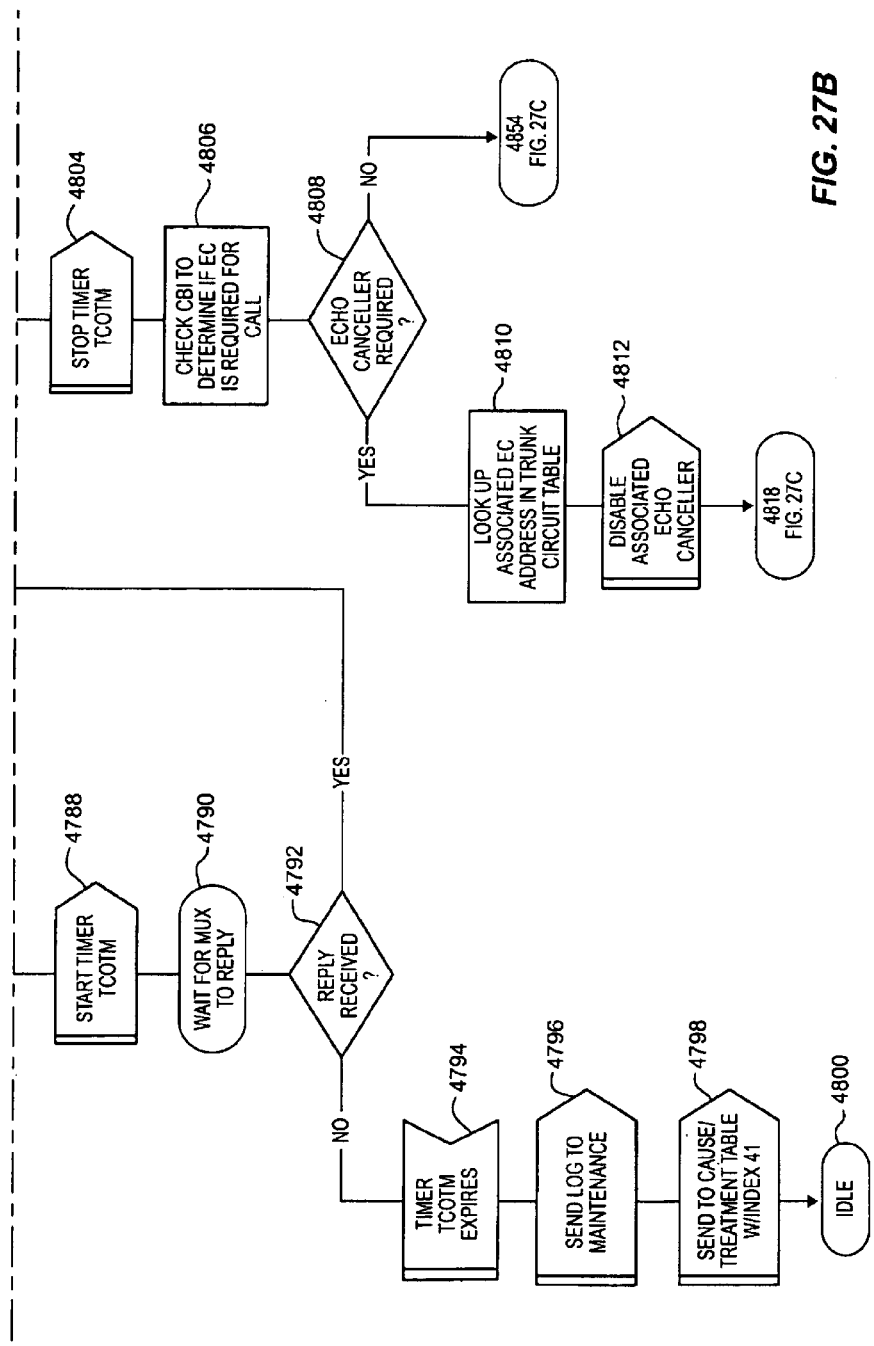

FIGS. 26A–26B depict the echo control process. At 4680, the echo control process is idle, and a message from the BCM is received at 4682. If echo control information is received in an IAM at 4684 or a CRM at 4686, then the circuit type is checked at 4688 and 4690. If the circuit is from a LEC (TDM), the information transfer capability is checked at 4692 and 4694. If it is not a 3.1 KHz call, the echo control address is accessed from the trunk circuit table at 4696. The associated echo canceller is disabled at 4698, and idle is attained at 4700.

If the call is a 3.1 KHz call at 4694, the echo control field in the forward call indicator is checked at 4702 and 4704. If an echo device is not included, no echo control disabling is required at 4706, and idle is attained at 4708. If an echo device is included, the echo control address is accessed from the trunk circuit table at 4710. The associated echo canceller is disabled at 4712, and idle is attained at 4714.

If the circuit is from another call processor (ATM) at 4690, then the information transfer capability is checked at 4716 and 4718. If it is not a 3.1 KHz call, the echo control address is accessed from the trunk circuit table at 4720. The associated echo canceller is disabled at 4722, and idle is attained at 4724. If the call is a 3.1 KHz call at 4718, no echo control disabling is required at 4726, and idle is attained at 4728.

If echo control information is received in an ACM at 4730, a CPM at 4732, or an ANM at 4734, then the circuit type is checked at 4736 and 4738. If the circuit is from another call processor (ATM), then no echo control disabling is required at 4740, and idle is attained at 4742. If the circuit is from a LEC (TDM), the echo control field in the backward call indicator is checked at 4744 and 4746. If an echo device is included, the CBI is checked to see if echo cancellation is enabled at 4748 and 4750. If is not enabled, no echo control disabling is required at 4752, and idle is attained at 4754. If echo cancellation is enabled at 4750, the echo control address is accessed from the trunk circuit table at 4756. The associated echo canceller is disabled at 4758, and idle is attained at 4760. If an echo device is not included at 4746, no echo control disabling is required at 4762, and idle is attained at 4764.

FIGS. 27A–27D depict the incoming continuity check process. On FIG. 27A at 4770, the continuity check process for an incoming call is idle, and a message is received invoking the process at 4772. At 4774, the CBI is checked to determine the DS0 for the continuity check. At 4776, the mux is instructed to connect the DS0 to a loopback. The COT timer is set at 4778, and the process awaits a reply from the mux at 4780 and 4782. If the COT timer expires at 4784, the mux message is resent at 4786, and the timer is restarted at 4788. The process awaits a reply from the mux at 4790 and 4792. If the COT timer expires at 4794, maintenance is informed at 4796, a message is sent to the treatment table with index 41 at 4798, and idle is attained at 4800.

If a reply is received at 4782 or 4792, the message indicates that the loopback has been provided at 4802. The COT timer is stopped at 4804. At 4806 and 4808, the CBI is checked for echo control requirements. If echo control is required, the echo control address is accessed from the trunk circuit table at 4810. The associated echo canceller is disabled at 4812.

At 4818 (FIG. 27C), a message is received to stop the continuity check. At 4820, the mux is instructed to disconnect the loopback, a COT timer is started at 4822, and the process awaits a mux reply at 4824 and 4826. If the COT timer expires at 4828, the mux message is resent at 4830, and the timer is restarted at 4832. The process awaits a reply from the mux at 4834 and 4836. If the COT timer expires at 4838, maintenance is informed at 4840, a message is sent to the treatment table with index 41 at 4842, and idle is attained at 4844.

If a reply is received at 4826 or 4836, the message indicates that the loopback has been disconnected at 4846. The COT timer is stopped at 4848. The associated echo canceller is enabled at 4850. Idle is attained at 4852. At 4854, a message is received to stop the continuity check. At 4856, the mux is instructed to disconnect the loopback, a COT timer is started at 4858, and the process awaits a mux reply at 4860 and 4862. If the COT timer expires at 4864, the mux message is resent at 4866, and the timer is restarted at 4868. The process awaits a reply from the mux at 4870 and 4872.

If the COT timer expires at 4874, maintenance is informed at 4876, a message is sent to the treatment table with index 41 at 4878, and idle is attained at 4880. If a reply is received at 4862 or 4872, the message indicates that the loopback has been disconnected at 4882. The COT timer is stopped at 4884. Idle is attained at 4886.

Figure 28A:
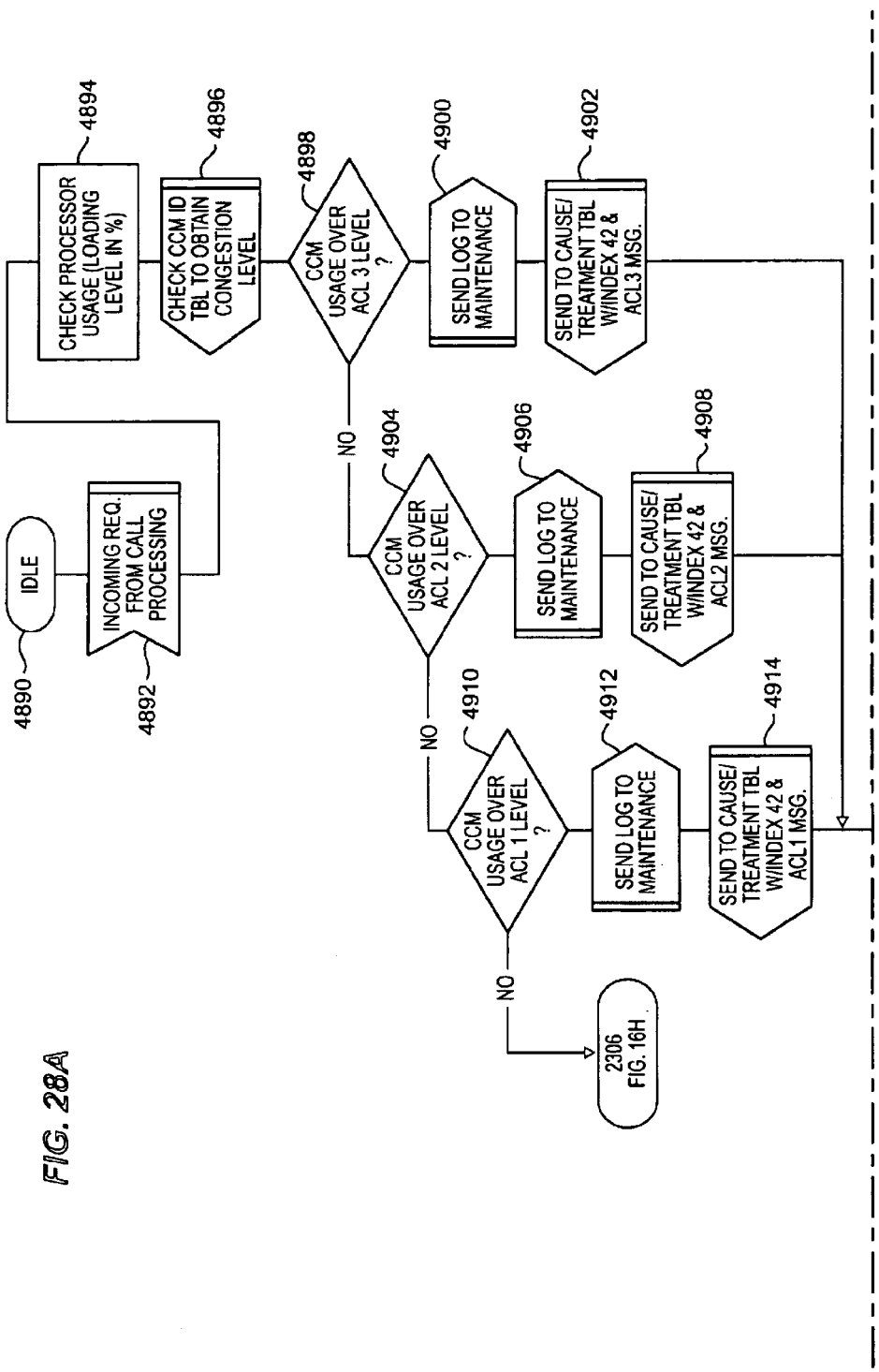

FIGS. 28A–28B depict the automatic congestion control process. The automatic congestion control process is idle at 4890, and a message is received at 4892. At 4894, the call processor load is checked. At 4896, the call processor ID table is checked to obtain the call processor congestion level. At 4898, it is determined if the call processor load exceeds congestion level (ACL) 3. If so, maintenance is informed at 4900, and an REL with cause 42 is sent out at 4902. If not, it is determined if the call processor load exceeds congestion level 2 at 4904. If so, maintenance is informed at 4906, and an REL with cause 42 is sent out at 4908. If not, it is determined if the call processor load exceeds congestion level-at 4910.

If call processor usage does not exceed congestion level 1 at 4910, the process proceeds to 2306 (FIG. 16H). If call processor usage does exceed congestion level 1, maintenance is informed at 4912, and an REL with cause 42 is sent out at 4914. COT is checked at 4916. If a 1 is present, the incoming continuity process is stopped at 4918, and the COT timer is stopped at 4920. If a 2 is present at 4916, the COT timer is stopped at 4920. After 4920 or if a 0 is present at 4916, the circuit is marked as transient at 4922. The RLC timer is started at 4924, and the send REL timer is started at 4926. The automatic congestion control process awaits an RLC at 3724 (FIG. 22P).

Figure 29B:
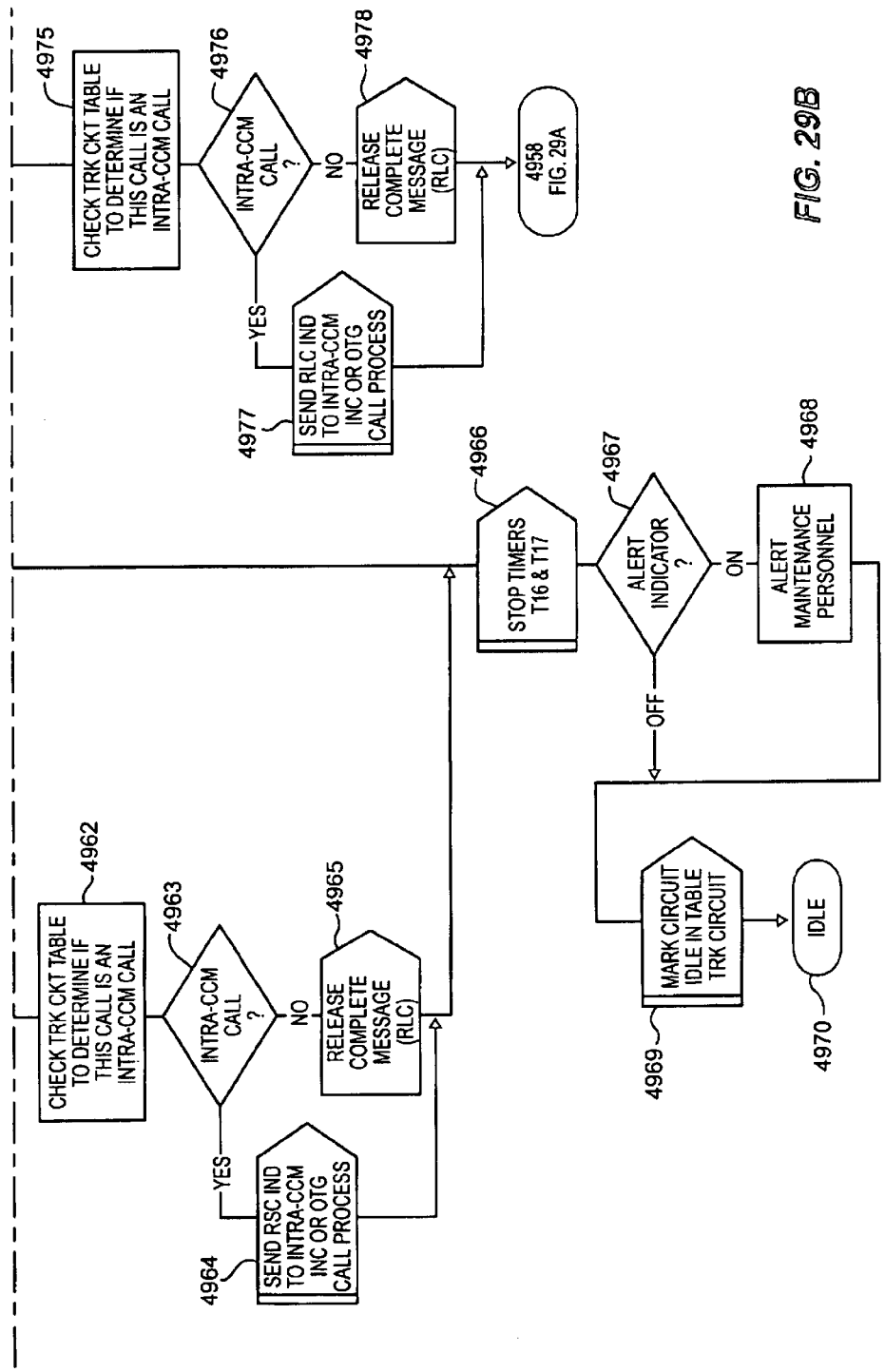
Figure 30A:
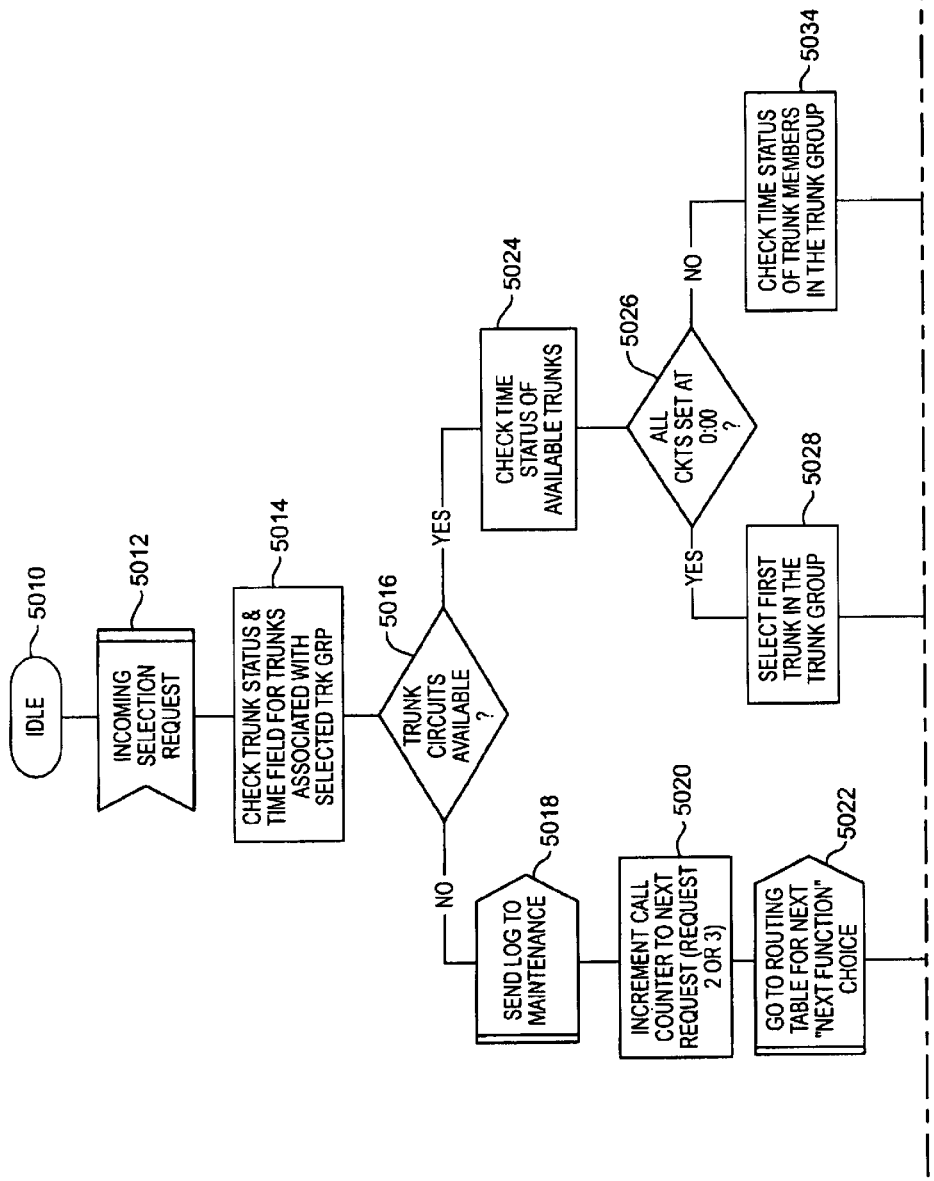
Figure 30B:
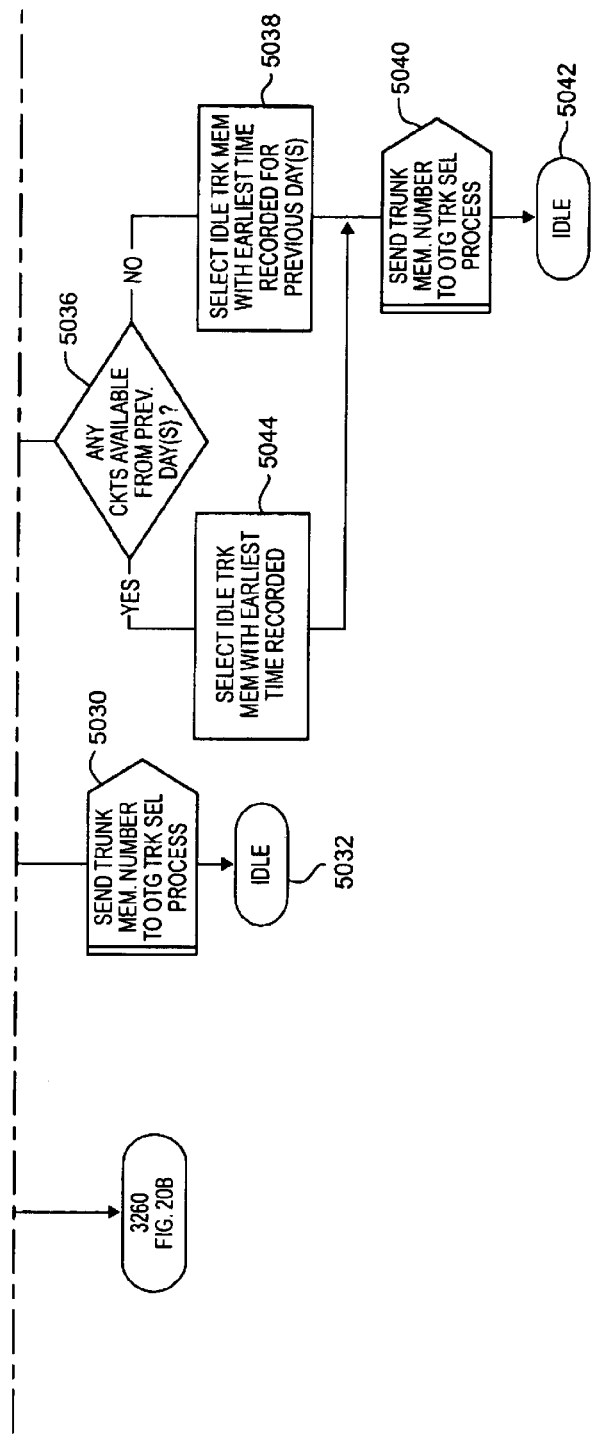
Figure 30D:
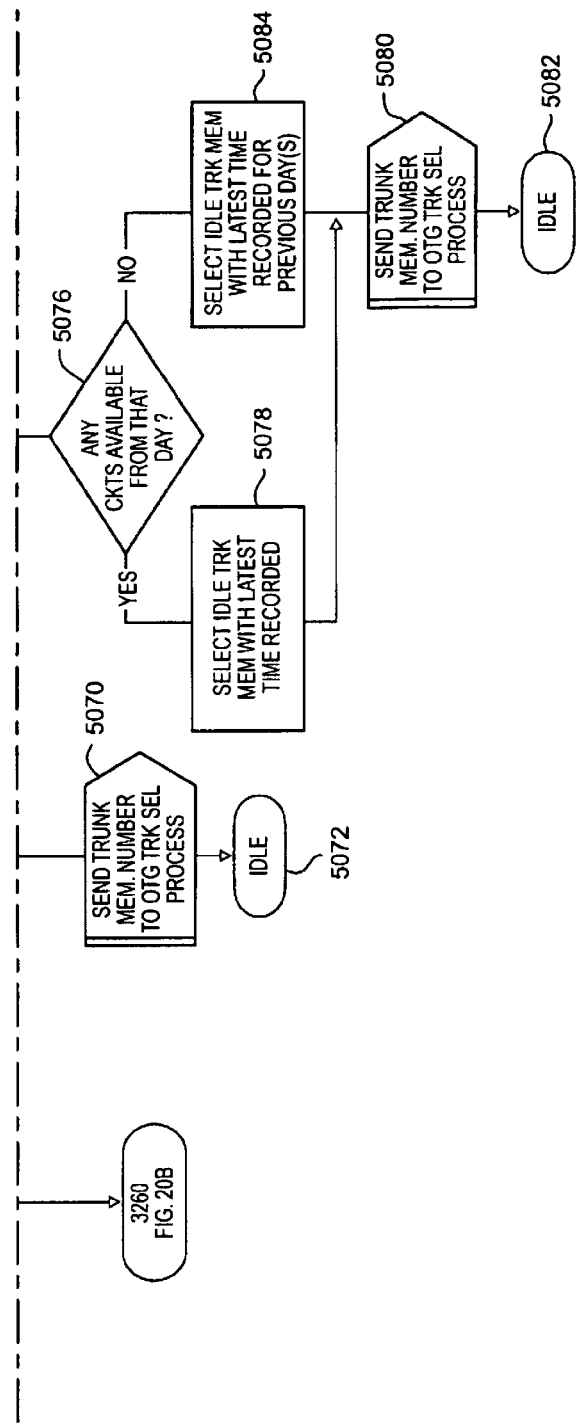
Figure 30E:
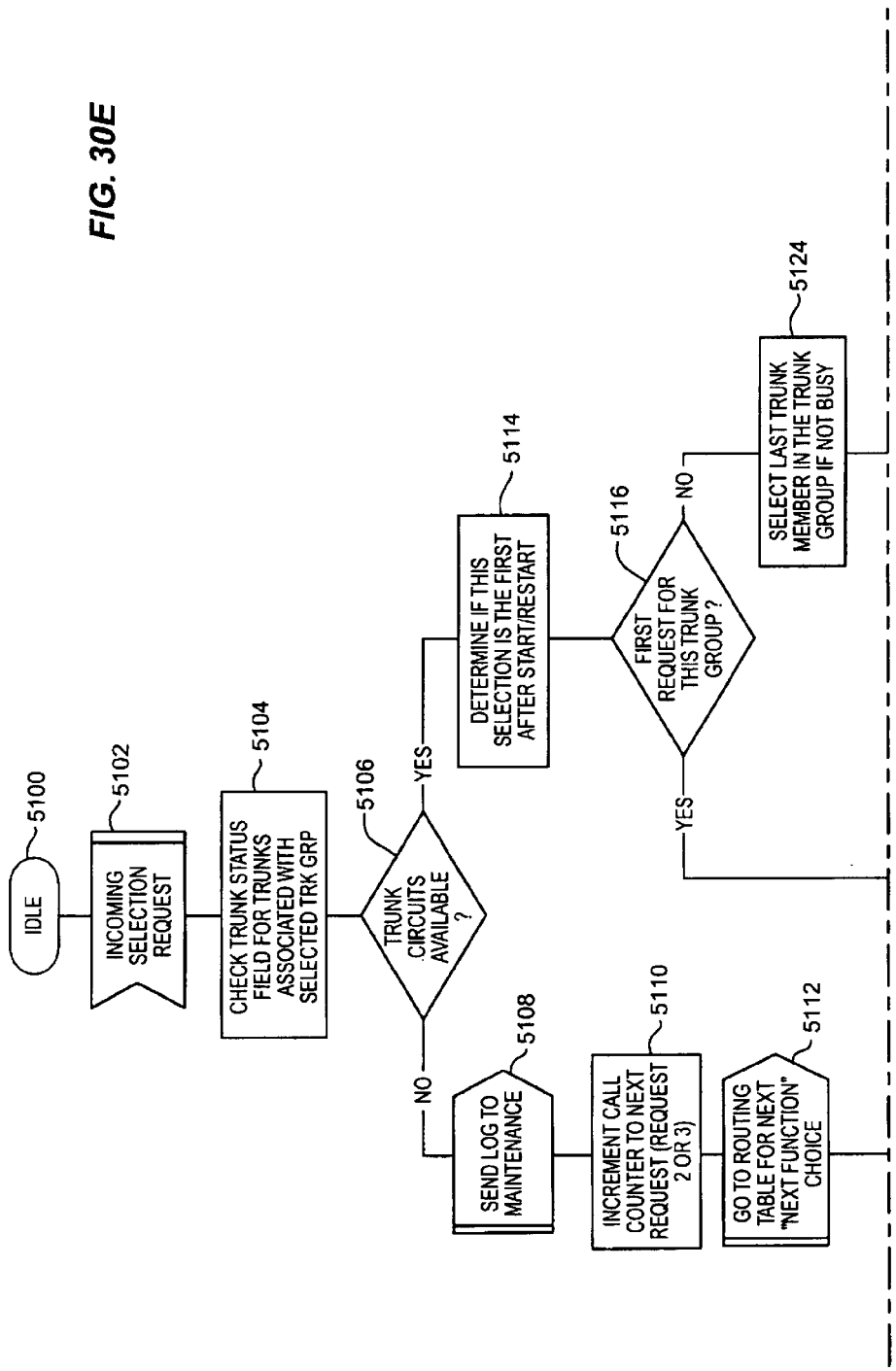
Figure 30F:
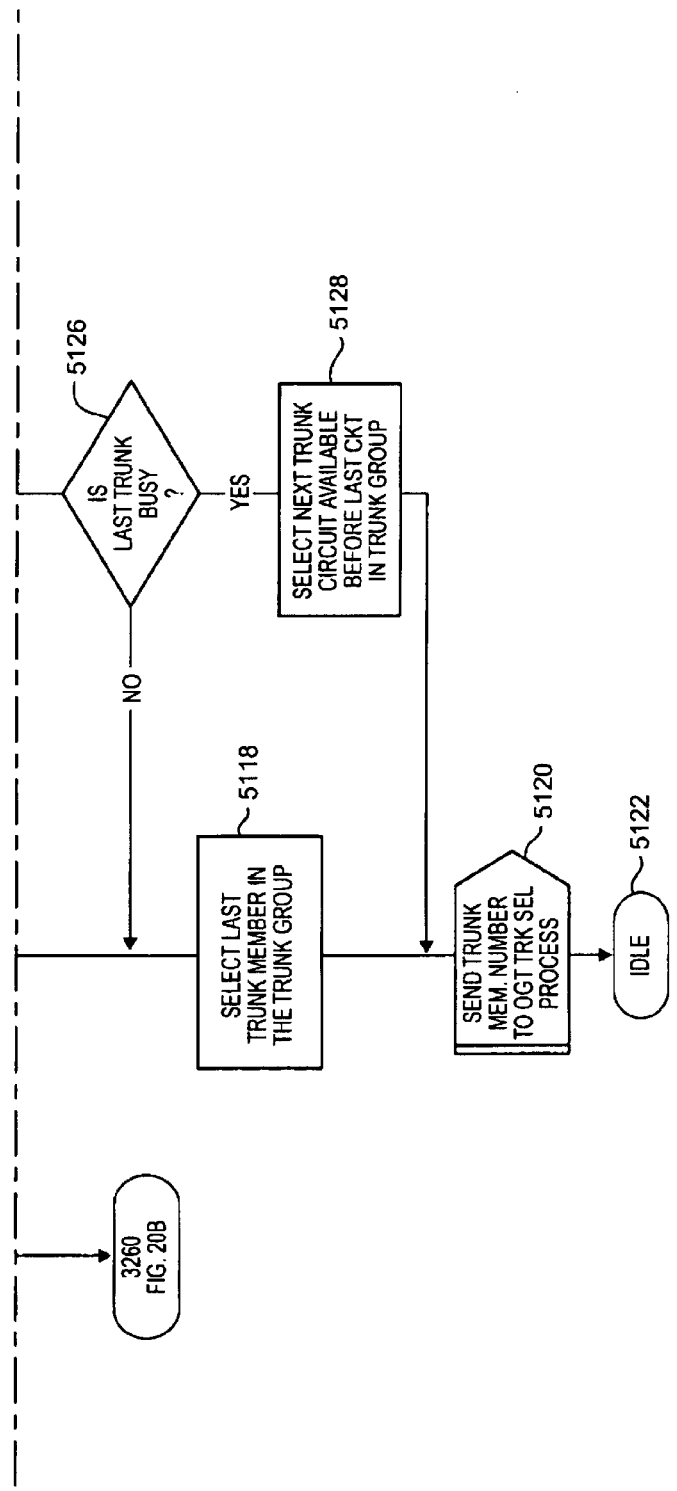
Figure 30G:
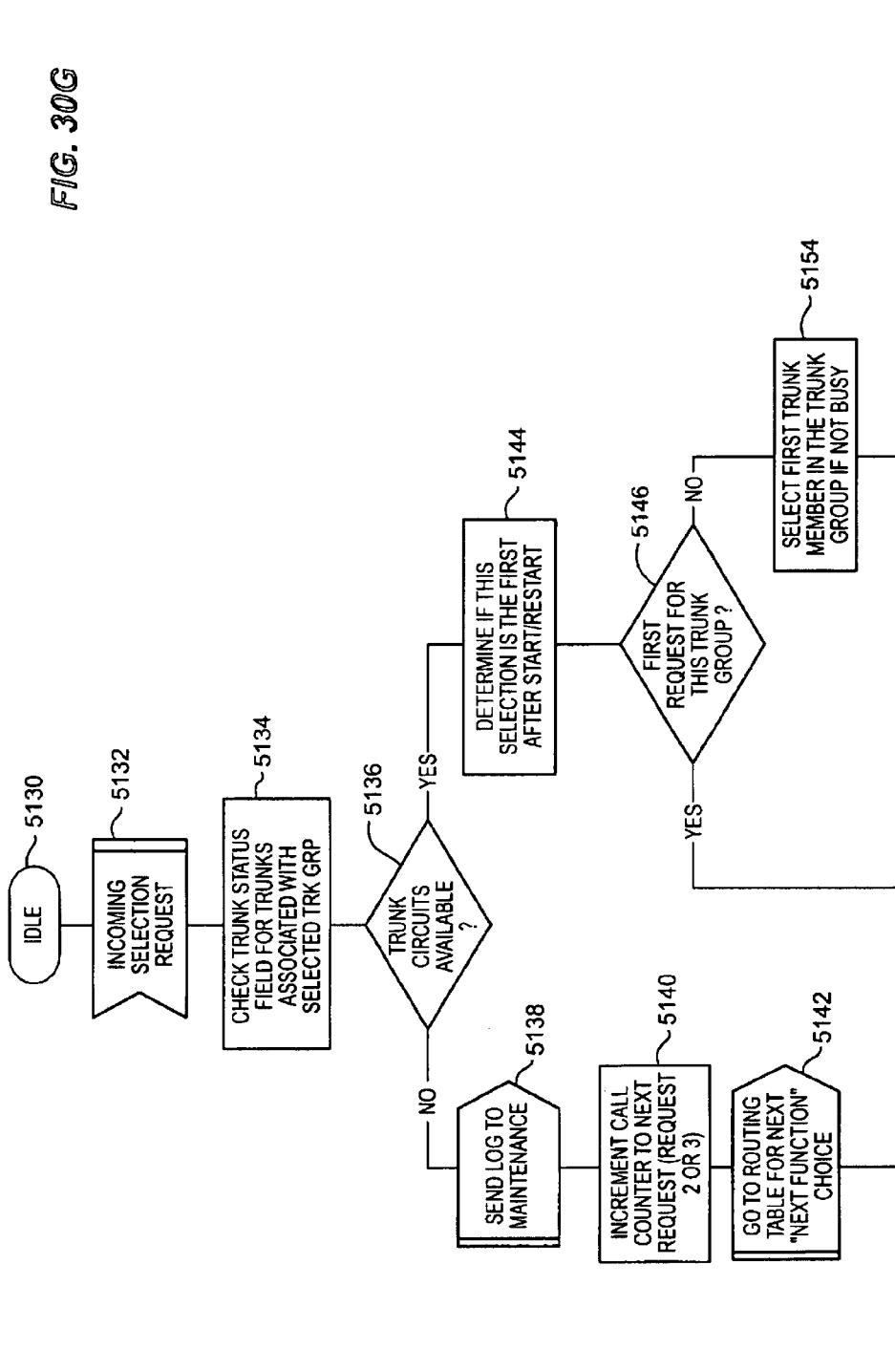
Figure 30H:
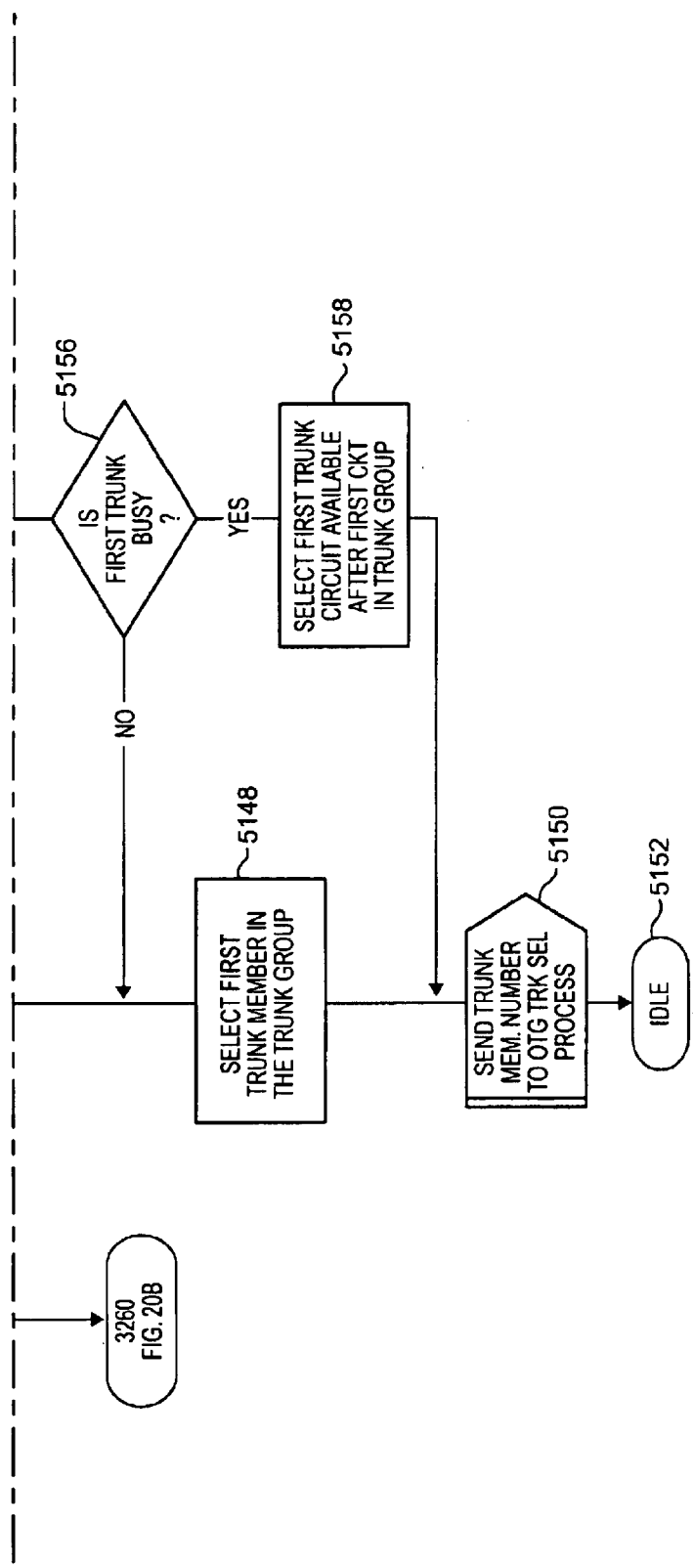
Figure 30J:
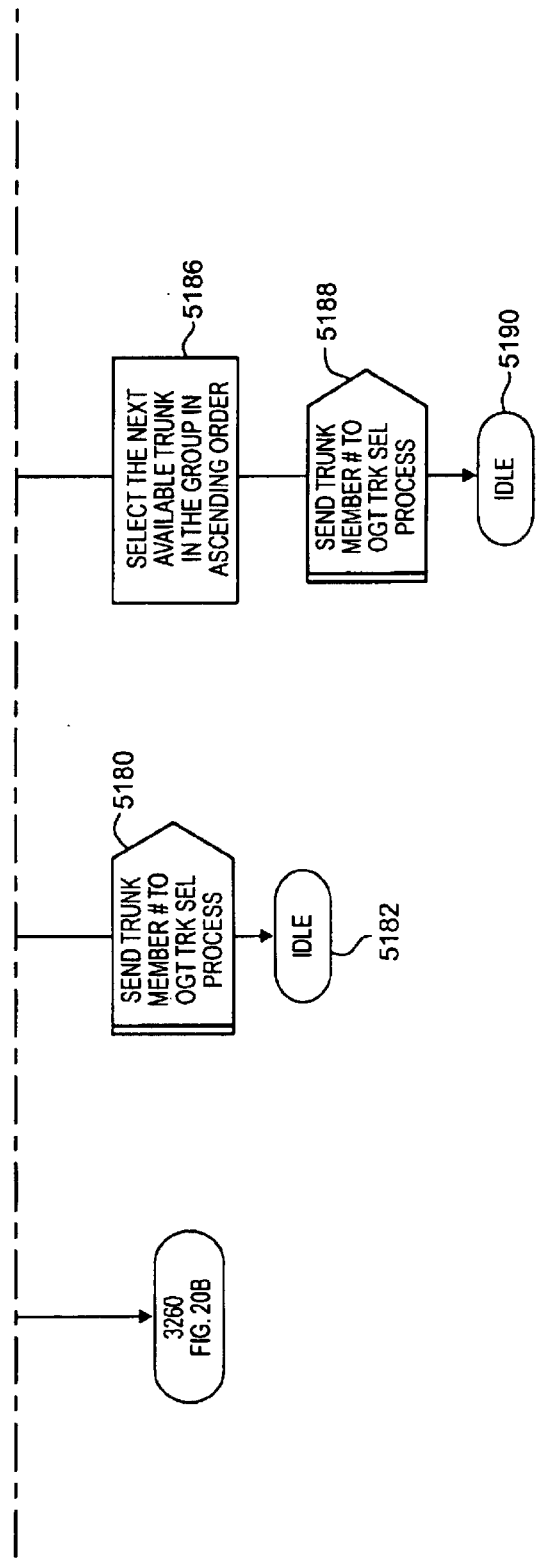
Figure 30L:
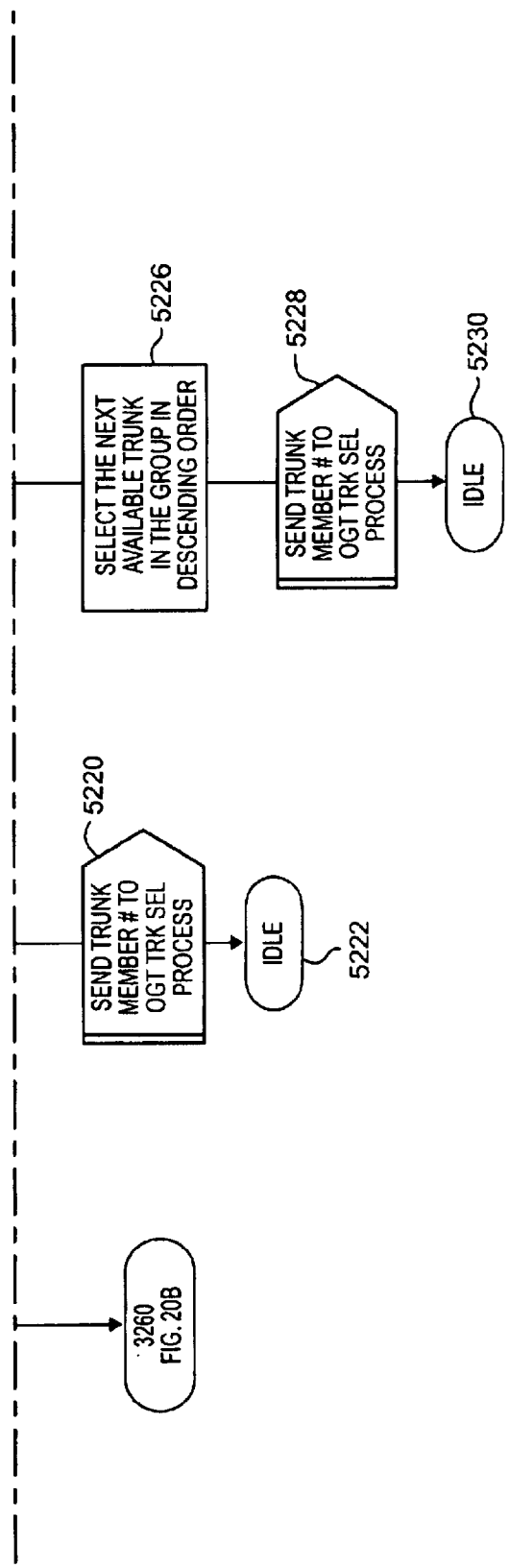

FIGS. 29A–29C depict the circuit reset sending process. On FIG. 29A at 4940, the circuit reset sending process is idle. If a message is received from the BCM at 4941, processing proceeds to 4948. At 4942, a message is received from the mux indicating loss of circuit status, and, at 4944, processing for the call is halted. At 4946, the mux is instructed to clear the circuit and reset. At 4948, the circuit is marked transient. It is determined if the call is intra-call processor at 4949 and 4950. If the call is intra-call processor at 4950, an internal RSC is sent at 4951. If the call is not intra-call processor at 4950, an external RSC is sent at 4552. After 4951 or 4952, the T16 timer is started at 4953, and the T17 timer is started at 4956. The process awaits an RLC at 4958.

If an internal RSC is received at 4960 or if an external RSC is received at 4961, it is determined if the call is intra-call processor at 4962 and 4963. If the call is intra-call processor at 4963, an internal RSC is sent at 4964. If the call is not intra-call processor at 4963, an external RSC is sent at 4965. After 4964 or 4965, timers T16 and T17 are stopped at 4966. At 4967, it is determined if the alert indicator is on or off. If it is on, maintenance is informed at 4968. After 4968 or if the alert indicator is off at 4967, the circuit is marked as idle at 4969, and idle is attained at 4970.

If an internal RLC is received at 4971 if or an external RLC is received at 4972, processing proceeds to 4966. If an internal REL is received at 4973 or an external REL is received at 4974, it is determined if the call is intra-call processor at 4975 and 4976. If the call is intra-call processor at 4976, an internal RLC is sent at 4977. If the call is not intra-call processor at 4976, an external RLC is sent at 4978. After 4977 or 4978, processing proceeds to 4958.

If the T16 timer expires at 4979 (FIG. 29C), it is determined if the call is intra-call processor at 4980 and 4981. If the call is intra-call processor at 4981, an internal RSC is sent at 4982. If the call is not intra-call processor at 4981, an external RSC is sent at 4983. After 4982 or 4983, the T16 timer is started at 4984. The process then returns to 4958 (FIG. 29A).

If the T17 timer expires at 4985, the timer T16 is stopped at 4986. At 4987, it is determined if the alert indicator is on or off. If it is on, the alert indicator is set at 4988, and maintenance is informed at 4989. After 4989 or if the alert indicator is off at 4987, it is determined if the call is intra-call processor at 4990 and 4991. If the call is intra-call processor at 4991, an internal RSC is sent at 4992. If the call is not intra-call processor at 4991, an external RSC is sent at 4993. After 4992 or 4993, the T17 timer is started at 4994. The process then returns to 4958 (FIG. 29A).

FIGS. 30A–30L depict the trunk selection processes. On FIG. 30A at 5010, the "most idle" trunk selection process which selects the trunk that has been idle the longest is idle. At 5012, a message is received requesting circuit selection. At 5014, the status and time fields are checked for the circuits in the trunk group. If no circuits are available at 5016, maintenance is informed at 5018, and the call counter is incremented at 5020. At 5022, the next routing choice is used, and the process proceeds to 3260 (FIG. 20A).

If trunk circuits are available at 5016, times are checked for the idle circuits in the group at 5024. If all circuits are set at 0:00 at 5026, the first trunk in the group is selected at 5028, and the selected circuit is provided to the terminating process at 5030. Idle is attained at 5032. If all circuits are not 0:00 at 5026, time status is checked at 5034. If any circuits are available from the previous day at 5036, the circuit with the earliest time on the previous day is selected at 5038. The selected circuit is provided to the terminating process at 5040, and idle is attained at 5042. If no circuits are available from the previous day at 5036, the circuit with the earliest time on that day is selected at 5044, and the process proceeds to 5040.

At 5050 (FIG. 30C), the "least idle" trunk selection process which selects the trunk that has been idle the shortest is idle. At 5052, a message is received requesting circuit selection. At 5054, the status and time fields are checked for the circuits in the trunk group. If no circuits are available at 5056, maintenance is informed at 5058, and the call counter is incremented at 5060. At 5062, the next routing choice is used, and the process proceeds to 3260 (FIG. 20A).

If trunk circuits are available at 5056, times are checked for the idle circuits in a group at 5064. If all circuits are set at 0:00 at 5066, the last trunk in the group is selected at 5068, and the selected circuit is provided to the terminating process at 5070. Idle is attained at 5072. If all circuits are not 0:00 at 5066, time status is checked at 5074. If any circuits are available from that day at 5076, the circuit with the latest time on that day is selected at 5078. The selected circuit is provided to the terminating process at 5080, and idle is attained at 5082. If no circuits are available from that day at 5076, the circuit with the latest time on the previous day is selected at 5084, and the process proceeds to 5080.

At 5100 (FIG. 30E), the "descending" trunk selection process which selects the lowest numbered idle trunk is idle. At 5102, a message is received requesting circuit selection. At 5104, the status fields are checked for the idle circuits in the trunk group. If no circuits are available at 5106, maintenance is informed at 5108, and the call counter is incremented at 5110. At 5112, the next routing choice is used, and the process proceeds to 3260 (FIG. 20A).

If trunk circuits are available at 5106, it is determined if this is the first request for the trunk group at 5114 and 5116. If it is the first request at 5116, the last trunk in the group is selected at 5118, and the selected circuit is provided to the terminating process at 5120. Idle is attained at 5122. If this is not the first request at 5116, the last trunk in the group is selected at 5124. If the selected trunk is not busy at 5126, the process goes to 5118. If the selected circuit is busy at 5126, the next trunk available before the last trunk is selected at 5128, and the process proceeds to 5120.

At 5130 (FIG. 30G), the "ascending" trunk selection process which selects the highest numbered idle trunk is idle. At 5132, a message is received requesting circuit selection. At 5134, the status fields are checked for the idle circuits in the trunk group. If no circuits are available at 5136, maintenance is informed at 5138, and the call counter is incremented at 5140. At 5142, the next routing choice is used, and the process proceeds to 3260 (FIG. 20A).

If trunk circuits are available at 5136, it is determined if this is the first request for the trunk group at 5144 and 5146. If it is the first request at 5146, the first trunk in the group is selected at 5148, and the selected circuit is provided to the terminating process at 5150. Idle is attained at 5152. If this is not the first request at 5146, the first trunk in the group is selected at 5154. If the selected trunk is not busy at 5156, the process goes to 5148. If the selected circuit is busy at 5156, the next trunk available after the first trunk is selected at 5158, and the process proceeds to 5150.

At 5160 (FIG. 30I), the "counter-clockwise" trunk selection process which selects trunks sequentially from high to low is idle. At 5162, a message is received requesting circuit selection. At 5164, the status fields are checked for the idle circuits in the trunk group. If no circuits are available at 5166, maintenance is informed at 5168, and the call counter is incremented at 5170. At 5172, the next routing choice is used, and the process proceeds to 3260 (FIG. 20A).

If trunk circuits are available at 5166, it is determined if this is the first request for the trunk group at 5174 and 5176. If it is the first request at 5176, the last trunk in the group is selected at 5178, and the selected circuit is provided to the terminating process at 5180. Idle is attained at 5182. If this is not the first request at 5146, the most recent trunk selected from the group is determined at 5184. The next available trunk in descending order is selected at 5186. The selected circuit is provided to the terminating process at 5188. Idle is attained at 5190.

At 5200 (FIG. 30K), the "clockwise" trunk selection process which selects trunks sequentially from low to high is idle. At 5202, a message is received requesting circuit selection. At 5204, the status fields are checked for the idle circuits in the trunk group. If no circuits are available at 5206, maintenance is informed at 5208, and the call counter is incremented at 5210. At 5212, the next routing choice is used, and the process proceeds to 3260 (FIG. 20A).

If trunk circuits are available at 5206, it is determined if this is the first request for the trunk group at 5214 and 5216. If it is the first request at 5216, the first trunk in the group is selected at 5218, and the selected circuit is provided to the terminating process at 5220. Idle is attained at 5222. If this is not the first request at 5216, the most recent trunk selected from the group is determined at 5224. The next available trunk in ascending order is selected at 5226. The selected circuit is provided to the terminating process at 5228. Idle is attained at 5230.

Figure 31B:
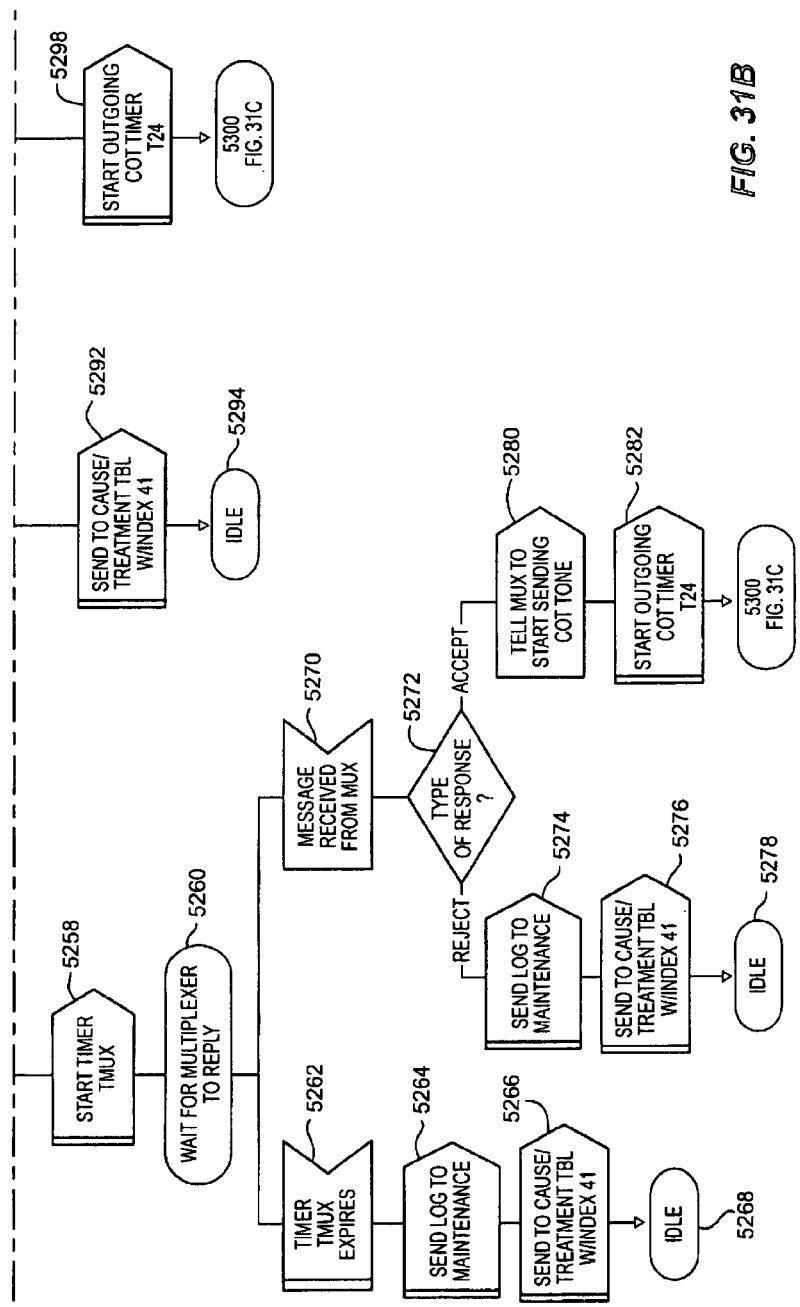
Figure 31D:
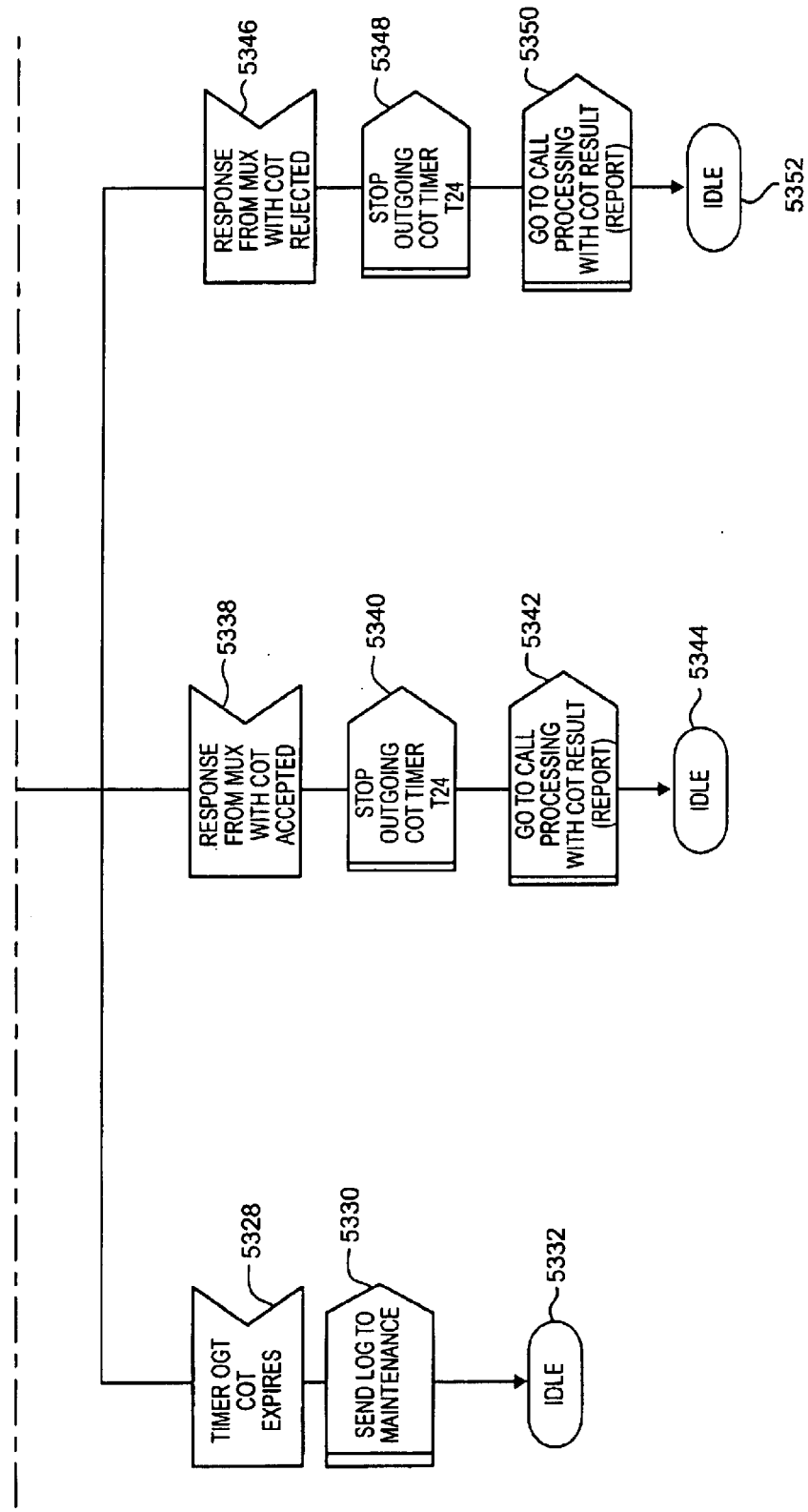

FIGS. 31A–31P depict the outgoing continuity check process. On FIG. 31A, the outgoing continuity check process is idle at 5240. At 5242, an outgoing continuity check message is received. At 5244, the CBI is consulted to determine the DSO on the call. At 5246, the mux is instructed to set-up the continuity test and disable the associated echo canceller. At 5248, the mux timer is started, and a reply is awaited at 5250. If the mux timer expires at 5252, maintenance is informed at 5254, and the mux message is resent at 5256. At 5258, the mux timer is restarted, and a reply is awaited at 5260. If mux timer expires at 5262, maintenance is informed at 5264, a message is sent to the treatment table with index 41 at 5266, and idle is attained at 5268.

If a message is received from the mux at 5270, the type of message is determined at 5272. If it is a reject message, maintenance is informed at 5274, a message is sent to the treatment table with index 41 at 5276, and idle is attained at 5278. If the message at 5272 is an accept message, the continuity tone is applied at 5280, the COT timer is started at 5282, and the process proceeds to 5300 (FIG. 31C).

If a message is received from the mux at 5286, the type of message is determined at 5288. If it is a reject message, maintenance is informed at 5290, a message is sent to the treatment table with index 41 at 5292, and idle is attained at 5294. If the message at 5288 is an accept message, the continuity tone is applied at 5296, the COT timer is started at 5298, and the process proceeds to 5300 (FIG. 31C).

At 5300 (FIG. 31C), the process awaits a status message from the mux. If an acceptance message (indicating that the test is complete, the tone has been removed, and the echo canceller enabled) is received at 5302, the COT timer is stopped at 5204. A message indicating acceptance is sent to the BCM at 5306, and idle is attained at 5308. If a reject message (indicating that the test is complete, the tone has been removed, and the echo canceller enabled) is received at 5310, the COT timer is stopped at 53.12. A message indicating rejection is sent to the BCM at 5314, and idle is attained at 5316.

If the COT timer expires at 5318, maintenance is informed at 5320, and a COT information retransmission is requested from the mux at 5322. The COT timer is started at 5324, and a message from the mux is awaited at 5326. If the COT timer expires at 5328, maintenance is informed at 5330, and idle is attained at 5332. If an acceptance message (indicating that the test is complete, the tone has been removed, and the echo canceller enabled) is received at 5338, the COT timer is stopped at 5340. A message indicating acceptance is sent to the BCM at 5342, and idle is attained at 5344. If a rejection message (indicating that the test is complete, the tone has been removed, and the echo canceller enabled) is received at 5346, the COT timer is stopped at 5348. A message indicating rejection is sent to the BCM at 5350, and idle is attained at 5352.

Figure 32A:
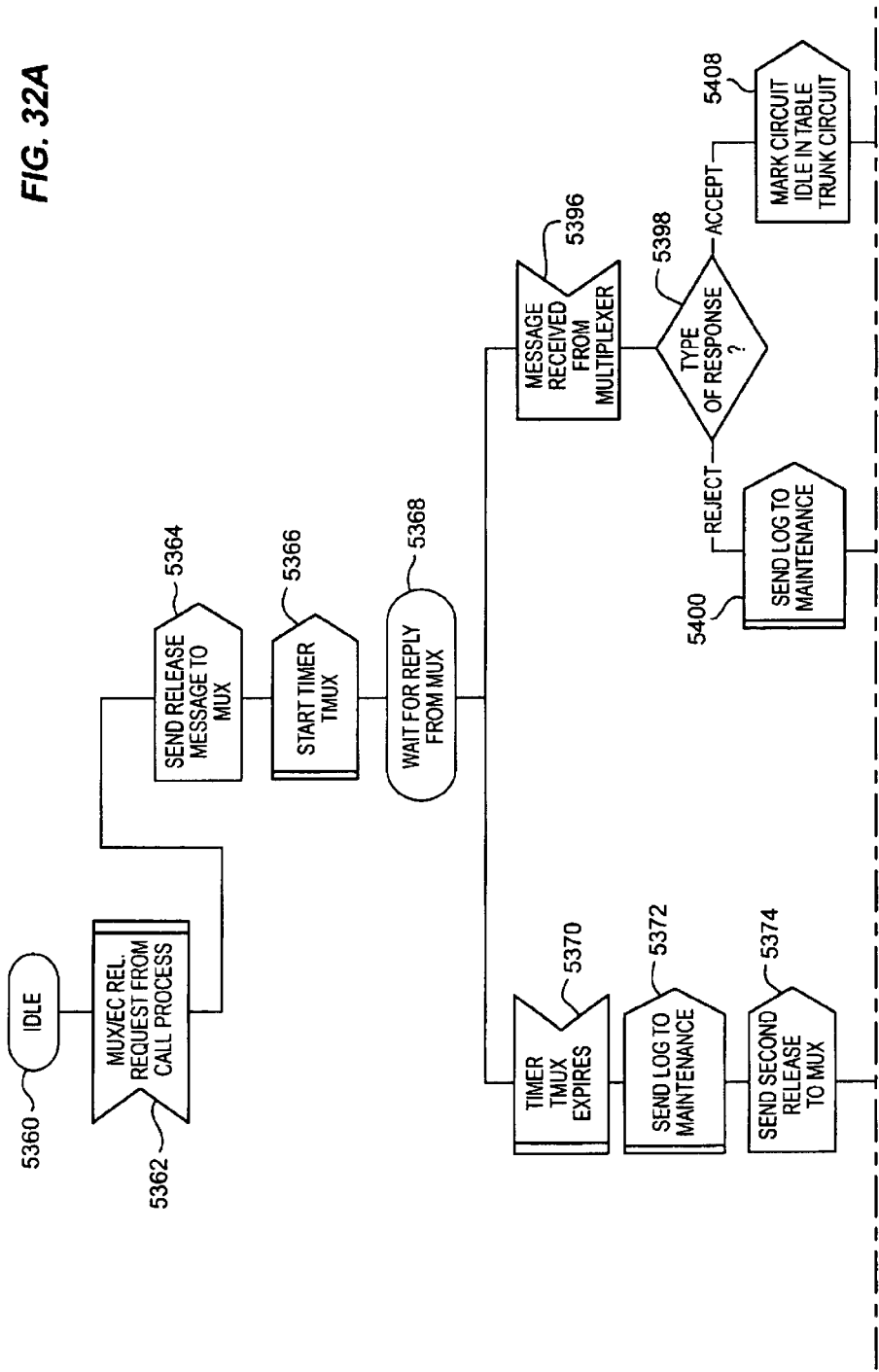
FIGS. 32A–32B are SDL diagrams of logic used in a version of the invention for an interworking unit/echo release process.
Figure 32B:
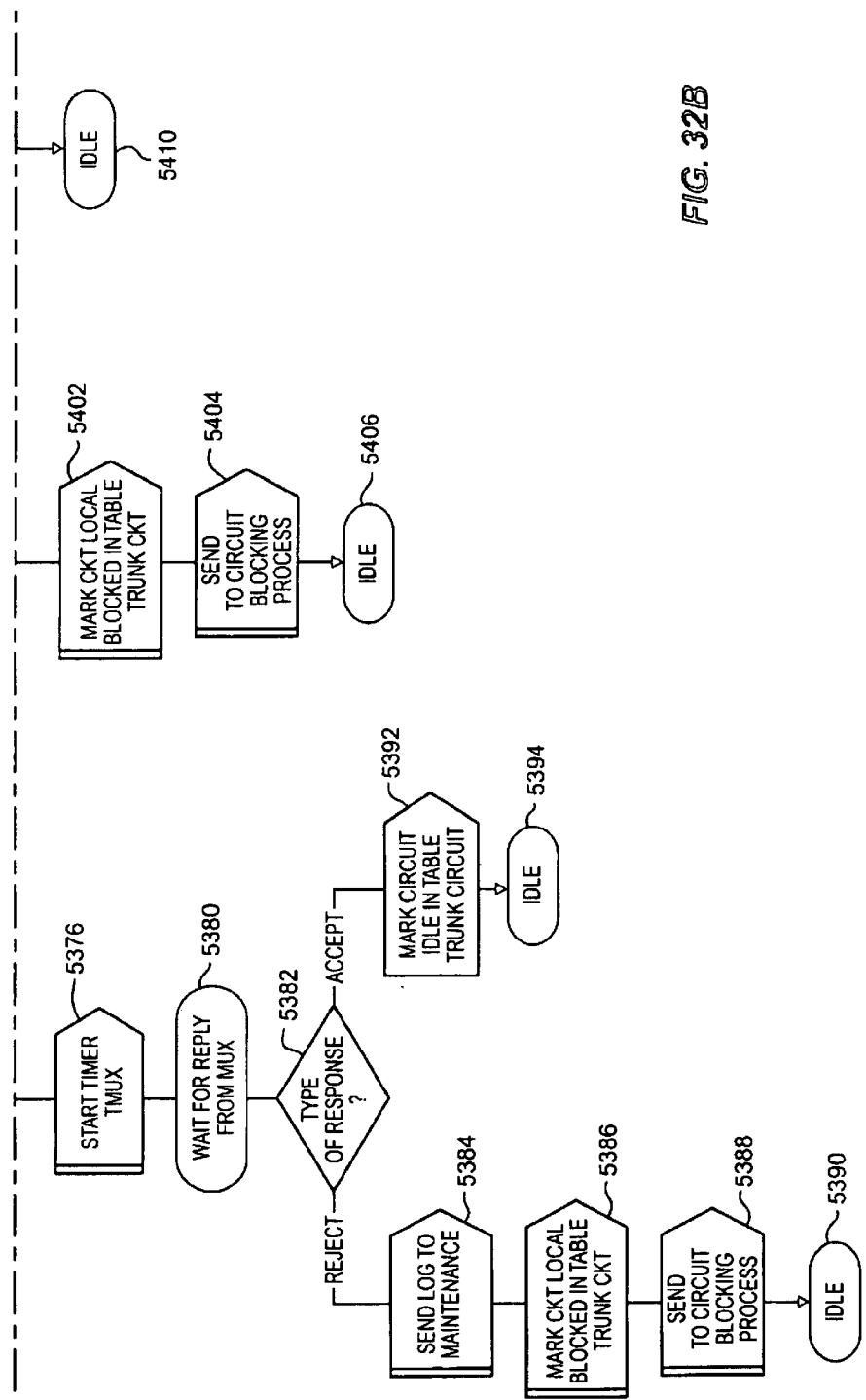

FIGS. 32A–32B depict the mux/echo release process. The mux/echo release process is idle at 5360. A message to release is received at 5362, and a message is sent to the mux at 5364. The mux timer is started at 5366, and a reply is awaited at 5368. If the mux timer expires at 5370, maintenance is informed at 5372, and the mux message is resent at 5374. At 5376, the mux timer is restarted, and a reply is awaited at 5380. The mux response is determined at 5382. If the mux reply is a rejection, maintenance is informed at 5384. The circuit is marked as blocked in the trunk circuit table at 5386, and a message is sent to the blocking process at 5388. Idle is attained at 5390. If the message is accepted at 5382, the circuit is marked idle at 5392, and idle is attained at 5394.

If a message is received from the mux at 5396, the mux response is determined at 5398. If the mux reply is a rejection, maintenance is informed at 5400. The circuit is marked as blocked in the trunk circuit table at 5402, and a message is sent to the blocking process at 5404. Idle is attained at 5406. If the message is accepted at 5398, the circuit is marked idle at 5408, and idle is attained at 5410.

Call Maintenance

Call maintenance is illustrated in FIGS. 33A–48D. Call maintenance is the process of treating calls for non-call associated messaging. A standard call maintenance process is described in ANSI standard T1.113, the contents of which are incorporated herein by reference. The following FIGS. 33A–48D illustrate the call treatment process logic/maintenance process logic that relates to maintenance of circuits and connections for calls and treatment of calls, call. signaling, and non-signaling messages to maintain the circuits and connections.

Blocking and Unblocking Message Receiving

Figure 33A:
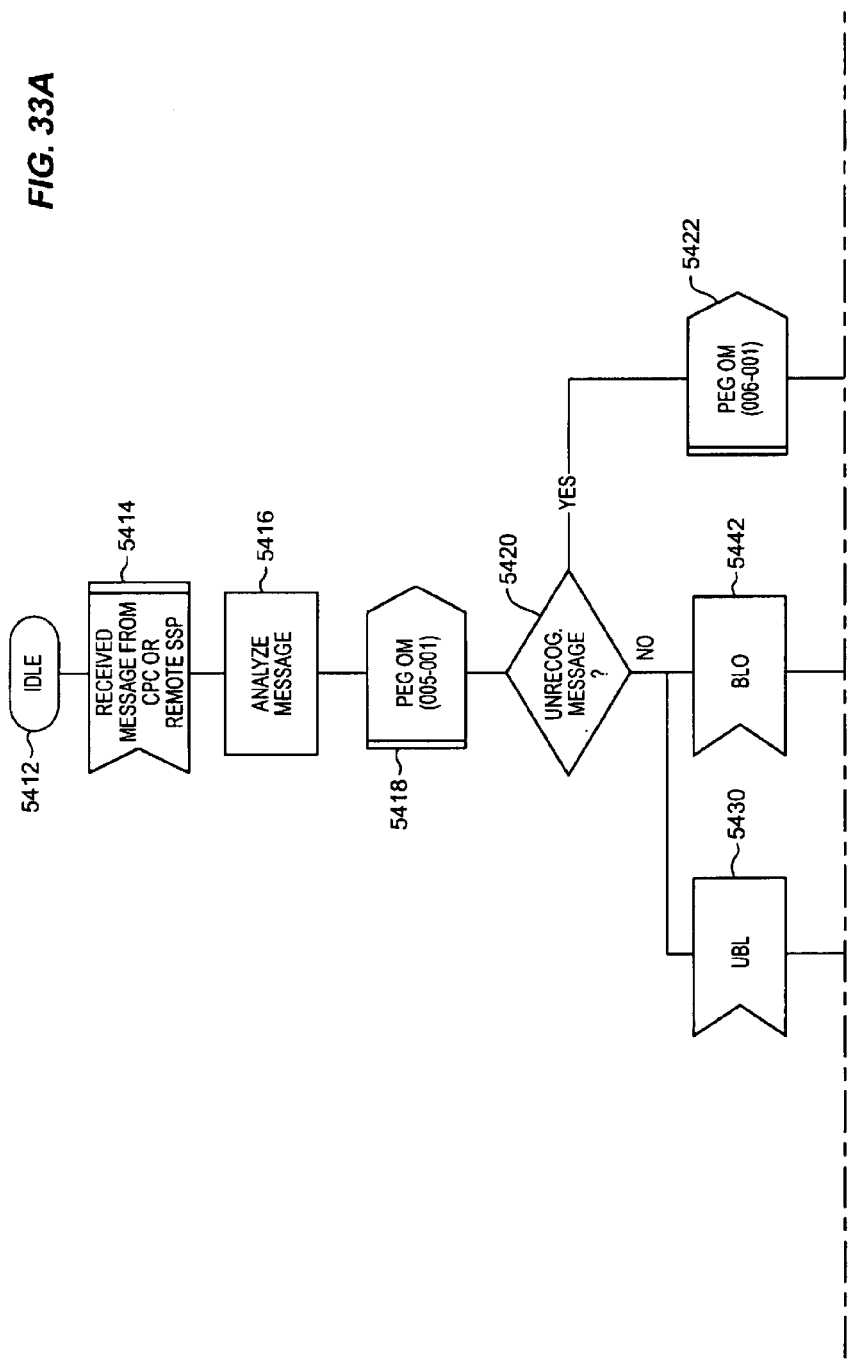
FIGS. 33A–33C are SDL diagrams of logic used in a version of the invention for a blocking and unblocking message receiving process.
Figure 33B:
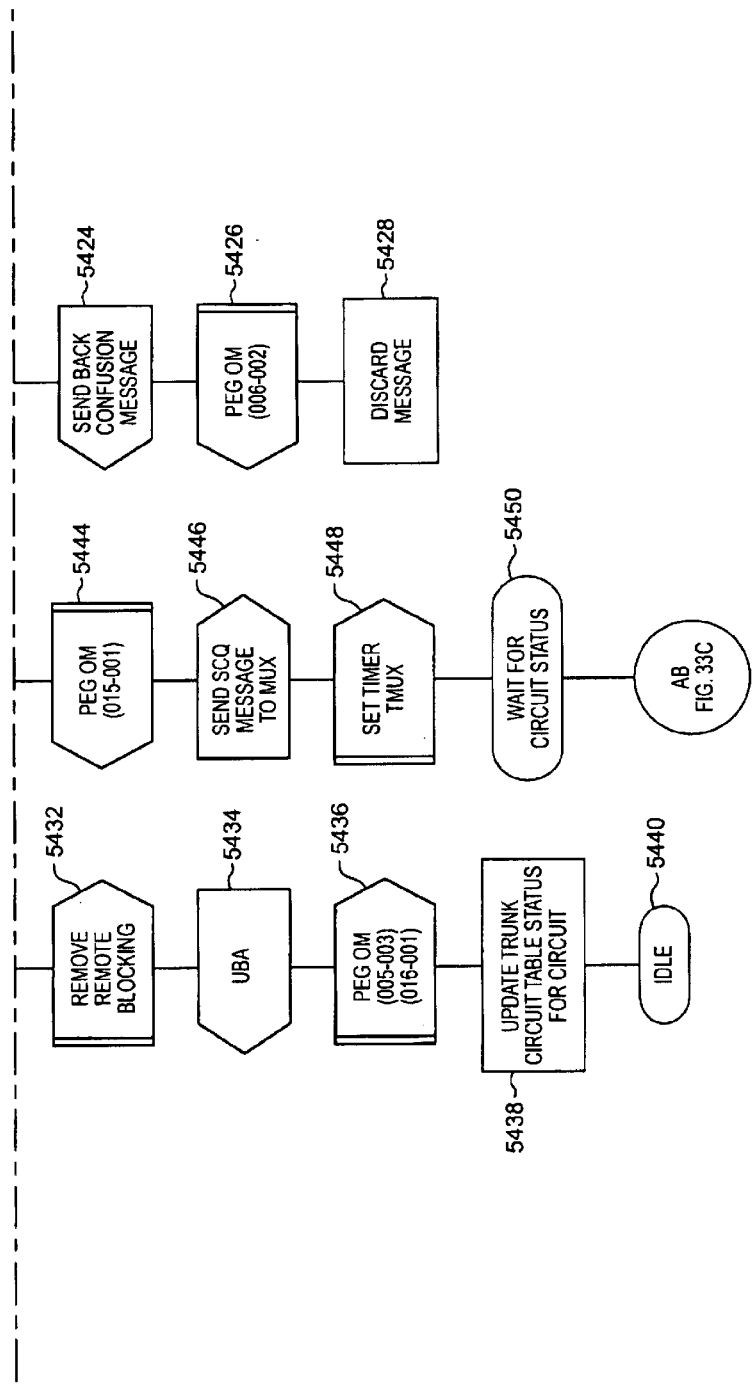
Figure 33C:
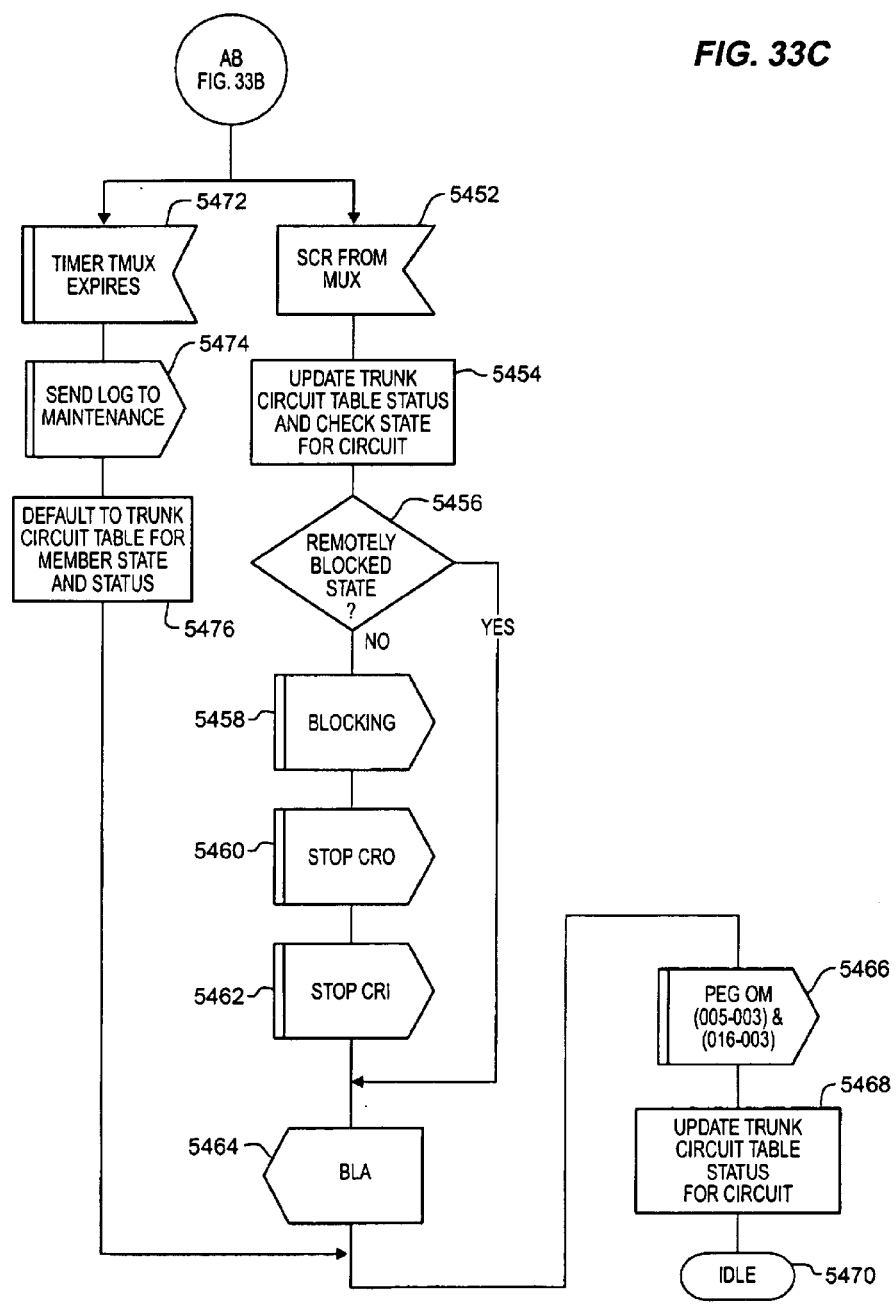

FIGS. 33A–33C illustrate the blocking acknowledgment (BLA) and unblocking acknowledgment (UBA) message reception process (BLR). On FIG. 33A, the BLA/UBA process is idle at 5412. At 5414, a message is received from the call processing center (CPC) or a remote signal switching point (SSP). The message is analyzed at 5416, and the operational maintenance (OM) counter for an incoming message is incremented (pegged) at 5418. If the message is unrecognized at 5420, then the OM for an "unrecognized message" is pegged at 5422. The signaling processor sends a confusion message from the originating end at 5424. The OM is pegged at 5426, and the message is discarded at 5428.

If the message is recognized at 5420, and if the message is an unblocking message (UBL) at 5430, then the remote blocking is removed at 5432 from the next point in the call. An unblocking acknowledgment is sent at 5434. The OM is pegged at 5436. The trunk circuit table is updated for the status of the circuit at 5438, and idle is attained at 5440.

If the message is recognized at 5420, and the message is a blocking message (BLO) at 5442, then the OM is pegged at 5444. A status connection query (SCQ) is sent to the interworking unit (mux) at 5446. The timer for the mux is set at 5448, and the CCM waits for the circuit status at 5450.

If the status connection response (SCR) is received from the mux at 5452, then the trunk circuit table status is updated, and the state of the circuit is checked at 5454. If the circuit is not remotely blocked at 5456, the circuit is blocked at 5458, the continuity recheck outgoing process (CRO) is stopped at 5460, and the continuity recheck incoming process (CRI) is stopped at 5462. A blocking acknowledgment (BLA) is sent at 5464. The OM is pegged at 5466. The trunk circuit table is updated for the status of the circuit at 5468, and idle is attained at 5470.

Blocking and Unblocking Message Sending

FIGS. 34A–34D illustrate the blocking and unblocking message sending process (BLS). On FIG. 34A, the blocking and unblocking process is idle at 5472. Manual blocking is initiated at 5474. The CRO is stopped at 5476, and the CRI is stopped at 5478. At 5480, an SCQ is sent to the mux to set the circuit to busy. The CCM receives an SCR back from the mux at 5482, the circuit is blocked at 5484, and the trunk circuit table is updated at 5486. A blocking message (BLO) is sent to the next point in the connection at 5488. The T12 and T13 timers are started at 5490 and 5492, and the CCM waits for a BLA at 5494.

Blocking occurs for the CPC, CQS, and circuit reception (CRR) at 5496. The process continues at step 5488, at which the BLO is transmitted for the terminating side of the call. The T12 and T13 timers are started at 5490 and 5492. Then, the signaling processor waits for a BLA at 5494.

If a UBA is received at 5498, then the trunk circuit table is queried to determine the circuit state and the circuit status at 5500. The CCM waits for the state and the status at 5502. The circuit status is received at 5504 from the trunk circuit table. If the circuit is not locally blocked at 5506, then idle is attained at 5508. If the circuit is locally blocked at 5506, then a BLO is sent at 5488. The T12 and T13 timers are started at 5490 and 5492, and the CCM waits for a BLA at 5494.

Either manual unblocking may be initiated at 5510 or standard unblocking may begin at 5512. For either manual or standard unblocking, an unblocking message (UBL) is transported at 5514 to the next point in the call. The T14 timer and the T15 timer are started at 5516 and 5518, respectively, Then, the signaling processor waits for an unblocking acknowledgment message (UBA) at 5520.

If a blocking acknowledgment message (BLA) is received at 5522, then the trunk circuit table is queried to determine the state and the status at 5524. The CCM waits for the state and the status at 5526, and the state and the status are returned for the circuit at 5528. If the circuit is locally blocked at 5530, then idle is attained at 5532. If the circuit is not locally blocked at 5530, a UBL is sent at 5514, and the T14 and T15 timers are started at 5516 and 5518. The signaling processor then waits for a UBA at 5520.

At 5534 (FIG. 34D), the signaling processor is waiting for a BLA. If the T13 timer expires at 5536, and if the T12 timer is still active at 5538, then the T12 timer is stopped at 5540. If the T13 timer expires and the T12 timer is not active at 5538, then the stop timer step of 5540 is skipped. Next, a BLO is sent at 5542. The OM is pegged at 5544. The T13 timer is started again at 5546, and maintenance personnel are alerted by sending a log to maintenance at 5548. The system again waits for a BLA at 5550.

If the T12 timer expires at 5552, a BLO is sent at 5554. The OM is pegged at 5556, and the T12 timer is started again at 5558. The system again waits for a BLA at 5560.

If a BLA is received at 5562, and the OM is pegged at 5564. The T12 and T13 timers are stopped at 5566 and 5568. The trunk circuit table is updated for the blocked circuit at 5570, and idle is attained at 5572.

If a stop BLO is received at 5573 on the originating end, then the T12 and T13 timers are stopped at 5566 and 5568. The trunk circuit table is updated for the blocked circuit at 5570, and idle is attained at 5572.

CPC blocking is initiated at 5574. A BLO is transported at 5576, and the OM is pegged at 5578. The signaling processor then waits for a BLA at 5580.

If a UBA is received at 5582, the OM is pegged at 5584. A BLO is sent at 5576, and the OM is pegged at 5578. The signaling processor then waits for the BLA at 5580.

Manual unblocking is initiated at 5586. The T12 and T13 timers are stopped at 5588 and 5590, respectively. The trunk circuit table is updated to active and idle for the circuit at 5592. A UBL is transported from the signaling processor at 5514 (FIG. 34A). The T14 and T15 timers are started at 5516 and 5518. The system then waits for a UBA at 5532.

In addition, an unblocking message may be received at the signaling processor at 5594. The T12 and T13 timers are stopped at 5588 and 5590, respectively. The trunk circuit table is updated for the active idle circuit at 5592. A UBL is transported at 5514 (FIG. 34A). The T14 and T15 timers are started at 5516 and 5518, respectively. The signaling processor then waits for a UBA at 5520.

Figure 34C:
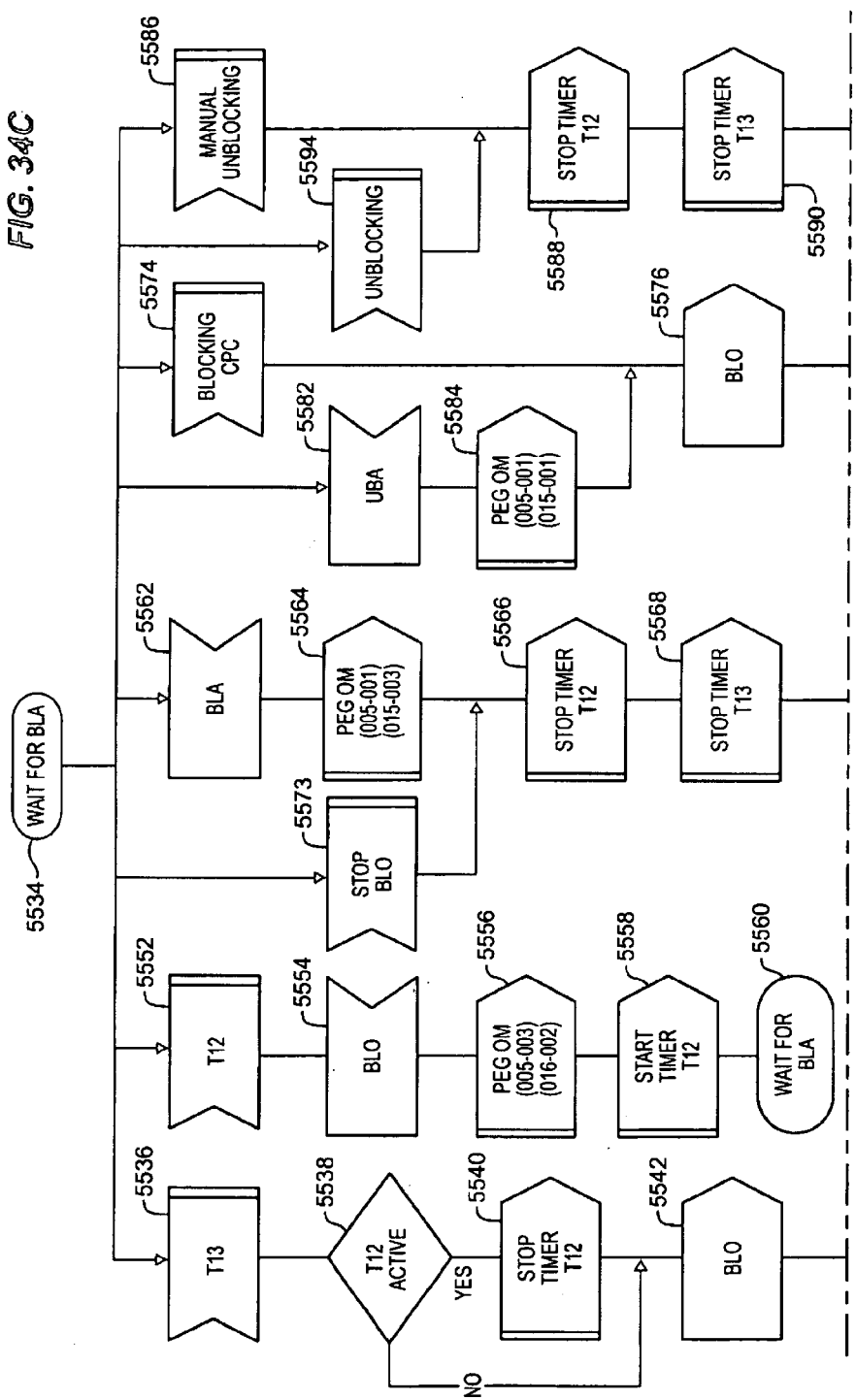
Figure 34D:
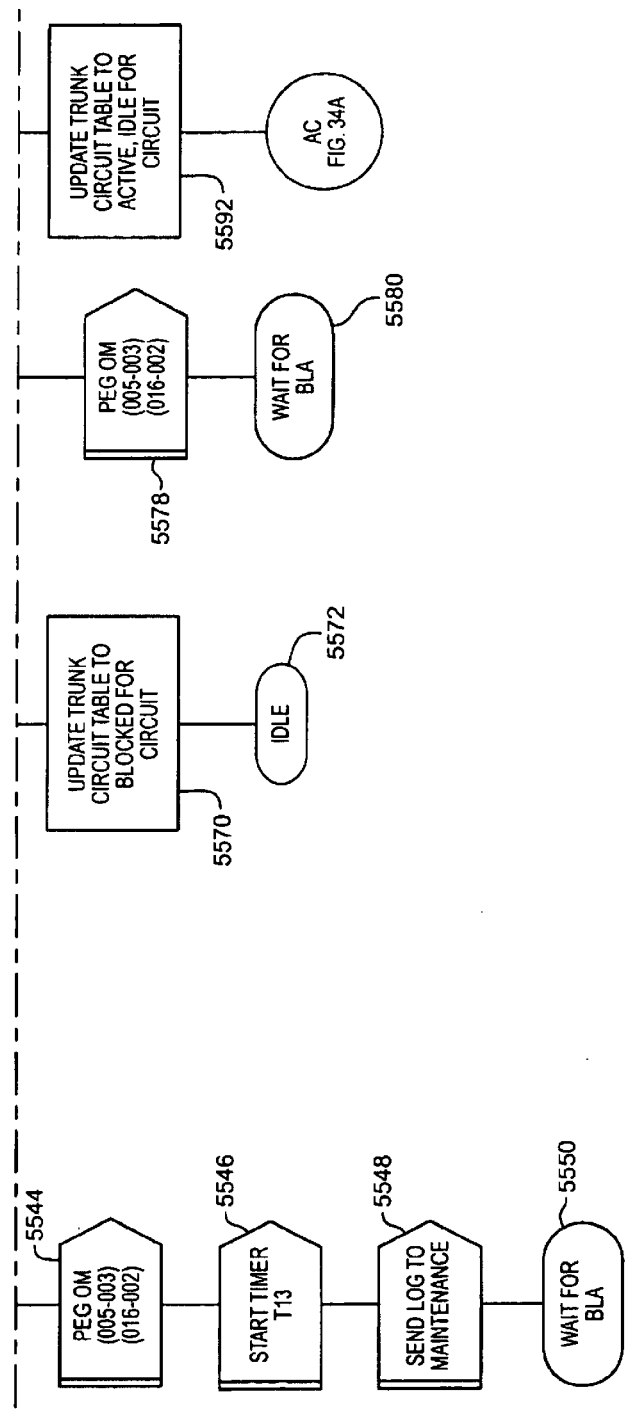
Figure 34E:
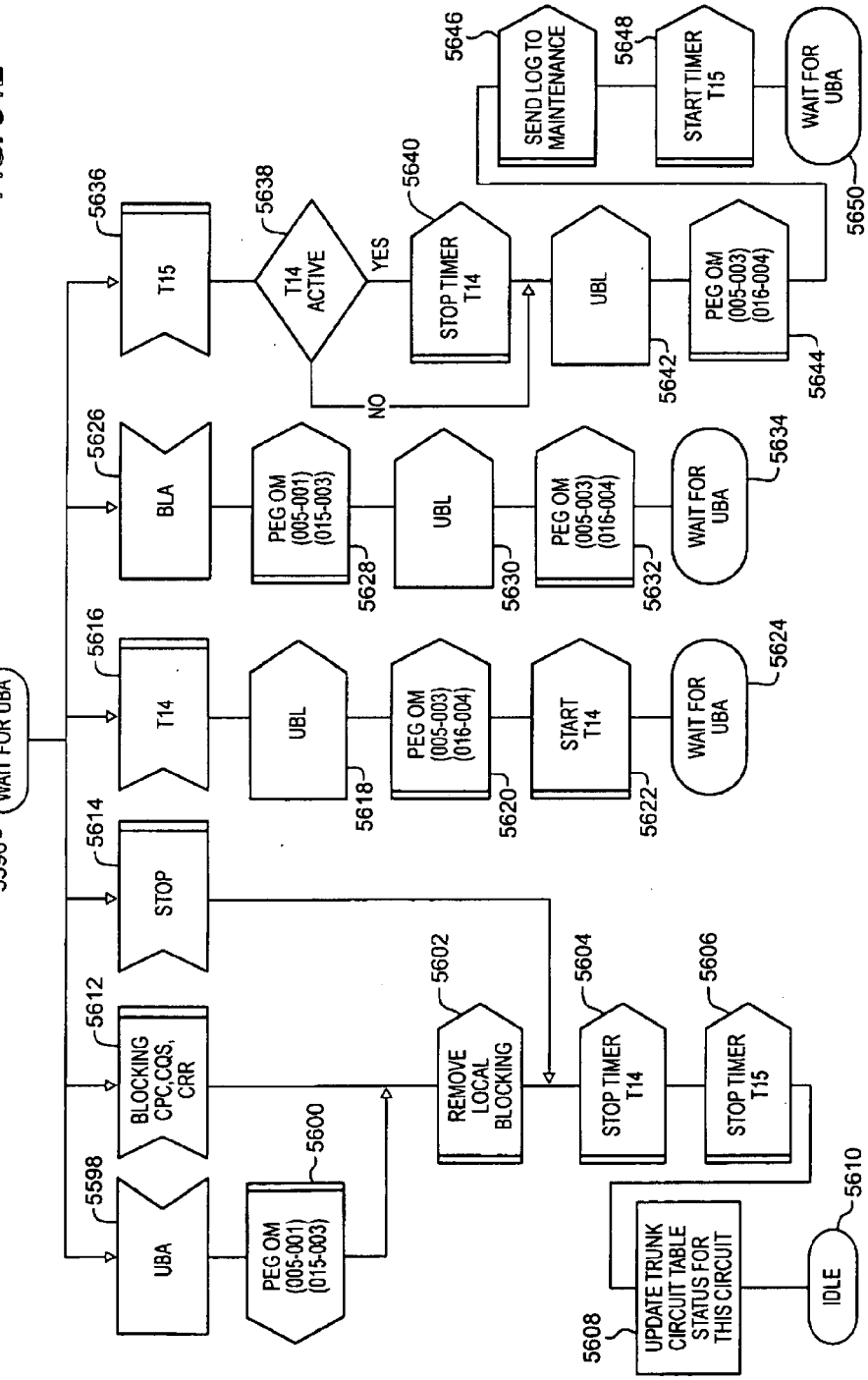

At FIG. 34E, the signaling processor is waiting for a UBA message at 5596. If an external UBA is received at 5598, the OM is pegged at 5600. The local blocking is removed at 5602. The T14 and T15 timers are stopped at 5604 and 5606, respectively. The trunk circuit table is updated for the status of the circuit at 5608, and the idle state is attained at 5610.

If a blocking message is received for CRR, CQS or CPC at 5612, then the local blocking is removed at 5602. The T14 and T15 timers are stopped at 5604 and 5606, respectively. The trunk circuit table status is updated for the circuit at 5608, and idle is attained at 5610.

If a stop is received at 5614, the T14 and T15 timers are stopped at 5604 and 5606, respectively. The trunk circuit table status is updated for the circuit at 5608, and idle is attained at 5610.

If the T14 timer times out at 5616, a UBL is retransmitted at 5618, the OM is pegged at 5620, and the T14 timer is restarted at 5622. The signaling processor waits for a UBA at 5624.

If a BLA is received at 5626, the OM is pegged at 5628, and a UBL is transported at 5630. The OM is pegged at 5632, and the signaling processor waits for a UBA at 5634.

If the T15 timer times out at 5636, and if the T14 timer is active at 5638, the T14 timer is stopped at 5640. If the T15 timer times out at 5636, and if the T14 timer is not active at 5638, it is not stopped. Next, a UBL is sent at 5642. The OM is pegged at 5644. The maintenance personnel are notified at 5646 by sending a log to maintenance. The T15 timer is restarted at 5648, and the signaling processor enters the wait state for a UBA at 5650.

Circuit Reset Message Reception

Figure 35A:
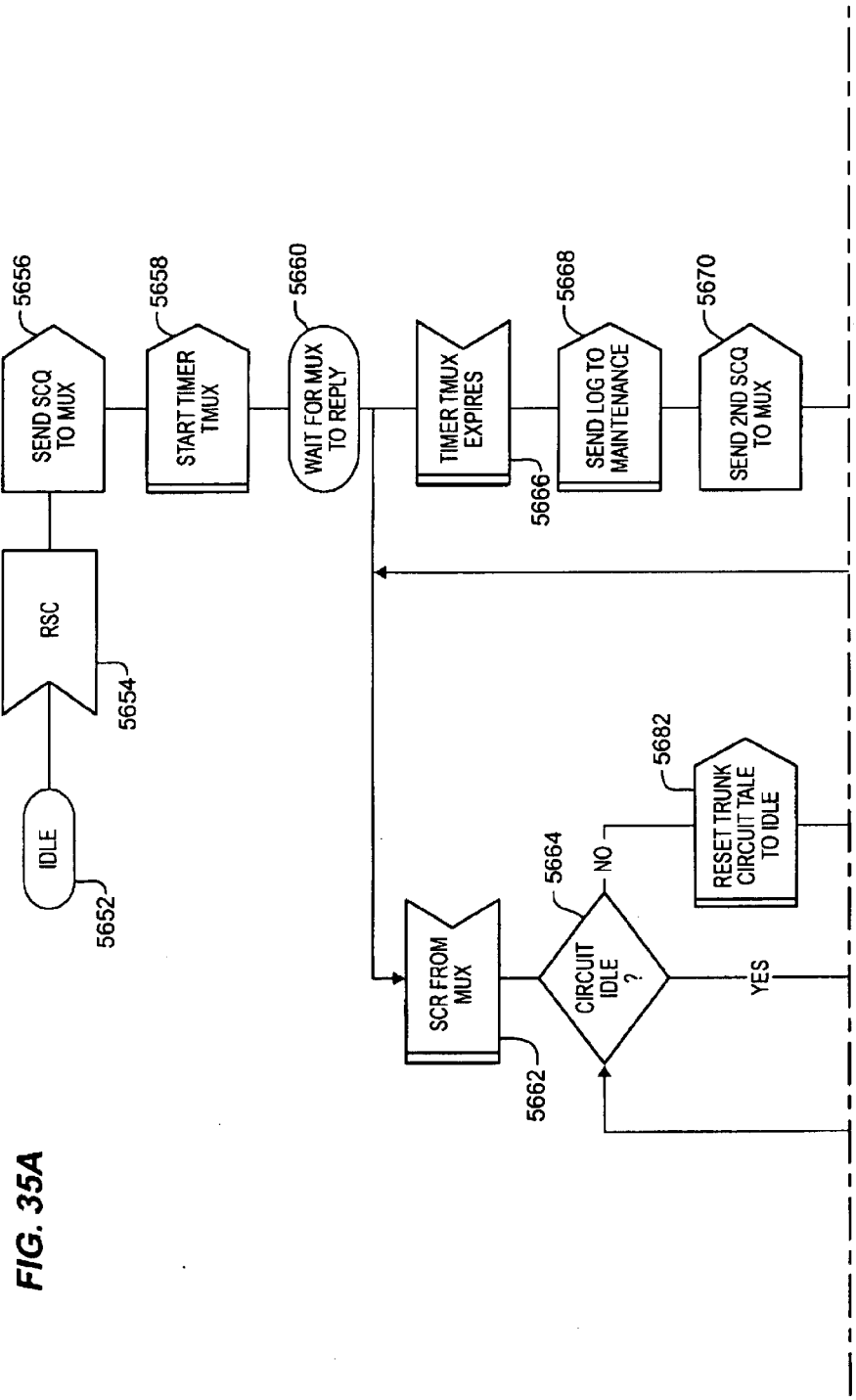
FIGS. 35A–35C are SDL diagrams of logic used in a version of the invention for a circuit message reception process.
Figure 35B:
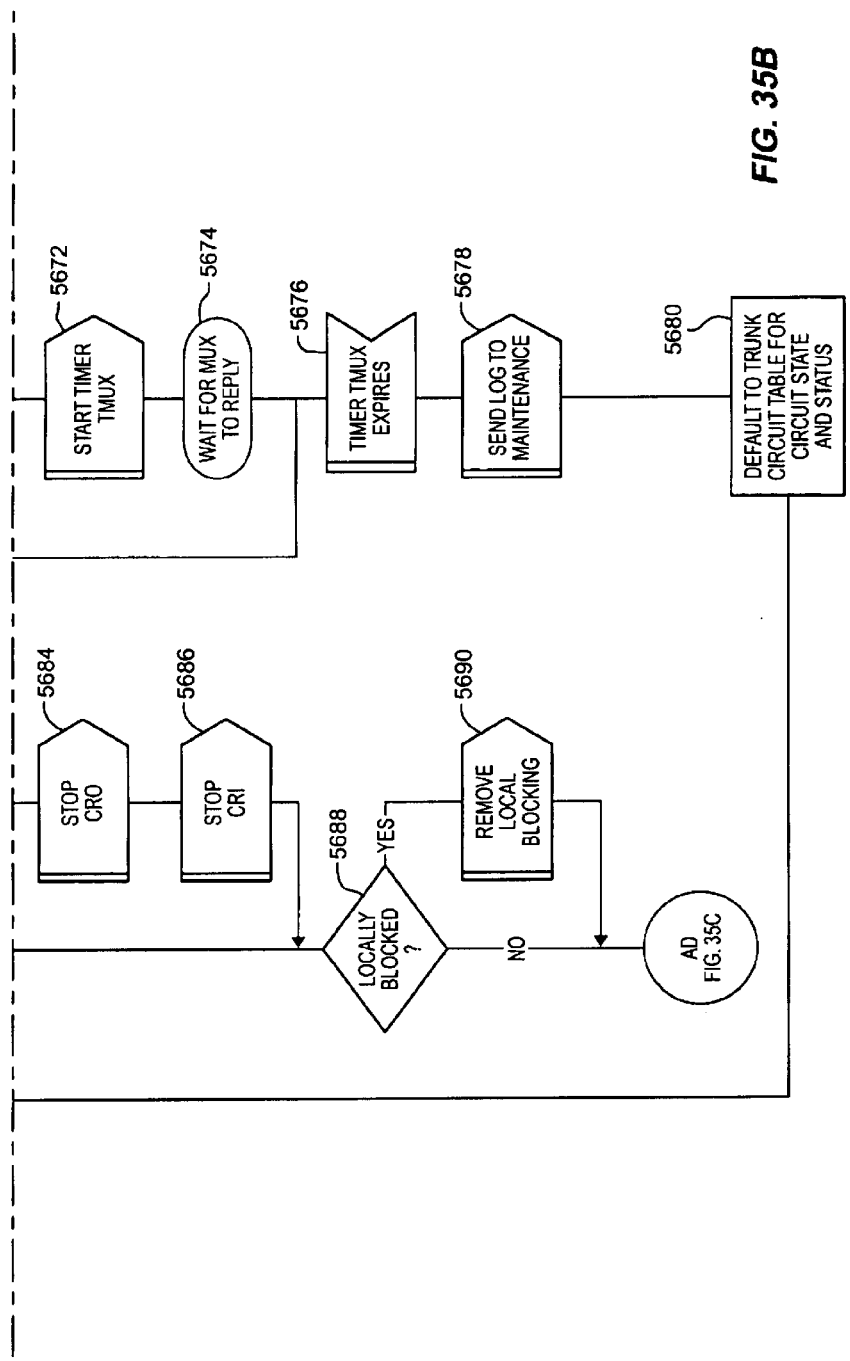
Figure 35C:
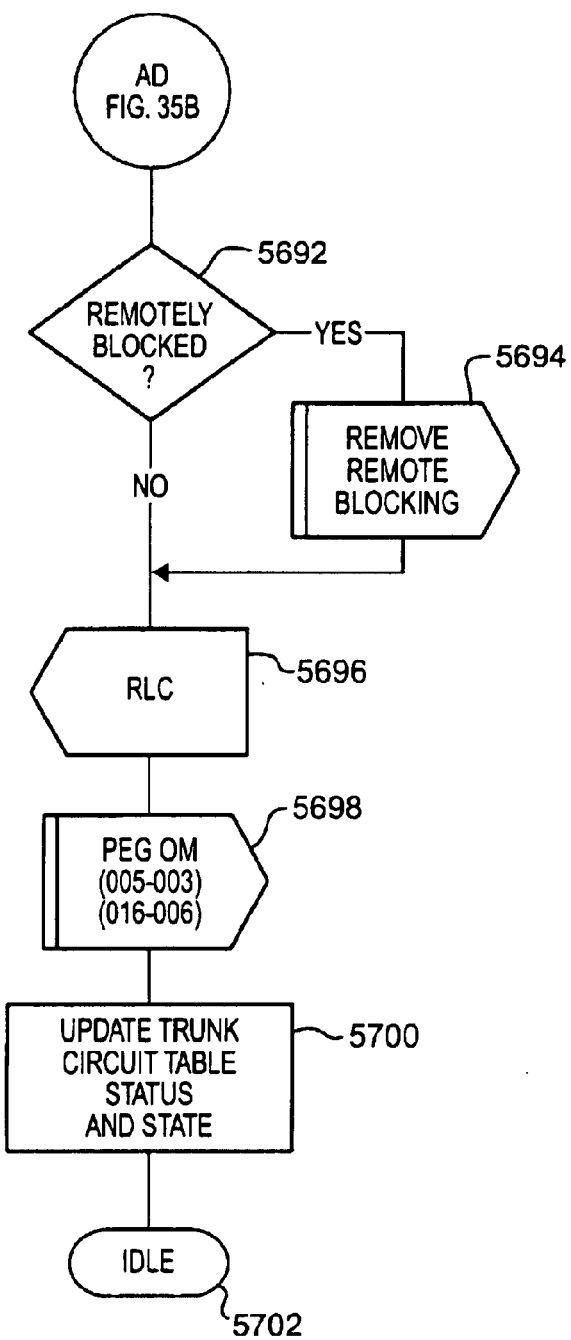

FIGS. 35A–35C illustrate the circuit reset message reception process (CRR). On Fig. 35A, the process is idle at 5652. If a reset circuit message (RSC) is received at 5654, an SCQ is sent to the mux at 5656. The mux timer is started at 5658, and the system waits for a reply from the mux at 5660. If an SCR is returned from the mux at 5662, it is determined if the circuit is idle at 5664.

If the mux timer expires at 5666, a log is sent to the maintenance personnel at 5668. A second SCQ is sent to the mux at 5670, and the mux timer is restarted at 5672. The signaling processor then waits for a reply from the mux at 5674. If an SCR is returned from the mux at 5662, it is determined if the circuit is idle at 5664. If the mux timer expires again at 5676, another log message is sent to the maintenance personnel at 5676, and the circuit state and status are set to the default for the trunk circuit table at 5680. Then, it is determined if the circuit is idle at 5664.

If the circuit is not idle at 5664, the trunk circuit table is reset to idle at 5682. The CRO and the CRI are stopped at 5684 and 5686, respectively. Then, it is determined if the circuit is locally blocked at 5688. In addition, if the state of the circuit is determined to be idle at 5664, it is next determined if the circuit is locally blocked at 5688.

If the circuit is locally blocked at 5688, the local blocking is removed at 5690. If the circuit is not locally blocked at 5688 or after local blocking has been removed at 5690, it is determined if the circuit is remotely blocked at 5692 (FIG. 35C). If the circuit is remotely blocked at 5692, the remote blocking is removed at 5694, and a release complete message (RLC) is transmitted at 5696. If the circuit is not remotely blocked at 5692, the RLC is transported at 5696. The OM is pegged at 5698, and the trunk circuit table status and state are updated at 5700. Idle is attained at 5702.

Circuit Reset Message Sending

Figure 36A:
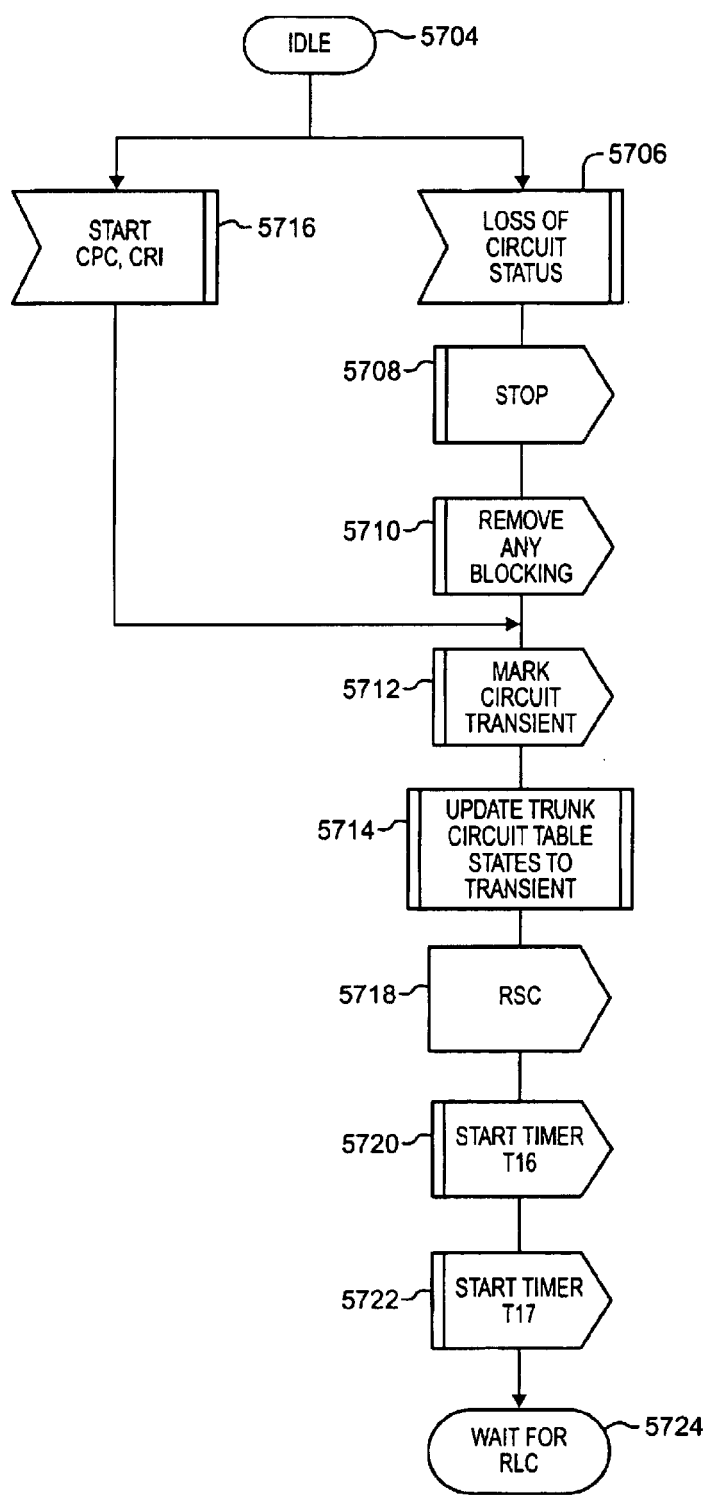
FIGS. 36A–36C are SDL diagrams of logic used in a version of the invention for a circuit message sending process.
Figure 36B:
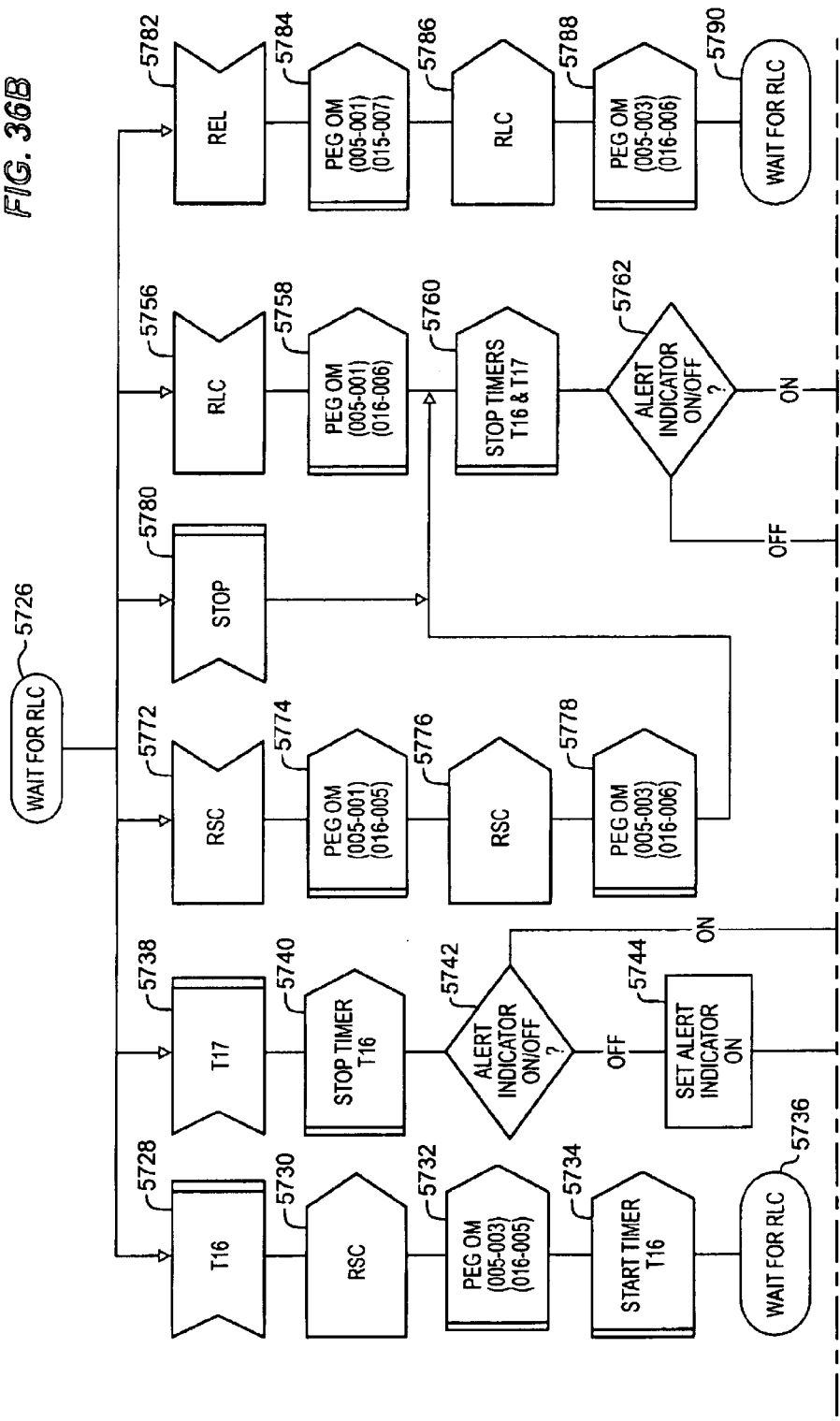
Figure 36C:
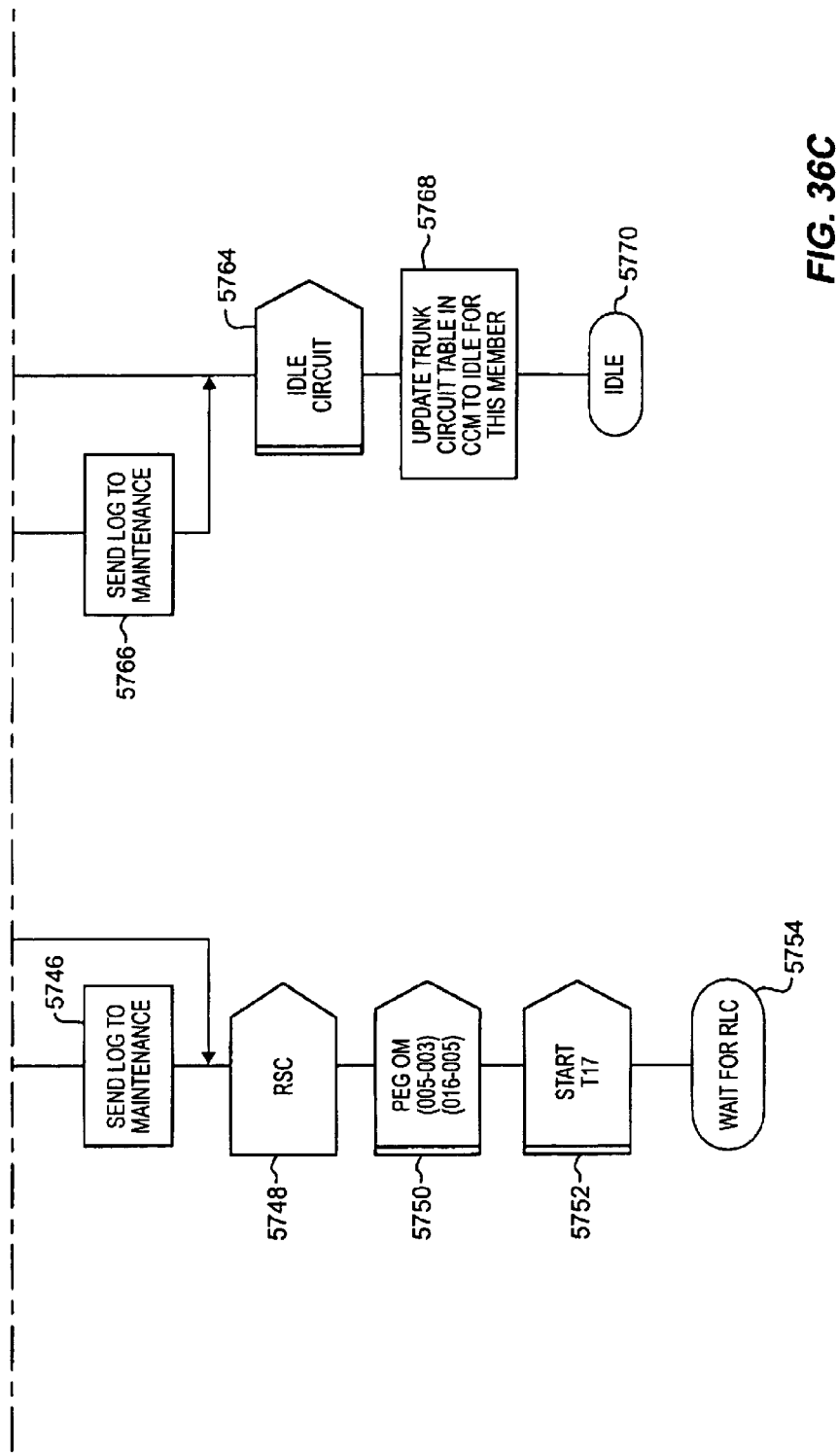

FIGS. 36A–36C illustrate the circuit reset message sending process (CRS). The process is idle at 5704. If the circuit status is lost at 5706, processing is stopped at 5708. Blocking is removed at 5710, and the circuit is marked as a transient circuit at 5712. The trunk circuit table status is updated to transient at 5714.

If, at the idle state at 5704, the CPC or CRI are started at 5716, the circuit is marked as transient at 5712, and the trunk circuit table status is updated to transient at 5714. After the trunk table is updated, a reset circuit message (RSC) is transported at 5718. The T16 and T17 timers are started at 5720 and 5722, respectively. The signaling processor waits for a release complete message (RLC) at 5724.

The signaling processor continues in the wait state for the RLC at 5726 (FIG. 36B). If the T16 timer times out at 5728, an RSC is transmitted at 5730. The OM is pegged at 5732, and the T16 timer is restarted at 5734. The signaling processor waits for an RLC at 5736.

If the T17 timer times out at 5738, the T16 timer is stopped at 5740. If the alert indicator is off at 5742, the alert indicator is set "on" at 5744, and a log is sent to maintenance personnel at 5746. An RSC is transported at 5748, and the OM is pegged at 5750. The T17 timer is restarted at 5752, and the signaling processor again waits for an RLC at 5754.

If the alert indicator was on at 5742, an RSC is sent at 5748. The OM is pegged at 5750. The T17 timer is reset at 5752, and the signaling processor again waits for an RLC at 5754.

If an RLC is received at 5756, the OM is pegged at 5758. The T16 and T17 timers are stopped at 5760. If the alert indicator is on at 5762, the circuit is set to idle at 5764. If the alert indicator is off at 5762, a log is sent to the maintenance personnel at 5766 before setting the circuit to idle at 5764. The trunk circuit table is updated to set the circuit for idle at 5768. Idle is attained at 5770.

If an RSC is received at 5772, the OM is pegged at 5774. An RLC is transported at 5776, and the OM for the RLC is pegged at 5778. Processing continues at step 5760 where the timers for T16 and T17 are stopped. Processing continues for steps 5762–5770 as explained above.

If a stop is received from a human machine interface (HMI) at 5780, processing continues at step 5760 where the T16 and T17 timers are stopped. Processing continues for steps 5762–5770 as explained above.

If a release message (REL) is received at 5782, the OM for the release is pegged at 5784. An RLC is transported to 5786, and the OM is pegged at 5788. The signaling processor then waits for an RLC to be received at 5790.

Circuit Query Message Reception

Figure 37:
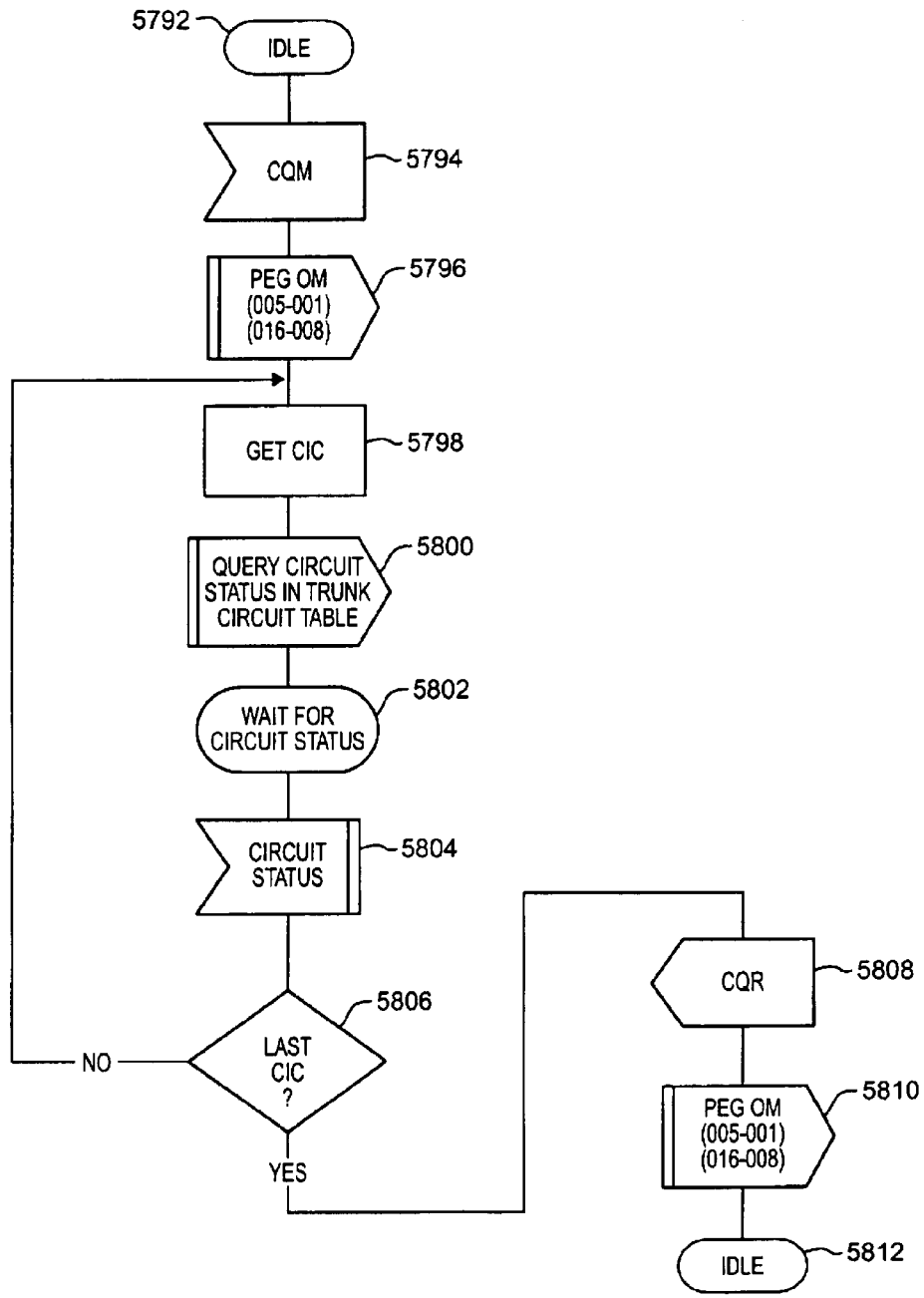
FIG. 37 is an SDL diagram of logic used in a version of the invention for a circuit query message reception process.

FIG. 37 illustrates the circuit query message reception process (CQR). On FIG. 37, the circuit query message reception process is in idle at 5792. If a circuit query message (CQM) is received at 5794, the OM for the CQM is pegged at 5796. The circuit identification code (CIC) for the circuit is obtained at 5798. The CCM queries the trunk circuit table to determine the circuit status at 5800, and waits for the response at 5802. The circuit status is received at 5804. If the CIC was the last CIC at 5806, then a circuit query response message (CQR) is sent at 5808. The OM for the CQR is pegged at 5810, and the process returns to idle at 5812.

If the CIC that was received from the circuit status at 5804 was not the last CIC at 5806, then the process returns to the step of getting the CIC at 5798. The process resumes its normal flow of querying the trunk circuit table for the circuit status at 5800 and continues.

Circuit Query Sending

Figure 38A:
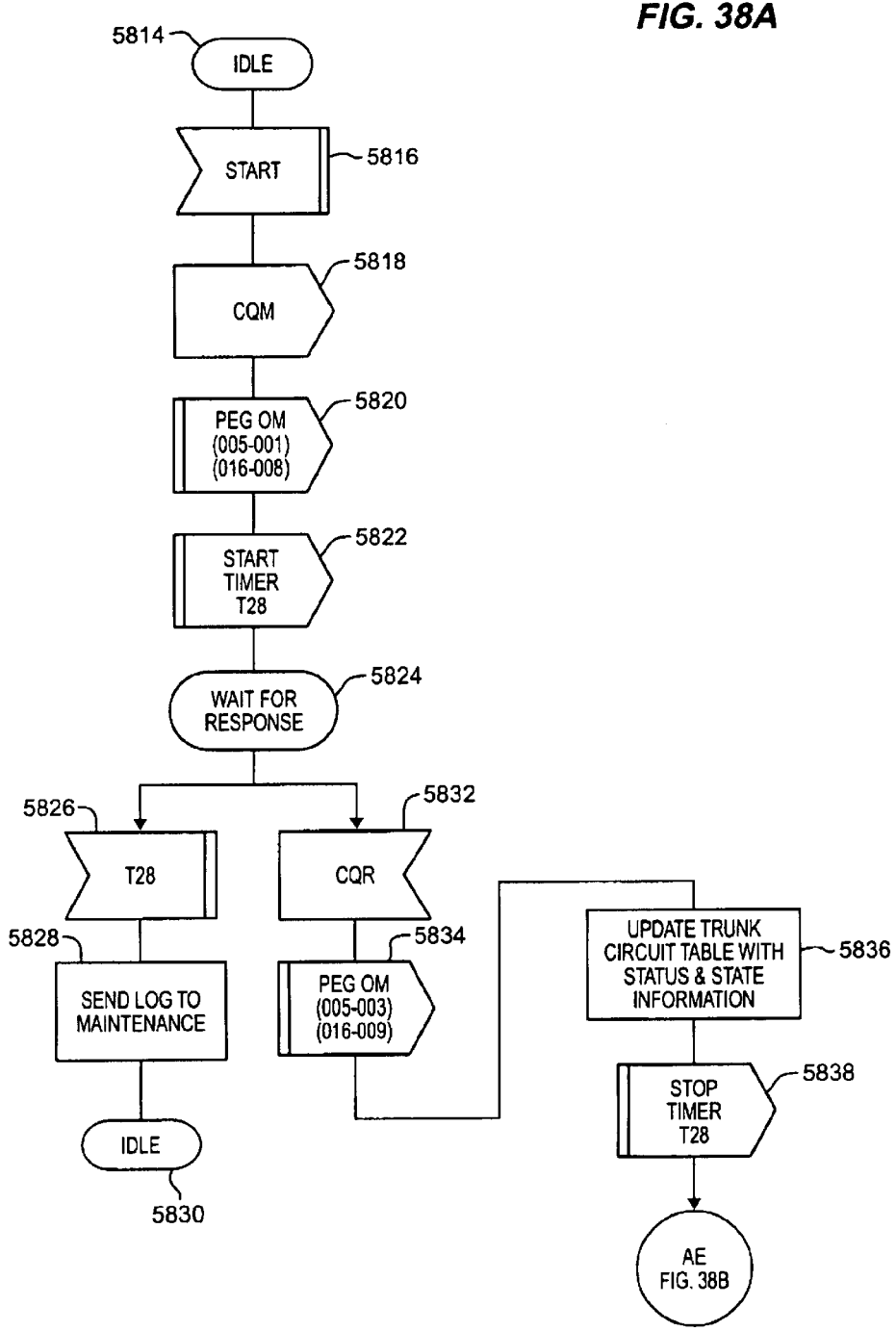
Figure 38D:
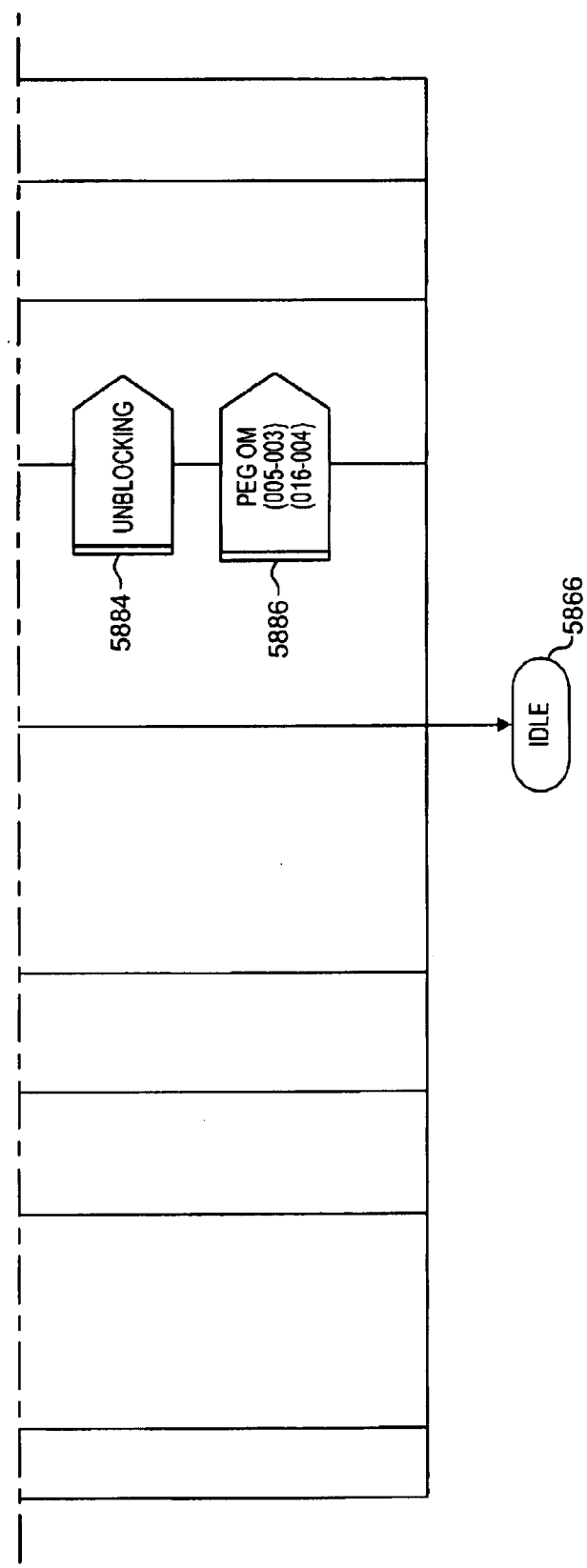

FIGS. 38A–38B illustrate the circuit query sending process (CQS). In FIG. 38A, the circuit query sending process is idle at 5814. When the process is started at 5816, a CQM is sent at 5818. The OM for the CQM is pegged at 5820. The T28 timer for the CQM process is started at 5822, and the signaling processor waits for response at 5824.

If the T28 timer times out at 5826, then maintenance is alerted by sending a log to the maintenance personnel at 5828. The system returns to idle at 5830.

If a CQR is received at 5832 before the T28 timer times out, the OM for the CQR is pegged at 5834. The trunk circuit table is updated with the status and the state of the CQR response at 5836. The T28 timer is stopped at 5838.

At 5840 (FIG. 38B), the trunk circuit table is checked for the circuit status and state. If the near end circuit at 5842 for the outgoing trunk circuit (OGC) is busy, and the far end circuit at 5844 is idle and unequipped, then the circuit is reset at 5846. If the near end circuit at 5842 is the incoming trunk circuit (ICC) and is busy, and the far end circuit at 5848 is idle and unequipped, then the circuit is reset at 5846. If the near end circuit at 5842 for ICC is busy, and the far end circuit at 5848 for the ICC is busy, then the circuit is released at 5850. The trunk circuit table is updated at 5852 for the far end state which is set to idle.

If the near end circuit at 5842 is idle and unequipped, and the far end circuit at 5854 is either ICC busy or OGC busy, then the circuit is released at 5856. If the near end circuit at 5842 is idle or unequipped, and the far end circuit at 5854 is transient, idle, or unequipped, then the status of the near end circuit is reexamined at 5858 (FIG. 38C).

In addition, if the near end circuit is transient at 5842, the status of the near end circuit is reexamined at 5858 (FIG. 38C). Moreover, after the trunk circuit table is updated at 5852, the circuit is reset at 5846, or the circuit is released at 5856, the status of the near end circuit is reexamined at 5858 (FIG. 38C).

On FIG. 38C, the near end circuit status is determined at 5858. If the near end circuit status at 5858 is unequipped, and if the far end circuit at 5860 is active, a BLO is sent at 5862, and the OM for the BLO is pegged at 5864. If the far end circuit at 5860 is locally blocked, remotely blocked, locally and remotely blocked, transient, or unequipped, then the process goes to idle at 5866.

If tile near end circuit at 5858 is locally blocked, and the far end circuit at 5868 is remotely blocked, transient, or unequipped, then the process returns to idle at 5866. If the near end circuit at 5858 is locally blocked, and if the far end circuit at 5868 is locally blocked, then the blocking process is started at 5870. The remote blocking process is also started at 5872. Maintenance personnel are alerted at 5874 by sending a log to maintenance.

If the near end circuit at 5858 is locally blocked, and the far end circuit at 5868 is locally and remotely blocked, then the remote blocking process is started at 5872. Maintenance personnel are alerted at 5874 by sending a log to maintenance. After each case of sending the log to maintenance at 5874, the process returns to idle at 5866.

If the near end circuit at 5858 is locally blocked, and if the far end circuit at 5868 is active, the blocking process is started at 5876. Idle is resumed at 5866.

If the near end circuit at 5858 is active and the far end circuit at 5878 is locally and remotely blocked, the remote blocking process is started at 5880. Maintenance personnel are alerted at 5882 by sending a log to maintenance. The unblocking process is started at 5884. The OM for unblocking is pegged at 5886. Then, idle is attained at 5866.

If the near end circuit at 5858 is active, and the far end circuit at 5878 is remotely blocked, the unblocking process is started at 5884. The OM for unblocking is pegged at 5886. Idle then is attained at 5866.

If the near end circuit at 5858 is active, and the far end circuit at 5878 is locally blocked, the remote blocking process is started at 5888. Maintenance personnel are alerted at 5890 by sending a log to maintenance. Then, idle is attained at 5866.

If the near end circuit at 5858 is active, and the far end circuit at 5878 is active and transient, idle is attained at 5866. If the near end circuit at 5858 is active, and the far end circuit at 5878 is unequipped, local blocking is started at 5892. Then, idle is attained at 5866.

Figure 38E:
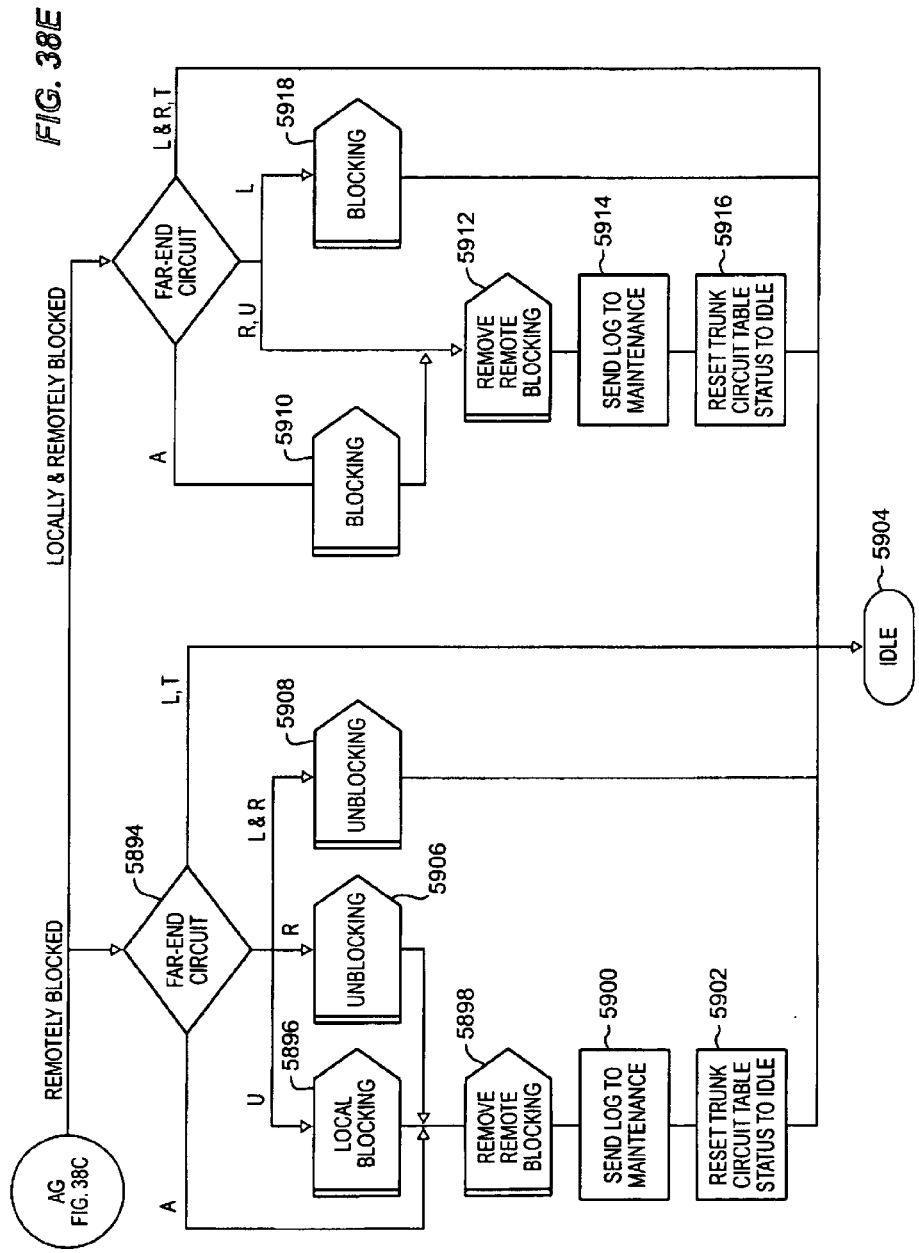

If the near end circuit at 5858 is either remotely blocked or locally and remotely blocked, then the status of the far end circuit is determined for remote and local blocking at 5894 and 5895 (FIG. 38E). If the far end circuit at 5894 is unequipped, the local blocking process is started at 5896 by sending a CQS for local blocking to the Signaling Procedure Control (SPRC). Remote blocking is removed at 5898 by sending a CQS for that process to the SPRC. Maintenance personnel are alerted by sending a log to maintenance at 5900. The trunk circuit table status is reset to idle at 5902. Idle then is attained at 5904.

If the far end circuit at 5894 is active, remote blocking is removed at 5898 by sending a CQS for that process to the SPRC. Maintenance personnel are alerted by sending a log to maintenance at 5900. The trunk circuit table status is reset to idle at 5902, and idle is attained at 5904.

If the far end circuit is remotely blocked at 5894, unblocking is started at 5906 by sending a CQS for unblocking to the BLS. Remote blocking is removed at 5898 by sending a CQS for that process to the SPRC. Maintenance personnel are alerted at 5900 by sending a log to maintenance. The trunk circuit table status is reset to idle at 5902, and idle is attained at 5904.

If the far end circuit at 5894 is locally blocked and remotely blocked, the unblocking process is started at 5908. A CQS for the unblocking process is sent to the BLS. Idle then is attained at 5904. If, however, the far end circuit status at 5894 is locally blocked or transient, then idle is attained at 5904.

If the near end circuit is locally and remotely blocked, and the far end circuit is active at 5895, blocking is started at 5910. A CQS for the blocking process is sent to the BLS and the signaling processor. Remote blocking is removed at 5912 by sending a CQS for that process to the SPRC. Maintenance personnel are notified at 5914 by sending a log to maintenance. The trunk circuit table status is reset to idle at 5916. Then, idle is attained at 5904.

If the near end circuit is locally and remotely blocked, and the far end circuit is remotely blocked or unequipped at 5895, remote blocking is removed at 5912 by sending a CQS to the SPRC for the remote blocking removal process. Maintenance personnel are notified at 5914 by sending a log to maintenance. The trunk circuit table status is reset to idle at 5916. Then, idle is attained at 5904.

If the near end circuit is locally blocked and remotely blocked, and the far end circuit is locally blocked at 5895, the blocking process is started at 5918. A CQS is sent to the BLS for the blocking process. Idle then is attained at 5904. If the near end circuit, however, is locally blocked and remotely blocked, and the far end circuit is locally blocked and remotely blocked or transient at 5895, idle is attained at 5904.

Unequipped Circuit Identification Code Process

Figure 39A:
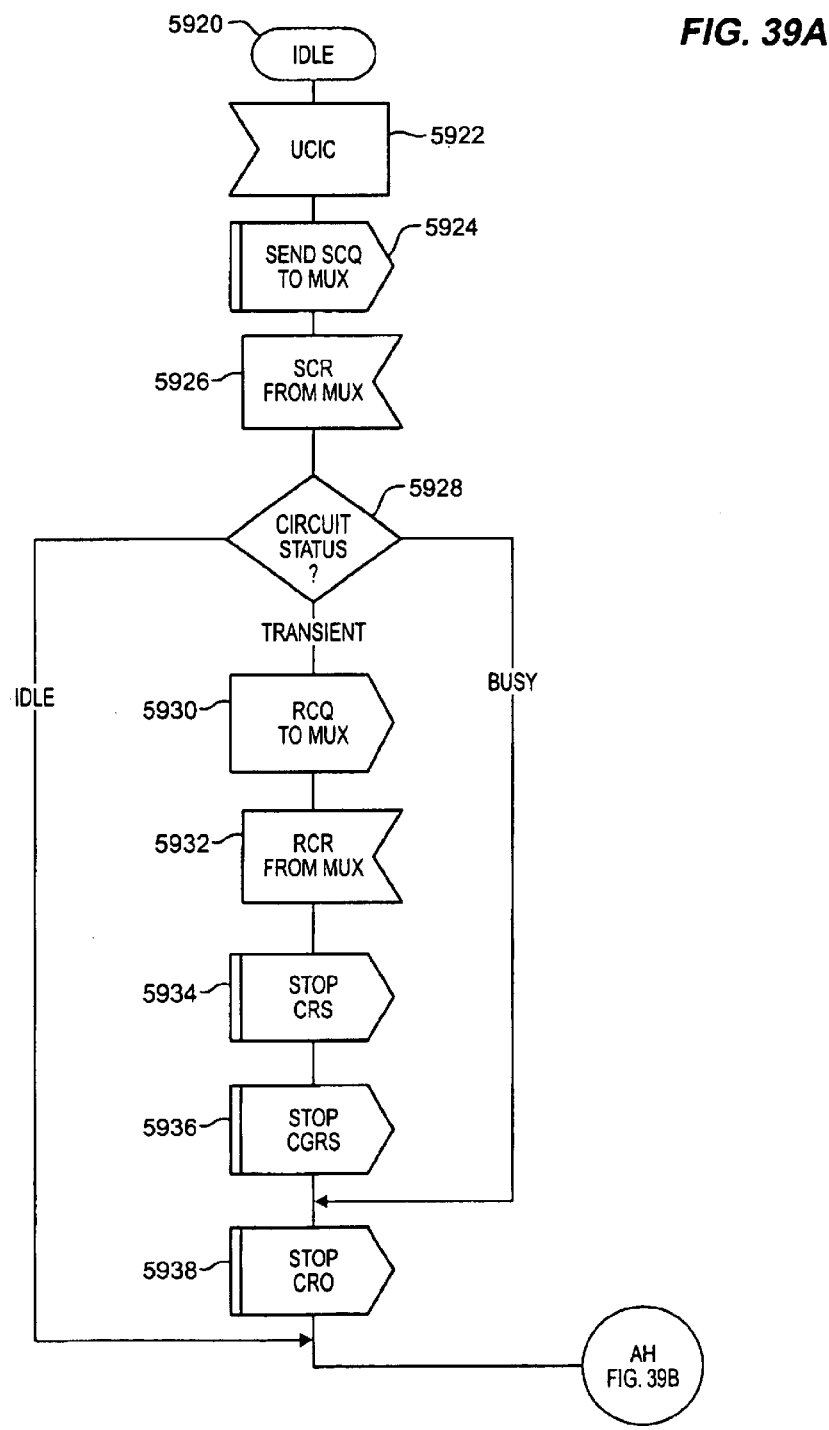
FIGS. 39A–39B are SDL diagrams of logic used in a version of the invention for an unequipped circuit identification code process.
Figure 39B:
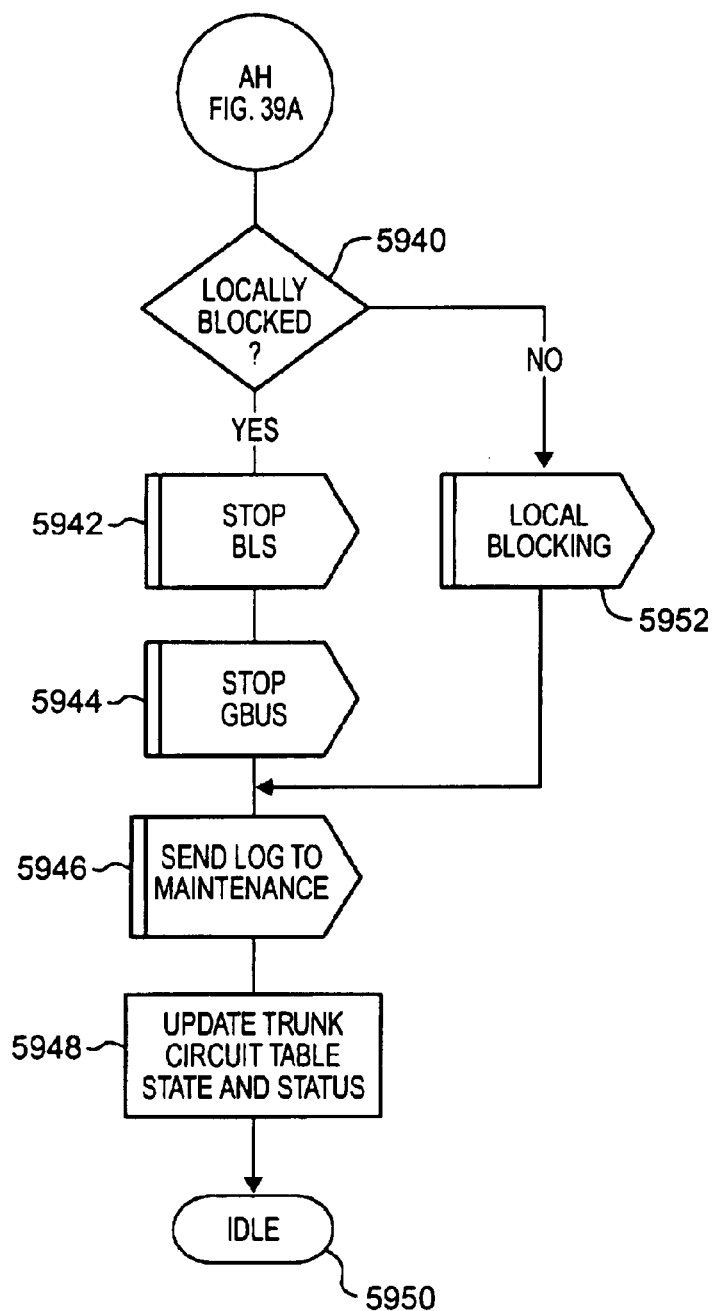

FIGS. 39A–39B illustrate the maintenance process for unequipped circuit identification code (UCIC). On FIG. 39A, the process is in idle at 5920. A UCIC message is received at 5922. An SCQ is sent to the mux at 5924. The signaling processor receives an SCR from the mux with the circuit status at 5926. If the circuit status is transient at 5928, a reset connection query message (RCQ) is sent to the mux at 5930. A reset connection response message (RCR) is received from the mux at 5932. The circuit reset sending (CRS) is stopped at 5934. The circuit group reset sending (CGRS) is stopped at 5936. The continuity recheck outgoing (CRO) is stopped at 5938.

If the circuit status at 5928 is busy, the process steps down so that the CRO is stopped at 5938. If the circuit status is idle at 5928, the process steps down just after the stop CRO at 5938.

After the stop CRO at 5938, it is determined if the circuit is locally blocked at 5940 (FIG. 39B). If the circuit is locally blocked at 5940, the blocking/unblocking signal sending process (BLS) is stopped at 5942. The circuit group blocking/unblocking sending process (GBUS) is stopped at 5944. Maintenance personnel are notified by sending a log to maintenance at 5946. The trunk circuit table is updated for state and status at 5948. Idle is attained at 5950.

If the circuit is not locally blocked at 5940, the local blocking process is started at 5952. The circuit is removed from service by sending a UCIC to the SPRC. Maintenance personnel are notified by sending a log to maintenance at 5946. The trunk circuit table is updated for state and status at 5948. Then, idle is attained at 5950.

Circuit Group Blocking/Unblocking Reception

Figure 40A:
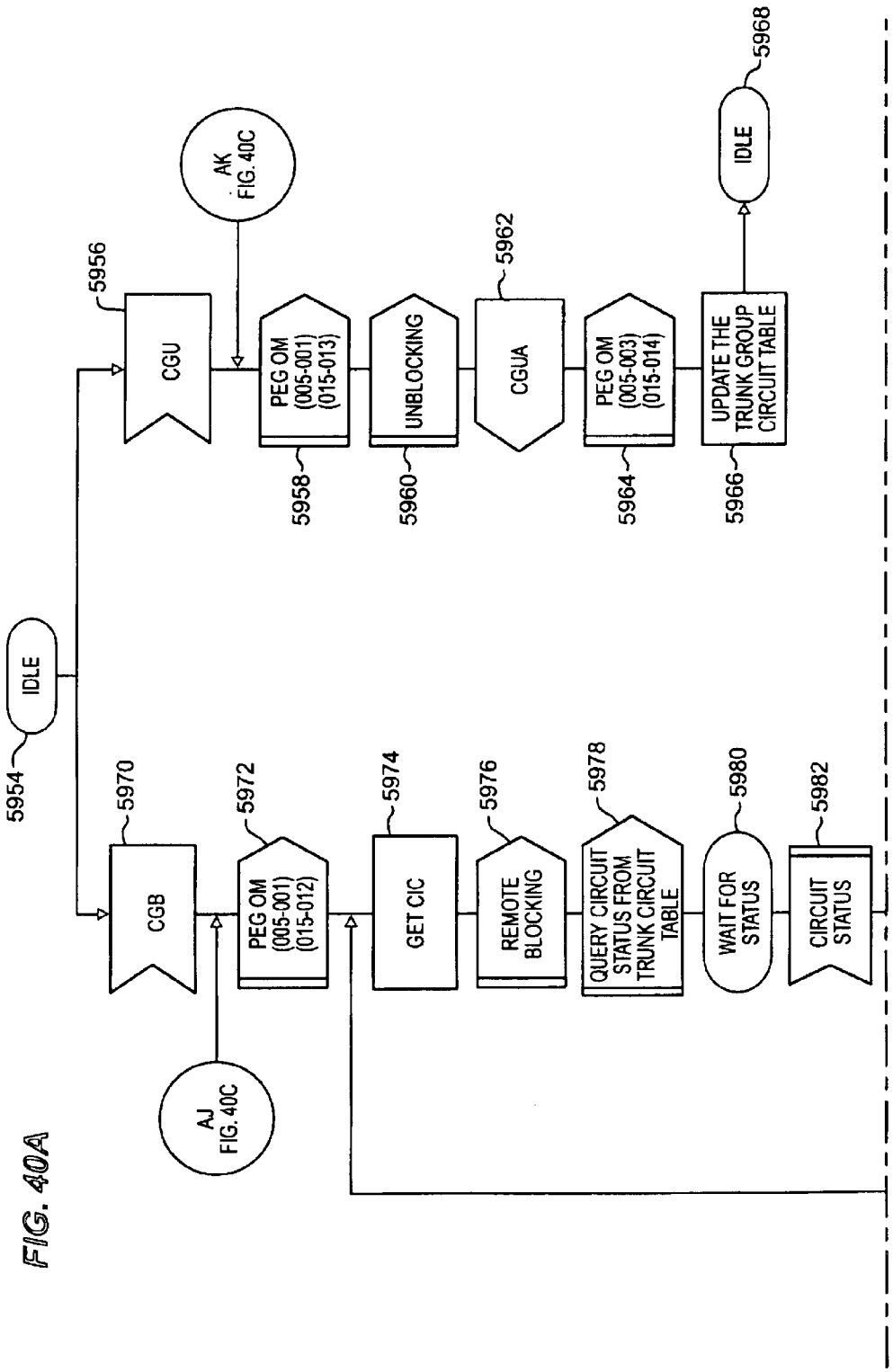
FIGS. 40A–40C are SDL diagrams of logic used in a version of the invention for a circuit group blocking/unblocking reception process.
Figure 40B:
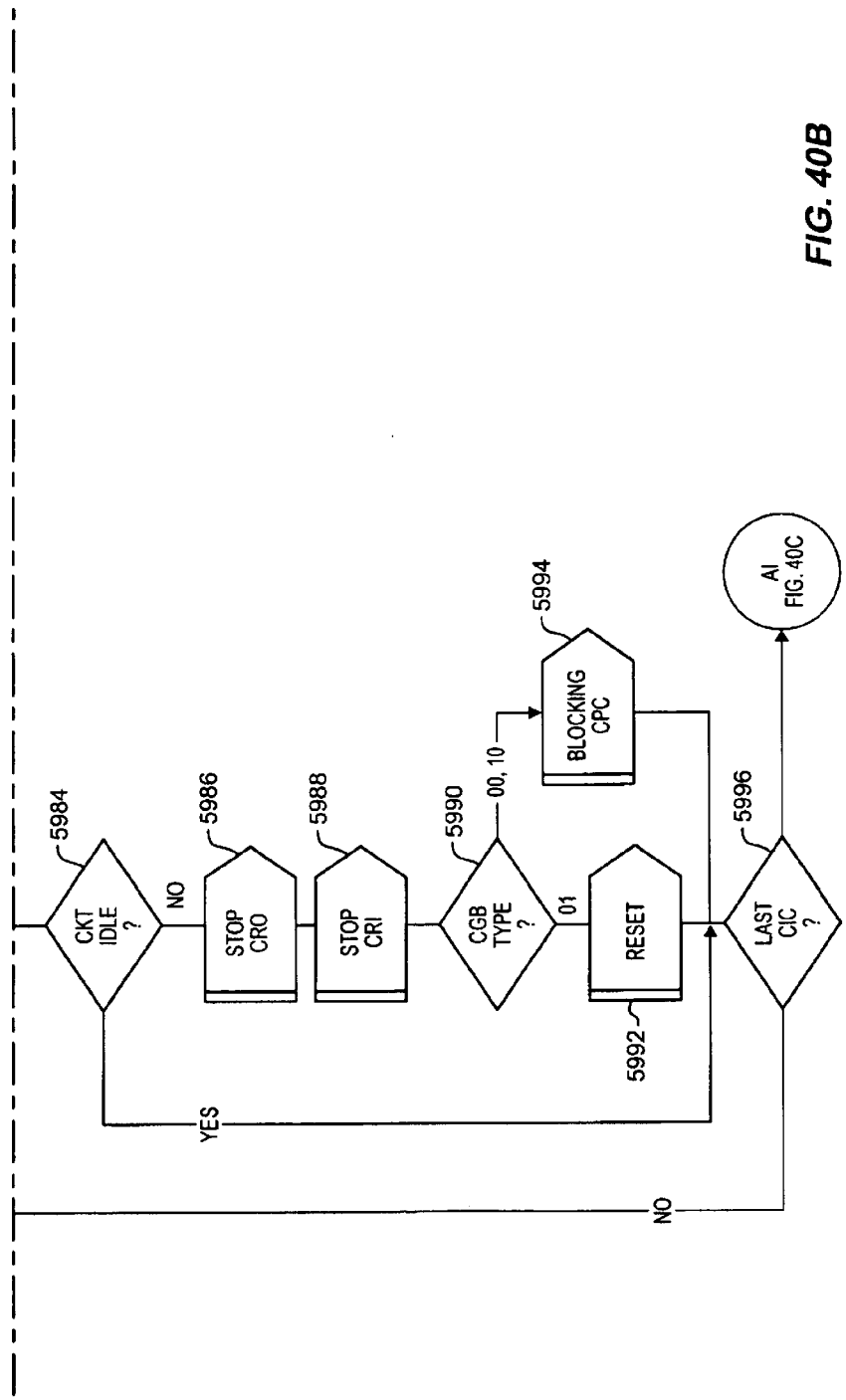
Figure 40C:
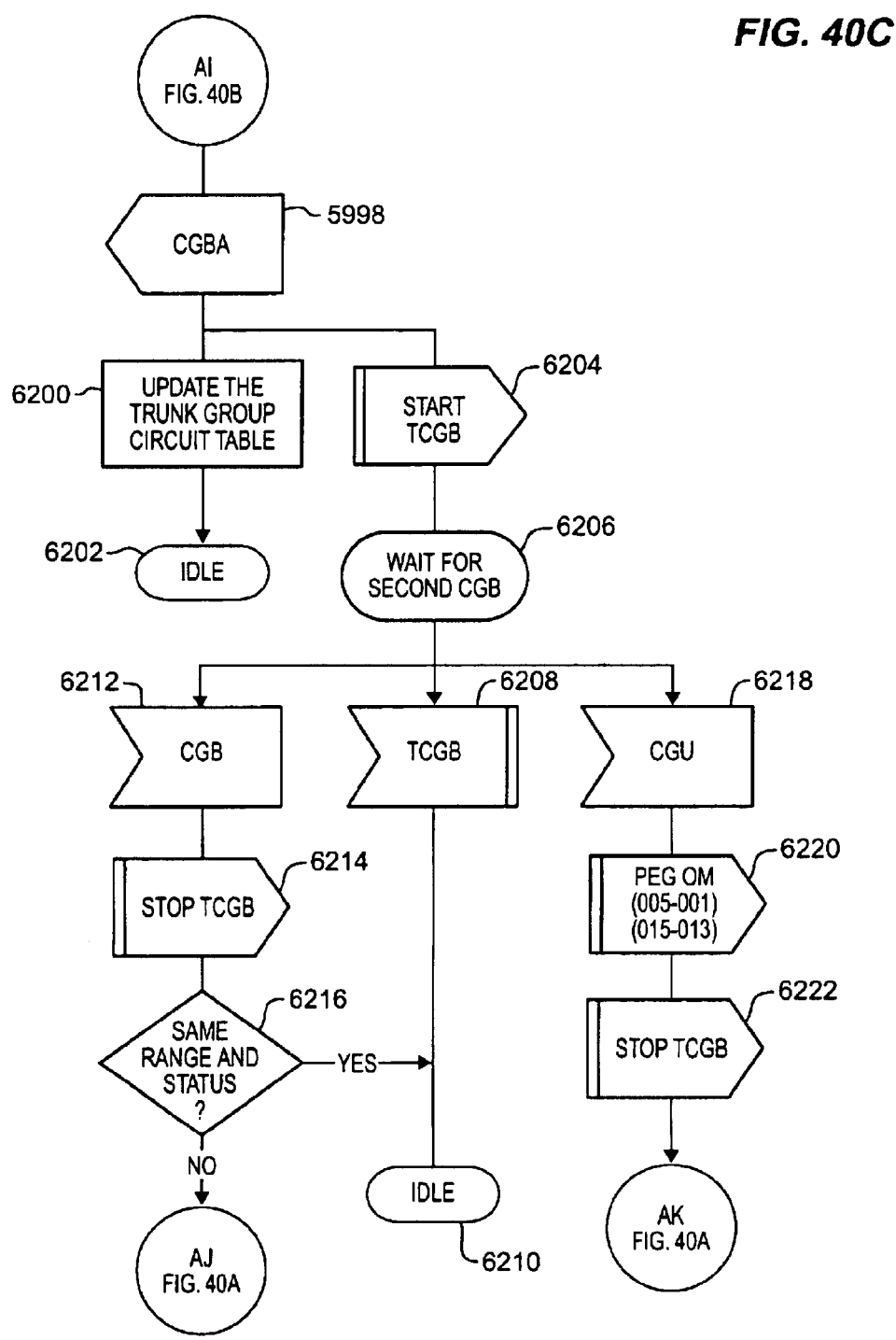

FIGS. 40A–40C illustrate the process for circuit group blocking/unblocking reception (GBUR). On FIG. 40A, the GBUR process is in idle at 5954. If a circuit group unblocking message (CGU) is received at 5956, the OM for the CGU reception is pegged at 5958. The unblocking process is started at 5960 for each circuit within a range or status specified by the CGU. A circuit group unblocking acknowledgment (CGUA) is transported at 5962. The OM for the CGUA is pegged at 5964. The trunk group circuit table is updated for state and status at 5966. Idle is attained at 5968.

If a circuit group blocking message (CGB) is received at 5970, the OM for that message is pegged at 5972. The CIC is obtained at 5974. Remote blocking is initiated at 5976. The trunk circuit table is queried to determine the circuit status at 5978. After waiting for the status at 5980, the circuit status is received at 5982. If the circuit is not idle at 5984, the CRO process is stopped at 5986. In addition, the CRI process is stopped at 5988.

If the COB type at 5990 is 01 so that the circuit group has been released, then the circuit group is reset at 5992. If the COB type at 5990 is 00 or 10 such that there has been no release of the circuit group, then the circuit group is blocked at 5994.

If at step 5984 the status of the circuit is idle, then the process moves to step 5996 where it is determined if the last circuit within the CIC range has been processed. In addition, after the circuit in the circuit group has either been reset at step 5992 or blocked at step 5994, it is determined if the CIC for the last circuit in the circuit group has been received and processed at 5996.

If the last CIC has not been retrieved so that the process has not been initiated for the last circuit in the circuit group, then the process returns to step 5974, and the next CIC is retrieved. If the last CIC has been retrieved at 5996, then a circuit group blocking acknowledgment (CGBA) is sent at 5998 (FIG. 40B). The circuit type in the CGBA is set to a same value as the circuit type in the COB. The trunk group circuit table is updated at 6200 for the circuit group blocking. Idle is attained at 6202.

In addition, after the CGBA is sent at 5998, it is optional to start a timer for the circuit group blocking message (TCGB) at 6204. The signaling processor waits for a second COB, a CGU, or for the time out of the TCGB at 6206. If the TCGB times out at 6208, idle is attained at 6210. In addition, a subsequent CGB received after the TCGB timer times out will be accepted as a new message.

If, while waiting for the second COB at 6206, a COB is received at 6212, the TCGB timer is stopped at 6214. At 6216, if the range and status of the second COB which is received at 6212 is the same as the range and status of the first COB which was received at 5970 (FIG. 40A), then idle is attained at 6210. If the range and status is not the same at 6216, then the process returns to step 5972 (FIG. 40A), and it continues in its normal fashion.

If while waiting for the second CGB at 6206, a CGU is received at 6218, the OM for the CGU is pegged at 6220. The TCGB timer is stopped at 6222. The process returns to step 5958 (FIG. 40A), and proceeds in its normal fashion.

Circuit Group Blocking/Unblocking Sending

Figure 41A:
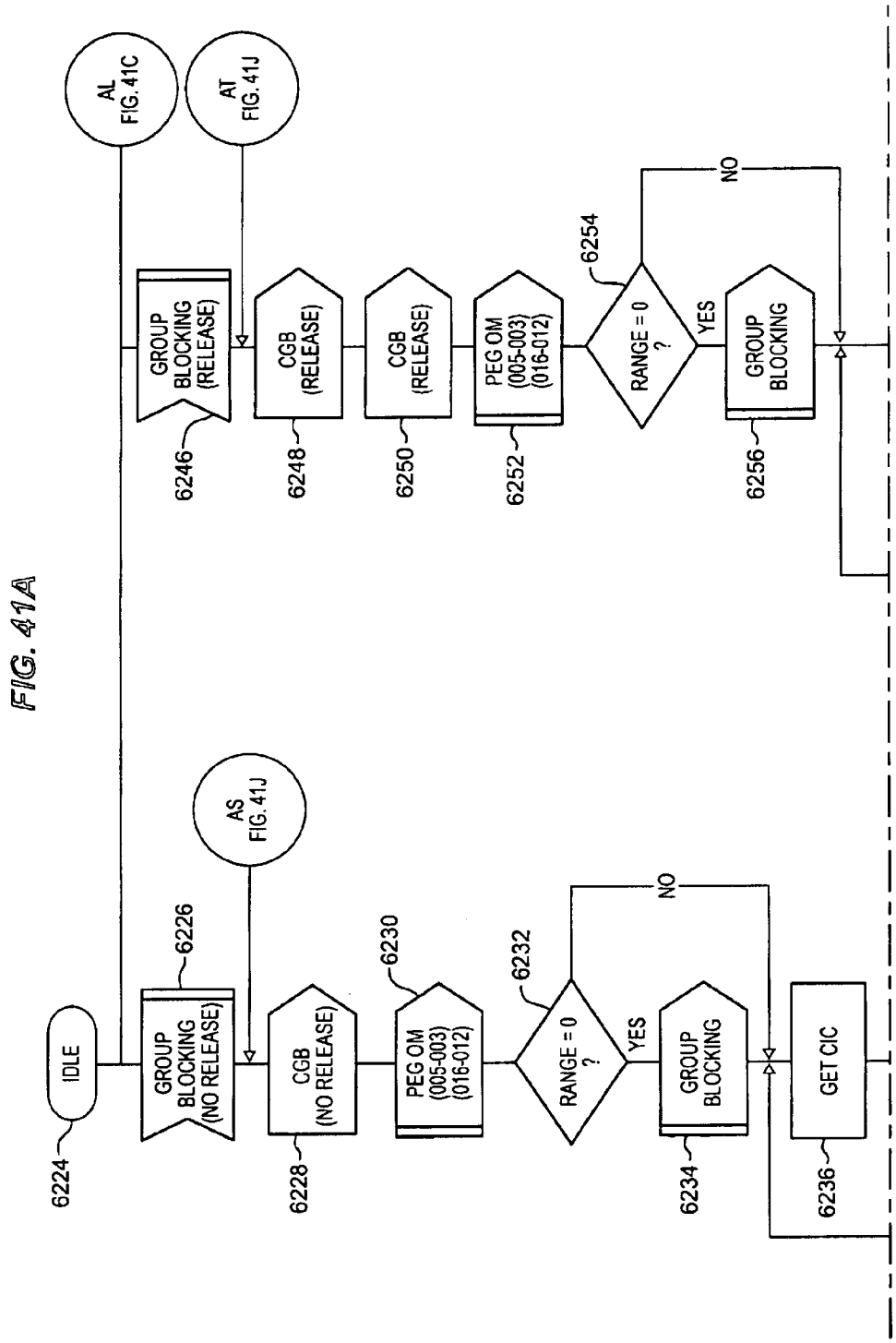
FIGS. 41A–41S are SDL diagrams of logic used in a version of the invention for a circuit group blocking/unblocking sending process.
Figure 41B:
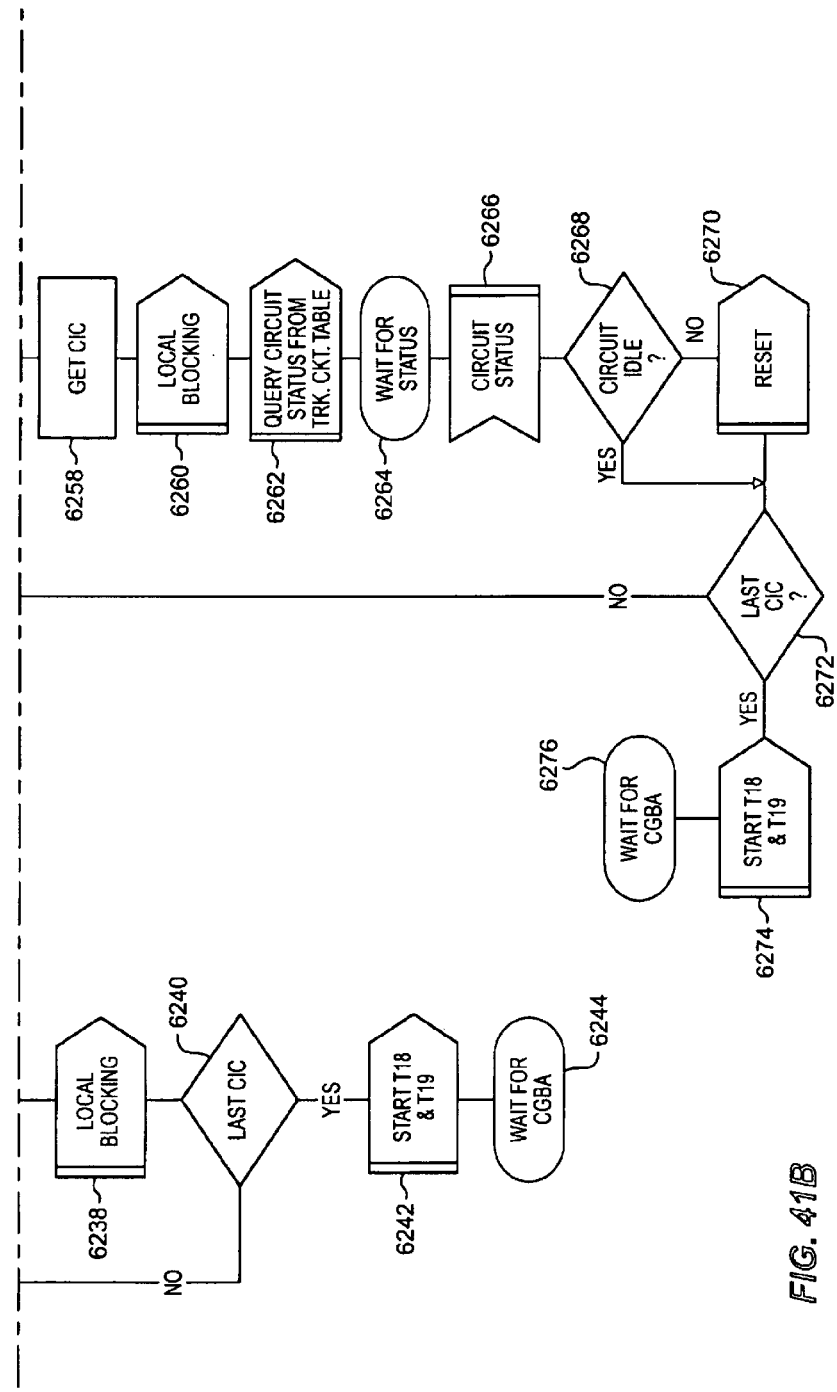
Figure 41C:
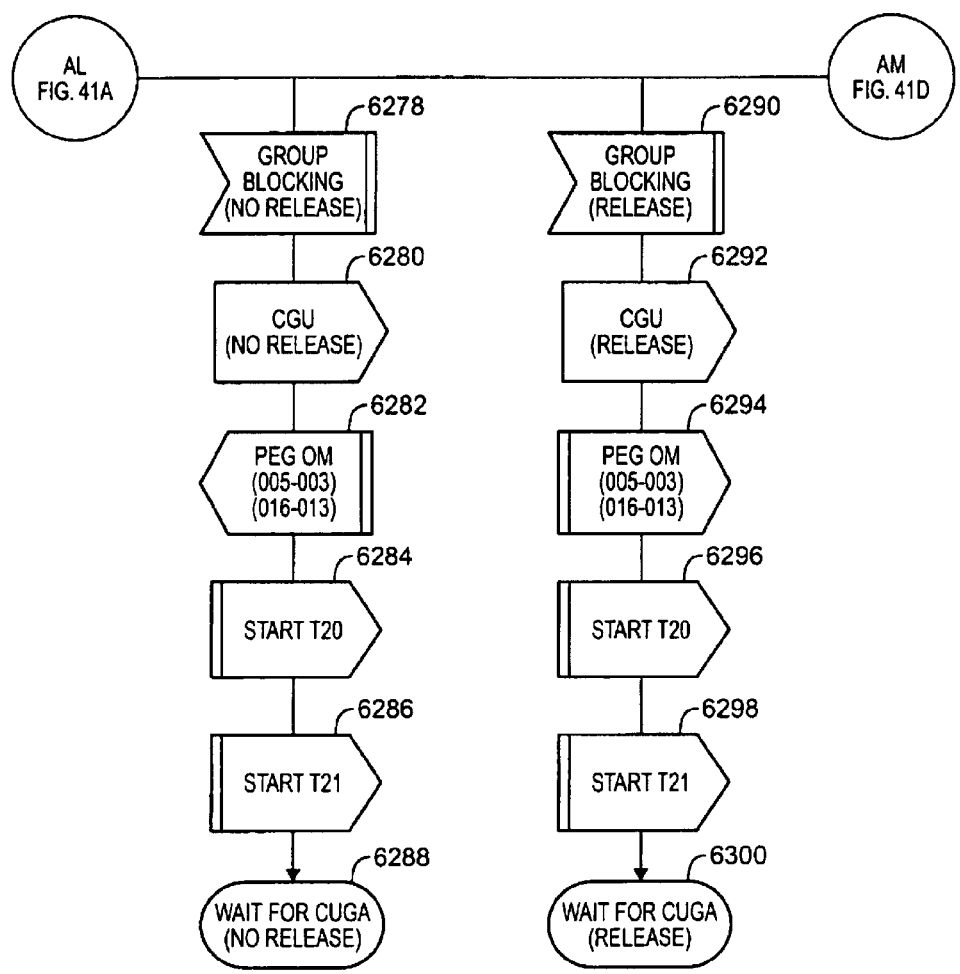
Figure 41E:
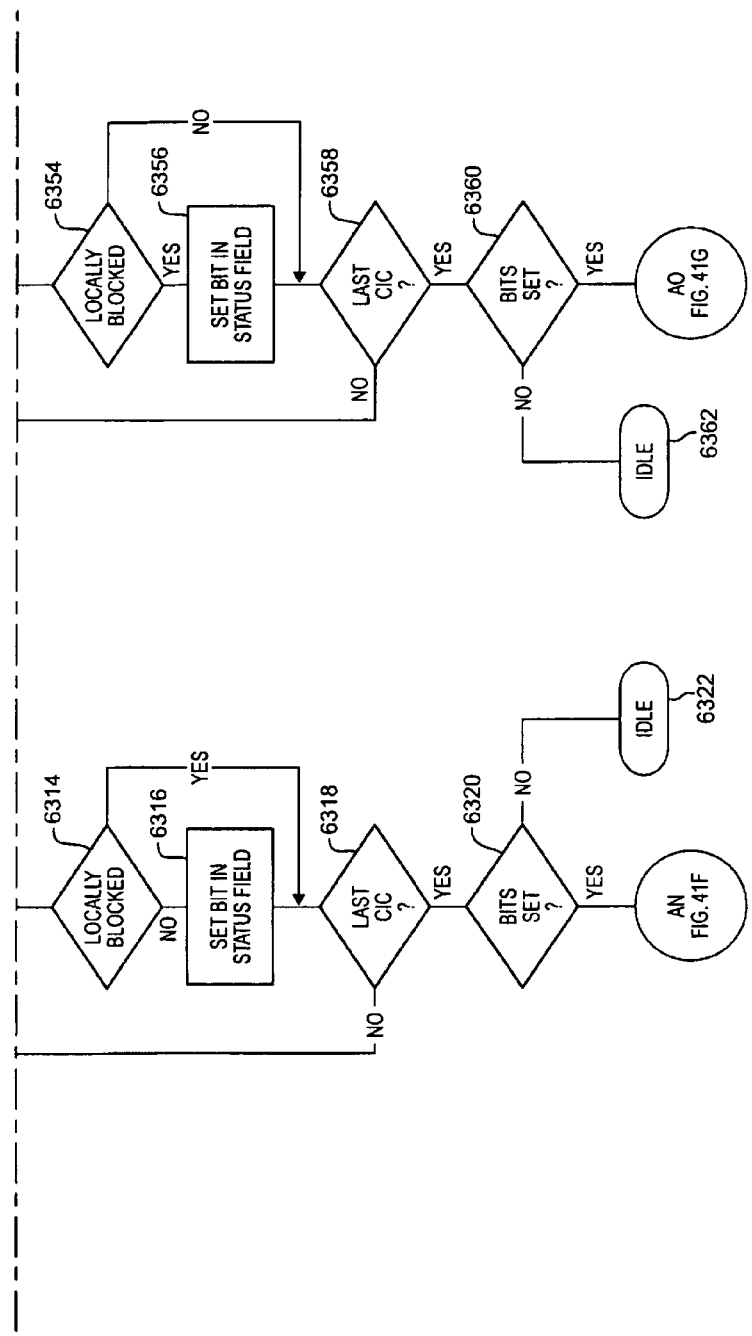
Figure 41H:
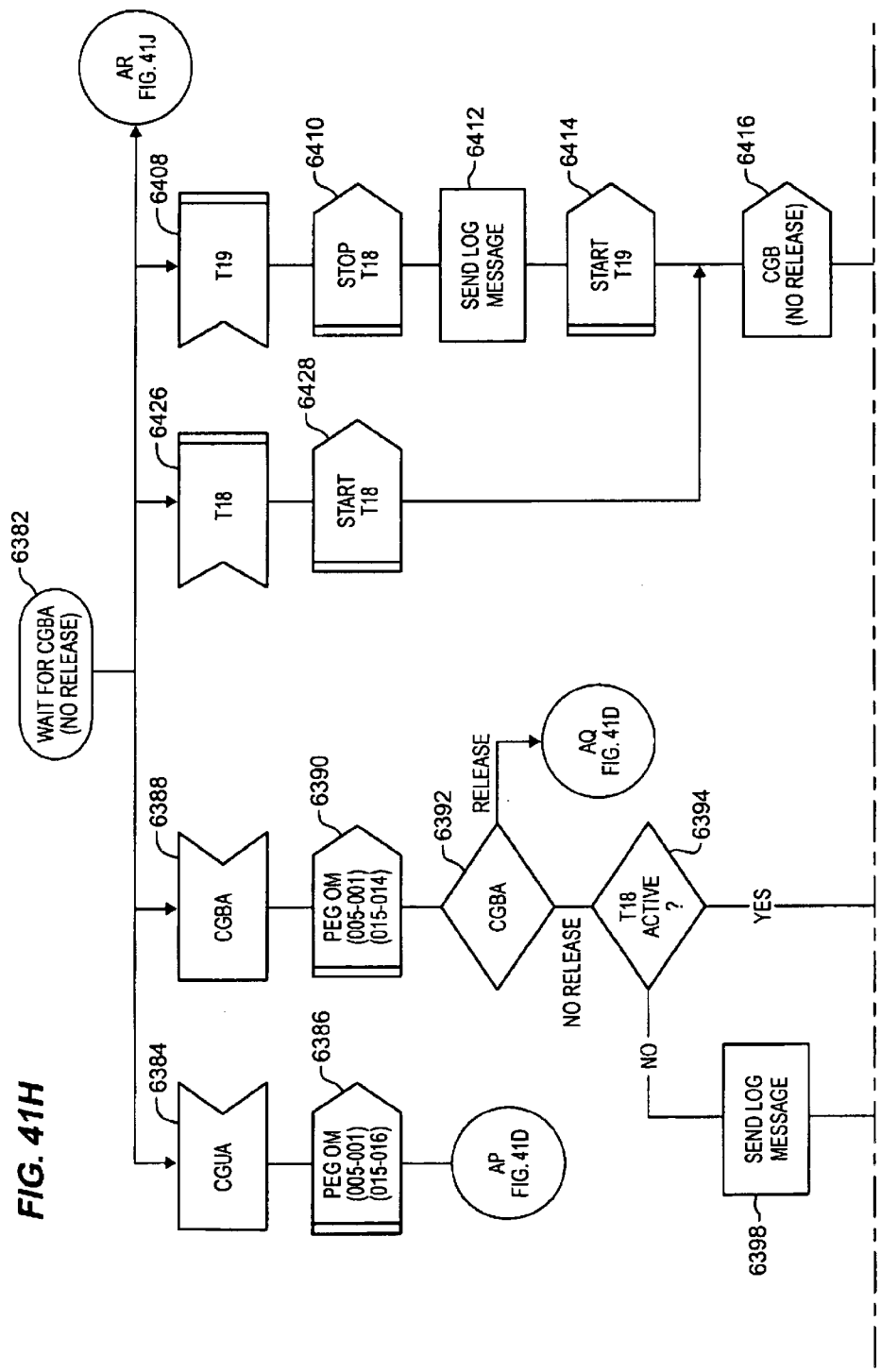
Figure 41I:
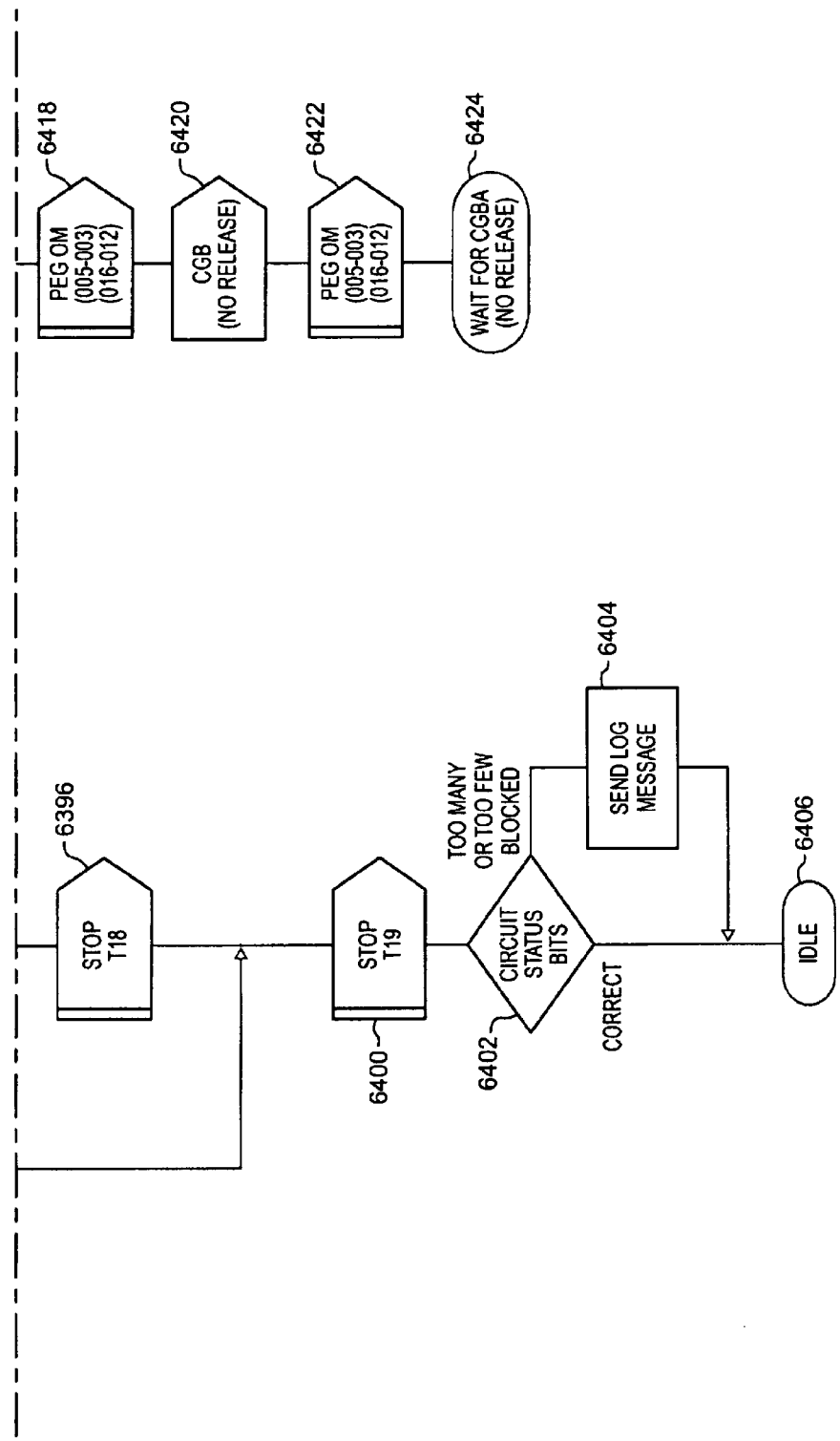
Figure 41J:
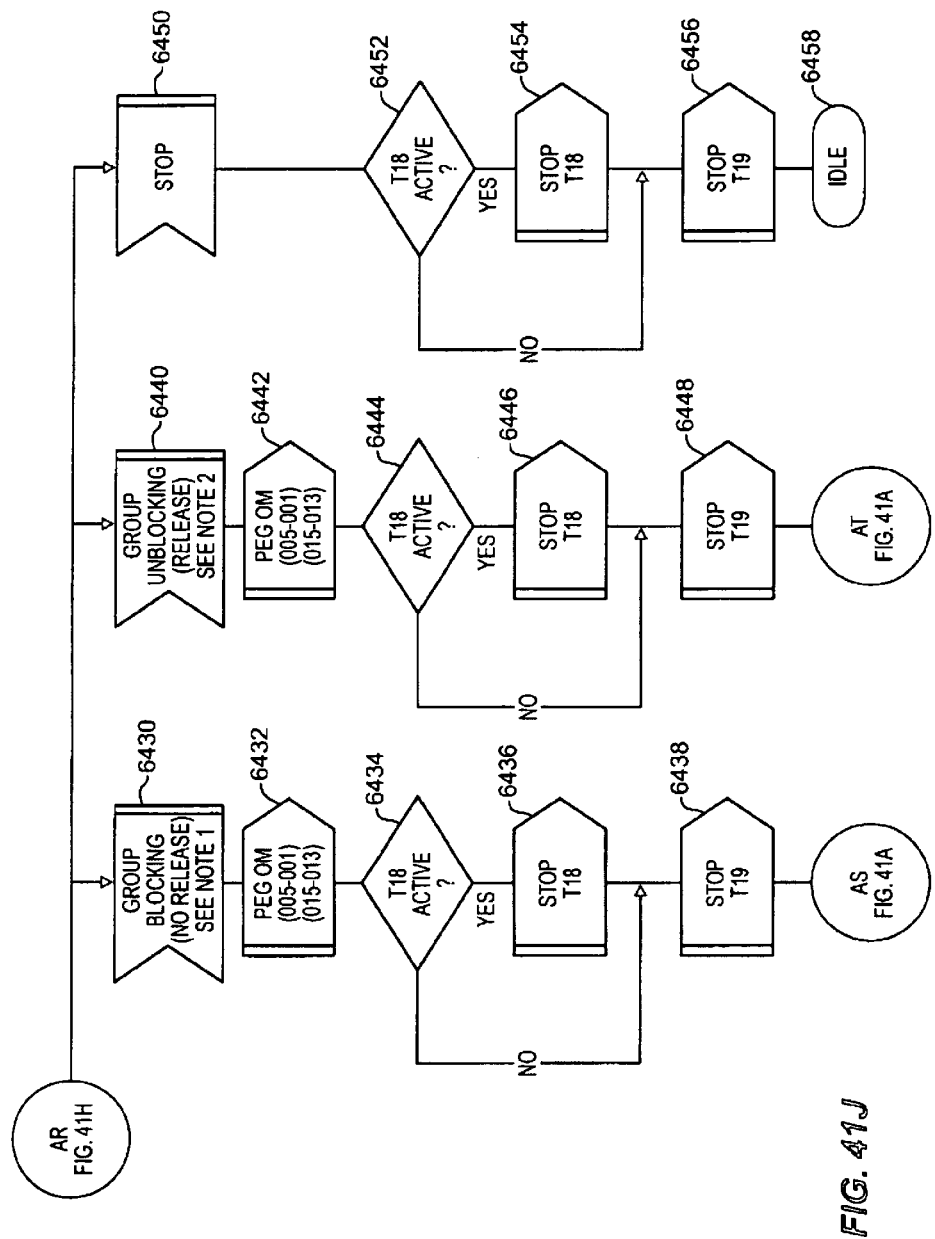
Figure 41K:
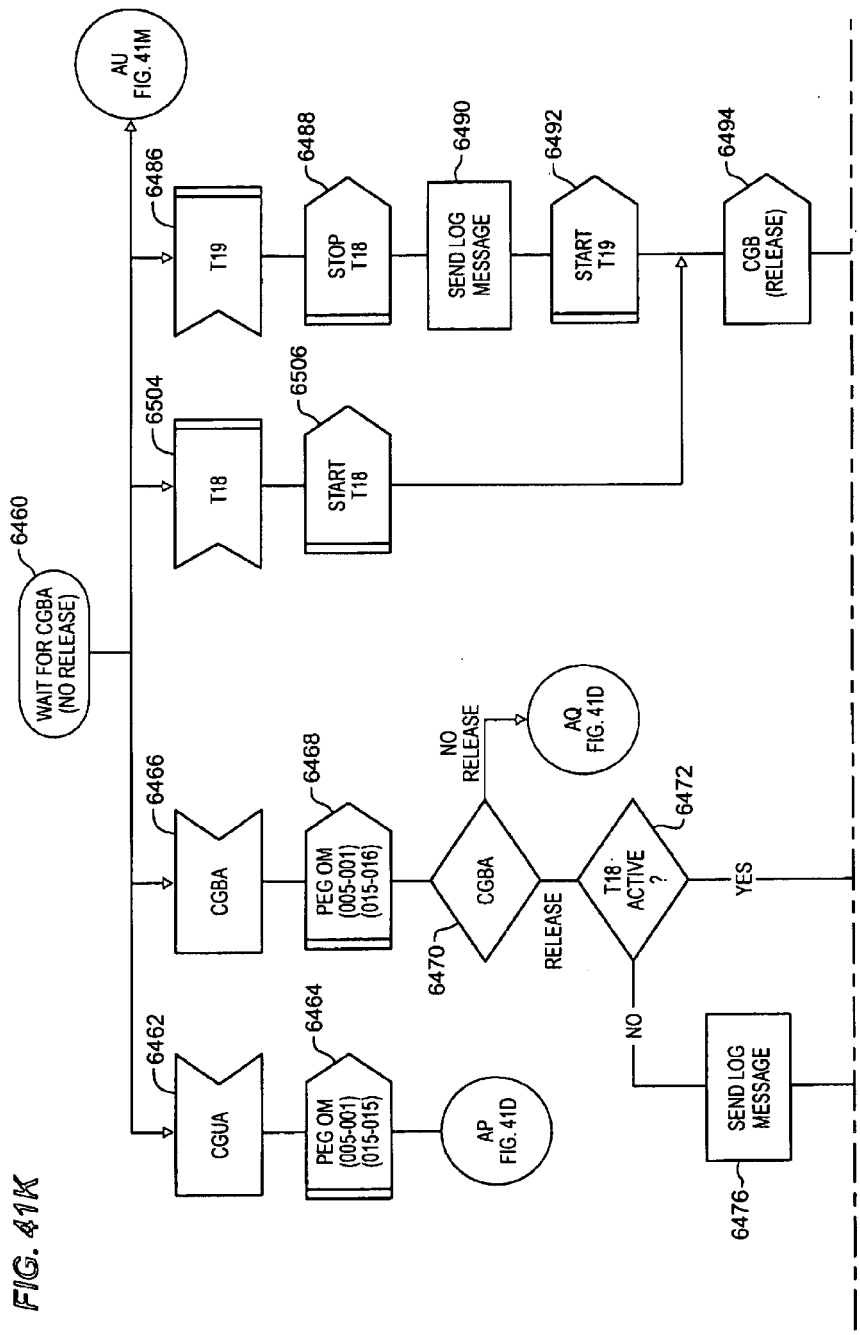
Figure 41L:
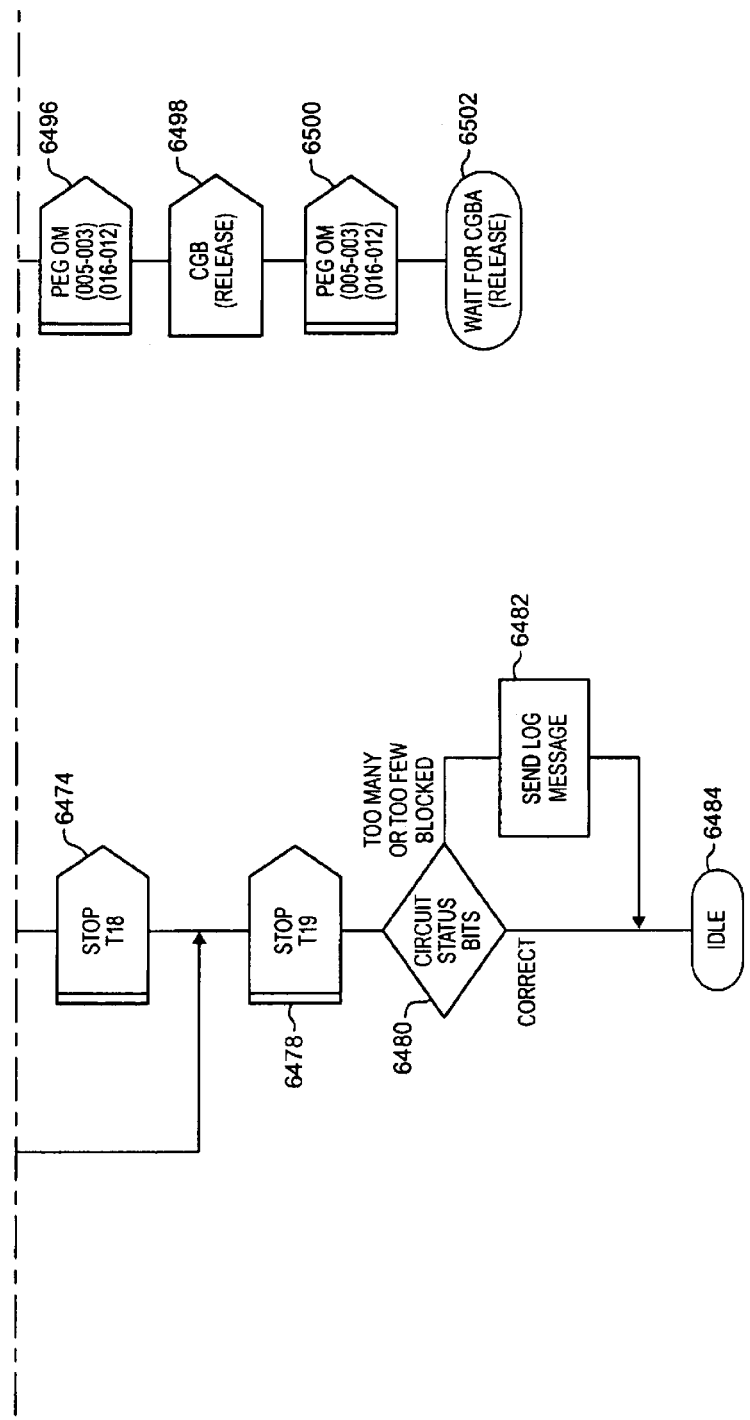
Figure 41M:
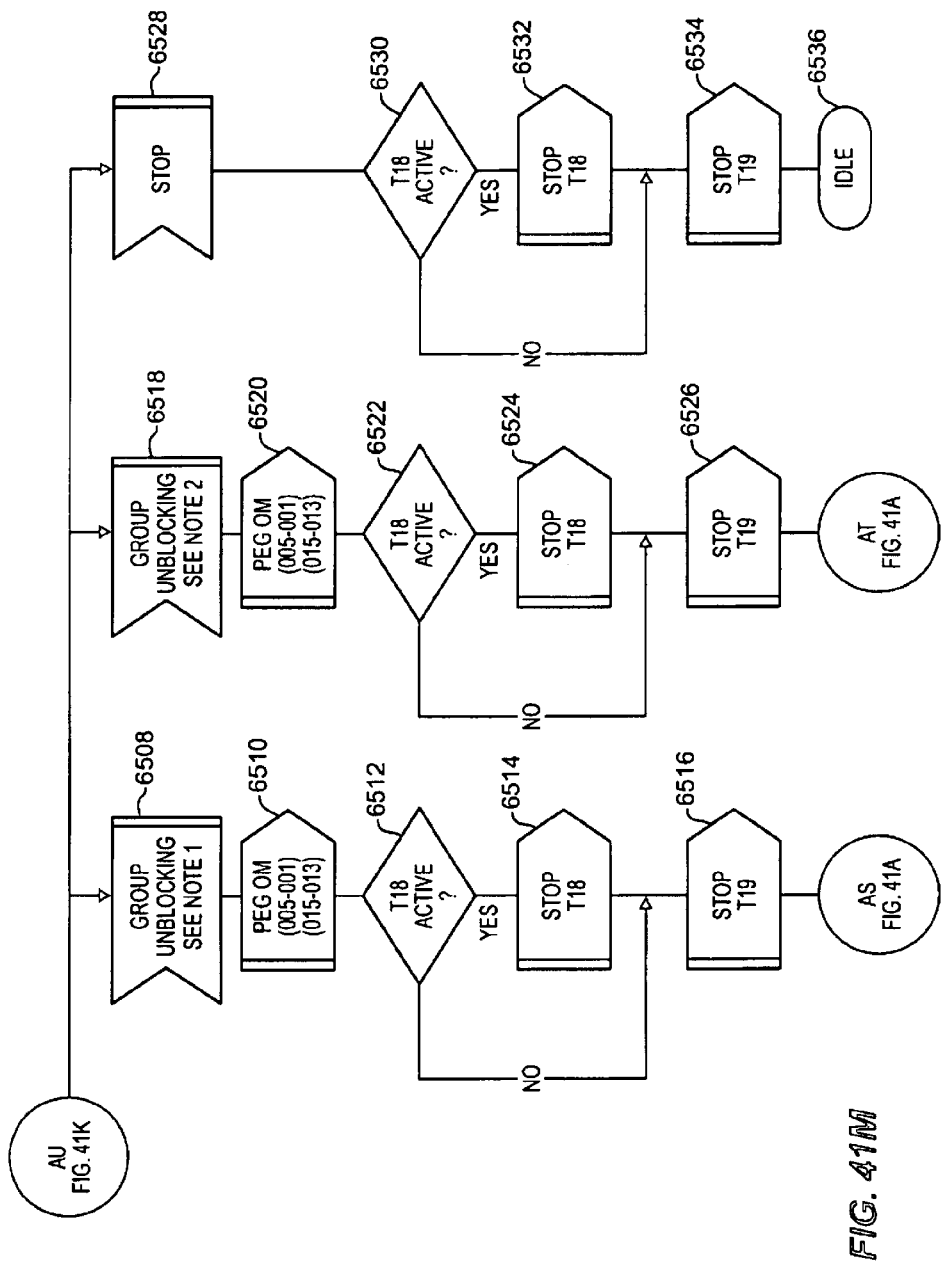
Figure 41N:
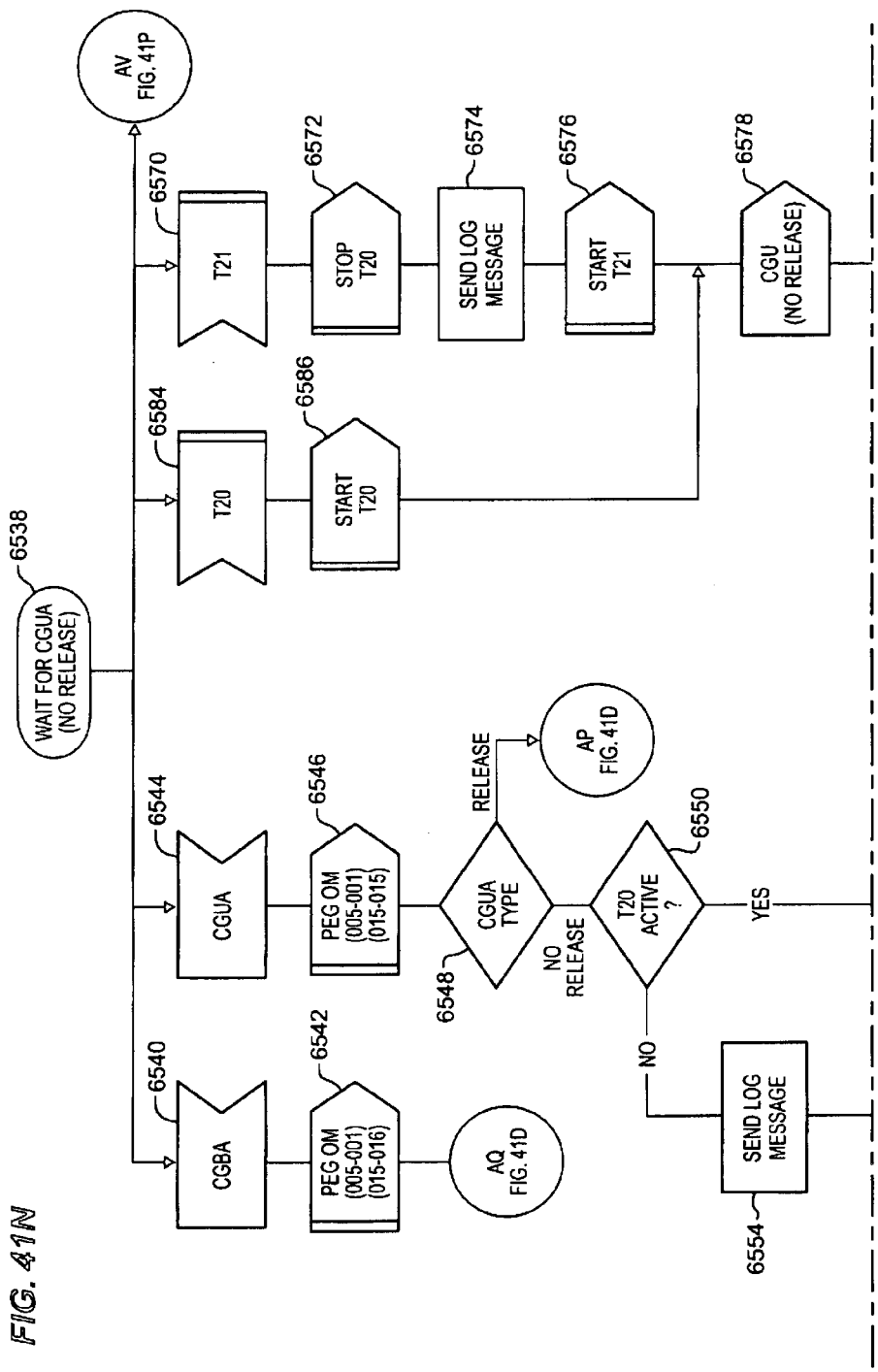
Figure 41:
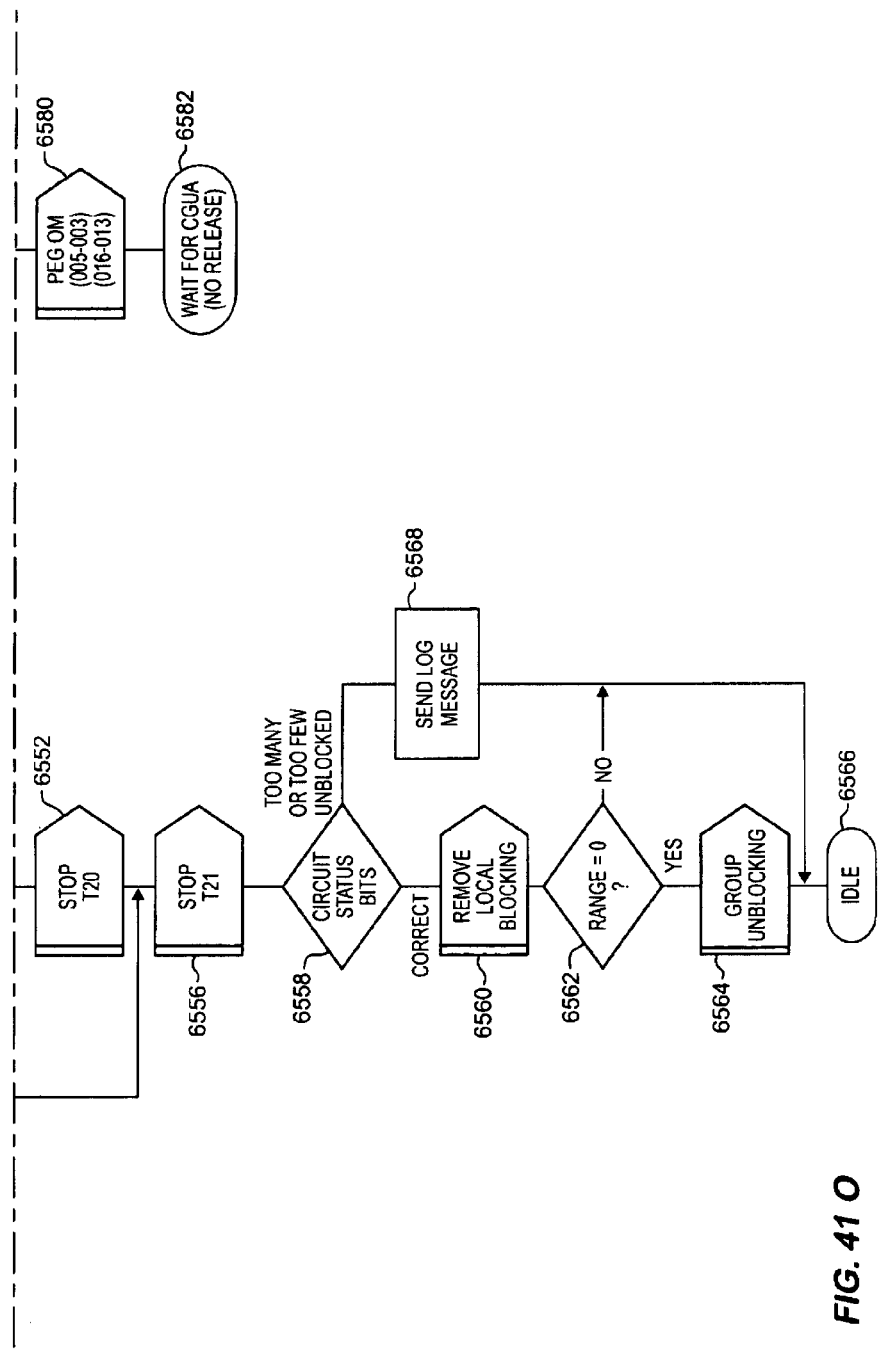
Figure 41P:
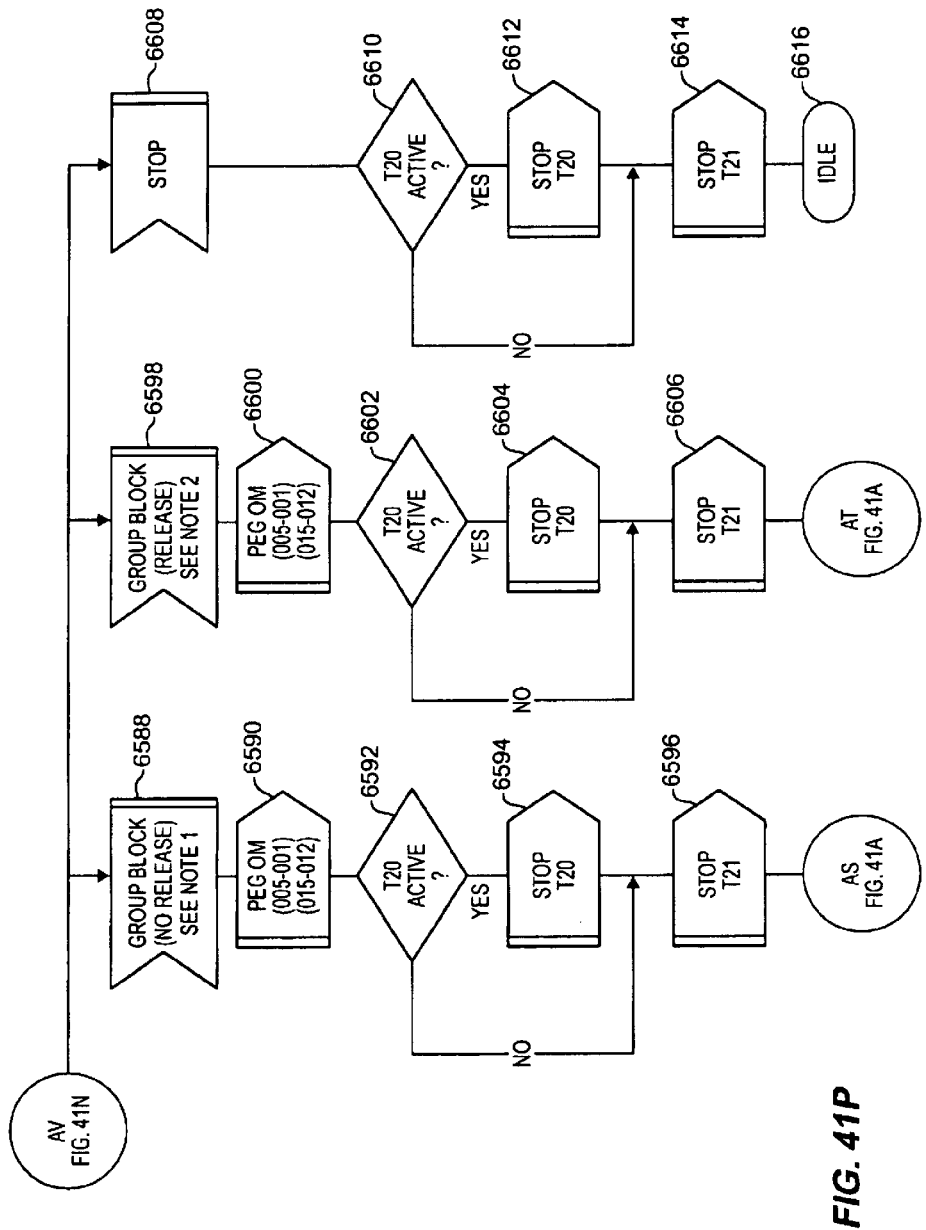
Figure 41Q:
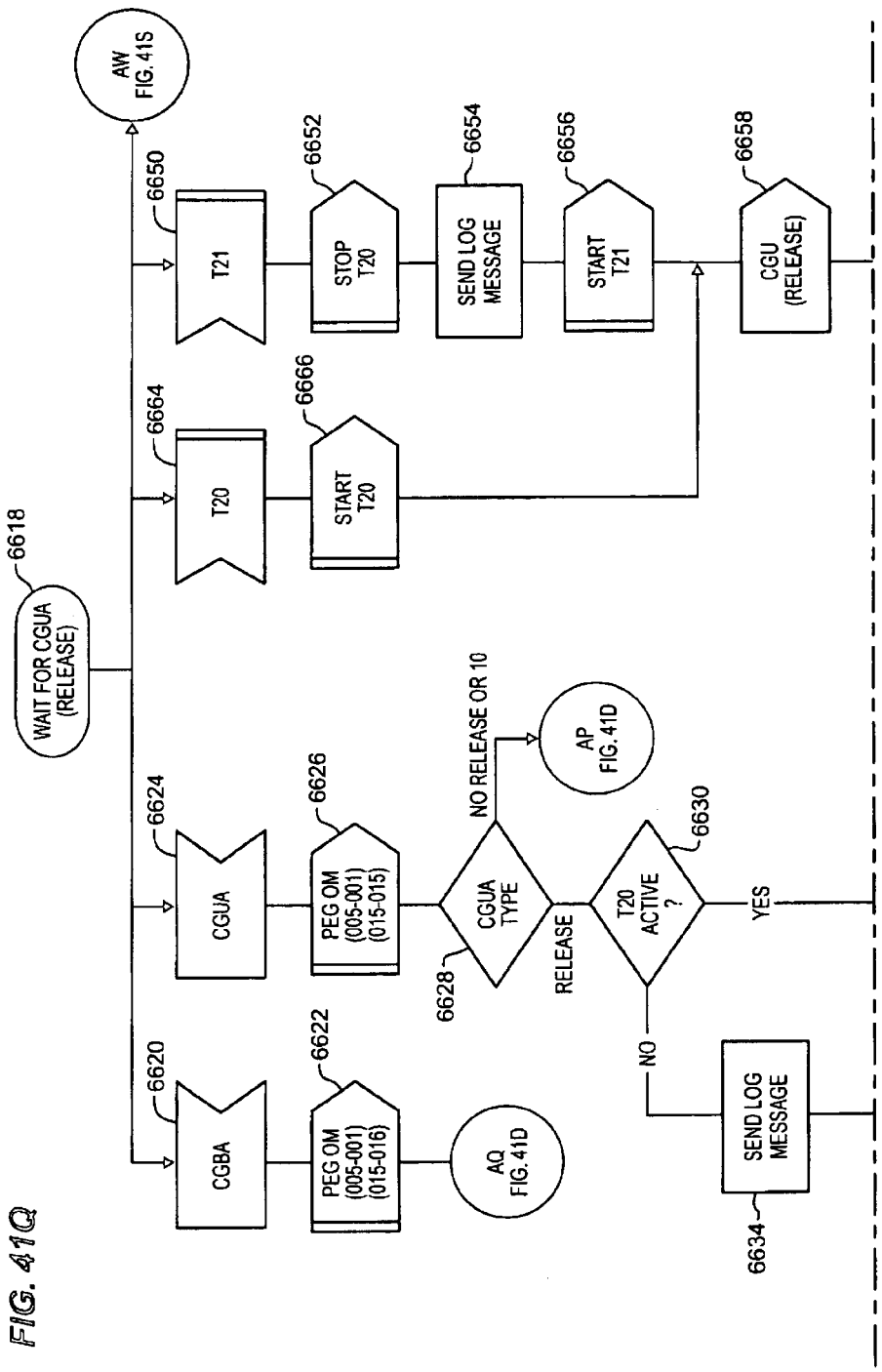
Figure 41R:
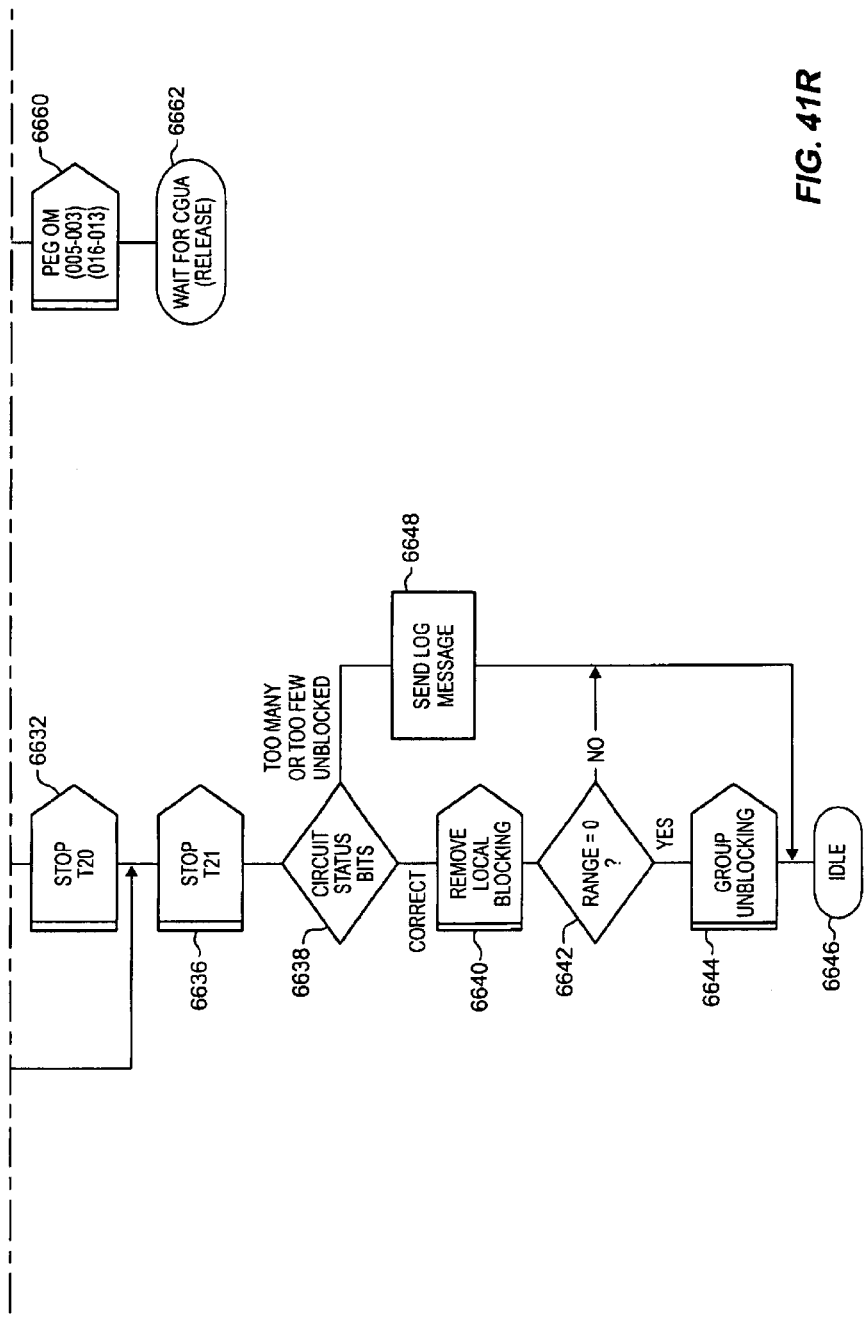
Figure 41S:
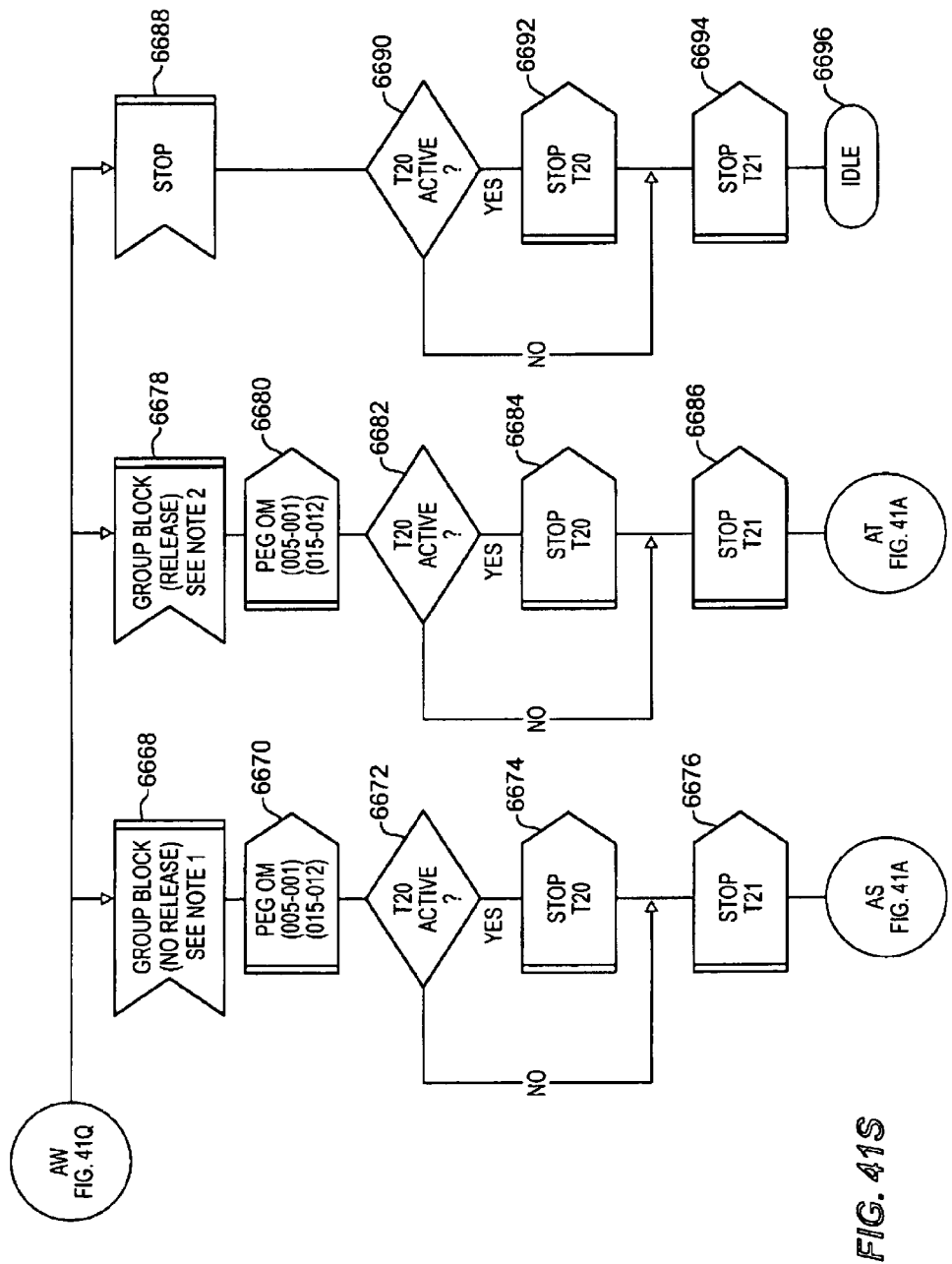

FIGS. 41A–41S illustrate the process for circuit group blocking (CGB) and circuit group unblocking (CGU) sending (GBUS). On FIG. 41A, the process is in idle at 6224. In the GBUS process, one procedure is defined for circuit blocking without release of the circuits. In this procedure, the specified circuits are marked as remotely blocked. However, the circuits are not released until any calls that are in progress have been completed. In addition, the GBUS procedure has a process in which specified circuits and related calls are released immediately when a circuit group blocking message is sent. In this procedure, the specified circuits are marked as remotely blocked, and they are released using appropriate messages. In the procedures, the range of circuits to be blocked or unblocked is defined in the circuit group blocking message (CGB) or the circuit group unblocking message (CGU), respectively.

If a group blocking message with no release is received at 6226 while the process is in idle at 6224, a COB with no release is sent at 6228. The OM for the CGB is pegged at 6230. At 6232, if the range specified in the group unblocking message is equal to zero, then the process for the group blocking without release (GBNR) is initiated for the first circuit in the range at 6234. If the range is not equal to zero at 6232, then the GBNR process at 6234 is skipped.

Next, the CIC for the first circuit in the range is obtained at 6236. Local blocking is initiated for that circuit at 6238. At 6240, if the CIC that was just obtained at step 6236 is not the last CIC within the range, then the next CIC is obtained at 6236, and it is locally blocked at 6238. This process continues until the last CIC is obtained at 6240. If the last CIC is obtained at 6240, then the T18 and T19 timers are started at 6240. Then, the procedure waits for a circuit group blocking acknowledgment (CGBA) at 6244.

If, while the GBUS process is at idle at 6224, group blocking with release is initiated at 6246, a CGB with release is sent at 6248. An automatic repeat attempt is made for the CGB with release at 6250. The OM for CGB is pegged at 6252.

At 6254, if the range specified in the received group blocking message is equal to zero, then group blocking is initiated at 6256 for the first circuit in the range. If the range is not equal to zero at 6254, then the group blocking step at 6256 is skipped.

Next, the CIC for the circuits within the range is obtained at 6258. Local blocking is initiated for the circuit having that CIC at 6260. The circuit status for that CIC is requested with a query to the trunk circuit table at 6262. The process waits for the status at 6264 until the circuit status is received from the trunk circuit table at 6266.

If the circuit is not in idle at 6268, then the circuit is reset at 6270. If the circuit is in idle at 6268, then the reset step at 6270 is skipped.

At 6272, if the CIC that was obtained at step 6258 is not the last CIC within the range specified in the group unblocking message that was received at 6246, then the process continues back to step 6258, and the next CIC is obtained. However, if the CIC that was obtained at step 6258 is the last CIC within the range, then the T18 and T19 timers are started at 6274. The process then waits for a CGBA at 6276.

On FIG. 41C, a group unblocking with no release is initiated at 6278 while the procedure is in idle at 6224 (FIG. 41A). A CGU with no release is sent at 6280. The OM for the CGU is pegged at 6282. The T20 timer is started at 6284, and the T21 timer is started at 6286. The system then waits for a CGUA with no release at 6288.

In addition, a group unblocking with release can be initiated at 6290 from the idle state at 6224 (FIG. 41A). A CGU with release is sent at 6292. The OM for the CGU is pegged at 6294. The T20 timer is started at 6296, and the T21 timer is started at 6298. The process then waits for a CGUA with release at 6300.

On FIG. 41D, if a CGBA is received at 6302 while the process is in the idle state at 6224 (FIG. 41A), and the CGBA is not expected as an acknowledgment for any circuit group blocking message, the OM for the CGBA is pegged at 6304. The first CIC in the range specified in the CGBA is obtained at 6306. The trunk circuit table is queried at 6308 to obtain the circuit status, and the process waits for the status to be returned from the trunk circuit table at 6310. The circuit status is received at 6312.

At 6314, if the status of the circuit is not locally blocked, then a bit In the status field is set at 6316 so that a circuit group unblocking message shall be sent for the circuit. However, if the circuit is locally blocked at 6814, the step at 6316 for setting the bit in the status field is skipped, and the received CGBA is discarded.

Next, at 6318, if it is determined that if the CIC that was obtained at step 6306 is not the last CIC within the range specified in the CGBA that was received at step 6302, then the process returns to step 6306, and the next CIC in the range is obtained. If however, the CIC was the last CIC in the range at 6318, then it is determined if the bits are set for the CGBA type at 6320. If the bits are not set for the CGBA type at 6320, the process returns to idle at 6322. If the bits for the CGBA type are set at 6320, then the bit type is determined at 6324 (FIG. 41F).

The bits for the CGBA type present the circuit blocking type indicator. If the bits are 00, having the value of zero, then the type indicator is without release. If the bits are 01, having the value of one, then the type indicator is for immediate release. If the bits are 10, having the value of two, then the type indicator is also without release. It will be appreciated, however, that the 10 value is reserved for national use, and bilateral agreements may determine whether a type indicator of 10 may be with or without release. If the type indicator for the CGBA at 6324 is a 01 for release, a CGB with release is set at 6326. The OM for the CGBA is pegged at 6328. The I20 and I21 timers are started at 6330, and the process waits for a CGUA with release at 6332.

If the CGBA type indicator at 6324 is a 00, so that the block is without release, or if the type indicator is a 10, then the CGB is sent at 6334. The CGB will specify either no release if the type indicator from step 6324 was a 00, or it will specify a 10 in the type field if the type indicator from step 6324 was a 10. The OM for the CGBA is pegged at 6336. The T20 and T21 timers are started at 6338, and the process returns to a wait state for a CGUA with no release at 6340.

On FIG. 41E, if a CGUA is received at 6342 while the process is in the idle state (step 6224 on FIG. 41A), and the CGUA is not expected as an acknowledgment for any circuit group unblocking message, the OM for the CGUA is pegged at 6344. The first CIC within the range specified in the CGUA is obtained at 6346. The trunk circuit table is queried to determine the circuit status at 6348, and the process waits for the status to be returned at 6350. The circuit status is received at 6352.

If the circuit is locally blocked at 6354, a bit in the status field is set at 6356 so that a circuit group blocking message will be sent for that circuit. If the circuit is not locally blocked at 6354, then the step at 6356 is skipped.

At 6358, it is determined if the CIC that was obtained at step 6346 is the last CIC within the range. If the CIC is not the last CIC within the range at 6358, then the process returns to step 6346 and the next CIC within the range is obtained. However, if the CIC is the last CIC within the range at 6358, then it is determined if the CGUA bits for the indicator type are set at 6360. If the bits are not set at 6360, idle is attained at 6362. If the bits are set at 6360, the bit types are determined at 6364 (FIG. 41G).

If the CGU type at 6364 is a 01 so that the CGUA is with release, then a CGU with release is sent at 6366. The OM for the CGU is pegged at 6368. The T18 and T19 timers are started at 6370, and the process waits for a CGBA with release at 6372.

If the CGUA type indicator at 6364 is a 00 so that it is without release, or if the type indicator is a 10, then a CGU is sent at 6374. If the type indicator from the CGUA at 6364 was a 00, then the CGU type also will be with no release. If the CGUA type indicator at 6364 was a 10, then the CGU type indicator also will be a 10 at 6374. The OM for the CGU is pegged at 6376. The T18 and T19 timers are started at 6378, and the process waits for a CGBA with no release at 6380.

On FIG. 41H, the process is waiting for a CGBA with no release at 6382. A CGUA is received at 6384. The OM for the CGUA is pegged at 6386. The process then returns to step 6346 (FIG. 41P).

If a CGBA is received at 6388 while waiting for the CGBA for no release at 6382, the OM for the CGBA is pegged at 6390. At 6'392, if the indicator type for the CGBA is a release, then the process returns to step 6306 (FIG. 41D). If the indicator type for the CGBA at 6392 is a no release, then it is determined if the T18 timer is active at 6394.

If the T18 timer is active at 6394, the timer is stopped at 6396. If the T18 timer is not active at 6394, maintenance personnel are alerted by sending a log message to maintenance at 6398.

Next, the T19 timer is stopped at 6400. The circuit status bits are checked at 6402. If there are too many circuits blocked at 6402, or if there are too few circuits blocked at 6402, then maintenance personnel are alerted by sending a log message to maintenance at 6404. Idle then is attained at 6406. If, however, the correct number of circuits are blocked at 6402, idle is attained at 6406 without sending a log message to maintenance.

If the T19 timer times out at 6408 while waiting for a CGBA with no release at 6382, the T18 timer is stopped at 6410. Maintenance personnel are alerted by sending a log message to maintenance at 6412. The T19 timer is restarted at 6414. A CGB with no release is sent at 6416. The OM for the CGB is pegged at 6418. The CGB with no release is automatically retransmitted at 6420, and the OM is again pegged at 6422. The process then waits for a CGBA with no release at 6424.

If, while waiting for the CGBA with no release at 6382, the T18 timer times out at 6426, the T18 timer is restarted at 6428. A CGB with no release is sent at 6416, and the OM is pegged at 6418. The CGB with no release is automatically retransmitted at 6420, and the OM is again pegged at 6422. The process then waits for the CGBA with no release at 6424.

On FIG. 41J, group unblocking with no release is initiated at 6430 while waiting for the CGBA with no release at 6382 (FIG. 41H). The OM for group unblocking is pegged at 6432. If the T18 timer is active at 6434, the T18 timer is Stopped at 6436. If the T18 timer is not active at 6434, the stop T18 timer step at 6436 is skipped. Next, the T19 timer is stopped at 6438. The process then continues with step 6228 by sending a CGB with no release (FIG. 41A).

If group unblocking with release is initiated at 6440 while waiting for a CGBA with no release at 6382 (FIG. 41H), the OM for group unblocking is pegged at 6442. If the T18 timer is active at 6444, the T18 timer is stopped at 6446. If the T18 timer is not active at 6444, the stop T18 timer step at 6446 is skipped. Next, the T19 timer is stopped at 6448. The process continues with step 6248 (FIG. 41A) by sending a CGB with release.

If a stop is initiated at 6450 while waiting for a CGBA with no release at 6382 (FIG. 41H), it is determined at step 6452 if the T18 timer is active. If the T18 timer is active at 6452, the T18 timer is stopped at 6454. If the T18 timer is not active at 6452, then the stop T18 timer step at 6454 is skipped. Next, the T19 timer is stopped at 6456. Idle is attained at 6458.

On FIG. 41K, the process is waiting for a CGBA with release at 6460. If a CGUA is received at 6462, the OM for the CGUA is pegged at 6464. The process then continues at step 6346 (FIG. 41D).

If a CGBA is received at 6466, the OM for the CGBA is pegged at 6468. At 6470, if the CGBA is without release, then the process continues at step 6306 (FIG. 41D). However, if the CGBA indicator type is with release at 6470, it is determined at 6472 if the T18 timer is active.

If the T18 timer is active at 6472, the T18 timer is stopped at 6474. If the T18 timer is not active at 6472, then maintenance personnel are alerted by sending a log message to maintenance at 6476. The stop T18 timer step at 6474 then is skipped.

Next, the T19 timer is stopped at 6478. The circuit status is checked at 6480. If too many circuits are blocked, or if too few circuits are blocked, then maintenance personnel are alerted by sending a log message to maintenance at 6482. Idle is then attained at 6484. However, if the correct number of circuits are blocked at 6480, idle is attained at 6484.

If, while waiting for the CGBA with release at 6460, the T19 timer times out at 6486, the T18 timer is stopped at 6488. Maintenance personnel are alerted by sending a log message to maintenance at 6490. The T19 timer is restarted at 6492.

A CGB with release is sent at 6494. The OM for the CGB is pegged at 6496. The CGB with release is automatically retransmitted at 6498, and the OM is again pegged at 6500. The process then waits for a CGBA with release at 6502.

If, while waiting for the CGBA with release at 6460, the T18 timer times out at 6504, then the T18 timer is restarted at 6506. A CGB with release is sent at 6494, and the OM is pegged at 6496. The CGB with release is automatically retransmitted at 6498, and the OM is again pegged at 6500. The process then waits for a CGBA with release at 6502.

On FIG. 41M, group unblocking with no release is initiated at 6508 while waiting for the CGBA with release at 6460 (FIG. 41K). Then, the OM for group unblocking is pegged at 6510. If the T18 timer is active at 6512, the T18 timer is stopped at 6514. If the T18 timer is not active at 6512, the stop T18 timer step at 6514 is skipped. Next, the T19 timer is stopped at 6516. The process continues at step 6228 (FIG. 41A) at which point a CGB with no release is sent.

If a group unblocking with release is initiated at 6518 while waiting for a CGBA with release at 6460 (FIG. 41K), the OM for group unblocking with release is pegged at 6520. If the T18 timer is active at 6522, the T18 timer is stopped at 6524. If the T18 timer is not active at 6522, then the stop T18 timer step at 6524 is skipped. Next, the T19 timer is stopped at 6526. The process continues at step 6248 (FIG. 41A) by transmitting a CGB with release.

If a stop is initiated at 6528 while waiting for a CGBA with release at 6460 (FIG. 41K), it is determined if the T18 timer is active at 6530. If the T18 timer is active at 6530, the T18 timer is stopped at 6532. If the T18 timer is not active at 6530, the stop T18 timer step at 6532 is skipped. Next, the T19 timer is stopped at 6534. Idle is attained at 6536.

On FIG. 41N, the process is waiting for a CGUA with no release at 6538. If a CGBA is received at 6540, the OM for the CGBA is pegged at 6542. The process then continues at step 6306 (FIG. 41D).

If a CGUA is received at 6544, the OM for the CGUA is pegged at 6546. If the CGUA indicator type is with release at 6548, the process continues at step 6346 (FIG. 41D). If the CGUA indicator type at 6548 is with no release, it is determined if the T20 timer is active at 6550.

If the T20 timer is active at 6550, then the T20 timer is stopped at 6552. If the T20 timer is not active at 6550, then maintenance personnel are alerted by sending a log message to maintenance at 6554, and the stop T20 timer step at 6552 is skipped.

Next, the T21 timer is stopped at 6556. At step 6558, the circuit status is checked to determine the number of circuits that are to be unblocked. If the circuit status indicates that the correct number of circuits are to be unblocked at 6558, local blocking is removed at 6560. This is done for each circuit in the range specified in the CGUA that was received at 6544. If the range of circuits to be unblocked equals zero at 6562, group unblocking is initiated at 6564 for the first circuit in the range. The trunk circuit table is updated for the group unblocking. Idle then is attained at 6566.

If, however, at 6558 too many circuits are to be unblocked or too few circuits are to be unblocked, then maintenance personnel are alerted at 6568 by sending a log message to maintenance. Then, idle is attained at 6566. In addition, if the range does not equal zero at 6562, then idle is attained at 6566.

If, while waiting for the CGUA with no release at 6538, the T21 timer times out at 6570,"the T20 timer is stopped at 6572. Maintenance personnel are alerted by sending a log message to maintenance at 6574. The T21 timer is restarted at 6576. A CGU with no release is sent at 6578, and the OM for the CGU with no release is pegged at 6580. The process then waits for a CGUA with no release at 6582.

If, while waiting for the CGUA with no release at 6538, the T20 timer times out at 6584, the T20 timer is restarted at 6586. A CGU with no release is sent at 6578, and the OM for the CGU is pegged at 6580. The process then waits for a CGU with no release at 6582.

On FIG. 41K, group blocking with no release is initiated at 6588 while waiting for a CGUA with no release at 6538 (FIG. 41N). The OM for the group block with no release is pegged at 6590. If the T20 timer is active at 6592, the T20 timer is stopped at 6594. If the T20 timer is not active at 6592, then the stop T20 timer step at 6594 is skipped. Next, the T21 timer is stopped at 6596. The process continues at step 6228 by sending a CGB with no release (FIG. 41A).

If group blocking with release is initiated at 6598 while waiting for a CGUA at 6538 (FIG. 41N), the OM for the group blocking with release is pegged at 6600. If the T20 timer is active at 6602, the T20 timer is stopped at 6604. If the T20 timer is not active at 6602, then the stop T20 timer step at 6604 is skipped. Next, the T20 timer is stopped at 6606. The process continues at step 6248 by sending a CGB with release (FIG. 41A).

If a stop is initiated at 6608 while waiting for a CGUA with no release at 6538 (FIG. 41N), it is determined if the T20 timer is active at 6610. If the T20 timer is active at 6610, then the T20 timer is stopped at 6612. If the T20 timer is not active at 6610, then the stop no timer step at 6612 is skipped. Next, the T21 timer is stopped at 6614. Idle is attained at 6616.

On FIG. 41Q, the system is waiting for a CGUA with release at 6618. If a CGBA is received at 6620, the OM for the CGBA reception is pegged at 6622. The process continues at step 6306 (FIG. 41D).

If a CGUA is received at 6624, the OM for the CGUA is pegged at 6626. At 6628, if the CGUA indicator type is for a no release or the bits are a 10, having a value of two, then the process continues at step 6346 (FIG. 41D). If the CGUA indicator type at 6628 is for a release, then it is determined if the T20 timer is active at 6630.

If the T20 timer is active at 6630, the T20 timer is stopped at 6632. If the T20 timer is not active at 6630, then maintenance personnel are alerted by sending a log message to maintenance at 6634, and the stop T20 timer step at 6632 is skipped. Next, the T21 timer is stopped at 6636.

The circuit status bits are checked at 6638 to determine the number of circuits that are designated to be unblocked. If the correct number of circuits are to be unblocked at 6638, then local blocking is removed at 6640 for each circuit in the range designated in the CGUA that was received at 6624. The trunk circuit table is updated for the state and status of the circuit. If the range of circuits to be blocked equals zero at 6642, then group unblocking is initiated at 6644 for the first circuit in the range. The trunk circuit table is updated with the circuit group blocking. Idle is attained at 6646.

If, at 6638, too many circuits or too few circuits are to be unblocked, then maintenance personnel are notified by sending a log message to maintenance at 6648. Idle then is attained at 6646. In addition, if the range at 6642 is not equal to zero, then idle is attained at 6646.

If, while waiting for the CGUA with release at 6618, the T21 timer times out at 6650, the T20 timer is stopped at 6652. A log message alerting maintenance is sent at 6654. The T21 timer is restarted at 6656. A CGU with release is transmitted at 6658, and the OM is pegged at 6660. The process then waits for a CGUA with release at 6662.

If, while waiting for the CGUA with release at 6618, the T20 timer times out at 6664, the T20 timer is restarted at 6666. A CGU with release is sent at 6658, and the OM is pegged at 6660. The process then waits for a CGUA with release at 6662.

On FIG. 41S, a group blocking with no release is initiated at 6668 while waiting for a CGUA with release at 6618 (FIG. 41R). The OM is pegged at 6670. If the T20 timer is active at 6672, then the T20 timer is stopped at 6674. If the T20 timer is not active at 6672, then the stop T20 timer step at 6674 is skipped. Next, the T21 timer is stopped at 6676. The process continues at step 6228 by sending a CGB with no release (FIG. 41A).

At 6678, group blocking with release is initiated while waiting for a CGUA at 6618 (FIG. 41Q). The OM for group blocking with release is pegged at 6680. If the T20 timer is active at 6682, then the T20 timer is stopped at 6684. If the T20 timer is not active at 6682, then the stop T20 timer step at 6684 is skipped. Next, the T21 timer is stopped at 6686. The process then continues at step 6248 by sending a CGB with release (FIG. 41A).

A stop is initiated at 6688 while waiting for a CGUA with release at 6618 (FIG. 41Q). If the T20 timer is active at 6690, then the T20 timer is stopped at 6692. If the T20 timer is not active at 6690, then the stop T20 timer step at 6692 is skipped. Next, the T21 timer is stopped at 6694. Idle is attained at 6696.

Circuit Validation Test Sending Process

Figure 42B:
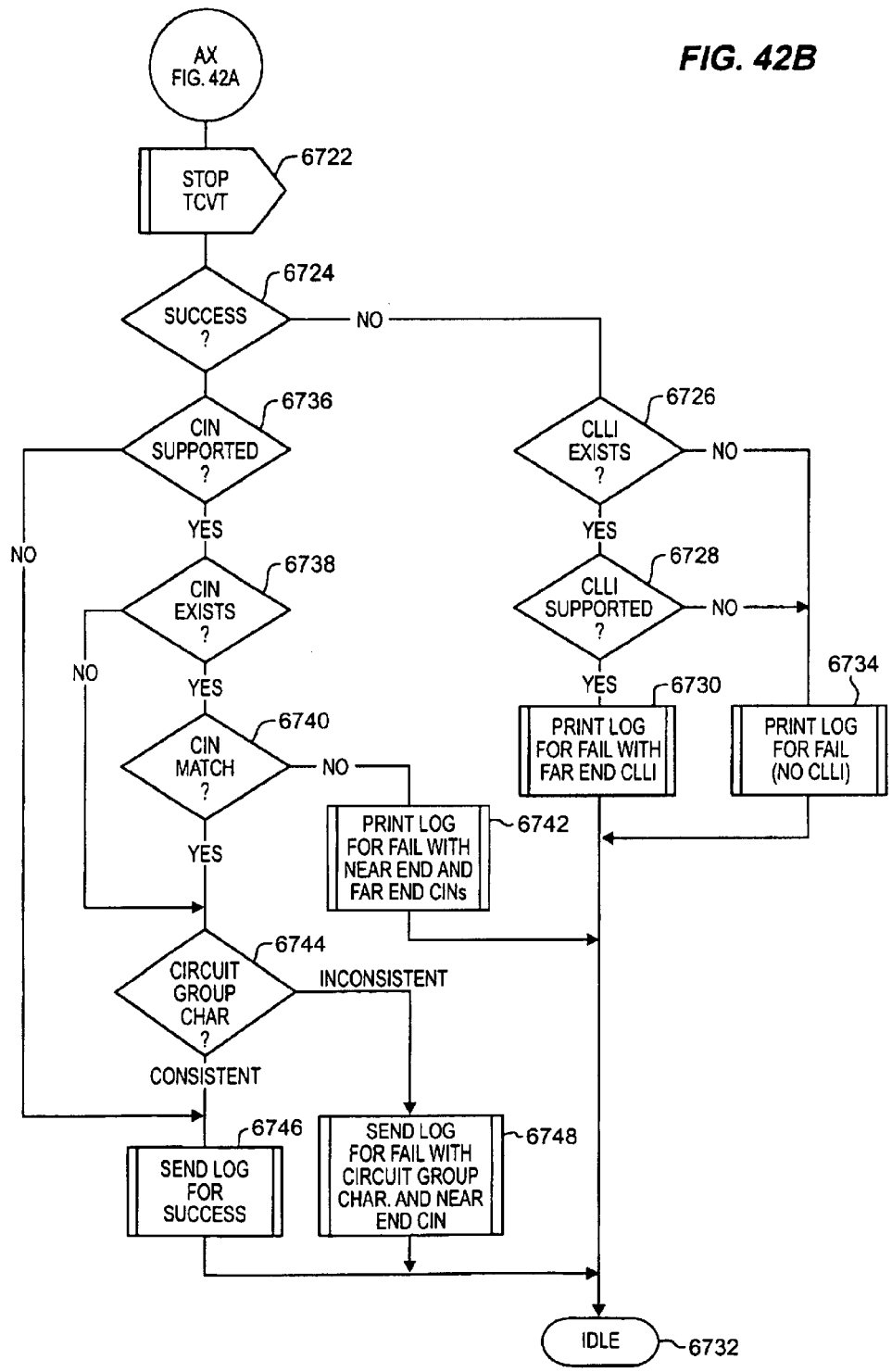

FIGS. 42A–42B illustrate the process for circuit validation test (CVT) sending. The CVT sending process (CVTS) is in idle at 6698. A CVT request is initiated at 6700. If a circuit translation does not exist at 6702, then maintenance is alerted by sending a log to maintenance at 6704. Idle is attained at 6706.

If a circuit translation does exist at 6702, a CVT is sent at 6708. The timer for the CVT is started at 6710, and the process waits for a circuit validation response (CVR) at 6712. If the CVT timer times out at 6714, and if that is the first time out of the CVT timer at 6716, then the CVT is retransmitted at 6708, and the CVT timer is restarted at 6710. If, however, the time out of the CVT timer at 6714 is not the first time out at 6716, maintenance personnel are alerted by sending a log to maintenance at 6718. Idle then is attained at 6720.

If, while waiting for the CVR at 6712, the CVR is received at 6721, then the CVT timer is stopped at 6722 (FIG. 42B). It is determined if the CVT was successful at 6724.

If the circuit validation test was not successful at 6724, but if a common language locator indicator (CLLI) exists in the CVR at 6726, and if the CLLI is supported by the near end system at 6728, then the log for the failure with the far end CLLI is printed at 6730. Idle then is attained at 6732. If, however, the CLLI is not supported at 6728, or if a CLLI does not exist at 6726, then the log for the failure is printed at 6734 without the CLLI. Idle then is attained at 6732.

After the timer for the CVT is stopped at 6722, if the circuit validation test is successful at 6724, then it is determined if the circuit identification name (CIN) is supported at 6736. If the CIN is supported at 6736, and if the CIN exists in the CVR at 6738, it is determined if the CIN from the CVR which described the far end CIN matches with the near end CIN at 6740. If the CIN from the far end does not match the CIN with the near end at 6740, then the log for the failure is printed including the near end CIN and the far end CIN at 6742. Idle then is attained at 6732.

If the CIN from the far end matches the CIN from the near end at 6740, it is determined if the circuit group characteristics from the far end and the near end are consistent at 6744. If the circuit group characteristics are consistent at 6744, then a log is sent to maintenance showing success at 6746. Idle then is attained at 6732. If, however, the circuit group characteristics are inconsistent at 6744, a log for the failure is sent to maintenance including the circuit group characteristics and the near end CIN at 6748. Idle then is attained at 6732.

At step 6736, if the CIN is not supported, the process continues at step 6746, and a log for success is sent to maintenance. In addition, at step 6738, if a CIN does not exist, the process continues at step 6744 to determine if the circuit group characteristics for the near end and the far end are inconsistent or consistent.

Circuit Validation Test Receiving Process

Figure 43:
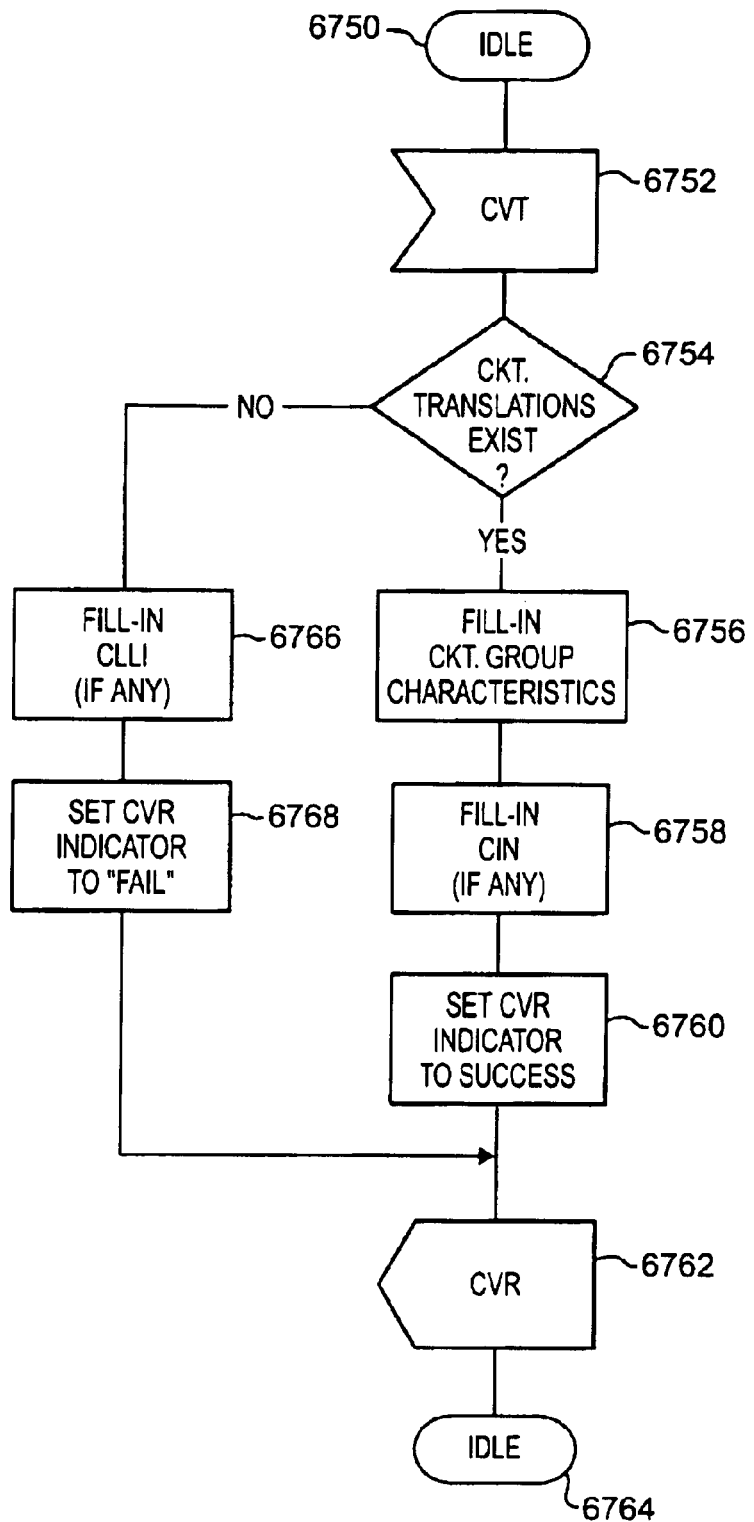
FIG. 43 is an SDL diagram of logic used in a version of the invention for a circuit validation test receiving process.

FIG. 43 illustrates the process for circuit validation test (CVT) receiving. The CVT receiving process (CVTR) is in idle at 6750. A CVT is received at 6752. If circuit translations exist in the CVT at 6754, then the circuit group characteristics are filled in at 6756. Also, the CIN is filled in at 6758. The CVR indicator is set to success at 6760. A CVR is sent at 6762, and idle is attained at 6764.

If circuit translations do not exist at 6754, then the CLLI is filled in for the response parameter at 6766. The CVR indicator is set to fail at 6768. The CVR is sent at 6762, and idle is attained at 6764.

Continuity Recheck Outgoing Process

FIGS. 44A–44F illustrate the continuity recheck outgoing process (CRO). CRO is in idle at 6770. If a resume is initiated at 6772, idle is attained at 6774. In addition, if a stop CRO is initiated at 6776, idle is attained at 6774.

If a start CRO is initiated at 6778, it is determined if the software carrier group alarm (SCGA) is equipped at 6780. If the SCGA is equipped at 6780, and if the circuit is seized for the SCGA at 6782, then idle is attained at 6774. If, however, the circuit is not seized for the SCGA at 6782, then the SCGA process is started at 6784. The process waits for the SCGA at 6786.

If, while waiting for the SCGA at 6786, a stop CRO is initiated at 6788, then the SCGA is stopped at 6790. Idle then is attained at 6774.

If, while waiting for the SCGA at 6786, a resume is initiated at 6792, then a first time indicator is set to "on" at 6794. Then, the T25 timer is started at 6796. It will be appreciated that if the SCGA group is not equipped at step 6780, then the first time indicator is set to "on" at 6794, and the T25 timer is started at 6796.

After the T25 timer is started at 6796, the process waits for a time out at 6798 (FIG. 44B). If a stop is initiated at 6800, either the T25 timer or the T26 timer is stopped at 6802. The T25 timer is stopped when the initial continuity recheck process is operational. The T26 timer is stopped when a second continuity recheck is operational. Next, the circuit is set to idle at 6804. Idle is attained at 6806.

If either the T25 timer times out at 6808 or the T26 timer times out at 6810 while waiting for time out at 6798, then the continuity check is repeated at 6812. The process then waits for a continuity check response at 6814.

If, while waiting for a time out at 6798, and initial address message (IAM) is received at 6816, the circuit is set to idle at 6818. A response IAM is sent at 6820. The T25 timer or the T26 timer is stopped, depending on which is operational at 6822. Idle is attained at 6824.

If, while waiting for a time out at 6798, a manual stop is initiated at 6826, the T25 timer or the T26 timer is stopped, depending on which is operational at 6828. The process then jumps to step 6848 (FIG. 44C) where it is determined if the first time indicator is on.

On FIG. 44C, the system is waiting for a continuity recheck at 6830. If a demand continuity outgoing (DCO) fail is initiated at 6832, and if the first time indicator is set to "on" at 6834, a log is sent to maintenance notifying them of the failure at 6836. The first time indicator is set to "on" at 6838. A continuity message (COT) failure is sent at 6840. The T26 timer is started at 6842, and the process waits for a time out at 6844.

At step 6834, if the first time indicator is not on, then the T26 timer is started at 6842. The process then waits for a time out at 6844.

A DCO success is initiated at 6846 while waiting for the continuity recheck at 6830. For the continuity check to be considered successful, a loop back acknowledgment message (LPA) must be received before the expiration of the timers for a CCR. If the first time indicator is set on at 6848, the first time indicator is turned off at 6850. If the first time indicator is not on at 6848, then the first time indicator is set on at 6852. Next, an REL is sent at 6854. The circuit is marked as transient at 6856. The T1 and T5 timers are started at 6858 and 6860, respectively. Then, the system waits for a release complete message (RLC) at 6862.

A DCO LPA failure may be initiated at 6864 while waiting for the continuity recheck at 6830. Then, the continuity recheck is restarted at 6866. The circuit is set to idle at 6868, and idle is attained at 6870.

Figure 44E:
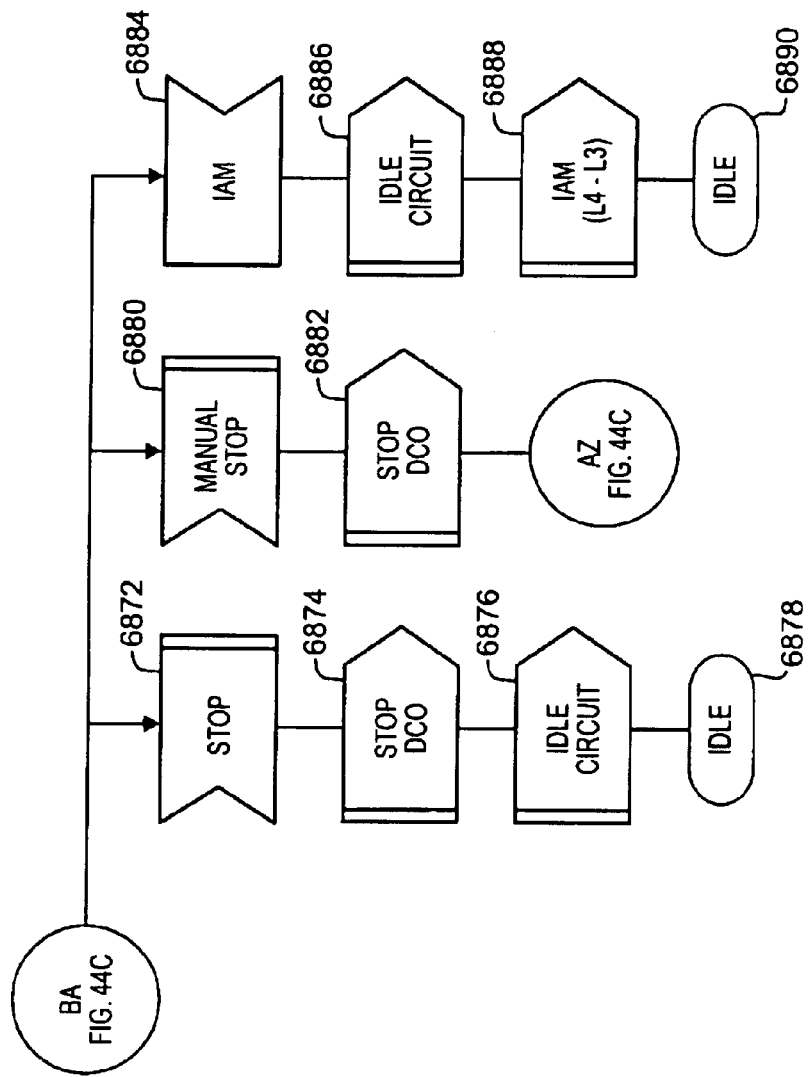

On FIG. 44E, a stop may be initiated at 6872 while waiting for the continuity recheck at 6830 (FIG. 44C). Then, the DCO is stopped at 6874. The circuit is set to idle at 6876, and idle is attained at 6878.

A manual stop may be initiated at 6880 while waiting for the continuity recheck at 6830 (FIG. 44C). The DCO is stopped at 6882. The process then continues at step 6848 where it is determined if the first time indicator is on (FIG. 44C).

An IAM may be received at 6884 while waiting for the continuity recheck at 6830 (FIG. 44C). The circuit then is set to idle at 6886. An IAM is sent at 6888 for a level 3 signaling network function to a level 4 ISDN user part message. Idle then is attained at 6890.

On FIG. 44F, the process is waiting for an RLC at 6892. An RLC is received at 6894, and the OM is pegged at 6896. The T1 timer is stopped at 6898, and the T5 timer is stopped at 6900. The trunk circuit table is updated for the idle circuit at 6902, and idle is attained at 6904. If the T5 timer times out at 6906 while waiting for an RLC at 6892, the T1 timer is stopped at 6908. The circuit reset sending process (CRS) is started at 6910. A log message is sent to maintenance at 6912. The trunk circuit table is updated for the idle circuit at 6914, and idle is attained at 6916.

If the T1 timer times out at 6918, a release message is sent at 6920. The OM is pegged at 6922, and the T1 timer is restarted at 6924. The process then waits for an RLC at 6926.

If a stop is initiated at 6928 while waiting for the RLC at 6892, the T1 timer is stopped at 6930. Also, the T5 timer is stopped at 6932. The trunk circuit table is updated for the idle circuit at 6934, and idle is attained at 6936.

If an IAM is received at 6938 while waiting for the RLC at 6892, the OM is pegged at 6940. The T1 timer is stopped at 6942, and the T5 timer is stopped at 6944. The trunk circuit table is updated for the idle circuit at 6946. An IAM for L4 to L3 is initiated at 6948, and idle is attained at 6950.

If an REL is received at 6952 while waiting for the RLC at 6892, the OM for the REL is pegged at 6954. An RLC is sent at 6956, and the OM for the RLC is pegged at 6958. The system then waits for an RLC at 6960.

If, while waiting for the RLC at 6892, other messages are received at 6962, the OM is pegged at 6964. The other messages are ignored and discarded at 6966. The system then waits again for an RLC at 6968.

Circuit Group Reset Message Reception

Figure 45A:
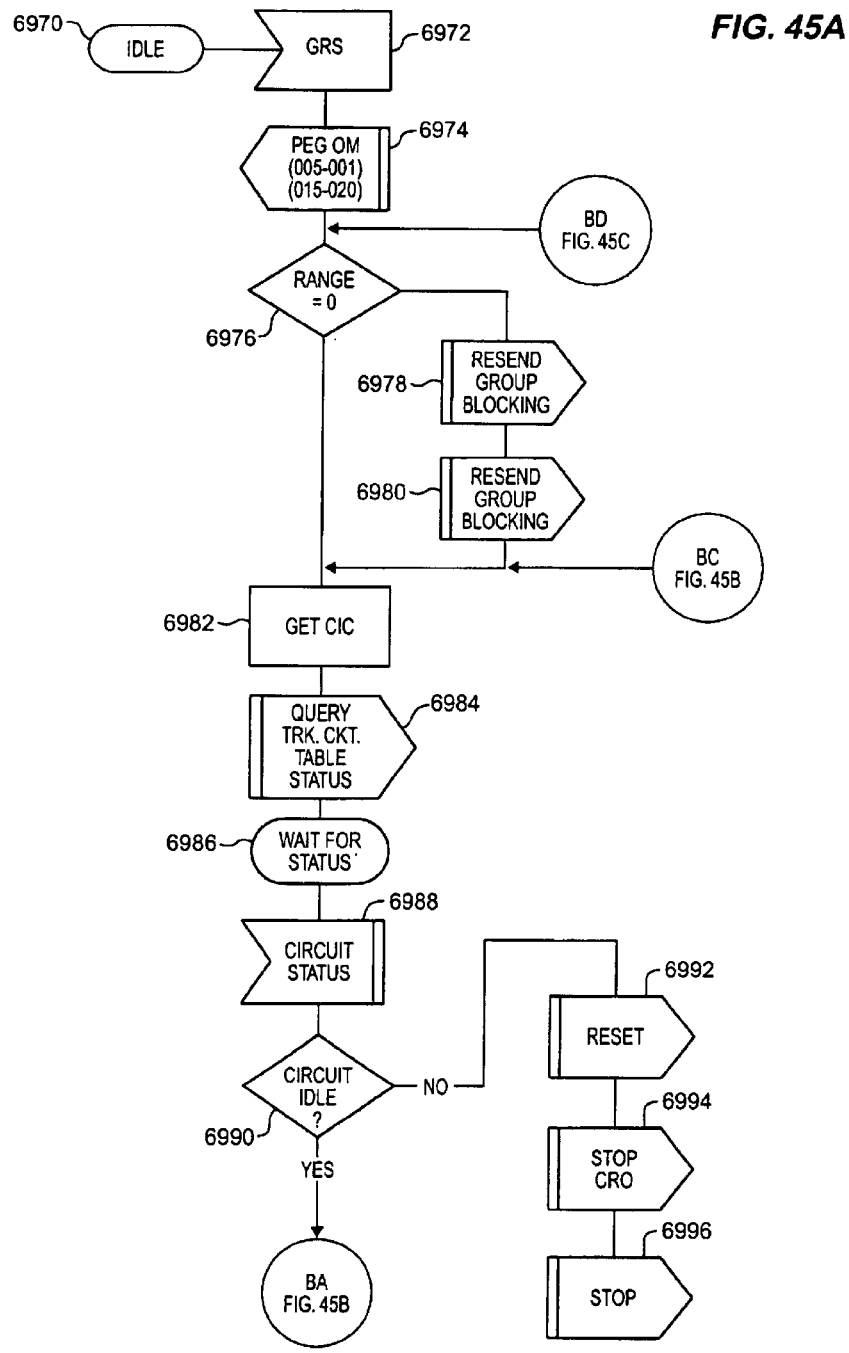
FIGS. 45A–45C are SDL diagrams of logic used in a version of the invention for a circuit group reset reception process.
Figure 45B:
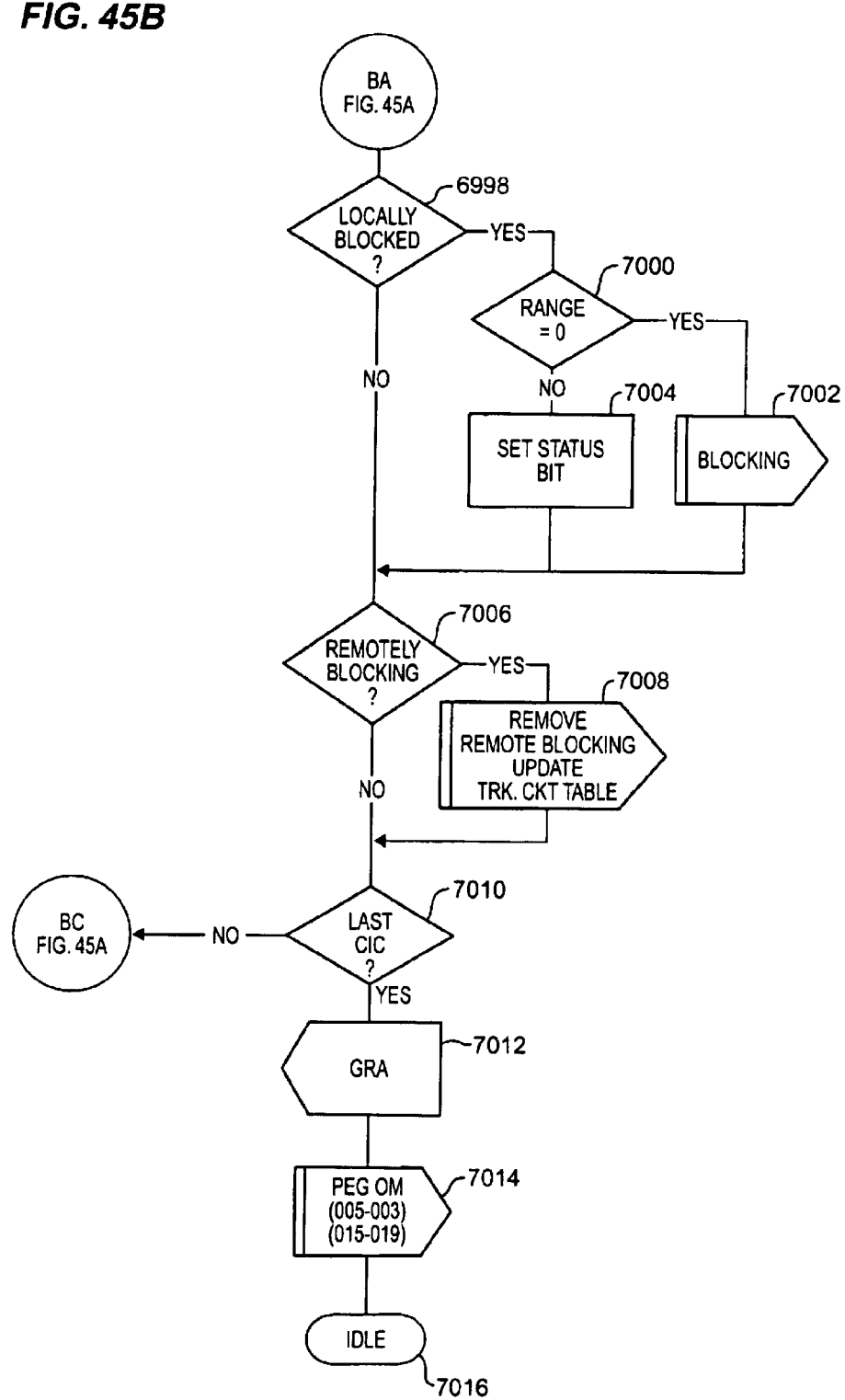
Figure 45C:
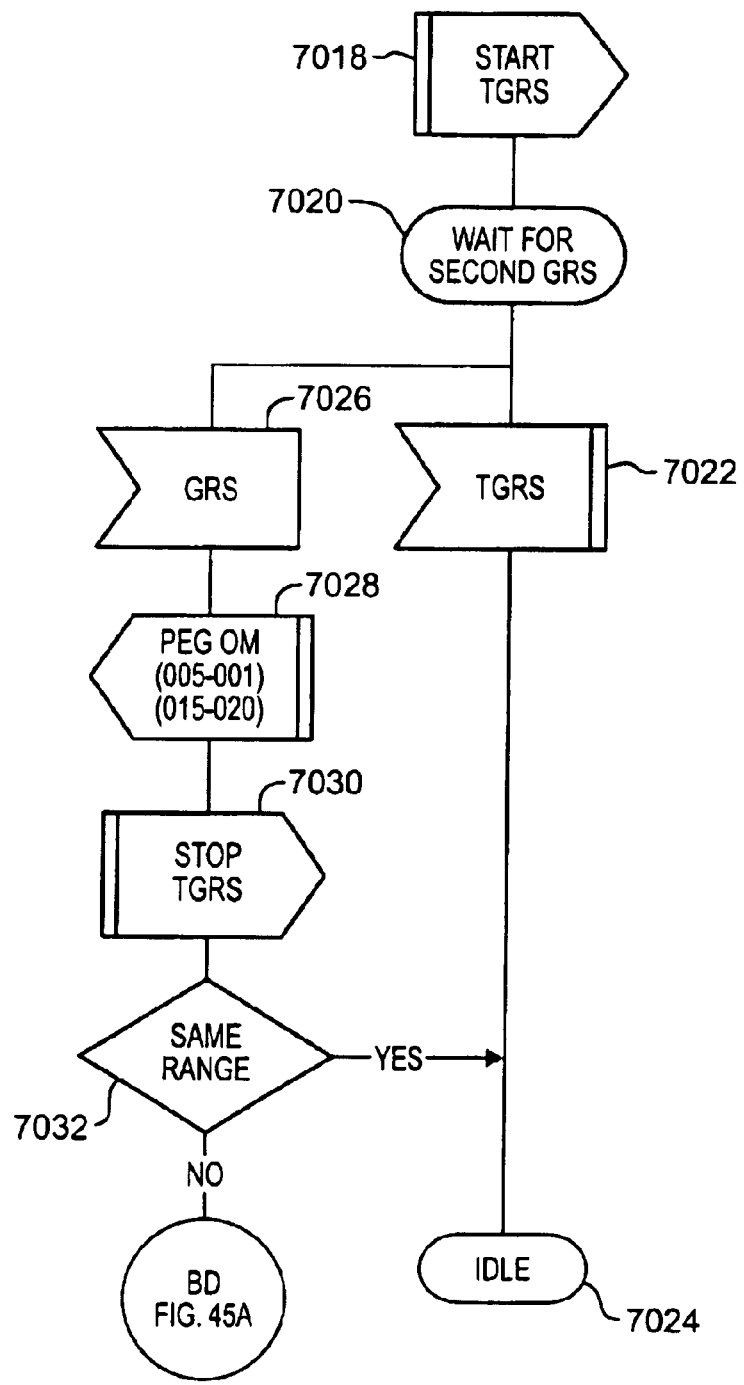

FIGS. 45A–45C illustrate the circuit group reset message (CGR) reception process (CGRR). The CGRR is idle at 6970. A group reset message (GRS) is received at 6972. The OM for the GRS is pegged at 6974. If the range specified in the GRS is equal to zero at 6976, then group blocking with release is initiated at 6978. Also, group blocking with no release is initiated at 6980: It will be appreciated that a range equal to zero indicates that a predetermined set of circuits is to be reset. Next, the CIC for the range is obtained at 6982. In addition, if the range at 6976 is not equal to zero, then the CIC for the range is obtained at 6982.

The trunk circuit table is queried to determine the circuit status at 6984, and the process waits for the status at 6986. The status is returned and received at 6988. If the circuit is not in idle at 6990, then the circuit is reset at 6992. The CRO process is stopped at 6994. The CRI process is stopped at 6996. If the circuit was idle at 6990, then the reset, stop CRO, and stop CRI steps 6992, 6994, and 6996, respectively, are skipped.

Next, it is determined at 6998 if the circuit is locally blocked (FIG. 45B). If the circuit is locally blocked at 6998, and if the range is equal to zero at 7000, then blocking is initiated at 7002. If the circuit is locally blocked at 6998, and the range is not equal to zero at 7000, then the status bit is set for the group reset acknowledgment message (GRA) at 7004. Next, it is determined if the circuit is remotely blocked at 7006. In addition, if the circuit was not locally blocked at 6998, then it is determined if the circuit is remotely blocked at 7006.

If the circuit is remotely blocked at 7006, the remote blocking is removed at 7008, and the trunk circuit table is updated with that circuit status. If the circuit is not remotely blocked at 7006, then the removal of the remote blocking at step 7008 is skipped. If the CIC for the circuit is the last CIC within the range at 7010, then the GRA is sent at 7012. If the CIC for the circuit is not the last CIC within the range at 7010, then the process continues at step 6982 (FIG. 45A). The OM for the GRA is pegged at 7014. Idle is attained at 7016.

FIG. 45C illustrates an optional process for operating a GRS timer. This optional process is initiated prior to reaching the idle state at step 7016 (FIG. 45B). The GRS timer is started at 7018, and the process waits for a second GRS at 7020. If the GRS timer times out at 7022, idle is attained at 7024. If, while waiting for the second GRS at 7020, the GRS is received at 7026, the OM for the GRS is pegged at 7028. The timer for GRS is stopped at 7030. If the range given in the second GRS that was received at step 7026 is the same range from the first GRS at 7032, then idle is attained at 7024. If the range is not the same at 7032, then the process continues at step 6976 (FIG. 45A).

Circuit Group Reset Message Sending

Figure 46A:
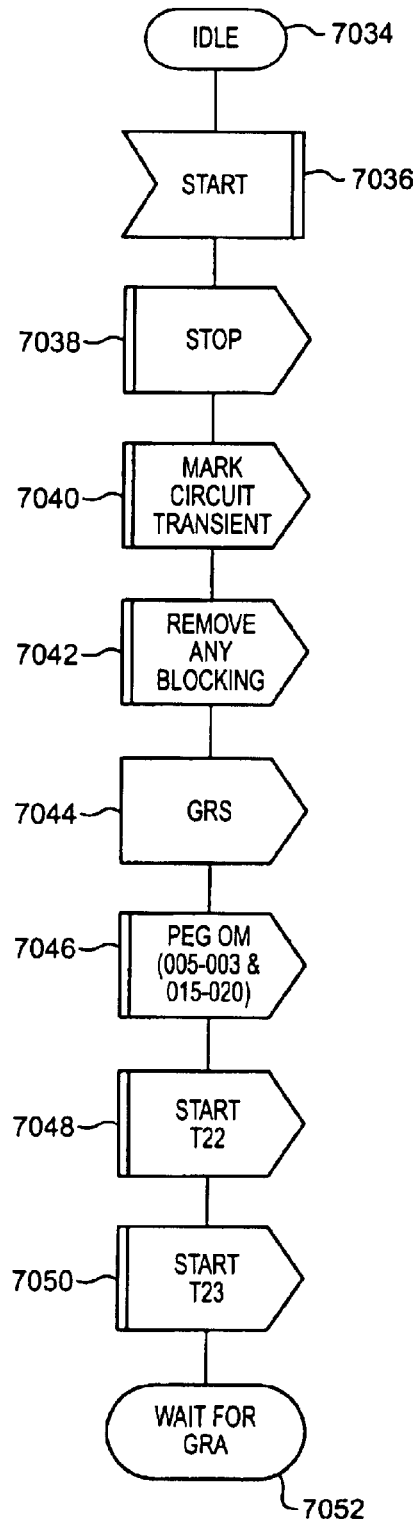
Figure 46C:
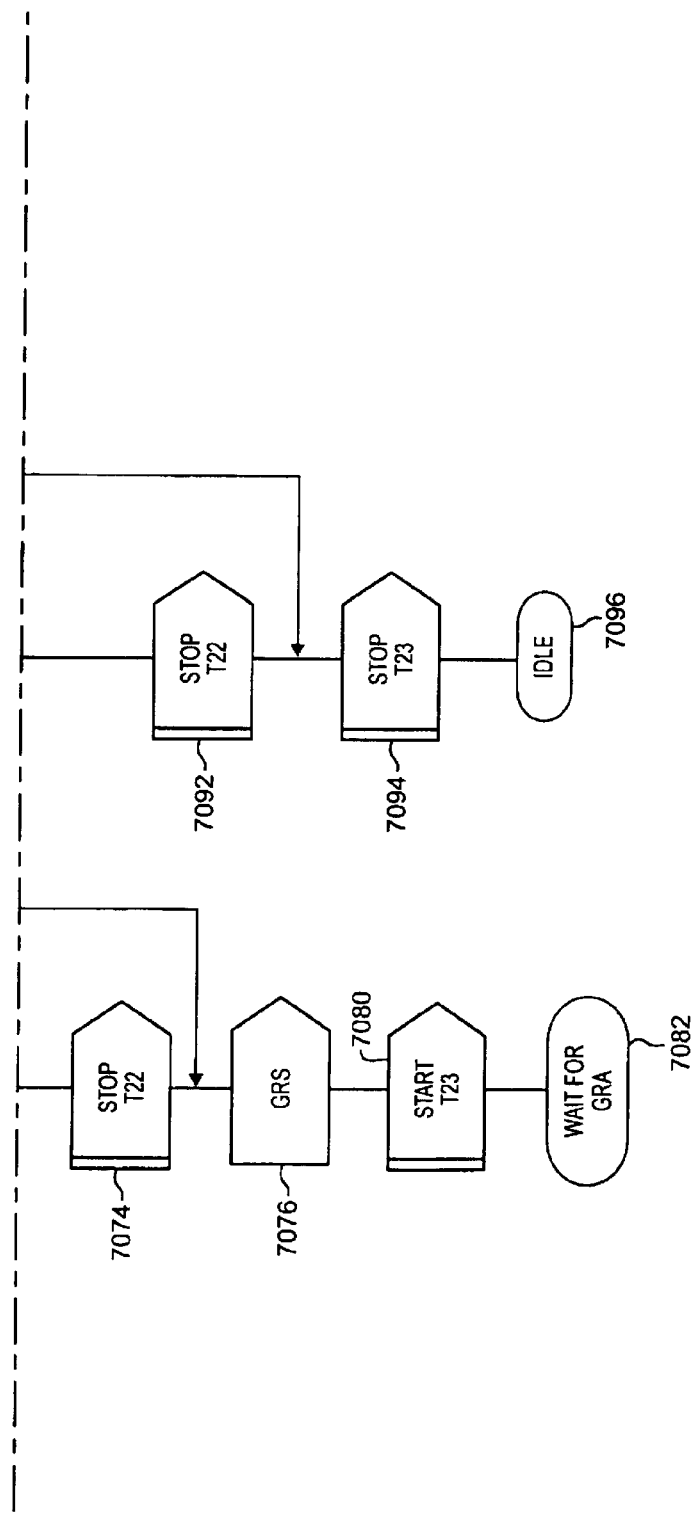

FIGS. 46A–46C illustrate the circuit group reset message (CGR) sending process (CGRS). The CGRS process is in idle at 7034. The CGRS process is started at 7036. All other processes on the circuits within the range of the circuit group to be reset are stopped at 7038. The circuits within the range specified to be reset are marked as transient at 7040. The trunk circuit table is updated for the transient status of the circuits. All blocking is removed from the circuits at 7042, and the trunk circuit table is again updated for the status of the circuits. A GRS is sent at 7044. The OM for the ORS is pegged at 7046. The T22 timer is started at 7048, and the T23 timer is started at 7050. The process then waits for a ORA at 7052.

On FIG. 46B, the process is waiting for a ORA at 7054. If a T22 timer times out at 7056, a group reset sending message (ORS) is sent at 7058. The T22 timer is restarted at 7062, and the process again waits for GRA at 7064.

If the T23 timer times out at 7066 while waiting for the GRA at 7054, it is determined if the alert indicator is off at 7068. If the alert indicator is off at 7068, the alert indicator is reset to be on at 7070. Maintenance personnel are alerted at 7072 by sending a log to maintenance. The T22 timer is stopped at 7074. If the alert indicator is on at 7068, then the process continues down below step 7074 to step 7076.

At step 7076, a ORS is sent. The T23 timer is restarted at 7080, and the process again waits for a GRA at 7082.

A GRA may be received at 7084 while waiting for the GRA at 7054. The remotely blocked states are refreshed for the range and status at 7086 from the range and status specified in the GRA that was received at 7084. Each circuit specified in the range is set to idle at 7088. If the T22 timer is active at 7090, then the T22 timer is stopped at 7092. If the T22 timer is not active at 7090, then the stop T22 timer step is skipped at 7092. Next, the T23 timer is stopped at 7094. Idle is attained at 7096.

A manual stop may be initiated at 7098 while waiting for the GRA at 7054. Next, if the T22 timer is active at 7090, then the T22 timer is stopped at 7092. Otherwise, if the T22 timer is not active at 7090, the stop T22 timer step is skipped at 7092. The T23 timer is stopped at 7094, and idle is attained at 7096.

If a CGRS stop is initiated at 7100, then maintenance personnel are alerted by sending a log to maintenance at 7102. If the T22 timer is active at 7090, then the T22 timer is stopped at 7092. Otherwise, if the T22 timer is not active at 7090, then the stop T22 timer step at 7092 is skipped. The T23 timer then is stopped at 7094, and idle is attained at 7096.

Loop Back Acknowledgment Process

Figure 47A:
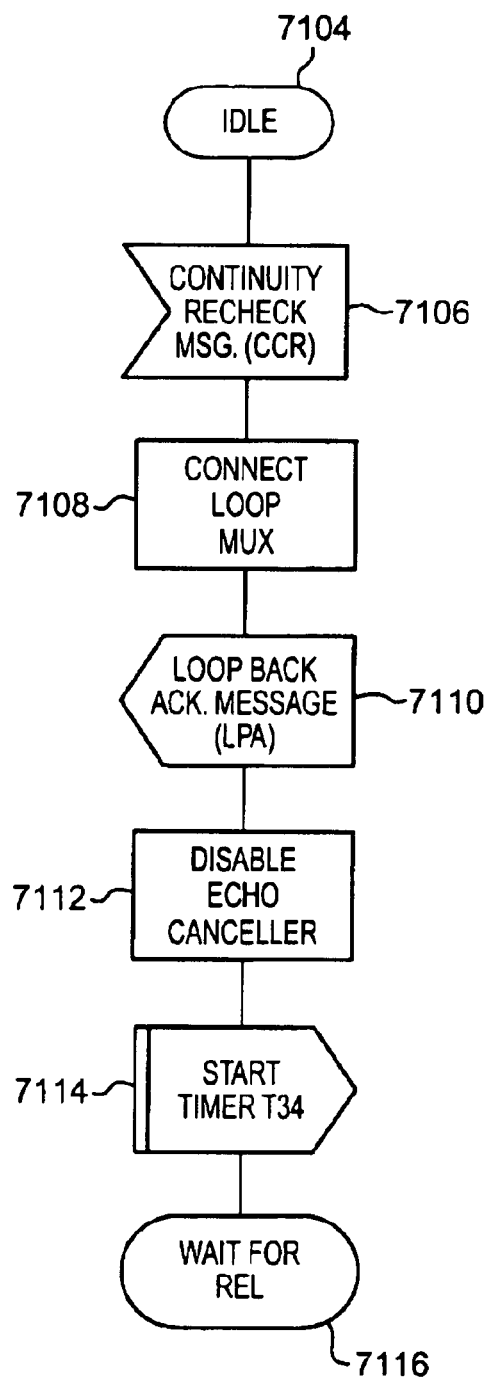
FIGS. 47A–47C are SDL diagrams of logic used in a version of the invention for a loop back acknowledgment process.
Figure 47B:
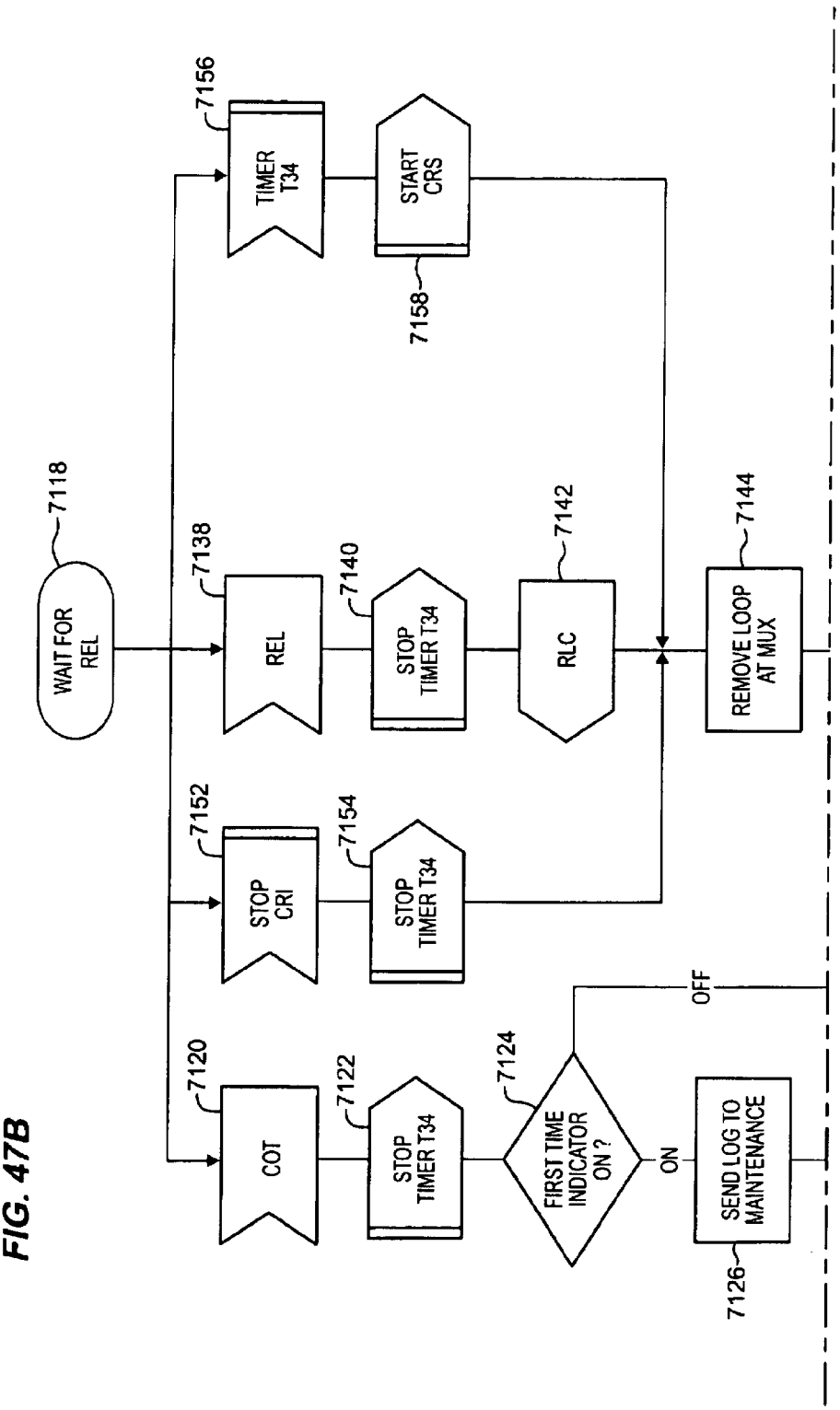
Figure 47C:
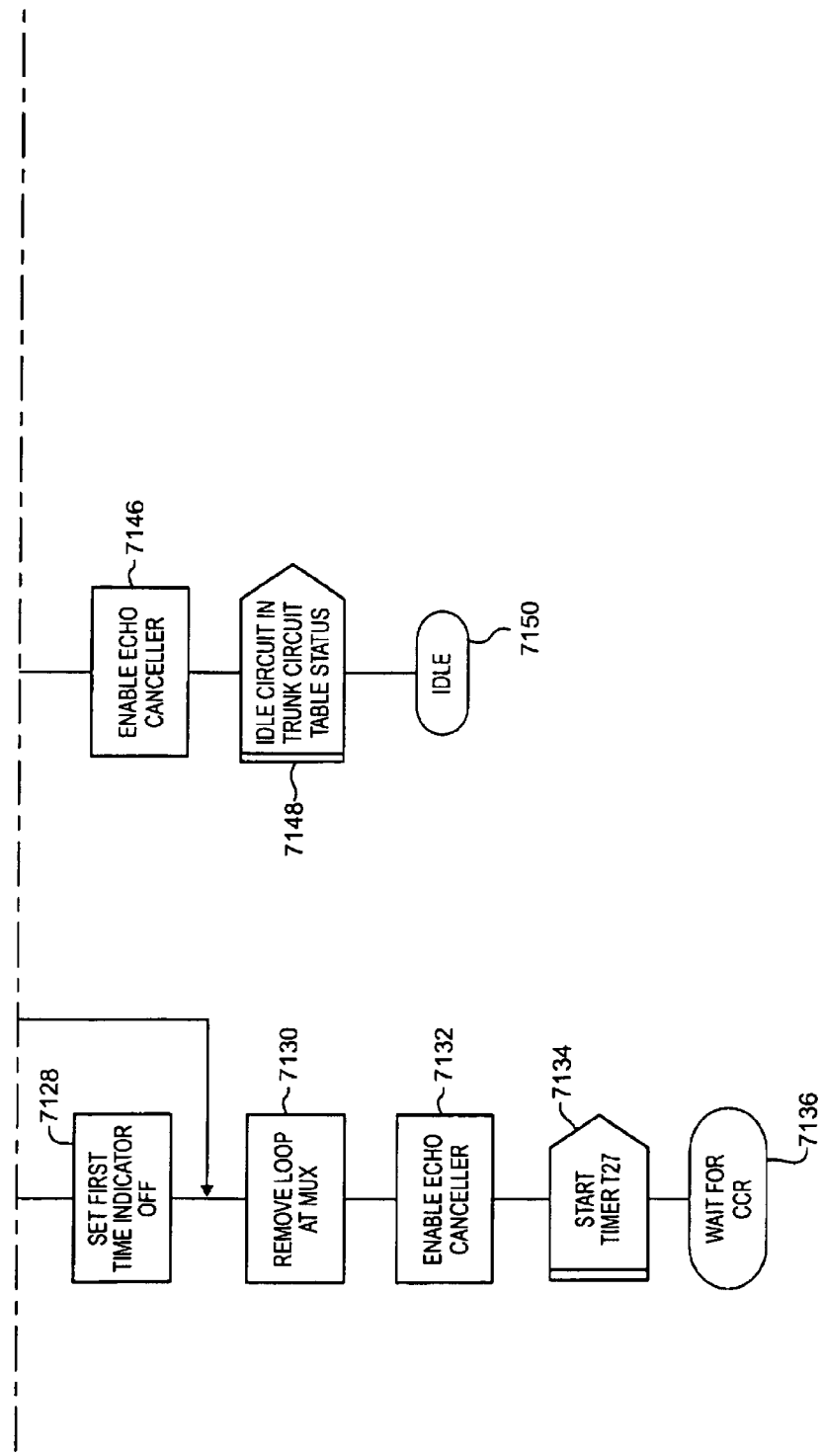

FIGS. 47A–47C illustrate the loop back acknowledgment (LPA) process. On FIG. 47A, the LPA process is in idle at 7104. A CCR is received at 7106. A loop is connected to the mux at 7108. An LPA is sent at 7110, and the echo canceller is disabled at 7112. The T34 timer is started at 7114, and the process waits for an REL at 7116.

On FIG. 47B, the process is waiting for an REL at 7118. If a COT is received at 7120 while waiting for an REL at 7118, the T34 timer is stopped at 7122. If the first time indicator is on at 7124, a log is sent to maintenance at 7126. The first time indicator is then turned off at 7128. If the first time indicator is off at 7124, step 7126 and step 7128 are skipped.

Next, the loop is removed at the mux at 7130. The echo canceller is enabled at 7132. The T27 timer is started at 7134, and the process waits for a CCR at 7136.

If an REL is received at 7138 while waiting for the REL at 7118, the T34 timer is stopped at 7140. An RLC is sent at 7142. The loop is removed at the mux at 7144. The echo canceller is enabled at 7146. The circuit is set for idle in the trunk circuit table status at 7148, and idle is attained at 7150.

If a stop CRI is initiated at 7152 while waiting for the REL at 7118, the T34 timer is stopped at 7154. The loop is removed at the mux at 7144. The echo canceller is enabled at 7146. The circuit is set to idle in the trunk circuit table status at 7148, and idle is attained at 7150.

If the T34 timer expires at 7156 while waiting for the REL at 7118, the CRS process is started at 7158. The loop is removed at the mux at 7144, and the echo canceller is enabled at 7146. The circuit is set to idle in the trunk circuit table status at 7148, and idle is attained at 7150.

Continuity Recheck Incoming

FIGS. 48A–48D illustrate the continuity recheck incoming process (CRI). On FIG. 48A, the CRI is idle at 7160. A continuity check request message (CCR) is received at 7162. The first time indicator is set to "on" at 7164. The loop is connected for the circuit at 7166, and an LPA is sent at 7168. The echo suppresser is disabled at 7170. The T34 timer is started at 7172, and the process waits for an REL at 7174.

While in idle at 7160, the CRI process is started at 7176. The first time indicator is set to "on" at 7178. The continuity check request timer (TCCR) is started at 7180, and the system waits for a CCR at 7182.

If, while waiting for the CCR at 7182, the CCR is received at 7184, then the loop for the circuit is connected at 7166. An LPA is sent at 7168, and the echo suppresser is disabled, if any, at 7170. The T34 timer is started at 7172, and the system waits for an REL at 7174.

If, while waiting for the CCR at 7182, either the TCCR timer times out at 7186 or the T27 timer times out at 7188, then the circuit reset sending process (CRS) is started at 7190. The circuit is set to idle at 7192, and idle is attained at 7194.

If an REL is received at 7196 while waiting for the CCR at 7182, an RLC is sent at 7198, the TCCR timer is stopped at 7200. The circuit is set to idle at 7202, and idle is attained at 7204.

An IAM may be received at 7206 while waiting for the CCR at 7182. Then, an IAM is initiated at 7208 for a level three signaling network function. The TCCR timer is stopped at 7200. The circuit is set to idle at 7202, and idle is attained at 7204.

The CRI process is stopped at 7210 while waiting for the CCR at 7182. Then, the TCCR timer is stopped at 7200. The circuit is set to idle at 7202, and idle is attained at 7204.

Figure 48A:
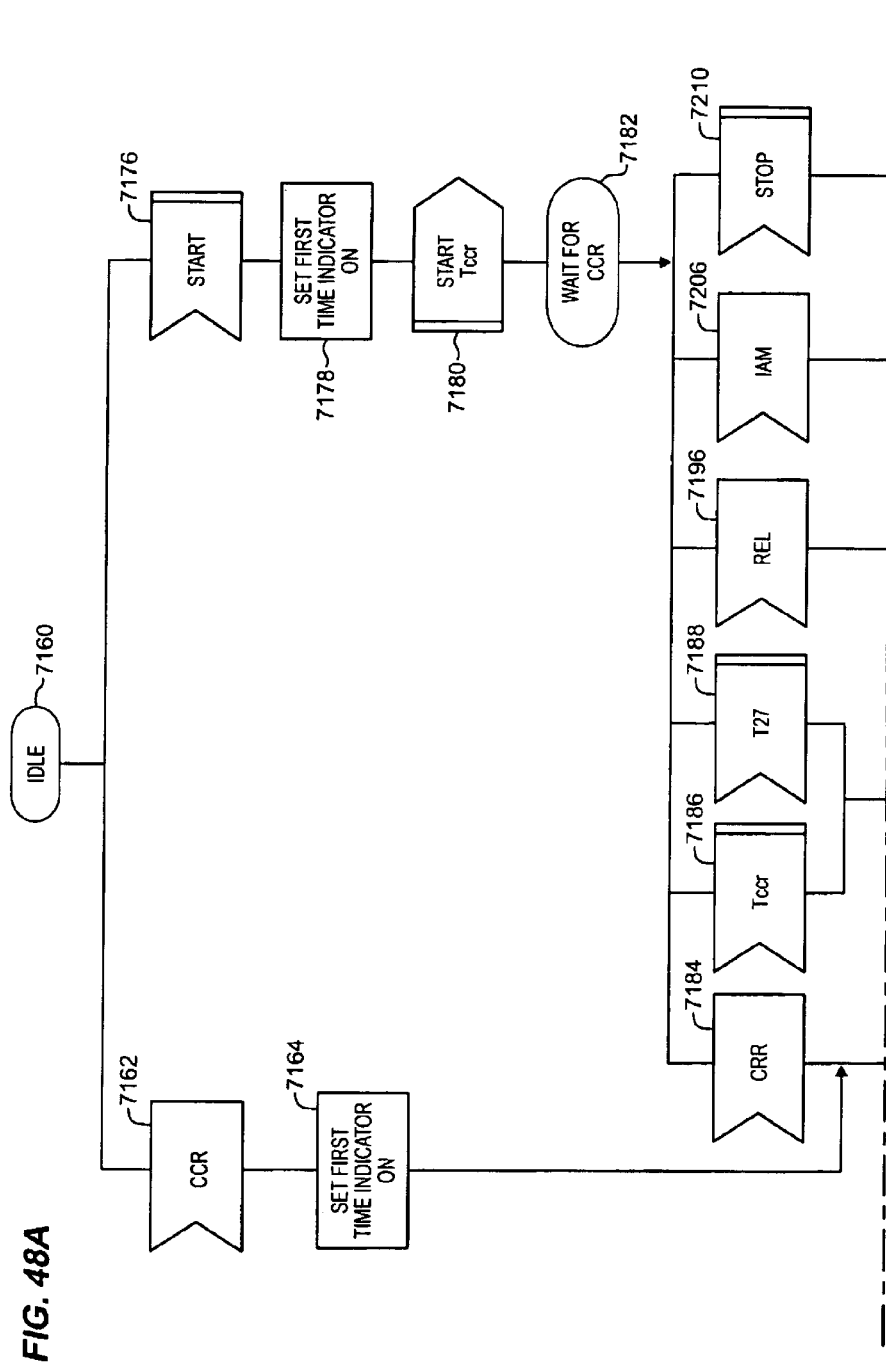
FIGS. 48A–48D are SDL diagrams of logic used in a version of the invention for a continuity recheck incoming process.
Figure 48B:
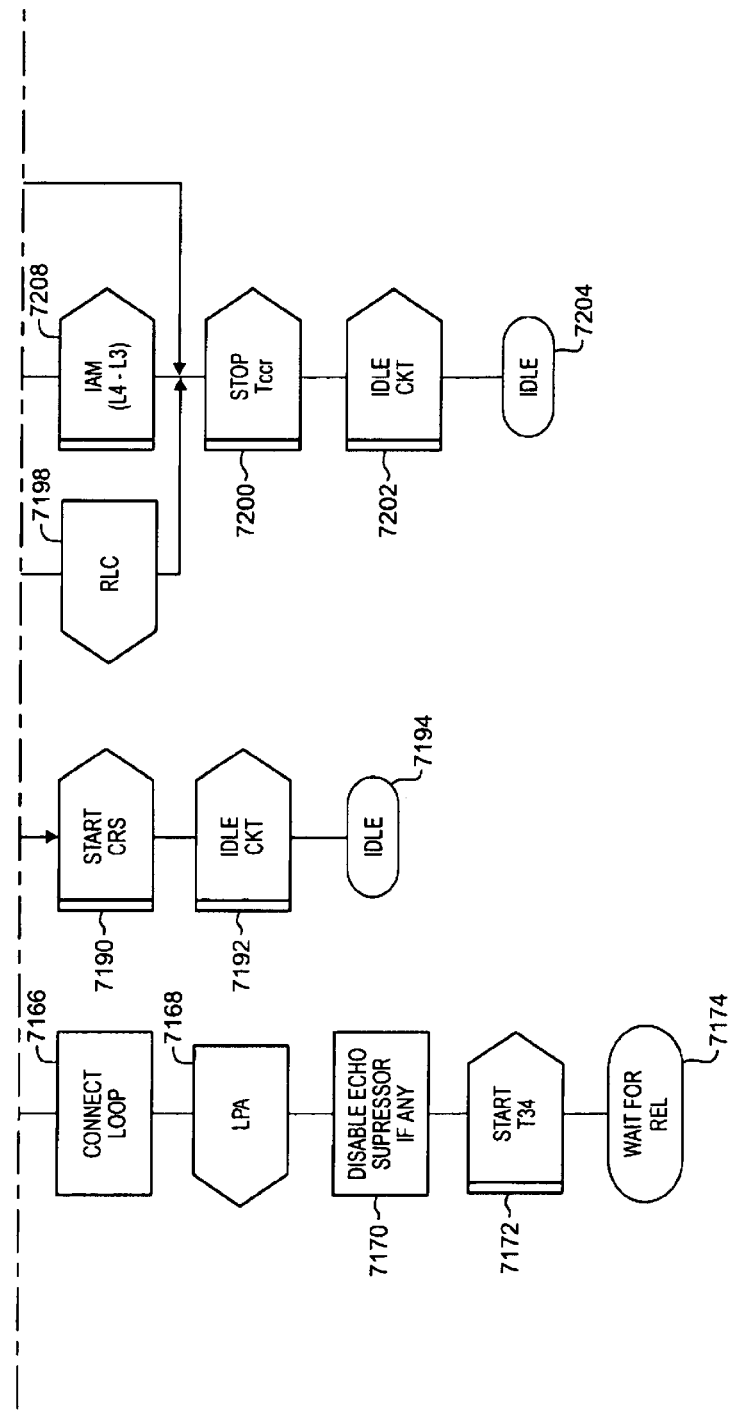
Figure 48C:
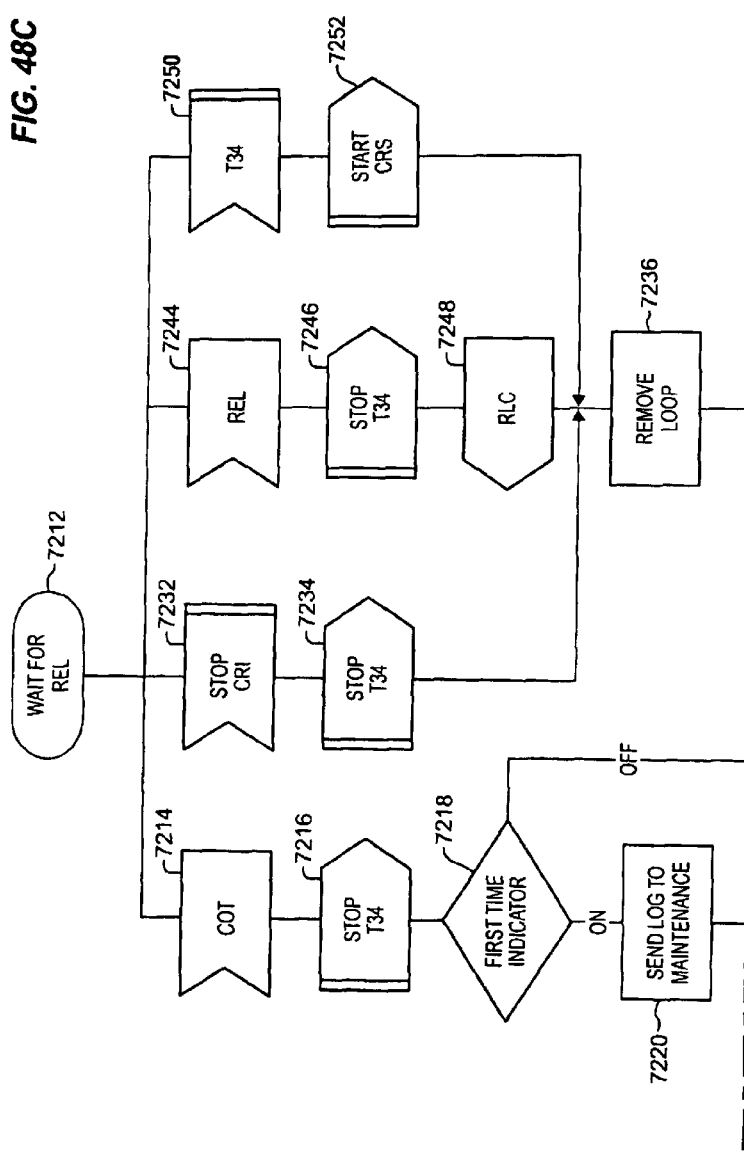
Figure 48D:
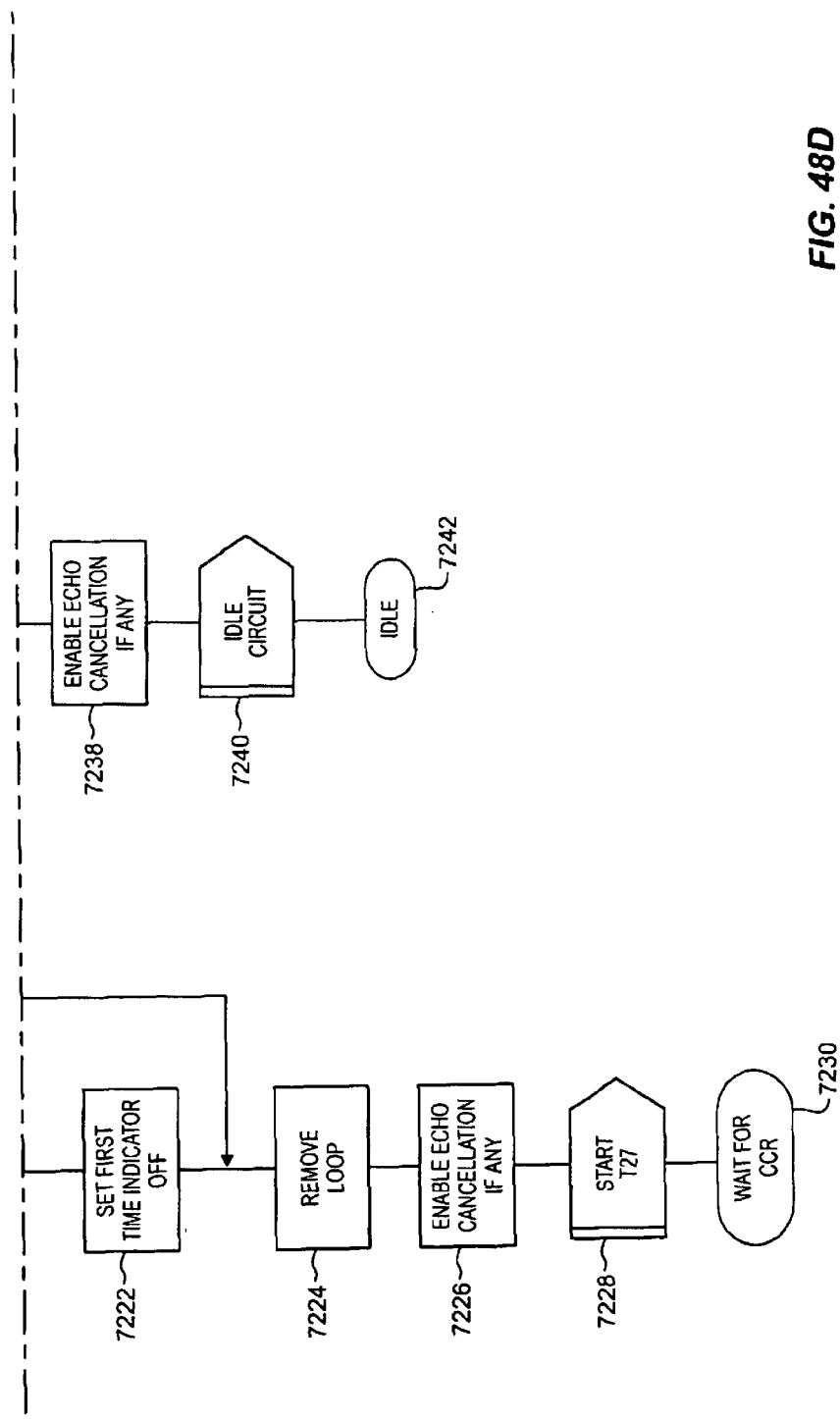

On FIG. 48C, the process is waiting for an REL at 7212. A COT is received at 7214. The T34 timer is stopped at 7216. If the first time indicator is on at 7218, then maintenance personnel is alerted by sending a log to maintenance at 7220. The first time indicator is reset to "off" at 7222. The loop is removed at 7224. Echo cancellation is enabled on the circuit, if any, at 7226. The T27 timer is started at 7228, and the process then waits for a CCR at 7230.

The CRI process may be stopped at 7232 while waiting for the REL at 7212. Then, the T34 timer is stopped at 7234. The loop is removed at 7236, and echo cancellation is enabled at 7238. The circuit is set to idle at 7240, and idle is attained at 7242.

An REL is received at 7244 while waiting for the REL at 7212. The T34 timer is stopped at 7246. An RLC is sent at 7248. The loop is removed from the circuit at 7236, and echo cancellation is enable for the circuit at 7238. The circuit is set to idle at 7240, and idle is attained at 7242.

If the T34 timer times out at 7250 while waiting for the REL at 7212, the CRS process is started at 7252. The loop is removed from the circuit at 7236, and echo cancellation is enabled for the circuit at 7238. The circuit is set to idle at 7240, and idle is attained at 7242.

Those skilled in the art will appreciate variations in the above disclosure that do not depart from the scope of the invention. As such, the invention should be measured by the scope and meaning of the following claims.

What is claimed is:

1. A communication signaling processor comprising:
   a signaling interface configured to receive a Signaling System Seven (SS7) Initial Address Message (IAM) for a call; and
   a call processor that is external to telecommunications switches and that includes a first data structure having originating connection information, a second data structure having packet routing information, and additional data structures, wherein the call processor is configured to process data from the SS7 IAM to determine an originating connection for the call, enter the first data structure with the originating connection for the call to yield a first pointer, process at least some of the additional data structures based on the first pointer to yield a second pointer, enter the second data structure based on the second pointer to yield the packet routing information for the call, and to transfer a control message indicating the packet routing information for the call.

2. The communication signaling processor of claim 1 wherein the originating connection comprises a time division multiplex connection.

3. The communication signaling processor of claim 1 wherein a device receives time division multiplex communications for the call from the originating connection and receives the control message, and in response to the control message, converts the division multiplex communications into packet communications having the packet routing information in packet headers.

4. The communication signaling processor of claim 1 wherein the call processor is configured to process at least some of the additional data structures based on the first pointer to yield an index, select the second data structure with the second pointer, and enter the second data structure with the index to yield the packet routing information for the call.

5. The communication signaling processor of claim 1 wherein the routing information comprises asynchronous transfer mode virtual connection information.

6. The communication signaling processor of claim 1 wherein one of the additional data structures comprises a caller number data structure having information for caller numbers.

7. The communication signaling processor of claim 1 wherein one of the additional data structures comprises a called number data structure having information for called numbers.

8. The communication signaling processor of claim 1 wherein one of the additional data structures comprises a query data structure having information for queries for additional call processing.

9. The communication signaling processor of claim 1 wherein one of the additional data structures comprises a ported number data structure having information for ported numbers.

10. The communication signaling processor of claim 1 wherein one of the additional data structures comprises an exception data structure having information for call routing exceptions.

11. A method of operating a communication signaling processor that includes a first data structure having originating connection information, a second data structure having packet routing information, and additional data structures, the method comprising:
    receiving a Signaling System Seven (SS7) Initial Address Message (IAM) for a call;
    processing data from the SS7 IAM to determine an originating connection for the call;
    entering the first data structure with the originating connection for the call to yield a first pointer;
    processing at least some of the additional data structures based on the first pointer to yield a second pointer;
    entering the second data structure based on the second pointer to yield the packet routing information for the call;
    transferring a control message indicating the packet routing information for the call; and
    wherein the call processor is external to telecommunications switches.

12. The method of claim 11 wherein the originating connection comprises a time division multiplex connection.

13. The method of claim 12 wherein a device receives time division multiplex communications for the call from the originating connection and receives the control message, and in response to the control message, converts the division multiplex communications into packet communications having the packet routing information in packet headers.

14. The method of claim 11 wherein processing at least some of the additional data structures comprises processing at least some of the additional data structures based on the first pointer to yield an index, and wherein entering the second data structure based on the second pointer comprises selecting the second data structure with the second pointer and entering the second data structure with the index to yield the packet routing information for the call.

15. The method of claim 1 wherein the routing information comprises asynchronous transfer mode virtual connection information.

16. The method of claim 11 wherein one of the additional data structures comprises a caller number data structure having information for caller numbers.

17. The method of claim 11 wherein one of the additional data structures comprises a called number data structure having information for called numbers.

18. The method of claim 11 wherein one of the additional data structures comprises a query data structure having information for queries for additional call processing.

19. The method of claim 11 wherein one of the additional data structures comprises a ported number data structure having information for ported numbers.

20. The method of claim 11 wherein one of the additional data structures comprises an exception data structure having information for call routing exceptions.

* * * * *